US010844324B2

(12) United States Patent
DiCosimo et al.

(10) Patent No.: US 10,844,324 B2
(45) Date of Patent: Nov. 24, 2020

(54) GLUCAN FIBER COMPOSITIONS FOR USE IN LAUNDRY CARE AND FABRIC CARE

(71) Applicant: DuPont Industrial Biosciences USA, LLC, Wilmington, DE (US)

(72) Inventors: Robert DiCosimo, Chadds Ford, PA (US); Qiong Cheng, Wilmington, DE (US); Rakesh Nambiar, West Chester, PA (US); Jayme L Paullin, Exton, PA (US); Mark S Payne, Wilmington, DE (US); Jahnavi Chandra Prasad, Wilmington, DE (US); Zheng You, Hoffman Estates, IL (US)

(73) Assignee: DUPONT INDUSTRIAL BIOSCIENCES USA, LLC, Wilmington, DE (US)

( * ) Notice: Subject to any disclaimer, the term of this patent is extended or adjusted under 35 U.S.C. 154(b) by 29 days.

(21) Appl. No.: 15/765,545

(22) PCT Filed: Nov. 7, 2016

(86) PCT No.: PCT/US2016/060832

§ 371 (c)(1),
(2) Date: Apr. 3, 2018

(87) PCT Pub. No.: WO2017/083228

PCT Pub. Date: May 18, 2017

(65) Prior Publication Data

US 2018/0312781 A1 Nov. 1, 2018

Related U.S. Application Data

(60) Provisional application No. 62/255,185, filed on Nov. 13, 2015.

(51) Int. Cl.

| | |
|---|---|
| ***C11D 3/22*** | (2006.01) |
| ***C11D 7/26*** | (2006.01) |
| ***C11D 11/00*** | (2006.01) |
| ***C08L 5/00*** | (2006.01) |
| ***C08B 37/00*** | (2006.01) |

(52) U.S. Cl.
CPC .......... *C11D 3/222* (2013.01); *C08B 37/0009* (2013.01); *C08L 5/00* (2013.01); *C11D 3/225* (2013.01); *C11D 3/226* (2013.01); *C11D 7/268* (2013.01); *C11D 11/0017* (2013.01)

(58) Field of Classification Search
CPC ......... C11D 3/222; C11D 3/225; C11D 3/226; C11D 3/227; C11D 7/268; C11D 11/0017; C08B 37/0009; C08L 5/00
See application file for complete search history.

(56) References Cited

U.S. PATENT DOCUMENTS

| | | | |
|---|---|---|---|
| 2,709,150 | A | 5/1955 | Carlson et al. |
| 2,776,925 | A | 1/1957 | Julian et al. |
| 3,844,890 | A | 10/1974 | Nakao et al. |
| 4,435,307 | A | 3/1984 | Barbesgaard et al. |
| 4,462,917 | A | 7/1984 | Conway |
| 4,464,270 | A | 8/1984 | Hollenbeak et al. |
| 4,477,360 | A | 10/1984 | Almond |
| 4,501,886 | A | 2/1985 | O'Brien |
| 4,580,421 | A | 4/1986 | Babuin et al. |
| 4,649,058 | A | 3/1987 | Schwengers |
| 4,689,297 | A | 8/1987 | Good et al. |
| 4,767,614 | A | 8/1988 | Scarpa et al. |
| 4,794,661 | A | 1/1989 | Durazzani |
| 4,797,361 | A | 1/1989 | Montenecourt |
| 4,799,550 | A | 1/1989 | Harris et al. |
| 4,861,381 | A | 8/1989 | Paul et al. |
| 4,963,298 | A | 10/1990 | Allen et al. |
| 5,141,858 | A | 8/1992 | Paul et al. |
| 5,296,286 | A | 3/1994 | Allen et al. |
| 5,324,649 | A | 6/1994 | Arnold et al. |
| 5,340,735 | A | 8/1994 | Christianson et al. |
| 5,457,046 | A | 10/1995 | Woeldike et al. |
| 5,500,364 | A | 3/1996 | Christianson et al. |
| 5,648,263 | A | 7/1997 | Schuelein et al. |
| 5,686,593 | A | 11/1997 | Woeldike et al. |
| 5,691,178 | A | 11/1997 | Schuelein et al. |
| 5,700,646 | A | 12/1997 | Wood |
| 5,700,676 | A | 12/1997 | Bott et al. |
| 5,702,942 | A | 12/1997 | Leathers et al. |
| 5,712,107 | A | 1/1998 | Nichols |
| 5,763,254 | A | 6/1998 | Woeldike et al. |
| 5,776,757 | A | 7/1998 | Schuelein et al. |
| 5,786,196 | A | 7/1998 | Cote et al. |
| 5,801,039 | A | 9/1998 | Maurer et al. |
| 5,814,501 | A | 9/1998 | Becker et al. |
| 5,855,625 | A | 1/1999 | Maurer et al. |
| 5,942,431 | A | 8/1999 | Yoneda et al. |
| 5,945,394 | A | 8/1999 | Sajic et al. |
| 5,955,340 | A | 9/1999 | Bott et al. |
| 5,985,666 | A | 11/1999 | Loiselle et al. |

(Continued)

FOREIGN PATENT DOCUMENTS

| | | |
|---|---|---|
| EP | 0218272 A1 | 4/1987 |
| EP | 0258068 A2 | 3/1988 |

(Continued)

OTHER PUBLICATIONS

Kralj, et al., "Glucan Synthesis in the Genus *Lactobacillus*: Isolation and Characterization of Glucansucrase Genes, Enzymes and Glucan Products from Six Different Strains", Microbiology (2004), 150, 3681-3690.

(Continued)

*Primary Examiner* — Brian P Mruk

(57) ABSTRACT

An enzymatically produced α-glucan oligomer/polymer compositions is provided. The enzymatically produced α-glucan oligomer/polymers can be derivatized into α-glucan ether compounds. The α-glucan oligomers/polymers and the corresponding α-glucan ethers are cellulose and/or protease resistant, making them suitable for use in fabric care and laundry care applications. Methods for the production and use of the present compositions are also provided.

25 Claims, No Drawings

Specification includes a Sequence Listing.

(56) References Cited

U.S. PATENT DOCUMENTS 6,087,559 A 7/2000 Nichols
6,127,602 A 10/2000 Nichols
6,127,603 A 10/2000 Nichols
6,284,479 B1 9/2001 Nichols
6,312,936 B1 11/2001 Poulose et al.
6,410,025 B1 6/2002 Lander
6,426,410 B1 7/2002 Wang
6,440,991 B1 8/2002 Zhu et al.
6,465,203 B2 10/2002 Nichols
6,482,628 B1 11/2002 Poulose et al.
6,486,314 B1 11/2002 Van et al.
6,562,612 B2 5/2003 Jones et al.
6,566,114 B1 5/2003 Kauppinen et al.
6,579,840 B1 6/2003 Heltovics
6,602,842 B2 8/2003 Cuperus et al.
6,630,586 B1 10/2003 Fouache et al.
6,730,646 B1 5/2004 Waschenbach et al.
6,867,026 B2 3/2005 Van Geel-Schutten et al.
6,933,140 B1 8/2005 Dyson et al.
7,000,000 B1 2/2006 O'Brien
7,001,878 B2 2/2006 De et al.
7,012,053 B1 3/2006 Barnabas et al.
7,056,880 B2 6/2006 Wang et al.
7,138,263 B2 11/2006 Murashima et al.
7,402,420 B2 7/2008 Kossmann et al.
7,439,049 B2 10/2008 Bozonet et al.
7,524,645 B2 4/2009 Monsan et al.
7,534,759 B2 5/2009 Wahl et al.
7,576,048 B2 8/2009 Gray et al.
7,595,182 B2 9/2009 Koga et al.
7,604,974 B2 10/2009 Jones et al.
7,612,198 B2 11/2009 Fuertes et al.
7,897,373 B2 3/2011 Monsan et al.
8,057,840 B2 11/2011 Harrison et al.
8,076,279 B2 12/2011 Brand et al.
8,192,956 B2 6/2012 Kim et al.
8,530,219 B2 9/2013 Estell et al.
8,541,041 B2 9/2013 Pilling
8,569,033 B2 10/2013 Watanabe et al.
8,575,083 B2 11/2013 Bettiol et al.
8,642,757 B2 2/2014 O'Brien et al.
8,828,689 B2 9/2014 Caimi et al.
8,835,374 B2 9/2014 Guida et al.
8,871,474 B2 10/2014 Payne et al.
8,962,282 B2 2/2015 Caimi et al.
9,034,092 B2 5/2015 O'Brien
9,080,195 B2 7/2015 O'Brien et al.
9,096,956 B2 8/2015 Shiflett et al.
9,139,718 B2 9/2015 Paullin et al.
9,175,423 B2 11/2015 O'Brien et al.
9,212,301 B2 12/2015 O'Brien et al.
9,278,988 B2 3/2016 Kasat et al.
9,334,584 B2 5/2016 O'Brien et al.
9,365,955 B2 6/2016 Opper
9,403,917 B2 8/2016 Kasat et al.
9,540,747 B2 1/2017 O'Brien
9,562,112 B2 2/2017 Landschutze et al.
9,644,322 B2 5/2017 Massouda
9,670,290 B2 6/2017 Landschutze et al.
9,695,253 B2 7/2017 Nambiar et al.
9,714,403 B2 7/2017 Nagy et al.
9,719,121 B2 8/2017 Fake et al.
9,771,548 B2 9/2017 Nagy et al.
9,957,334 B2 5/2018 Dennes et al.
9,982,284 B2 5/2018 Nagy et al.
10,005,850 B2 6/2018 Kasat et al.
10,059,779 B2 8/2018 Nambiar et al.
10,072,100 B2 9/2018 Nambiar et al.
10,087,479 B2 10/2018 Fake et al.
10,117,937 B2 11/2018 Yao et al.
10,428,362 B2 10/2019 Nagy et al.
2005/0059633 A1 3/2005 Van Geel-Schuten
2006/0127328 A1 6/2006 Monsan et al.
2007/0112185 A1 5/2007 Myllymaki et al.
2008/0090747 A1 4/2008 Augustinus et al.
2008/0095731 A1 4/2008 Mitra
2008/0248989 A1 10/2008 Holderbaum et al.
2009/0123448 A1 5/2009 Bozonnet et al.
2009/0209445 A1 8/2009 Panandiker et al.
2009/0297663 A1 12/2009 Van et al.
2009/0300798 A1 12/2009 Kok-Jacon et al.
2010/0047432 A1 2/2010 Harrison et al.
2010/0081598 A1 4/2010 Sharma et al.
2010/0122378 A1 5/2010 Frohberg et al.
2010/0284972 A1 11/2010 Naeye et al.
2011/0014345 A1 1/2011 Pilling
2011/0020496 A1 1/2011 Shimada et al.
2011/0039744 A1 2/2011 Heath et al.
2011/0081474 A1 4/2011 Zhou et al.
2011/0178289 A1 7/2011 Monsan et al.
2011/0223117 A1 9/2011 Kim et al.
2012/0034366 A1 2/2012 Hoffman et al.
2012/0165290 A1 6/2012 Dijkhuizen et al.
2013/0087938 A1 4/2013 O'Brien et al.
2013/0157316 A1 6/2013 Caimi et al.
2013/0161562 A1 6/2013 O'Brien et al.
2013/0161861 A1 6/2013 O'Brien et al.
2013/0168895 A1 7/2013 Opper
2013/0196384 A1 8/2013 Caimi et al.
2013/0214443 A1 8/2013 Shiflett et al.
2013/0244287 A1 9/2013 O'Brien et al.
2013/0244288 A1 9/2013 O'Brien et al.
2013/0313737 A1 11/2013 O'Brien
2014/0087431 A1 3/2014 Payne et al.
2014/0179913 A1 6/2014 Paullin et al.
2014/0187766 A1 7/2014 Kasat et al.
2014/0187767 A1 7/2014 Kasat et al.
2014/0323715 A1 10/2014 Kasat et al.
2015/0126730 A1 5/2015 O'Brien
2015/0191550 A1 7/2015 Mishra et al.
2015/0225877 A1 8/2015 O'Brien
2015/0232785 A1* 8/2015 Paullin ................ C09D 105/00 510/299
2015/0240278 A1* 8/2015 Nagy ........................ C12P 7/14 435/97
2015/0353649 A1 12/2015 Paullin et al.
2015/0368594 A1 12/2015 Nagy et al.
2016/0053061 A1 2/2016 Durnberger et al.
2016/0053406 A1 2/2016 Durnberger et al.
2016/0060792 A1 3/2016 Durnberger et al.
2016/0122445 A1 5/2016 Nambiar et al.
2016/0138195 A1 5/2016 Kraft et al.
2016/0138196 A1 5/2016 Roder et al.
2016/0144065 A1 5/2016 Roder et al.
2016/0175811 A1 6/2016 Behabtu et al.
2016/0177471 A1 6/2016 Kraft et al.
2016/0230348 A1 8/2016 Massouda
2016/0251453 A1 9/2016 Kasat et al.
2016/0304629 A1 10/2016 Kasat et al.
2016/0311935 A1 10/2016 Dennes et al.
2016/0326269 A1 11/2016 Dennes et al.
2016/0333117 A1 11/2016 Massouda et al.
2016/0333157 A1 11/2016 Massouda et al.
2017/0167063 A1 6/2017 Behabtu
2017/0196231 A1 7/2017 Massouda et al.
2017/0198108 A1 7/2017 Mishra et al.
2017/0198109 A1 7/2017 Mishra et al.
2017/0198322 A1 7/2017 Cheng et al.
2017/0198323 A1 7/2017 Cheng et al.
2017/0198324 A1 7/2017 Cheng et al.
2017/0204203 A1 7/2017 Massouda et al.
2017/0204232 A1 7/2017 Mishra
2017/0204442 A1 7/2017 DiCosimo et al.
2017/0208823 A1 7/2017 Massouda et al.
2017/0218093 A1 8/2017 Cheng et al.
2017/0267787 A1 9/2017 Nambiar et al.
2017/0298303 A1 10/2017 Nagy et al.
2017/0362345 A1 12/2017 Behabtu et al.
2018/0021238 A1 1/2018 Huh et al.
2018/0049457 A1 2/2018 Cheng et al.
2018/0066214 A1 3/2018 Nagy et al.
2018/0119357 A1 5/2018 Behabtu et al.
2018/0127682 A1 5/2018 Nambiar et al.
2018/0223002 A1 8/2018 Dennes et al.

(56) References Cited

U.S. PATENT DOCUMENTS

| | | | |
|---|---|---|---|
| 2018/0230241 | A1 | 8/2018 | Johnson et al. |
| 2018/0258590 | A1 | 9/2018 | Behabtu et al. |
| 2018/0273731 | A1 | 9/2018 | Opietnik et al. |
| 2018/0282918 | A1 | 10/2018 | Behabtu et al. |
| 2018/0291311 | A1 | 10/2018 | DiCosimo et al. |
| 2018/0312781 | A1 | 11/2018 | DiCosimo et al. |
| 2019/0136153 | A1 | 5/2019 | DiCosimo et al. |
| 2019/0153674 | A1 | 5/2019 | Behabtu |
| 2019/0186049 | A1 | 6/2019 | Durnberger et al. |
| 2019/0218373 | A1 | 7/2019 | Opietnik et al. |

FOREIGN PATENT DOCUMENTS

| | | | |
|---|---|---|---|
| EP | 0260105 | A2 | 3/1988 |
| EP | 0305216 | A1 | 3/1989 |
| EP | 0331376 | A2 | 9/1989 |
| EP | 0407225 | A1 | 1/1991 |
| EP | 0495257 | A1 | 7/1992 |
| EP | 0531315 | | 3/1993 |
| EP | 0531372 | | 3/1993 |
| EP | 1151085 | B1 | 8/2005 |
| EP | 1504994 | B1 | 7/2007 |
| EP | 2100949 | A1 | 9/2009 |
| EP | 2365084 | A2 | 9/2011 |
| EP | 1740690 | B1 | 10/2012 |
| EP | 2644197 | A1 | 10/2013 |
| GB | 1296839 | | 11/1972 |
| GB | 1372034 | A | 10/1974 |
| GB | 2095275 | A | 9/1982 |
| WO | 88/09367 | A1 | 12/1988 |
| WO | 89/06270 | A1 | 7/1989 |
| WO | 90/09446 | A1 | 8/1990 |
| WO | 91/00353 | A2 | 1/1991 |
| WO | 91/16422 | A1 | 10/1991 |
| WO | 91/17243 | A1 | 11/1991 |
| WO | 91/17244 | A1 | 11/1991 |
| WO | 92/05249 | A1 | 4/1992 |
| WO | 92/06154 | A1 | 4/1992 |
| WO | 92/06165 | A1 | 4/1992 |
| WO | 92/06221 | A1 | 4/1992 |
| WO | 92/21760 | A1 | 12/1992 |
| WO | 93/24618 | A1 | 12/1993 |
| WO | 94/01541 | A1 | 1/1994 |
| WO | 94/02597 | A1 | 2/1994 |
| WO | 94/07998 | A1 | 4/1994 |
| WO | 94/12621 | A1 | 6/1994 |
| WO | 94/18314 | | 8/1994 |
| WO | 94/25578 | A1 | 11/1994 |
| WO | 95/01426 | A1 | 1/1995 |
| WO | 95/06720 | A1 | 3/1995 |
| WO | 95/10602 | A1 | 4/1995 |
| WO | 95/10603 | A1 | 4/1995 |
| WO | 95/14783 | A1 | 6/1995 |
| WO | 95/22615 | A1 | 8/1995 |
| WO | 95/23221 | A1 | 8/1995 |
| WO | 95/24471 | A1 | 9/1995 |
| WO | 95/26397 | A1 | 10/1995 |
| WO | 95/30744 | A2 | 11/1995 |
| WO | 95/35381 | A1 | 12/1995 |
| WO | 95/35382 | A2 | 12/1995 |
| WO | 96/00292 | A1 | 1/1996 |
| WO | 96/05295 | A2 | 2/1996 |
| WO | 96/11262 | A1 | 4/1996 |
| WO | 96/12012 | A1 | 4/1996 |
| WO | 96/13580 | A1 | 5/1996 |
| WO | 96/23873 | A1 | 8/1996 |
| WO | 1996/023874 | A1 | 8/1996 |
| WO | 96/27002 | A1 | 9/1996 |
| WO | 96/29397 | A1 | 9/1996 |
| WO | 96/30481 | A1 | 10/1996 |
| WO | 97/03161 | | 1/1997 |
| WO | 97/04079 | A1 | 2/1997 |
| WO | 97/07202 | A1 | 2/1997 |
| WO | 97/10342 | A1 | 3/1997 |
| WO | 97/41213 | A1 | 11/1997 |
| WO | 97/43424 | A1 | 11/1997 |
| WO | 98/08940 | A1 | 3/1998 |
| WO | 98/12307 | A1 | 3/1998 |
| WO | 98/15257 | A1 | 4/1998 |
| WO | 98/26078 | A1 | 6/1998 |
| WO | 99/02702 | A1 | 1/1999 |
| WO | 99/09183 | A1 | 2/1999 |
| WO | 99/14341 | A2 | 3/1999 |
| WO | 99/14342 | A1 | 3/1999 |
| WO | 99/19467 | A1 | 4/1999 |
| WO | 99/23211 | A1 | 5/1999 |
| WO | 99/29876 | A2 | 6/1999 |
| WO | 99/33960 | A2 | 7/1999 |
| WO | 99/34003 | A2 | 7/1999 |
| WO | 99/42567 | A1 | 8/1999 |
| WO | 99/43793 | A1 | 9/1999 |
| WO | 99/43794 | | 9/1999 |
| WO | 99/46399 | A1 | 9/1999 |
| WO | 00/29560 | A1 | 5/2000 |
| WO | 00/60058 | A2 | 10/2000 |
| WO | 00/60059 | A2 | 10/2000 |
| WO | 00/60060 | A2 | 10/2000 |
| WO | 01/14532 | A2 | 3/2001 |
| WO | 01/14629 | A1 | 3/2001 |
| WO | 01/34784 | A1 | 5/2001 |
| WO | 01/34899 | A1 | 5/2001 |
| WO | 01/64852 | A1 | 9/2001 |
| WO | 01/66712 | A2 | 9/2001 |
| WO | 01/85888 | A2 | 11/2001 |
| WO | 01/88107 | A2 | 11/2001 |
| WO | 01/96537 | A2 | 12/2001 |
| WO | 02/10355 | A2 | 2/2002 |
| WO | 02/31124 | A2 | 4/2002 |
| WO | 2002/092797 | | 11/2002 |
| WO | 03/08618 | A2 | 1/2003 |
| WO | 2003/089562 | A1 | 10/2003 |
| WO | 2004/113551 | A1 | 12/2004 |
| WO | 2005/001064 | A2 | 1/2005 |
| WO | 2005/003311 | A2 | 1/2005 |
| WO | 2005/018336 | A1 | 3/2005 |
| WO | 2005/019443 | A2 | 3/2005 |
| WO | 2005/056782 | A2 | 6/2005 |
| WO | 2005/056783 | A1 | 6/2005 |
| WO | 2005/066338 | A1 | 7/2005 |
| WO | 2006/007911 | A1 | 1/2006 |
| WO | 2006/012899 | A1 | 2/2006 |
| WO | 2006/012902 | A2 | 2/2006 |
| WO | 2006/031554 | A2 | 3/2006 |
| WO | 2006/045391 | A1 | 5/2006 |
| WO | 2006/063594 | A1 | 6/2006 |
| WO | 2006/066594 | A2 | 6/2006 |
| WO | 2006/066596 | A2 | 6/2006 |
| WO | 2006/136161 | A2 | 12/2006 |
| WO | 2007/044993 | A2 | 4/2007 |
| WO | 2007/106293 | A1 | 9/2007 |
| WO | 2008/000567 | A1 | 1/2008 |
| WO | 2008/000825 | A1 | 1/2008 |
| WO | 2008/063400 | A1 | 5/2008 |
| WO | 2008/087426 | A1 | 7/2008 |
| WO | 2008/088493 | A2 | 7/2008 |
| WO | 2008/092919 | A1 | 8/2008 |
| WO | 2008/101894 | A1 | 8/2008 |
| WO | 2008/106214 | A1 | 9/2008 |
| WO | 2008/106215 | A1 | 9/2008 |
| WO | 2009/058303 | A2 | 5/2009 |
| WO | 2009/058661 | A1 | 5/2009 |
| WO | 2009/061381 | A2 | 5/2009 |
| WO | 2009/098659 | A1 | 8/2009 |
| WO | 2009/098660 | A1 | 8/2009 |
| WO | 2009/100102 | A2 | 8/2009 |
| WO | 2009/112992 | A1 | 9/2009 |
| WO | 2009/124160 | A1 | 10/2009 |
| WO | 2009/126773 | A1 | 10/2009 |
| WO | 2009/140504 | A1 | 11/2009 |
| WO | 2009/149144 | A2 | 12/2009 |
| WO | 2009/149145 | A2 | 12/2009 |
| WO | 2009/149200 | A2 | 12/2009 |
| WO | 2009/149419 | A2 | 12/2009 |
| WO | 2009/152031 | A1 | 12/2009 |

(56) References Cited

FOREIGN PATENT DOCUMENTS

| | | | |
|---|---|---|---|
| WO | 2010/056640 | A2 | 5/2010 |
| WO | 2010/056653 | A2 | 5/2010 |
| WO | 2010/059413 | A2 | 5/2010 |
| WO | 2010/059483 | A1 | 5/2010 |
| WO | 2010/088112 | A1 | 8/2010 |
| WO | 2010/088447 | A1 | 8/2010 |
| WO | 2010/090915 | A1 | 8/2010 |
| WO | 2010/091221 | A1 | 8/2010 |
| WO | 2010/104675 | A1 | 9/2010 |
| WO | 2010/115021 | A2 | 10/2010 |
| WO | 2010/116139 | A1 | 10/2010 |
| WO | 2010/117511 | A1 | 10/2010 |
| WO | 2010/129839 | A1 | 11/2010 |
| WO | 2010/135238 | A1 | 11/2010 |
| WO | 2011/072099 | A2 | 6/2011 |
| WO | 2011/076123 | A1 | 6/2011 |
| WO | 2011/076897 | A1 | 6/2011 |
| WO | 2011/080352 | A1 | 7/2011 |
| WO | 2011/080353 | A1 | 7/2011 |
| WO | 2011/080354 | A1 | 7/2011 |
| WO | 2011/082425 | A2 | 7/2011 |
| WO | 2011/082429 | A1 | 7/2011 |
| WO | 2011/087836 | A2 | 7/2011 |
| WO | 2011/094687 | A1 | 8/2011 |
| WO | 2011/094690 | A1 | 8/2011 |
| WO | 2011/098531 | A1 | 8/2011 |
| WO | 2011/127102 | A1 | 10/2011 |
| WO | 2011/140364 | A1 | 11/2011 |
| WO | 2011/163428 | A1 | 12/2011 |
| WO | 2012/027404 | A1 | 3/2012 |
| WO | 2012/059336 | A1 | 5/2012 |
| WO | 2012/104613 | A1 | 8/2012 |
| WO | 2012/151534 | A1 | 11/2012 |
| WO | 2013/036918 | A2 | 3/2013 |
| WO | 2013/036968 | A1 | 3/2013 |
| WO | 2013/052730 | A1 | 4/2013 |
| WO | 2013/096502 | A1 | 6/2013 |
| WO | 2013/096511 | A1 | 6/2013 |
| WO | 2013/101854 | A1 | 7/2013 |
| WO | 2013/177348 | A1 | 11/2013 |
| WO | 2014/052386 | A2 | 4/2014 |
| WO | 2014/077340 | A1 | 5/2014 |
| WO | 2014/099724 | A1 | 6/2014 |
| WO | 2014/105696 | A1 | 7/2014 |
| WO | 2014/105698 | A1 | 7/2014 |
| WO | 2014/161018 | A1 | 10/2014 |
| WO | 2014/161019 | A1 | 10/2014 |
| WO | 2014/165881 | A1 | 10/2014 |
| WO | 2014/201479 | A1 | 12/2014 |
| WO | 2014/201480 | A1 | 12/2014 |
| WO | 2014/201481 | A1 | 12/2014 |
| WO | 2014/201482 | A1 | 12/2014 |
| WO | 2014/201483 | A1 | 12/2014 |
| WO | 2014/201484 | A1 | 12/2014 |
| WO | 2015130883 | | 3/2015 |
| WO | 2015/069828 | A1 | 5/2015 |
| WO | 2015/094402 | A1 | 6/2015 |
| WO | 2015/095046 | A1 | 6/2015 |
| WO | 2015/095358 | A1 | 6/2015 |
| WO | 2015/103531 | A1 | 7/2015 |
| WO | 2015/109064 | A1 | 7/2015 |
| WO | 2015/109066 | A1 | 7/2015 |
| WO | 2015/109164 | A1 | 7/2015 |
| WO | 2015/123323 | A1 | 8/2015 |
| WO | 2015/123327 | A1 | 8/2015 |
| WO | 2015/130881 | A1 | 9/2015 |
| WO | 2015/138283 | A1 | 9/2015 |
| WO | 2015/183714 | A1 | 12/2015 |
| WO | 2015/183721 | A1 | 12/2015 |
| WO | 2015/183722 | A1 | 12/2015 |
| WO | 2015/183724 | A1 | 12/2015 |
| WO | 2015/183726 | A1 | 12/2015 |
| WO | 2015/183729 | A1 | 12/2015 |
| WO | 2015/195777 | A1 | 12/2015 |
| WO | 2015/195960 | A1 | 12/2015 |
| WO | 2015/200589 | A1 | 12/2015 |
| WO | 2015/200590 | A1 | 12/2015 |
| WO | 2015/200593 | A1 | 12/2015 |
| WO | 2015/200596 | A1 | 12/2015 |
| WO | 2015/200605 | A1 | 12/2015 |
| WO | 2015/200612 | A1 | 12/2015 |
| WO | 2016/073732 | A1 | 5/2016 |
| WO | 2016/105971 | A1 | 6/2016 |
| WO | 2016/106011 | A1 | 6/2016 |
| WO | 2016/106068 | A1 | 6/2016 |
| WO | 2016/126685 | A1 | 8/2016 |
| WO | 2016/133734 | A1 | 8/2016 |
| WO | 2016/160737 | A1 | 10/2016 |
| WO | 2016/160738 | A2 | 10/2016 |
| WO | 2016/160740 | A1 | 10/2016 |
| WO | 2016/196021 | A1 | 12/2016 |
| WO | 2016/196022 | A1 | 12/2016 |
| WO | 2017/040369 | A1 | 3/2017 |
| WO | 2017/074859 | A1 | 5/2017 |
| WO | 2017/074862 | A1 | 5/2017 |
| WO | 2017/083226 | A1 | 5/2017 |
| WO | 2017/083228 | A1 | 5/2017 |
| WO | 2017/083229 | A1 | 5/2017 |

OTHER PUBLICATIONS

"Applied Fibre Science", F. Happey, Ed, Chapter 8, Academic Press, New York, 1979 (Book not included).

Altschul, "Basic local alignment search tool", Journal of Mol. Biol, vol. 215, pp. 403-410, 1990.

Bao et al., Chemical Modification of the (1→3)-a-D-Glucan From Spores of Ganoderma Lucidum and Investigation of Their Physicochemical Properties and Immunological Activity, Carbohydrate Research, vol. 336 (2001), pp. 127-140.

Cantarel et al., The Carbohydrate-Active Enzymes Database (CAZY): An Expert Resource for Glycogenomics, Nlucleic Acids Research (2009), vol. 37, Database Issue, pp. D233-D238.

Chenna et al., "Multiple Sequence Alignment with the Clustal Series of Programs", Nucleic Acids Res., vol. 31, 13, pp. 3497-3500, Jul. 2003.

Cumpstey, "Chemical Modification of Polysaccharides", Organic Chemistry, Jan. 1, 2013, vol. 2013, pp. 1-27.

Dartois et al., "Cloning, nucleotide sequence and expression in *Escherichia coli* of a lipase gene from Bacillus subtilis 168," Biochemica et Biophysica Acta, 1992, vol. 1131, pp. 253-3600.

Dubois, et al., "Colorimetric Method for Determination of Sugars and Related Substances", Analytical Chemistry, vol. 28, No. 3, pp. 350-356, Mar. 1956.

Hage, et al., "Efficient Manganese Catalysts for Low-Temperature Bleaching", Letters to Nature, vol. 369, pp. 637-639, Jun. 1994.

Hakamada et al., "Nucleotide Deduced Amino Acid Sequences of Mutanase-like Genes from Paenibacillus Isolates: Proposal of a New Family of Glycoside Hydrolases", Science Direct, vol. 90, pp. 525-533, 2008.

Higgins and Sharp, "Fast and sensitive multiple sequence alignments on a microcomputer", CABIOS. 5:151-153 (1989).

Kiho et al, "(1-3) Alpha D Glucan From an Alkaline Extract of Agrocybe Cylindracea and Antitumor Activity of Its O carboxymethylated Derivatives", Carbohydrate Research, 1989, vol. 189, pp. 273-279.

Leemhuis et al. Glucansucrases: Three-dimensional structures, reactions, mechanisms, alpha-glucan analysis and their implications in biotechnology and food applications,1 Journal of Biotechnology, vol. 163, No. 2, Jan. 1, 2013, pp. 250-272.

Lever, "A New Reaction for Colorimetric Determination of Carbohydrates", Analytical Biochemistry 47, pp. 273-279, 1972.

Monchois et al., 'Glucansucrases: mechanism of action and structure-function relationships,' FEMS Microbiol Rev., vol. 23, 1999 pp. 131-151.

Ogawa et al., 'Conformation of (1-3)-to-glucan tribenzoate,' Biosci Biotech Biochem, 1993, vol. 57 (10), pp. 1663-1665.

Ogawa et al., 'Crystal structure of (1→3)-alpha-d-glucan,' Water-soluble polymers: synthesis, solution properties and applications, American Chemical Society, Jan. 1, 1980, vol. 141, pp. 353-362.

(56) References Cited

OTHER PUBLICATIONS

Ogawa et al., 'X-ray diffraction data for (I>3)-alpha-d-glucan,' Carbohydrate Research, Oct. 1, 1979, vol. 75, pp. CI3-CI6.
Ogawa et al., "Molecular and Crystal Structure of the Regenerated form of (1→3)-a-D-Glucan," International Journal of Biological Macromolecule s, 1981, vol. 3. No. 1, pp. 31-36.
Ogawa et al., "X-Ray Diffraction Data for (1?3)-a-D-Glucan Triacetate," Carbohydrate Polymers, 1983, vol. 3, No. 4, pp. 287-297.
PCT International Search Report and Written Opinion issued for PCT/US2016/049194, dated Dec. 2, 2016.
PCT International Search Report and Written Opinion issued for PCT/US2013/076905, dated Feb. 25, 2014.
PCT International Search Report and Written Opinion issued for PCT/US2013/076919, dated Feb. 25, 2014.
PCT International Search Report and Written Opinion issued for PCT/US2014/044281, dated Sep. 3, 2014.
PCT International Search Report and Written Opinion issued for PCT/US2015/010139, dated Apr. 29, 2015.
PCT International Search Report and Written Opinion issued for PCT/US2015/011546, dated Apr. 13, 2015.
PCT International Search Report and Written Opinion issued for PCT/US2015/011551, dated Jul. 9, 2015.
PCT International Search Report and Written Opinion issued for PCT/US2015/011724, dated May 15, 2015.
PCT International Search Report and Written Opinion issued for PCT/US2015/037622, dated Sep. 22, 2015.
PCT International Search Report and Written Opinion issued for PCT/US2015/037624, dated Oct. 12, 2015.
PCT International Search Report and Written Opinion issued for PCT/US2015/037628, dated Sep. 22, 2015.
PCT International Search Report and Written Opinion issued for PCT/US2015/037634, dated Sep. 22, 2015.
PCT International Search Report and Written Opinion issued for PCT/US2015/037646, dated Oct. 7, 2015.
PCT International Search Report and Written Opinion issued for PCT/US2015/037656, dated Oct. 7, 2015.
PCT International Search Report and Written Opinion issued for PCT/US2015/066317, dated Mar. 30, 2016.
PCT International Search Report and Written Opinion issued for PCT/US2016/016136, dated Apr. 4, 2016.
PCT International Search Report and Written Opinion issued for PCT/US2016/033245, dated Aug. 22, 2016.
PCT International Search Report and Written Opinion issued for PCT/US2016/033249, dated Jul. 26, 2016.
PCT International Search Report and Written Opinion issued for PCT/US2016/058436, dated Feb. 8, 2017.
PCT International Search Report and Written Opinion issued for PCT/US2016/058453, dated Jan. 5, 2017.
PCT International Search Report and Written Opinion issued for PCT/US2016/060820, dated Feb. 17, 2017.
PCT International Search Report and Written Opinion issued for PCT/US2016/060832, dated Apr. 3, 2017.
PCT International Search Report and Written Opinion issued for PCT/US2016/060839, dated Apr. 3, 2017.
PCT International Search Report and Written Opinion issued for PCT/US2016/060892, dated Feb. 3, 2017.
PCT International Search Report and Written Opinion issued for PCT/US2017/036973, dated Sep. 15, 2017.
Pettolino et al., "Determining the Polysaccharide Composition of Plant Cell Walls", Nature Protocols, vol. 7, pp. 1590-1607, 2012.
Rice et al., "EMBOSS: The European Molecular Biology Open Software Suite", TIG, vol. 16, No. 6, pp. 276-277, Jun. 2000.
Sciiimada, et al., "cDNA Molecular Cloning of Geotrichum candidum Lipase." Journal of Biochem., vol. 106, pp. 383-388, 1989.
Shida et al., A (1/AR3)-Alpha-D-Glucan Isolated From the Fruit Bodies of Lentinus Edodes, Carbohydrate Research (1978), vol. 60, No. 1, pp. 117-127.
Shimamura, et al., "Identification of Amino Acid Residues in *Streptococcus* mutans Glucosyltransferases Influencing the Structure of the Glucan Product", Journ. Bacteriology, vol. 176, No. 16, pp. 4845-4850, 1994.
Simpson et al., 'Four glucosyltransferases, GtfJ, GffK, GtfL and GtfM from *Streptococcus salivarius* ATCC 25975,' Microbiology, 1995, vol. 141, pp. 1451-1460.
Striegel et al., "An SEC/MALS study of alteman degradation during size-exclusion chromatographic analysis", Anal. Bioanal. Chem. (2009), 394:1887-1893.
Synytsya et al., "Structural Analysis of Glucans", Annals of Translational Medicine, Feb. 2014, vol. 2, No. 2, 14 pages.
Thompson et al, "Clustal W improving the sensitivity of progressive multiple sequence alignment through sequence weighting, position-specific gap penalties and weight matrix choice", Nucleic Acids Res., vol. 22(22), pp. 4673-4680, "Clustal W improving the sensitivity of progressive multiple sequence alignment through sequence weighting, position-specific gap penalties and weight matrix choice", Nucleic Acids Res, vol. 22 (22), pp. 4673-4680, 1994.
Thompson, et al., "CLUSTAL W: Improving the Sensitivity of Progressive Multiple Sequence Alignment Through Sequence Weighting Position-Specific Gap Penalties and Weight Matrix Choice", Nuc. Acids Research, vol. 22, No. 22, pp. 4673-4680, 1994.
Villares et al., "Structural Features and Healthy Properties of Polysaccharides Occuring in Mushrooms", Agriculture, vol. 2, No. 4, 2012, pp. 452-471.
Yamaguchi et al,"Cloning and structure of the mono- and diacylglycerol lipase-encoding gene from Penicillium camembertii U-150", Gene, 1991, vol. 103, pp. 61-67.
Yui et al., "Molecular and crystal structure of (1→ 3)-alpha-d-glucan Triacetate," International Journal of Biological Macromolecules, 1992, vol. 14, No. 2, pp. 87-96.
Zhang et al., 'Dissolution and regeneration of cellulose in NaOH/Thiourea Aqueous Solution,' J Polym Sci Part B: Polym Phys, 2002, vol. 40, pp. 1521-1529.
Zhang et al., 'Effects of urea and sodium hydroxide on the molecular weight and conformation of alpha-(1→3)-d-glucan from Lentinus edodes in aqueous solution,' Carbohydrate Research, Aug. 7, 2000, vol. 327, No. 4, pp. 431-438.

* cited by examiner

GLUCAN FIBER COMPOSITIONS FOR USE IN LAUNDRY CARE AND FABRIC CARE

CROSS-REFERENCE TO RELATED APPLICATION

This application is the National Stage application of International Application No. PCT/US2016/60832 (filed Nov. 7, 2016), which claims the benefit of priority of U.S. Provisional Application No. 62/255,185 (filed Nov. 13, 2015), the entire disclosures of which prior applications are incorporated herein by reference in their entirety.

INCORPORATION BY REFERENCE OF THE SEQUENCE LISTING

The Official copy of the sequence listing is submitted electronically via EFS-Web as an ASCII formatted sequence listing with a file named 20161104_CL6277WOPCT_SequenceListing_ST25.txt created on Nov. 2, 2016, and having a size of 422,148 bytes and is filed concurrently with the specification. The sequence listing contained in this ASCII-formatted document is part of the specification and is herein is incorporated by reference herein in its entirety.

FIELD OF THE DISCLOSURE

This disclosure relates to oligosaccharides, polysaccharides, and derivatives thereof. Specially, the disclosure pertains to certain α-glucan polymers, derivatives of these α-glucans such as α-glucan ethers, and their use in fabric care and laundry care applications.

BACKGROUND

Driven by a desire to find new structural polysaccharides using enzymatic syntheses or genetic engineering of microorganisms, researchers have discovered oligosaccharides and polysaccharides that are biodegradable and can be made economically from renewably sourced feedstocks.

Various saccharide oligomer compositions have been reported in the art. For example, U.S. Pat. No. 6,486,314 discloses an α-glucan comprising at least 20, up to about 100,000 α-anhydroglucose units, 38-48% of which are 4-linked anhydroglucose units, 17-28% are 6-linked anhydroglucose units, and 7-20% are 4,6-linked anhydroglucose units and/or gluco-oligosaccharides containing at least two 4-linked anhydroglucose units, at least one 6-linked anhydroglucose unit and at least one 4,6-linked anhydroglucose unit. U.S. Patent Appl. Pub. No. 2010-0284972A1 discloses a composition for improving the health of a subject comprising an α-(1,2)-branched α-(1,6) oligodextran. U.S. Patent Appl. Pub. No. 2011-0020496A1 discloses a branched dextrin having a structure wherein glucose or isomaltooligosaccharide is linked to a non-reducing terminus of a dextrin through an α-(1,6) glycosidic bond and having a DE of 10 to 52. U.S. Pat. No. 6,630,586 discloses a branched maltodextrin composition comprising 22-35% (1,6) glycosidic linkages; a reducing sugars content of <20%; a polymolecularity index (Mp/Mn) of <5; and number average molecular weight (Mn) of 4500 g/mol or less. U.S. Pat. No. 7,612,198 discloses soluble, highly branched glucose polymers, having a reducing sugar content of less than 1%, a level of α-(1,6) glycosidic bonds of between 13 and 17% and a molecular weight having a value of between $0.9\times10^5$ and $1.5\times10^5$ daltons, wherein the soluble highly branched glucose polymers have a branched chain length distribution profile of 70 to 85% of a degree of polymerization (DP) of less than 15, of 10 to 14% of DP of between 15 and 25 and of 8 to 13% of DP greater than 25.

Poly α-1,3-glucan has been isolated by contacting an aqueous solution of sucrose with a glucosyltransferase (gtf) enzyme isolated from *Streptococcus salivarius* (Simpson et al., *Microbiology* 141:1451-1460, 1995). U.S. Pat. No. 7,000,000 disclosed the preparation of a polysaccharide fiber using an *S. salivarius* gtfJ enzyme. At least 50% of the hexose units within the polymer of this fiber were linked via α-1,3-glycosidic linkages. The disclosed polymer formed a liquid crystalline solution when it was dissolved above a critical concentration in a solvent or in a mixture comprising a solvent. From this solution continuous, strong, cotton-like fibers, highly suitable for use in textiles, were spun and used.

Development of new glucan polysaccharides and derivatives thereof is desirable given their potential utility in various applications. It is also desirable to identify glucosyltransferase enzymes that can synthesize new glucan polysaccharides, especially those with mixed glycosidic linkages, and derivatives thereof. The materials would be attractive for use in fabric care and laundry care applications to alter rheology, act as a structuring agent, provide a benefit (preferably a surface substantive effect) to a treated fabric, textile and/or article of clothing (such as improved fabric hand, improved resistance to soil deposition, etc.). Many applications, such as laundry care, often include enzymes such as cellulases, proteases, amylases, and the like. As such, the glucan polysaccharides are preferably resistant to cellulase, amylase, and/or protease activity.

SUMMARY

In one embodiment, a fabric care composition is provided comprising:

a. an α-glucan oligomer/polymer composition comprising:
    i. 10% to 30% α-(1,3) glycosidic linkages;
    ii. 65% to 87% α-(1,6) glycosidic linkages;
    iii. less than 5% α-(1,3,6) glycosidic linkages;
    iv. a weight average molecular weight (Mw) of less than 5000 Daltons;
    v. a viscosity of less than 0.25 Pascal second (Pa·s) at 12 wt % in water 20° C.;
    vi. a solubility of at least 20% (w/w) in pH 7 water at 25° C.; and
    vii. a polydispersity index (PDI) of less than 5; and
b. at least one additional fabric care ingredient.

In another embodiment, a laundry care composition is provided comprising:

a. an α-glucan oligomer/polymer composition comprising:
    i. 10% to 30% α-(1,3) glycosidic linkages;
    ii. 65% to 87% α-(1,6) glycosidic linkages;
    iii. less than 5% α-(1,3,6) glycosidic linkages;
    iv. a weight average molecular weight (Mw) of less than 5000 Daltons;
    v. a viscosity of less than 0.25 Pascal second (Pa·s) at 12 wt % in water 20° C.;
    vi. a solubility of at least 20% (w/w) in pH 7 water at 25° C.; and
    vii. a polydispersity index (PDI) of less than 5; and
b. at least one additional laundry care ingredient.

In another embodiment, the additional ingredient in the above fabric care composition or the above laundry care composition is at least one cellulase, at least one protease, at least one amylase or any combination thereof.

In another embodiment, the fabric care composition or the laundry care composition comprises 0.01 to 90% wt % of the soluble α-glucan oligomer/polymer composition.

In another embodiment, the fabric care composition or the laundry care composition comprises at least one additional ingredient comprising at least one of surfactants (anionic, nonionic, cationic, or zwitterionic), enzymes (proteases, cellulases, polyesterases, amylases, cutinases, lipases, pectate lyases, perhydrolases, xylanases, peroxidases, and/or laccases in any combination), detergent builders, complexing agents, polymers (in addition to the present α-glucan oligomers/polymers and/or α-glucan ethers), soil release polymers, surfactancy-boosting polymers, bleaching systems, bleach activators, bleaching catalysts, fabric conditioners, clays, foam boosters, suds suppressors (silicone or fatty-acid based), anti-corrosion agents, soil-suspending agents, anti-soil redeposition agents, dyes, bactericides, tarnish inhibitors, optical brighteners, perfumes, saturated or unsaturated fatty acids, dye transfer inhibiting agents, chelating agents, hueing dyes, calcium and magnesium cations, visual signaling ingredients, anti-foam, structurants, thickeners, anti-caking agents, starch, sand, gelling agents, and any combination thereof.

In another embodiment, a fabric care and/or laundry care composition is provided wherein the composition is in the form of a liquid, a gel, a powder, a hydrocolloid, an aqueous solution, granules, tablets, capsules, single compartment sachets, multi-compartment sachets or any combination thereof.

In another embodiment, the fabric care composition or the laundry care composition is packaged in a unit dose format.

Various glucan ethers may be produced from the present α-glucan oligomers/polymers. In another embodiment, an α-glucan ether composition is provided comprising:

- i. 10% to 30% α-(1,3) glycosidic linkages;
- ii. 65% to 87% α-(1,6) glycosidic linkages;
- iii. less than 5% α-(1,3,6) glycosidic linkages;
- iv. a weight average molecular weight (Mw) of less than 5000 Daltons;
- v. a viscosity of less than 0.25 Pascal second (Pa·s) at 12 wt % in water 20° C.;
- vi. a solubility of at least 20% (w/w) in pH 7 water at 25° C.; and
- i. a polydispersity index (PDI) of less than 5; wherein the glucan ether composition has a degree of substitution (DoS) with at least one organic group of about 0.05 to about 3.0.

The α-glucan ether compositions may be used in a fabric care and/or laundry care formulation comprising enzymes such as a cellulases, amylases, and proteases. In another embodiment, glucan ether composition is cellulase resistant, protease resistant, amylase resistant or any combination thereof.

The α-glucan ether compositions may be used in a fabric care and/or laundry care and/or personal care compositions. In another embodiment, a personal care composition, fabric care composition or laundry care composition is provided comprising the above α-glucan ether compositions.

In another embodiment, a method for preparing an aqueous composition is provided, the method comprising: contacting an aqueous composition with the above glucan ether composition wherein the aqueous composition comprises at least one cellulase, at least one protease, at least one cellulase or any combination thereof.

In another embodiment, a method of treating an article of clothing, textile or fabric is provided comprising:

- a. providing a composition selected from
  - i. the above fabric care composition;
  - ii. the above laundry care composition;
  - iii. the above glucan ether composition;
  - iv. the α-glucan oligomer/polymer composition comprising:
    - a. 10% to 30% α-(1,3) glycosidic linkages;
    - b. 65% to 87% α-(1,6) glycosidic linkages;
    - c. less than 5% α-(1,3,6) glycosidic linkages;
    - d. a weight average molecular weight (Mw) of less than 5000 Daltons;
    - e. a viscosity of less than 0.25 Pascal second (Pa·s) at 12 wt % in water 20° C.;
    - f. a solubility of at least 20% (w/w) in pH 7 water at 25° C.; and
    - g. a polydispersity index (PDI) of less than 5; and
  - v. any combination of (i) through (iv);
- b. contacting under suitable conditions the composition of (a) with a fabric, textile or article of clothing whereby the fabric, textile or article of clothing is treated and receives a benefit; and
- c. optionally rinsing the treated fabric, textile or article of clothing of (b).

In another embodiment of the above method, the α-glucan oligomer/polymer composition or the α-glucan ether composition is a surface substantive.

In a further embodiment of the above method, the benefit is selected from the group consisting of improved fabric hand, improved resistance to soil deposition, improved colorfastness, improved wear resistance, improved wrinkle resistance, improved antifungal activity, improved stain resistance, improved cleaning performance when laundered, improved drying rates, improved dye, pigment or lake update, and any combination thereof.

In another embodiment, a method to produce a glucan ether composition is provided comprising:

- a. providing an α-glucan oligomer/polymer composition comprising:
  - i. 10% to 30% α-(1,3) glycosidic linkages;
  - ii. 65% to 87% α-(1,6) glycosidic linkages;
  - iii. less than 5% α-(1,3,6) glycosidic linkages;
  - iv. a weight average molecular weight (Mw) of less than 5000 Daltons;
  - v. a viscosity of less than 0.25 Pascal second (Pa·s) at 12 wt % in water 20° C.;
  - vi. a solubility of at least 20% (w/w) in pH 7 water at 25° C.; and
  - vii. a polydispersity index (PDI) of less than 5;
- b. contacting the α-glucan oligomer/polymer composition of (a) in a reaction under alkaline conditions with at least one etherification agent comprising an organic group; whereby an α-glucan ether is produced has a degree of substitution (DoS) with at least one organic group of about 0.05 to about 3.0; and
- c. optionally isolating the α-glucan ether produced in step (b).

A textile, yarn, fabric or fiber may be modified to comprise (e.g., blended or coated with) the above α-glucan oligomer/polymer composition or the corresponding α-glucan ether composition. In another embodiment, a textile, yarn, fabric or fiber is provided comprising:

- a. an α-glucan oligomer/polymer composition comprising:
  - i. 10% to 30% α-(1,3) glycosidic linkages;
  - ii. 65% to 87% α-(1,6) glycosidic linkages;
  - iii. less than 5% α-(1,3,6) glycosidic linkages;
  - iv. a weight average molecular weight (Mw) of less than 5000 Daltons;
  - v. a viscosity of less than 0.25 Pascal second (Pa·s) at 12 wt % in water 20° C.;

vi. a solubility of at least 20% (w/w) in pH 7 water at 25° C.; and
vii. a polydispersity index (PDI) of less than 5;
b. a glucan ether composition comprising
i. 10% to 30% α-(1,3) glycosidic linkages;
ii. 65% to 87% α-(1,6) glycosidic linkages;
iii. less than 5% α-(1,3,6) glycosidic linkages;
iv. a weight average molecular weight (Mw) of less than 5000 Daltons;
v. a viscosity of less than 0.25 Pascal second (Pa·s) at 12 wt % in water 20° C.;
vi. a solubility of at least 20% (w/w) in pH 7 water at 25° C.; and
vii. a polydispersity index (PDI) of less than 5; wherein the glucan ether composition has a degree of substitution (DoS) with at least one organic group of about 0.05 to about 3.0; or
c. any combination thereof.

BRIEF DESCRIPTION OF THE BIOLOGICAL SEQUENCES

The following sequences comply with 37 C.F.R. §§ 1.821-1.825 ("Requirements for Patent Applications Containing Nucleotide Sequences and/or Amino Acid Sequence Disclosures—the Sequence Rules") and are consistent with World Intellectual Property Organization (WIPO) Standard ST.25 (2009) and the sequence listing requirements of the European Patent Convention (EPC) and the Patent Cooperation Treaty (PCT) Rules 5.2 and 49.5(a-bis), and Section 208 and Annex C of the Administrative Instructions. The symbols and format used for nucleotide and amino acid sequence data comply with the rules set forth in 37 C.F.R. § 1.822.

SEQ ID NO: 1 is the amino acid sequence of the *Streptococcus mutans* NN2025 Gtf-B glucosyltransferase as found in GENBANK® gi: 290580544.

SEQ ID NO: 2 is the nucleic acid sequence encoding a truncated *Streptococcus mutans* NN2025 Gtf-B (GENBANK® gi: 290580544) glucosyltransferase.

SEQ ID NO: 3 is the amino acid sequence of the truncated *Streptococcus mutans* NN2025 Gtf-B glucosyltransferase (also referred to herein as the "0544 glucosyltransferase" or "GTF0544").

SEQ ID NO: 4 is the amino acid sequence of the *Paenibacillus humicus* mutanase as found in GENBANK® gi: 257153264).

SEQ ID NO: 5 is the nucleic acid sequence encoding the *Paenibacillus humicus* mutanase (GENBANK® gi: 257153265 where GENBANK® gi: 257153264 is the corresponding polynucleotide sequence) used in for expression in *E. coli* BL21(DE3).

SEQ ID NO: 6 is the amino acid sequence of the mature *Paenibacillus humicus* mutanase (GENBANK® gi: 257153264; referred to herein as the "3264 mutanase" or "MUT3264") used for expression in *E. coli* BL21(DE3).

SEQ ID NO: 7 is the amino acid sequence of the *B. subtilis* AprE signal peptide used in the expression vector that was coupled to various enzymes for expression in *B. subtilis.*

SEQ ID NO: 8 is the nucleic acid sequence encoding the *Paenibacillus humicus* mutanase used for expression in *B. subtilis* host BG6006.

SEQ ID NO: 9 is the amino acid sequence of the mature *Paenibacillus humicus* mutanase used for expression in *B. subtilis* host BG6006. As used herein, this mutanase may also be referred to herein as "MUT3264".

SEQ ID NO: 10 is the nucleic acid sequence encoding the *Penicillium marneffei* ATCC® 18224™ mutanase.

SEQ ID NO: 11 is the amino acid sequence of the *Penicillium marneffei* ATCC® 18224™ mutanase (GENBANK® gi: 212533325; also referred to herein as the "3325 mutanase" or "MUT3325").

SEQ ID NO: 12 is the polynucleotide sequence of plasmid pTrex3.

SEQ ID NO: 13 is the amino acid sequence of the *Streptococcus mutans* glucosyltransferase as provided in GENBANK® gi:3130088.

SEQ ID NO: 14 is the nucleic acid sequence encoding a truncated version of the *Streptococcus mutans* glucosyltransferase.

SEQ ID NO: 15 is the nucleic acid sequence of plasmid pMP69.

SEQ ID NO: 16 is the amino acid sequence of a truncated *Streptococcus mutans* glucosyltransferase referred to herein as "GTF0088".

SEQ ID NO: 17 is the amino acid sequence of the *Streptococcus mutans* LJ23 glucosyltransferase as provided in GENBANK® gi:387786207 (also referred to as the "6207" glucosyltransferase or the "GTF6207".

SEQ ID NO: 18 is the nucleic acid sequence encoding a truncated *Streptococcus mutans* LJ23 glucosyltransferase.

SEQ ID NO: 19 is the amino acid sequence of a truncated version of the *Streptococcus mutans* LJ23 glucosyltransferase, also referred to herein as "GTF6207".

SEQ ID NO: 20 is a 1630 bp nucleic acid sequence used in Example 8.

SEQ ID NOs: 21-22 are primers.

SEQ ID NO: 23 is the nucleic acid sequence of plasmid p6207-1.

SEQ ID NO: 24 is a polynucleotide sequence of a terminator sequence.

SEQ ID NO: 25 is a polynucleotide sequence of a linker sequence.

SEQ ID NO: 26 is the native nucleotide sequence of GTF0088.

SEQ ID NO: 27 is the native nucleotide sequence of GTF5330.

SEQ ID NO: 28 is the amino acid sequence encoded by SEQ ID NO: 27.

SEQ ID NO: 29 is the native nucleotide sequence of GTF5318.

SEQ ID NO: 30 is the amino acid sequence encoded by SEQ ID NO: 29.

SEQ ID NO: 31 is the native nucleotide sequence of GTF5326.

SEQ ID NO: 32 is the amino acid sequence encoded by SEQ ID NO: 31.

SEQ ID NO: 33 is the native nucleotide sequence of GTF5312.

SEQ ID NO: 34 is the amino acid sequence encoded by SEQ ID NO: 33.

SEQ ID NO: 35 is the native nucleotide sequence of GTF5334.

SEQ ID NO: 36 is the amino acid sequence encoded by SEQ ID NO: 35.

SEQ ID NO: 37 is the native nucleotide sequence of GTF0095.

SEQ ID NO: 38 is the amino acid sequence encoded by SEQ ID NO: 37.

SEQ ID NO: 39 is the native nucleotide sequence of GTF0074.

SEQ ID NO: 40 is the amino acid sequence encoded by SEQ ID NO: 39.

SEQ ID NO: 41 is the native nucleotide sequence of GTF5320.

SEQ ID NO: 42 is the amino acid sequence encode by SEQ ID NO: 41.

SEQ ID NO: 43 is the native nucleotide sequence of GTF0081.

SEQ ID NO: 44 is the amino acid sequence encoded by SEQ ID NO: 43.

SEQ ID NO: 45 is the native nucleotide sequence of GTF5328.

SEQ ID NO: 46 is the amino acid sequence encoded by SEQ ID NO: 45.

SEQ ID NO: 47 is the nucleotide sequence of a T1 C-terminal truncation of GTF0088.

SEQ ID NO: 48 is the amino acid sequence encoded by SEQ ID NO: 47.

SEQ ID NO: 49 is the nucleotide sequence of a T1 C-terminal truncation of GTF5318.

SEQ ID NO: 50 is the amino acid sequence encoded by SEQ ID NO: 49.

SEQ ID NO: 51 is the nucleotide sequence of a T1 C-terminal truncation of GTF5328.

SEQ ID NO: 52 is the amino acid sequence encoded by SEQ ID NO: 51.

SEQ ID NO: 53 is the nucleotide sequence of a T1 C-terminal truncation of GTF5330.

SEQ ID NO: 54 is the amino acid sequence encoded by SEQ ID NO: 53.

SEQ ID NO: 55 is the nucleotide sequence of a T3 C-terminal truncation of GTF0088.

SEQ ID NO: 56 is the amino acid sequence encoded by SEQ ID NO: 55.

SEQ ID NO: 57 is the nucleotide sequence of a T3 C-terminal truncation of GTF5318.

SEQ ID NO: 58 is the amino acid sequence encoded by SEQ ID NO: 57.

SEQ ID NO: 59 is the nucleotide sequence of a T3 C-terminal truncation of GTF5328.

SEQ ID NO: 60 is the amino acid sequence encoded by SEQ ID NO: 59.

SEQ ID NO: 61 is the nucleotide sequence of a T3 C-terminal truncation of GTF5330.

SEQ ID NO: 62 is the amino acid sequence encoded by SEQ ID NO: 61.

DETAILED DESCRIPTION

In this disclosure, a number of terms and abbreviations are used. The following definitions apply unless specifically stated otherwise.

As used herein, the articles “a”, “an”, and “the” preceding an element or component are intended to be nonrestrictive regarding the number of instances (i.e., occurrences) of the element or component. Therefore “a”, “an”, and “the” should be read to include one or at least one, and the singular word form of the element or component also includes the plural unless the number is obviously meant to be singular.

As used herein, the term “comprising” means the presence of the stated features, integers, steps, or components as referred to in the claims, but that it does not preclude the presence or addition of one or more other features, integers, steps, components or groups thereof. The term “comprising” is intended to include embodiments encompassed by the terms “consisting essentially of” and “consisting of”. Similarly, the term “consisting essentially of” is intended to include embodiments encompassed by the term “consisting of”.

As used herein, the term “about” modifying the quantity of an ingredient or reactant employed refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term “about” also encompasses amounts that differ due to different equilibrium conditions for a composition resulting from a particular initial mixture. Whether or not modified by the term “about”, the claims include equivalents to the quantities.

Where present, all ranges are inclusive and combinable. For example, when a range of “1 to 5” is recited, the recited range should be construed as including ranges “1 to 4”, “1 to 3”, “1-2”, “1-2 & 4-5”, “1-3 & 5”, and the like.

As used herein, the term “obtainable from” shall mean that the source material (for example, sucrose) is capable of being obtained from a specified source, but is not necessarily limited to that specified source.

As used herein, the term “effective amount” will refer to the amount of the substance used or administered that is suitable to achieve the desired effect. The effective amount of material may vary depending upon the application. One of skill in the art will typically be able to determine an effective amount for a particular application or subject without undo experimentation.

The terms “percent by volume”, “volume percent”, “vol %” and “v/v %” are used interchangeably herein. The percent by volume of a solute in a solution can be determined using the formula: [(volume of solute)/(volume of solution)]×100%.

The terms “percent by weight”, “weight percentage (wt %)” and “weight-weight percentage (% w/w)” are used interchangeably herein. Percent by weight refers to the percentage of a material on a mass basis as it is comprised in a composition, mixture, or solution.

The terms “increased”, “enhanced” and “improved” are used interchangeably herein. These terms refer to a greater quantity or activity such as a quantity or activity slightly greater than the original quantity or activity, or a quantity or activity in large excess compared to the original quantity or activity, and including all quantities or activities in between. Alternatively, these terms may refer to, for example, a quantity or activity that is at least 1%, 2%, 3%, 4%, 5%, 6%, 7%, 8%, 9%, 10%, 11%, 12%, 13%, 14%, 15%, 16%, 17%, 18%, 19% or 20% more than the quantity or activity for which the increased quantity or activity is being compared.

As used herein, the term “isolated” means a substance in a form or environment that does not occur in nature. Non-limiting examples of isolated substances include (1) any non-naturally occurring substance, (2) any substance including, but not limited to, any host cell, enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated.

As used herein, term “water soluble” will refer to the present glucan oligomer/polymer compositions that are soluble at 20 wt % or higher in pH 7 water at 25° C.

As used herein, the terms “soluble glucan fiber”, “α-glucan fiber”, “α-glucan polymer”, “α-glucan oligosaccharide”, “α-glucan polysaccharide”, “α-glucan oligomer”, "α-glucan oligomer/polymer", and "soluble glucan fiber composition" refer to the present α-glucan polymer composition (non-derivatized; i.e., not an α-glucan ether) comprised of water soluble glucose oligomers having a glucose polymerization degree of 3 or more. The present soluble glucan polymer composition is enzymatically synthesized from sucrose (α-D-Glucopyranosyl β-D-fructofuranoside; CAS #57-50-1) obtainable from, for example, sugarcane and/or sugar beets. In one embodiment, the present soluble α-glucan polymer composition is not alternan or maltoalternan oligosaccharide.

As used herein, "weight average molecular weight" or "$M_w$" is calculated as $M_w=\Sigma N_i M_i^2/\Sigma N_i M_i$; where $M_i$ is the molecular weight of a chain and $N_i$ is the number of chains of that molecular weight. The weight average molecular weight can be determined by techniques such as static light scattering, small angle neutron scattering, X-ray scattering, and sedimentation velocity.

As used herein, "number average molecular weight" or "$M_n$" refers to the statistical average molecular weight of all the polymer chains in a sample. The number average molecular weight is calculated as $M_n=\Sigma N_i M_i/\Sigma N_i$ where $M_i$ is the molecular weight of a chain and $N_i$ is the number of chains of that molecular weight. The number average molecular weight of a polymer can be determined by techniques such as gel permeation chromatography, viscometry via the (Mark-Houwink equation), and colligative methods such as vapor pressure osmometry, end-group determination or proton NMR.

As used herein, "polydispersity index", "PDI", "heterogeneity index", and "dispersity" refer to a measure of the distribution of molecular mass in a given polymer (such as a glucose oligomer) sample and can be calculated by dividing the weight average molecular weight by the number average molecular weight ($PDI=M_w/M_n$).

It shall be noted that the terms "glucose" and "glucopyranose" as used herein are considered as synonyms and used interchangeably. Similarly the terms "glucosyl" and "glucopyranosyl" units are used herein are considered as synonyms and used interchangeably.

As used herein, "glycosidic linkages" or "glycosidic bonds" will refer to the covalent the bonds connecting the sugar monomers within a saccharide oligomer (oligosaccharides and/or polysaccharides). Example of glycosidic linkage may include α-linked glucose oligomers with 1,6-α-D-glycosidic linkages (herein also referred to as α-D-(1,6) linkages or simply "α-(1,6)" linkages); 1,3-α-D-glycosidic linkages (herein also referred to as α-D-(1,3) linkages or simply "α-(1,3)" linkages; 1,4-α-D-glycosidic linkages (herein also referred to as α-D-(1,4) linkages or simply "α-(1,4)" linkages; 1,2-α-D-glycosidic linkages (herein also referred to as α-D-(1,2) linkages or simply "α-(1,2)" linkages; and combinations of such linkages typically associated with branched saccharide oligomers.

As used herein, the terms "glucansucrase", "glucosyltransferase", "glucoside hydrolase type 70", "GTF", and "GS" will refer to transglucosidases classified into family 70 of the glycoside-hydrolases typically found in lactic acid bacteria such as *Streptococcus, Leuconostoc, Weisella* or *Lactobacillus* genera (see Carbohydrate Active Enzymes database; "CAZy"; Cantarel et al., (2009) *Nucleic Acids Res* 37:D233-238). The GTF enzymes are able to polymerize the D-glucosyl units of sucrose to form homooligosaccharides or homopolysaccharides. Glucosyltransferases can be identified by characteristic structural features such as those described in Leemhuis et al. (J. Biotechnology (2013) 162: 250-272) and Monchois et al. (FEMS Micro. Revs. (1999) 23:131-151). Depending upon the specificity of the GTF enzyme, linear and/or branched glucans comprising various glycosidic linkages may be formed such as α-(1,2), α-(1,3), α-(1,4) and α-(1,6). Glucosyltransferases may also transfer the D-glucosyl units onto hydroxyl acceptor groups. A non-limiting list of acceptors include carbohydrates, alcohols, polyols and flavonoids. Specific acceptors may also include maltose, isomaltose, isomaltotriose, and methyl-α-D-glucan. The structure of the resultant glucosylated product is dependent upon the enzyme specificity. A non-limiting list of glucosyltransferase sequences is provided as amino acid SEQ ID NOs: 1, 3, 13, 16, 17, 19, 28, 30, 32, 34, 36, 38, 40, 42, 44, 46, 48, 50, 52, 54, 56, 58, 60, and 62. In one aspect, the glucosyltransferase is expressed in a truncated and/or mature form. In another embodiment, the polypeptide having glucosyltransferase activity comprises an amino acid sequence having at least 90% identity, preferably 91, 92, 93, 94, 95, 96, 97, 98, 99 or 100% identity to SEQ ID NO: 1, 3, 13, 16, 17, 19, 28, 30, 32, 34, 36, 38, 40, 42, 44, 46, 48, 50, 52, 54, 56, 58, 60, or 62.

As used herein, the term "isomaltooligosaccharide" or "IMO" refers to a glucose oligomers comprised essentially of α-D-(1,6) glycosidic linkage typically having an average size of DP 2 to 20. Isomaltooligosaccharides can be produced commercially from an enzymatic reaction of α-amylase, pullulanase, β-amylase, and α-glucosidase upon corn starch or starch derivative products. Commercially available products comprise a mixture of isomaltooligosaccharides (DP ranging from 3 to 8, e.g., isomaltotriose, isomaltotetraose, isomaltopentaose, isomaltohexaose, isomaltoheptaose, isomaltooctaose) and may also include panose.

As used herein, the term "dextran" refers to water soluble α-glucans comprising at least 95% α-D-(1,6) glycosidic linkages (typically with up to 5% α-D-(1,3) glycosidic linkages at branching points). Dextrans often have an average molecular weight above 1000 kDa. As used herein, enzymes capable of synthesizing dextran from sucrose may be described as "dextransucrases" (EC 2.4.1.5).

As used herein, the term "mutan" refers to water insoluble α-glucans comprised primarily (50% or more of the glycosidic linkages present) of 1,3-α-D glycosidic linkages and typically have a degree of polymerization (DP) that is often greater than 9. Enzymes capable of synthesizing mutan or α-glucan oligomers comprising greater than 50% 1,3-α-D glycosidic linkages from sucrose may be described as "mutansucrases" (EC 2.4.1.-) with the proviso that the enzyme does not produce alternan.

As used herein, the term "alternan" refers to α-glucans having alternating 1,3-α-D glycosidic linkages and 1,6-α-D glycosidic linkages over at least 50% of the linear oligosaccharide backbone. Enzymes capable of synthesizing alternan from sucrose may be described as "alternansucrases" (EC 2.4.1.140).

As used herein, the term "reuteran" refers to soluble α-glucan comprised 1,4-α-D-glycosidic linkages (typically >50%); 1,6-α-D-glycosidic linkages; and 4,6-disubstituted α-glucosyl units at the branching points. Enzymes capable of synthesizing reuteran from sucrose may be described as "reuteransucrases" (EC 2.4.1.-).

As used herein, the terms "α-glucanohydrolase" and "glucanohydrolase" will refer to an enzyme capable of hydrolyzing an α-glucan oligomer. As used herein, the glucanohydrolase may be defined by the endohydrolysis activity towards certain α-D-glycosidic linkages. Examples may include, but are not limited to, dextranases (EC 3.2.1.1; capable of endohydrolyzing α-(1,6)-linked glycosidic bonds), mutanases (EC 3.2.1.59; capable of endohydrolyzing α-(1,3)-linked glycosidic bonds), and alternanases (EC 3.2.1.-; capable of endohydrolytically cleaving alternan). Various factors including, but not limited to, level of branching, the type of branching, and the relative branch length within certain α-glucans may adversely impact the ability of an α-glucanohydrolase to endohydrolyze some glycosidic linkages.

As used herein, the term "dextranase" (α-1,6-glucan-6-glucanohydrolase; EC 3.2.1.11) refers to an enzyme capable of endohydrolysis of 1,6-α-D-glycosidic linkages (the linkage predominantly found in dextran). Dextranases are known to be useful for a number of applications including the use as ingredient in dentifrice for prevention of dental caries, plaque and/or tartar and for hydrolysis of raw sugar juice or syrup of sugar canes and sugar beets. Several microorganisms are known to be capable of producing dextranases, among them fungi of the genera *Penicillium, Paecilomyces, Aspergillus, Fusarium, Spicaria, Verticillium, Helminthosporium* and *Chaetomium*; bacteria of the genera *Lactobacillus, Streptococcus, Cellvibrio, Cytophaga, Brevibacterium, Pseudomonas, Corynebacterium, Arthrobacter* and *Flavobacterium*, and yeasts such as *Lipomyces starkeyi*. Food grade dextranases are commercially available. An example of a food grade dextrinase is DEXTRANASE® Plus L, an enzyme from *Chaetomium erraticum* sold by Novozymes A/S, Bagsvaerd, Denmark.

As used herein, the term "mutanase" (glucan endo-1,3-α-glucosidase; EC 3.2.1.59) refers to an enzyme which hydrolytically cleaves 1,3-α-D-glycosidic linkages (the linkage predominantly found in mutan). Mutanases are available from a variety of bacterial and fungal sources. A non-limiting list of mutanases is provided as amino acid sequences 4, 6, 9, and 11. In one embodiment, a polypeptide having mutanase activity comprises an amino acid sequence having at least 90% identity, preferably at least 91, 92, 93, 94, 95, 96, 97, 98, 99 or 100% identity to SEQ ID NO: 4, 6, 9 or 11.

As used herein, the term "alternanase" (EC 3.2.1.-) refers to an enzyme which endo-hydrolytically cleaves alternan (U.S. Pat. No. 5,786,196 to Cote et al.).

As used herein, the term "wild type enzyme" will refer to an enzyme (full length and active truncated forms thereof) comprising the amino acid sequence as found in the organism from which it was obtained and/or annotated. The enzyme (full length or catalytically active truncation thereof) may be recombinantly produced in a microbial host cell. The enzyme is typically purified prior to being used as a processing aid in the production of the present soluble α-glucan oligomer/polymer composition. In one aspect, a combination of at least two wild type enzymes simultaneously present in the reaction system are used in order to obtain the present soluble glucan oligomer/polymer composition. In one embodiment, the combination of at least two enzymes concomitantly present comprises at least one polypeptide having glucosyltransferase activity having at least 90% amino acid identity to SEQ ID NO: 1 or 3 and at least one polypeptide having mutanase activity having at least 90% amino acid identity to SEQ ID NO: 4, 6, 9 or 11. In a preferred embodiment, the combination of at least two enzymes concomitantly present comprises at least one polypeptide having glucosyltransferase activity having at least 90%, preferably at least 91, 92, 93, 94, 95, 96, 97, 98, 99 or 100% amino acid identity to SEQ ID NO: 1 or 3 and at least one polypeptide having mutanase activity having at least 90%, preferably at least 91, 92, 93, 94, 95, 96, 97, 98, 99 or 100% amino acid identity to SEQ ID NO: 4 or 6.

As used herein, the terms "substrate" and "suitable substrate" will refer to a composition comprising sucrose. In one embodiment, the substrate composition may further comprise one or more suitable acceptors, such as maltose, isomaltose, isomaltotriose, and methyl-α-D-glucan, to name a few. In one embodiment, a combination of at least one glucosyltransferase capable of forming glucose oligomers is used in combination with at least one α-glucanohydrolase in the same reaction mixture (i.e., they are simultaneously present and active in the reaction mixture). As such the "substrate" for the α-glucanohydrolase is the glucose oligomers concomitantly being synthesized in the reaction system by the glucosyltransferase from sucrose. In one aspect, a two-enzyme method (i.e., at least one glucosyltransferase (GTF) and at least one α-glucanohydrolase) where the enzymes are not used concomitantly in the reaction mixture is excluded, by proviso, from the present methods.

As used herein, the terms "suitable enzymatic reaction mixture", "suitable reaction components", "suitable aqueous reaction mixture", and "reaction mixture", refer to the materials (suitable substrate(s)) and water in which the reactants come into contact with the enzyme(s). The suitable reaction components may be comprised of a plurality of enzymes. In one aspect, the suitable reaction components comprises at least one glucansucrase enzyme. In a further aspect, the suitable reaction components comprise at least one glucansucrase and at least one α-glucanohydrolase.

As used herein, "one unit of glucansucrase activity" or "one unit of glucosyltransferase activity" is defined as the amount of enzyme required to convert 1 μmol of sucrose per minute when incubated with 200 g/L sucrose at pH 5.5 and 37° C. The sucrose concentration was determined using HPLC.

As used herein, "one unit of dextranase activity" is defined as the amount of enzyme that forms 1 μmol reducing sugar per minute when incubated with 0.5 mg/mL dextran substrate at pH 5.5 and 37° C. The reducing sugars were determined using the PAHBAH assay (Lever M., (1972), A New Reaction for Colorimetric Determination of Carbohydrates, *Anal. Biochem.* 47, 273-279).

As used herein, "one unit of mutanase activity" is defined as the amount of enzyme that forms 1 μmol reducing sugar per minute when incubated with 0.5 mg/mL mutan substrate at pH 5.5 and 37° C. The reducing sugars were determined using the PAHBAH assay (Lever M., supra).

As used herein, the term "enzyme catalyst" refers to a catalyst comprising an enzyme or combination of enzymes having the necessary activity to obtain the desired soluble α-glucan polymer composition. In certain embodiments, a combination of enzyme catalysts may be required to obtain the desired soluble glucan polymer composition. The enzyme catalyst(s) may be in the form of a whole microbial cell, permeabilized microbial cell(s), one or more cell components of a microbial cell extract(s), partially purified enzyme(s) or purified enzyme(s). In certain embodiments the enzyme catalyst(s) may also be chemically modified (such as by pegylation or by reaction with cross-linking reagents). The enzyme catalyst(s) may also be immobilized on a soluble or insoluble support using methods well-known to those skilled in the art; see for example, *Immobilization of Enzymes and Cells*; Gordon F. Bickerstaff, Editor; Humana Press, Totowa, N.J., USA; 1997.

The term "resistance to enzymatic hydrolysis" will refer to the relative stability of the present materials (α-glucan oligomers/polymers and/or the corresponding α-glucan ether compounds produced by the etherification of the present α-glucan oligomers/polymers) to enzymatic hydrolysis. The resistance to hydrolysis will be particular important for use of the present materials in applications wherein enzymes are often present, such as in fabric care and laundry care applications. In one embodiment, the α-glucan oligomers/polymers and/or the corresponding α-glucan ether compounds produced by the etherification of the present α-glucan oligomers/polymers are resistant to cellulases (i.e., cellulase resistant). In another embodiment, the α-glucan oligomers/polymers and/or the corresponding α-glucan ether compounds produced by the etherification of the present α-glucan oligomers/polymers are resistant to proteases (i.e., protease resistant). In another embodiment, the α-glucan oligomers/polymers and/or the corresponding α-glucan ether compounds produced by the etherification of the present α-glucan oligomers/polymers are resistant to amylases (i.e., amylase resistant). In a preferred aspect, α-glucan oligomers/polymers and/or the corresponding α-glucan ether compounds produced by the etherification of the present α-glucan oligomers/polymers are resistant to multiple classes of enzymes (combinations of cellulases, proteases, and/or amylases). Resistance to any particular enzyme will be defined as having at least 50%, preferably at least 60, 70, 80, 90, 95 or 100% of the materials remaining after treatment with the respective enzyme. The % remaining may be determined by measuring the supernatant after enzyme treatment using SEC-HPLC. The assay to measure enzyme resistance may using the following: A sample of the soluble material (e.g., 100 mg to is added to 10.0 mL water in a 20-mL scintillation vial and mixed using a PTFE magnetic stir bar to create a 1 wt % solution. The reaction is run at pH 7.0 at 20° C. After the fiber is complete dissolved, 1.0 mL (1 wt % enzyme formulation) of cellulase (PURADEX® EGL), amylase (PURASTAR® ST L) or protease (SAVINASE® 16.0L) is added and the solution is mixed for 72 hrs at 20° C. The reaction mixture is heated to 70° C. for 10 minutes to inactivate the added enzyme, and the resulting mixture is cooled to room temperature and centrifuged to remove any precipitate. The supernatant is analyzed by SEC-HPLC for recovered oligomers/polymers and compared to a control where no enzyme was added to the reaction mixture. Percent changes in area counts for the respective oligomers/polymers may be used to test the relative resistance of the materials to the respective enzyme treatment. Percent changes in area count for total ≥DP3+ fibers will be used to assess the relative amount of materials remaining after treatment with a particular enzyme. Materials having a percent recovery of at least 50%, preferably at least 60, 70, 80, 90, 95 or 100% will be considered resistant to the respective enzyme treatment (e.g., "cellulase resistant", "protease resistant" and/or "amylase resistant").

The terms "α-glucan ether compound", "α-glucan ether composition", "α-glucan ether", and "α-glucan ether derivative" are used interchangeably herein. An α-glucan ether compound herein is the present α-glucan polymer that has been etherified with one or more organic groups such that the compound has a degree of substitution (DoS) with one or more organic groups of about 0.05 to about 3.0. Such etherification occurs at one or more hydroxyl groups of at least 30% of the glucose monomeric units of the α-glucan polymer.

An α-glucan ether compound is termed an "ether" herein by virtue of comprising the substructure —$C_G$—O—C—, where "—$C_G$—" represents a carbon atom of a glucose monomeric unit of an α-glucan ether compound (where such carbon atom was bonded to a hydroxyl group [—OH] in the α-glucan polymer precursor of the ether), and where "—C—" is a carbon atom of the organic group. Thus, for example, with regard to a glucose monomeric unit (G) involved in -1,3-G-1,3- within an ether herein, $C_G$ atoms 2, 4 and/or 6 of the glucose (G) may independently be linked to an OH group or be in ether linkage to an organic group. Similarly, for example, with regard to a glucose monomeric unit (G) involved in -1,3-G-1,6- within an ether herein, $C_G$ atoms 2, 4 and/or 6 of the glucose (G) may independently be linked to an OH group or be in ether linkage to an organic group. Also, for example, with regard to a glucose monomeric unit (G) involved in -1,6-G-1,6- within an ether herein, $C_G$ atoms 2, 3 and/or 4 of the glucose (G) may independently be linked to an OH group or be in ether linkage to an organic group. Similarly, for example, with regard to a glucose monomeric unit (G) involved in -1,6-G-1,3- within an ether herein, $C_G$ atoms 2, 3 and/or 4 of the glucose (G) may independently be linked to an OH group or be in ether linkage to an organic group.

It would be understood that a "glucose" monomeric unit of an α-glucan ether compound herein typically has one or more organic groups in ether linkage. Thus, such a glucose monomeric unit can also be referred to as an etherized glucose monomeric unit.

The α-glucan ether compounds disclosed herein are synthetic, man-made compounds. Likewise, compositions comprising the present α-glucan polymer are synthetic, man-made compounds.

An "organic group" group as used herein can refer to a chain of one or more carbons that (i) has the formula —$C_nH_{2n+1}$ (i.e., an alkyl group, which is completely saturated) or (ii) is mostly saturated but has one or more hydrogens substituted with another atom or functional group (i.e., a "substituted alkyl group"). Such substitution may be with one or more hydroxyl groups, oxygen atoms (thereby forming an aldehyde or ketone group), carboxyl groups, or other alkyl groups. Thus, as examples, an organic group herein can be an alkyl group, carboxy alkyl group, or hydroxy alkyl group. An organic group herein may thus be uncharged or anionic (an example of an anionic organic group is a carboxy alkyl group).

A "carboxy alkyl" group herein refers to a substituted alkyl group in which one or more hydrogen atoms of the alkyl group are substituted with a carboxyl group. A "hydroxy alkyl" group herein refers to a substituted alkyl group in which one or more hydrogen atoms of the alkyl group are substituted with a hydroxyl group.

The phrase "positively charged organic group" as used herein refers to a chain of one or more carbons ("carbon chain") that has one or more hydrogens substituted with another atom or functional group (i.e., a "substituted alkyl group"), where one or more of the substitutions is with a positively charged group. Where a positively charged organic group has a substitution in addition to a substitution with a positively charged group, such additional substitution may be with one or more hydroxyl groups, oxygen atoms (thereby forming an aldehyde or ketone group), alkyl groups, and/or additional positively charged groups. A positively charged organic group has a net positive charge since it comprises one or more positively charged groups.

The terms "positively charged group", "positively charged ionic group" and "cationic group" are used interchangeably herein. A positively charged group comprises a cation (a positively charged ion). Examples of positively charged groups include substituted ammonium groups, carbocation groups and acyl cation groups.

A composition that is "positively charged" herein typically is repelled from other positively charged substances, but attracted to negatively charged substances.

The terms "substituted ammonium group", "substituted ammonium ion" and "substituted ammonium cation" are used interchangeably herein. A substituted ammonium group herein comprises structure I:

(I)

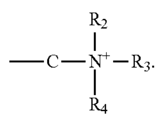

$R_2$, $R_3$ and $R_4$ in structure I each independently represent a hydrogen atom or an alkyl, aryl, cycloalkyl, aralkyl, or alkaryl group. The carbon atom (C) in structure I is part of the chain of one or more carbons ("carbon chain") of the positively charged organic group. The carbon atom is either directly ether-linked to a glucose monomer of the α-glucan polymer, or is part of a chain of two or more carbon atoms ether-linked to a glucose monomer of the α-glucan polymer/oligomer. The carbon atom in structure I can be —$CH_2$—, —CH— (where a H is substituted with another group such as a hydroxy group), or —C— (where both H's are substituted).

A substituted ammonium group can be a "primary ammonium group", "secondary ammonium group", "tertiary ammonium group", or "quaternary ammonium" group, depending on the composition of $R_2$, $R_3$ and $R_4$ in structure I. A primary ammonium group herein refers to structure I in which each of $R_2$, $R_3$ and $R_4$ is a hydrogen atom (i.e., —C—$NH_3^+$). A secondary ammonium group herein refers to structure I in which each of $R_2$ and $R_3$ is a hydrogen atom and $R_4$ is an alkyl, aryl, or cycloalkyl group. A tertiary ammonium group herein refers to structure I in which $R_2$ is a hydrogen atom and each of $R_3$ and $R_4$ is an alkyl, aryl, or cycloalkyl group. A quaternary ammonium group herein refers to structure I in which each of $R_2$, $R_3$ and $R_4$ is an alkyl, aryl, or cycloalkyl group (i.e., none of $R_2$, $R_3$ and $R_4$ is a hydrogen atom).

A quaternary ammonium α-glucan ether herein can comprise a trialkyl ammonium group (where each of $R_2$, $R_3$ and $R_4$ is an alkyl group), for example. A trimethylammonium group is an example of a trialkyl ammonium group, where each of $R_2$, $R_3$ and $R_4$ is a methyl group. It would be understood that a fourth member (i.e., $R_1$) implied by "quaternary" in this nomenclature is the chain of one or more carbons of the positively charged organic group that is ether-linked to a glucose monomer of the present α-glucan polymer/oligomer.

An example of a quaternary ammonium α-glucan ether compound is trimethylammonium hydroxypropyl α-glucan. The positively charged organic group of this ether compound can be represented as structure II:

(II)

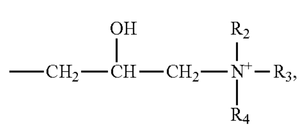

where each of $R_2$, $R_3$ and $R_4$ is a methyl group. Structure II is an example of a quaternary ammonium hydroxypropyl group.

A "halide" herein refers to a compound comprising one or more halogen atoms (e.g., fluorine, chlorine, bromine, iodine). A halide herein can refer to a compound comprising one or more halide groups such as fluoride, chloride, bromide, or iodide. A halide group may serve as a reactive group of an etherification agent.

When referring to the non-enzymatic etherification reaction, the terms "reaction", "reaction composition", and "etherification reaction" are used interchangeably herein and refer to a reaction comprising at least α-glucan polymer and an etherification agent. These components are typically mixed (e.g., resulting in a slurry) and/or dissolved in a solvent (organic and/or aqueous) comprising alkali hydroxide. A reaction is placed under suitable conditions (e.g., time, temperature) for the etherification agent to etherify one or more hydroxyl groups of the glucose units of α-glucan polymer/oligomer with an organic group, thereby yielding an α-glucan ether compound.

The term "alkaline conditions" herein refers to a solution or mixture pH of at least 10, 11 or 12. Alkaline conditions can be prepared by any means known in the art, such as by dissolving an alkali hydroxide in a solution or mixture.

The terms "etherification agent" and "alkylation agent" are used interchangeably herein. An etherification agent herein refers to an agent that can be used to etherify one or more hydroxyl groups of one or more glucose units of the present α-glucan polymer/oligomer with an organic group. An etherification agent thus comprises an organic group.

The term "degree of substitution" (DoS) as used herein refers to the average number of hydroxyl groups substituted in each monomeric unit (glucose) of the present α-glucan ether compound. Since there are at most three hydroxyl groups in a glucose monomeric unit in an α-glucan polymer/oligomer, the degree of substitution in an α-glucan ether compound herein can be no higher than 3.

The term "molar substitution" (M.S.) as used herein refers to the moles of an organic group per monomeric unit of the present α-glucan ether compound. Alternatively, M.S. can refer to the average moles of etherification agent used to react with each monomeric unit in the present α-glucan oligomer/polymer (M.S. can thus describe the degree of derivatization with an etherification agent). It is noted that the M.S. value for the present α-glucan may have no upper limit. For example, when an organic group containing a hydroxyl group (e.g., hydroxyethyl or hydroxypropyl) has been etherified to α-glucan, the hydroxyl group of the organic group may undergo further reaction, thereby coupling more of the organic group to the α-glucan oligomer/polymer.

The term "crosslink" herein refers to a chemical bond, atom, or group of atoms that connects two adjacent atoms in one or more polymer molecules. It should be understood that, in a composition comprising crosslinked α-glucan ether, crosslinks can be between at least two α-glucan ether molecules (i.e., intermolecular crosslinks); there can also be intramolecular crosslinking. A "crosslinking agent" as used herein is an atom or compound that can create crosslinks.

An "aqueous composition" herein refers to a solution or mixture in which the solvent is at least about 20 wt % water, for example, and which comprises the present α-glucan oligomer/polymer and/or the present α-glucan ether compound derivable from etherification of the present α-glucan oligomer/polymer. Examples of aqueous compositions herein are aqueous solutions and hydrocolloids.

The terms "hydrocolloid" and "hydrogel" are used interchangeably herein. A hydrocolloid refers to a colloid system in which water is the dispersion medium. A "colloid" herein refers to a substance that is microscopically dispersed throughout another substance. Therefore, a hydrocolloid herein can also refer to a dispersion, emulsion, mixture, or solution of α-glucan oligomer/polymer and/or one or more α-glucan ether compounds in water or aqueous solution.

The term "aqueous solution" herein refers to a solution in which the solvent is water. The present α-glucan oligomer/polymer and/or the present α-glucan ether compounds can be dispersed, mixed, and/or dissolved in an aqueous solution. An aqueous solution can serve as the dispersion medium of a hydrocolloid herein.

The terms "dispersant" and "dispersion agent" are used interchangeably herein to refer to a material that promotes the formation and stabilization of a dispersion of one substance in another. A "dispersion" herein refers to an aqueous composition comprising one or more particles (e.g., any ingredient of a personal care product, pharmaceutical product, food product, household product, or industrial product disclosed herein) that are scattered, or uniformly scattered, throughout the aqueous composition. It is believed that the present α-glucan oligomer/polymer and/or the present α-glucan ether compounds can act as dispersants in aqueous compositions disclosed herein.

The term "viscosity" as used herein refers to the measure of the extent to which a fluid or an aqueous composition such as a hydrocolloid resists a force tending to cause it to flow. Various units of viscosity that can be used herein include centipoise (cPs) and Pascal-second (Pa·s). A centipoise is one one-hundredth of a poise; one poise is equal to $0.100\ kg\cdot m^{-1}\cdot s^{-1}$. Thus, the terms "viscosity modifier" and "viscosity-modifying agent" as used herein refer to anything that can alter/modify the viscosity of a fluid or aqueous composition.

The term "shear thinning behavior" as used herein refers to a decrease in the viscosity of the hydrocolloid or aqueous solution as shear rate increases. The term "shear thickening behavior" as used herein refers to an increase in the viscosity of the hydrocolloid or aqueous solution as shear rate increases. "Shear rate" herein refers to the rate at which a progressive shearing deformation is applied to the hydrocolloid or aqueous solution. A shearing deformation can be applied rotationally.

The term "contacting" as used herein with respect to methods of altering the viscosity of an aqueous composition refers to any action that results in bringing together an aqueous composition with the present α-glucan polymer composition and/or α-glucan ether compound. "Contacting" may also be used herein with respect to treating a fabric, textile, yarn or fiber with the present α-glucan polymer and/or α-glucan ether compound to provide a surface substantive effect. Contacting can be performed by any means known in the art, such as dissolving, mixing, shaking, homogenization, spraying, treating, immersing, flushing, pouring on or in, combining, painting, coating, applying, affixing to and otherwise communicating an effective amount of the α-glucan polymer composition and/or α-glucan ether compound to an aqueous composition and/or directly to a fabric, fiber, yarn or textile to achieve the desired effect.

The terms "fabric", "textile", and "cloth" are used interchangeably herein to refer to a woven or non-woven material having a network of natural and/or artificial fibers. Such fibers can be thread or yarn, for example.

A "fabric care composition" herein is any composition suitable for treating fabric in some manner. Examples of such a composition include non-laundering fiber treatments (for desizing, scouring, mercerizing, bleaching, coloration, dying, printing, bio-polishing, anti-microbial treatments, anti-wrinkle treatments, stain resistance treatments, etc.), laundry care compositions (e.g., laundry care detergents), and fabric softeners.

The terms "heavy duty detergent" and "all-purpose detergent" are used interchangeably herein to refer to a detergent useful for regular washing of white and colored textiles at any temperature. The terms "low duty detergent" or "fine fabric detergent" are used interchangeably herein to refer to a detergent useful for the care of delicate fabrics such as viscose, wool, silk, microfiber or other fabric requiring special care. "Special care" can include conditions of using excess water, low agitation, and/or no bleach, for example.

The term "adsorption" herein refers to the adhesion of a compound (e.g., the present α-glucan polymer/oligomer and/or the present α-glucan ether compounds derived from the present α-glucan polymer/oligomers) to the surface of a material.

The terms "cellulase" and "cellulase enzyme" are used interchangeably herein to refer to an enzyme that hydrolyzes β-1,4-D-glucosidic linkages in cellulose, thereby partially or completely degrading cellulose. Cellulase can alternatively be referred to as "β-1,4-glucanase", for example, and can have endocellulase activity (EC 3.2.1.4), exocellulase activity (EC 3.2.1.91), or cellobiase activity (EC 3.2.1.21). A cellulase in certain embodiments herein can also hydrolyze β-1,4-D-glucosidic linkages in cellulose ether derivatives such as carboxymethyl cellulose. "Cellulose" refers to an insoluble polysaccharide having a linear chain of β-1,4-linked D-glucose monomeric units.

As used herein, the term "fabric hand" or "handle" is meant people's tactile sensory response towards fabric which may be physical, physiological, psychological, social or any combination thereof. In one embodiment, the fabric hand may be measured using a PhabrOmeter® System for measuring relative hand value (available from Nu Cybertek, Inc. Davis, Calif.) (American Association of Textile Chemists and Colorists (AATCC test method "202-2012, Relative Hand Value of Textiles: Instrumental Method").

As used herein, "pharmaceutically-acceptable" means that the compounds or compositions in question are suitable for use in contact with the tissues of humans and other animals without undue toxicity, incompatibility, instability, irritation, allergic response, and the like, commensurate with a reasonable benefit/risk ratio.

As used herein, the term "oligosaccharide" refers to polymers typically containing between 3 and about 30 monosaccharide units linked by α-glycosidic bonds.

As used herein the term "polysaccharide" refers to polymers typically containing greater than 30 monosaccharide units linked by α-glycosidic bonds.

As used herein, "personal care products" means products used in the cosmetic treatment hair, skin, scalp, and teeth, including, but not limited to shampoos, body lotions, shower gels, topical moisturizers, toothpaste, tooth gels, mouthwashes, mouthrinses, anti-plaque rinses, and/or other topical treatments. In some particularly preferred embodiments, these products are utilized on humans, while in other embodiments, these products find cosmetic use with non-human animals (e.g., in certain veterinary applications).

As used herein, an "isolated nucleic acid molecule", "isolated polynucleotide", and "isolated nucleic acid fragment" will be used interchangeably and refer to a polymer of RNA or DNA that is single- or double-stranded, optionally containing synthetic, non-natural or altered nucleotide bases. An isolated nucleic acid molecule in the form of a polymer of DNA may be comprised of one or more segments of cDNA, genomic DNA or synthetic DNA.

The term "amino acid" refers to the basic chemical structural unit of a protein or polypeptide. The following abbreviations are used herein to identify specific amino acids:

| Amino Acid | Three-Letter Abbreviation | One-Letter Abbreviation |
|---|---|---|
| Alanine | Ala | A |
| Arginine | Arg | R |
| Asparagine | Asn | N |
| Aspartic acid | Asp | D |
| Cysteine | Cys | C |
| Glutamine | Gln | Q |
| Glutamic acid | Glu | E |
| Glycine | Gly | G |
| Histidine | His | H |
| Isoleucine | Ile | I |
| Leucine | Leu | L |
| Lysine | Lys | K |
| Methionine | Met | M |
| Phenylalanine | Phe | F |
| Proline | Pro | P |
| Serine | Ser | S |
| Threonine | Thr | T |
| Tryptophan | Trp | W |
| Tyrosine | Tyr | Y |
| Valine | Val | V |
| Any amino acid or as defined herein | Xaa | X |

It would be recognized by one of ordinary skill in the art that modifications of amino acid sequences disclosed herein can be made while retaining the function associated with the disclosed amino acid sequences. For example, it is well known in the art that alterations in a gene which result in the production of a chemically equivalent amino acid at a given site, but do not affect the functional properties of the encoded protein are common. For the purposes of the present disclosure substitutions are defined as exchanges within one of the following five groups:

1. Small aliphatic, nonpolar or slightly polar residues: Ala, Ser, Thr (Pro, Gly);
2. Polar, negatively charged residues and their amides: Asp, Asn, Glu, Gln;
3. Polar, positively charged residues: His, Arg, Lys;
4. Large aliphatic, nonpolar residues: Met, Leu, Ile, Val (Cys); and
5. Large aromatic residues: Phe, Tyr, and Trp.

Thus, a codon for the amino acid alanine, a hydrophobic amino acid, may be substituted by a codon encoding another less hydrophobic residue (such as glycine) or a more hydrophobic residue (such as valine, leucine, or isoleucine). Similarly, changes which result in substitution of one negatively charged residue for another (such as aspartic acid for glutamic acid) or one positively charged residue for another (such as lysine for arginine) can also be expected to produce a functionally equivalent product. In many cases, nucleotide changes which result in alteration of the N-terminal and C-terminal portions of the protein molecule would also not be expected to alter the activity of the protein. Each of the proposed modifications is well within the routine skill in the art, as is determination of retention of biological activity of the encoded products.

As used herein, the term "codon optimized", as it refers to genes or coding regions of nucleic acid molecules for transformation of various hosts, refers to the alteration of codons in the gene or coding regions of the nucleic acid molecules to reflect the typical codon usage of the host organism without altering the polypeptide for which the DNA codes.

As used herein, "synthetic genes" can be assembled from oligonucleotide building blocks that are chemically synthesized using procedures known to those skilled in the art. These building blocks are ligated and annealed to form gene segments that are then enzymatically assembled to construct the entire gene. "Chemically synthesized", as pertaining to a DNA sequence, means that the component nucleotides were assembled in vitro. Manual chemical synthesis of DNA may be accomplished using well-established procedures, or automated chemical synthesis can be performed using one of a number of commercially available machines. Accordingly, the genes can be tailored for optimal gene expression based on optimization of nucleotide sequences to reflect the codon bias of the host cell. The skilled artisan appreciates the likelihood of successful gene expression if codon usage is biased towards those codons favored by the host. Determination of preferred codons can be based on a survey of genes derived from the host cell where sequence information is available.

As used herein, "gene" refers to a nucleic acid molecule that expresses a specific protein, including regulatory sequences preceding (5' non-coding sequences) and following (3' non-coding sequences) the coding sequence. "Native gene" refers to a gene as found in nature with its own regulatory sequences. "Chimeric gene" refers to any gene that is not a native gene, comprising regulatory and coding sequences that are not found together in nature. Accordingly, a chimeric gene may comprise regulatory sequences and coding sequences that are derived from different sources, or regulatory sequences and coding sequences derived from the same source, but arranged in a manner different from that found in nature. "Endogenous gene" refers to a native gene in its natural location in the genome of an organism. A "foreign" gene refers to a gene not normally found in the host organism, but that is introduced into the host organism by gene transfer. Foreign genes can comprise native genes inserted into a non-native organism, or chimeric genes. A "transgene" is a gene that has been introduced into the genome by a transformation procedure.

As used herein, "coding sequence" refers to a DNA sequence that codes for a specific amino acid sequence. "Suitable regulatory sequences" refer to nucleotide sequences located upstream (5' non-coding sequences), within, or downstream (3' non-coding sequences) of a coding sequence, and which influence the transcription, RNA processing or stability, or translation of the associated coding sequence. Regulatory sequences may include promoters, translation leader sequences, RNA processing site, effector binding sites, and stem-loop structures.

As used herein, the term "operably linked" refers to the association of nucleic acid sequences on a single nucleic acid molecule so that the function of one is affected by the other. For example, a promoter is operably linked with a coding sequence when it is capable of affecting the expression of that coding sequence, i.e., the coding sequence is under the transcriptional control of the promoter. Coding sequences can be operably linked to regulatory sequences in sense or antisense orientation.

As used herein, the term "expression" refers to the transcription and stable accumulation of sense (mRNA) or antisense RNA derived from the nucleic acid molecule of the disclosure. Expression may also refer to translation of mRNA into a polypeptide.

As used herein, "transformation" refers to the transfer of a nucleic acid molecule into the genome of a host organism, resulting in genetically stable inheritance. In the present disclosure, the host cell's genome includes chromosomal and extrachromosomal (e.g., plasmid) genes. Host organisms containing the transformed nucleic acid molecules are referred to as "transgenic", "recombinant" or "transformed" organisms.

As used herein, the term "sequence analysis software" refers to any computer algorithm or software program that is useful for the analysis of nucleotide or amino acid sequences. "Sequence analysis software" may be commercially available or independently developed. Typical sequence analysis software will include, but is not limited to, the GCG suite of programs (Wisconsin Package Version 9.0, Accelrys Software Corp., San Diego, Calif.), BLASTP, BLASTN, BLASTX (Altschul et al., *J. Mol. Biol.* 215:403-410 (1990)), and DNASTAR (DNASTAR, Inc. 1228 S. Park St. Madison, Wis. 53715 USA), CLUSTALW (for example, version 1.83; Thompson et al., *Nucleic Acids Research,* 22(22):4673-4680 (1994)), and the FASTA program incorporating the Smith-Waterman algorithm (W. R. Pearson, *Comput. Methods Genome Res*., [Proc. Int. Symp.] (1994), Meeting Date 1992, 111-20. Editor(s): Suhai, Sandor. Publisher: Plenum, New York, N.Y.), Vector NTI (Informax, Bethesda, Md.) and Sequencher v. 4.05. Within the context of this application it will be understood that where sequence analysis software is used for analysis, that the results of the analysis will be based on the "default values" of the program referenced, unless otherwise specified. As used herein "default values" will mean any set of values or parameters set by the software manufacturer that originally load with the software when first initialized.

Structural and Functional Properties of the Soluble α-Glucan Oligomer/Polymer Composition The present soluble α-glucan oligomer/polymer composition was prepared from sucrose (e.g., cane sugar) using one or more enzymatic processing aids that have essentially the same amino acid sequences as found in nature (or active truncations thereof) from microorganisms which having a long history of exposure to humans (microorganisms naturally found in the oral cavity or found in foods such a beer, fermented soybeans, etc.). The soluble oligomers/polymers have low viscosity (enabling use in a broad range of applications).

The present soluble α-glucan oligomer/polymer composition is characterized by the following combination of parameters:

a. 10% to 30% α-(1,3) glycosidic linkages;

b. 65% to 87% α-(1,6) glycosidic linkages;

c. less than 5% α-(1,3,6) glycosidic linkages;

d. a weight average molecular weight (Mw) of less than 5000 Daltons;

e. a viscosity of less than 0.25 Pascal second (Pa·s) at 12 wt % in water 20° C.;

f. a solubility of at least 20% (w/w) in pH 7 water at 25° C.; and g. a polydispersity index (PDI) of less than 5.

In one embodiment, the present soluble α-glucan oligomer/polymer composition comprises 10-30%, preferably 10-25%, α-(1,3) glycosidic linkages.

In another embodiment, in addition to the α-(1,3) glycosidic linkage embodiments described above, the present soluble α-glucan oligomer/polymer composition further comprises 65-87%, preferably 70-85%, more preferably 75-82% α-(1,6) glycosidic linkages.

In another embodiment, in addition to the α-(1,3) and α-(1,6) glycosidic linkage content embodiments described above, the present soluble α-glucan oligomer/polymer composition further comprises less than 5%, preferably less than 4%, 3%, 2% or 1% α-(1,3,6) glycosidic linkages.

In another embodiment, in addition to the above mentioned glycosidic linkage content embodiments, the present soluble α-glucan oligomer/polymer composition further comprises less than 5%, preferably less than 1%, and most preferably less than 0.5% α-(1,4) glycosidic linkages.

In another embodiment, in addition the above mentioned glycosidic linkage content embodiments, the present α-glucan oligomer/polymer composition comprises a weight average molecular weight ($M_w$) of less than 5000 Daltons, preferably less than 2500 Daltons, more preferably between 500 and 2500 Daltons, and most preferably about 500 to about 2000 Daltons.

In another embodiment, in addition to any of the above features, the present α-glucan oligomer/polymer composition comprises a viscosity of less than 250 centipoise (cP) (0.25 Pascal second (Pas), preferably less than 10 centipoise (cP) (0.01 Pascal second (Pas)), preferably less than 7 cP (0.007 Pas), more preferably less than 5 cP (0.005 Pas), more preferably less than 4 cP (0.004 Pas), and most preferably less than 3 cP (0.003 Pas) at 12 wt % in water at 20° C.

In addition to any of the above embodiments, the present soluble α-glucan oligomer/polymer composition has a solubility of at least 20% (w/w), preferably at least 30%, 40%, 50%, 60%, or 70% in pH 7 water at 25° C.

In another embodiment, the present soluble α-glucan oligomer/polymer composition comprises a number average molecular weight (Mn) between 400 and 2000 g/mole; preferably 500 to 1500 g/mole.

Compositions Comprising α-Glucan Oligomer/Polymers and/or α-Glucan Ethers

Depending upon the desired application, the present α-glucan oligomer/polymer composition and/or derivatives thereof (such as the present α-glucan ethers) may be formulated (e.g., blended, mixed, incorporated into, etc.) with one or more other materials and/or active ingredients suitable for use in laundry care, textile/fabric care, and/or personal care products. As such, the present disclosure includes compositions comprising the present glucan oligomer/polymer composition. The term "compositions comprising the present glucan oligomer/polymer composition" in this context may include, for example, aqueous formulations comprising the present glucan oligomer/polymer, rheology modifying compositions, fabric treatment/care compositions, laundry care formulations/compositions, fabric softeners, personal care compositions (hair, skin and oral care), and the like.

The present glucan oligomer/polymer composition may be directed as an ingredient in a desired product or may be blended with one or more additional suitable ingredients (ingredients suitable for fabric care applications, laundry care applications, and/or personal care applications). As such, the present disclosure comprises a fabric care, laundry care, or personal care composition comprising the present soluble α-glucan oligomer/polymer composition, the present α-glucan ethers, or a combination thereof. In one embodiment, the fabric care, laundry care or personal care composition comprises 0.01 to 99 wt % (dry solids basis), preferably 0.1 to 90 wt %, more preferably 1 to 90%, and most preferably 5 to 80 wt % of the glucan oligomer/polymer composition and/or the present α-glucan ether compounds.

In one embodiment, a fabric care composition is provided comprising:

a. an α-glucan oligomer/polymer composition comprising:
   i. 10% to 30% α-(1,3) glycosidic linkages;
   ii. 65% to 87% α-(1,6) glycosidic linkages;
   iii. less than 5% α-(1,3,6) glycosidic linkages;
   iv. a weight average molecular weight (Mw) of less than 5000 Daltons;
   v. a viscosity of less than 0.25 Pascal second (Pa·s) at 12 wt % in water 20° C.;
   vi. a solubility of at least 20% (w/w) in pH 7 water at 25° C.; and
   vii. a polydispersity index (PDI) of less than 5.
b. at least one additional fabric care ingredient.

In another embodiment, a laundry care composition is provided comprising:

a. an α-glucan oligomer/polymer composition comprising:
   i. 10% to 30% α-(1,3) glycosidic linkages;
   ii. 65% to 87% α-(1,6) glycosidic linkages;
   iii. less than 5% α-(1,3,6) glycosidic linkages;
   iv. a weight average molecular weight (Mw) of less than 5000 Daltons;
   v. a viscosity of less than 0.25 Pascal second (Pa·s) at 12 wt % in water 20° C.;
   vi. a solubility of at least 20% (w/w) in pH 7 water at 25° C.; and
   vii. a polydispersity index (PDI) of less than 5; and
b. at least one additional laundry care ingredient.

In another embodiment, an α-glucan ether derived from the present α-glucan oligomer/polymer composition is provided comprising:

a. 10% to 30% α-(1,3) glycosidic linkages;
b. 65% to 87% α-(1,6) glycosidic linkages;
c. less than 5% α-(1,3,6) glycosidic linkages;
d. a weight average molecular weight (Mw) of less than 5000 Daltons;
e. a viscosity of less than 0.25 Pascal second (Pa·s) at 12 wt % in water 20° C.;
f. a solubility of at least 20% (w/w) in pH 7 water at 25° C.; and
g. a polydispersity index (PDI) of less than 5; and
h. a polydispersity index of less than 5;
   wherein the composition has a degree of substitution (DoS) with at least one organic group of about 0.05 to about 3.0.

In a further embodiment to any of the above embodiments, the glucan ether composition has a degree of substitution (DoS) with at least one organic group of about 0.05 to about 3.0.

In a further embodiment to any of the above embodiments, the glucan ether composition comprises at least one organic group wherein the organic group is a carboxy alkyl group, hydroxy alkyl group, or an alkyl group.

In a further embodiment to any of the above embodiments, the at least one organic group is a carboxymethyl, hydroxypropyl, dihydroxypropyl, hydroxyethyl, methyl, and ethyl group.

In a further embodiment to any of the above embodiments, the at least one organic group is a positively charged organic group.

In a further embodiment to any of the above embodiments, the glucan ether is a quaternary ammonium glucan ether.

In a further embodiment to any of the above embodiments, the glucan ether composition is a trimethylammonium hydroxypropyl glucan.

In a further embodiment to any of the above embodiments, an organic group may be an alkyl group such as a methyl, ethyl, propyl, butyl, pentyl, hexyl, heptyl, octyl, nonyl, or decyl group, for example.

In a further embodiment to any of the above embodiments, the organic group may be a substituted alkyl group in which there is a substitution on one or more carbons of the alkyl group. The substitution(s) may be one or more hydroxyl, aldehyde, ketone, and/or carboxyl groups. For example, a substituted alkyl group may be a hydroxy alkyl group, dihydroxy alkyl group, or carboxy alkyl group.

Examples of suitable hydroxy alkyl groups are hydroxymethyl (—$CH_2OH$), hydroxyethyl (e.g., —$CH_2CH_2OH$, —$CH(OH)CH_3$), hydroxypropyl (e.g., —$CH_2CH_2CH_2OH$, —$CH_2CH(OH)CH_3$, —$CH(OH)CH_2CH_3$), hydroxybutyl and hydroxypentyl groups. Other examples include dihydroxy alkyl groups (diols) such as dihydroxymethyl, dihydroxyethyl (e.g., —$CH(OH)CH_2OH$), dihydroxypropyl (e.g., —$CH_2CH(OH)CH_2OH$, —$CH(OH)CH(OH)CH_3$), dihydroxybutyl and dihydroxypentyl groups.

Examples of suitable carboxy alkyl groups are carboxymethyl (—$CH_2COOH$), carboxyethyl (e.g., —$CH_2CH_2COOH$, —$CH(COOH)CH_3$), carboxypropyl (e.g., —$CH_2CH_2CH_2COOH$, —$CH_2CH(COOH)CH_3$, —$CH(COOH)CH_2CH_3$), carboxybutyl and carboxypentyl groups.

Alternatively still, one or more carbons of an alkyl group can have a substitution(s) with another alkyl group. Examples of such substituent alkyl groups are methyl, ethyl and propyl groups. To illustrate, an organic group can be —$CH(CH_3)CH_2CH_3$ or —$CH_2CH(CH_3)CH_3$, for example, which are both propyl groups having a methyl substitution.

As should be clear from the above examples of various substituted alkyl groups, a substitution (e.g., hydroxy or carboxy group) on an alkyl group in certain embodiments may be bonded to the terminal carbon atom of the alkyl group, where the terminal carbon group is opposite the terminus that is in ether linkage to a glucose monomeric unit in an α-glucan ether compound. An example of this terminal substitution is the hydroxypropyl group —$CH_2CH_2CH_2OH$. Alternatively, a substitution may be on an internal carbon atom of an alkyl group. An example on an internal substitution is the hydroxypropyl group —$CH_2CH(OH)CH_3$. An alkyl group can have one or more substitutions, which may be the same (e.g., two hydroxyl groups [dihydroxy]) or different (e.g., a hydroxyl group and a carboxyl group).

In a further embodiment to any of the above embodiments, the α-glucan ether compounds disclosed herein may contain one type of organic group. Examples of such compounds contain a carboxy alkyl group as the organic group (carboxyalkyl α-glucan, generically speaking). A specific non-limiting example of such a compound is carboxymethyl α-glucan.

In a further embodiment to any of the above embodiments, α-glucan ether compounds disclosed herein can contain two or more different types of organic groups. Examples of such compounds contain (i) two different alkyl groups as organic groups, (ii) an alkyl group and a hydroxy alkyl group as organic groups (alkyl hydroxyalkyl α-glucan, generically speaking), (iii) an alkyl group and a carboxy alkyl group as organic groups (alkyl carboxyalkyl α-glucan, generically speaking), (iv) a hydroxy alkyl group and a carboxy alkyl group as organic groups (hydroxyalkyl carboxyalkyl α-glucan, generically speaking), (v) two different hydroxy alkyl groups as organic groups, or (vi) two different carboxy alkyl groups as organic groups. Specific non-limiting examples of such compounds include ethyl hydroxyethyl α-glucan, hydroxyalkyl methyl α-glucan, carboxymethyl hydroxyethyl α-glucan, and carboxymethyl hydroxypropyl α-glucan.

In a further embodiment to any of the above embodiments, the organic group herein can alternatively be a positively charged organic group. As defined above, a positively charged organic group comprises a chain of one or more carbons having one or more hydrogens substituted with another atom or functional group, where one or more of the substitutions is with a positively charged group.

A positively charged group may be a substituted ammonium group, for example. Examples of substituted ammonium groups are primary, secondary, tertiary and quaternary ammonium groups. Structure I depicts a primary, secondary, tertiary or quaternary ammonium group, depending on the composition of $R_2$, $R_3$ and $R_4$ in structure I. Each of $R_2$, $R_3$ and $R_4$ in structure I independently represent a hydrogen atom or an alkyl, aryl, cycloalkyl, aralkyl, or alkaryl group. Alternatively, each of $R_2$, $R_3$ and $R_4$ in can independently represent a hydrogen atom or an alkyl group. An alkyl group can be a methyl, ethyl, propyl, butyl, pentyl, hexyl, heptyl, octyl, nonyl, or decyl group, for example. Where two or three of $R_2$, $R_3$ and $R_4$ are an alkyl group, they can be the same or different alkyl groups.

A "primary ammonium α-glucan ether compound" herein can comprise a positively charged organic group having an ammonium group. In this example, the positively charged organic group comprises structure I in which each of $R_2$, $R_3$ and $R_4$ is a hydrogen atom. A non-limiting example of such a positively charged organic group is represented by structure II when each of $R_2$, $R_3$ and $R_4$ is a hydrogen atom. An example of a primary ammonium α-glucan ether compound can be represented in shorthand as ammonium α-glucan ether. It would be understood that a first member (i.e., $R_1$) implied by "primary" in the above nomenclature is the chain of one or more carbons of the positively charged organic group that is ether-linked to a glucose monomer of α-glucan.

A "secondary ammonium α-glucan ether compound" herein can comprise a positively charged organic group having a monoalkylammonium group, for example. In this example, the positively charged organic group comprises structure I in which each of $R_2$ and $R_3$ is a hydrogen atom and $R_4$ is an alkyl group. A non-limiting example of such a positively charged organic group is represented by structure II when each of $R_2$ and $R_3$ is a hydrogen atom and $R_4$ is an alkyl group. An example of a secondary ammonium α-glucan ether compound can be represented in shorthand herein as monoalkylammonium α-glucan ether (e.g., monomethyl-, monoethyl-, monopropyl-, monobutyl-, monopentyl-, monohexyl-, monoheptyl-, monooctyl-, mononony l- or monodecyl-ammonium α-glucan ether). It would be understood that a second member (i.e., $R_1$) implied by "secondary" in the above nomenclature is the chain of one or more carbons of the positively charged organic group that is ether-linked to a glucose monomer of α-glucan.

A "tertiary ammonium α-glucan ether compound" herein can comprise a positively charged organic group having a dialkylammonium group, for example. In this example, the positively charged organic group comprises structure I in which $R_2$ is a hydrogen atom and each of $R_3$ and $R_4$ is an alkyl group. A non-limiting example of such a positively charged organic group is represented by structure II when $R_2$ is a hydrogen atom and each of $R_3$ and $R_4$ is an alkyl group. An example of a tertiary ammonium α-glucan ether compound can be represented in shorthand as dialkylammonium α-glucan ether (e.g., dimethyl-, diethyl-, dipropyl-, dibutyl-, dipentyl-, dihexyl-, diheptyl-, dioctyl-, dinonyl- or didecyl-ammonium α-glucan ether). It would be understood that a third member (i.e., $R_1$) implied by "tertiary" in the above nomenclature is the chain of one or more carbons of the positively charged organic group that is ether-linked to a glucose monomer of α-glucan.

A "quaternary ammonium α-glucan ether compound" herein can comprise a positively charged organic group having a trialkylammonium group, for example. In this example, the positively charged organic group comprises structure I in which each of $R_2$, $R_3$ and $R_4$ is an alkyl group. A non-limiting example of such a positively charged organic group is represented by structure II when each of $R_2$, $R_3$ and $R_4$ is an alkyl group. An example of a quaternary ammonium α-glucan ether compound can be represented in shorthand as trialkylammonium α-glucan ether (e.g., trimethyl-, triethyl-, tripropyl-, tributyl-, tripentyl-, trihexyl-, triheptyl-, trioctyl-, trinonyl- or tridecyl-ammonium α-glucan ether). It would be understood that a fourth member (i.e., $R_1$) implied by "quaternary" in the above nomenclature is the chain of one or more carbons of the positively charged organic group that is ether-linked to a glucose monomer of α-glucan.

Additional non-limiting examples of substituted ammonium groups that can serve as a positively charged group herein are represented in structure I when each of $R_2$, $R_3$ and $R_4$ independently represent a hydrogen atom; an alkyl group such as a methyl, ethyl, or propyl group; an aryl group such as a phenyl or naphthyl group; an aralkyl group such as a benzyl group; an alkaryl group; or a cycloalkyl group. Each of $R_2$, $R_3$ and $R_4$ may further comprise an amino group or a hydroxyl group, for example.

The nitrogen atom in a substituted ammonium group represented by structure I is bonded to a chain of one or more carbons as comprised in a positively charged organic group. This chain of one or more carbons ("carbon chain") is ether-linked to a glucose monomer of α-glucan, and may have one or more substitutions in addition to the substitution with the nitrogen atom of the substituted ammonium group. There can be 1, 2, 3, 4, 5, 6, 7, 8, 9 or 10 carbons, for example, in a carbon chain. To illustrate, the carbon chain of structure II is 3 carbon atoms in length.

Examples of a carbon chain of a positively charged organic group that do not have a substitution in addition to the substitution with a positively charged group include $—CH_2—$, $—CH_2CH_2—$, $—CH_2CH_2CH_2—$, $—CH_2CH_2CH_2CH_2—$ and $—CH_2CH_2CH_2CH_2CH_2—$. In each of these examples, the first carbon atom of the chain is ether-linked to a glucose monomer of α-glucan, and the last carbon atom of the chain is linked to a positively charged group. Where the positively charged group is a substituted ammonium group, the last carbon atom of the chain in each of these examples is represented by the C in structure I.

Where a carbon chain of a positively charged organic group has a substitution in addition to a substitution with a positively charged group, such additional substitution may be with one or more hydroxyl groups, oxygen atoms (thereby forming an aldehyde or ketone group), alkyl groups (e.g., methyl, ethyl, propyl, butyl), and/or additional positively charged groups. A positively charged group is typically bonded to the terminal carbon atom of the carbon chain.

Examples of a carbon chain of a positively charged organic group having one or more substitutions with a hydroxyl group include hydroxyalkyl (e.g., hydroxyethyl, hydroxypropyl, hydroxybutyl, hydroxypentyl) groups and dihydroxyalkyl (e.g., dihydroxyethyl, dihydroxypropyl, dihydroxybutyl, dihydroxypentyl) groups. Examples of hydroxyalkyl and dihydroxyalkyl (diol) carbon chains include —CH(OH)—, —CH(OH)$CH_2$—, —C(OH)$_2$ $CH_2$—, —$CH_2$CH(OH)$CH_2$—, —CH(OH)$CH_2CH_2$—, —CH(OH)CH(OH)$CH_2$—, —$CH_2CH_2$CH(OH)$CH_2$—, —$CH_2$CH(OH)$CH_2CH_2$—, —CH(OH)$CH_2CH_2CH_2$—, —$CH_2$CH(OH)CH(OH)$CH_2$—, —CH(OH)CH(OH) $CH_2CH_2$— and —CH(OH)$CH_2$CH(OH)$CH_2$—. In each of these examples, the first carbon atom of the chain is ether-linked to a glucose monomer of the present α-glucan, and the last carbon atom of the chain is linked to a positively charged group. Where the positively charged group is a substituted ammonium group, the last carbon atom of the chain in each of these examples is represented by the C in structure I.

Examples of a carbon chain of a positively charged organic group having one or more substitutions with an alkyl group include chains with one or more substituent methyl, ethyl and/or propyl groups. Examples of methylalkyl groups include —CH($CH_3$)$CH_2CH_2$— and —$CH_2$CH($CH_3$) $CH_2$—, which are both propyl groups having a methyl substitution. In each of these examples, the first carbon atom of the chain is ether-linked to a glucose monomer of the present α-glucan, and the last carbon atom of the chain is linked to a positively charged group. Where the positively charged group is a substituted ammonium group, the last carbon atom of the chain in each of these examples is represented by the C in structure I.

In a further embodiment to any of the above embodiments, the α-glucan ether compounds herein may contain one type of positively charged organic group. For example, one or more positively charged organic groups ether-linked to the glucose monomer of α-glucan may be trimethylammonium hydroxypropyl groups (structure II). Alternatively, α-glucan ether compounds disclosed herein can contain two or more different types of positively charged organic groups.

In a further embodiment to any of the above embodiments, α-glucan ether compounds herein can comprise at least one nonionic organic group and at least one anionic group, for example. As another example, α-glucan ether compounds herein can comprise at least one nonionic organic group and at least one positively charged organic group.

In a further embodiment to any of the above embodiments, α-glucan ether compounds may be derived from any of the present α-glucan oligomers/polymers disclosed herein. For example, the α-glucan ether compound can be produced by ether-derivatizing the present α-glucan oligomers/polymers using an etherification reaction as disclosed herein.

In certain embodiments of the disclosure, a composition comprising an α-glucan ether compound can be a hydrocolloid or aqueous solution having a viscosity of at least about 10 cPs. Alternatively, such a hydrocolloid or aqueous solution has a viscosity of at least about 100, 250, 500, 750, 1000, 1250, 1500, 1750, 2000, 2250, 2500, 3000, 3500, or 4000 cPs (or any value between 100 and 4000 cPs), for example.

Viscosity can be measured with the hydrocolloid or aqueous solution at any temperature between about 3° C. to about 110° C. (or any integer between 3 and 110° C.). Alternatively, viscosity can be measured at a temperature between about 4° C. to 30° C., or about 20° C. to 25° C. Viscosity can be measured at atmospheric pressure (about 760 torr) or any other higher or lower pressure.

The viscosity of a hydrocolloid or aqueous solution disclosed herein can be measured using a viscometer or rheometer, or using any other means known in the art. It would be understood by those skilled in the art that a viscometer or rheometer can be used to measure the viscosity of those hydrocolloids and aqueous solutions that exhibit shear thinning behavior or shear thickening behavior (i.e., liquids with viscosities that vary with flow conditions). The viscosity of such embodiments can be measured at a rotational shear rate of about 10 to 1000 rpm (revolutions per minute) (or any integer between 10 and 1000 rpm), for example. Alternatively, viscosity can be measured at a rotational shear rate of about 10, 60, 150, 250, or 600 rpm.

The pH of a hydrocolloid or aqueous solution disclosed herein can be between about 2.0 to about 12.0. Alternatively, pH can be about 2.0, 3.0, 4.0, 5.0, 6.0, 7.0, 8.0, 9.0, 10.0, 11.0, 12.0; or between 5.0 to about 12.0; or between about 4.0 and 8.0; or between about 5.0 and 8.0.

An aqueous composition herein such as a hydrocolloid or aqueous solution can comprise a solvent having at least about 20 wt % water. In other embodiments, a solvent is at least about 30, 40, 50, 60, 70, 80, 90, or 100 wt % water (or any integer value between 20 and 100 wt %), for example.

In a further embodiment to any of the above embodiments, the α-glucan ether compound disclosed herein can be present in a hydrocolloid or aqueous solution at a weight percentage (wt %) of at least about 0.01%, 0.05%, 0.1%, 0.2%, 0.3%, 0.4%, 0.5%, 0.6%, 0.7%, 0.8%, 0.9%, 1.0%, 1.2%, 1.4%, 1.6%, 1.8%, 2.0%, 2.5%, 3.0%, 3.5%, 4.0%, 4.5%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30%, for example.

In a further embodiment to any of the above embodiments, the hydrocolloid or aqueous solution herein can comprise other components in addition to one or more α-glucan ether compounds. For example, the hydrocolloid or aqueous solution can comprise one or more salts such as a sodium salt (e.g., NaCl, $Na_2SO_4$). Other non-limiting examples of salts include those having (i) an aluminum, ammonium, barium, calcium, chromium (II or III), copper (I or II), iron (II or III), hydrogen, lead (II), lithium, magnesium, manganese (II or III), mercury (I or II), potassium, silver, sodium strontium, tin (II or IV), or zinc cation, and (ii) an acetate, borate, bromate, bromide, carbonate, chlorate, chloride, chlorite, chromate, cyanamide, cyanide, dichromate, dihydrogen phosphate, ferricyanide, ferrocyanide, fluoride, hydrogen carbonate, hydrogen phosphate, hydrogen sulfate, hydrogen sulfide, hydrogen sulfite, hydride, hydroxide, hypochlorite, iodate, iodide, nitrate, nitride, nitrite, oxalate, oxide, perchlorate, permanganate, peroxide, phosphate, phosphide, phosphite, silicate, stannate, stannite, sulfate, sulfide, sulfite, tartrate, or thiocyanate anion. Thus, any salt having a cation from (i) above and an anion from (ii) above can be in a hydrocolloid or aqueous solution, for example. A salt can be present in a hydrocolloid or aqueous solution at a wt % of about 0.01% to about 10.00% (or any hundredth increment between 0.01% and 10.00%), for example.

In a further embodiment to any of the above embodiments, those skilled in the art would understand that in certain embodiments, the α-glucan ether compound can be in an anionic form in a hydrocolloid or aqueous solution. Examples may include those α-glucan ether compounds having an organic group comprising an alkyl group substituted with a carboxyl group. Carboxyl (COOH) groups in a carboxyalkyl α-glucan ether compound can convert to carboxylate ($COO^-$) groups in aqueous conditions. Such anionic groups can interact with salt cations such as any of those listed above in (i) (e.g., potassium, sodium, or lithium cation). Thus, an α-glucan ether compound can be a sodium carboxyalkyl α-glucan ether (e.g., sodium carboxymethyl α-glucan), potassium carboxyalkyl α-glucan ether (e.g., potassium carboxymethyl α-glucan), or lithium carboxyalkyl α-glucan ether (e.g., lithium carboxymethyl α-glucan), for example.

In alternative embodiments to any of the above embodiments, a composition comprising the α-glucan ether compound herein can be non-aqueous (e.g., a dry composition). Examples of such embodiments include powders, granules, microcapsules, flakes, or any other form of particulate matter. Other examples include larger compositions such as pellets, bars, kernels, beads, tablets, sticks, or other agglomerates. A non-aqueous or dry composition herein typically has less than 3, 2, 1, 0.5, or 0.1 wt % water comprised therein.

In certain embodiments the α-glucan ether compound may be crosslinked using any means known in the art. Such crosslinks may be borate crosslinks, where the borate is from any boron-containing compound (e.g., boric acid, diborates, tetraborates, pentaborates, polymeric compounds such as POLYBOR®, polymeric compounds of boric acid, alkali borates), for example. Alternatively, crosslinks can be provided with polyvalent metals such as titanium or zirconium. Titanium crosslinks may be provided, for example, using titanium IV-containing compounds such as titanium ammonium lactate, titanium triethanolamine, titanium acetylacetonate, and polyhydroxy complexes of titanium. Zirconium crosslinks can be provided using zirconium IV-containing compounds such as zirconium lactate, zirconium carbonate, zirconium acetylacetonate, zirconium triethanolamine, zirconium diisopropylamine lactate and polyhydroxy complexes of zirconium, for example. Alternatively still, crosslinks can be provided with any crosslinking agent described in U.S. Pat. Nos. 4,462,917, 4,464,270, 4,477,360 and 4,799,550, which are all incorporated herein by reference. A crosslinking agent (e.g., borate) may be present in an aqueous composition herein at a concentration of about 0.2% to 20 wt %, or about 0.1, 0.2, 0.3, 0.4, 0.5, 1, 2, 3, 4, 5, 6, 7, 8, 9, 10, 15, or 20 wt %, for example.

It is believed that an α-glucan ether compound disclosed herein that is crosslinked typically has a higher viscosity in an aqueous solution compared to its non-crosslinked counterpart. In addition, it is believed that a crosslinked α-glucan ether compound can have increased shear thickening behavior compared to its non-crosslinked counterpart.

In a further embodiment to any of the above embodiments, a composition herein (fabric care, laundry care, personal care, etc.) may optionally contain one or more active enzymes. Non-limiting examples of suitable enzymes include proteases, cellulases, hem icellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases and amylases. If an enzyme(s) is included, it may be comprised in a composition herein at about 0.0001-0.1 wt % (e.g., 0.01-0.03 wt %) active enzyme (e.g., calculated as pure enzyme protein), for example.

A cellulase herein can have endocellulase activity (EC 3.2.1.4), exocellulase activity (EC 3.2.1.91), or cellobiase activity (EC 3.2.1.21). A cellulase herein is an "active cellulase" having activity under suitable conditions for maintaining cellulase activity; it is within the skill of the art to determine such suitable conditions. Besides being able to degrade cellulose, a cellulase in certain embodiments can also degrade cellulose ether derivatives such as carboxymethyl cellulose. Examples of cellulose ether derivatives which are expected to not be stable to cellulase are disclosed in U.S. Pat. Nos. 7,012,053, 7,056,880, 6,579,840, 7,534, 759 and 7,576,048.

A cellulase herein may be derived from any microbial source, such as a bacteria or fungus. Chemically-modified cellulases or protein-engineered mutant cellulases are included. Suitable cellulases include, but are not limited to, cellulases from the genera *Bacillus, Pseudomonas, Streptomyces, Trichoderma, Humicola, Fusarium, Thielavia* and *Acremonium*. As other examples, a cellulase may be derived from *Humicola insolens, Myceliophthora thermophila* or *Fusarium oxysporum*; these and other cellulases are disclosed in U.S. Pat. Nos. 4,435,307, 5,648,263, 5,691,178, 5,776,757 and 7,604,974, which are all incorporated herein by reference. Exemplary *Trichoderma reesei* cellulases are disclosed in U.S. Pat. Nos. 4,689,297, 5,814,501, 5,324,649, and International Patent Appl. Publ. Nos. WO92/06221 and WO92/06165, all of which are incorporated herein by reference. Exemplary *Bacillus* cellulases are disclosed in U.S. Pat. No. 6,562,612, which is incorporated herein by reference. A cellulase, such as any of the foregoing, preferably is in a mature form lacking an N-terminal signal peptide. Commercially available cellulases useful herein include CELLUZYME® and CAREZYME® (Novozymes A/S); CLAZINASE® and PURADAX® HA (DuPont Industrial Biosciences), and KAC-500(B)® (Kao Corporation).

Alternatively, a cellulase herein may be produced by any means known in the art, such as described in U.S. Pat. Nos. 4,435,307, 5,776,757 and 7,604,974, which are incorporated herein by reference. For example, a cellulase may be produced recombinantly in a heterologous expression system, such as a microbial or fungal heterologous expression system. Examples of heterologous expression systems include bacterial (e.g., *E. coli, Bacillus* sp.) and eukaryotic systems. Eukaryotic systems can employ yeast (e.g., *Pichia* sp., *Saccharomyces* sp.) or fungal (e.g., *Trichoderma* sp. such as *T. reesei, Aspergillus* species such as *A. niger*) expression systems, for example.

One or more cellulases can be directly added as an ingredient when preparing a composition disclosed herein. Alternatively, one or more cellulases can be indirectly (inadvertently) provided in the disclosed composition. For example, cellulase can be provided in a composition herein by virtue of being present in a non-cellulase enzyme preparation used for preparing a composition. Cellulase in compositions in which cellulase is indirectly provided thereto can be present at about 0.1-10 ppb (e.g., less than 1 ppm), for example. A contemplated benefit of a composition herein, by virtue of employing a poly alpha-1,3-1,6-glucan ether compound instead of a cellulose ether compound, is that non-cellulase enzyme preparations that might have background cellulase activity can be used without concern that the desired effects of the glucan ether will be negated by the background cellulase activity.

A cellulase in certain embodiments can be thermostable. Cellulase thermostability refers to the ability of the enzyme to retain activity after exposure to an elevated temperature (e.g. about 60-70° C.) for a period of time (e.g., about 30-60 minutes). The thermostability of a cellulase can be measured by its half-life (t1/2) given in minutes, hours, or days, during which time period half the cellulase activity is lost under defined conditions.

A cellulase in certain embodiments can be stable to a wide range of pH values (e.g. neutral or alkaline pH such as pH of ~7.0 to ~11.0). Such enzymes can remain stable for a predetermined period of time (e.g., at least about 15 min., 30 min., or 1 hour) under such pH conditions.

At least one, two, or more cellulases may be included in the composition. The total amount of cellulase in a composition herein typically is an amount that is suitable for the purpose of using cellulase in the composition (an "effective amount"). For example, an effective amount of cellulase in a composition intended for improving the feel and/or appearance of a cellulose-containing fabric is an amount that produces measurable improvements in the feel of the fabric (e.g., improving fabric smoothness and/or appearance, removing pills and fibrils which tend to reduce fabric appearance sharpness). As another example, an effective amount of cellulase in a fabric stonewashing composition herein is that amount which will provide the desired effect (e.g., to produce a worn and faded look in seams and on fabric panels). The amount of cellulase in a composition herein can also depend on the process parameters in which the composition is employed (e.g., equipment, temperature, time, and the like) and cellulase activity, for example. The effective concentration of cellulase in an aqueous composition in which a fabric is treated can be readily determined by a skilled artisan. In fabric care processes, cellulase can be present in an aqueous composition (e.g., wash liquor) in which a fabric is treated in a concentration that is minimally about 0.01-0.1 ppm total cellulase protein, or about 0.1-10 ppb total cellulase protein (e.g., less than 1 ppm), to maximally about 100, 200, 500, 1000, 2000, 3000, 4000, or 5000 ppm total cellulase protein, for example.

In a further embodiment to any of the above embodiments, the α-glucan oligomer/polymers and/or the present α-glucan ethers (derived from the present α-glucan oligomer/polymers) are mostly or completely stable (resistant) to being degraded by cellulase. For example, the percent degradation of the present α-glucan oligomers/polymers and/or α-glucan ether compounds by one or more cellulases is less than 10%, 9%, 8%, 7%, 6%, 5%, 4%, 3%, 2%, or 1%, or is 0%. Such percent degradation can be determined, for example, by comparing the molecular weight of polymer before and after treatment with a cellulase for a period of time (e.g., ~24 hours).

In a further embodiment to any of the above embodiments, hydrocolloids and aqueous solutions in certain embodiments are believed to have either shear thinning behavior or shear thickening behavior. Shear thinning behavior is observed as a decrease in viscosity of the hydrocolloid or aqueous solution as shear rate increases, whereas shear thickening behavior is observed as an increase in viscosity of the hydrocolloid or aqueous solution as shear rate increases. Modification of the shear thinning behavior or shear thickening behavior of an aqueous solution herein is due to the admixture of the α-glucan ether to the aqueous composition. Thus, one or more α-glucan ether compounds can be added to an aqueous composition to modify its rheological profile (i.e., the flow properties of the aqueous liquid, solution, or mixture are modified). Also, one or more α-glucan ether compounds can be added to an aqueous composition to modify its viscosity.

The rheological properties of hydrocolloids and aqueous solutions can be observed by measuring viscosity over an increasing rotational shear rate (e.g., from about 10 rpm to about 250 rpm). For example, shear thinning behavior of a hydrocolloid or aqueous solution disclosed herein can be observed as a decrease in viscosity (cPs) by at least about 5%, 10%, 15%, 20%, 25%, 30%, 35%, 40%, 45%, 50%, 55%, 60%, 65%, 70%, 75%, 80%, 85%, 90%, or 95% (or any integer between 5% and 95%) as the rotational shear rate increases from about 10 rpm to 60 rpm, 10 rpm to 150 rpm, 10 rpm to 250 rpm, 60 rpm to 150 rpm, 60 rpm to 250 rpm, or 150 rpm to 250 rpm. As another example, shear thickening behavior of a hydrocolloid or aqueous solution disclosed herein can be observed as an increase in viscosity (cPs) by at least about 5%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, or 200% (or any integer between 5% and 200%) as the rotational shear rate increases from about 10 rpm to 60 rpm, 10 rpm to 150 rpm, 10 rpm to 250 rpm, 60 rpm to 150 rpm, 60 rpm to 250 rpm, or 150 rpm to 250 rpm.

A hydrocolloid or aqueous solution disclosed herein can be in the form of, and/or comprised in, a textile care product, a laundry care product, a personal care product, a pharmaceutical product, or industrial product. The present α-glucan oligomers/polymers and/or the present α-glucan ether compounds can be used as thickening agents and/or dispersion agents in each of these products. Such a thickening agent may be used in conjunction with one or more other types of thickening agents if desired, such as those disclosed in U.S. Pat. No. 8,541,041, the disclosure of which is incorporated herein by reference in its entirety.

A household and/or industrial product herein can be in the form of drywall tape-joint compounds; mortars; grouts; cement plasters; spray plasters; cement stucco; adhesives; pastes; wall/ceiling texturizers; binders and processing aids for tape casting, extrusion forming, injection molding and ceramics; spray adherents and suspending/dispersing aids for pesticides, herbicides, and fertilizers; fabric care products such as fabric softeners and laundry detergents; hard surface cleaners; air fresheners; polymer emulsions; gels such as water-based gels; surfactant solutions; paints such as water-based paints; protective coatings; adhesives; sealants and caulks; inks such as water-based ink; metal-working fluids; emulsion-based metal cleaning fluids used in electroplating, phosphatizing, galvanizing and/or general metal cleaning operations; hydraulic fluids (e.g., those used for fracking in downhole operations); and aqueous mineral slurries, for example.

In a further embodiment to any of the above embodiments, compositions disclosed herein can be in the form of a fabric care composition. A fabric care composition herein can be used for hand wash, machine wash and/or other purposes such as soaking and/or pretreatment of fabrics, for example. A fabric care composition may take the form of, for example, a laundry detergent; fabric conditioner; any wash-, rinse-, or dryer-added product; unit dose or spray. Fabric care compositions in a liquid form may be in the form of an aqueous composition as disclosed herein. In other aspects, a fabric care composition can be in a dry form such as a granular detergent or dryer-added fabric softener sheet. Other non-limiting examples of fabric care compositions herein include: granular or powder-form all-purpose or heavy-duty washing agents; liquid, gel or paste-form all-purpose or heavy-duty washing agents; liquid or dry fine-fabric (e.g. delicates) detergents; cleaning auxiliaries such as bleach additives, "stain-stick", or pre-treatments; substrate-laden products such as dry and wetted wipes, pads, or sponges; sprays and mists.

A detergent composition herein may be in any useful form, e.g., as powders, granules, pastes, bars, unit dose, or liquid. A liquid detergent may be aqueous, typically containing up to about 70 wt % of water and 0 wt % to about 30 wt % of organic solvent. It may also be in the form of a compact gel type containing only about 30 wt % water.

A detergent composition herein typically comprises one or more surfactants, wherein the surfactant is selected from nonionic surfactants, anionic surfactants, cationic surfactants, ampholytic surfactants, zwitterionic surfactants, semipolar nonionic surfactants and mixtures thereof. In some embodiments, the surfactant is present at a level of from about 0.1% to about 60%, while in alternative embodiments the level is from about 1% to about 50%, while in still further embodiments the level is from about 5% to about 40%, by weight of the cleaning composition. A detergent will usually contain 0 wt % to about 50 wt % of an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap. In addition, a detergent composition may optionally contain 0 wt % to about 40 wt % of a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monoethanolamide, or polyhydroxy alkyl fatty acid amide (as described for example in WO92/06154, which is incorporated herein by reference).

A detergent composition herein typically comprise one or more detergent builders or builder systems. In some embodiments incorporating at least one builder, the cleaning compositions comprise at least about 1%, from about 3% to about 60% or even from about 5% to about 40% builder by weight of the cleaning composition. Builders include, but are not limited to, the alkali metal, ammonium and alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Indeed, it is contemplated that any suitable builder will find use in various embodiments of the present disclosure. Examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst). A detergent may also be unbuilt, i.e., essentially free of detergent builder.

In some embodiments, the builders form water-soluble hardness ion complexes (e.g., sequestering builders), such as citrates and polyphosphates (e.g., sodium tripolyphosphate and sodium tripolyphospate hexahydrate, potassium tripolyphosphate, and mixed sodium and potassium tripolyphosphate, etc.). It is contemplated that any suitable builder will find use in the present disclosure, including those known in the art (See e.g., EP 2 100 949).

In some embodiments, builders for use herein include phosphate builders and non-phosphate builders. In some embodiments, the builder is a phosphate builder. In some embodiments, the builder is a non-phosphate builder. If present, builders are used in a level of from 0.1% to 80%, or from 5 to 60%, or from 10 to 50% by weight of the composition. In some embodiments the product comprises a mixture of phosphate and non-phosphate builders. Suitable phosphate builders include mono-phosphates, di-phosphates, tri-polyphosphates or oligomeric-poylphosphates, including the alkali metal salts of these compounds, including the sodium salts. In some embodiments, a builder can be sodium tripolyphosphate (STPP). Additionally, the composition can comprise carbonate and/or citrate, preferably citrate that helps to achieve a neutral pH composition. Other suitable non-phosphate builders include homopolymers and copolymers of polycarboxylic acids and their partially or completely neutralized salts, monomeric polycarboxylic acids and hydroxycarboxylic acids and their salts. In some embodiments, salts of the above mentioned compounds include the ammonium and/or alkali metal salts, i.e. the lithium, sodium, and potassium salts, including sodium salts. Suitable polycarboxylic acids include acyclic, alicyclic, hetero-cyclic and aromatic carboxylic acids, wherein in some embodiments, they can contain at least two carboxyl groups which are in each case separated from one another by, in some instances, no more than two carbon atoms.

A detergent composition herein can comprise at least one chelating agent. Suitable chelating agents include, but are not limited to copper, iron and/or manganese chelating agents and mixtures thereof. In embodiments in which at least one chelating agent is used, the cleaning compositions of the present disclosure comprise from about 0.1% to about 15% or even from about 3.0% to about 10% chelating agent by weight of the subject cleaning composition.

A detergent composition herein can comprise at least one deposition aid. Suitable deposition aids include, but are not limited to, polyethylene glycol, polypropylene glycol, polycarboxylate, soil release polymers such as polytelephthalic acid, clays such as kaolinite, montmorillonite, atapulgite, illite, bentonite, halloysite, and mixtures thereof.

A detergent composition herein can comprise one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. Additional dye transfer inhibiting agents include manganese phthalocyanine, peroxidases, polyvinylpyrrolidone polymers, polyamine N-oxide polymers, copolymers of N-vinylpyrrolidone and N-vinylimidazole, polyvinyloxazolidones and polyvinylimidazoles and/or mixtures thereof; chelating agents examples of which include ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetracetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethylethylenediaminetriacetic acid (HEDTA), triethylenetetraaminehexaacetic acid (TTNA), N-hydroxyethyliminodiacetic acid (HEIDA), dihydroxyethylglycine (DHEG), ethylenediaminetetrapropionic acid (EDTP) and derivatives thereof, which can be used alone or in combination with any of the above. In embodiments in which at least one dye transfer inhibiting agent is used, the cleaning compositions of the present disclosure comprise from about 0.0001% to about 10%, from about 0.01% to about 5%, or even from about 0.1% to about 3% by weight of the cleaning composition.

A detergent composition herein can comprise silicates. In some such embodiments, sodium silicates (e.g., sodium disilicate, sodium metasilicate, and crystalline phyllosilicates) find use. In some embodiments, silicates are present at a level of from about 1% to about 20%. In some embodiments, silicates are present at a level of from about 5% to about 15% by weight of the composition.

A detergent composition herein can comprise dispersants. Suitable water-soluble organic materials include, but are not limited to the homo- or co-polymeric acids or their salts, in which the polycarboxylic acid comprises at least two carboxyl radicals separated from each other by not more than two carbon atoms.

Any cellulase disclosed above is contemplated for use in the disclosed detergent compositions. Suitable cellulases include, but are not limited to *Humicola insolens* cellulases (See e.g., U.S. Pat. No. 4,435,307). Exemplary cellulases contemplated for such use are those having color care benefit for a textile. Examples of cellulases that provide a color care benefit are disclosed in EP0495257, EP0531372, EP531315, WO96/11262, WO96/29397, WO94/07998; WO98/12307; WO95/24471, WO98/08940, and U.S. Pat. Nos. 5,457,046, 5,686,593 and 5,763,254, all of which are incorporated herein by reference. Examples of commercially available cellulases useful in a detergent include CELLUSOFT®, CELLUCLEAN®, CELLUZYME®, and CAREZYME® (Novo Nordisk A/S and Novozymes A/S); CLAZINASE®, PURADAX HA®, and REVITALENZ™ (DuPont Industrial Biosciences); BIOTOUCH® (AB Enzymes); and KAC-500(B)™ (Kao Corporation). Additional cellulases are disclosed in, e.g., U.S. Pat. Nos. 7,595,182, 8,569,033, 7,138,263, 3,844,890, 4,435,307, 4,435,307, and GB2095275.

A detergent composition herein may additionally comprise one or more other enzymes in addition to at least one cellulase. Examples of other enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase, phenoloxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, alpha-amylases, beta-amylases, galactosidases, galactanases, catalases, carageenases, hyaluronidases, keratinases, lactases, ligninases, peroxidases, phosphatases, polygalacturonases, pullulanases, rhamnogalactouronases, tannases, transglutaminases, xyloglucanases, xylosidases, metalloproteases, arabinofuranosidases, phytases, isomerases, transferases and/or amylasesin any combination.

In some embodiments, the detergent compositions can comprise one or more enzymes, each at a level from about 0.00001% to about 10% by weight of the composition and the balance of cleaning adjunct materials by weight of composition. In some other embodiments, the detergent compositions also comprise each enzyme at a level of about 0.0001% to about 10%, about 0.001% to about 5%, about 0.001% to about 2%, about 0.005% to about 0.5% enzyme by weight of the composition.

Suitable proteases include those of animal, vegetable or microbial origin. In some embodiments, microbial proteases are used. In some embodiments, chemically or genetically modified mutants are included. In some embodiments, the protease is a serine protease, preferably an alkaline microbial protease or a trypsin-like protease. Examples of alkaline proteases include subtilisins, especially those derived from *Bacillus* (e.g., *subtilisin, lentus, amyloliquefaciens, subtilisin* Carlsberg, *subtilisin* 309, *subtilisin* 147 and *subtilisin* 168). Additional examples include those mutant proteases described in U.S. Pat. Nos. RE 34,606, 5,955,340, 5,700,676, 6,312,936, and 6,482,628, all of which are incorporated herein by reference. Additional protease examples include, but are not limited to trypsin (e.g., of porcine or bovine origin), and the *Fusarium* protease described in WO 89/06270. In some embodiments, commercially available protease enzymes that find use include, but are not limited to MAXATASE®, MAXACAL™, MAXAPEM™, OPTICLEAN®, OPTIMASE®, PROPERASE®, PURAFECT®, PURAFECT® OXP, PURAMAX™, EXCELLASE™, PREFERENZ™ proteases (e.g. P100, P110, P280), EFFECTENZ™ proteases (e.g. P1000, P1050, P2000), EXCELLENZ™ proteases (e.g. P1000), ULTIMASE®, and PURAFAST™ (Genencor); ALCALASE®, SAVINASE®, PRIMASE®, DURAZYM™, POLARZYME®, OVOZYME®, KANNASE®, LIQUANASE®, NEUTRASE®, RELASE® and ESPERASE® (Novozymes); BLAP™ and BLAP™ variants (Henkel Kommanditgesellschaft auf Aktien, Duesseldorf, Germany), and KAP (*B. alkalophilus* subtilisin; Kao Corp., Tokyo, Japan). Various proteases are described in WO95/23221, WO 92/21760, WO 09/149200, WO 09/149144, WO 09/149145, WO 11/072099, WO 10/056640, WO 10/056653, WO 11/140364, WO 12/151534, U.S. Pat. Publ. No. 2008/0090747, and U.S. Pat. Nos. 5,801,039, 5,340,735, 5,500,364, 5,855,625, US RE 34,606, 5,955,340, 5,700,676, 6,312,936, 6,482,628, 8,530,219, and various other patents. In some further embodiments, neutral metalloproteases find use in the present disclosure, including but not limited to the neutral metalloproteases described in WO1999014341, WO1999033960, WO1999014342, WO1999034003, WO2007044993, WO2009058303, WO2009058661. Exemplary metalloproteases include nprE, the recombinant form of neutral metalloprotease expressed in *Bacillus subtilis* (See e.g., WO 07/044993), and PMN, the purified neutral metalloprotease from *Bacillus amyloliquefaciens*.

Suitable mannanases include, but are not limited to those of bacterial or fungal origin. Chemically or genetically modified mutants are included in some embodiments. Various mannanases are known which find use in the present disclosure (See e.g., U.S. Pat. Nos. 6,566,114, 6,602,842, and 6,440,991, all of which are incorporated herein by reference). Commercially available mannanases that find use in the present disclosure include, but are not limited to MANNASTAR®, PURABRITE™, and MANNAWAY®.

Suitable lipases include those of bacterial or fungal origin. Chemically modified, proteolytically modified, or protein engineered mutants are included. Examples of useful lipases include those from the genera *Humicola* (e.g., *H. lanuginosa*, EP258068 and EP305216; *H. insolens*, WO96/13580), *Pseudomonas* (e.g., *P. alcaligenes* or *P. pseudoalcaligenes*, EP218272; *P. cepacia*, EP331376; *P. stutzeri*, GB1372034; *P. fluorescens* and *Pseudomonas* sp. strain SD 705, WO95/06720 and WO96/27002; *P. wisconsinensis*, WO96/12012); and *Bacillus* (e.g., *B. subtilis*, Dartois et al., *Biochemica et*

*Biophysica Acta* 1131:253-360; *B. stearothermophilus*, JP64/744992; *B. pumilus*, WO91/16422). Furthermore, a number of cloned lipases find use in some embodiments, including but not limited to *Penicillium camembertii* lipase (See, Yamaguchi et al., Gene 103:61-67 [1991]), *Geotricum candidum* lipase (See, Schimada et al., J. Biochem., 106: 383-388 [1989]), and various *Rhizopus* lipases such as *R. delemar* lipase (See, Hass et al., Gene 109:117-113 [1991]), a *R. niveus* lipase (Kugimiya et al., Biosci. Biotech. Biochem. 56:716-719 [1992]) and *R. oryzae* lipase. Additional lipases useful herein include, for example, those disclosed in WO92/05249, WO94/01541, WO95/35381, WO96/00292, WO95/30744, WO94/25578, WO95/14783, WO95/22615, WO97/04079, WO97/07202, EP407225 and EP260105. Other types of lipase polypeptide enzymes such as cutinases also find use in some embodiments, including but not limited to the cutinase derived from *Pseudomonas mendocina* (See, WO 88/09367), and the cutinase derived from *Fusarium solani pisi* (See, WO 90/09446). Examples of certain commercially available lipase enzymes useful herein include M1 LIPASE™, LUMA FAST™, and LIPOMAX™ (Genencor); LIPEX®, LIPOLASE® and LIPOLASE® ULTRA (Novozymes); and LIPASE P™ "Amano" (Amano Pharmaceutical Co. Ltd., Japan).

Suitable polyesterases include, for example, those disclosed in WO01/34899, WO01/14629 and U.S. Pat. No. 6,933,140.

A detergent composition herein can also comprise 2,6-beta-D-fructan hydrolase, which is effective for removal/cleaning of certain biofilms present on household and/or industrial textiles/laundry.

Suitable amylases include, but are not limited to those of bacterial or fungal origin. Chemically or genetically modified mutants are included in some embodiments. Amylases that find use in the present disclosure, include, but are not limited to α-amylases obtained from *B. licheniformis* (See e.g., GB 1,296,839). Additional suitable amylases include those found in WO9510603, WO9526397, WO9623874, WO9623873, WO9741213, WO9919467, WO0060060, WO0029560, WO9923211, WO9946399, WO0060058, WO0060059, WO9942567, WO0114532, WO02092797, WO0166712, WO0188107, WO0196537, WO0210355, WO9402597, WO0231124, WO9943793, WO9943794, WO2004113551, WO2005001064, WO2005003311, WO0164852, WO2006063594, WO2006066594, WO2006066596, WO2006012899, WO2008092919, WO2008000825, WO2005018336, WO2005066338, WO2009140504, WO2005019443, WO2010091221, WO2010088447, WO0134784, WO2006012902, WO2006031554, WO2006136161, WO2008101894, WO2010059413, WO2011098531, WO2011080352, WO2011080353, WO2011080354, WO2011082425, WO2011082429, WO2011076123, WO2011087836, WO2011076897, WO94183314, WO9535382, WO9909183, WO9826078, WO9902702, WO9743424, WO9929876, WO9100353, WO9605295, WO9630481, WO9710342, WO2008088493, WO2009149419, WO2009061381, WO2009100102, WO2010104675, WO2010117511, and WO2010115021.

Suitable amylases include, for example, commercially available amylases such as STAINZYME®, STAINZYME PLUS®, NATALASE®, DURAMYL®, TERMAMYL®, TERMAMYL ULTRA®, FUNGAMYL® and BAN™ (Novo Nordisk A/S and Novozymes A/S); RAPIDASE®, POWERASE®, PURASTAR® and PREFERENZ™ (DuPont Industrial Biosciences).

Suitable peroxidases/oxidases contemplated for use in the compositions include those of plant, bacterial or fungal origin. Chemically modified or protein engineered mutants are included. Examples of peroxidases useful herein include those from the genus *Coprinus* (e.g., *C. cinereus*, WO93/24618, WO95/10602, and WO98/15257), as well as those referenced in WO 2005056782, WO2007106293, WO2008063400, WO2008106214, and WO2008106215. Commercially available peroxidases useful herein include, for example, GUARDZYME™ (Novo Nordisk A/S and Novozymes A/S).

In some embodiments, peroxidases are used in combination with hydrogen peroxide or a source thereof (e.g., a percarbonate, perborate or persulfate) in the compositions of the present disclosure. In some alternative embodiments, oxidases are used in combination with oxygen. Both types of enzymes are used for "solution bleaching" (i.e., to prevent transfer of a textile dye from a dyed fabric to another fabric when the fabrics are washed together in a wash liquor), preferably together with an enhancing agent (See e.g., WO 94/12621 and WO 95/01426). Suitable peroxidases/oxidases include, but are not limited to those of plant, bacterial or fungal origin. Chemically or genetically modified mutants are included in some embodiments.

Enzymes that may be comprised in a detergent composition herein may be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition herein may contain about 1 wt % to about 65 wt % of a detergent builder or complexing agent such as zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst). A detergent may also be unbuilt, i.e., essentially free of detergent builder.

A detergent composition in certain embodiments may comprise one or more other types of polymers in addition to the present α-glucan oligomers/polymers and/or the present α-glucan ether compounds. Examples of other types of polymers useful herein include carboxymethyl cellulose (CMC), poly(vinylpyrrolidone) (PVP), polyethylene glycol (PEG), poly(vinyl alcohol) (PVA), polycarboxylates such as polyacrylates, maleic/acrylic acid copolymers and lauryl methacrylate/acrylic acid copolymers.

A detergent composition herein may contain a bleaching system. For example, a bleaching system can comprise an $H_2O_2$ source such as perborate or percarbonate, which may be combined with a peracid-forming bleach activator such as tetraacetylethylenediamine (TAED) or nonanoyloxybenzenesulfonate (NOBS). Alternatively, a bleaching system may comprise peroxyacids (e.g., amide, imide, or sulfone type peroxyacids). Alternatively still, a bleaching system can be an enzymatic bleaching system comprising perhydrolase, for example, such as the system described in WO2005/056783.

A detergent composition herein may also contain conventional detergent ingredients such as fabric conditioners, clays, foam boosters, suds suppressors, anti-corrosion agents, soil-suspending agents, anti-soil redeposition agents, dyes, bactericides, tarnish inhibitors, optical brighteners, or perfumes. The pH of a detergent composition herein (measured in aqueous solution at use concentration) is usually neutral or alkaline (e.g., pH of about 7.0 to about 11.0).

Particular forms of detergent compositions that can be adapted for purposes disclosed herein are disclosed in, for example, US20090209445A1, US20100081598A1, U.S.

Pat. No. 7,001,878B2, EP1504994B1, WO2001085888A2, WO2003089562A1, WO2009098659A1, WO2009098660A1, WO2009112992A1, WO2009124160A1, WO2009152031A1, WO2010059483A1, WO2010088112A1, WO2010090915A1, WO2010135238A1, WO2011094687A1, WO2011094690A1, WO2011127102A1, WO2011163428A1, WO2008000567A1, WO2006045391A1, WO2006007911A1, WO2012027404A1, EP1740690B1, WO2012059336A1, U.S. Pat. No. 6,730,646B1, WO2008087426A1, WO2010116139A1, and WO2012104613A1, all of which are incorporated herein by reference.

Laundry detergent compositions herein can optionally be heavy duty (all purpose) laundry detergent compositions. Exemplary heavy duty laundry detergent compositions comprise a detersive surfactant (10%-40% wt/wt), including an anionic detersive surfactant (selected from a group of linear or branched or random chain, substituted or unsubstituted alkyl sulphates, alkyl sulphonates, alkyl alkoxylated sulphate, alkyl phosphates, alkyl phosphonates, alkyl carboxylates, and/or mixtures thereof), and optionally non-ionic surfactant (selected from a group of linear or branched or random chain, substituted or unsubstituted alkyl alkoxylated alcohol, e.g., C8-C18 alkyl ethoxylated alcohols and/or C6-C12 alkyl phenol alkoxylates), where the weight ratio of anionic detersive surfactant (with a hydrophilic index (HIc) of from 6.0 to 9) to non-ionic detersive surfactant is greater than 1:1. Suitable detersive surfactants also include cationic detersive surfactants (selected from a group of alkyl pyridinium compounds, alkyl quaternary ammonium compounds, alkyl quaternary phosphonium compounds, alkyl ternary sulphonium compounds, and/or mixtures thereof); zwitterionic and/or amphoteric detersive surfactants (selected from a group of alkanolamine sulpho-betaines); ampholytic surfactants; semi-polar non-ionic surfactants and mixtures thereof.

A detergent herein such as a heavy duty laundry detergent composition may optionally include, a surfactancy boosting polymer consisting of amphiphilic alkoxylated grease cleaning polymers (selected from a group of alkoxylated polymers having branched hydrophilic and hydrophobic properties, such as alkoxylated polyalkylenimines in the range of 0.05 wt %-10 wt %) and/or random graft polymers (typically comprising of hydrophilic backbone comprising monomers selected from the group consisting of: unsaturated C1-C6 carboxylic acids, ethers, alcohols, aldehydes, ketones, esters, sugar units, alkoxy units, maleic anhydride, saturated polyalcohols such as glycerol, and mixtures thereof; and hydrophobic side chain(s) selected from the group consisting of: C4-C25 alkyl group, polypropylene, polybutylene, vinyl ester of a saturated C1-C6 mono-carboxylic acid, C1-C6 alkyl ester of acrylic or methacrylic acid, and mixtures thereof.

A detergent herein such as a heavy duty laundry detergent composition may optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and copolymers thereof in random or block configuration, for example REPEL-O-TEX SF, SF-2 AND SRP6, TEXCARE SRA100, SRA300, SRN100, SRN170, SRN240, SRN300 AND SRN325, MARLOQUEST SL), anti-redeposition polymers (0.1 wt % to 10 wt %), include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Da); and polymeric carboxylate (such as maleate/acrylate random copolymer or polyacrylate homopolymer).

A detergent herein such as a heavy duty laundry detergent composition may optionally further include saturated or unsaturated fatty acids, preferably saturated or unsaturated C12-C24 fatty acids (0 wt % to 10 wt %); deposition aids in addition to the α-glucan ether compound disclosed herein (examples for which include polysaccharides, cellulosic polymers, poly diallyl dimethyl ammonium halides (DADMAC), and copolymers of DAD MAC with vinyl pyrrolidone, acrylamides, imidazoles, imidazolinium halides, and mixtures thereof, in random or block configuration, cationic guar gum, cationic starch, cationic polyacylamides, and mixtures thereof.

A detergent herein such as a heavy duty laundry detergent composition may optionally further include dye transfer inhibiting agents, examples of which include manganese phthalocyanine, peroxidases, polyvinylpyrrolidone polymers, polyamine N-oxide polymers, copolymers of N-vinylpyrrolidone and N-vinylimidazole, polyvinyloxazolidones and polyvinylimidazoles and/or mixtures thereof; chelating agents, examples of which include ethylene-diamine-tetraacetic acid (EDTA), diethylene triamine penta methylene phosphonic acid (DTPMP), hydroxy-ethane diphosphonic acid (HEDP), ethylenediamine N,N'-disuccinic acid (EDDS), methyl glycine diacetic acid (MGDA), diethylene triamine penta acetic acid (DTPA), propylene diamine tetracetic acid (PDTA), 2-hydroxypyridine-N-oxide (HPNO), or methyl glycine diacetic acid (MGDA), glutamic acid N,N-diacetic acid (N,N-dicarboxymethyl glutamic acid tetrasodium salt (GLDA), nitrilotriacetic acid (NTA), 4,5-dihydroxy-m-benzenedisulfonic acid, citric acid and any salts thereof, N-hydroxyethylethylenediaminetriacetic acid (HEDTA), triethylenetetraaminehexaacetic acid (TTNA), N-hydroxyethyliminodiacetic acid (HEIDA), dihydroxyethylglycine (DHEG), ethylenediaminetetrapropionic acid (EDTP), and derivatives thereof.

A detergent herein such as a heavy duty laundry detergent composition may optionally include silicone or fatty-acid based suds suppressors; hueing dyes, calcium and magnesium cations, visual signaling ingredients, anti-foam (0.001 wt % to about 4.0 wt %), and/or a structurant/thickener (0.01 wt % to 5 wt %) selected from the group consisting of diglycerides and triglycerides, ethylene glycol distearate, microcrystalline cellulose, microfiber cellulose, biopolymers, xanthan gum, gellan gum, and mixtures thereof). Such structurant/thickener would be in addition to the one or more of the present α-glucan oligomers/polymers and/or α-glucan ether compounds comprised in the detergent.

A detergent herein can be in the form of a heavy duty dry/solid laundry detergent composition, for example. Such a detergent may include: (i) a detersive surfactant, such as any anionic detersive surfactant disclosed herein, any non-ionic detersive surfactant disclosed herein, any cationic detersive surfactant disclosed herein, any zwitterionic and/or amphoteric detersive surfactant disclosed herein, any ampholytic surfactant, any semi-polar non-ionic surfactant, and mixtures thereof; (ii) a builder, such as any phosphate-free builder (e.g., zeolite builders in the range of 0 wt % to less than 10 wt %), any phosphate builder (e.g., sodium tri-polyphosphate in the range of 0 wt % to less than 10 wt %), citric acid, citrate salts and nitrilotriacetic acid, any silicate salt (e.g., sodium or potassium silicate or sodium meta-silicate in the range of 0 wt % to less than 10 wt %); any carbonate salt (e.g., sodium carbonate and/or sodium bicarbonate in the range of 0 wt % to less than 80 wt %), and mixtures thereof; (iii) a bleaching agent, such as any photobleach (e.g., sulfonated zinc phthalocyanines, sulfonated aluminum phthalocyanines, xanthenes dyes, and mixtures thereof), any hydrophobic or hydrophilic bleach activator (e.g., dodecanoyl oxybenzene sulfonate, decanoyl oxybenzene sulfonate, decanoyl oxybenzoic acid or salts thereof, 3,5,5-trimethy hexanoyl oxybenzene sulfonate, tetraacetyl ethylene diamine-TAED, nonanoyloxybenzene sulfonate-NOBS, nitrile quats, and mixtures thereof), any source of hydrogen peroxide (e.g., inorganic perhydrate salts, examples of which include mono or tetra hydrate sodium salt of perborate, percarbonate, persulfate, perphosphate, or persilicate), any preformed hydrophilic and/or hydrophobic peracids (e.g., percarboxylic acids and salts, percarbonic acids and salts, perimidic acids and salts, peroxymonosulfuric acids and salts, and mixtures thereof); and/or (iv) any other components such as a bleach catalyst (e.g., imine bleach boosters examples of which include iminium cations and polyions, iminium zwitterions, modified amines, modified amine oxides, N-sulphonyl imines, N-phosphonyl imines, N-acyl imines, thiadiazole dioxides, perfluoroimines, cyclic sugar ketones, and mixtures thereof), and a metal-containing bleach catalyst (e.g., copper, iron, titanium, ruthenium, tungsten, molybdenum, or manganese cations along with an auxiliary metal cations such as zinc or aluminum and a sequestrate such as EDTA, ethylenediaminetetra(methylenephosphonic acid).

Compositions disclosed herein can be in the form of a dishwashing detergent composition. Examples of dishwashing detergents include automatic dishwashing detergents (typically used in dishwasher machines) and hand-washing dish detergents. A dishwashing detergent composition can be in any dry or liquid/aqueous form as disclosed herein, for example. Components that may be included in certain embodiments of a dishwashing detergent composition include, for example, one or more of a phosphate; oxygen- or chlorine-based bleaching agent; non-ionic surfactant; alkaline salt (e.g., metasilicates, alkali metal hydroxides, sodium carbonate); any active enzyme disclosed herein; anti-corrosion agent (e.g., sodium silicate); anti-foaming agent; additives to slow down the removal of glaze and patterns from ceramics; perfume; anti-caking agent (in granular detergent); starch (in tablet-based detergents); gelling agent (in liquid/gel based detergents); and/or sand (powdered detergents).

Dishwashing detergents such as an automatic dishwasher detergent or liquid dishwashing detergent can comprise (i) a non-ionic surfactant, including any ethoxylated non-ionic surfactant, alcohol alkoxylated surfactant, epoxy-capped poly(oxyalkylated) alcohol, or amine oxide surfactant present in an amount from 0 to 10 wt %; (ii) a builder, in the range of about 5-60 wt %, including any phosphate builder (e.g., mono-phosphates, di-phosphates, tri-polyphosphates, other oligomeric-polyphosphates, sodium tripolyphosphate-STPP), any phosphate-free builder (e.g., amino acid-based compounds including methyl-glycine-diacetic acid [MGDA] and salts or derivatives thereof, glutamic-N,N-diacetic acid [GLDA] and salts or derivatives thereof, iminodisuccinic acid (IDS) and salts or derivatives thereof, carboxy methyl inulin and salts or derivatives thereof, nitrilotriacetic acid [NTA], diethylene triamine penta acetic acid [DTPA], B-alaninediacetic acid [B-ADA] and salts thereof), homopolymers and copolymers of poly-carboxylic acids and partially or completely neutralized salts thereof, monomeric polycarboxylic acids and hydroxycarboxylic acids and salts thereof in the range of 0.5 wt % to 50 wt %, or sulfonated/carboxylated polymers in the range of about 0.1 wt % to about 50 wt %; (iii) a drying aid in the range of about 0.1 wt % to about 10 wt % (e.g., polyesters, especially anionic polyesters, optionally together with further monomers with 3 to 6 functionalities—typically acid, alcohol or ester functionalities which are conducive to polycondensation, polycarbonate-, polyurethane- and/or polyurea-polyorganosiloxane compounds or precursor compounds thereof, particularly of the reactive cyclic carbonate and urea type); (iv) a silicate in the range from about 1 wt % to about 20 wt % (e.g., sodium or potassium silicates such as sodium disilicate, sodium meta-silicate and crystalline phyllosilicates); (v) an inorganic bleach (e.g., perhydrate salts such as perborate, percarbonate, perphosphate, persulfate and persilicate salts) and/or an organic bleach (e.g., organic peroxyacids such as diacyl- and tetraacylperoxides, especially diperoxydodecanedioic acid, diperoxytetradecanedioic acid, and diperoxyhexadecanedioic acid); (vi) a bleach activator (e.g., organic peracid precursors in the range from about 0.1 wt % to about 10 wt %) and/or bleach catalyst (e.g., manganese triazacyclononane and related complexes; Co, Cu, Mn, and Fe bispyridylamine and related complexes; and pentamine acetate cobalt(III) and related complexes); (vii) a metal care agent in the range from about 0.1 wt % to 5 wt % (e.g., benzatriazoles, metal salts and complexes, and/or silicates); and/or (viii) any active enzyme disclosed herein in the range from about 0.01 to 5.0 mg of active enzyme per gram of automatic dishwashing detergent composition, and an enzyme stabilizer component (e.g., oligosaccharides, polysaccharides, and inorganic divalent metal salts).

Various examples of detergent formulations comprising at least one α-glucan ether compound (e.g., a carboxyalkyl α-glucan ether such as carboxymethyl α-glucan) are disclosed below (1-19):

1) A detergent composition formulated as a granulate having a bulk density of at least 600 g/L comprising: linear alkylbenzenesulfonate (calculated as acid) at about 7-12 wt %; alcohol ethoxysulfate (e.g., C12-18 alcohol, 1-2 ethylene oxide [EO]) or alkyl sulfate (e.g., C16-18) at about 1-4 wt %; alcohol ethoxylate (e.g., C14-15 alcohol) at about 5-9 wt %; sodium carbonate at about 14-20 wt %; soluble silicate (e.g., $Na_2O\ 2SiO_2$) at about 2-6 wt %; zeolite (e.g., $NaAlSiO_4$) at about 15-22 wt %; sodium sulfate at about 0-6 wt %; sodium citrate/citric acid at about 0-15 wt %; sodium perborate at about 11-18 wt %; TAED at about 2-6 wt %; α-glucan ether up to about 2 wt %; other polymers (e.g., maleic/acrylic acid copolymer, PVP, PEG) at about 0-3 wt %; optionally an enzyme(s) (calculated as pure enzyme protein) at about 0.0001-0.1 wt %; and minor ingredients (e.g., suds suppressors, perfumes, optical brightener, photobleach) at about 0-5 wt %.

2) A detergent composition formulated as a granulate having a bulk density of at least 600 g/L comprising: linear alkylbenzenesulfonate (calculated as acid) at about 6-11 wt %; alcohol ethoxysulfate (e.g., C12-18 alcohol, 1-2 EO) or alkyl sulfate (e.g., C16-18) at about 1-3 wt %; alcohol ethoxylate (e.g., C14-15 alcohol) at about 5-9 wt %; sodium carbonate at about 15-21 wt %; soluble silicate (e.g., $Na_2O\ 2SiO_2$) at about 1-4 wt %; zeolite (e.g., $NaAlSiO_4$) at about 24-34 wt %; sodium sulfate at about 4-10 wt %; sodium citrate/citric acid at about 0-15 wt %; sodium perborate at about 11-18 wt %; TAED at about 2-6 wt %; α-glucan ether up to about 2 wt %; other polymers (e.g., maleic/acrylic acid copolymer, PVP, PEG) at about 1-6 wt %; optionally an enzyme(s) (calculated as pure enzyme protein) at about 0.0001-0.1 wt %; and minor ingredients (e.g., suds suppressors, perfumes, optical brightener, photobleach) at about 0-5 wt %.

3) A detergent composition formulated as a granulate having a bulk density of at least 600 g/L comprising: linear alkylbenzenesulfonate (calculated as acid) at about 5-9 wt %; alcohol ethoxysulfate (e.g., C12-18 alcohol, 7 EO) at about 7-14 wt %; soap as fatty acid (e.g., C16-22 fatty acid) at about 1-3 wt %; sodium carbonate at about 10-17 wt %; soluble silicate (e.g., $Na_2O$ $2SiO_2$) at about 3-9 wt %; zeolite (e.g., $NaAlSiO_4$) at about 23-33 wt %; sodium sulfate at about 0-4 wt %; sodium perborate at about 8-16 wt %; TAED at about 2-8 wt %; phosphonate (e.g., EDTMPA) at about 0-1 wt %; α-glucan ether up to about 2 wt %; other polymers (e.g., maleic/acrylic acid copolymer, PVP, PEG) at about 0-3 wt %; optionally an enzyme(s) (calculated as pure enzyme protein) at about 0.0001-0.1 wt %; and minor ingredients (e.g., suds suppressors, perfumes, optical brightener) at about 0-5 wt %.

4) A detergent composition formulated as a granulate having a bulk density of at least 600 g/L comprising: linear alkylbenzenesulfonate (calculated as acid) at about 8-12 wt %; alcohol ethoxylate (e.g., C12-18 alcohol, 7 EO) at about 10-25 wt %; sodium carbonate at about 14-22 wt %; soluble silicate (e.g., $Na_2O$ $2SiO_2$) at about 1-5 wt %; zeolite (e.g., $NaAlSiO_4$) at about 25-35 wt %; sodium sulfate at about 0-10 wt %; sodium perborate at about 8-16 wt %; TAED at about 2-8 wt %; phosphonate (e.g., EDTMPA) at about 0-1 wt %; α-glucan ether up to about 2 wt %; other polymers (e.g., maleic/acrylic acid copolymer, PVP, PEG) at about 1-3 wt %; optionally an enzyme(s) (calculated as pure enzyme protein) at about 0.0001-0.1 wt %; and minor ingredients (e.g., suds suppressors, perfumes) at about 0-5 wt %.

5) An aqueous liquid detergent composition comprising: linear alkylbenzenesulfonate (calculated as acid) at about 15-21 wt %; alcohol ethoxylate (e.g., C12-18 alcohol, 7 EO; or C12-15 alcohol, 5 EO) at about 12-18 wt %; soap as fatty acid (e.g., oleic acid) at about 3-13 wt %; alkenylsuccinic acid (C12-14) at about 0-13 wt %; aminoethanol at about 8-18 wt %; citric acid at about 2-8 wt %; phosphonate at about 0-3 wt %; α-glucan ether up to about 2 wt %; other polymers (e.g., PVP, PEG) at about 0-3 wt %; borate at about 0-2 wt %; ethanol at about 0-3 wt %; propylene glycol at about 8-14 wt %; optionally an enzyme(s) (calculated as pure enzyme protein) at about 0.0001-0.1 wt %; and minor ingredients (e.g., dispersants, suds suppressors, perfume, optical brightener) at about 0-5 wt %.

6) An aqueous structured liquid detergent composition comprising: linear alkylbenzenesulfonate (calculated as acid) at about 15-21 wt %; alcohol ethoxylate (e.g., C12-18 alcohol, 7 EO; or C12-15 alcohol, 5 EO) at about 3-9 wt %; soap as fatty acid (e.g., oleic acid) at about 3-10 wt %; zeolite (e.g., $NaAlSiO_4$) at about 14-22 wt %; potassium citrate about 9-18 wt %; borate at about 0-2 wt %; α-glucan ether up to about 2 wt %; other polymers (e.g., PVP, PEG) at about 0-3 wt %; ethanol at about 0-3 wt %; anchoring polymers (e.g., lauryl methacrylate/acrylic acid copolymer, molar ratio 25:1, MW 3800) at about 0-3 wt %; glycerol at about 0-5 wt %; optionally an enzyme(s) (calculated as pure enzyme protein) at about 0.0001-0.1 wt %; and minor ingredients (e.g., dispersants, suds suppressors, perfume, optical brightener) at about 0-5 wt %.

7) A detergent composition formulated as a granulate having a bulk density of at least 600 g/L comprising: fatty alcohol sulfate at about 5-10 wt %, ethoxylated fatty acid monoethanolamide at about 3-9 wt %; soap as fatty acid at about 0-3 wt %; sodium carbonate at about 5-10 wt %; soluble silicate (e.g., $Na_2O$ $2SiO_2$) at about 1-4 wt %; zeolite (e.g., $NaAlSiO_4$) at about 20-40 wt %; sodium sulfate at about 2-8 wt %; sodium perborate at about 12-18 wt %; TAED at about 2-7 wt %; α-glucan ether up to about 2 wt %; other polymers (e.g., maleic/acrylic acid copolymer, PEG) at about 1-5 wt %; optionally an enzyme(s) (calculated as pure enzyme protein) at about 0.0001-0.1 wt %; and minor ingredients (e.g., optical brightener, suds suppressors, perfumes) at about 0-5 wt %.

8) A detergent composition formulated as a granulate comprising: linear alkylbenzenesulfonate (calculated as acid) at about 8-14 wt %; ethoxylated fatty acid monoethanolamide at about 5-11 wt %; soap as fatty acid at about 0-3 wt %; sodium carbonate at about 4-10 wt %; soluble silicate (e.g., $Na_2O$ $2SiO_2$) at about 1-4 wt %; zeolite (e.g., $NaAlSiO_4$) at about 30-50 wt %; sodium sulfate at about 3-11 wt %; sodium citrate at about 5-12 wt %; α-glucan ether up to about 2 wt %; other polymers (e.g., PVP, maleic/acrylic acid copolymer, PEG) at about 1-5 wt %; optionally an enzyme(s) (calculated as pure enzyme protein) at about 0.0001-0.1 wt %; and minor ingredients (e.g., suds suppressors, perfumes) at about 0-5 wt %.

9) A detergent composition formulated as a granulate comprising: linear alkylbenzenesulfonate (calculated as acid) at about 6-12 wt %; nonionic surfactant at about 1-4 wt %; soap as fatty acid at about 2-6 wt %; sodium carbonate at about 14-22 wt %; zeolite (e.g., $NaAlSiO_4$) at about 18-32 wt %; sodium sulfate at about 5-20 wt %; sodium citrate at about 3-8 wt %; sodium perborate at about 4-9 wt %; bleach activator (e.g., NOBS or TAED) at about 1-5 wt %; α-glucan ether up to about 2 wt %; other polymers (e.g., polycarboxylate or PEG) at about 1-5 wt %; optionally an enzyme(s) (calculated as pure enzyme protein) at about 0.0001-0.1 wt %; and minor ingredients (e.g., optical brightener, perfume) at about 0-5 wt %.

10) An aqueous liquid detergent composition comprising: linear alkylbenzenesulfonate (calculated as acid) at about 15-23 wt %; alcohol ethoxysulfate (e.g., C12-15 alcohol, 2-3 EO) at about 8-15 wt %; alcohol ethoxylate (e.g., C12-15 alcohol, 7 EO; or C12-15 alcohol, 5 EO) at about 3-9 wt %; soap as fatty acid (e.g., lauric acid) at about 0-3 wt %; aminoethanol at about 1-5 wt %; sodium citrate at about 5-10 wt %; hydrotrope (e.g., sodium toluenesulfonate) at about 2-6 wt %; borate at about 0-2 wt %; α-glucan ether up to about 1 wt %; ethanol at about 1-3 wt %; propylene glycol at about 2-5 wt %; optionally an enzyme(s) (calculated as pure enzyme protein) at about 0.0001-0.1 wt %; and minor ingredients (e.g., dispersants, perfume, optical brighteners) at about 0-5 wt %.

11) An aqueous liquid detergent composition comprising: linear alkylbenzenesulfonate (calculated as acid) at about 20-32 wt %; alcohol ethoxylate (e.g., C12-15 alcohol, 7 EO; or C12-15 alcohol, 5 EO) at about 6-12 wt %; aminoethanol at about 2-6 wt %; citric acid at about 8-14 wt %; borate at about 1-3 wt %; α-glucan ether up to about 2 wt %; ethanol at about 1-3 wt %; propylene glycol at about 2-5 wt %; other polymers (e.g., maleic/acrylic acid copolymer, anchoring polymer such as lauryl methacrylate/acrylic acid copolymer) at about 0-3 wt %; glycerol at about 3-8 wt %; optionally an enzyme(s) (calculated as pure enzyme protein) at about 0.0001-0.1 wt %; and minor ingredients (e.g., hydrotropes, dispersants, perfume, optical brighteners) at about 0-5 wt %.

12) A detergent composition formulated as a granulate having a bulk density of at least 600 g/L comprising: anionic surfactant (e.g., linear alkylbenzenesulfonate, alkyl sulfate, alpha-olefinsulfonate, alpha-sulfo fatty acid methyl esters, alkanesulfonates, soap) at about 25-40 wt %; nonionic surfactant (e.g., alcohol ethoxylate) at about 1-10 wt %; sodium carbonate at about 8-25 wt %; soluble silicate (e.g., $Na_2O$ $2SiO_2$) at about 5-15 wt %; sodium sulfate at about 0-5 wt %; zeolite ($NaAlSiO_4$) at about 15-28 wt %; sodium perborate at about 0-20 wt %; bleach activator (e.g., TAED or NOBS) at about 0-5 wt %; α-glucan ether up to about 2 wt %; optionally an enzyme(s) (calculated as pure enzyme protein) at about 0.0001-0.1 wt %; and minor ingredients (e.g., perfume, optical brighteners) at about 0-3 wt %.

13) Detergent compositions as described in (1)-(12) above, but in which all or part of the linear alkylbenzenesulfonate is replaced by C12-C18 alkyl sulfate.

14) A detergent composition formulated as a granulate having a bulk density of at least 600 g/L comprising: C12-C18 alkyl sulfate at about 9-15 wt %; alcohol ethoxylate at about 3-6 wt %; polyhydroxy alkyl fatty acid amide at about 1-5 wt %; zeolite (e.g., $NaAlSiO_4$) at about 10-20 wt %; layered disilicate (e.g., SK56 from Hoechst) at about 10-20 wt %; sodium carbonate at about 3-12 wt %; soluble silicate (e.g., $Na_2O$ $2SiO_2$) at 0-6 wt %; sodium citrate at about 4-8 wt %; sodium percarbonate at about 13-22 wt %; TAED at about 3-8 wt %; α-glucan ether up to about 2 wt %; other polymers (e.g., polycarboxylates and PVP) at about 0-5 wt %; optionally an enzyme(s) (calculated as pure enzyme protein) at about 0.0001-0.1 wt %; and minor ingredients (e.g., optical brightener, photobleach, perfume, suds suppressors) at about 0-5 wt %.

15) A detergent composition formulated as a granulate having a bulk density of at least 600 g/L comprising: C12-C18 alkyl sulfate at about 4-8 wt %; alcohol ethoxylate at about 11-15 wt %; soap at about 1-4 wt %; zeolite MAP or zeolite A at about 35-45 wt %; sodium carbonate at about 2-8 wt %; soluble silicate (e.g., $Na_2O$ $2SiO_2$) at 0-4 wt %; sodium percarbonate at about 13-22 wt %; TAED at about 1-8 wt %; α-glucan ether up to about 3 wt %; other polymers (e.g., polycarboxylates and PVP) at about 0-3 wt %; optionally an enzyme(s) (calculated as pure enzyme protein) at about 0.0001-0.1 wt %; and minor ingredients (e.g., optical brightener, phosphonate, perfume) at about 0-3 wt %.

16) Detergent formulations as described in (1)-(15) above, but that contain a stabilized or encapsulated peracid, either as an additional component or as a substitute for an already specified bleach system(s).

17) Detergent compositions as described in (1), (3), (7), (9) and (12) above, but in which perborate is replaced by percarbonate.

18) Detergent compositions as described in (1), (3), (7), (9), (12), (14) and (15) above, but that additionally contain a manganese catalyst. A manganese catalyst, for example, is one of the compounds described by Hage et al. (1994, *Nature* 369:637-639), which is incorporated herein by reference.

19) Detergent compositions formulated as a non-aqueous detergent liquid comprising a liquid non-ionic surfactant (e.g., a linear alkoxylated primary alcohol), a builder system (e.g., phosphate), α-glucan ether, optionally an enzyme(s), and alkali. The detergent may also comprise an anionic surfactant and/or bleach system.

In another embodiment, the present α-glucan oligomers/polymers (non-derivatized) may be partially or completely substituted for the α-glucan ether component in any of the above exemplary formulations.

It is believed that numerous commercially available detergent formulations can be adapted to include a poly alpha-1,3-1,6-glucan ether compound. Examples include PUREX® ULTRAPACKS (Henkel), FINISH® QUANTUM (Reckitt Benckiser), CLOROX™ 2 PACKS (Clorox), OXICLEAN MAX FORCE POWER PAKS (Church & Dwight), TIDE® STAIN RELEASE, CASCADE® ACTIONPACS, and TIDE® PODS™ (Procter & Gamble).

In a further embodiment to any of the above embodiments, a personal care composition, a fabric care composition or a laundry care composition is provided comprising the glucan ether composition described in any of the preceding embodiments.

The present α-glucan oligomer/polymer composition and/or the present α-glucan ether composition may be applied as a surface substantive treatment to a fabric, yarn or fiber. In yet a further embodiment, a fabric, yarn or fiber is provided comprising the present α-glucan oligomer/polymer composition, the present α-glucan ether composition, or a combination thereof.

The α-glucan ether compound disclosed herein may be used to alter viscosity of an aqueous composition. The α-glucan ether compound herein can have a relatively low DoS and still be an effective viscosity modifier. It is believed that the viscosity modification effect of the disclosed α-glucan ether compounds may be coupled with a rheology modification effect. It is further believed that, by contacting a hydrocolloid or aqueous solution herein with a surface (e.g., fabric surface), one or more α-glucan ether compounds and/or the present α-glucan oligomer/polymer composition, the compounds will adsorb to the surface.

In another embodiment, a method for preparing an aqueous composition, the method is provided comprising: contacting an aqueous composition with the present α-glucan ether compound wherein the aqueous composition comprises a cellulase, a protease or a combination thereof.

In another embodiment, a method to produce a glucan ether composition is provided comprising:

a. Providing an α-glucan oligomer/polymer composition comprising:
   i. 10% to 30% α-(1,3) glycosidic linkages;
   ii. 65% to 87% α-(1,6) glycosidic linkages;
   iii. less than 5% α-(1,3,6) glycosidic linkages;
   iv. a weight average molecular weight (Mw) of less than 5000 Daltons;
   v. a viscosity of less than 0.25 Pascal second (Pa·s) at 12 wt % in water 20° C.;
   vi. a solubility of at least 20% (w/w) in pH 7 water at 25° C.; and
   vii. a polydispersity index (PDI) of less than 5; and
b. contacting the α-glucan oligomer/polymer composition of (a) in a reaction under alkaline conditions with at least one etherification agent comprising an organic group; whereby an α-glucan ether is produced has a degree of substitution (DoS) with at least one organic group of about 0.05 to about 3.0; and
c. optionally isolating the α-glucan ether produced in step (b).

In another embodiment, a method of treating an article of clothing, textile or fabric is provided comprising:

a. providing a composition selected from
   i. a fabric care composition as described above;
   ii. a laundry care composition as described above;
   iii. an α-glucan ether composition as described above;
   iv. an α-glucan oligomer/polymer composition comprising:
      1. 10% to 30% α-(1,3) glycosidic linkages;
      2. 65% to 87% α-(1,6) glycosidic linkages;
      3. less than 5% α-(1,3,6) glycosidic linkages;

4. a weight average molecular weight (Mw) of less than 5000 Daltons;
5. a viscosity of less than 0.25 Pascal second (Pa·s) at 12 wt % in water 20° C.;
6. a solubility of at least 20% (w/w) in pH 7 water at 25° C.; and
7. a polydispersity index (PDI) of less than 5; and v. any combination of (i) through (iv).

b. contacting under suitable conditions the composition of (a) with a fabric, textile or article of clothing whereby the fabric, textile or article of clothing is treated and receives a benefit;

c. optionally rinsing the treated fabric or article of clothing of (b).

In a preferred embodiment of the above method, the composition of (a) is cellulase resistant, protease resistant or a combination thereof.

In another embodiment to the above method, the α-glucan oligomer/polymer composition and/or the α-glucan ether composition is a surface substantive.

In another embodiment to any of the above methods, the benefit is selected from the group consisting of improved fabric hand, improved resistance to soil deposition, improved colorfastness, improved wear resistance, improved wrinkle resistance, improved antifungal activity, improved stain resistance, improved cleaning performance when laundered, improved drying rates, improved dye, pigment or lake update, and any combination thereof.

A fabric herein can comprise natural fibers, synthetic fibers, semi-synthetic fibers, or any combination thereof. A semi-synthetic fiber herein is produced using naturally occurring material that has been chemically derivatized, an example of which is rayon. Non-limiting examples of fabric types herein include fabrics made of (i) cellulosic fibers such as cotton (e.g., broadcloth, canvas, chambray, chenille, chintz, corduroy, cretonne, damask, denim, flannel, gingham, jacquard, knit, matelassé, oxford, percale, poplin, plissé, sateen, seersucker, sheers, terry cloth, twill, velvet), rayon (e.g., viscose, modal, lyocell), linen, and Tencel®; (ii) proteinaceous fibers such as silk, wool and related mammalian fibers; (iii) synthetic fibers such as polyester, acrylic, nylon, and the like; (iv) long vegetable fibers from jute, flax, ramie, coir, kapok, sisal, henequen, abaca, hemp and sunn; and (v) any combination of a fabric of (i)-(iv). Fabric comprising a combination of fiber types (e.g., natural and synthetic) include those with both a cotton fiber and polyester, for example. Materials/articles containing one or more fabrics herein include, for example, clothing, curtains, drapes, upholstery, carpeting, bed linens, bath linens, tablecloths, sleeping bags, tents, car interiors, etc. Other materials comprising natural and/or synthetic fibers include, for example, non-woven fabrics, paddings, paper, and foams.

An aqueous composition that is contacted with a fabric can be, for example, a fabric care composition (e.g., laundry detergent, fabric softener or other fabric treatment composition). Thus, a treatment method in certain embodiments can be considered a fabric care method or laundry method if employing a fabric care composition therein. A fabric care composition herein can effect one or more of the following fabric care benefits: improved fabric hand, improved resistance to soil deposition, improved soil release, improved colorfastness, improved fabric wear resistance, improved wrinkle resistance, improved wrinkle removal, improved shape retention, reduction in fabric shrinkage, pilling reduction, improved antifungal activity, improved stain resistance, improved cleaning performance when laundered, improved drying rates, improved dye, pigment or lake update, and any combination thereof.

Examples of conditions (e.g., time, temperature, wash/rinse volumes) for conducting a fabric care method or laundry method herein are disclosed in WO1997/003161 and U.S. Pat. Nos. 4,794,661, 4,580,421 and 5,945,394, which are incorporated herein by reference. In other examples, a material comprising fabric can be contacted with an aqueous composition herein: (i) for at least about 5, 10, 20, 30, 40, 50, 60, 70, 80, 90, 100, 110, or 120 minutes; (ii) at a temperature of at least about 10, 15, 20, 25, 30, 35, 40, 45, 50, 55, 60, 65, 70, 75, 80, 85, 90, or 95° C. (e.g., for laundry wash or rinse: a "cold" temperature of about 15-30° C., a "warm" temperature of about 30-50° C., a "hot" temperature of about 50-95° C.); (iii) at a pH of about 2, 3, 4, 5, 6, 7, 8, 9, 10, 11, or 12 (e.g., pH range of about 2-12, or about 3-11); (iv) at a salt (e.g., NaCl) concentration of at least about 0.5, 1.0, 1.5, 2.0, 2.5, 3.0, 3.5, or 4.0 wt %; or any combination of (i)-(iv). The contacting step in a fabric care method or laundry method can comprise any of washing, soaking, and/or rinsing steps, for example.

In certain embodiments of treating a material comprising fabric, the present α-glucan oligomers/polymers and/or the present α-glucan ether compound component(s) of the aqueous composition adsorbs to the fabric. This feature is believed to render the compounds useful as anti-redeposition agents and/or anti-greying agents in fabric care compositions disclosed herein (in addition to their viscosity-modifying effect). An anti-redeposition agent or anti-greying agent herein helps keep soil from redepositing onto clothing in wash water after the soil has been removed. It is further contemplated that adsorption of one or more of the present compounds herein to a fabric enhances mechanical properties of the fabric.

Adsorption of the present α-glucan oligomers/polymer and/or the present α-glucan ethers to a fabric herein can be measured following the methodology disclosed in the below Examples, for example. Alternatively, adsorption can be measured using a colorimetric technique (e.g., Dubois et al., 1956, *Anal. Chem.* 28:350-356; Zemljič et al., 2006, *Lenzinger Berichte* 85:68-76; both incorporated herein by reference) or any other method known in the art.

Other materials that can be contacted in the above treatment method include surfaces that can be treated with a dish detergent (e.g., automatic dishwashing detergent or hand dish detergent). Examples of such materials include surfaces of dishes, glasses, pots, pans, baking dishes, utensils and flatware made from ceramic material, china, metal, glass, plastic (e.g., polyethylene, polypropylene, polystyrene, etc.) and wood (collectively referred to herein as "tableware"). Thus, the treatment method in certain embodiments can be considered a dishwashing method or tableware washing method, for example. Examples of conditions (e.g., time, temperature, wash volume) for conducting a dishwashing or tableware washing method herein are disclosed in U.S. Pat. No. 8,575,083, which is incorporated herein by reference. In other examples, a tableware article can be contacted with an aqueous composition herein under a suitable set of conditions such as any of those disclosed above with regard to contacting a fabric-comprising material.

Certain embodiments of a method of treating a material herein further comprise a drying step, in which a material is dried after being contacted with the aqueous composition. A drying step can be performed directly after the contacting step, or following one or more additional steps that might follow the contacting step (e.g., drying of a fabric after being rinsed, in water for example, following a wash in an aqueous composition herein). Drying can be performed by any of several means known in the art, such as air drying (e.g., ~20-25° C.), or at a temperature of at least about 30, 40, 50, 60, 70, 80, 90, 100, 120, 140, 160, 170, 175, 180, or 200° C., for example. A material that has been dried herein typically has less than 3, 2, 1, 0.5, or 0.1 wt % water comprised therein. Fabric is a preferred material for conducting an optional drying step.

An aqueous composition used in a treatment method herein can be any aqueous composition disclosed herein, such as in the above embodiments or in the below Examples. Examples of aqueous compositions include detergents (e.g., laundry detergent or dish detergent) and water-containing dentifrices such as toothpaste.

In another embodiment, a method to alter the viscosity of an aqueous composition is provided comprising contacting one or more of the present α-glucan ether compounds with the aqueous composition, wherein the presence of the one or more α-glucan ether compounds alters (increases or decreases) the viscosity of the aqueous composition.

In a preferred aspect, the alteration in viscosity can be an increase and/or decrease of at least about 1%, 10%, 100%, 1000%, 100000%, or 1000000% (or any integer between 1% and 1000000%), for example, compared to the viscosity of the aqueous composition before the contacting step.

Etherification of the Present α-Glucan Oligomers/Polymers

The following steps can be taken to prepare the above etherification reaction.

The present α-glucan oligomers/polymers are contacted under alkaline conditions with at least one etherification agent comprising an organic group. This step can be performed, for example, by first preparing alkaline conditions by contacting the present α-glucan oligomers/polymers with a solvent and one or more alkali hydroxides to provide a mixture (e.g., slurry) or solution. The alkaline conditions of the etherification reaction can thus comprise an alkali hydroxide solution. The pH of the alkaline conditions can be at least about 11.0, 11.2, 11.4, 11.6, 11.8, 12.0, 12.2, 12.4, 12.6, 12.8, or 13.0.

Various alkali hydroxides can be used, such as sodium hydroxide, potassium hydroxide, calcium hydroxide, lithium hydroxide, and/or tetraethylammonium hydroxide. The concentration of alkali hydroxide in a preparation with the present α-glucan oligomers/polymers and a solvent can be from about 1-70 wt %, 5-50 wt %, 5-10 wt %, 10-50 wt %, 10-40 wt %, or 10-30 wt % (or any integer between 1 and 70 wt %). Alternatively, the concentration of alkali hydroxide such as sodium hydroxide can be at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. An alkali hydroxide used to prepare alkaline conditions may be in a completely aqueous solution or an aqueous solution comprising one or more water-soluble organic solvents such as ethanol or isopropanol. Alternatively, an alkali hydroxide can be added as a solid to provide alkaline conditions.

Various organic solvents that can optionally be included or used as the main solvent when preparing the etherification reaction include alcohols, acetone, dioxane, isopropanol and toluene, for example. Toluene or isopropanol can be used in certain embodiments. An organic solvent can be added before or after addition of alkali hydroxide. The concentration of an organic solvent (e.g., isopropanol or toluene) in a preparation comprising the present α-glucan oligomers/polymers and an alkali hydroxide can be at least about 10, 15, 20, 25, 30, 35, 40, 45, 50, 55, 60, 65, 70, 75, 80, 85, or 90 wt % (or any integer between 10 and 90 wt %).

Alternatively, solvents that can dissolve the present α-glucan oligomers/polymers can be used when preparing the etherification reaction. These solvents include, but are not limited to, lithium chloride (LiCl)/N,N-dimethyl-acetamide (DMAc), $SO_2$/diethylamine (DEA)/dimethyl sulfoxide (DMSO), LiCl/1,3-dimethy-2-imidazolidinone (DMI), N,N-dimethylformamide (DMF)/$N_2O_4$, DMSO/tetrabutyl-ammonium fluoride trihydrate (TBAF), N-methylmorpholine-N-oxide (NMMO), $Ni(tren)(OH)_2$ [tren¼tris(2-aminoethyl) amine] aqueous solutions and melts of $LiClO_4.3H_2O$, NaOH/urea aqueous solutions, aqueous sodium hydroxide, aqueous potassium hydroxide, formic acid, and ionic liquids.

The present α-glucan oligomers/polymers can be contacted with a solvent and one or more alkali hydroxides by mixing. Such mixing can be performed during or after adding these components with each other. Mixing can be performed by manual mixing, mixing using an overhead mixer, using a magnetic stir bar, or shaking, for example. In certain embodiments, the present α-glucan oligomers/polymers can first be mixed in water or an aqueous solution before it is mixed with a solvent and/or alkali hydroxide.

After contacting the present α-glucan oligomers/polymers, solvent, and one or more alkali hydroxides with each other, the resulting composition can optionally be maintained at ambient temperature for up to 14 days. The term "ambient temperature" as used herein refers to a temperature between about 15-30° C. or 20-25° C. (or any integer between 15 and 30° C.). Alternatively, the composition can be heated with or without reflux at a temperature from about 30° C. to about 150° C. (or any integer between 30 and 150° C.) for up to about 48 hours. The composition in certain embodiments can be heated at about 55° C. for about 30 minutes or about 60 minutes. Thus, a composition obtained from mixing the present α-glucan oligomers/polymers, solvent, and one or more alkali hydroxides with each other can be heated at about 50, 51, 52, 53, 54, 55, 56, 57, 58, 59, or 60° C. for about 30-90 minutes.

After contacting the present α-glucan oligomers/polymers, solvent, and one or more alkali hydroxides with each other, the resulting composition can optionally be filtered (with or without applying a temperature treatment step). Such filtration can be performed using a funnel, centrifuge, press filter, or any other method and/or equipment known in the art that allows removal of liquids from solids. Though filtration would remove much of the alkali hydroxide, the filtered α-glucan oligomers/polymers would remain alkaline (i.e., mercerized α-glucan), thereby providing alkaline conditions.

An etherification agent comprising an organic group can be contacted with the present α-glucan oligomers/polymers in a reaction under alkaline conditions in a method herein of producing the respective α-glucan ether compounds. For example, an etherification agent can be added to a composition prepared by contacting the present α-glucan oligomers/polymers composition, solvent, and one or more alkali hydroxides with each other as described above. Alternatively, an etherification agent can be included when preparing the alkaline conditions (e.g., an etherification agent can be mixed with the present α-glucan oligomers/polymers and solvent before mixing with alkali hydroxide).

An etherification agent herein can refer to an agent that can be used to etherify one or more hydroxyl groups of glucose monomeric units of the present α-glucan oligomers/polymers with an organic group as disclosed herein. Examples of organic groups include alkyl groups, hydroxy alkyl groups, and carboxy alkyl groups. One or more etherification agents may be used in the reaction.

Etherification agents suitable for preparing an alkyl α-glucan ether compound include, for example, dialkyl sulfates, dialkyl carbonates, alkyl halides (e.g., alkyl chloride), iodoalkanes, alkyl triflates (alkyl trifluoromethanesulfonates) and alkyl fluorosulfonates. Thus, examples of etherification agents for producing methyl α-glucan ethers include dimethyl sulfate, dimethyl carbonate, methyl chloride, iodomethane, methyl triflate and methyl fluorosulfonate. Examples of etherification agents for producing ethyl α-glucan ethers include diethyl sulfate, diethyl carbonate, ethyl chloride, iodoethane, ethyl triflate and ethyl fluorosulfonate. Examples of etherification agents for producing propyl α-glucan ethers include dipropyl sulfate, dipropyl carbonate, propyl chloride, iodopropane, propyl triflate and propyl fluorosulfonate. Examples of etherification agents for producing butyl α-glucan ethers include dibutyl sulfate, dibutyl carbonate, butyl chloride, iodobutane and butyl triflate.

Etherification agents suitable for preparing a hydroxyalkyl α-glucan ether compound include, for example, alkylene oxides such as ethylene oxide, propylene oxide (e.g., 1,2-propylene oxide), butylene oxide (e.g., 1,2-butylene oxide; 2,3-butylene oxide; 1,4-butylene oxide), or combinations thereof. As examples, propylene oxide can be used as an etherification agent for preparing hydroxypropyl α-glucan, and ethylene oxide can be used as an etherification agent for preparing hydroxyethyl α-glucan. Alternatively, hydroxyalkyl halides (e.g., hydroxyalkyl chloride) can be used as etherification agents for preparing hydroxyalkyl α-glucan. Examples of hydroxyalkyl halides include hydroxyethyl halide, hydroxypropyl halide (e.g., 2-hydroxypropyl chloride, 3-hydroxypropyl chloride) and hydroxybutyl halide. Alternatively, alkylene chlorohydrins can be used as etherification agents for preparing hydroxyalkyl α-glucan ethers. Alkylene chlorohydrins that can be used include, but are not limited to, ethylene chlorohydrin, propylene chlorohydrin, butylene chlorohydrin, or combinations of these.

Etherification agents suitable for preparing a dihydroxyalkyl α-glucan ether compound include dihydroxyalkyl halides (e.g., dihydroxyalkyl chloride) such as dihydroxyethyl halide, dihydroxypropyl halide (e.g., 2,3-dihydroxypropyl chloride [i.e., 3-chloro-1,2-propanediol]), or dihydroxybutyl halide, for example. 2,3-dihydroxypropyl chloride can be used to prepare dihydroxypropyl α-glucan ethers, for example.

Etherification agents suitable for preparing a carboxyalkyl α-glucan ether compounds may include haloalkylates (e.g., chloroalkylate). Examples of haloalkylates include haloacetate (e.g., chloroacetate), 3-halopropionate (e.g., 3-chloropropionate) and 4-halobutyrate (e.g., 4-chlorobutyrate). For example, chloroacetate (monochloroacetate) (e.g., sodium chloroacetate) can be used as an etherification agent to prepare carboxymethyl α-glucan. An etherification agent herein can alternatively comprise a positively charged organic group.

An etherification agent in certain embodiments can etherify α-glucan oligomers/polymers with a positively charged organic group, where the carbon chain of the positively charged organic group only has a substitution with a positively charged group (e.g., substituted ammonium group such as trimethylammonium). Examples of such etherification agents include dialkyl sulfates, dialkyl carbonates, alkyl halides (e.g., alkyl chloride), iodoalkanes, alkyl triflates (alkyl trifluoromethanesulfonates) and alkyl fluorosulfonates, where the alkyl group(s) of each of these agents has one or more substitutions with a positively charged group (e.g., substituted ammonium group such as trimethylammonium). Other examples of such etherification agents include dimethyl sulfate, dimethyl carbonate, methyl chloride, iodomethane, methyl triflate and methyl fluorosulfonate, where the methyl group(s) of each of these agents has a substitution with a positively charged group (e.g., substituted ammonium group such as trimethylammonium). Other examples of such etherification agents include diethyl sulfate, diethyl carbonate, ethyl chloride, iodoethane, ethyl triflate and ethyl fluorosulfonate, where the ethyl group(s) of each of these agents has a substitution with a positively charged group (e.g., substituted ammonium group such as trimethylammonium). Other examples of such etherification agents include dipropyl sulfate, dipropyl carbonate, propyl chloride, iodopropane, propyl triflate and propyl fluorosulfonate, where the propyl group(s) of each of these agents has one or more substitutions with a positively charged group (e.g., substituted ammonium group such as trimethylammonium). Other examples of such etherification agents include dibutyl sulfate, dibutyl carbonate, butyl chloride, iodobutane and butyl triflate, where the butyl group(s) of each of these agents has one or more substitutions with a positively charged group (e.g., substituted ammonium group such as trimethylammonium).

An etherification agent alternatively may be one that can etherify the present α-glucan oligomers/polymers with a positively charged organic group, where the carbon chain of the positively charged organic group has a substitution (e.g., hydroxyl group) in addition to a substitution with a positively charged group (e.g., substituted ammonium group such as trimethylammonium). Examples of such etherification agents include hydroxyalkyl halides (e.g., hydroxyalkyl chloride) such as hydroxypropyl halide and hydroxybutyl halide, where a terminal carbon of each of these agents has a substitution with a positively charged group (e.g., substituted ammonium group such as trimethylammonium); an example is 3-chloro-2-hydroxypropyl-trimethylammonium. Other examples of such etherification agents include alkylene oxides such as propylene oxide (e.g., 1,2-propylene oxide) and butylene oxide (e.g., 1,2-butylene oxide; 2,3-butylene oxide), where a terminal carbon of each of these agents has a substitution with a positively charged group (e.g., substituted ammonium group such as trimethylammonium).

A substituted ammonium group comprised in any of the foregoing etherification agent examples can be a primary, secondary, tertiary, or quaternary ammonium group. Examples of secondary, tertiary and quaternary ammonium groups are represented in structure I, where $R_2$, $R_3$ and $R_4$ each independently represent a hydrogen atom or an alkyl group such as a methyl, ethyl, propyl, or butyl group. Etherification agents herein typically can be provided as a fluoride, chloride, bromide, or iodide salt (where each of the foregoing halides serve as an anion).

When producing the present α-glucan ether compounds with two or more different organic groups, two or more different etherification agents would be used, accordingly. For example, both an alkylene oxide and an alkyl chloride could be used as etherification agents to produce an alkyl hydroxyalkyl α-glucan ether. Any of the etherification agents disclosed herein may therefore be combined to produce α-glucan ether compounds with two or more different organic groups. Such two or more etherification agents may be used in the reaction at the same time, or may be used sequentially in the reaction. When used sequentially, any of the temperature-treatment (e.g., heating) steps disclosed below may optionally be used between each addition. One may choose sequential introduction of etherification agents in order to control the desired DoS of each organic group. In general, a particular etherification agent would be used first if the organic group it forms in the ether product is desired at a higher DoS compared to the DoS of another organic group to be added.

The amount of etherification agent to be contacted with the present α-glucan oligomers/polymers in a reaction under alkaline conditions can be determined based on the DoS required in the α-glucan ether compound being produced. The amount of ether substitution groups on each glucose monomeric unit in α-glucan ether compounds produced herein can be determined using nuclear magnetic resonance (NMR) spectroscopy. The molar substitution (MS) value for α-glucan has no upper limit. In general, an etherification agent can be used in a quantity of at least about 0.05 mole per mole of α-glucan. There is no upper limit to the quantity of etherification agent that can be used.

Reactions for producing α-glucan ether compounds herein can optionally be carried out in a pressure vessel such as a Parr reactor, an autoclave, a shaker tube or any other pressure vessel well known in the art. A reaction herein can optionally be heated following the step of contacting the present α-glucan oligomers/polymers with an etherification agent under alkaline conditions. The reaction temperatures and time of applying such temperatures can be varied within wide limits. For example, a reaction can optionally be maintained at ambient temperature for up to 14 days. Alternatively, a reaction can be heated, with or without reflux, between about 25° C. to about 200° C. (or any integer between 25 and 200° C.). Reaction time can be varied correspondingly: more time at a low temperature and less time at a high temperature.

In certain embodiments of producing carboxymethyl α-glucan ethers, a reaction can be heated to about 55° C. for about 3 hours. Thus, a reaction for preparing a carboxyalkyl α-glucan ether herein can be heated to about 50° C. to about 60° C. (or any integer between 50 and 60° C.) for about 2 hours to about 5 hours, for example. Etherification agents such as a haloacetate (e.g., monochloroacetate) may be used in these embodiments, for example.

Optionally, an etherification reaction herein can be maintained under an inert gas, with or without heating. As used herein, the term "inert gas" refers to a gas which does not undergo chemical reactions under a set of given conditions, such as those disclosed for preparing a reaction herein.

All of the components of the reactions disclosed herein can be mixed together at the same time and brought to the desired reaction temperature, whereupon the temperature is maintained with or without stirring until the desired α-glucan ether compound is formed. Alternatively, the mixed components can be left at ambient temperature as described above.

Following etherification, the pH of a reaction can be neutralized. Neutralization of a reaction can be performed using one or more acids. The term "neutral pH" as used herein, refers to a pH that is neither substantially acidic or basic (e.g., a pH of about 6-8, or about 6.0, 6.2, 6.4, 6.6, 6.8, 7.0, 7.2, 7.4, 7.6, 7.8, or 8.0). Various acids that can be used for this purpose include, but are not limited to, sulfuric, acetic (e.g., glacial acetic), hydrochloric, nitric, any mineral (inorganic) acid, any organic acid, or any combination of these acids.

The present α-glucan ether compounds produced in a reaction herein can optionally be washed one or more times with a liquid that does not readily dissolve the compound. For example, α-glucan ether can typically be washed with alcohol, acetone, aromatics, or any combination of these, depending on the solubility of the ether compound therein (where lack of solubility is desirable for washing). In general, a solvent comprising an organic solvent such as alcohol is preferred for washing an α-glucan ether. The present α-glucan ether product(s) can be washed one or more times with an aqueous solution containing methanol or ethanol, for example. For example, 70-95 wt % ethanol can be used to wash the product. The present α-glucan ether product can be washed with a methanol:acetone (e.g., 60:40) solution in another embodiment.

An α-glucan ether produced in the disclosed reaction can be isolated. This step can be performed before or after neutralization and/or washing steps using a funnel, centrifuge, press filter, or any other method or equipment known in the art that allows removal of liquids from solids. An isolated α-glucan ether product can be dried using any method known in the art, such as vacuum drying, air drying, or freeze drying.

Any of the above etherification reactions can be repeated using an α-glucan ether product as the starting material for further modification. This approach may be suitable for increasing the DoS of an organic group, and/or adding one or more different organic groups to the ether product.

The structure, molecular weight and DoS of the α-glucan ether product can be confirmed using various physiochemical analyses known in the art such as NMR spectroscopy and size exclusion chromatography (SEC).

Personal Care and/or Pharmaceutical Compositions Comprising the Present Soluble Oligomer/Polymer The present glucan oligomer/polymers and/or the present α-glucan ethers may be used in personal care products. For example, one may be able to use such materials as a humectants, hydrocolloids or possibly thickening agents. The present α-glucan oligomers/polymers and/or the present α-glucan ethers may be used in conjunction with one or more other types of thickening agents if desired, such as those disclosed in U.S. Pat. No. 8,541,041, the disclosure of which is incorporated herein by reference in its entirety.

Personal care products herein are not particularly limited and include, for example, skin care compositions, cosmetic compositions, antifungal compositions, and antibacterial compositions. Personal care products herein may be in the form of, for example, lotions, creams, pastes, balms, ointments, pomades, gels, liquids, combinations of these and the like. The personal care products disclosed herein can include at least one active ingredient. An active ingredient is generally recognized as an ingredient that causes the intended pharmacological or cosmetic effect.

In certain embodiments, a skin care product can be applied to skin for addressing skin damage related to a lack of moisture. A skin care product may also be used to address the visual appearance of skin (e.g., reduce the appearance of flaky, cracked, and/or red skin) and/or the tactile feel of the skin (e.g., reduce roughness and/or dryness of the skin while improved the softness and subtleness of the skin). A skin care product typically may include at least one active ingredient for the treatment or prevention of skin ailments, providing a cosmetic effect, or for providing a moisturizing benefit to skin, such as zinc oxide, petrolatum, white petrolatum, mineral oil, cod liver oil, lanolin, dimethicone, hard fat, vitamin A, allantoin, calamine, kaolin, glycerin, or colloidal oatmeal, and combinations of these. A skin care product may include one or more natural moisturizing factors such as ceramides, hyaluronic acid, glycerin, squalane, amino acids, cholesterol, fatty acids, triglycerides, phospholipids, glycosphingolipids, urea, linoleic acid, glycosaminoglycans, mucopolysaccharide, sodium lactate, or sodium pyrrolidone carboxylate, for example. Other ingredients that may be included in a skin care product include, without limitation, glycerides, apricot kernel oil, canola oil, squalane, squalene, coconut oil, corn oil, jojoba oil, jojoba wax, lecithin, olive oil, safflower oil, sesame oil, shea butter, soybean oil, sweet almond oil, sunflower oil, tea tree oil, shea butter, palm oil, cholesterol, cholesterol esters, wax esters, fatty acids, and orange oil.

A personal care product herein can also be in the form of makeup or other product including, but not limited to, a lipstick, mascara, rouge, foundation, blush, eyeliner, lip liner, lip gloss, other cosmetics, sunscreen, sun block, nail polish, mousse, hair spray, styling gel, nail conditioner, bath gel, shower gel, body wash, face wash, shampoo, hair conditioner (leave-in or rinse-out), cream rinse, hair dye, hair coloring product, hair shine product, hair serum, hair anti-frizz product, hair split-end repair product, lip balm, skin conditioner, cold cream, moisturizer, body spray, soap, body scrub, exfoliant, astringent, scruffing lotion, depilatory, permanent waving solution, antidandruff formulation, antiperspirant composition, deodorant, shaving product, pre-shaving product, after-shaving product, cleanser, skin gel, rinse, toothpaste, or mouthwash, for example.

A pharmaceutical product herein can be in the form of an emulsion, liquid, elixir, gel, suspension, solution, cream, capsule, tablet, sachet or ointment, for example. Also, a pharmaceutical product herein can be in the form of any of the personal care products disclosed herein. A pharmaceutical product can further comprise one or more pharmaceutically acceptable carriers, diluents, and/or pharmaceutically acceptable salts. The present α-glucan oligomers/polymers and/or compositions comprising the present α-glucan oligomers/polymers can also be used in capsules, encapsulants, tablet coatings, and as an excipients for medicaments and drugs.

Enzymatic Synthesis of the Soluble α-Glucan Oligomer/Polymer Composition

Methods are provided to enzymatically produce a soluble α-glucan oligomer/polymer composition. Two different methods are described herein. In one embodiment, the "single enzyme" method comprises the use of at least one glucosyltransferase (in the absence of an α-glucanohydrolase) belong to glucoside hydrolase type 70 (E.C. 2.4.1.-) capable of catalyzing the synthesis of a digestion resistant soluble α-glucan oligomer/polymer composition using sucrose as a substrate. In another embodiment, a "two enzyme" method comprises a combination of at least one glucosyltransferase (GH70) in combination with at least one α-glucanohydrolase (such as an endomutanase).

Glycoside hydrolase family 70 enzymes are transglucosidases produced by lactic acid bacteria such as *Streptococcus, Leuconostoc, Weisella* or *Lactobacillus* genera (see Carbohydrate Active Enzymes database; "CAZy"; Cantarel et al., (2009) *Nucleic Acids Res* 37:D233-238). The recombinantly expressed glucosyltransferases preferably have an amino acid sequence identical to that found in nature (i.e., the same as the full length sequence as found in the source organism or a catalytically active truncation thereof).

GTF enzymes are able to polymerize the D-glucosyl units of sucrose to form homooligosaccharides or homopolysaccharides. Depending upon the specificity of the GTF enzyme, linear and/or branched glucans comprising various glycosidic linkages may be formed such as α-(1,2), α-(1,3), α-(1,4) and α-(1,6). Glucosyltransferases may also transfer the D-glucosyl units onto hydroxyl acceptor groups. A non-limiting list of acceptors may include carbohydrates, alcohols, polyols or flavonoids. The structure of the resultant glucosylated product is dependent upon the enzyme specificity.

In the present disclosure the D-glucopyranosyl donor is sucrose. As such the reaction is:

$$\text{Sucrose+GTF} \underset{\text{GTF}}{\rightleftarrows} \alpha\text{-D-(Glucose)}_n\text{+D-Fructose+}$$

The type of glycosidic linkage predominantly formed is used to name/classify the glucosyltransferase enzyme. Examples include dextransucrases (α-(1,6) linkages; EC 2.4.1.5), mutansucrases (α-(1,3) linkages; EC 2.4.1.-), alternansucrases (alternating α(1,3)-α(1,6) backbone; EC 2.4.1.140), and reuteransucrases (mix of α-(1,4) and α-(1,6) linkages; EC 2.4.1.-).

In one aspect, the glucosyltransferase (GTF) is capable of forming glucans having α-(1,3) glycosidic linkages with the proviso that that glucan product is not alternan (i.e., the enzyme is not an alternansucrase).

In one aspect, the glucosyltransferase comprises an amino acid sequence having at least 90% identity, preferably at least 91, 92, 93, 94, 95, 96, 97, 98, 99 or 100% identity to SEQ ID NO: 1, 3, 13, 16, 17, 19, 28, 30, 32, 34, 36, 38, 40, 42, 44, 46, 48, 50, 52, 54, 56, 58, 60, or 62. In a preferred aspect, the glucosyltransferase comprises an amino acid sequence selected from the group consisting of SEQ ID NOs: 1, 3, 13, 16, 17, 19, 28, 30, 32, 34, 36, 38, 40, 42, 44, 46, 48, 50, 52, 54, 56, 58, 60, and 62. However, it should be noted that some wild type sequences may be found in nature in a truncated form. As such, and in a further embodiment, the glucosyltransferase suitable for use may be a truncated form of the wild type sequence. In a further embodiment, the truncated glucosyltransferase comprises a sequence derived from the full length wild type amino acid sequence selected from the group consisting of SEQ ID NOs: 1, 13, 17, 28, 30, 32, 34, 36, 38, 40, 42, 44, and 46. In another embodiment, the glucosyltransferase may be truncated and will have an amino acid sequence selected from the group consisting of SEQ ID NOs: 3, 16, 19, 48, 50, 52, 54, 56, 58, 60, and 62.

The concentration of the catalyst in the aqueous reaction formulation depends on the specific catalytic activity of the catalyst, and is chosen to obtain the desired rate of reaction. The weight of each catalyst (either a single glucosyltransferase or individually a glucosyltransferase and α-glucanohydrolase) reactions typically ranges from 0.0001 mg to 20 mg per mL of total reaction volume, preferably from 0.001 mg to 10 mg per mL. The catalyst may also be immobilized on a soluble or insoluble support using methods well-known to those skilled in the art; see for example, *Immobilization of Enzymes and Cells*; Gordon F. Bickerstaff, Editor; Humana Press, Totowa, N.J., USA; 1997. The use of immobilized catalysts permits the recovery and reuse of the catalyst in subsequent reactions. The enzyme catalyst may be in the form of whole microbial cells, permeabilized microbial cells, microbial cell extracts, partially-purified or purified enzymes, and mixtures thereof.

The pH of the final reaction formulation is from about 3 to about 8, preferably from about 4 to about 8, more preferably from about 5 to about 8, even more preferably about 5.5 to about 7.5, and yet even more preferably about 5.5 to about 6.5. The pH of the reaction may optionally be controlled by the addition of a suitable buffer including, but not limited to, phosphate, pyrophosphate, bicarbonate, acetate, or citrate. The concentration of buffer, when employed, is typically from 0.1 mM to 1.0 M, preferably from 1 mM to 300 mM, most preferably from 10 mM to 100 mM.

The sucrose concentration initially present when the reaction components are combined is at least 50 g/L, preferably 50 g/L to 600 g/L, more preferably 100 g/L to 500 g/L, more preferably 150 g/L to 450 g/L, and most preferably 250 g/L to 450 g/L. The substrate for the α-glucanohydrolase (when present) will be the members of the glucose oligomer population formed by the glucosyltransferase. As the glucose oligomers present in the reaction system may act as acceptors, the exact concentration of each species present in the reaction system will vary. Additionally, other acceptors may be added (i.e., external acceptors) to the initial reaction mixture such as maltose, isomaltose, isomaltotriose, and methyl-α-D-glucan, to name a few.

The length of the reaction may vary and may often be determined by the amount of time it takes to use all of the available sucrose substrate. In one embodiment, the reaction is conducted until at least 90%, preferably at least 95% and most preferably at least 99% of the sucrose initially present in the reaction mixture is consumed. In another embodiment, the reaction time is 1 hour to 168 hours, preferably 1 hour to 72 hours, and most preferably 1 hour to 24 hours.

Single Enzyme Method (Glucosyltransferase)

Two glucosyltransferases/glucansucrases have been identified capable of producing the present α-glucan oligomer/polymer composition in the absence of an α-glucanohydrolase. Specifically, a glucosyltransferase from *Streptococcus mutans* (GENBANK® gi: 3130088 (or a catalytically active truncation thereof suitable for expression in the recombinant microbial host cell); also referred to herein as the "0088" glucosyltransferase or "GTF0088") can produce the present α-glucan oligomer/polymer composition. In one aspect, the *Streptococcus mutans GTF*0088 may be produced as a catalytically active fragment of the full length sequence reported in GENBANK® gi: 3130088. In one embodiment, the present α-glucan oligomer/polymer composition is produced using the *Streptococcus mutans* GTF0088 glucosyltransferase or a catalytically active fragment thereof.

In one embodiment, a method to produce an α-glucan oligomer/polymer composition is provided comprising:

a. providing a set of reaction components comprising:
   i. sucrose;
   ii. at least one polypeptide having glucosyltransferase activity having at least 90% identity to SEQ ID NOs: 13, 16, 17, 19, 28, 30, 32, 34, 36, 38, 40, 42, 44, 46, 48, 50, 52, 54, 56, 58, 60, and 62; and
   iii. optionally one more acceptors;
b. combining under suitable aqueous reaction conditions the set of reaction components of (a) to form a single reaction mixture, whereby a product mixture comprising glucose oligomers is formed;
c. optionally isolating the soluble α-glucan oligomer/polymer composition from the product mixture comprising glucose oligomers; and
d. optionally concentrating the soluble α-glucan oligomer/polymer composition.

In a preferred embodiment, the present α-glucan oligomer/polymer composition is produced using a glucosyltransferase enzyme having an amino acid sequence having at least 90%, preferably 91, 92, 93, 94, 95, 96, 97, 98, 99, or 100% to SEQ ID NO: 13 (the full length form) or SEQ ID NO: 16, 48, or 56 (a catalytically active truncated form) with the understanding the such enzymes will retain a similar activity and produce a product profile consistent with the present α-glucan oligomer/polymer composition.

In another embodiment, a glucosyltransferase from *Streptococcus mutans* 1123 GENBANK® gi:387786207 (or a catalytically active truncation thereof suitable for expression in the recombinant microbial host cell; herein also referred to as the "6207" glucosyltransferase or simply "GTF6207") has also been identified as being capable of producing the present α-glucan oligomer/polymer composition in the absence of an α-glucanohydrolase (e.g., dextranase, mutanase, etc.). In one aspect, the *Streptococcus mutan* GTF6207 may be produced as a catalytically active fragment of the full length sequence reported in GENBANK® gi: 387786207. In one embodiment, the present α-glucan oligomer/polymer composition is produced using the *Streptococcus mutans* GTF6207 glucosyltransferase or a catalytically active fragment thereof. In a preferred embodiment, the present α-glucan oligomer/polymer composition is produced using a glucosyltransferase enzyme having an amino acid sequence having at least 90%, preferably 91, 92, 93, 94, 95, 96, 97, 98, 99, or 100% to SEQ ID NO: 17 (the full length form) or SEQ ID NO: 19 (a catalytically active truncated form) with the understanding the such enzymes will retain a similar activity and produce a product profile consistent with the present α-glucan oligomer/polymer composition.

In further embodiments, the present α-glucan fiber composition is produced using a glucosyltransferase enzyme having an amino acid sequence having at least 90%, preferably 91, 92, 93, 94, 95, 96, 97, 98, 99, or 100% to a homolog or a truncation of a homolog of SEQ ID NO: 13 with the understanding that such enzymes will retain a similar activity and produce a product profile consistent with the present α-glucan fiber composition. In certain embodiments, the homolog is selected from SEQ ID NOs: 28, 30, 32, 34, 36, 40, 42, 44, and 46. In certain embodiments, the truncation of a homolog is selected from SEQ ID NOs: 50, 52, 54, 58, 60, and 62.

Soluble Glucan Fiber Synthesis—Reaction Systems Comprising a Glucosyltransferase (Gtf) and an α-Glucanohydrolase A method is provided to enzymatically produce the present soluble α-glucan oligomer/polymer using at least one α-glucanohydrolase in combination (i.e., concomitantly in the reaction mixture) with at least one of the above glucosyltransferases. The simultaneous use of the two enzymes produces a different product profile (i.e., the profile of the soluble oligomer/polymer composition) when compared to a sequential application of the same enzymes (i.e., first synthesizing the glucan polymer from sucrose using a glucosyltransferase and then subsequently treating the glucan polymer with an α-glucanohydrolase). In one embodiment, a glucan oligomer/polymer synthesis method based on sequential application of a glucosyltransferase with an α-glucanohydrolase is specifically excluded.

In one embodiment, a method to produce a soluble α-glucan oligomer/polymer composition is provided comprising:

a. providing a set of reaction components comprising:
   i. sucrose;
   ii. at least one polypeptide having glucosyltransferase activity, said polypeptide having at least 90% identity to SEQ ID NO: 1 or 3;
   iii. at least one polypeptide having α-glucanohydrolase activity; and
   iv. optionally one more acceptors;
b. combining under suitable reaction conditions whereby a product comprising a soluble α-glucan oligomer/polymer composition is produced; and c. optionally isolating the soluble α-glucan oligomer/polymer composition from the product of step (b).

A glucosyltransferase from *Streptococcus mutans* NN2025 (GENBANK® GI:290580544; also referred to herein as the "0544" glucosyltransferase or simply "GTF0544") can produce the present α-glucan oligomer/polymer composition when used in combination with an α-glucanohydrolase having endohydrolytic activity. In one aspect, the *Streptococcus mutans* GTF0544 may be produced as a catalytically active fragment of the full length sequence reported in GENBANK® gi: 290580544. In one embodiment, the present α-glucan oligomer/polymer composition is produced using the *Streptococcus mutans* GTF0544 glucosyltransferase (or a catalytically active fragment thereof suitable for expression in the recombinant host cell) in combination with a least one α-glucanohydrolase having endohydrolytic activity. Similar to the glucosyltransferases, an α-glucanohydrolase may be defined by the endohydrolysis activity towards certain α-D-glycosidic linkages. Examples may include, but are not limited to, dextranases (capable of hydrolyzing α-(1,6)-linked glycosidic bonds; E.C. 3.2.1.11), mutanases (capable of hydrolyzing α-(1,3)-linked glycosidic bonds; E.C. 3.2.1.59), mycodextranases (capable of endohydrolysis of (14)-α-D-glucosidic linkages in α-D-glucans containing both (1→3)- and (1→4)-bonds; EC 3.2.1.61), glucan 1,6-α-glucosidase (EC 3.2.1.70), and alternanases (capable of endohydrolytically cleaving alternan; E.C. 3.2.1.-; see U.S. Pat. No. 5,786,196). Various factors including, but not limited to, level of branching, the type of branching, and the relative branch length within certain α-glucans may adversely impact the ability of an α-glucanohydrolase to endohydrolyze some glycosidic linkages.

In one embodiment, the α-glucanohydrolase is at least one mutanase (EC 3.1.1.59). Mutanases useful in the methods disclosed herein can be identified by their characteristic structure. See, e.g., Y. Hakamada et al. (*Biochimie*, (2008) 90:525-533). In another embodiment, the mutanase is one obtainable from the genera *Penicillium, Paenibacillus, Hypocrea, Aspergillus*, and *Trichoderma*. In a further embodiment, the mutanase is from *Penicillium marneffei* ATCC 18224 or *Paenibacillus Humicus*. In one embodiment, the mutanase comprises an amino acid sequence selected from SEQ ID NOs 4, 6, 9, 11, and any combination thereof. In another embodiment, the above mutanases may be a catalytically active truncation so long as the mutanase activity is retained. In a preferred embodiment, the *Paenibacillus* Humicus mutanase, identified in GENBANK® as gi:257153264 (also referred to herein as the "3264" mutanase or simply "MUT3264") or a catalytically active fragment thereof may be used in combination with the GTF0544 glucosyltransferase to produce the present α-glucan oligomer/polymer composition. The MUT3264 mutanase may be produced with its native signal sequence, an alternative signal sequence (such as the *Bacillus subtilis* AprE signal sequence; SEQ ID NO: 7), or may be produced in a mature form (for example, a truncated form lacking the signal sequence) so long as the desired mutanase activity is retained and the resulting product (when used in combination with the GTF0544 glucosyltransferase) is the present α-glucan oligomer/polymer composition.

In a preferred embodiment, the present α-glucan oligomer/polymer composition is produced using a glucosyltransferase enzyme having an amino acid sequence having at least 90%, preferably 91, 92, 93, 94, 95, 96, 97, 98, 99, or 100% to SEQ ID NO: 1 (the full length form) or SEQ ID NO: 3 (a catalytically active truncated form) in combination with a mutanase having at least 90%, preferably 91, 92, 93, 94, 95, 96, 97, 98, 99, or 100% to SEQ ID NO: 4 (the full length form as reported in GENBANK® gi: 257153264) or SEQ ID NO: 6 or SEQ ID NO: 9 with the understanding that the combinations of enzymes (GTF0544 and MUT3264) will retain a similar activity and produce a product profile consistent with the present α-glucan oligomer/polymer composition.

The temperature of the enzymatic reaction system comprising concomitant use of at least one glucosyltransferase and at least one α-glucanohydrolase may be chosen to control both the reaction rate and the stability of the enzyme catalyst activity. The temperature of the reaction may range from just above the freezing point of the reaction formulation (approximately 0° C.) to about 60° C., with a preferred range of 5° C. to about 55° C., and a more preferred range of reaction temperature of from about 20° C. to about 45° C.

The ratio of glucosyltransferase to α-glucanohydrolase (v/v) may vary depending upon the selected enzymes. In one embodiment, the ratio of glucosyltransferase to α-glucanohydrolase (v/v) ranges from 1:0.01 to 0.01:1.0. In another embodiment, the ratio of glucosyltransferase to α-glucanohydrolase (units of activity/units of activity) may vary depending upon the selected enzymes. In still further embodiments, the ratio of glucosyltransferase to α-glucanohydrolase (units of activity/units of activity) ranges from 1:0.01 to 0.01:1.0.

Methods to Identify Substantially Similar Enzymes Having the Desired Activity

The skilled artisan recognizes that substantially similar enzyme sequences may also be used in the present compositions and methods so long as the desired activity is retained (i.e., glucosyltransferase activity capable of forming glucans having the desired glycosidic linkages or α-glucanohydrolases having endohydrolytic activity towards the target glycosidic linkage(s)). For example, it has been demonstrated that catalytically activity truncations may be prepared and used so long as the desired activity is retained (or even improved in terms of specific activity). In one embodiment, substantially similar sequences are defined by their ability to hybridize, under highly stringent conditions with the nucleic acid molecules associated with sequences exemplified herein. In another embodiment, sequence alignment algorithms may be used to define substantially similar enzymes based on the percent identity to the DNA or amino acid sequences provided herein.

As used herein, a nucleic acid molecule is "hybridizable" to another nucleic acid molecule, such as a cDNA, genomic DNA, or RNA, when a single strand of the first molecule can anneal to the other molecule under appropriate conditions of temperature and solution ionic strength. Hybridization and washing conditions are well known and exemplified in Sambrook, J. and Russell, D., T. *Molecular Cloning: A Laboratory Manual*, Third Edition, Cold Spring Harbor Laboratory Press, Cold Spring Harbor (2001). The conditions of temperature and ionic strength determine the "stringency" of the hybridization. Stringency conditions can be adjusted to screen for moderately similar molecules, such as homologous sequences from distantly related organisms, to highly similar molecules, such as genes that duplicate functional enzymes from closely related organisms. Post-hybridization washes typically determine stringency conditions. One set of preferred conditions uses a series of washes starting with 6×SSC, 0.5% SDS at room temperature for 15 min, then repeated with 2×SSC, 0.5% SDS at 45° C. for 30 min, and then repeated twice with 0.2×SSC, 0.5% SDS at 50° C. for 30 min. A more preferred set of conditions uses higher temperatures in which the washes are identical to those above except for the temperature of the final two 30 min washes in 0.2×SSC, 0.5% SDS was increased to 60° C. Another preferred set of highly stringent hybridization conditions is 0.1×SSC, 0.1% SDS, 65° C. and washed with 2×SSC, 0.1% SDS followed by a final wash of 0.1×SSC, 0.1% SDS, 65° C.

Hybridization requires that the two nucleic acids contain complementary sequences, although depending on the stringency of the hybridization, mismatches between bases are possible. The appropriate stringency for hybridizing nucleic acids depends on the length of the nucleic acids and the degree of complementation, variables well known in the art. The greater the degree of similarity or homology between two nucleotide sequences, the greater the value of Tm for hybrids of nucleic acids having those sequences. The relative stability (corresponding to higher Tm) of nucleic acid hybridizations decreases in the following order: RNA:RNA, DNA:RNA, DNA:DNA. For hybrids of greater than 100 nucleotides in length, equations for calculating Tm have been derived (Sambrook, J. and Russell, D., T., supra). For hybridizations with shorter nucleic acids, i.e., oligonucleotides, the position of mismatches becomes more important, and the length of the oligonucleotide determines its specificity. In one aspect, the length for a hybridizable nucleic acid is at least about 10 nucleotides. Preferably, a minimum length for a hybridizable nucleic acid is at least about 15 nucleotides in length, more preferably at least about 20 nucleotides in length, even more preferably at least 30 nucleotides in length, even more preferably at least 300 nucleotides in length, and most preferably at least 800 nucleotides in length. Furthermore, the skilled artisan will recognize that the temperature and wash solution salt concentration may be adjusted as necessary according to factors such as length of the probe.

As used herein, the term "percent identity" is a relationship between two or more polypeptide sequences or two or more polynucleotide sequences, as determined by comparing the sequences. In the art, "identity" also means the degree of sequence relatedness between polypeptide or polynucleotide sequences, as the case may be, as determined by the match between strings of such sequences. "Identity" and "similarity" can be readily calculated by known methods, including but not limited to those described in: *Computational Molecular Biology* (Lesk, A. M., ed.) Oxford University Press, N Y (1988); *Biocomputing: Informatics and Genome Projects* (Smith, D. W., ed.) Academic Press, NY (1993); *Computer Analysis of Sequence Data, Part I* (Griffin, A. M., and Griffin, H. G., eds.) Humana Press, N J (1994); *Sequence Analysis in Molecular Biology* (von Heinje, G., ed.) Academic Press (1987); and *Sequence Analysis Primer* (Gribskov, M. and Devereux, J., eds.) Stockton Press, NY (1991). Methods to determine identity and similarity are codified in publicly available computer programs. Sequence alignments and percent identity calculations may be performed using the Megalign program of the LASERGENE bioinformatics computing suite (DNASTAR Inc., Madison, Wis.), the AlignX program of Vector NTI v. 7.0 (Informax, Inc., Bethesda, Md.), or the EMBOSS Open Software Suite (EMBL-EBI; Rice et al., *Trends in Genetics* 16, (6):276-277 (2000)). Multiple alignment of the sequences can be performed using the CLUSTAL method (such as CLUSTALW; for example version 1.83) of alignment (Higgins and Sharp, *CABIOS,* 5:151-153 (1989); Higgins et al., *Nucleic Acids Res.* 22:4673-4680 (1994); and Chenna et al., *Nucleic Acids Res* 31 (13):3497-500 (2003)), available from the European Molecular Biology Laboratory via the European Bioinformatics Institute) with the default parameters. Suitable parameters for CLUSTALW protein alignments include GAP Existence penalty=15, GAP extension=0.2, matrix=Gonnet (e.g., Gonnet250), protein ENDGAP=−1, protein GAPDIST=4, and KTUPLE=1. In one embodiment, a fast or slow alignment is used with the default settings where a slow alignment is preferred. Alternatively, the parameters using the CLUSTALW method (e.g., version 1.83) may be modified to also use KTUPLE=1, GAP PENALTY=10, GAP extension=1, matrix=BLOSUM (e.g., BLOSUM64), WINDOW=5, and TOP DIAGONALS SAVED=5.

In one aspect, suitable isolated nucleic acid molecules encode a polypeptide having an amino acid sequence that is at least about 20%, preferably at least 30%, 40%, 50%, 60%, 70%, 80%, 85%, 90%, 91%, 92%, 93%, 94%, 95%, 96%, 97%, 98%, or 99% identical to the amino acid sequences reported herein. In another aspect, suitable isolated nucleic acid molecules encode a polypeptide having an amino acid sequence that is at least about 20%, preferably at least 30%, 40%, 50%, 60%, 70%, 80%, 85%, 90%, 91%, 92%, 93%, 94%, 95%, 96%, 97%, 98%, or 99% identical to the amino acid sequences reported herein; with the proviso that the polypeptide retains the respective activity (i.e., glucosyltransferase or α-glucanohydrolase activity).

Methods to Obtain the Enzymatically-Produced Soluble α-Glucan Oligomer/Polymer Composition Any number of common purification techniques may be used to obtain the present soluble α-glucan oligomer/polymer composition from the reaction system including, but not limited to centrifugation, filtration, fractionation, chromatographic separation, dialysis, evaporation, precipitation, dilution or any combination thereof, preferably by dialysis or chromatographic separation, most preferably by dialysis (ultrafiltration).

Recombinant Microbial Expression

The genes and gene products of the instant sequences may be produced in heterologous host cells, particularly in the cells of microbial hosts. Preferred heterologous host cells for expression of the instant genes and nucleic acid molecules are microbial hosts that can be found within the fungal or bacterial families and which grow over a wide range of temperature, pH values, and solvent tolerances. For example, it is contemplated that any of bacteria, yeast, and filamentous fungi may suitably host the expression of the present nucleic acid molecules. The enzyme(s) may be expressed intracellularly, extracellularly, or a combination of both intracellularly and extracellularly, where extracellular expression renders recovery of the desired protein from a fermentation product more facile than methods for recovery of protein produced by intracellular expression. Transcription, translation and the protein biosynthetic apparatus remain invariant relative to the cellular feedstock used to generate cellular biomass; functional genes will be expressed regardless. Examples of host strains include, but are not limited to, bacterial, fungal or yeast species such as *Aspergillus, Trichoderma, Saccharomyces, Pichia, Phaffia, Kluyveromyces, Candida, Hansenula, Yarrowia, Salmonella, Bacillus, Acinetobacter, Zymomonas, Agrobacterium, Erythrobacter, Chlorobium, Chromatium, Flavobacterium, Cytophaga, Rhodobacter, Rhodococcus, Streptomyces, Brevibacterium, Corynebacteria, Mycobacterium, Deinococcus, Escherichia, Erwinia, Pantoea, Pseudomonas, Sphingomonas, Methylomonas, Methylobacter, Methylococcus, Methylosinus, Methylomicrobium, Methylocystis, Alcaligenes, Synechocystis, Synechococcus, Anabaena, Thiobacillus, Methanobacterium, Klebsiella*, and *Myxococ-*

*cus*. In one embodiment, the fungal host cell is *Trichoderma*, preferably a strain of *Trichoderma reesei. In one embodiment, bacterial host strains include Escherichia, Bacillus, Kluyveromyces*, and *Pseudomonas*. In a preferred embodiment, the bacterial host cell is *Bacillus subtilis* or *Escherichia coli.*

Large-scale microbial growth and functional gene expression may use a wide range of simple or complex carbohydrates, organic acids and alcohols or saturated hydrocarbons, such as methane or carbon dioxide in the case of photosynthetic or chemoautotrophic hosts, the form and amount of nitrogen, phosphorous, sulfur, oxygen, carbon or any trace micronutrient including small inorganic ions. The regulation of growth rate may be affected by the addition, or not, of specific regulatory molecules to the culture and which are not typically considered nutrient or energy sources.

Vectors or cassettes useful for the transformation of suitable host cells are well known in the art. Typically the vector or cassette contains sequences directing transcription and translation of the relevant gene, a selectable marker, and sequences allowing autonomous replication or chromosomal integration. Suitable vectors comprise a region 5' of the gene which harbors transcriptional initiation controls and a region 3' of the DNA fragment which controls transcriptional termination. It is most preferred when both control regions are derived from genes homologous to the transformed host cell and/or native to the production host, although such control regions need not be so derived.

Initiation control regions or promoters which are useful to drive expression of the present cephalosporin C deacetylase coding region in the desired host cell are numerous and familiar to those skilled in the art. Virtually any promoter capable of driving these genes is suitable for the present disclosure including but not limited to, CYC1, HIS3, GAL1, GAL10, ADH1, PGK, PHO5, GAPDH, ADC1, TRP1, URA3, LEU2, ENO, TPI (useful for expression in *Saccharomyces*); AOX1 (useful for expression in *Pichia*); and lac, araB, tet, trp, $IP_L$, $IP_R$, T7, tac, and trc (useful for expression in *Escherichia coli*) as well as the amy, apr, npr promoters and various phage promoters useful for expression in *Bacillus*.

Termination control regions may also be derived from various genes native to the preferred host cell. In one embodiment, the inclusion of a termination control region is optional. In another embodiment, the chimeric gene includes a termination control region derived from the preferred host cell.

Industrial Production

A variety of culture methodologies may be applied to produce the enzyme(s). For example, large-scale production of a specific gene product over-expressed from a recombinant microbial host may be produced by batch, fed-batch, and continuous culture methodologies. Batch and fed-batch culturing methods are common and well known in the art and examples may be found in *Biotechnology: A Textbook of Industrial Microbiology* by Wulf Crueger and Anneliese Crueger (authors), Second Edition, (Sinauer Associates, Inc., Sunderland, Mass. (1990) and *Manual of Industrial Microbiology and Biotechnology*, Third Edition, Richard H. Baltz, Arnold L. Demain, and Julian E. Davis (Editors), (ASM Press, Washington, D.C. (2010).

Commercial production of the desired enzyme(s) may also be accomplished with a continuous culture. Continuous cultures are an open system where a defined culture media is added continuously to a bioreactor and an equal amount of conditioned media is removed simultaneously for processing. Continuous cultures generally maintain the cells at a constant high liquid phase density where cells are primarily in log phase growth. Alternatively, continuous culture may be practiced with immobilized cells where carbon and nutrients are continuously added and valuable products, by-products or waste products are continuously removed from the cell mass. Cell immobilization may be performed using a wide range of solid supports composed of natural and/or synthetic materials.

Recovery of the desired enzyme(s) from a batch fermentation, fed-batch fermentation, or continuous culture, may be accomplished by any of the methods that are known to those skilled in the art. For example, when the enzyme catalyst is produced intracellularly, the cell paste is separated from the culture medium by centrifugation or membrane filtration, optionally washed with water or an aqueous buffer at a desired pH, then a suspension of the cell paste in an aqueous buffer at a desired pH is homogenized to produce a cell extract containing the desired enzyme catalyst. The cell extract may optionally be filtered through an appropriate filter aid such as celite or silica to remove cell debris prior to a heat-treatment step to precipitate undesired protein from the enzyme catalyst solution. The solution containing the desired enzyme catalyst may then be separated from the precipitated cell debris and protein by membrane filtration or centrifugation, and the resulting partially-purified enzyme catalyst solution concentrated by additional membrane filtration, then optionally mixed with an appropriate carrier (for example, maltodextrin, phosphate buffer, citrate buffer, or mixtures thereof) and spray-dried to produce a solid powder comprising the desired enzyme catalyst. Alternatively, the resulting partially-purified enzyme catalyst solution can be stabilized as a liquid formulation by the addition of polyols such as maltodextrin, sorbitol, or propylene glycol, to which is optionally added a preservative such as sorbic acid, sodium sorbate or sodium benzoate.

When an amount, concentration, or other value or parameter is given either as a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope be limited to the specific values recited when defining a range.

Description of Certain Embodiments

In a first embodiment, a soluble α-glucan oligomer/polymer composition is provided, said soluble α-glucan oligomer/polymer composition comprising:

a. 10-30% α-(1,3) glycosidic linkages;
b. 65-87% α-(1,6) glycosidic linkages;
c. less than 5% α-(1,3,6) glycosidic linkages;
d. a weight average molecular weight of less than 5000 Daltons;
e. a viscosity of less than 0.25 Pascal second (Pa·s) at 12 wt % in water at 20° C.;
f. a solubility of at least 20% (w/w) in pH 7 water at 25° C.; and
g. a polydispersity index of less than 5.

In another embodiment to any of the above embodiments, the present soluble α-glucan oligomer/polymer composition comprises a content of reducing sugars of less than 10%.

In another embodiment to any of the above embodiments, the soluble α-glucan oligomer/polymer composition comprises less than 1% α-(1,4) glycosidic linkages.

In another embodiment to any of the above embodiments, the soluble α-glucan oligomer/polymer composition is characterized by a number average molecular weight (Mn) between 400 and 2000 g/mole.

In second embodiment, a fabric care, laundry care, or aqueous composition is provided comprising 0.01 to 99 wt % (dry solids basis), preferably 10 to 90% wt %, of the soluble α-glucan oligomer/polymer composition described above.

In another embodiment, a method to produce a soluble α-glucan oligomer/polymer composition is provided comprising:

- a. providing a set of reaction components comprising:
  - i. sucrose; preferably at a concentration of at least 50 g/L, preferably at least 200 g/L;
  - ii. at least one polypeptide having glucosyltransferase activity, said polypeptide having at least 90% identity, preferably at least 91, 92, 93, 94, 95, 96, 97, 98, 99 or 100% identity to SEQ ID NO: 1 or 3;
  - iii. at least one polypeptide having α-glucanohydrolase activity; preferably endomutanase activity or endodextranase activity; and
  - iv. optionally one more acceptors;
- b. combining under suitable reaction conditions whereby a product comprising a soluble α-glucan oligomer/polymer composition is produced;
- c. optionally isolating the soluble α-glucan oligomer/polymer composition from the product of step (b); and
- d. optimally concentrating the soluble α-glucan oligomer/polymer composition In another embodiment to any of the above embodiments, the at least one polypeptide having glucosyltransferase activity and the at least one polypeptide having α-glucanohydrolase activity are concomitantly present in the reaction mixture.

In another embodiment to any of the above embodiments, the endomutanase comprises an amino acid sequence having at least 90% identity to SEQ ID NO: 4, 6, 9 or 11.

In another embodiment to any of the above embodiments, the endodextranase is dextranase L from *Chaetomium erraticum*.

In another embodiment to any of the above embodiments, the ratio of glucosyltransferase activity to α-glucanohydrolase activity is 0.01:1 to 1:0.01.

In another embodiment, a method to produce the α-glucan oligomer/polymer composition is provided comprising:

- a. providing a set of reaction components comprising:
  - i. sucrose;
  - ii. at least one polypeptide having glucosyltransferase activity having at least 90% identity to SEQ ID NOs: 13, 16, 17, 19, 28, 30, 32, 34, 36, 38, 40, 42, 44, 46, 48, 50, 52, 54, 56, 58, 60, and 62; and
  - iii. optionally one more acceptors;
- b. combining under suitable aqueous reaction conditions the set of reaction components of (a) to form a single reaction mixture, whereby a product mixture comprising glucose oligomers is formed;
- c. optionally isolating the soluble α-glucan oligomer/polymer composition from the product mixture comprising glucose oligomers; and
- d. optionally concentrating the soluble α-glucan oligomer/polymer composition.

In another embodiment, a composition comprising 0.01 to 99 wt % (dry solids basis) of the present soluble α-glucan oligomer/polymer composition and at least one of the following ingredients: at least one cellulase, at least one protease or a combination thereof.

A composition or method according to any of the above embodiments wherein the composition is in the form of a liquid, a powder, granules, shaped spheres, shaped sticks, shaped plates, shaped cubes, tablets, powders, capsules, sachets, or any combination thereof.

A method according to any of the above embodiments wherein the isolating step comprises at least one of centrifugation, filtration, fractionation, chromatographic separation, dialysis, evaporation, dilution or any combination thereof.

A method according to any of the above embodiments wherein the sucrose concentration in the single reaction mixture is initially at least 200 g/L upon combining the set of reaction components.

A method according to any of the above embodiments wherein the ratio of glucosyltransferase activity to α-glucanohydrolase activity ranges from 0.01:1 to 1:0.01.

A method according to any of the above embodiments wherein the suitable reaction conditions (for enzymatic glucan synthesis) comprises a reaction temperature between 0° C. and 45° C.

A method according to any of the above embodiments wherein the suitable reaction conditions comprise a pH range of 3 to 8, preferably 4 to 8.

A method according to any of the above embodiments wherein a buffer is present and is selected from the group consisting of phosphate, pyrophosphate, bicarbonate, acetate, or citrate A method according to any of the above methods wherein said at least one glucosyltransferase is selected from the group consisting of SEQ ID NOs: 1, 3, 13, 16, 17, 19, 28, 30, 32, 34, 36, 38, 40, 42, 44, 46, 48, 50, 52, 54, 56, 58, 60, 62 and any combination thereof.

A method according to any of the above embodiments wherein said at least one α-glucanohydrolase is selected from the group consisting of SEQ ID NOs 4, 6, 9, 11 and any combination thereof.

A method according to any of the above embodiments wherein said at least one glucosyltransferase and said at least one α-glucanohydrolase is selected from the combinations of glucosyltransferase GTF0544 (SEQ ID NO: 1, 3 or a combination thereof) and mutanase MUT3264 (SEQ ID NOs: 4, 6, 9 or a combination thereof)

A product produced by any of the above process embodiments; preferably wherein the product produced is the soluble α-glucan oligomer/polymer composition of the first embodiment.

EXAMPLES

Unless defined otherwise herein, all technical and scientific terms used herein have the same meaning as commonly understood by one of ordinary skill in the art to which this disclosure belongs. Singleton, et al., *DICTIONARY OF MICROBIOLOGY AND MOLECULAR BIOLOGY*, 2D ED., John Wiley and Sons, New York (1994), and Hale & Marham, *THE HARPER COLLINS DICTIONARY OF BIOLOGY*, Harper Perennial, N.Y. (1991) provide one of skill with a general dictionary of many of the terms used in this disclosure.

The present disclosure is further defined in the following Examples. It should be understood that these Examples, while indicating preferred embodiments, are given by way of illustration only. From the above discussion and these Examples, one skilled in the art can ascertain the essential characteristics of this disclosure, and without departing from the spirit and scope thereof, can make various changes and modifications of to adapt it to various uses and conditions.

The meaning of abbreviations is as follows: "sec" or "s" means second(s), "ms" mean milliseconds, "min" means minute(s), "h" or "hr" means hour(s), "μL" means microliter(s), "mL" means milliliter(s), "L" means liter(s); "mL/min" is milliliters per minute; "μg/mL" is microgram(s) per milliliter(s); "LB" is Luria broth; "μm" is micrometers, "nm" is nanometers; "OD" is optical density; "IPTG" is isopropyl-β-D-thio-galactoside; "g" is gravitational force; "mM" is millimolar; "SDS-PAGE" is sodium dodecyl sulfate polyacrylamide; "mg/mL" is milligrams per milliliters; "N" is normal; "w/v" is weight for volume; "DTT" is dithiothreitol; "BCA" is bicinchoninic acid; "DMAc" is N,N'-dimethyl acetamide; "LiCl" is Lithium chloride; "NMR" is nuclear magnetic resonance; "DMSO" is dimethylsulfoxide; "SEC" is size exclusion chromatography; "GI" or "gi" means GenInfo Identifier, a system used by GENBANK® and other sequence databases to uniquely identify polynucleotide and/or polypeptide sequences within the respective databases; "DPx" means glucan degree of polymerization having "x" units in length; "ATCC" means American Type Culture Collection (Manassas, Va.), "DSMZ" and "DSM" will refer to Leibniz Institute DSMZ-German Collection of Microorganisms and Cell Cultures, (Braunschweig, Germany); "EELA" is the Finish Food Safety Authority (Helsinki, Finland); "CCUG" refer to the Culture Collection, University of Göteborg, Sweden; "Suc." means sucrose; "Gluc." means glucose; "Fruc." means fructose; "Leuc." means leucrose; and "Rxn" means reaction.

General Methods

Standard recombinant DNA and molecular cloning techniques used herein are well known in the art and are described by Sambrook, J. and Russell, D., *Molecular Cloning: A Laboratory Manual*, Third Edition, Cold Spring Harbor Laboratory Press, Cold Spring Harbor, N.Y. (2001); and by Silhavy, T. J., Bennan, M. L. and Enquist, L. W., *Experiments with Gene Fusions*, Cold Spring Harbor Laboratory Cold Press Spring Harbor, N Y (1984); and by Ausubel, F. M. et. al., *Short Protocols in Molecular Biology*, $5^{th}$ Ed. Current Protocols and John Wiley and Sons, Inc., N.Y., 2002.

Materials and methods suitable for the maintenance and growth of bacterial cultures are also well known in the art. Techniques suitable for use in the following Examples may be found in *Manual of Methods for General Bacteriology*, Phillipp Gerhardt, R. G. E. Murray, Ralph N. Costilow, Eugene W. Nester, Willis A. Wood, Noel R. Krieg and G. Briggs Phillips, eds., (American Society for Microbiology Press, Washington, D.C. (1994)), *Biotechnology: A Textbook of Industrial Microbiology* by Wulf Crueger and Anneliese Crueger (authors), Second Edition, (Sinauer Associates, Inc., Sunderland, Mass. (1990)), and *Manual of Industrial Microbiology and Biotechnology*, Third Edition, Richard H. Baltz, Arnold L. Demain, and Julian E. Davis (Editors), (American Society of Microbiology Press, Washington, D.C. (2010).

All reagents, restriction enzymes and materials used for the growth and maintenance of bacterial cells were obtained from BD Diagnostic Systems (Sparks, Md.), Invitrogen/Life Technologies Corp. (Carlsbad, Calif.), Life Technologies (Rockville, Md.), QIAGEN (Valencia, Calif.), Sigma-Aldrich Chemical Company (St. Louis, Mo.) or Pierce Chemical Co. (A division of Thermo Fisher Scientific Inc., Rockford, Ill.) unless otherwise specified. IPTG, (cat #I6758) and triphenyltetrazolium chloride were obtained from the Sigma Co., (St. Louis, Mo.). Bellco spin flask was from the Bellco Co., (Vineland, N.J.). LB medium was from Becton, Dickinson and Company (Franklin Lakes, N.J.). BCA protein assay was from Sigma-Aldrich (St Louis, Mo.).

Growth of Recombinant *E. coli* Strains for Production of GTF Enzymes

*Escherichia coli* strains expressing a functional GTF enzyme were grown in shake flask using LB medium with ampicillin (100 μg/mL) at 37° C. and 220 rpm to $OD_{600nm}$=0.4-0.5, at which time isopropyl-β-D-thio-galactoside (IPTG) was added to a final concentration of 0.5 mM and incubation continued for 2-4 hr at 37° C. Cells were harvested by centrifugation at 5,000×g for 15 min and resuspended (20%-25% wet cell weight/v) in 50 mM phosphate buffer pH 7.0). Resuspended cells were passed through a French Pressure Cell (SLM Instruments, Rochester, N.Y.) twice to ensure >95% cell lysis. Cell lysate was centrifuged for 30 min at 12,000×g and 4° C. The resulting supernatant (cell extract) was analyzed by the BCA protein assay and SDS-PAGE to confirm expression of the GTF enzyme, and the cell extract was stored at −80° C.

pHYT Vector

The pHYT vector backbone is a replicative *Bacillus subtilis* expression plasmid containing the *Bacillus subtilis* aprE promoter. It was derived from the *Escherichia coli-Bacillus subtilis* shuttle vector pHY320PLK (GENBANK® Accession No. D00946 and is commercially available from Takara Bio Inc. (Otsu, Japan)). The replication origin for *Escherichia coli* and ampicillin resistance gene are from pACYC177 (GENBANK® X06402 and is commercially available from New England Biolabs Inc., Ipswich, Mass.). The replication origin for *Bacillus subtilis* and tetracycline resistance gene were from pAMalpha-1 (Francia et al., *J Bacteriol.* 2002 September; 184(18):5187-93)).

To construct pHYT, a terminator sequence: 5'-ATAAAAAACGCTCGGTTGCCGCCGGGCGTTTTT-TAT-3' (SEQ ID NO: 24) from phage lambda was inserted after the tetracycline resistance gene. The entire expression cassette (EcoRI-BamHI fragment) containing the aprE promoter −AprE signal peptide sequence-coding sequence encoding the enzyme of interest (e.g., coding sequences for various GTFs)-BPN' terminator was cloned into the EcoRI and HindIII sites of pHYT using a BamHI-HindIII linker that destroyed the HindIII site. The linker sequence is 5'-GGATCCTGACTGCCTGAGCTT-3' (SEQ ID NO: 25). The aprE promoter and AprE signal peptide sequence (SEQ ID NO: 7) are native to *Bacillus subtilis*. The BPN' terminator is from subtilisin of *Bacillus amyloliquefaciens*. In the case when native signal peptide was used, the AprE signal peptide was replaced with the native signal peptide of the expressed gene.

Biolistic Transformation of *T. reesei*

A *Trichoderma reesei* spore suspension was spread onto the center ~6 cm diameter of an acetamidase transformation plate (150 μL of a $5\times10^7$-$5\times10^8$ spore/mL suspension). The plate was then air dried in a biological hood. The stopping screens (BioRad 165-2336) and the macrocarrier holders (BioRad 1652322) were soaked in 70% ethanol and air dried. DRIERITE® desiccant (calcium sulfate desiccant; W.A. Hammond DRIERITE® Company, Xenia, Ohio) was placed in small Petri dishes (6 cm Pyrex) and overlaid with Whatman filter paper (GE Healthcare Bio-Sciences, Pittsburgh, Pa.). The macrocarrier holder containing the macrocarrier (BioRad 165-2335; Bio-Rad Laboratories, Hercules, Calif.) was placed flatly on top of the filter paper and the Petri dish lid replaced. A tungsten particle suspension was prepared by adding 60 mg tungsten M-10 particles (micro-carrier, 0.7 micron, BioRad #1652266, Bio-Rad Laboratories) to an Eppendorf tube. Ethanol (1 mL) (100%) was added. The tungsten was vortexed in the ethanol solution and allowed to soak for 15 minutes. The Eppendorf tube was microfuged briefly at maximum speed to pellet the tungsten. The ethanol was decanted and washed three times with sterile distilled water. After the water wash was decanted the third time, the tungsten was resuspended in 1 mL of sterile 50% glycerol. The transformation reaction was prepared by adding 25 μL suspended tungsten to a 1.5 mL-Eppendorf tube for each transformation. Subsequent additions were made in order, 2 μL DNA pTrex3 expression vector (SEQ ID NO: 12; see U.S. Pat. No. 6,426,410), 25 μL 2.5M CaCl2), 10 μL 0.1M spermidine. The reaction was vortexed continuously for 5-10 minutes, keeping the tungsten suspended. The Eppendorf tube was then microfuged briefly and decanted. The tungsten pellet was washed with 200 μL of 70% ethanol, microfuged briefly to pellet and decanted. The pellet was washed with 200 μL of 100% ethanol, microfuged briefly to pellet, and decanted. The tungsten pellet was resuspended in 24 μL 100% ethanol. The Eppendorf tube was placed in an ultrasonic water bath for 15 seconds and 8 μL aliquots were transferred onto the center of the desiccated macrocarriers. The macrocarriers were left to dry in the desiccated Petri dishes.

A Helium tank was turned on to 1500 psi (~10.3 MPa). 1100 psi (~7.58 MPa) rupture discs (BioRad 165-2329) were used in the Model PDS-1000/He™ BIOLISTIC® Particle Delivery System (BioRad). When the tungsten solution was dry, a stopping screen and the macrocarrier holder were inserted into the PDS-1000. An acetamidase plate, containing the target *T. reesei* spores, was placed 6 cm below the stopping screen. A vacuum of 29 inches Hg (~98.2 kPa) was pulled on the chamber and held. The He BIOLISTIC® Particle Delivery System was fired. The chamber was vented and the acetamidase plate removed for incubation at 28° C. until colonies appeared (5 days).

Modified amdS Biolistic Agar (MABA) Per Liter
Part I, make in 500 mL distilled water ($dH_2O$)
1000× salts 1 mL
Noble agar 20 g
pH to 6.0, autoclave
Part II, make in 500 mL $dH_2O$
Acetamide 0.6 g
CsCl 1.68 g
Glucose 20 g
$KH_2PO_4$ 15 g
$MgSO_4.7H_2O$ 0.6 g
$CaCl_2.2H_2O$ 0.6 g
pH to 4.5, 0.2 micron filter sterilize; leave in 50° C. oven to warm, add to agar, mix, pour plates. Stored at room temperature (~21° C.)
1000× Salts Per Liter
$FeSO_4.7H_2O$ 5 g
$MnSO_4.H_2O$ 1.6 g
$ZnSO_4.7H_2O$ 1.4 g
$CoCl_2.6H_2O$ 1 g
Bring up to 1 L $dH_2O$.
0.2 micron filter sterilize Determination of the Glucosyltransferase Activity Glucosyltransferase activity assay was performed by incubating 1-10% (v/v) crude protein extract containing GTF enzyme with 200 g/L sucrose in 25 mM or 50 mM sodium acetate buffer at pH 5.5 in the presence or absence of 25 g/L dextran (MW~1500, Sigma-Aldrich, Cat. #31394) at 37° C. and 125 rpm orbital shaking. One aliquot of reaction mixture was withdrawn at 1 h, 2 h and 3 h and heated at 90° C. for 5 min to inactivate the GTF. The insoluble material was removed by centrifugation at 13,000×g for 5 min, followed by filtration through 0.2 μm RC (regenerated cellulose) membrane. The resulting filtrate was analyzed by HPLC using two Aminex HPX-87C columns series at 85° C. (Bio-Rad, Hercules, Calif.) to quantify sucrose concentration. The sucrose concentration at each time point was plotted against the reaction time and the initial reaction rate was determined from the slope of the linear plot. One unit of GTF activity was defined as the amount of enzyme needed to consume one micromole of sucrose in one minute under the assay condition.

Determination of the α-Glucanohydrolase Activity

Insoluble mutan polymers required for determining mutanase activity were prepared using secreted enzymes produced by *Streptococcus sobrinus* ATCC® 33478™. Specifically, one loop of glycerol stock of *S. sobrinus* ATCC® 33478™ was streaked on a BHI agar plate (Brain Heart Infusion agar, Teknova, Hollister, Calif.), and the plate was incubated at 37° C. for 2 days; A few colonies were picked using a loop to inoculate 2×100 mL BHI liquid medium in the original medium bottle from Teknova, and the culture was incubated at 37° C., static for 24 h. The resulting cells were removed by centrifugation and the resulting supernatant was filtered through 0.2 μm sterile filter; 2×101 mL of filtrate was collected. To the filtrate was added 2×11.2 mL of 200 g/L sucrose (final sucrose 20 g/L). The reaction was incubated at 37° C., with no agitation for 67 h. The resulting polysaccharide polymers were collected by centrifugation at 5000×g for 10 min. The supernatant was carefully decanted. The insoluble polymers were washed 4 times with 40 mL of sterile water. The resulting mutan polymers were lyophilized for 48 h. Mutan polymer (390 mg) was suspended in 39 mL of sterile water to make suspension of 10 mg/mL. The mutan suspension was homogenized by sonication (40% amplitude until large lumps disappear, ~10 min in total). The homogenized suspension was aliquoted and stored at 4° C.

A mutanase assay was initiated by incubating an appropriate amount of enzyme with 0.5 mg/mL mutan polymer (prepared as described above) in 25 mM KOAc buffer at pH 5.5 and 37° C. At various time points, an aliquot of reaction mixture was withdrawn and quenched with equal volume of 100 mM glycine buffer (pH 10). The insoluble material in each quenched sample was removed by centrifugation at 14,000×g for 5 min. The reducing ends of oligosaccharide and polysaccharide polymer produced at each time point were quantified by the p-hydroxybenzoic acid hydrazide solution (PAHBAH) assay (Lever M., Anal. Biochem., (1972) 47:273-279) and the initial rate was determined from the slope of the linear plot of the first three or four time points of the time course. The PAHBAH assay was performed by adding 10 μL of reaction sample supernatant to 100 μL of PAHBAH working solution and heated at 95° C. for 5 min. The working solution was prepared by mixing one part of reagent A (0.05 g/mL p-hydroxy benzoic acid hydrazide and 5% by volume of concentrated hydrochloric acid) and four parts of reagent B (0.05 g/mL NaOH, 0.2 g/mL sodium potassium tartrate). The absorption at 410 nm was recorded and the concentration of the reducing ends was calculated by subtracting appropriate background absorption and using a standard curve generated with various concentrations of glucose as standards. A Unit of mutanase activity is defined as the conversion of 1 micromole/min of mutan polymer at pH 5.5 and 37° C., determined by measuring the increase in reducing ends as described above.

Determination of Glycosidic Linkages

One-dimensional $^1$H NMR data were acquired on a Varian Unity Inova system (Agilent Technologies, Santa Clara, Calif.) operating at 500 MHz using a high sensitivity cryo-probe. Water suppression was obtained by carefully placing the observe transmitter frequency on resonance for the residual water signal in a "presat" experiment, and then using the "tnnoesy" experiment with a full phase cycle (multiple of 32) and a mix time of 10 ms.

Typically, dried samples were taken up in 1.0 mL of $D_2O$ and sonicated for 30 min. From the soluble portion of the sample, 100 μL was added to a 5 mm NMR tube along with 350 μL $D_2O$ and 100 μL of $D_2O$ containing 15.3 mM DSS (4,4-dimethyl-4-silapentane-1-sulfonic acid sodium salt) as internal reference and 0.29% $NaN_3$ as bactericide. The abundance of each type of anomeric linkage was measured by the integrating the peak area at the corresponding chemical shift. The percentage of each type of anomeric linkage was calculated from the abundance of the particular linkage and the total abundance anomeric linkages from oligosaccharides.

Methylation Analysis

The distribution of glucosidic linkages in glucans was determined by a well-known technique generally named "methylation analysis," or "partial methylation analysis" (see: F. A. Pettolino, et al., *Nature Protocols*, (2012) 7(9): 1590-1607). The technique has a number of minor variations but always includes: 1. methylation of all free hydroxyl groups of the glucose units, 2. hydrolysis of the methylated glucan to individual monomer units, 3. reductive ring-opening to eliminate anomers and create methylated glucitols; the anomeric carbon is typically tagged with a deuterium atom to create distinctive mass spectra, 4. acetylation of the free hydroxyl groups (created by hydrolysis and ring opening) to create partially methylated glucitol acetates, also known as partially methylated products, 5. analysis of the resulting partially methylated products by gas chromatography coupled to mass spectrometry and/or flame ionization detection.

The partially methylated products include non-reducing terminal glucose units, linked units and branching points. The individual products are identified by retention time and mass spectrometry. The distribution of the partially-methylated products is the percentage (area %) of each product in the total peak area of all partially methylated products. The gas chromatographic conditions were as follows: RTx-225 column (30 m×250 μm ID×0.1 μm film thickness, Restek Corporation, Bellefonte, Pa., USA), helium carrier gas (0.9 mL/min constant flow rate), oven temperature program starting at 80° C. (hold for 2 min) then 30° C./min to 170° C. (hold for 0 min) then 4° C./min to 240° C. (hold for 25 min), 1 μL injection volume (split 5:1), detection using electron impact mass spectrometry (full scan mode)

Viscosity Measurement

The viscosity of 12 wt % aqueous solutions of soluble oligomer/polymer was measured using a TA Instruments AR-G2 controlled-stress rotational rheometer (TA Instruments—Waters, LLC, New Castle, Del.) equipped with a cone and plate geometry. The geometry consists of a 40 mm 2° upper cone and a peltier lower plate, both with smooth surfaces. An environmental chamber equipped with a water-saturated sponge was used to minimize solvent (water) evaporation during the test. The viscosity was measured at 20° C. The peltier was set to the desired temperature and 0.65 mL of sample was loaded onto the plate using an Eppendorf pipette (Eppendorf North America, Hauppauge, N.Y.). The cone was lowered to a gap of 50 μm between the bottom of the cone and the plate. The sample was thermally equilibrated for 3 minutes. A shear rate sweep was performed over a shear rate range of 500-10 $s^{-1}$. Sample stability was confirmed by running repeat shear rate points at the end of the test.

Determination of the Concentration of Sucrose, Glucose, Fructose and Leucrose

Sucrose, glucose, fructose, and leucrose were quantitated by HPLC with two tandem Aminex HPX-87C Columns (Bio-Rad, Hercules, Calif.). Chromatographic conditions used were 85° C. at column and detector compartments, 40° C. at sample and injector compartment, flow rate of 0.6 mL/min, and injection volume of 10 μL. Software packages used for data reduction were EMPOWER™ version 3 from Waters (Waters Corp., Milford, Mass.). Calibrations were performed with various concentrations of standards for each individual sugar.

Determination of the Concentration of Oligosaccharides

Soluble oligosaccharides were quantitated by HPLC with two tandem Aminex HPX-42A columns (Bio-Rad). Chromatographic conditions used were 85° C. column temperature and 40° C. detector temperature, water as mobile phase (flow rate of 0.6 m L/min), and injection volume of 10 μL. Software package used for data reduction was EMPOWER™ version 3 from Waters Corp. Oligosaccharide samples from DP2 to DP7 were obtained from Sigma-Aldrich: maltoheptaose (DP7, Cat. #47872), maltohexanose (DP6, Cat. #47873), maltopentose (DP5, Cat. #47876), maltotetraose (DP4, Cat. #47877), isomaltotriose (DP3, Cat. #47884) and maltose (DP2, Cat. #47288). Calibration was performed for each individual oligosaccharide with various concentrations of the standard.

Purification of Soluble Oligosaccharide Fiber

Soluble oligosaccharide fiber present in product mixtures produced by the conversion of sucrose using glucosyltransferase enzymes with or without added mutanases as described in the following examples were purified and isolated by size-exclusion column chromatography (SEC). In a typical procedure, product mixtures were heat-treated at 60° C. to 90° C. for between 15 min and 30 min and then centrifuged at 4000 rpm for 10 min. The resulting supernatant was injected onto an ÄKTAprime purification system (SEC; GE Healthcare Life Sciences) (10 mL-50 mL injection volume) connected to a GE HK 50/60 column packed with 1.1 L of Bio-Gel P2 Gel (Bio-Rad, Fine 45-90 μm) using water as eluent at 0.7 mL/min. The SEC fractions (~5 mL per tube) were analyzed by HPLC for oligosaccharides using a Bio-Rad HPX-47A column. Fractions containing >DP2 oligosaccharides were combined and the soluble oligomer/polymer isolated by rotary evaporation of the combined fractions to produce a solution containing between 3% and 6% (w/w) solids, where the resulting solution was lyophilized to produce the soluble oligomer/polymer as a solid product.

Example 1

Production of Gtf-B GI:290580544 in *E. coli* TOP10

A polynucleotide encoding a truncated version of a glucosyltransferase enzyme identified in GENBANK® as GI:290580544 (SEQ ID NO: 1; Gtf-B from *Streptococcus mutans* NN2025) was synthesized using codons optimized for expression in *E. coli* (DNA 2.0). The nucleic acid product (SEQ ID NO: 2) encoding protein "GTF0544" (SEQ ID NO: 3) was subcloned into PJEXPRESS404® to generate the plasmid identified as pMP67. The plasmid pMP67 was used to transform *E. coli* TOP10 to generate the strain identified as TOP10/pMP67. Growth of the *E. coli* strain TOP10/pMP67 expressing the Gtf-B enzyme "GTF0544" (SEQ ID NO: 3) and determination of the GTF0544 activity followed the methods described above.

Example 2

Production of Mutanase MUT3264 GI: 257153264 in *E. coli* BL21(DE3)

A gene encoding mutanase from *Paenibacillus Humicus* NA1123 identified in GENBANK® as GI:257153264 (SEQ ID NO: 4) was synthesized by GenScript (GenScript USA Inc., Piscataway, N.J.). The nucleotide sequence (SEQ ID NO: 5) encoding protein sequence ("MUT3264"; SEQ ID NO: 6) was subcloned into pET24a (Novagen; Merck KGaA, Darmstadt, Germany). The resulting plasmid was transformed into *E. coli* BL21(DE3) (Invitrogen) to generate the strain identified as SGZY6. The strain was grown at 37° C. with shaking at 220 rpm to $OD_{600}$ of ~0.7, then the temperature was lowered to 18° C. and IPTG was added to a final concentration of 0.4 mM. The culture was grown overnight before harvest by centrifugation at 4000 g. The cell pellet from 600 mL of culture was suspended in 22 mL 50 mM KPi buffer, pH 7.0. Cells were disrupted by French Cell Press (2 passages @ 15,000 psi (103.4 MPa)); cell debris was removed by centrifugation (SORVALL™ SS34 rotor, @13,000 rpm; Thermo Fisher Scientific, Inc., Waltham, Mass.) for 40 min. The supernatant was analyzed by SDS-PAGE to confirm the expression of the "mut3264" mutanase and the crude extract was used for activity assay. A control strain without the mutanase gene was created by transforming *E. coli* BL21(DE3) cells with the pET24a vector.

Example 3

Production of Mutanase MUT3264 GI: 257153264 in *B. subtilis* Strain BG6006 Strain SG1021-1

SG1021-1 is a *Bacillus subtilis* mutanase expression strain that expresses the mutanase from *Paenibacillus humicus* NA1123 isolated from fermented soy bean natto. For recombinant expression in *B. subtilis*, the native signal peptide was replaced with a *Bacillus* AprE signal peptide (GENBANK® Accession No. AFG28208; SEQ ID NO: 7). The polynucleotide encoding MUT3264 (SEQ ID NO: 8) was operably linked downstream of an AprE signal peptide (SEQ ID NO: 7) encoding *Bacillus* expressed MUT3264 provided as SEQ ID NO: 9. A C-terminal lysine was deleted to provide a stop codon prior to a sequence encoding a poly histidine tag.

The *B. subtilis* host BG6006 strain contains 9 protease deletions (amyE::xylRPxylAcomK-ermC, degUHy32, oppA, ΔspoIIE3501, ΔaprE, ΔnprE, Δepr, ΔispA, Δbpr, Δvpr, ΔwprA, Δmpr-ybfJ, ΔnprB). The wild type mut3264 (as found under GENBANK® GI: 257153264) has 1146 amino acids with the N terminal 33 amino acids deduced as the native signal peptide by the SignalP 4.0 program (Nordahl et al., (2011) *Nature Methods,* 8:785-786). The mature mut3264 without the native signal peptide was synthesized by GenScript and cloned into the NheI and HindIII sites of the replicative *Bacillus* expression pHYT vector under the aprE promoter and fused with the *B. subtilis* AprE signal peptide (SEQ ID NO: 7) on the vector. The construct was first transformed into *E. coli* DH10B and selected on LB with ampicillin (100 μg/mL) plates. The confirmed construct pDCQ921 was then transformed into *B. subtilis* BG6006 and selected on the LB plates with tetracycline (12.5 μg/mL). The resulting *B. subtilis* expression strain SG1021 was purified and a single colony isolate, SG1021-1, was used as the source of the mutanase mut3264. SG1021-1 strain was first grown in LB containing 10 μg/mL tetracycline, and then sub-cultured into GrantsII medium containing 12.5 μg/mL tetracycline and grown at 37° C. for 2-3 days. The cultures were spun at 15,000 g for 30 min at 4° C. and the supernatant filtered through a 0.22 μm filter. The filtered supernatant containing MUT3264 was aliquoted and frozen at −80° C.

Example 4

Production of Mutanase MUT3325 GI: 212533325

A gene encoding the *Penicillium marneffei* ATCC® 18224™ mutanase identified in GENBANK® as GI:212533325 was synthesized by GenScript (Piscataway, N.J.). The nucleotide sequence (SEQ ID NO: 10) encoding protein sequence (MUT3325; SEQ ID NO: 11) was subcloned into plasmid pTrex3 (SEQ ID NO: 12) at SacII and AscI restriction sites, a vector designed to express the gene of interest in *Trichoderma reesei*, under control of CBHI promoter and terminator, with *Aspergillus niger* acetamidase for selection. The resulting plasmid was transformed into *T. reesei* by biolistic injection as described in the general method section, above. The detailed method of biolistic transformation is described in International PCT Patent Application Publication WO2009/126773 A1. A 1 $cm^2$ agar plug with spores from a stable clone TRM05-3 was used to inoculate the production media (described below). The culture was grown in the shake flasks for 4-5 days at 28° C. and 220 rpm. To harvest the secreted proteins, the cell mass was first removed by centrifugation at 4000 g for 10 min and the supernatant was filtered through 0.2 μM sterile filters. The expression of mutanase MUT3325 was confirmed by SDS-PAGE.

The production media component is listed below.

NREL-Trich Lactose Defined

| Formula | Amount | Units |
|---|---|---|
| ammonium sulfate | 5 | g |
| PIPPS | 33 | g |
| BD Bacto casamino acid | 9 | g |
| $KH_2PO_4$ | 4.5 | g |
| $CaCl_2$•$2H_2O$ | 1.32 | g |
| $MgSO_4$•$7H_2O$ | 1 | g |
| *T. reesei* trace elements | 2.5 | mL |
| NaOH pellet | 4.25 | g |
| Adjust pH to 5.5 with 50% NaOH | | |
| Bring volume to | 920 | mL |
| Add to each aliquot: Foamblast | 5 | Drops |
| Autoclave, then add 20% lactose filter sterilized | 80 | mL |

*T. reesei* trace elements

| Formula | Amount | Units |
|---|---|---|
| citric acid•$H_2O$ | 191.41 | g |
| $FeSO_4$•$7H_2O$ | 200 | g |

-continued

| *T. reesei* trace elements | | |
|---|---|---|
| Formula | Amount | Units |
| $ZnSO_4•7H_2O$ | 16 | g |
| $CuSO_4•5H_2O$ | 3.2 | g |
| $MnSO_4•H_2O$ | 1.4 | g |
| $H_3BO_3$ (boric acid) | 0.8 | g |
| Bring volume to | 1 | L |

Example 5

Production of MUT3325 by Fermentation

Fermentation seed culture was prepared by inoculating 0.5 L of minimal medium in a 2-L baffled flask with 1.0 mL frozen spore suspension of the MUT3325 expression strain TRM05-3 (Example 4) (The minimal medium was composed of 5 g/L ammonium sulfate, 4.5 g/L potassium phosphate monobasic, 1.0 g/L magnesium sulfate heptahydrate, 14.4 g/L citric acid anhydrous, 1 g/L calcium chloride dihydrate, 25 g/L glucose and trace elements including 0.4375 g/L citric acid, 0.5 g/L ferrous sulfate heptahydrate, 0.04 g/L zinc sulfate heptahydrate, 0.008 g/L cupric sulfate pentahydrate, 0.0035 g/L manganese sulfate monohydrate and 0.002 g/L boric add. The pH was 5.5). The culture was grown at 32° C. and 170 rpm for 48 hours before transferred to 8 L of the production medium in a 14-L fermentor. The production medium was composed of 75 g/L glucose, 4.5 g/L potassium phosphate monobasic, 0.6 g/L calcium chloride dehydrate, 1.0 g/L magnesium sulfate heptahydrate, 7.0 g/L ammonium sulfate, 0.5 g/L citric acid anhydrous, 0.5 g/L ferrous sulfate heptahydrate, 0.04 g/L zinc sulfate heptahydrate, 0.00175 g/L cupric sulfate pentahydrate, 0.0035 g/L manganese sulfate monohydrate, 0.002 g/L boric acid and 0.3 mL/L foam blast 882.

The fermentation was first run with batch growth on glucose at 34° C., 500 rpm for 24 h. At the end of 24 h, the temperature was lowered to 28° C. and agitation speed was increased to 1000 rpm. The fermentor was then fed with a mixture of glucose and sophorose (62% w/w) at specific feed rate of 0.030 g glucose-sophorose solids/g biomass/hr. At the end of run, the biomass was removed by centrifugation and the supernatant containing the mutanase was concentrated about 10-fold by ultrafiltration using 10-kD Molecular Weight Cut-Off ultrafiltration cartridge (UFP-10-E-35; GEHealthcare, Lithe Chalfont, Buckinghamshire, UK). The concentrated protein was stored at −80° C.

Example 6

Isolation of Soluble Oligosaccharide Fiber Produced by the Combination of GTF-B and MUT3264

A 200-mL reaction containing 100 g/L sucrose, *E. coli* crude protein extract (10% v/v) containing GTF-B from *Streptococcus mutans* NN2025 (GI:290580544; Example 1), and *E. coli* crude protein extract (10% v/v) comprising a mutanase from *Paenibacillus humicus* (MUT3264, GI:257153264; Example 2) in distilled, deionized $H_2O$, was stirred at 37° C. for 24 h, then heated to 90° C. for 15 min to inactivate the enzymes. The resulting product mixture was centrifuged and the resulting supernatant analyzed by HPLC for soluble monosaccharides, disaccharides and oligosaccharides, then 132 mL of the supernatant was purified by SEC using BioGel P2 resin (BioRad). The SEC fractions that contained oligosaccharides ≥DP3 were combined and concentrated by rotary evaporation for analysis by HPLC (Table 1).

TABLE 1

Soluble oligosaccharide fiber produced by GTF-B/mut3264 mutanase.
100 g/L sucrose, GTF-B, mut3264, 37° C., 24 h

| | Product mixture, g/L | SEC-purified product, g/L |
|---|---|---|
| DP7 | 2.8 | 11.7 |
| DP6 | 4.0 | 14.0 |
| DP5 | 4.3 | 13.2 |
| DP4 | 3.5 | 9.4 |
| DP3 | 4.4 | 2.4 |
| DP2 | 9.8 | 0.0 |
| Sucrose | 10.3 | 0.2 |
| Leucrose | 15.6 | 0.0 |
| Glucose | 2.9 | 0.0 |
| Fructose | 41.7 | 0.1 |
| Sum DP2-DP7 | 28.8 | 50.7 |
| Sum DP3-DP7 | 19.0 | 50.7 |

Example 7

Production of GTF-C GI:3130088 in *E. coli* BL21

A gene encoding a truncated version of a glucosyltransferase (gtf) enzyme identified in GENBANK® as GI:3130088 (SEQ ID NO: 13; gtfC from *S. mutans* MT-4239) was synthesized using codons optimized for expression in *E. coli* (DNA 2.0, Menlo Park, Calif.). The nucleic acid product encoding a truncated version of the *S. mutans* GTF0088 glucosyltransferase (SEQ ID NO: 14) was subcloned into PJEXPRESS404® (DNA 2.0, Menlo Park Calif.) to generate the plasmid identified as pMP69 (SEQ ID NO: 15). The plasmid pMP69 was used to transform *E. coli* BL21 (EMD Millipore, Billerica, Mass.) to generate the strain identified as BL21-GI3130088, producing truncated form of the *S. mutans* GENBANK® gi:3130088 glucosyltransferase; also referred to herein as "GTF0088" (SEQ ID NO: 16). A single colony from the transformation plate was streaked onto a plate containing LB agar with 100 ug/ml ampicillin and incubated overnight at 37° C. A single colony from the plate was inoculated into LB media containing 100 ug/mL ampicillin and grown at 37° C. with shaking at 220 rpm for 3.5 hours. The culture was diluted 1250 fold into 8 flasks containing 2 L total of LB media with 100 ug/ml ampicillin and grown at 37° C. with shaking at 220 rpm for 4 hours. IPTG was added to a final concentration of 0.5 mM and the cultures were grown overnight before harvesting by centrifugation at 9000×g. The cell pellet was suspended in 50 mM KPi buffer, pH 7.0 at a ratio of 5 ml buffer per gram wet cell weight. Cells were disrupted by French Cell Press (2 passages @ 16,000 psi) and cell debris was removed by centrifugation at 25,000×g. Cell free extract was stored at −80° C.

Example 8

Production of *S. mutans* LJ23 GTF GI:387786207 in *E. coli* TOP10

The amino acid sequence of the *Streptococcus mutans* LJ23 glucosyltransferase (gtf) as described in GENBANK® as 387786207 is provided as SEQ ID NO: 17. A coding sequence (SEQ ID NO: 18) encoding a truncated version (SEQ ID NO: 19) of the glucosyltransferase (gtf) enzyme identified in GENBANK® as 387786207 ("GTF6207") from *S. mutans* LJ23 was prepared by mutagenesis of the pMP69 plasmid described in Example 7. A 1630 bp DNA fragment encoding a portion of GI:387786207 (SEQ ID NO:20) was ordered from GenScript (Piscataway, N.J.). The resultant plasmid (6207f1 in pUC57) was employed as a template for PCR with primers 8807f1 (5'-AATACAATCA-GGTGTATTCGACGGATGC-3'; SEQ ID NO: 21) and 8807r1 (5'-TCCTGATCGCTGTGATACGCTTTGATG-3'; SEQ ID NO: 22). The PCR conditions for amplification were as follows: 1. 95° C. for 2 minutes, 2. 95° C. for 40 seconds, 3. 48° C. for 30 seconds, 4. 72° C. for 1.5 minutes, 5. return to step 2 for 30 cycles, 6. 4° C. indefinitely. The reaction sample contained 0.5 uL of plasmid DNA for 6207f1 in pUC57 (90 ng), 4 uL of a mixture of primers 8807f1 and 8807r1 (40 μmol each), 5 uL of the 10× buffer, 2 uL 10 mM dNTPs mixture, 1 uL of the Pfu Ultra AD (Agilent Technologies, Santa Clara, Calif.) and 37.5 uL distilled water. The PCR product was gel purified with the GFX PCR DNA and Gel Band Purification Kit (GE Healthcare Bio-Sciences Corp., Piscataway, N.J.). The purified product was employed as a megaprimer for mutagenesis of pMP69 with the QuikChange Lightning Site-Directed Mutagenesis Kit (Agilent Technologies, Santa Clara, Calif.). The conditions for the mutagenesis reaction were as follows: 1. 95° C. for 2 minutes, 2. 95° C. for 30 seconds, 3. 60° C. for 30 seconds, 4. 68° C. for 12 minutes, 5. return to step 2 for 18 cycles, 6. 68° C. for 7 minutes, 7. 4° C. indefinitely. The reaction sample contained 1 uL of the pMP69 (50 ng), 17 uL of the PCR product (500 ng), 5 uL of the 10× buffer, 1.5 uL QuikSolution reagent, 1 uL of dNTP mixture, 1 uL of QuikChange Lightning Enzyme and 23.5 uL distilled water. 2 uL of DpnI was added and the mixture was incubated for 1 hr at 37° C. The resultant product was then transformed into ONE SHOT® TOP10 Chemically Competent *E. coli* (Life Technologies, Grand Island, N.Y.). Colonies from the transformation were grown overnight in LB media containing 100 ug/mL ampicillin and plasmids were isolated with the QIAprep Spin Miniprep Kit (Qiaqen, Valencia, Calif.). Sequence analysis was performed to confirm the presence of the gene encoding gi:387786207. The resultant plasmid p6207-1 (SEQ ID NO:22) was transformed into *E. coli* BL21 (EMD Millipore, Billerica, Mass.) to generate the strain identified as BL21-6207. A single colony from the plate was inoculated into 5 mL LB media containing 100 ug/mL ampicillin and grown at 37° C. with shaking at 220 rpm for 8 hours. The culture was diluted 200 fold into 4 flasks containing 1 L total of LB media with 100 ug/mL ampicillin and 1 mM IPTG. Cultures were grown at 33° C. overnight before harvesting by centrifugation at 9000×g. The cell pellet was suspended in 50 mM KPi buffer, pH 7.0 at a ratio of 5 mL buffer per gram wet cell weight. Cells were disrupted by French Cell Press (2 passages @ 16,000 psi) and cell debris was removed by centrifugation at 25,000×g. Cell free extract was stored at −80° C.

Example 9

Isolation of Soluble Oligosaccharide Fiber Produced by GTF-C GI:3130088

A 600-mL reaction containing 200 g/L sucrose, *E. coli* concentrated crude protein extract (10.0% v/v) containing GTF GI:3130088 from *S. mutans* MT-4239 GTF-C (Example 7) in distilled, deionized $H_2O$, was stirred at 30° C. for 22 h, then heated to 90° C. for 10 min to inactivate the enzyme. The resulting product mixture was centrifuged and the resulting supernatant analyzed by HPLC for soluble monosaccharides, disaccharides and oligosaccharides, then the supernatant was purified by SEC using BioGel P2 resin (BioRad). The SEC fractions that contained oligosaccharides ≥DP3 were combined and concentrated by rotary evaporation for analysis by HPLC (Table 2).

TABLE 2

Soluble oligosaccharide fiber produced by GTF GI: 3130088. 200 g/L sucrose, GTF-C, 30° C., 22 h

| | Product mixture, g/L | SEC-purified product, g/L |
|---|---|---|
| ≥DP8 | 29.2 | 49.3 |
| DP7 | 10.0 | 14.5 |
| DP6 | 9.5 | 11.6 |
| DP5 | 9.0 | 8.6 |
| DP4 | 6.2 | 4.3 |
| DP3 | 4.5 | 2.0 |
| DP2 | 5.0 | 1.0 |
| Sucrose | 0.7 | 0.1 |
| Leucrose | 41.3 | 0.0 |
| Glucose | 8.6 | 0.0 |
| Fructose | 64.3 | 0.2 |
| Sum DP2-≥DP8 | 73.4 | 91.3 |
| Sum DP3-≥DP8 | 68.4 | 90.3 |

Example 10

Isolation of Soluble Oligosaccharide Fiber Produced by GTF GI: 387786207

A 600-mL reaction containing 200 g/L sucrose, *E. coli* concentrated crude protein extract (10.0% v/v) containing GTF6207 (SEQ ID NO: 19) from *S. mutans* 1123 (Example 8) in distilled, deionized $H_2O$, was stirred at 37° C. for 72 h, then heated to 90° C. for 10 min to inactivate the enzyme. The resulting product mixture was centrifuged and the resulting supernatant analyzed by HPLC for soluble monosaccharides, disaccharides and oligosaccharides, then 580 mL of the supernatant was purified by SEC using BioGel P2 resin (BioRad). The SEC fractions that contained oligosaccharides ≥DP3 were combined and concentrated by rotary evaporation for analysis by HPLC (Table 3).

TABLE 3

Soluble oligosaccharide fiber produced by GTF GI: 387786207. 200 g/L sucrose, GTF GI: 387786207, 30° C., 72 h

| | Product mixture, g/L | SEC-purified product, g/L |
|---|---|---|
| ≥DP8 | 19.2 | 83.2 |
| DP7 | 7.9 | 28.3 |
| DP6 | 8.5 | 26.2 |
| DP5 | 7.4 | 24.8 |
| DP4 | 4.9 | 13.1 |
| DP3 | 3.3 | 5.0 |
| DP2 | 4.2 | 2.0 |
| Sucrose | 36.5 | 0.0 |
| Leucrose | 31.5 | 1.5 |
| Glucose | 6.0 | 0.0 |
| Fructose | 56.5 | 1.3 |
| Sum DP2-≥DP8 | 55.4 | 182.6 |
| Sum DP3-≥DP8 | 51.2 | 180.6 |

Example 11

Anomeric Linkage Analysis of Soluble Oligosaccharide Fiber Produced by GTF-C and by GTF-6207

Solutions of chromatographically-purified soluble oligosaccharide fibers prepared as described in Examples 6, 9 and 10 were dried to a constant weight by lyophilization, and the resulting solids analyzed by $^{1}H$ NMR spectroscopy and by GC/MS as described in the General Methods section (above). The anomeric linkages for each of these soluble oligosaccharide fiber mixtures are reported in Tables 4 and 5.

TABLE 4

Anomeric linkage analysis of soluble oligosaccharides by $^{1}H$ NMR spectroscopy.

| Example # | GTF | % α-(1,3) | % α-(1,2) | % α-(1,3,6) | % α-(1,2,6) | % α-(1,6) |
|---|---|---|---|---|---|---|
| 6 | GTF0544/MUT3264 | 15 | 0 | 3.4 | 0 | 81.6 |
| 9 | GTF-C GI:3130088 | 7.8 | 0.0 | 1.3 | 0 | 90.9 |
| 10 | GTF GI:387786207 | 6.0 | 1.7 | 1.4 | 0 | 90.9 |

TABLE 5

Anomeric linkage analysis of soluble oligosaccharides by GC/MS.

| Example # | GTF | % α-(1,4) | % α-(1,3) | % α-(1,3,6) | % 2,1 Fruc | % α-(1,2) | % α-(1,6) | % α-(1,3,4) | % α-(1,2,3) | % α-(1,4,6) + α-(1,2,6) |
|---|---|---|---|---|---|---|---|---|---|---|
| 6 | GTF0544/MUT3264 | 0.4 | 24.1 | 2.5 | 1.0 | 0.5 | 70.9 | 0.0 | 0.0 | 0.6 |
| 9 | GTF-C GI:3130088 | 0.6 | 14.0 | 1.4 | 1.1 | 0.9 | 80.8 | 0.0 | 0.0 | 1.2 |
| 10 | GTF GI:387786207 | 0.3 | 11.8 | 0.0 | 1.1 | 0.5 | 86.3 | 0.0 | 0.0 | 0.0 |

Example 12

Viscosity of Soluble Oligosaccharide Fiber Produced by GTF-C and by GTF-6207

Solutions of chromatographically-purified soluble oligosaccharide fibers prepared as described in Examples 6, 9 and 10 were dried to a constant weight by lyophilization, and the resulting solids were used to prepare a 12 wt % solution of soluble fiber in distilled, deionized water. The viscosity of the soluble fiber solutions (reported in centipoise (cP), where 1 cP=1 millipascal-s (mPa-s)) (Table 6) was measured at 20° C. as described in the General Methods section.

TABLE 6

Viscosity of 12% (w/w) soluble oligosaccharide fiber solutions measured at 20° C. (ND = not determined).

| Example # | GTF | viscosity (cP) |
|---|---|---|
| 6 | GTF0544/MUT3264 | 6.7 |
| 9 | GTF-C GI: 3130088 | 1.8 |
| 10 | GTF GI: 387786207 | 1.7 |

Example 13

Molecular Weight of Oligosaccharide Fiber Produced by GTF-C or by the Combination of GTF-B and MUT3264

A solution of chromatographically-purified soluble oligosaccharide fibers prepared as described in Examples 9 and Example 6 were dried to a constant weight by lyophilization, and the resulting solids were analyzed by SEC chromatography for number average molecular weight ($M_n$), weight average molecular weight ($M_w$), peak molecular weight ($M_p$), z-average molecular weight ($M_z$), and polydispersity index ($PDI=M_w/M_n$) as described in the General Methods section (Table 7).

TABLE 7

Characterization of soluble oligosaccharide fiber by SEC.

| Example # | GTF or GTF/mutanase | $M_n$ (Daltons) | $M_w$ (Daltons) | $M_p$ (Daltons) | $M_z$ (Daltons) | PDI |
|---|---|---|---|---|---|---|
| 9 | GTF-C GI:3130088 | 821 | 1265 | 1560 | 1702 | 1.54 |
| 6 | GTF0544/mut3264 | 1314 | 1585 | 1392 | 1996 | 1.21 |

Example 13A

Construction of *Bacillus subtilis* Strains Expressing Homolog Genes of GTF0088

The amino acid sequence of the GTF0088 enzyme (GI 3130088) was used as a query to search the NR database (non-redundant version of the NCBI protein database) with BLAST. From the BLAST search, over 60 sequences were identified having at least 80% identity over an alignment length of at least 1000 amino acids. These sequences were then aligned using CLUSTALW. Using Discovery Studio, a phylogenetic tree was also generated. The tree had three major branches. More than two dozen of the homologs belonged to the same branch as GTF0088. These sequences have amino acid sequence identities between 91.5%-99.5% in an aligned region of ~1455 residues, which extends from position 1 to 1455 in GTF0088. One of the homologs, GTF6207, was evaluated as described in Examples 10-12. Ten additional homologs, together with GTF0088 in native codons (Table 8) were synthesized with N terminal variable region truncation by Genscript. The synthetic genes were cloned into the NheI and HindIII sites of the *Bacillus subtilis* integrative expression plasmid p4JH under the aprE promoter and fused with the *B. subtilis* AprE signal peptide on the vector. In some cases, they were cloned into the SpeI and HindIII sites of the *Bacillus subtilis* integrative expression plasmid p4JH under the aprE promoter without a signal peptide. The constructs were first transformed into *E. coli*

DH10B and selected on LB with ampicillin (100 ug/ml) plates. The confirmed constructs expressing the particular GTFs were then transformed into *B. subtilis* host containing 9 protease deletions (amyE::xylRPxylAcomK-ermC, degUHy32, oppA, ΔspoIIE3501, ΔaprE, ΔnprE, Δepr, ΔispA, Δbpr, Δvpr, ΔwprA, Δmpr-ybfJ, ΔnprB) and selected on the LB plates with chloramphenicol (5 ug/ml). The colonies grown on LB plates with 5 ug/ml chloramphenicol were streaked several times onto LB plates with 25 ug/ml chloramphenicol. The resulted *B. subtilis* expression strains were grown in LB medium with 5 ug/ml chloramphenicol first and then subcultured into GrantsII medium grown at 30° C. for 2-3 days. The cultures were spun at 15,000 g for 30 min at 4° C. and the supernatants were filtered through 0.22 urn filters. The filtered supernatants were aliquoted and frozen at −80° C.

TABLE 8

GTF0088 homologues with N terminal truncation tested in this application

| GI number | % Identity | Source Organism | DNA seq SEQ ID | aa seq SEQ ID |
|---|---|---|---|---|
| gi\|3130088\| | 100.00 | *Streptococcus mutans* MT4239 | 26 | 16 |
| gi\|387786207\| | 99.50 | *Streptococcus mutans* LJ23 | 18 | 19 |
| gi\|440355330\| | 99.45 | *Streptococcus mutans* UA113 | 27 | 28 |
| gi\|440355318\| | 99.45 | *Streptococcus mutans* BZ15 | 29 | 30 |
| gi\|440355326\| | 99.29 | *Streptococcus mutans* Leo | 31 | 32 |
| gi\|440355312\| | 99.21 | *Streptococcus mutans* Asega | 33 | 34 |
| gi\|440355334\| | 99.13 | *Streptococcus mutans* UA140 | 35 | 36 |
| gi\|3130095\| | 98.97 | *Streptococcus mutans* MT4251 | 37 | 38 |
| gi\|3130074\| | 98.82 | *Streptococcus mutans* MT8148 | 39 | 40 |
| gi\|440355320\| | 98.82 | *Streptococcus mutans* CH638 | 41 | 42 |
| gi\|3130081\| | 97.58 | *Streptococcus mutans* MT4245 | 43 | 44 |
| gi\|440355328\| | 97.31 | *Streptococcus troglodytae* Mark | 45 | 46 |

The supernatants containing the GTF0088 homolog enzymes with N terminal truncation were tested for activity in the sucrose conversion assay. After three days, the samples were analyzed by HPLC. The following table shows that all the N terminal truncated homolog enzymes were active in converting sucrose and the profile of the produced small sugars and oligomers was similar.

TABLE 9

HPLC analysis of sucrose conversion by the GTF0088 homologs.

| gene | DP8 & up est. (g/L) | DP7 (g/L) | DP6 (g/L) | DP5 (g/L) | DP4 (g/L) | DP3 (g/L) | DP3 & up (g/L) | DP2 (g/L) | Sucrose (g/L) | Leucrose (g/L) | Glucose (g/L) | Frucrose (g/L) | Total Sugar (g/L) |
|---|---|---|---|---|---|---|---|---|---|---|---|---|---|
| gtf0074NT | 21.6 | 6.6 | 8.6 | 7.5 | 5.6 | 4.2 | 53.9 | 6.0 | 1.1 | 21.0 | 7.0 | 44.5 | 133.4 |
| gtf0081NT | 29.3 | 5.5 | 5.6 | 5.2 | 4.2 | 3.7 | 53.4 | 6.0 | 1.1 | 21.3 | 6.4 | 45.1 | 133.2 |
| gtf0088NT | 20.9 | 6.7 | 7.7 | 7.6 | 5.5 | 4.0 | 52.5 | 5.2 | 1.2 | 19.2 | 7.1 | 45.5 | 130.7 |
| gtf0095NT | 28.6 | 5.6 | 6.3 | 5.5 | 3.9 | 3.2 | 53.0 | 5.2 | 0.9 | 23.0 | 6.8 | 44.3 | 133.3 |
| gtf5312NT | 24.7 | 7.0 | 7.2 | 7.5 | 5.6 | 3.7 | 55.6 | 5.1 | 1.0 | 18.2 | 6.6 | 46.2 | 132.6 |
| gtf5318NT | 25.9 | 7.2 | 6.7 | 7.2 | 5.0 | 3.7 | 55.6 | 4.9 | 1.0 | 18.6 | 6.4 | 46.3 | 132.8 |
| gtf5320NT | 26.6 | 6.1 | 6.4 | 6.1 | 4.7 | 3.9 | 53.8 | 5.3 | 0.9 | 23.7 | 6.6 | 44.9 | 135.3 |
| gtf5326NT | 28.6 | 7.3 | 6.5 | 6.5 | 4.7 | 3.4 | 57.0 | 5.0 | 0.8 | 19.0 | 6.6 | 46.8 | 135.2 |
| gtf5328NT | 23.7 | 7.1 | 7.1 | 7.1 | 5.5 | 4.2 | 54.7 | 6.1 | 1.1 | 18.2 | 6.7 | 46.9 | 133.7 |
| gtf5330NT | 24.7 | 6.8 | 7.8 | 7.5 | 5.6 | 3.9 | 56.4 | 5.2 | 1.0 | 19.0 | 6.6 | 46.7 | 134.8 |
| gtf5334NT | 13.0 | 6.4 | 8.3 | 8.3 | 7.3 | 4.7 | 48.0 | 6.0 | 1.8 | 18.2 | 6.5 | 47.4 | 127.9 |

Example 13B

Construction of *Bacillus subtilis* Strains Expressing C Terminal Truncations of GTF0088 Homolog Genes Glucosyltransferases usually contain an N-terminal variable domain, a middle catalytic domain followed by multiple glucan binding domains at the C terminus. The GTF0088 homologs tested in Example 13A all contained the N terminal variable region truncation. Homologs with additional C terminal truncations of part of the glucan binding domains were also prepared and evaluated. This example describes the construction of *Bacillus subtilis* strains expressing two of the C terminal truncations of GTF0088 homologs.

The C terminal T1 or T3 truncation was made to the GTF0088, GTF5318, GTF5328 and GTF5330 listed in the table in Example 13A. The nucleotide sequences of these T1 strains are shown in SEQ ID NOs: 47-53 (odd numbers); the amino acid sequences of these T1 strains are shown in SEQ ID NOs: 48-54 (even numbers). The nucleotide sequences of the T3 strains are shown in SEQ ID NOs: 55-61 (odd numbers); the amino acid sequences of the T3 strains are shown in SEQ ID NOs: 56-62 (even numbers). The DNA fragments encoding the T1 or T3 truncation were PCR amplified from the synthetic gene plasmids provided by Genscript and cloned into the SpeI and HindIII sites of the *Bacillus subtilis* integrative expression plasmid p4JH under the aprE promoter without a signal peptide. The constructs were first transformed into *E. coli* DH10B and selected on LB with ampicillin (100 ug/ml) plates. The confirmed constructs expressing the particular GTFs were then transformed into *B. subtilis* host strains containing 9 protease deletions (amyE::xylRPxylAcomK-ermC, degUHy32, oppA, ΔspoIIE3501, ΔaprE, ΔnprE, Δepr, ΔispA, Δbpr, Δvpr, ΔmprA, Δmpr-ybfJ, ΔnprB) and selected on the LB plates with chloramphenicol (5 ug/ml). The colonies grown on LB plates with 5 ug/ml chloramphenicol were streaked several times onto LB plates with 25 ug/ml chloramphenicol. The resulting *B. subtilis* expression strains were grown first in LB medium with 5 ug/ml chloramphenicol and then subcultured into GrantsII medium grown at 30° C. for 2-3 days. The cultures were spun at 15,000 g for 30 min at 4° C.

and the supernatants were filtered through 0.22 um filters. The filtered supernatants were aliquoted and frozen at −80° C.

Example 13C

Isolation of Soluble Oligosaccharide Fiber Produced by the C-Terminal Truncated GTF0088T1

A 250 mL reaction containing 450 g/L sucrose and *B. subtilis* crude protein extract (5% v/v) containing a version of GTF0088 from *Streptococcus mutans* MT4239 (GI: 3130088; Example 13A) having additional C terminal truncations of part of the glucan binding domains (GTF0088-T1, Example 13B) in distilled, deionized $H_2O$, was stirred at pH 5.5 and 47° C. for 22 h, then heated to 90° C. for 30 min to inactivate the enzymes. The resulting product mixture was centrifuged and the resulting supernatant analyzed by HPLC for soluble monosaccharides, disaccharides and oligosaccharides (Table 10), then the oligosaccharides were isolated from the supernatant by SEC at 40° C. using Diaion UBK 530 ($Na^+$ form) resin (Mitsubishi). The SEC fractions that contained oligosaccharides ≥DP3 were combined and concentrated by rotary evaporation for analysis by HPLC (Table 10). The combined SEC fractions were diluted to 5 wt % dry solids (DS) and freeze-dried to produce the fiber as a dry solid.

TABLE 10

Soluble oligosaccharide fiber produced by GTF0088-T1.
450 g/L sucrose, GTF0088-T1, 47° C., 22 h

| | Product mixture, g/L | SEC-purified product, g/L | SEC-purified product % (wt/wt DS) |
|---|---|---|---|
| DP8+ | 74.8 | 47.3 | 44.8 |
| DP7 | 27.1 | 16.4 | 15.5 |
| DP6 | 28.2 | 13.8 | 13.1 |
| DP5 | 26.4 | 12.8 | 12.1 |
| DP4 | 18.5 | 7.2 | 6.8 |
| DP3 | 13.8 | 4.5 | 4.3 |
| DP2 | 16.8 | 2.3 | 2.2 |
| Sucrose | 5.5 | 1.1 | 1.1 |
| Leucrose | 82.4 | 0.2 | 0.2 |
| Glucose | 9.4 | 0.0 | 0.0 |
| Fructose | 156.7 | 0.0 | 0.0 |
| Sum DP2-DP8+ | 205.6 | 104.3 | 98.7 |
| Sum DP3-DP8+ | 188.8 | 102.0 | 96.5 |

Example 13D

Isolation of Soluble Oligosaccharide Fiber Produced by the C-Terminal Truncated GTF5318-T1

A 250 mL reaction containing 450 g/L sucrose and *B. subtilis* crude protein extract (5% v/v) containing a version of GTF5318 from *Streptococcus mutans* BZ15 (GI: 440355318; Example 13A) having additional C terminal truncations of part of the glucan binding domains (GTF5318-T1, Examples 13A and 13B) in distilled, deionized $H_2O$, was stirred at pH 5.5 and 47° C. for 4 h, then heated to 90° C. for 30 min to inactivate the enzymes. The resulting product mixture was centrifuged and the resulting supernatant analyzed by HPLC for soluble monosaccharides, disaccharides and oligosaccharides (Table 11), then the oligosaccharides were isolated from the supernatant by SEC at 40° C. using Diaion UBK 530 ($Na^+$ form) resin (Mitsubishi). The SEC fractions that contained oligosaccharides ≥DP3 were combined and concentrated by rotary evaporation for analysis by HPLC (Table 11). The combined SEC fractions were diluted to 5 wt % dry solids (DS) and freeze-dried to produce the fiber as a dry solid.

TABLE 11

Soluble oligosaccharide fiber produced by GTF5318-T1.
450 g/L sucrose, GTF5318-T1, 47° C., 4 h

| | Product mixture, g/L | SEC-purified product, g/L | SEC-purified product % (wt/wt DS) |
|---|---|---|---|
| DP8+ | 111.2 | 75.6 | 62.7 |
| DP7 | 19.9 | 13.0 | 10.8 |
| DP6 | 19.5 | 11.6 | 9.6 |
| DP5 | 18.2 | 8.2 | 6.8 |
| DP4 | 14.0 | 5.8 | 4.8 |
| DP3 | 10.7 | 3.6 | 3.0 |
| DP2 | 14.8 | 2.4 | 2.0 |
| Sucrose | 6.4 | 0.0 | 0.0 |
| Leucrose | 82.9 | 0.4 | 0.3 |
| Glucose | 7.7 | 0.0 | 0.0 |
| Fructose | 166.6 | 0.0 | 0.0 |
| Sum DP2-DP8+ | 208.3 | 120.3 | 99.7 |
| Sum DP3-DP8+ | 193.5 | 117.9 | 97.7 |

Example 13E

Isolation of Soluble Oligosaccharide Fiber Produced by the C-Terminal Truncated GTF5328-T1

A 250 mL reaction containing 450 g/L sucrose and *B. subtilis* crude protein extract (5% v/v) containing a version of GTF5328 from *Streptococcus troglodytae* Mark (GI: 440355328; Example 13A) having additional C terminal truncations of part of the glucan binding domains (GTF5328-T1, Examples 13A and 13B) in distilled, deionized $H_2O$, was stirred at pH 5.5 and 47° C. for 4 h, then heated to 90° C. for 30 min to inactivate the enzymes. The resulting product mixture was centrifuged and the resulting supernatant analyzed by HPLC for soluble monosaccharides, disaccharides and oligosaccharides (Table 12), then the oligosaccharides were isolated from the supernatant by SEC at 40° C. using Diaion UBK 530 ($Na^+$ form) resin (Mitsubishi). The SEC fractions that contained oligosaccharides ≥DP3 were combined and concentrated by rotary evaporation for analysis by HPLC (Table 12). The combined SEC fractions were diluted to 5 wt % dry solids (DS) and freeze-dried to produce the fiber as a dry solid.

TABLE 12

Soluble oligosaccharide fiber produced by GTF5328-T1.
450 g/L sucrose, GTF5328-T1, 47° C., 4 h

| | Product mixture, g/L | SEC-purified product, g/L | SEC-purified product % (wt/wt DS) |
|---|---|---|---|
| DP8+ | 91.3 | 69.2 | 57.6 |
| DP7 | 21.2 | 14.1 | 11.8 |
| DP6 | 21.2 | 13.3 | 11.1 |
| DP5 | 19.4 | 10.5 | 8.7 |

TABLE 12-continued

| Soluble oligosaccharide fiber produced by GTF5328-T1. 450 g/L sucrose, GTF5328-T1, 47° C., 4 h | | | |
|---|---|---|---|
| | Product mixture, g/L | SEC-purified product, g/L | SEC-purified product % (wt/wt DS) |
| DP4 | 14.9 | 6.8 | 5.7 |
| DP3 | 10.9 | 3.7 | 3.1 |
| DP2 | 13.6 | 2.2 | 1.8 |
| Sucrose | 5.3 | 0.0 | 0.0 |
| Leucrose | 94.2 | 0.2 | 0.2 |
| Glucose | 8.4 | 0.0 | 0.0 |
| Fructose | 161.6 | 0.0 | 0.0 |
| Sum DP2-DP8+ | 194.3 | 119.9 | 99.8 |
| Sum DP3-DP8+ | 178.7 | 117.7 | 98.0 |

Example 13F

Isolation of Soluble Oligosaccharide Fiber Produced by the C-Terminal Truncated GTF5330-T1

A 250 mL reaction containing 450 g/L sucrose and *B. subtilis* crude protein extract (5% v/v) containing a version of GTF5330 from *Streptococcus mutans* UA113 (GI: 440355330; Example 13A) having additional C terminal truncations of part of the glucan binding domains (GTF5330-T1, Examples 13A and 13B) in distilled, deionized $H_2O$, was stirred at pH 5.5 and 47° C. for 4 h, then heated to 90° C. for 30 min to inactivate the enzymes. The resulting product mixture was centrifuged and the resulting supernatant analyzed by HPLC for soluble monosaccharides, disaccharides and oligosaccharides (Table 13), then the oligosaccharides were isolated from the supernatant by SEC at 40° C. using Diaion UBK 530 ($Na^+$ form) resin (Mitsubishi). The SEC fractions that contained oligosaccharides ≥DP3 were combined and concentrated by rotary evaporation for analysis by HPLC (Table 13). The combined SEC fractions were diluted to 5 wt % dry solids (DS) and freeze-dried to produce the fiber as a dry solid.

TABLE 13

| Soluble oligosaccharide fiber produced by GTF5330-T1. 450 g/L sucrose, GTF5330-T1, 47° C., 4 h | | | |
|---|---|---|---|
| | Product mixture, g/L | SEC-purified product, g/L | SEC-purified product % (wt/wt DS) |
| DP8+ | 89.5 | 67.5 | 56.6 |
| DP7 | 22.1 | 14.3 | 12.0 |
| DP6 | 22.0 | 12.8 | 10.7 |
| DP5 | 19.1 | 10.6 | 8.9 |
| DP4 | 14.3 | 7.0 | 5.9 |
| DP3 | 11.6 | 4.2 | 3.5 |
| DP2 | 15.7 | 2.8 | 2.3 |
| Sucrose | 6.1 | 0.0 | 0.0 |
| Leucrose | 87.0 | 0.2 | 0.2 |
| Glucose | 8.5 | 0.0 | 0.0 |
| Fructose | 162.9 | 0.0 | 0.0 |
| Sum DP2-DP8+ | 194.3 | 119.1 | 99.8 |
| Sum DP3-DP8+ | 178.7 | 116.3 | 97.5 |

Example 13G

Isolation of Soluble Oligosaccharide Fiber Produced by the C-Terminal Truncated GTF5330-T3

A 250 mL reaction containing 450 g/L sucrose and *B. subtilis* crude protein extract (5% v/v) containing a version of GTF5330 from *Streptococcus mutans* UA113 (GI: 440355330; Example 13A) having additional C terminal truncations of part of the glucan binding domains (GTF5330-T3, Examples 13A and 13B) in distilled, deionized $H_2O$, was stirred at pH 5.5 and 47° C. for 4 h, then heated to 90° C. for 30 min to inactivate the enzymes. The resulting product mixture was centrifuged and the resulting supernatant analyzed by HPLC for soluble monosaccharides, disaccharides and oligosaccharides (Table 14), then the oligosaccharides were isolated from the supernatant by SEC at 40° C. using Diaion UBK 530 ($Na^+$ form) resin (Mitsubishi). The SEC fractions that contained oligosaccharides ≥DP3 were combined and concentrated by rotary evaporation for analysis by HPLC (Table 14). The combined SEC fractions were diluted to 5 wt % dry solids (DS) and freeze-dried to produce the fiber as a dry solid.

TABLE 14

| Soluble oligosaccharide fiber produced by GTF5330-T3. 450 g/L sucrose, GTF5330-T3, 47° C., 4 h | | | |
|---|---|---|---|
| | Product mixture, g/L | SEC-purified product, g/L | SEC-purified product % (wt/wt DS) |
| DP8+ | 98.0 | 64.7 | 53.7 |
| DP7 | 23.8 | 15.1 | 12.6 |
| DP6 | 22.5 | 13.2 | 11.0 |
| DP5 | 19.4 | 10.5 | 8.8 |
| DP4 | 16.2 | 7.7 | 6.4 |
| DP3 | 15.5 | 4.9 | 4.1 |
| DP2 | 22.4 | 3.5 | 2.9 |
| Sucrose | 6.9 | 0.3 | 0.2 |
| Leucrose | 79.4 | 0.3 | 0.2 |
| Glucose | 9.5 | 0.0 | 0.0 |
| Fructose | 162.2 | 0.0 | 0.0 |
| Sum DP2-DP8+ | 217.8 | 119.8 | 99.5 |
| Sum DP3-DP8+ | 195.4 | 116.2 | 96.6 |

Example 13H

Anomeric Linkage Analysis of Soluble Oligosaccharide Fiber Produced by C-Terminal Truncated GTF-0088 Homologs Solutions of chromatographically-purified soluble oligosaccharide fibers prepared as described in Examples 13C-13G were dried to a constant weight by lyophilization, and the resulting solids analyzed by $^1H$ NMR spectroscopy and by GC/MS as described in the General Methods section (above). The anomeric linkages for each of these soluble oligosaccharide fiber mixtures are reported in Tables 15 and 16, and compared to the soluble oligosaccharide fiber prepared using the non C-terminal truncated GTF0088 (Example 9).

TABLE 15

| Anomeric linkage analysis of soluble oligosaccharides by $^1$H NMR spectroscopy. | | | | | | | |
|---|---|---|---|---|---|---|---|
| Example # | GTF | % α-(1,4) | % α-(1,3) | % α-(1,2) | % α-(1,3,6) | % α-(1,2,6) | % α-(1,6) |
| 9 | GTF0088 | 0.0 | 7.8 | 0.0 | 1.3 | 0 | 90.9 |
| 13C | GTF0088-T1 | 0.0 | 8.0 | 0.0 | 5.2 | 0.0 | 86.8 |
| 13D | GTF5318-T1 | 0.0 | 6.8 | 0.0 | 1.1 | 0.0 | 92.1 |
| 13E | GTF5328-T1 | 0.0 | 8.9 | 0.0 | 1.1 | 0.0 | 90.1 |
| 13F | GTF5330-T1 | 0.0 | 7.5 | 0.0 | 1.1 | 0.0 | 91.4 |
| 13G | GTF5330-T3 | 0.0 | 6.8 | 0.0 | 1.7 | 0.0 | 91.5 |

TABLE 16

| Anomeric linkage analysis of soluble oligosaccharides by GC/MS. | | | | | | | | | |
|---|---|---|---|---|---|---|---|---|---|
| Example # | GTF | % α-(1,4) | % α-(1,3) | % α-(1,3,6) | % α-(1,2) | % α-(1,6) | % α-(1,3,4) | % α-(1,2,3) | % α-(1,4,6) + α-(1,2,6) |
| 9 | GTF0088 | 0.6 | 14.0 | 1.4 | 0.9 | 80.8 | 0.0 | 0.0 | 1.2 |
| 13C | GTF0088-T1 | 1.6 | 20.4 | 2.0 | 0.4 | 74.1 | 0.1 | 0.1 | 1.3 |
| 13D | GTF5318-T1 | 1.7 | 17.0 | 3.6 | 0.5 | 77.2 | 0.0 | 0.1 | 0.0 |
| 13E | GTF5328-T1 | 1.3 | 19.0 | 2.1 | 0.4 | 75.8 | 0.0 | 0.0 | 1.4 |
| 13F | GTF5330-T1 | 1.6 | 14.3 | 2.7 | 0.4 | 79.3 | 0.0 | 0.0 | 1.6 |
| 13G | GTF5330-T3 | 1.7 | 15.0 | 2.0 | 0.4 | 79.7 | 0.2 | 0.1 | 1.0 |

Example 13I

Viscosity of Soluble Oligosaccharide Fiber

Solutions of chromatographically-purified soluble oligosaccharide fibers prepared as described in Examples 6, 9 and 10 were dried to a constant weight by lyophilization, and the resulting solids were used to prepare a 12 wt % solution of soluble fiber in distilled, deionized water. The viscosity of the soluble fiber solutions (reported in centipoise (cP), where 1 cP=1 millipascal-s (mPa-s)) (Table 17) was measured at 20° C. as described in the General Methods section.

TABLE 17

| Viscosity of 12% (w/w) soluble oligosaccharide fiber solutions measured at 20° C. (ND = not determined). | | |
|---|---|---|
| Example # | GTF | viscosity (cP) |
| 6 | GTF0544/MUT3264 | 6.7 |
| 9 | GTF-C GI:3130088 | 1.8 |
| 10 | GTF GI:387786207 | 1.7 |
| 13D | GTF5318-T1 | 4.1 |
| 13E | GTF5328-T1 | 4.1 |
| 13F | GTF5330-T1 | 4.1 |
| 13G | GTF5330-T3 | 1.7 |

Example 14

Preparation of a Sodium Carboxymethyl α-Glucan

This Example describes producing the glucan ether derivative, carboxymethyl glucan, using the α-glucan fiber composition described herein.

Approximately 1 g of an α-glucan fiber composition as described in Examples 6, 9 or 10 is added to 20 mL of isopropanol in a 50-mL capacity round bottom flask fitted with a thermocouple for temperature monitoring and a condenser connected to a recirculating bath, and a magnetic stir bar. Sodium hydroxide (4 mL of a 15% solution) is added drop wise to the preparation, which is then heated to 25° C. on a hotplate. The preparation is stirred for 1 hour before the temperature is increased to 55° C. Sodium monochloroacetate (0.3 g) is then added to provide a reaction, which is held at 55° C. for 3 hours before being neutralized with glacial acetic acid. The material is then collected and analyzed by NMR to determine degree of substitution (DoS) of the solid.

Various DoS samples of carboxymethyl α-glucan are prepared using processes similar to the above process, but with certain modifications such as the use of different reagent (sodium monochloroacetate):α-glucan fiber molar ratios, different NaOH:α-glucan fiber molar ratios, different temperatures, and/or reaction times.

Example 15

Viscosity Modification Using Carboxymethyl α-Glucan

This Example describes the effect of carboxymethyl α-glucan on the viscosity of an aqueous composition.

Various sodium carboxymethyl glucan samples as prepared in Example 14 are tested. To prepare 0.6 wt % solutions of each of these samples, 0.102 g of sodium carboxymethyl α-glucan is added to DI water (17 g). Each preparation is then mixed using a bench top vortexer at 1000 rpm until completely dissolved.

To determine the viscosity of carboxymethyl α-glucan, each solution of the dissolved α-glucan ether samples is subjected to various shear rates using a Brookfield III+ viscometer equipped with a recirculating bath to control temperature (20° C.). The shear rate is increased using a gradient program which increased from 0.1-232.5 rpm and the shear rate is increased by 4.55 (1/s) every 20 seconds.

Example 16

Preparation of Carboxymethyl Dextran from Solid Dextran

This Example describes producing carboxymethyl dextran for use in Example 17.

Approximately 0.5 g of solid dextran ($M_w$=750000) was added to 10 mL of isopropanol in a 50-mL capacity round bottom flask fitted with a thermocouple for temperature monitoring and a condenser connected to a recirculating bath, and a magnetic stir bar. Sodium hydroxide (0.9 mL of a 15% solution) was added drop wise to the preparation, which was then heated to 25° C. on a hotplate. The preparation was stirred for 1 hour before the temperature was increased to 55° C. Sodium monochloroacetate (0.15 g) was then added to provide a reaction, which was held at 55° C. for 3 hours before being neutralized with glacial acetic acid. The solid material was then collected by vacuum filtration and washed with ethanol (70%) four times, dried under vacuum at 20-25° C., and analyzed by NMR to determine degree of substitution (DoS) of the solid. The solid was identified as sodium carboxymethyl dextran.

Additional sodium carboxymethyl dextran was prepared using dextran of different $M_w$. The DoS values of carboxymethyl dextran samples prepared in this example are provided in Table 18.

TABLE 18

Samples of Sodium Carboxymethyl Dextran Prepared from Solid Dextran

| Product Sample Designation | Dextran $M_w$ | Reagent[a]:Dextran Molar Ratio[b] | NaOH:Dextran Molar Ratio[b] | Reaction Time (hours) | DoS |
|---|---|---|---|---|---|
| 2A | 750000 | 0.41 | 1.08 | 3 | 0.64 |
| 2B | 1750000 | 0.41 | 0.41 | 3 | 0.49 |

[a]Reagent refers to sodium monochloroacetate.

[b]Molar ratios calculated as moles of reagent per moles of dextran (third column), or moles of NaOH per moles of dextran (fourth column).

These carboxymethyl dextran samples were tested for their viscosity modification effects in Example 17.

Example 17 (Comparative)

Effect of Shear Rate on Viscosity of Carboxymethyl Dextran

This Example describes the viscosity, and the effect of shear rate on viscosity, of solutions containing the carboxymethyl dextran samples prepared in Example 16.

Various sodium carboxymethyl dextran samples (2A and 2B) were prepared as described in Example 16. To prepare 0.6 wt % solutions of each of these samples, 0.102 g of sodium carboxymethyl dextran was added to DI water (17 g). Each preparation was then mixed using a bench top vortexer at 1000 rpm until the solid was completely dissolved.

To determine the viscosity of carboxymethyl dextran at various shear rates, each solution of the dissolved dextran ether samples was subjected to various shear rates using a Brookfield III+ viscometer equipped with a recirculating bath to control temperature (20° C.). The shear rate was increased using a gradient program which increased from 0.1-232.5 rpm and the shear rate was increased by 4.55 (1/s) every 20 seconds. The results of this experiment at 14.72 (1/s) are listed in Table 19.

TABLE 19

Viscosity of Carboxymethyl Dextran Solutions at Various Shear Rates

| Sample | Sample Loading (wt %) | Viscosity (cPs) @ 66.18 rpm | Viscosity (cPs) @ 110.3 rpm | Viscosity (cPs) @ 183.8 rpm | Viscosity (cPs) @ 250 rpm |
|---|---|---|---|---|---|
| 2A | 0.6 | 4.97 | 2.55 | 4.43 | 3.88 |
| 2B | 0.6 | 6.86 | 5.68 | 5.28 | 5.26 |

The results summarized in Table 9 indicate that 0.6 wt % solutions of carboxymethyl dextran have viscosities of about 2.5-7 cPs.

Example 18 (Comparative)

Preparation of Carboxymethyl α-Glucan

This Example describes producing carboxymethyl glucan for use in Example 19.

The glucan was prepared as described in Examples 6, 9 or 10.

Approximately 150 g of the α-glucan oligomer/polymer composition is added to 3000 mL of isopropanol in a 500-mL capacity round bottom flask fitted with a thermocouple for temperature monitoring and a condenser connected to a recirculating bath, and a magnetic stir bar. Sodium hydroxide (600 mL of a 15% solution) is added drop wise to the preparation, which is then heated to 25° C. on a hotplate. The preparation is stirred for 1 hour before the temperature is increased to 55° C. Sodium monochloroacetate is then added to provide a reaction, which is held at 55° C. for 3 hours before being neutralized with 90% acetic acid. The material is then collected and analyzed by NMR to determine degree of substitution (DoS).

Various DoS samples of carboxymethyl α-glucan are prepared using processes similar to the above process, but with certain modifications such as the use of different reagent (sodium monochloroacetate):α-glucan oligomer/polymer molar ratios, different NaOH:α-glucan oligomer/polymer molar ratios, different temperatures, and/or reaction times.

Example 19 (Comparative)

Viscosity Modification Using Carboxymethyl α-Glucan

This Example describes the effect of carboxymethyl α-glucan on the viscosity of an aqueous composition.

Various sodium carboxymethyl glucan samples are prepared as described in Example 18. To prepare 0.6 wt % solutions of each of these samples, 0.102 g of sodium carboxymethyl α-glucan is added to DI water (17 g). Each preparation is then mixed using a bench top vortexer at 1000 rpm until completely dissolved.

To determine the viscosity of carboxymethyl glucan at various shear rates, each solution of the glucan ether samples is subjected to various shear rates using a Brookfield III+ viscometer equipped with a recirculating bath to control temperature (20° C.). The shear rate is increased using a gradient program which increased from 0.1-232.5 rpm and then the shear rate is increased by 4.55 (1/s) every 20 seconds.

Example 20 (Comparative)

Viscosity Modification Using Carboxymethyl Cellulose

This Example describes the effect of carboxymethyl cellulose (CMC) on the viscosity of an aqueous composition.

CMC samples obtained from DuPont Nutrition & Health (Danisco) were dissolved in DI water to prepare 0.6 wt % solutions of each sample.

To determine the viscosity of CMC at various shear rates, each solution of the dissolved CMC samples was subjected to various shear rates using a Brookfield III+ viscometer equipped with a recirculating bath to control temperature (20° C.). The shear rate was increased using a gradient program which increased from 0.1-232.5 rpm and the shear rate was increased by 4.55 (1/s) every 20 seconds. Results of this experiment at 14.72 (1/s) are listed in Table 20.

TABLE 20

Viscosity of CMC Solutions

| Sample | Molecular Weight (Mw) | DoS | Sample Loading (wt %) | Viscosity (cPs) @ 14.9 rpm |
|---|---|---|---|---|
| C3A (BAK 130) | ~130000 | 0.66 | 0.6 | 235.03 |
| C3B (BAK 550) | ~550000 | 0.734 | 0.6 | 804.31 |

CMC (0.6 wt %) therefore can increase the viscosity of an aqueous solution.

Example 21

Creating Calibration Curves for Direct Red 80 and Toluidine Blue O Dyes Using UV Absorption This example discloses creating calibration curves that could be useful for determining the relative level of adsorption of glucan ether derivatives onto fabric surfaces.

Solutions of known concentration (ppm) are made using Direct Red 80 and Toluidine Blue O dyes. The absorbance of these solutions are measured using a LAMOTTE SMART2 Colorimeter at either 520 nm (Direct Red 80) or 620 nm (Toluidine Blue O Dye). The absorption information is plotted in order that it can be used to determine dye concentration of solutions exposed to fabric samples. The concentration and absorbance of each calibration curve are provided in Tables 21 and 22.

TABLE 21

Direct Red 80 Dye Calibration Curve Data

| Dye Concentration (ppm) | Average Absorbance @520 nm |
|---|---|
| 25 | 0.823333333 |
| 22.5 | 0.796666667 |
| 20 | 0.666666667 |
| 15 | 0.51 |
| 10 | 0.37 |
| 5 | 0.2 |

TABLE 22

Toluidine Blue O Dye Calibration Curve Data

| Dye Concentration (ppm) | Average Absorbance @620 nm |
|---|---|
| 12.5 | 1.41 |
| 10 | 1.226666667 |
| 7 | 0.88 |
| 5 | 0.676666667 |
| 3 | 0.44 |
| 1 | 0.166666667 |

Thus, calibration curves were prepared that are useful for determining the relative level of adsorption of poly alpha-1,3-glucan ether derivatives onto fabric surfaces.

Example 22

Preparation of Quaternary Ammonium Glucan

This Example describes how one could produce a quaternary ammonium glucan ether derivative. Specifically, trimethylammonium hydroxypropyl glucan can be produced.

Approximately 10 g of the α-glucan oligomer/polymer composition (prepared as in Examples 6, 9 or 10) is added to 100 mL of isopropanol in a 500-mL capacity round bottom flask fitted with a thermocouple for temperature monitoring and a condenser connected to a recirculating bath, and a magnetic stir bar. 30 mL of sodium hydroxide (17.5% solution) is added drop wise to this preparation, which is then heated to 25° C. on a hotplate. The preparation is stirred for 1 hour before the temperature is increased to 55° C. 3-chloro-2-hydroxypropyl-trimethylammonium chloride (31.25 g) is then added to provide a reaction, which is held at 55° C. for 1.5 hours before being neutralized with 90% acetic acid. The product that forms (trimethylammonium hydroxypropyl glucan) is collected by vacuum filtration and washed with ethanol (95%) four times, dried under vacuum at 20-25° C., and analyzed by NMR and SEC to determine molecular weight and DoS.

Thus, the quaternary ammonium glucan ether derivative, trimethylammonium hydroxypropyl glucan, can be prepared and isolated.

Example 23

Effect of Shear Rate on Viscosity of Quaternary Ammonium Glucan

This Example describes how one could test the effect of shear rate on the viscosity of trimethylammonium hydroxypropyl glucan as prepared in Example 22. It is contemplated that this glucan ether derivative exhibits shear thinning or shear thickening behavior.

Samples of trimethylammonium hydroxypropyl glucan are prepared as described in Example 22. To prepare a 2 wt % solution of each sample, 1 g of sample is added to 49 g of DI water. Each preparation is then homogenized for 12-15 seconds at 20,000 rpm to dissolve the trimethylammonium hydroxypropyl glucan sample in the water.

To determine the viscosity of each 2 wt % quaternary ammonium glucan solution at various shear rates, each solution is subjected to various shear rates using a Brookfield DV III+ Rheometer equipped with a recirculating bath to control temperature (20° C.) and a ULA (ultra low adapter) spindle and adapter set. The shear rate is increased using a gradient program which increases from 10-250 rpm and the shear rate is increased by 4.9 1/s every 20 seconds for the ULA spindle and adapter.

It is contemplated that the viscosity of each of the quaternary ammonium glucan solutions would change (reduced or increased) as the shear rate is increased, thereby indicating that the solutions demonstrate shear thinning or shear thickening behavior. Such would indicate that quaternary ammonium glucan could be added to an aqueous liquid to modify its rheological profile.

Example 24

Adsorption of Quaternary Ammonium Glucan on Various Fabrics

This example discloses how one could test the degree of adsorption of a quaternary ammonium glucan (trimethylammonium hydroxypropyl glucan) on different types of fabrics.

A 0.07 wt % solution of trimethylammonium hydroxypropyl glucan (as prepared in Example 22) is made by dissolving 0.105 g of the polymer in 149.89 g of deionized water. This solution is divided into several aliquots with different concentrations of polymer (Table 23). Other components are added such as acid (dilute hydrochloric acid) or base (sodium hydroxide) to modify pH, or NaCl salt.

TABLE 23

Quaternary Ammonium Glucan Solutions Useful in Fabric Adsorption Studies

| Amount of NaCl (g) | Amount of Solution (g) | Polymer Concentration (wt %) | Final pH |
|---|---|---|---|
| 0 | 15 | 0.07 | ~7 |
| 0.15 | 14.85 | 0.0693 | ~7 |
| 0.3 | 14.7 | 0.0686 | ~7 |
| 0.45 | 14.55 | 0.0679 | ~7 |
| 0 | 9.7713 | 0.0683 | ~3 |
| 0 | 9.7724 | 0.0684 | ~5 |
| 0 | 10.0311 | 0.0702 | ~9 |
| 0 | 9.9057 | 0.0693 | ~11 |

Four different fabric types (cretonne, polyester, 65:35 polyester/cretonne, bleached cotton) are cut into 0.17 g pieces. Each piece is placed in a 2-mL well in a 48-well cell culture plate. Each fabric sample is exposed to 1 mL of each of the above solutions (Table 13) for a total of 36 samples (a control solution with no polymer is included for each fabric test). The fabric samples are allowed to sit for at least 30 minutes in the polymer solutions. The fabric samples are removed from the polymer solutions and rinsed in DI water for at least one minute to remove any unbound polymer. The fabric samples are then dried at 60° C. for at least 30 minutes until constant dryness is achieved. The fabric samples are weighed after drying and individually placed in 2-mL wells in a clean 48-well cell culture plate. The fabric samples are then exposed to 1 mL of a 250 ppm Direct Red 80 dye solution. The samples are left in the dye solution for at least 15 minutes. Each fabric sample is removed from the dye solution, after which the dye solution is diluted 10×.

The absorbance of the diluted solutions is measured compared to a control sample. A relative measure of glucan polymer adsorbed to the fabric is calculated based on the calibration curve created in Example 21 for Direct Red 80 dye. Specifically, the difference in UV absorbance for the fabric samples exposed to polymer compared to the controls (fabric not exposed to polymer) represents a relative measure of polymer adsorbed to the fabric. This difference in UV absorbance could also be expressed as the amount of dye bound to the fabric (over the amount of dye bound to control), which is calculated using the calibration curve (i.e., UV absorbance is converted to ppm dye). A positive value represents the dye amount that is in excess to the dye amount bound to the control fabric, whereas a negative value represents the dye amount that is less than the dye amount bound to the control fabric. A positive value would reflect that the glucan ether compound adsorbed to the fabric surface.

It is believed that this assay would demonstrate that quaternary ammonium glucan can adsorb to various types of fabric under different salt and pH conditions. This adsorption would suggest that cationic glucan ether derivatives are useful in detergents for fabric care (e.g., as anti-redeposition agents).

Example 25

Adsorption of the Present α-Glucan Oligomer/Polymer Compositions on Various Fabrics This example discloses how one could test the degree of adsorption of the present α-glucan fiber composition (unmodified) on different types of fabrics.

A 0.07 wt % solution of the present α-glucan fiber composition (as prepared in Examples 6, 9 or 10) is made by dissolving 0.105 g of the polymer in 149.89 g of deionized water. This solution is divided into several aliquots with different concentrations of polymer (Table 24). Other components are added such as acid (dilute hydrochloric acid) or base (sodium hydroxide) to modify pH, or NaCl salt.

TABLE 24

α-Glucan Fiber Solutions Useful in Fabric Adsorption Studies

| Amount of NaCl (g) | Amount of Solution (g) | Polymer Concentration (wt %) | Final pH |
|---|---|---|---|
| 0 | 15 | 0.07 | ~7 |
| 0.15 | 14.85 | 0.0693 | ~7 |
| 0.3 | 14.7 | 0.0686 | ~7 |
| 0.45 | 14.55 | 0.0679 | ~7 |
| 0 | 9.7713 | 0.0683 | ~3 |
| 0 | 9.7724 | 0.0684 | ~5 |
| 0 | 10.0311 | 0.0702 | ~9 |
| 0 | 9.9057 | 0.0693 | ~11 |

Four different fabric types (cretonne, polyester, 65:35 polyester/cretonne, bleached cotton) are cut into 0.17 g pieces. Each piece is placed in a 2-mL well in a 48-well cell culture plate. Each fabric sample is exposed to 1 mL of each of the above solutions (Table 14) for a total of 36 samples (a control solution with no polymer is included for each fabric test). The fabric samples are allowed to sit for at least 30 minutes in the polymer solutions. The fabric samples are removed from the polymer solutions and rinsed in DI water for at least one minute to remove any unbound polymer. The fabric samples are then dried at 60° C. for at least 30 minutes until constant dryness is achieved. The fabric samples are weighed after drying and individually placed in 2-mL wells in a clean 48-well cell culture plate. The fabric samples are then exposed to 1 mL of a 250 ppm Direct Red 80 dye solution. The samples are left in the dye solution for at least 15 minutes. Each fabric sample is removed from the dye solution, after which the dye solution is diluted 10×.

The absorbance of the diluted solutions is measured compared to a control sample. A relative measure of the α-glucan polymer adsorbed to the fabric is calculated based on the calibration curve created in Example 21 for Direct Red 80 dye. Specifically, the difference in UV absorbance for the fabric samples exposed to polymer compared to the controls (fabric not exposed to polymer) represents a relative measure of polymer adsorbed to the fabric. This difference in UV absorbance could also be expressed as the amount of dye bound to the fabric (over the amount of dye bound to control), which is calculated using the calibration curve (i.e., UV absorbance is converted to ppm dye). A positive value represents the dye amount that is in excess to the dye amount bound to the control fabric, whereas a negative value represents the dye amount that is less than the dye amount bound to the control fabric. A positive value would reflect that the glucan ether compound adsorbed to the fabric surface.

It is believed that this assay would demonstrate that the present α-glucan fiber compositions can adsorb to various types of fabric under different salt and pH conditions. This adsorption would suggest that the present α-glucan fiber compositions are useful in detergents for fabric care (e.g., as anti-redeposition agents).

Example 26

Adsorption of Carboxymethyl α-Glucan (CMG) on Various Fabrics

This example discloses how one could test the degree of adsorption of an α-glucan ether compound (CMG) on different types of fabrics.

A 0.25 wt % solution of CMG is made by dissolving 0.375 g of the polymer in 149.625 g of deionized water. This solution is divided into several aliquots with different concentrations of polymer (Table 25). Other components are added such as acid (dilute hydrochloric acid) or base (sodium hydroxide) to modify pH, or NaCl salt.

TABLE 25

CMG Solutions Useful in Fabric Adsorption Studies

| Amount of NaCl (g) | Amount of Solution (g) | Polymer Concentration (wt %) | Final pH |
|---|---|---|---|
| 0 | 15 | 0.25 | ~7 |
| 0.15 | 14.85 | 0.2475 | ~7 |
| 0.3 | 14.7 | 0.245 | ~7 |
| 0.45 | 14.55 | 0.2425 | ~7 |
| 0 | 9.8412 | 0.2459 | ~3 |
| 0 | 9.4965 | 0.2362 | ~5 |
| 0 | 9.518 | 0.2319 | ~9 |
| 0 | 9.8811 | 0.247 | ~11 |

Four different fabric types (cretonne, polyester, 65:35 polyester/cretonne, bleached cotton) are cut into 0.17 g pieces. Each piece is placed in a 2-mL well in a 48-well cell culture plate. Each fabric sample is exposed to 1 mL of each of the above solutions (Table 15) for a total of 36 samples (a control solution with no polymer is included for each fabric test). The fabric samples are allowed to sit for at least 30 minutes in the polymer solutions. The fabric samples are removed from the polymer solutions and rinsed in DI water for at least one minute to remove any unbound polymer. The fabric samples are then dried at 60° C. for at least 30 minutes until constant dryness is achieved. The fabric samples are weighed after drying and individually placed in 2-mL wells in a clean 48-well cell culture plate. The fabric samples are then exposed to 1 mL of a 250 ppm Toluidine Blue dye solution. The samples are left in the dye solution for at least 15 minutes. Each fabric sample is removed from the dye solution, after which the dye solution is diluted 10×.

The absorbance of the diluted solutions is measured compared to a control sample. A relative measure of CMG polymer adsorbed to the fabric is calculated based on the calibration curve created in Example 21 for Toluidine Blue dye. Specifically, the difference in UV absorbance for the fabric samples exposed to polymer compared to the controls (fabric not exposed to polymer) represents a relative measure of polymer adsorbed to the fabric. This difference in UV absorbance could also be expressed as the amount of dye bound to the fabric (over the amount of dye bound to control), which is calculated using the calibration curve (i.e., UV absorbance is converted to ppm dye). A positive value represents the dye amount that is in excess to the dye amount bound to the control fabric, whereas a negative value represents the dye amount that is less than the dye amount bound to the control fabric. A positive value would reflect that the CMG polymer adsorbed to the fabric surface.

It is believed that this assay would demonstrate that CMG polymer can adsorb to various types of fabric under different salt and pH conditions. This adsorption would suggest that the present glucan ether derivatives are useful in detergents for fabric care (e.g., as anti-redeposition agents).

Example 27

Effect of Cellulase on Carboxymethyl Glucan (CMG)

This example discloses how one could test the stability of an α-glucan ether, CMG, in the presence of cellulase compared to the stability of carboxymethyl cellulose (CMC). Stability to cellulase would indicate applicability of CMG to use in cellulase-containing compositions/processes such as in fabric care.

Solutions (1 wt %) of CMC ($M_w$=90000, DoS=0.7) or CMG are treated with cellulase or amylase as follows. CMG or CMC polymer (100 mg) is added to a clean 20-mL glass scintillation vial equipped with a PTFE stir bar. Water (10.0 mL) that has been previously adjusted to pH 7.0 using 5 vol % sodium hydroxide or 5 vol % sulfuric acid is then added to the scintillation vial, and the mixture is agitated until a solution (1 wt %) forms. A cellulase or amylase enzyme is added to the solution, which is then agitated for 24 hours at room temperature (~25° C.). Each enzyme-treated sample is analyzed by SEC (above) to determine the molecular weight of the treated polymer. Negative controls are conducted as above, but without the addition of a cellulase or amylase. Various enzymatic treatments of CMG and CMC that could be performed are listed in Table 26, for example.

TABLE 26

Measuring Stability of CMG and CMC Against Degradation by Cellulase or Amylase

| Polymer | Enzyme | Enzyme Type | Enzyme Loading |
|---|---|---|---|
| CMC | none | N/A | — |
| CMC | PURADAX HA 1200E | Cellulase | 1 mg/mL |

TABLE 26-continued

Measuring Stability of CMG and CMC Against Degradation by Cellulase or Amylase

| Polymer | Enzyme | Enzyme Type | Enzyme Loading |
|---|---|---|---|
| CMC | PREFERENZ S 100 | Amylase | 3 μL/mL |
| CMG | none | N/A | — |
| CMG | PURADAX HA 1200E | Cellulase | 1 mg/mL |
| CMG | PREFERENZ S 100 | Amylase | 3 μL/mL |
| CMG | PURASTAR ST L | Amylase | 3 μL/mL |
| CMG | PURADAX EG L | Cellulase | 3 μL/mL |

It is believed that the enzymatic studies in Table 16 would indicate that CMC is highly susceptible to degradation by cellulase, whereas CMG is more resistant to this degradation. It is also believed that these studies would indicate that both CMC and CMG are largely stable to amylase.

Use of CMC for providing viscosity to an aqueous composition (e.g., laundry or dishwashing detergent) containing cellulase would be unacceptable. CMG on the other hand, given its stability to cellulase, would be useful for cellulase-containing aqueous compositions such as detergents.

Example 28

Effect of Cellulase on Carboxymethyl Glucan (CMG)

This example discloses how one could test the stability of the present α-glucan fiber composition (unmodified) in the presence of cellulase compared to the stability of carboxymethyl cellulose (CMC). Stability to cellulase would indicate applicability of the present α-glucan oligomer/polymer composition to use in cellulase-containing compositions/processes, such as in fabric care.

Solutions (1 wt %) of CMC ($M_w$=90000, DoS=0.7) or the present α-glucan oligomer/polymer composition as described in Examples 6, 9 or 10 are treated with cellulase or amylase as follows. The present α-glucan oligomer/polymer composition or CMC polymer (100 mg) is added to a clean 20-mL glass scintillation vial equipped with a PTFE stir bar. Water (10.0 mL) that has been previously adjusted to pH 7.0 using 5 vol % sodium hydroxide or 5 vol % sulfuric acid is then added to the scintillation vial, and the mixture is agitated until a solution (1 wt %) forms. A cellulase or amylase enzyme is added to the solution, which is then agitated for 24 hours at room temperature (~25° C.). Each enzyme-treated sample is analyzed by SEC (above) to determine the molecular weight of the treated polymer. Negative controls are conducted as above, but without the addition of a cellulase or amylase. Various enzymatic treatments of the present α-glucan oligomer/polymer composition and CMC that could be performed are listed in Table 27, for example.

TABLE 27

Measuring Stability of an α-Glucan Fiber Composition and CMC Against Degradation by Cellulase or Amylase

| Polymer | Enzyme | Enzyme Type | Enzyme Loading |
|---|---|---|---|
| CMC | none | N/A | — |
| CMC | PURADAX HA 1200E | Cellulase | 1 mg/mL |
| CMC | PREFERENZ S 100 | Amylase | 3 μL/mL |
| α-GF[1] | none | N/A | — |
| α-GF | PURADAX HA 1200E | Cellulase | 1 mg/mL |
| α-GF | PREFERENZ S 100 | Amylase | 3 μL/mL |
| α-GF | PURASTAR ST L | Amylase | 3 μL/mL |
| α-GF | PURADAX EG L | Cellulase | 3 μL/mL |

[1]= α-GF is the present α-glucan fiber.

It is believed that the enzymatic studies in Table 17 would indicate that CMC is highly susceptible to degradation by cellulase, whereas the present α-glucan oligomer/polymer composition is more resistant to this degradation. It is also believed that these studies would indicate that both CMC and the present α-glucan oligomer/polymer composition are largely stable to amylase.

Use of CMC for providing viscosity to an aqueous composition (e.g., laundry or dishwashing detergent) containing cellulase would be unacceptable. The present α-glucan oligomer/polymer composition (unmodified) on the other hand, given its stability to cellulase, would be useful for cellulase-containing aqueous compositions such as detergents.

Example 29

Preparation of Hydroxypropyl α-Glucan

This Example describes producing the glucan ether derivative, hydroxypropyl α-glucan.

Approximately 10 g of the present α-glucan oligomer/polymer composition as prepared in Examples 6, 9 or 10 is mixed with 101 g of toluene and 5 mL of 20% sodium hydroxide. This preparation is stirred in a 500-mL glass beaker on a magnetic stir plate at 55° C. for 30 minutes. The preparation is then transferred to a shaker tube reactor after which 34 g of propylene oxide is added; the reaction is then stirred at 75° C. for 3 hours. The reaction is then neutralized with 20 g of acetic acid and the hydroxypropyl α-glucan formed is collected, washed with 70% aqueous ethanol or hot water, and dried. The molar substitution (MS) of the product is determined by NMR.

Example 30

Preparation of Hydroxyethyl α-Glucan

This Example describes producing the glucan ether derivative, hydroxyethyl poly alpha-1,3-glucan.

Approximately 10 g of the present α-glucan oligomer/polymer composition as prepared in Examples 6, 9 or 10 is mixed with 150 mL of isopropanol and 40 mL of 30% sodium hydroxide. This preparation is stirred in a 500-mL glass beaker on a magnetic stir plate at 55° C. for 1 hour, and then is stirred overnight at ambient temperature. The preparation is then transferred to a shaker tube reactor after which 15 g of ethylene oxide is added; the reaction is then stirred at 60° C. for 6 hour. The reaction is then allowed to remain in the sealed shaker tube overnight (approximately 16 hours) before it is neutralized with 20.2 g of acetic acid thereby forming hydroxyethyl glucan. The hydroxyethyl glucan solids is collected and is washed in a beaker by adding a methanol:acetone (60:40 v/v) mixture and stirring with a stir bar for 20 minutes. The methanol:acetone mixture is then filtered away from the solids. This washing step is repeated two times prior to drying of the product. The molar substitution (MS) of the product is determined by NMR.

Example 31

Preparation of Ethyl α-Glucan

This Example describes producing the glucan ether derivative, ethyl glucan.

Approximately 10 g of the present α-glucan oligomer/polymer composition as prepared in Example 6, 9 or 10 is added to a shaker tube, after which sodium hydroxide (1-70% solution) and ethyl chloride are added to provide a reaction. The reaction is heated to 25-200° C. and held at that temperature for 1-48 hours before the reaction is neutralized with acetic acid. The resulting product is collected washed, and analyzed by NMR and SEC to determine the molecular weight and degree of substitution (DoS) of the ethyl glucan.

Example 32

Preparation of Ethyl Hydroxyethyl α-Glucan

This Example describes producing the glucan ether derivative, ethyl hydroxyethyl glucan.

Approximately 10 g of the present α-glucan oligomer/polymer composition as prepared in Example 6, 9 or 10 is added to a shaker tube, after which sodium hydroxide (1-70% solution) is added. Then, ethyl chloride is added followed by an ethylene oxide/ethyl chloride mixture to provide a reaction. The reaction is slowly heated to 25-200° C. and held at that temperature for 1-48 hours before being neutralized with acetic acid. The product formed is collected, washed, dried under a vacuum at 20-70° C., and then analyzed by NMR and SEC to determine the molecular weight and DoS of the ethyl hydroxyethyl glucan.

Example 33

Preparation of Methyl α-Glucan

This Example describes producing the glucan ether derivative, methyl glucan.

Approximately 10 g of the present α-glucan oligomer/polymer composition as prepared in Example 6, 9 or 10 is mixed with 40 mL of 30% sodium hydroxide and 40 mL of 2-propanol, and is stirred at 55° C. for 1 hour to provide alkali glucan. This preparation is then filtered, if needed, using a Buchner funnel. The alkali glucan is then mixed with 150 mL of 2-propanol. A shaker tube reactor is charged with the mixture and 15 g of methyl chloride is added to provide a reaction. The reaction is stirred at 70° C. for 17 hours. The resulting methyl glucan solid is filtered and neutralized with 20 mL 90% acetic acid, followed by three 200-mL ethanol washes. The resulting product is analyzed by NMR and SEC to determine the molecular weight and degree of substitution (DoS).

Example 34

Preparation of Hydroxyalkyl Methyl α-Glucan

This Example describes producing the glucan ether derivative, hydroxyalkyl methyl α-glucan.

Approximately 10 g of the present α-glucan oligomer/polymer composition as prepared in Example 6, 9 or 10 is added to a vessel, after which sodium hydroxide (5-70% solution) is added. This preparation is stirred for 0.5-8 hours. Then, methyl chloride is added to the vessel to provide a reaction, which is then heated to 30-100° C. for up to 14 days. An alkylene oxide (e.g., ethylene oxide, propylene oxide, butylene oxide, etc.) is then added to the reaction while controlling the temperature. The reaction is heated to 25-100° C. for up to 14 days before being neutralized with acid. The product thus formed is filtered, washed and dried. The resulting product is analyzed by NMR and SEC to determine the molecular weight and degree of substitution (DoS).

Example 35

Preparation of Carboxymethyl Hydroxyethyl α-Glucan

This Example describes producing the glucan ether derivative, carboxymethyl hydroxyethyl glucan.

Approximately 10 g of the present α-glucan oligomer/polymer composition as prepared in Example 6, 9 or 10 is added to an aliquot of a substance such as isopropanol or toluene in a 400-mL capacity shaker tube, after which sodium hydroxide (1-70% solution) is added. This preparation is stirred for up to 48 hours. Then, monochloroacetic acid is added to provide a reaction, which is then heated to 25-100° C. for up to 14 days. Ethylene oxide is then added to the reaction, which is then heated to 25-100° C. for up to 14 days before being neutralized with acid (e.g., acetic, sulfuric, nitric, hydrochloric, etc.). The product thus formed is collected, washed and dried. The resulting product is analyzed by NMR and SEC to determine the molecular weight and degree of substitution (DoS).

Example 36

Preparation of Sodium Carboxymethyl Hydroxyethyl α-Glucan

This Example describes producing the glucan ether derivative, sodium carboxymethyl hydroxyethyl glucan.

Approximately 10 g of the present α-glucan oligomer/polymer composition as prepared in Examples 6, 9 or 10 is added to an aliquot of an alcohol such as isopropanol in a 400-mL capacity shaker tube, after which sodium hydroxide (1-70% solution) is added. This preparation is stirred for up to 48 hours. Then, sodium monochloroacetate is added to provide a reaction, which is then heated to 25-100° C. for up to 14 days. Ethylene oxide is then added to the reaction, which is then heated to 25-100° C. for up to 14 days before being neutralized with acid (e.g., acetic, sulfuric, nitric, hydrochloric, etc.). The product thus formed is collected, washed and dried. The resulting product is analyzed by NMR and SEC to determine the molecular weight and degree of substitution (DoS).

Example 37

Preparation of Carboxymethyl Hydroxypropyl α-Glucan

This Example describes producing the glucan ether derivative, carboxymethyl hydroxypropyl glucan.

Approximately 10 g of the present α-glucan oligomer/polymer composition as prepared in Examples 6, 9 or 10 is added to an aliquot of a substance such as isopropanol or toluene in a 400-mL capacity shaker tube, after which sodium hydroxide (1-70% solution) is added. This preparation is stirred for up to 48 hours. Then, monochloroacetic acid is added to provide a reaction, which is then heated to 25-100° C. for up to 14 days. Propylene oxide is then added to the reaction, which is then heated to 25-100° C. for up to 14 days before being neutralized with acid (e.g., acetic, sulfuric, nitric, hydrochloric, etc.). The solid product thus formed is collected, washed and dried. The resulting product is analyzed by NMR and SEC to determine the molecular weight and degree of substitution (DoS).

Example 38

Preparation of Sodium Carboxymethyl Hydroxypropyl α-Glucan

This Example describes producing the glucan ether derivative, sodium carboxymethyl hydroxypropyl glucan.

Approximately 10 g of the present α-glucan oligomer/polymer composition as prepared in Example 6, 9 or 10 is added to an aliquot of a substance such as isopropanol or toluene in a 400-mL capacity shaker tube, after which sodium hydroxide (1-70% solution) is added. This preparation is stirred for up to 48 hours. Then, sodium monochloroacetate is added to provide a reaction, which is then heated to 25-100° C. for up to 14 days. Propylene oxide is then added to the reaction, which is then heated to 25-100° C. for up to 14 days before being neutralized with acid (e.g., acetic, sulfuric, nitric, hydrochloric, etc.). The product thus formed is collected, washed and dried. The resulting product is analyzed by NMR and SEC to determine the molecular weight and degree of substitution (DoS).

Example 39

Preparation of Potassium Carboxymethyl α-Glucan

This Example describes producing the glucan ether derivative, potassium carboxymethyl glucan.

Approximately 10 g of the present α-glucan oligomer/polymer composition as prepared in Example 6, 9 or 10 is added to 200 mL of isopropanol in a 500-mL capacity round bottom flask fitted with a thermocouple for temperature monitoring and a condenser connected to a recirculating bath, and a magnetic stir bar. 40 mL of potassium hydroxide (15% solution) is added drop wise to this preparation, which is then heated to 25° C. on a hotplate. The preparation is stirred for 1 hour before the temperature is increased to 55° C. Potassium chloroacetate (12 g) is then added to provide a reaction, which was held at 55° C. for 3 hours before being neutralized with 90% acetic acid. The product formed was collected, washed with ethanol (70%), and dried under vacuum at 20-25° C. The resulting product is analyzed by NMR and SEC to determine the molecular weight and degree of substitution (DoS).

Example 40

Preparation of Lithium Carboxymethyl α-Glucan

This Example describes producing the glucan ether derivative, lithium carboxymethyl glucan.

Approximately 10 g of the present α-glucan oligomer/polymer composition as prepared in Examples 6, 9 or 10 is added to 200 mL of isopropanol in a 500-mL capacity round bottom flask fitted with a thermocouple for temperature monitoring and a condenser connected to a recirculating bath, and a magnetic stir bar. 50 mL of lithium hydroxide (11.3% solution) is added drop wise to this preparation, which is then heated to 25° C. on a hotplate. The preparation is stirred for 1 hour before the temperature is increased to 55° C. Lithium chloroacetate (12 g) is then added to provide a reaction, which is held at 55° C. for 3 hours before being neutralized with 90% acetic acid. The product formed is collected, washed with ethanol (70%), and dried under vacuum at 20-25° C. The resulting product is analyzed by NMR and SEC to determine the molecular weight and degree of substitution (DoS).

Example 41

Preparation of a Dihydroxyalkyl α-Glucan

This Example describes producing a dihydroxyalkyl ether derivative of α-glucan. Specifically, dihydroxypropyl glucan is produced.

Approximately 10 g of the present α-glucan oligomer/polymer composition as prepared in Examples 6, 9 or 10 is added to 100 mL of 20% tetraethylammonium hydroxide in a 500-mL capacity round bottom flask fitted with a thermocouple for temperature monitoring and a condenser connected to a recirculating bath, and a magnetic stir bar (resulting in ~9.1 wt % poly alpha-1,3-glucan). This preparation is stirred and heated to 30° C. on a hotplate. The preparation is stirred for 1 hour to dissolve any solids before the temperature is increased to 55° C. 3-chloro-1,2-propanediol (6.7 g) and 11 g of DI water were then added to provide a reaction (containing ~5.2 wt % 3-chloro-1,2-propanediol), which is held at 55° C. for 1.5 hours after which time 5.6 g of DI water is added to the reaction. The reaction is held at 55° C. for an additional 3 hours and 45 minutes before being neutralized with acetic acid. After neutralization, an excess of isopropanol is added. The product formed was collected, washed with ethanol (95%), and dried under vacuum at 20-25° C. The resulting product is analyzed by NMR and SEC to determine the molecular weight and degree of substitution (DoS).

Example 42

Resistance to Enzymatic Hydrolysis of Soluble Oligosaccharide Fiber Produced by the Combination of GTF0544 and MUT3264

For each test, reactions were run in distilled water at pH 7.0 and 20° C. Soluble fiber (100 mg) (from GTF0544 and MUT3264 reaction, Example 6) was added to 10.0 mL water in a 20-mL scintillation vial and mixed using a PTFE magnetic stirbar to create a 1 wt % solution. After the soluble fiber was completely dissolved, 1.0 mL (1 wt % enzyme formulation) of cellulase (PURADEX® EG L), or amylase (PURASTAR® ST L), or protease (SAVINASE® 16.0L) was added and the resulting solution mixed for 72 hours at 20° C. The reaction mixture was then heated to 70° C. for 10 minutes to inactivate the added enzyme, and the resulting mixture cooled to room temperature and centrifuged to remove precipitate. The supernatant was then analyzed be SEC-HPLC for recovered oligosaccharides, and compared to a control reaction where no enzyme was added to the reaction mixture (1.0 mL of distilled water added as diluent to represent enzyme addition). The results are provided in Table 28.

TABLE 28

Recovery of soluble oligosaccharide fiber produced by GTF-B/mut3264 mutanase after treatment with cellulase, protease, or amylase.

| | no enzyme (area count) | with cellulase (area count) | with protease (area count) | with amylase (area count) |
|---|---|---|---|---|
| ≥DP8 g/L | 446323 | 368557 | 383321 | 397368 |
| DP7 g/L | 86451 | 119671 | 121084 | 118558 |
| DP6 g/L | 203845 | 121712 | 159602 | 167237 |
| DP5 g/L | 155492 | 148751 | 124151 | 101638 |
| DP4 g/L | 105015 | 76144 | 92309 | 105507 |
| DP3 g/L | 33852 | 29031 | 32416 | 35034 |
| Total ≥DP3+ | 1030978 | 863866 | 912883 | 925342 |
| % recovery | — | 83.8 | 88.5 | 89.8 |

Example 43

Carboxymethylation of Soluble Oligosaccharide Fiber Produced by the Combination of GTF0544 and MUT3264

Soluble fiber (500 mg) (from GTF0544 and MUT3264 reaction, Example 6) was added to 15 mL isopropanol and 0.9 g of 15% sodium hydroxide in a 50-mL capacity round bottom flask fitted with a thermocouple for temperature monitoring and a condenser connected to a recirculating bath, and a magnetic stir bar. The reaction was stirred for 1 hour at 25° C., then heated to 55° C. and 0.3 g sodium chloroacetate was added. The reaction was stirred for 3 hours while being maintained at 55° C., then neutralized with glacial acetic acid. The resulting sodium carboxymethyl oligosaccharide fiber was washed four times with 70% ethanol, then dried under vacuum. The same method was also used to derivatize the product of the GTF0088 reaction (Example 9). The degree of substitution (DoS) was measured using NMR. The DoS for GTF0544/MUT3264 was 0.244 and the DoS for GTF0088 was 0.131.

Example 44

Resistance to Enzymatic hydrolysis of Sodium Carboxymethyl Soluble Oligosaccharide Fiber Produced by the Combination of gtf-B and mut3264

For each test, reactions were run in distilled water at pH 7.0 and 20° C. Sodium carboxymethyl oligosaccharide fiber (100 mg) (from GTF0544 and MUT3264 reaction, Example 43) was added to 10.0 mL water in a 20-mL scintillation vial and mixed using a PTFE magnetic stirbar to create a 1 wt % solution. After the soluble fiber was completely dissolved, 1.0 mL (1 wt % enzyme formulation) of cellulase (PURADEX® EG L), or amylase (PURASTAR® ST L), or protease (SAVINASE® 16.0L) was added and the resulting solution mixed for 72 hours at 20° C. The reaction mixture was then heated to 70° C. for 10 minutes to inactivate the added enzyme, and the resulting mixture cooled to room temperature and centrifuged to remove precipitate. The supernatant was then analyzed be SEC-HPLC for recovered oligosaccharides, and compared to a control reaction where no enzyme was added to the reaction mixture (1.0 mL of distilled water added as diluent to represent enzyme addition). The results are provided in Table 29.

TABLE 29

Recovery of soluble sodium carboxymethyl oligosaccharide fiber produced by GTF0544/MUT3264 mutanase after treatment with cellulase, protease, or amylase.

| | no enzyme (area count) | with cellulase (area count) | with protease (area count) | with amylase (area count) |
|---|---|---|---|---|
| ≥DP8 g/L | 27270 | 42063 | 56504 | 24936 |
| DP7 g/L | 16305 | 20665 | 20745 | 12017 |
| DP6 g/L | 15214 | 19933 | 15355 | 17167 |
| DP5 g/L | 20764 | 20939 | 11765 | 21058 |
| DP4 g/L | 17213 | 17253 | 9395 | 15289 |
| DP3 g/L | 11902 | 16481 | 4183 | 12663 |
| Total ≥DP3+ | 108668 | 137334 | 117947 | 103130 |
| % recovery | — | 126.4 | 108.5 | 94.9 |

What is claimed is:

1. A fabric care composition comprising:

(a) an α-glucan oligomer/polymer composition comprising:

(i) 10% to 25% α-(1,3) glycosidic linkages;

(ii) 65% to 87% α-(1,6) glycosidic linkages;

(iii) less than 5% α-(1,3,6) glycosidic linkages;

wherein the % glycosidic linkages are determined by methylation analysis;

(iv) a weight average molecular weight of less than 5000 Daltons;

(v) a viscosity of less than 0.25 Pascal second at 12 wt % in water at 20° C.;

(vi) a solubility of at least 20% (w/w) in pH 7 water at 25° C.; and (vii) a polydispersity index of less than 5; and (b) at least one additional fabric care ingredient selected from a cellulase or protease.

2. A laundry care composition comprising:

(a) an α-glucan oligomer/polymer composition comprising:

(i) 10% to 25% α-(1,3) glycosidic linkages;

(ii) 65% to 87% α-(1,6) glycosidic linkages;

(iii) less than 5% α-(1,3,6) glycosidic linkages;

wherein the % glycosidic linkages are determined by methylation analysis;

(iv) a weight average molecular weight of less than 5000 Daltons;

(v) a viscosity of less than 0.25 Pascal second at 12 wt % in water at 20° C.;

(vi) a solubility of at least 20% (w/w) in pH 7 water at 25° C.; and (vii) a polydispersity index of less than 5; and (b) at least one additional laundry care ingredient selected from a cellulase or protease.

3. The fabric care composition of claim 1 or the laundry care composition of claim 2, wherein the additional ingredient is at least one cellulase.

4. The fabric care composition of claim 1 or the laundry care composition of claim 2, wherein the additional ingredient is at least one protease.

5. The fabric care composition of claim 1 or the laundry care composition of claim 2, wherein the α-glucan oligomer/polymer composition further comprises less than 5% α-(1,4) glycosidic linkages.

6. The fabric care composition of claim 1 or the laundry care composition of claim 2, wherein the fabric care composition or laundry care composition comprises 0.01 to 90 wt % of the α-glucan oligomer/polymer composition.

7. The fabric care composition of claim 1, wherein the at least one additional fabric care ingredient further comprises at least one of surfactants selected from anionic surfactants, nonionic surfactants, cationic surfactants, or zwitterionic surfactants, enzymes selected from polyesterases, amylases, cutinases, lipases, pectate lyases, perhydrolases, xylanases, peroxidases, and/or laccases, detergent builders, complexing agents, polymers, soil release polymers, surfactancy-boosting polymers, bleaching systems, bleach activators, bleaching catalysts, fabric conditioners, clays, foam boosters, suds suppressors, anti-corrosion agents, soil-suspending agents, anti-soil redeposition agents, dyes, bactericides, tarnish inhibitors, optical brighteners, perfumes, saturated or unsaturated fatty acids, dye transfer inhibiting agents, chelating agents, hueing dyes, calcium and magnesium cations, visual signaling ingredients, anti-foam, structurants, thickeners, anti-caking agents, starch, sand, gelling agents, or any combination thereof.

8. The laundry care composition of claim 2, wherein the at least one additional laundry care ingredient comprises at least one of surfactants selected from anionic surfactants, nonionic surfactants, cationic surfactants, or zwitterionic surfactants, enzymes selected from polyesterases, amylases, cutinases, lipases, pectate lyases, perhydrolases, xylanases, peroxidases, and/or laccases, detergent builders, complexing agents, polymers, soil release polymers, surfactancy-boosting polymers, bleaching systems, bleach activators, bleaching catalysts, fabric conditioners, clays, foam boosters, suds suppressors, anti-corrosion agents, soil-suspending agents, anti-soil redeposition agents, dyes, bactericides, tarnish inhibitors, optical brighteners, perfumes, saturated or unsaturated fatty acids, dye transfer inhibiting agents, chelating agents, hueing dyes, calcium and magnesium cations, visual signaling ingredients, anti-foam, structurants, thickeners, anti-caking agents, starch, sand, gelling agents, or any combination thereof.

9. The fabric care composition of claim 1 or the laundry care composition of claim 2, wherein the fabric care composition or laundry care composition is in the form of a liquid, a gel, a powder, a hydrocolloid, an aqueous solution, granules, tablets, capsules, single compartment sachets, multi-compartment sachets, or any combination thereof.

10. The fabric care composition of claim 1 or the laundry care composition of claim 2, wherein the α-glucan oligomer/polymer composition is cellulase-resistant, protease-resistant, or a combination thereof.

11. A glucan ether composition comprising:

(a) 10% to 25% α-(1,3) glycosidic linkages;

(b) 65% to 87% α-(1,6) glycosidic linkages;

(c) less than 5% α-(1,3,6) glycosidic linkages;

wherein the % glycosidic linkages are determined by methylation analysis;

(d) a weight average molecular weight of less than 5000 Daltons;

(e) a viscosity of less than 0.25 Pascal second at 12 wt % in water at 20° C.;

(f) a solubility of at least 20% (w/w) in pH 7 water at 25° C.; and (g) a polydispersity index of less than 5;

wherein the glucan ether composition has a degree of substitution with at least one organic group of about 0.05 to about 3.0.

12. The glucan ether composition of claim 11, wherein at least one organic group is selected from the group consisting of carboxy alkyl, hydroxy alkyl, and alkyl.

13. The glucan ether composition of claim 11, wherein at least one organic group is selected from the group consisting of carboxymethyl, hydroxypropyl, dihydroxypropyl, hydroxyethyl, methyl, and ethyl.

14. The glucan ether composition of claim 11, wherein at least one organic group is a positively charged organic group.

15. The glucan ether composition of claim 11, wherein the glucan ether is a quaternary ammonium glucan ether.

16. The glucan ether composition of claim 15, wherein the quaternary ammonium glucan ether is a trimethylammonium hydroxypropyl glucan.

17. The glucan ether composition 11, wherein the glucan ether composition is cellulase-resistant, protease-resistant, amylase-resistant, or a combination thereof.

18. A personal care composition, fabric care composition, or laundry care composition comprising the glucan ether composition of claim 11.

19. A method of treating an article of clothing, textile, or fabric, said method comprising:
(a) providing a composition selected from
(i) the fabric care composition of claim 1;
(ii) the laundry care composition of claim 2;
(iii) the glucan ether composition of claim 11; or
(iv) an α-glucan oligomer/polymer composition comprising:
(1) 10% to 25% α-(1,3) glycosidic linkages;
(2) 65% to 87% α-(1,6) glycosidic linkages;
(3) less than 5% α-(1,3,6) glycosidic linkages;
wherein the % glycosidic linkages are determined by methylation analysis;
(4) a weight average molecular weight of less than 5000 Daltons;
(5) a viscosity of less than 0.25 Pascal second at 12 wt % in water at 20° C.;
(6) a solubility of at least 20% (w/w) in pH 7 water at 25° C.; and
(7) a polydispersity index of less than 5;
(b) contacting under suitable conditions the composition of (a) with a fabric, textile, or article of clothing, whereby the fabric, textile, or article of clothing is treated and receives a benefit; and
(c) optionally rinsing the treated fabric, textile, or article of clothing of (b).

20. The method of claim 19, wherein the composition of (a) is cellulase-resistant, protease-resistant, or a combination thereof.

21. The method of claim 19, wherein the α-glucan oligomer/polymer composition of (iv) or the α-glucan ether composition is surface substantive.

22. The method of claim 19, wherein the benefit is selected from the group consisting of improved fabric hand, improved resistance to soil deposition, improved colorfastness, improved wear resistance, improved wrinkle resistance, improved antifungal activity, improved stain resistance, improved cleaning performance when laundered, improved drying rates, and any combination thereof.

23. A method to produce a glucan ether composition, the method comprising:
(a) providing an α-glucan oligomer/polymer composition comprising:
(i) 10% to 25% α-(1,3) glycosidic linkages;
(ii) 65% to 87% α-(1,6) glycosidic linkages;
(iii) less than 5% α-(1,3,6) glycosidic linkages;
wherein the % glycosidic linkages are determined by methylation analysis;
(iv) a weight average molecular weight of less than 5000 Daltons;
(v) a viscosity of less than 0.25 Pascal second at 12 wt % in water at 20° C.;
(vi) a solubility of at least 20% (w/w) in pH 7 water at 25° C.; and
(vii) a polydispersity index of less than 5; and
(b) contacting the α-glucan oligomer/polymer composition of (a) in a reaction under alkaline conditions with at least one etherification agent comprising an organic group; whereby an α-glucan ether is produced that has a degree of substitution with at least one organic group of about 0.05 to about 3.0; and
(c) optionally isolating the α-glucan ether produced in step (b).

24. The method of claim 23, wherein said organic group is a hydroxy alkyl group, alkyl group, or carboxy alkyl group.

25. A textile, yarn, fabric, or fiber comprising
(a) an α-glucan oligomer/polymer composition comprising:
(i) 10% to 25% α-(1,3) glycosidic linkages;
(ii) 65% to 87% α-(1,6) glycosidic linkages;
(iii) less than 5% α-(1,3,6) glycosidic linkages;
(iv) a weight average molecular weight of less than 5000 Daltons;
(v) a viscosity of less than 0.25 Pascal second at 12 wt % in water at 20° C.;
(vi) a solubility of at least 20% (w/w) in pH 7 water at 25° C.; and
(vii) a polydispersity index of less than 5;
(b) a glucan ether composition comprising
(i) 10% to 25% α-(1,3) glycosidic linkages;
(ii) 65% to 87% α-(1,6) glycosidic linkages;
(iii) less than 5% α-(1,3,6) glycosidic linkages;
(iv) a weight average molecular weight of less than 5000 Daltons;
(v) a viscosity of less than 0.25 Pascal second at 12 wt % in water at 20° C.;
(vi) a solubility of at least 20% (w/w) in pH 7 water at 25° C.; and
(vii) a polydispersity index of less than 5;
wherein the glucan ether composition has a degree of substitution with at least one organic group of about 0.05 to about 3.0; or
(c) a combination thereof;
wherein the % glycosidic linkages are determined by methylation analysis.

* * * * *

SEQUENCE LISTING

```
<160> NUMBER OF SEQ ID NOS: 62

<210> SEQ ID NO 1
<211> LENGTH: 1476
<212> TYPE: PRT
<213> ORGANISM: Streptococcus mutans

<400> SEQUENCE: 1

Met Asp Lys Lys Val Arg Tyr Lys Leu Arg Lys Val Lys Lys Arg Trp
1               5                   10                  15

Val Thr Val Ser Val Ala Ser Ala Val Met Thr Leu Thr Thr Leu Ser
            20                  25                  30

Gly Gly Leu Val Lys Ala Asp Ser Asn Glu Ser Lys Ser Gln Ile Ser
        35                  40                  45
```

```
Asn Asp Ser Asn Thr Ser Val Val Thr Ala Asn Glu Glu Ser Asn Val
    50                  55                  60

Thr Thr Glu Ala Thr Ser Lys Gln Glu Ala Ala Ser Ser Gln Thr Asn
65                  70                  75                  80

His Thr Val Thr Thr Ser Ser Ser Ser Thr Ser Val Val Asn Pro Lys
                85                  90                  95

Glu Val Val Ser Asn Pro Tyr Thr Val Gly Glu Thr Ala Ser Asn Gly
            100                 105                 110

Glu Lys Leu Gln Asn Gln Thr Thr Thr Val Asp Lys Thr Ser Glu Ala
        115                 120                 125

Ala Ala Asn Asn Ile Ser Lys Gln Thr Thr Glu Ala Asp Thr Asp Val
    130                 135                 140

Ile Asp Asp Ser Asn Ala Ala Asn Ile Gln Ile Leu Glu Lys Leu Pro
145                 150                 155                 160

Asn Val Lys Glu Ile Asp Gly Lys Tyr Tyr Tyr Tyr Asp Asn Asn Gly
                165                 170                 175

Lys Val Arg Thr Asn Phe Thr Leu Ile Ala Asp Gly Lys Ile Leu His
            180                 185                 190

Phe Asp Glu Thr Gly Ala Tyr Thr Asp Thr Ser Ile Asp Thr Val Asn
        195                 200                 205

Lys Asp Ile Val Thr Thr Arg Ser Asn Leu Tyr Lys Lys Tyr Asn Gln
    210                 215                 220

Val Tyr Asp Arg Ser Ala Gln Ser Phe Glu His Val Asp His Tyr Leu
225                 230                 235                 240

Thr Ala Glu Ser Trp Tyr Arg Pro Lys Tyr Ile Leu Lys Asp Gly Lys
                245                 250                 255

Thr Trp Thr Gln Ser Thr Glu Lys Asp Phe Arg Pro Leu Leu Met Thr
            260                 265                 270

Trp Trp Pro Ser Gln Glu Thr Gln Arg Gln Tyr Val Asn Phe Met Asn
        275                 280                 285

Ala Gln Leu Gly Ile Asn Lys Thr Tyr Asp Asp Thr Ser Asn Gln Leu
    290                 295                 300

Gln Leu Asn Ile Ala Ala Ala Thr Ile Gln Ala Lys Ile Glu Ala Lys
305                 310                 315                 320

Ile Thr Thr Leu Lys Asn Thr Asp Trp Leu Arg Gln Thr Ile Ser Ala
                325                 330                 335

Phe Val Lys Thr Gln Ser Ala Trp Asn Ser Asp Ser Glu Lys Pro Phe
            340                 345                 350

Asp Asp His Leu Gln Asn Gly Ala Val Leu Tyr Asp Asn Glu Gly Lys
        355                 360                 365

Leu Thr Pro Tyr Ala Asn Ser Asn Tyr Arg Ile Leu Asn Arg Thr Pro
    370                 375                 380

Thr Asn Gln Thr Gly Lys Lys Asp Pro Arg Tyr Thr Ala Asp Asn Thr
385                 390                 395                 400

Ile Gly Gly Tyr Glu Phe Leu Leu Ala Asn Asp Val Asp Asn Ser Asn
                405                 410                 415

Pro Val Val Gln Ala Glu Gln Leu Asn Trp Leu His Phe Leu Met Asn
            420                 425                 430

Phe Gly Asn Ile Tyr Ala Asn Asp Pro Asp Ala Asn Phe Asp Ser Ile
        435                 440                 445

Arg Val Asp Ala Val Asp Asn Val Asp Ala Asp Leu Leu Gln Ile Ala
    450                 455                 460

Gly Asp Tyr Leu Lys Ala Ala Lys Gly Ile His Lys Asn Asp Lys Ala
```

```
465                 470                 475                 480

Ala Asn Asp His Leu Ser Ile Leu Glu Ala Trp Ser Asp Asn Asp Thr
                485                 490                 495

Pro Tyr Leu His Asp Asp Gly Asp Asn Met Ile Asn Met Asp Asn Lys
            500                 505                 510

Leu Arg Leu Ser Leu Leu Phe Ser Leu Ala Lys Pro Leu Asn Gln Arg
        515                 520                 525

Ser Gly Met Asn Pro Leu Ile Thr Asn Ser Leu Val Asn Arg Thr Asp
    530                 535                 540

Asp Asn Ala Glu Thr Ala Ala Val Pro Ser Tyr Ser Phe Ile Arg Ala
545                 550                 555                 560

His Asp Ser Glu Val Gln Asp Leu Ile Arg Asp Ile Ile Lys Ala Glu
                565                 570                 575

Ile Asn Pro Asn Val Val Gly Tyr Ser Phe Thr Met Glu Glu Ile Lys
            580                 585                 590

Lys Ala Phe Glu Ile Tyr Asn Lys Asp Leu Leu Ala Thr Glu Lys Lys
        595                 600                 605

Tyr Thr His Tyr Asn Thr Ala Leu Ser Tyr Ala Leu Leu Leu Thr Asn
    610                 615                 620

Lys Ser Ser Val Pro Arg Val Tyr Tyr Gly Asp Met Phe Thr Asp Asp
625                 630                 635                 640

Gly Gln Tyr Met Ala His Lys Thr Ile Asn Tyr Glu Ala Ile Glu Thr
                645                 650                 655

Leu Leu Lys Ala Arg Ile Lys Tyr Val Ser Gly Gly Gln Ala Met Arg
            660                 665                 670

Asn Gln Gln Val Gly Asn Ser Glu Ile Ile Thr Ser Val Arg Tyr Gly
        675                 680                 685

Lys Gly Ala Leu Lys Ala Met Asp Thr Gly Asp Arg Thr Thr Arg Thr
    690                 695                 700

Ser Gly Val Ala Val Ile Glu Gly Asn Asn Pro Ser Leu Arg Leu Lys
705                 710                 715                 720

Ala Ser Asp Arg Val Val Val Asn Met Gly Ala Ala His Lys Asn Gln
                725                 730                 735

Ala Tyr Arg Pro Leu Leu Leu Thr Thr Asp Asn Gly Ile Lys Ala Tyr
            740                 745                 750

His Ser Asp Gln Glu Ala Ala Gly Leu Val Arg Tyr Thr Asn Asp Arg
        755                 760                 765

Gly Glu Leu Ile Phe Thr Ala Ala Asp Ile Lys Gly Tyr Ala Asn Pro
    770                 775                 780

Gln Val Ser Gly Tyr Leu Gly Val Trp Val Pro Val Gly Ala Ala Ala
785                 790                 795                 800

Asp Gln Asp Val Arg Val Ala Ala Ser Thr Ala Pro Ser Thr Asp Gly
                805                 810                 815

Lys Ser Val His Gln Asn Ala Ala Leu Asp Ser Arg Val Met Phe Glu
            820                 825                 830

Gly Phe Ser Asn Phe Gln Ala Phe Ala Thr Lys Lys Glu Glu Tyr Thr
        835                 840                 845

Asn Val Val Ile Ala Lys Asn Val Asp Lys Phe Ala Glu Trp Gly Val
    850                 855                 860

Thr Asp Phe Glu Met Ala Pro Gln Tyr Val Ser Ser Thr Asp Gly Ser
865                 870                 875                 880

Phe Leu Asp Ser Val Ile Gln Asn Gly Tyr Ala Phe Thr Asp Arg Tyr
                885                 890                 895
```

```
Asp Leu Gly Ile Ser Lys Pro Asn Lys Tyr Gly Thr Ala Asp Asp Leu
            900                 905                 910

Val Lys Ala Ile Lys Ala Leu His Ser Lys Gly Ile Lys Val Met Ala
        915                 920                 925

Asp Trp Val Pro Asp Gln Met Tyr Ala Leu Pro Glu Lys Glu Val Val
    930                 935                 940

Thr Ala Thr Arg Val Asp Lys Tyr Gly Thr Pro Val Ala Gly Ser Gln
945                 950                 955                 960

Ile Lys Asn Thr Leu Tyr Val Val Asp Gly Lys Ser Ser Gly Lys Asp
                965                 970                 975

Gln Gln Ala Lys Tyr Gly Gly Ala Phe Leu Glu Glu Leu Gln Ala Lys
            980                 985                 990

Tyr Pro Glu Leu Phe Ala Arg Lys  Gln Ile Ser Thr Gly  Val Pro Met
        995                 1000                1005

Asp Pro  Ser Val Lys Ile Lys  Gln Trp Ser Ala Lys  Tyr Phe Asn
    1010                1015                1020

Gly Thr  Asn Ile Leu Gly Arg  Gly Ala Gly Tyr Val  Leu Lys Asp
    1025                1030                1035

Gln Ala  Thr Asn Thr Tyr Phe  Asn Ile Ser Asp Asn  Lys Glu Ile
    1040                1045                1050

Asn Phe  Leu Pro Lys Thr Leu  Leu Asn Gln Asp Ser  Gln Val Gly
    1055                1060                1065

Phe Ser  Tyr Asp Gly Lys Gly  Tyr Val Tyr Tyr Ser  Thr Ser Gly
    1070                1075                1080

Tyr Gln  Ala Lys Asn Thr Phe  Ile Ser Glu Gly Asp  Lys Trp Tyr
    1085                1090                1095

Tyr Phe  Asp Asn Asn Gly Tyr  Met Val Thr Gly Ala  Gln Ser Ile
    1100                1105                1110

Asn Gly  Val Asn Tyr Tyr Phe  Leu Pro Asn Gly Leu  Gln Leu Arg
    1115                1120                1125

Asp Ala  Ile Leu Lys Asn Glu  Asp Gly Thr Tyr Ala  Tyr Tyr Gly
    1130                1135                1140

Asn Asp  Gly Arg Arg Tyr Glu  Asn Gly Tyr Tyr Gln  Phe Met Ser
    1145                1150                1155

Gly Val  Trp Arg His Phe Asn  Asn Gly Glu Met Ser  Val Gly Leu
    1160                1165                1170

Thr Val  Ile Asp Gly Gln Val  Gln Tyr Phe Asp Glu  Met Gly Tyr
    1175                1180                1185

Gln Ala  Lys Gly Lys Phe Val  Thr Thr Ala Asp Gly  Lys Ile Arg
    1190                1195                1200

Tyr Phe  Asp Lys Gln Ser Gly  Asn Met Tyr Arg Asn  Arg Phe Ile
    1205                1210                1215

Glu Asn  Glu Glu Gly Lys Trp  Leu Tyr Leu Gly Glu  Asp Gly Ala
    1220                1225                1230

Ala Val  Thr Gly Ser Gln Thr  Ile Asn Gly Gln His  Leu Tyr Phe
    1235                1240                1245

Arg Ala  Asn Gly Val Gln Val  Lys Gly Glu Phe Val  Thr Asp Arg
    1250                1255                1260

His Gly  Arg Ile Ser Tyr Tyr  Asp Gly Asn Ser Gly  Asp Gln Ile
    1265                1270                1275

Arg Asn  Arg Phe Val Arg Asn  Ala Gln Gly Gln Trp  Phe Tyr Phe
    1280                1285                1290
```

Asp Asn Asn Gly Tyr Ala Val Thr Gly Ala Arg Thr Ile Asn Gly
1295 1300 1305

Gln His Leu Tyr Phe Arg Ala Asn Gly Val Gln Val Lys Gly Glu
1310 1315 1320

Phe Val Thr Asp Arg His Gly Arg Ile Ser Tyr Tyr Asp Gly Asn
1325 1330 1335

Ser Gly Asp Gln Ile Arg Asn Arg Phe Val Arg Asn Ala Gln Gly
1340 1345 1350

Gln Trp Phe Tyr Phe Asp Asn Asn Gly Tyr Ala Val Thr Gly Ala
1355 1360 1365

Arg Thr Ile Asn Gly Gln His Leu Tyr Phe Arg Ala Asn Gly Val
1370 1375 1380

Gln Val Lys Gly Glu Phe Val Thr Asp Arg Tyr Gly Arg Ile Ser
1385 1390 1395

Tyr Tyr Asp Gly Asn Ser Gly Asp Gln Ile Arg Asn Arg Phe Val
1400 1405 1410

Arg Asn Ala Gln Gly Gln Trp Phe Tyr Phe Asp Asn Asn Gly Tyr
1415 1420 1425

Ala Val Thr Gly Ala Arg Thr Ile Asn Gly Gln His Leu Tyr Phe
1430 1435 1440

Arg Ala Asn Gly Val Gln Val Lys Gly Glu Phe Val Thr Asp Arg
1445 1450 1455

Tyr Gly Arg Ile Ser Tyr Tyr Asp Ala Asn Ser Gly Glu Arg Val
1460 1465 1470

Arg Ile Asn
1475

<210> SEQ ID NO 2
<211> LENGTH: 3942
<212> TYPE: DNA
<213> ORGANISM: Streptococcus mutans

<400> SEQUENCE: 2
atgattgacg gcaaatacta ctactatgac aacaacggca aagtacgcac caatttcacg 60
ttgatcgcgg acggtaaaat cctgcatttt gatgaaactg gcgcgtacac cgacactagc 120
attgataccg tgaacaagga tattgtcacg acgcgtagca acctgtataa gaaatacaat 180
caagtgtatg atcgcagcgc gcagagcttc gagcatgttg atcactacct gacggcggaa 240
tcttggtacc gtccgaaata cattctgaaa gatggcaaga cctggaccca gagcaccgag 300
aaggacttcc gtcctctgct gatgacctgg tggccgagcc aggaaacgca gcgccagtat 360
gtcaacttca tgaacgccca gttgggtatc aacaaaacgt acgacgacac cagcaatcag 420
ctgcaattga acatcgctgc tgcaacgatc caagcaaaga tcgaagccaa aatcacgacg 480
ctgaagaaca ccgattggct gcgtcaaacg atcagcgcgt tcgtcaaaac ccaaagcgct 540
tggaatagcg acagcgaaaa gccgtttgat gaccatctgc aaaacggtgc ggttctgtat 600
gataacgaag gtaaattgac gccgtatgcc aatagcaact atcgtattct gaaccgcacg 660
ccgaccaacc agaccggtaa gaaggacccg cgttataccg ccgacaacac gatcggcggc 720
tacgagtttc tgctggccaa cgacgtggat aatagcaacc cggtggttca ggccgagcag 780
ctgaactggc tgcacttcct gatgaacttt ggtaatatct acgcaaacga ccctgacgct 840
aacttcgact ccatccgcgt tgacgctgtc gataatgtgg acgccgatct gttacagatc 900
gcgggtgact atctgaaagc ggcaaagggc atccataaga atgacaaagc ggcgaacgac 960

-continued

```
cacctgtcca ttctggaagc gtggagcgac aatgacactc cgtatctgca tgatgatggc   1020
gacaacatga ttaacatgga taacaaactg cgcctgagcc tgctgttctc cctggcgaaa   1080
ccgctgaatc agcgtagcgg tatgaacccg ttgattacga acagcctggt caaccgtact   1140
gatgataatg ccgaaacggc ggcagtgcca agctactctt ttatccgtgc ccacgatagc   1200
gaggtccagg atttgattcg tgatatcatt aaggctgaga ttaacccgaa cgtcgtcggt   1260
tacagcttca cgatggaaga gattaagaag gcatttgaga tctacaataa ggacctgttg   1320
gccacggaga agaagtatac ccactataac accgcattga gctacgcgtt gctgctgacg   1380
aacaagagca gcgtgccgcg tgtctactat ggtgatatgt ttacggacga tggtcaatac   1440
atggcccaca agaccattaa ctacgaggca atcgaaaccc tgctgaaagc acgtatcaag   1500
tacgtgtccg gtggtcaggc tatgcgcaac cagcaagtgg gtaattcgga gatcatcacc   1560
agcgtgcgtt acggtaaagg tgcgctgaag gcgatggata cgggtgaccg cactacccgt   1620
acctctggtg tggcggtcat tgagggcaac aacccgagct tgcgcctgaa ggcttctgat   1680
cgtgtggttg tgaatatggg tgcggcccac aaaaatcaag cctatcgccc gctgctgttg   1740
acgaccgata acggcattaa ggcctatcac agcgaccaag aagcggcagg cctggtgcgt   1800
tacaccaacg accgtggcga actgatcttt accgcagccg acattaaggg ctacgcaaat   1860
ccgcaagtta gcggctacct gggcgtctgg gtccctgttg gcgcagcagc tgatcaggac   1920
gttcgtgttg cggcgagcac cgcgccaagc acggacggca agagcgttca ccagaacgcg   1980
gctctggaca gccgtgtgat gttcgagggt ttctcgaact tccaggcatt tgctaccaag   2040
aaagaagagt ataccaatgt ggtcatcgct aagaatgtgg ataagttcgc ggagtggggt   2100
gtcaccgatt tcgagatggc tccgcaatac gtttctagca ccgacggtag ctttttggat   2160
agcgtgattc aaaacggtta tgcttttacc gaccgttacg acctgggcat cagcaagccg   2220
aacaaatatg gcaccgcgga cgatctggtt aaagcgatta aggcattgca cagcaaaggc   2280
atcaaagtta tggcggattg ggttccggac cagatgtatg ccctgccgga aaaagaggtt   2340
gtgacggcaa cccgtgttga caaatacggt acgccggtag ctggcagcca gatcaaaaac   2400
acgctgtacg tggtcgatgg taaatctagc ggtaaggacc agcaggcgaa gtacggtggt   2460
gccttcctgg aagagctgca agcgaagtat ccggaactgt tcgcgcgcaa acagattagc   2520
accggtgttc cgatggaccc gagcgtcaag attaagcaat ggagcgcaaa atacttcaac   2580
ggcacgaata tcctgggtcg tggtgctggt tacgtgctga aagatcaggc aaccaacacc   2640
tactttaaca tcagcgacaa taaagagatc aatttcctgc caaagacgtt gctgaaccag   2700
gattctcaag ttggctttag ctacgacggt aagggctatg tgtactacag cacctcgggc   2760
taccaggcta aaaacacgtt catcagcgag ggtgacaagt ggtattactt cgacaataac   2820
ggttatatgg ttaccggcgc acagagcatt aatggtgtga actattactt cctgccgaat   2880
ggtttacagc tgcgtgatgc gattctgaaa aatgaggacg gtacgtacgc gtattatggc   2940
aatgatggtc gccgctacga gaatggctat tatcagttta tgagcggtgt ttggcgccat   3000
ttcaataatg gcgagatgtc cgttggtctg accgtcattg acggtcaagt tcaatacttt   3060
gacgagatgg gttaccaggc gaaaggcaaa ttcgttacca ccgcggatgg taagatccgt   3120
tacttcgata agcagagcgg caatatgtat cgtaatcgtt tcattgagaa cgaagagggc   3180
aaatggctgt acctgggtga ggacggcgcg gcagtcaccg gtagccagac gatcaatggt   3240
cagcacctgt attttcgtgc taacggcgtt caggttaagg gtgagttcgt gaccgatcgt   3300
catggccgca tctcttatta cgacggcaac agcggtgatc agatccgcaa ccgtttcgtc   3360
```

```
cgcaatgcgc aaggccagtg gttttacttt gacaacaatg gctatgcagt aactggtgct   3420

cgtacgatca acggccagca cctgtatttc cgcgcgaacg gtgttcaggt aaaaggtgag   3480

tttgttacgg accgccacgg ccgcattagc tattatgatg gtaatagcgg tgaccaaatt   3540

cgcaatcgtt tcgtgcgtaa tgcacagggt cagtggttct acttcgacaa taatggttat   3600

gcagtcacgg gtgcacgtac cattaacggc caacacctgt actttcgcgc caatggtgtg   3660

caagtgaaag gcgaatttgt tactgatcgt tatggtcgta tcagctacta tgatggcaat   3720

tctggcgacc aaattcgcaa tcgctttgtt cgtaacgccc aaggtcaatg gttctatttc   3780

gacaacaacg gttacgcggt gaccggtgcc cgcacgatta atggtcaaca cttgtacttc   3840

cgtgccaacg gtgtccaggt gaagggtgaa tttgtgaccg accgctatgg tcgcatttct   3900

tactacgacg caaattccgg tgaacgcgtc cgtatcaatt aa                      3942


<210> SEQ ID NO 3
<211> LENGTH: 1313
<212> TYPE: PRT
<213> ORGANISM: Streptococcus mutans

<400> SEQUENCE: 3

Met Ile Asp Gly Lys Tyr Tyr Tyr Tyr Asp Asn Asn Gly Lys Val Arg
1               5                   10                  15

Thr Asn Phe Thr Leu Ile Ala Asp Gly Lys Ile Leu His Phe Asp Glu
            20                  25                  30

Thr Gly Ala Tyr Thr Asp Thr Ser Ile Asp Thr Val Asn Lys Asp Ile
        35                  40                  45

Val Thr Thr Arg Ser Asn Leu Tyr Lys Lys Tyr Asn Gln Val Tyr Asp
    50                  55                  60

Arg Ser Ala Gln Ser Phe Glu His Val Asp His Tyr Leu Thr Ala Glu
65                  70                  75                  80

Ser Trp Tyr Arg Pro Lys Tyr Ile Leu Lys Asp Gly Lys Thr Trp Thr
                85                  90                  95

Gln Ser Thr Glu Lys Asp Phe Arg Pro Leu Leu Met Thr Trp Trp Pro
            100                 105                 110

Ser Gln Glu Thr Gln Arg Gln Tyr Val Asn Phe Met Asn Ala Gln Leu
        115                 120                 125

Gly Ile Asn Lys Thr Tyr Asp Asp Thr Ser Asn Gln Leu Gln Leu Asn
    130                 135                 140

Ile Ala Ala Ala Thr Ile Gln Ala Lys Ile Glu Ala Lys Ile Thr Thr
145                 150                 155                 160

Leu Lys Asn Thr Asp Trp Leu Arg Gln Thr Ile Ser Ala Phe Val Lys
                165                 170                 175

Thr Gln Ser Ala Trp Asn Ser Asp Ser Glu Lys Pro Phe Asp Asp His
            180                 185                 190

Leu Gln Asn Gly Ala Val Leu Tyr Asp Asn Glu Gly Lys Leu Thr Pro
        195                 200                 205

Tyr Ala Asn Ser Asn Tyr Arg Ile Leu Asn Arg Thr Pro Thr Asn Gln
    210                 215                 220

Thr Gly Lys Lys Asp Pro Arg Tyr Thr Ala Asp Asn Thr Ile Gly Gly
225                 230                 235                 240

Tyr Glu Phe Leu Leu Ala Asn Asp Val Asp Asn Ser Asn Pro Val Val
                245                 250                 255

Gln Ala Glu Gln Leu Asn Trp Leu His Phe Leu Met Asn Phe Gly Asn
            260                 265                 270
```

```
Ile Tyr Ala Asn Asp Pro Asp Ala Asn Phe Asp Ser Ile Arg Val Asp
        275                 280                 285

Ala Val Asp Asn Val Asp Ala Asp Leu Leu Gln Ile Ala Gly Asp Tyr
    290                 295                 300

Leu Lys Ala Ala Lys Gly Ile His Lys Asn Asp Lys Ala Ala Asn Asp
305                 310                 315                 320

His Leu Ser Ile Leu Glu Ala Trp Ser Asp Asn Asp Thr Pro Tyr Leu
                325                 330                 335

His Asp Asp Gly Asp Asn Met Ile Asn Met Asp Asn Lys Leu Arg Leu
            340                 345                 350

Ser Leu Leu Phe Ser Leu Ala Lys Pro Leu Asn Gln Arg Ser Gly Met
        355                 360                 365

Asn Pro Leu Ile Thr Asn Ser Leu Val Asn Arg Thr Asp Asp Asn Ala
    370                 375                 380

Glu Thr Ala Ala Val Pro Ser Tyr Ser Phe Ile Arg Ala His Asp Ser
385                 390                 395                 400

Glu Val Gln Asp Leu Ile Arg Asp Ile Ile Lys Ala Glu Ile Asn Pro
                405                 410                 415

Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495

Ala Arg Ile Lys Tyr Val Ser Gly Gly Gln Ala Met Arg Asn Gln Gln
            500                 505                 510

Val Gly Asn Ser Glu Ile Ile Thr Ser Val Arg Tyr Gly Lys Gly Ala
        515                 520                 525

Leu Lys Ala Met Asp Thr Gly Asp Arg Thr Thr Arg Thr Ser Gly Val
    530                 535                 540

Ala Val Ile Glu Gly Asn Asn Pro Ser Leu Arg Leu Lys Ala Ser Asp
545                 550                 555                 560

Arg Val Val Val Asn Met Gly Ala Ala His Lys Asn Gln Ala Tyr Arg
                565                 570                 575

Pro Leu Leu Leu Thr Thr Asp Asn Gly Ile Lys Ala Tyr His Ser Asp
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655

His Gln Asn Ala Ala Leu Asp Ser Arg Val Met Phe Glu Gly Phe Ser
            660                 665                 670

Asn Phe Gln Ala Phe Ala Thr Lys Lys Glu Glu Tyr Thr Asn Val Val
        675                 680                 685
```

```
Ile Ala Lys Asn Val Asp Lys Phe Ala Glu Trp Gly Val Thr Asp Phe
    690                 695                 700

Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750

Ile Lys Ala Leu His Ser Lys Gly Ile Lys Val Met Ala Asp Trp Val
        755                 760                 765

Pro Asp Gln Met Tyr Ala Leu Pro Glu Lys Glu Val Val Thr Ala Thr
    770                 775                 780

Arg Val Asp Lys Tyr Gly Thr Pro Val Ala Gly Ser Gln Ile Lys Asn
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830

Leu Phe Ala Arg Lys Gln Ile Ser Thr Gly Val Pro Met Asp Pro Ser
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880

Tyr Phe Asn Ile Ser Asp Asn Lys Glu Ile Asn Phe Leu Pro Lys Thr
                885                 890                 895

Leu Leu Asn Gln Asp Ser Gln Val Gly Phe Ser Tyr Asp Gly Lys Gly
            900                 905                 910

Tyr Val Tyr Tyr Ser Thr Ser Gly Tyr Gln Ala Lys Asn Thr Phe Ile
        915                 920                 925

Ser Glu Gly Asp Lys Trp Tyr Tyr Phe Asp Asn Asn Gly Tyr Met Val
    930                 935                 940

Thr Gly Ala Gln Ser Ile Asn Gly Val Asn Tyr Tyr Phe Leu Pro Asn
945                 950                 955                 960

Gly Leu Gln Leu Arg Asp Ala Ile Leu Lys Asn Glu Asp Gly Thr Tyr
                965                 970                 975

Ala Tyr Tyr Gly Asn Asp Gly Arg Arg Tyr Glu Asn Gly Tyr Tyr Gln
            980                 985                 990

Phe Met Ser Gly Val Trp Arg His  Phe Asn Asn Gly Glu  Met Ser Val
        995                 1000                 1005

Gly Leu  Thr Val Ile Asp Gly  Gln Val Gln Tyr Phe  Asp Glu Met
    1010                 1015                 1020

Gly Tyr  Gln Ala Lys Gly Lys  Phe Val Thr Thr Ala  Asp Gly Lys
    1025                 1030                 1035

Ile Arg  Tyr Phe Asp Lys Gln  Ser Gly Asn Met Tyr  Arg Asn Arg
    1040                 1045                 1050

Phe Ile  Glu Asn Glu Glu Gly  Lys Trp Leu Tyr Leu  Gly Glu Asp
    1055                 1060                 1065

Gly Ala  Ala Val Thr Gly Ser  Gln Thr Ile Asn Gly  Gln His Leu
    1070                 1075                 1080

Tyr Phe  Arg Ala Asn Gly Val  Gln Val Lys Gly Glu  Phe Val Thr
    1085                 1090                 1095

Asp Arg  His Gly Arg Ile Ser  Tyr Tyr Asp Gly Asn  Ser Gly Asp
```

```
    1100                1105                1110

Gln Ile  Arg Asn Arg Phe Val  Arg Asn Ala Gln Gly  Gln Trp Phe
    1115                1120                1125

Tyr Phe  Asp Asn Asn Gly Tyr  Ala Val Thr Gly Ala  Arg Thr Ile
    1130                1135                1140

Asn Gly  Gln His Leu Tyr Phe  Arg Ala Asn Gly Val  Gln Val Lys
    1145                1150                1155

Gly Glu  Phe Val Thr Asp Arg  His Gly Arg Ile Ser  Tyr Tyr Asp
    1160                1165                1170

Gly Asn  Ser Gly Asp Gln Ile  Arg Asn Arg Phe Val  Arg Asn Ala
    1175                1180                1185

Gln Gly  Gln Trp Phe Tyr Phe  Asp Asn Asn Gly Tyr  Ala Val Thr
    1190                1195                1200

Gly Ala  Arg Thr Ile Asn Gly  Gln His Leu Tyr Phe  Arg Ala Asn
    1205                1210                1215

Gly Val  Gln Val Lys Gly Glu  Phe Val Thr Asp Arg  Tyr Gly Arg
    1220                1225                1230

Ile Ser  Tyr Tyr Asp Gly Asn  Ser Gly Asp Gln Ile  Arg Asn Arg
    1235                1240                1245

Phe Val  Arg Asn Ala Gln Gly  Gln Trp Phe Tyr Phe  Asp Asn Asn
    1250                1255                1260

Gly Tyr  Ala Val Thr Gly Ala  Arg Thr Ile Asn Gly  Gln His Leu
    1265                1270                1275

Tyr Phe  Arg Ala Asn Gly Val  Gln Val Lys Gly Glu  Phe Val Thr
    1280                1285                1290

Asp Arg  Tyr Gly Arg Ile Ser  Tyr Tyr Asp Ala Asn  Ser Gly Glu
    1295                1300                1305

Arg Val  Arg Ile Asn
    1310


<210> SEQ ID NO 4
<211> LENGTH: 1146
<212> TYPE: PRT
<213> ORGANISM: Paenibacillus humicus

<400> SEQUENCE: 4

Met Arg Ile Arg Thr Lys Tyr Met Asn Trp Met Leu Val Leu Val Leu
1               5                   10                  15

Ile Ala Ala Gly Phe Phe Gln Ala Ala Gly Pro Ile Ala Pro Ala Thr
            20                  25                  30

Ala Ala Gly Gly Ala Asn Leu Thr Leu Gly Lys Thr Val Thr Ala Ser
        35                  40                  45

Gly Gln Ser Gln Thr Tyr Ser Pro Asp Asn Val Lys Asp Ser Asn Gln
    50                  55                  60

Gly Thr Tyr Trp Glu Ser Thr Asn Asn Ala Phe Pro Gln Trp Ile Gln
65                  70                  75                  80

Val Asp Leu Gly Ala Ser Thr Ser Ile Asp Gln Ile Val Leu Lys Leu
                85                  90                  95

Pro Ser Gly Trp Glu Thr Arg Thr Gln Thr Leu Ser Ile Gln Gly Ser
            100                 105                 110

Ala Asn Gly Ser Thr Phe Thr Asn Ile Val Gly Ser Ala Gly Tyr Thr
        115                 120                 125

Phe Asn Pro Ser Val Ala Gly Asn Ser Val Thr Ile Asn Phe Ser Ala
    130                 135                 140
```

```
Ala Ser Ala Arg Tyr Val Arg Leu Asn Phe Thr Ala Asn Thr Gly Trp
145                 150                 155                 160

Pro Ala Gly Gln Leu Ser Glu Leu Glu Ile Tyr Gly Ala Thr Ala Pro
                165                 170                 175

Thr Pro Thr Pro Thr Pro Thr Pro Thr Pro Thr Pro Thr Pro Thr Pro
            180                 185                 190

Thr Pro Thr Pro Thr Val Thr Pro Ala Pro Ser Ala Thr Pro Thr Pro
        195                 200                 205

Thr Pro Pro Ala Gly Ser Asn Ile Ala Val Gly Lys Ser Ile Thr Ala
    210                 215                 220

Ser Ser Ser Thr Gln Thr Tyr Val Ala Ala Asn Ala Asn Asp Asn Asn
225                 230                 235                 240

Thr Ser Thr Tyr Trp Glu Gly Gly Ser Asn Pro Ser Thr Leu Thr Leu
                245                 250                 255

Asp Phe Gly Ser Asn Gln Ser Ile Thr Ser Val Val Leu Lys Leu Asn
            260                 265                 270

Pro Ala Ser Glu Trp Gly Thr Arg Thr Gln Thr Ile Gln Val Leu Gly
        275                 280                 285

Ala Asp Gln Asn Ala Gly Ser Phe Ser Asn Leu Val Ser Ala Gln Ser
    290                 295                 300

Tyr Thr Phe Asn Pro Ala Thr Gly Asn Thr Val Thr Ile Pro Val Ser
305                 310                 315                 320

Ala Thr Val Lys Arg Leu Gln Leu Asn Ile Thr Ala Asn Ser Gly Ala
                325                 330                 335

Pro Ala Gly Gln Ile Ala Glu Phe Gln Val Phe Gly Thr Pro Ala Pro
            340                 345                 350

Asn Pro Asp Leu Thr Ile Thr Gly Met Ser Trp Thr Pro Ser Ser Pro
        355                 360                 365

Val Glu Ser Gly Asp Ile Thr Leu Asn Ala Val Val Lys Asn Ile Gly
    370                 375                 380

Thr Ala Ala Ala Gly Ala Thr Thr Val Asn Phe Tyr Leu Asn Asn Glu
385                 390                 395                 400

Leu Ala Gly Thr Ala Pro Val Gly Ala Leu Ala Ala Gly Ala Ser Ala
                405                 410                 415

Asn Val Ser Ile Asn Ala Gly Ala Lys Ala Ala Ala Thr Tyr Ala Val
            420                 425                 430

Ser Ala Lys Val Asp Glu Ser Asn Ala Val Ile Glu Gln Asn Glu Gly
        435                 440                 445

Asn Asn Ser Tyr Ser Asn Pro Thr Asn Leu Val Val Ala Pro Val Ser
    450                 455                 460

Ser Ser Asp Leu Val Ala Val Thr Ser Trp Ser Pro Gly Thr Pro Ser
465                 470                 475                 480

Gln Gly Ala Ala Val Ala Phe Thr Val Ala Leu Lys Asn Gln Gly Thr
                485                 490                 495

Leu Ala Ser Ala Gly Gly Ala His Pro Val Thr Val Val Leu Lys Asn
            500                 505                 510

Ala Ala Gly Ala Thr Leu Gln Thr Phe Thr Gly Thr Tyr Thr Gly Ser
        515                 520                 525

Leu Ala Ala Gly Ala Ser Ala Asn Ile Ser Val Gly Ser Trp Thr Ala
    530                 535                 540

Ala Ser Gly Thr Tyr Thr Val Ser Thr Thr Val Ala Ala Asp Gly Asn
545                 550                 555                 560

Glu Ile Pro Ala Lys Gln Ser Asn Asn Thr Ser Ser Ala Ser Leu Thr
```

```
                565                 570                 575

Val Tyr Ser Ala Arg Gly Ala Ser Met Pro Tyr Ser Arg Tyr Asp Thr
            580                 585                 590

Glu Asp Ala Val Leu Gly Gly Gly Ala Val Leu Arg Thr Ala Pro Thr
        595                 600                 605

Phe Asp Gln Ser Leu Ile Ala Ser Glu Ala Ser Gly Gln Lys Tyr Ala
    610                 615                 620

Ala Leu Pro Ser Asn Gly Ser Ser Leu Gln Trp Thr Val Arg Gln Gly
625                 630                 635                 640

Gln Gly Gly Ala Gly Val Thr Met Arg Phe Thr Met Pro Asp Thr Ser
                645                 650                 655

Asp Gly Met Gly Gln Asn Gly Ser Leu Asp Val Tyr Val Asn Gly Thr
            660                 665                 670

Lys Ala Lys Thr Val Ser Leu Thr Ser Tyr Tyr Ser Trp Gln Tyr Phe
        675                 680                 685

Ser Gly Asp Met Pro Ala Asp Ala Pro Gly Gly Gly Arg Pro Leu Phe
    690                 695                 700

Arg Phe Asp Glu Val His Phe Lys Leu Asp Thr Ala Leu Lys Pro Gly
705                 710                 715                 720

Asp Thr Ile Arg Val Gln Lys Gly Gly Asp Ser Leu Glu Tyr Gly Val
                725                 730                 735

Asp Phe Ile Glu Ile Glu Pro Ile Pro Ala Ala Val Ala Arg Pro Ala
            740                 745                 750

Asn Ser Val Ser Val Thr Glu Tyr Gly Ala Val Ala Asn Asp Gly Lys
        755                 760                 765

Asp Asp Leu Ala Ala Phe Lys Ala Ala Val Thr Ala Ala Val Ala Ala
    770                 775                 780

Gly Lys Ser Leu Tyr Ile Pro Glu Gly Thr Phe His Leu Ser Ser Met
785                 790                 795                 800

Trp Glu Ile Gly Ser Ala Thr Ser Met Ile Asp Asn Phe Thr Val Thr
                805                 810                 815

Gly Ala Gly Ile Trp Tyr Thr Asn Ile Gln Phe Thr Asn Pro Asn Ala
            820                 825                 830

Ser Gly Gly Gly Ile Ser Leu Arg Ile Lys Gly Lys Leu Asp Phe Ser
        835                 840                 845

Asn Ile Tyr Met Asn Ser Asn Leu Arg Ser Arg Tyr Gly Gln Asn Ala
    850                 855                 860

Val Tyr Lys Gly Phe Met Asp Asn Phe Gly Thr Asn Ser Ile Ile His
865                 870                 875                 880

Asp Val Trp Val Glu His Phe Glu Cys Gly Met Trp Val Gly Asp Tyr
                885                 890                 895

Ala His Thr Pro Ala Ile Tyr Ala Ser Gly Leu Val Val Glu Asn Ser
            900                 905                 910

Arg Ile Arg Asn Asn Leu Ala Asp Gly Ile Asn Phe Ser Gln Gly Thr
        915                 920                 925

Ser Asn Ser Thr Val Arg Asn Ser Ser Ile Arg Asn Asn Gly Asp Asp
    930                 935                 940

Gly Leu Ala Val Trp Thr Ser Asn Thr Asn Gly Ala Pro Ala Gly Val
945                 950                 955                 960

Asn Asn Thr Phe Ser Tyr Asn Thr Ile Glu Asn Asn Trp Arg Ala Ala
                965                 970                 975

Ala Ile Ala Phe Phe Gly Gly Ser Gly His Lys Ala Asp His Asn Tyr
            980                 985                 990
```

```
Ile Ile Asp Cys Val Gly Gly Ser  Gly Ile Arg Met Asn  Thr Val Phe
        995                 1000                 1005

Pro Gly  Tyr His Phe Gln Asn  Asn Thr Gly Ile Thr  Phe Ser Asp
    1010                 1015                 1020

Thr Thr  Ile Ile Asn Ser Gly  Thr Ser Gln Asp Leu  Tyr Asn Gly
    1025                 1030                 1035

Glu Arg  Gly Ala Ile Asp Leu  Glu Ala Ser Asn Asp  Ala Ile Lys
    1040                 1045                 1050

Asn Val  Thr Phe Thr Asn Ile  Asp Ile Ile Asn Ala  Gln Arg Asp
    1055                 1060                 1065

Gly Val  Gln Ile Gly Tyr Gly  Gly Gly Phe Glu Asn  Ile Val Phe
    1070                 1075                 1080

Asn Asn  Ile Thr Ile Asp Gly  Thr Gly Arg Asp Gly  Ile Ser Thr
    1085                 1090                 1095

Ser Arg  Phe Ser Gly Pro His  Leu Gly Ala Ala Ile  Tyr Thr Tyr
    1100                 1105                 1110

Thr Gly  Asn Gly Ser Ala Thr  Phe Asn Asn Leu Val  Thr Arg Asn
    1115                 1120                 1125

Ile Ala  Tyr Ala Gly Gly Asn  Tyr Ile Gln Ser Gly  Phe Asn Leu
    1130                 1135                 1140

Thr Ile  Lys
    1145
```

<210> SEQ ID NO 5
<211> LENGTH: 3351
<212> TYPE: DNA
<213> ORGANISM: Paenibacillus humicus

<400> SEQUENCE: 5

```
atggctagcg cagcaggagg cgcgaatctg acgctcggca aaaccgtcac cgccagcggc     60

cagtcgcaga cgtacagccc cgacaatgtc aaggacagca atcagggaac ttactgggaa    120

agcacgaaca acgccttccc gcagtggatc caagtcgacc ttggcgccag cacgagcatc    180

gaccagatcg tgctcaaact tccgtccgga tgggagactc gtacgcaaac gctctcgata    240

cagggcagcg cgaacggctc gacgttcacg aacatcgtcg gatcggccgg gtatacattc    300

aatccatccg tcgccggcaa cagcgtcacg atcaacttca gcgctgccag cgcccgctac    360

gtccgcctga atttcacggc caatacgggc tggccagcag gccagctgtc ggagcttgag    420

atctacggag cgacggcgcc aacgcctact cccacgccta ctccaacacc aacgccaacg    480

ccaacaccaa cgccaacccc tacagtaacc cctgcgcctt cggccacgcc gactccgact    540

cctccggcag gcagcaacat cgccgtaggg aaatcgatta cagcctcttc cagcacgcag    600

acctacgtag ctgcaaatgc aaatgacaac aatacatcca cctattggga gggaggaagc    660

aacccgagca cgctgactct cgatttcggt tccaaccaga gcatcacttc cgtcgtcctc    720

aagctgaatc cggcttcgga atgggggact cgcacgcaaa cgatccaagt tcttggagcg    780

gatcagaacg ccggctcctt cagcaatctc gtctctgccc agtcctatac gttcaatccc    840

gcaaccggca atacggtgac gattccggtc tccgcgacgg tcaagcgcct ccagctgaac    900

attacggcga actccggcgc ccctgccggc cagattgccg agttccaagt gttcggcacg    960

ccagcgccta atccggactt gaccattacc ggcatgtcct ggactccgtc ttctccggtc   1020

gagagcggcg acattacgct gaacgccgtc gtcaagaaca tcggaactgc agctgcaggc   1080

gccacgacgg tcaatttcta cctgaacaac gaactcgccg gcaccgctcc ggtaggcgcg   1140
```

```
cttgcggcag gagcttctgc aaatgtatcg atcaatgcag gcgccaaagc agccgcaacg   1200
tatgcggtaa gcgccaaagt cgacgagagc aacgccgtca tcgagcagaa tgaaggcaac   1260
aacagctact cgaacccgac taacctcgtc gtagcgccgg tgtccagctc cgacctcgtc   1320
gccgtgacgt catggtcgcc gggcacgccg tcgcagggag cggcggtcgc atttaccgtc   1380
gcgcttaaaa atcagggtac gctggcttcc gccggcggag cccatcccgt aaccgtcgtt   1440
ctgaaaaacg ctgccggagc gacgctgcaa accttcacgg gcacctacac aggttccctg   1500
gcagcaggcg catccgcgaa tatcagcgtg ggcagctgga cggcagcgag cggcacctat   1560
accgtctcga cgacggtagc cgctgacggc aatgaaattc cggccaagca aagcaacaat   1620
acgagcagcg cgagcctcac ggtctactcg gcgcgcggcg ccagcatgcc gtacagccgt   1680
tacgacacgg aggatgcggt gctcggcggc ggagctgtcc tgagaacggc gccgacgttc   1740
gatcagtcgc tcatcgcttc cgaagcatcg ggacagaaat acgccgcact tccgtccaac   1800
ggctccagcc tgcagtggac cgtccgtcaa ggccagggcg gtgcaggcgt cacgatgcgc   1860
ttcacgatgc ccgacacgag cgacggcatg ggccagaacg gctcgctcga cgtctatgtc   1920
aacggaacca aagccaaaac ggtgtcgctg acctcttatt acagctggca gtatttctcc   1980
ggcgacatgc cggctgacgc tccgggcggc ggcaggccgc tcttccgctt cgacgaagtc   2040
cacttcaagc tggatacggc gttgaagccg ggagacacga tccgcgtcca gaagggcggt   2100
gacagcctgg agtacggcgt cgacttcatc gagatcgagc cgattccggc agcggttgcc   2160
cgtccggcca actcggtgtc cgtcaccgaa tacggcgctg tcgccaatga cggcaaggat   2220
gatctcgccg ccttcaaggc tgccgtgacc gcagcggtag cggccggaaa atccctctac   2280
atcccggaag gcaccttcca cctgagcagc atgtgggaga tcggctcggc caccagcatg   2340
atcgacaact tcacggtcac gggtgccggc atctggtata cgaacatcca gttcacgaat   2400
cccaatgcat cgggcggcgg catctccctg agaatcaaag gaaagctgga tttcagcaac   2460
atctacatga actccaacct gcgttcccgt tacgggcaga acgccgtcta caaaggcttt   2520
atggacaatt tcggcactaa ttcgatcatc catgacgtct gggtcgagca tttcgaatgc   2580
ggcatgtggg tcggcgacta cgcccatact cctgcgatct atgcgagcgg gctcgtcgtg   2640
gaaaacagcc gcatccgcaa caatcttgcc gacggcatca acttctcgca gggaacgagc   2700
aactcgaccg tccgcaacag cagcatccgc aacaacggcg atgacggcct cgccgtctgg   2760
acgagcaaca cgaacggcgc tccggccggc gtgaacaaca ccttctccta caacacgatc   2820
gagaacaact ggcgcgcggc ggccatcgcc ttcttcggcg gcagcggcca caaggctgac   2880
cacaactaca tcatcgactg tgtcggcggc tccggcatcc ggatgaatac ggtgttccca   2940
ggctaccact tccagaacaa caccggcatc accttctcgg atacgacgat catcaacagc   3000
ggcaccagcc aggatctgta caacggcgag cgcggagcga ttgatctgga agcatccaac   3060
gacgcgatca aaaacgtcac cttcaccaac atcgacatca tcaatgccca gcgcgacggc   3120
gttcagatcg gctatggcgg cggcttcgag aacatcgtgt tcaacaacat cacgatcgac   3180
ggcaccggcc gcgacgggat atcgacatcc cgcttctcgg gacctcatct tggcgcagcc   3240
atctatacgt acacgggcaa cggctcggcg acgttcaaca acctggtgac ccggaacatc   3300
gcctatgcag gcggcaacta catccagagc gggttcaacc tgacgatcta a            3351
```

<210> SEQ ID NO 6
<211> LENGTH: 1116
<212> TYPE: PRT

```
<213> ORGANISM: Paenibacillus humicus

<400> SEQUENCE: 6

Met Ala Ser Ala Ala Gly Gly Ala Asn Leu Thr Leu Gly Lys Thr Val
1               5                   10                  15

Thr Ala Ser Gly Gln Ser Gln Thr Tyr Ser Pro Asp Asn Val Lys Asp
            20                  25                  30

Ser Asn Gln Gly Thr Tyr Trp Glu Ser Thr Asn Asn Ala Phe Pro Gln
        35                  40                  45

Trp Ile Gln Val Asp Leu Gly Ala Ser Thr Ser Ile Asp Gln Ile Val
    50                  55                  60

Leu Lys Leu Pro Ser Gly Trp Glu Thr Arg Thr Gln Thr Leu Ser Ile
65                  70                  75                  80

Gln Gly Ser Ala Asn Gly Ser Thr Phe Thr Asn Ile Val Gly Ser Ala
                85                  90                  95

Gly Tyr Thr Phe Asn Pro Ser Val Ala Gly Asn Ser Val Thr Ile Asn
            100                 105                 110

Phe Ser Ala Ala Ser Ala Arg Tyr Val Arg Leu Asn Phe Thr Ala Asn
        115                 120                 125

Thr Gly Trp Pro Ala Gly Gln Leu Ser Glu Leu Glu Ile Tyr Gly Ala
    130                 135                 140

Thr Ala Pro Thr Pro Thr Pro Thr Pro Thr Pro Thr Pro Thr Pro Thr
145                 150                 155                 160

Pro Thr Pro Thr Pro Thr Pro Thr Val Thr Pro Ala Pro Ser Ala Thr
                165                 170                 175

Pro Thr Pro Thr Pro Pro Ala Gly Ser Asn Ile Ala Val Gly Lys Ser
            180                 185                 190

Ile Thr Ala Ser Ser Ser Thr Gln Thr Tyr Val Ala Ala Asn Ala Asn
        195                 200                 205

Asp Asn Asn Thr Ser Thr Tyr Trp Glu Gly Gly Ser Asn Pro Ser Thr
    210                 215                 220

Leu Thr Leu Asp Phe Gly Ser Asn Gln Ser Ile Thr Ser Val Val Leu
225                 230                 235                 240

Lys Leu Asn Pro Ala Ser Glu Trp Gly Thr Arg Thr Gln Thr Ile Gln
                245                 250                 255

Val Leu Gly Ala Asp Gln Asn Ala Gly Ser Phe Ser Asn Leu Val Ser
            260                 265                 270

Ala Gln Ser Tyr Thr Phe Asn Pro Ala Thr Gly Asn Thr Val Thr Ile
        275                 280                 285

Pro Val Ser Ala Thr Val Lys Arg Leu Gln Leu Asn Ile Thr Ala Asn
    290                 295                 300

Ser Gly Ala Pro Ala Gly Gln Ile Ala Glu Phe Gln Val Phe Gly Thr
305                 310                 315                 320

Pro Ala Pro Asn Pro Asp Leu Thr Ile Thr Gly Met Ser Trp Thr Pro
                325                 330                 335

Ser Ser Pro Val Glu Ser Gly Asp Ile Thr Leu Asn Ala Val Val Lys
            340                 345                 350

Asn Ile Gly Thr Ala Ala Ala Gly Ala Thr Thr Val Asn Phe Tyr Leu
        355                 360                 365

Asn Asn Glu Leu Ala Gly Thr Ala Pro Val Gly Ala Leu Ala Ala Gly
    370                 375                 380

Ala Ser Ala Asn Val Ser Ile Asn Ala Gly Ala Lys Ala Ala Ala Thr
385                 390                 395                 400
```

```
Tyr Ala Val Ser Ala Lys Val Asp Glu Ser Asn Ala Val Ile Glu Gln
                405                 410                 415

Asn Glu Gly Asn Asn Ser Tyr Ser Asn Pro Thr Asn Leu Val Val Ala
            420                 425                 430

Pro Val Ser Ser Ser Asp Leu Val Ala Val Thr Ser Trp Ser Pro Gly
        435                 440                 445

Thr Pro Ser Gln Gly Ala Ala Val Ala Phe Thr Val Ala Leu Lys Asn
    450                 455                 460

Gln Gly Thr Leu Ala Ser Ala Gly Gly Ala His Pro Val Thr Val Val
465                 470                 475                 480

Leu Lys Asn Ala Ala Gly Ala Thr Leu Gln Thr Phe Thr Gly Thr Tyr
                485                 490                 495

Thr Gly Ser Leu Ala Ala Gly Ala Ser Ala Asn Ile Ser Val Gly Ser
            500                 505                 510

Trp Thr Ala Ala Ser Gly Thr Tyr Thr Val Ser Thr Thr Val Ala Ala
        515                 520                 525

Asp Gly Asn Glu Ile Pro Ala Lys Gln Ser Asn Asn Thr Ser Ser Ala
    530                 535                 540

Ser Leu Thr Val Tyr Ser Ala Arg Gly Ala Ser Met Pro Tyr Ser Arg
545                 550                 555                 560

Tyr Asp Thr Glu Asp Ala Val Leu Gly Gly Gly Ala Val Leu Arg Thr
                565                 570                 575

Ala Pro Thr Phe Asp Gln Ser Leu Ile Ala Ser Glu Ala Ser Gly Gln
            580                 585                 590

Lys Tyr Ala Ala Leu Pro Ser Asn Gly Ser Ser Leu Gln Trp Thr Val
        595                 600                 605

Arg Gln Gly Gln Gly Gly Ala Gly Val Thr Met Arg Phe Thr Met Pro
    610                 615                 620

Asp Thr Ser Asp Gly Met Gly Gln Asn Gly Ser Leu Asp Val Tyr Val
625                 630                 635                 640

Asn Gly Thr Lys Ala Lys Thr Val Ser Leu Thr Ser Tyr Tyr Ser Trp
                645                 650                 655

Gln Tyr Phe Ser Gly Asp Met Pro Ala Asp Ala Pro Gly Gly Gly Arg
            660                 665                 670

Pro Leu Phe Arg Phe Asp Glu Val His Phe Lys Leu Asp Thr Ala Leu
        675                 680                 685

Lys Pro Gly Asp Thr Ile Arg Val Gln Lys Gly Gly Asp Ser Leu Glu
    690                 695                 700

Tyr Gly Val Asp Phe Ile Glu Ile Glu Pro Ile Pro Ala Ala Val Ala
705                 710                 715                 720

Arg Pro Ala Asn Ser Val Ser Val Thr Glu Tyr Gly Ala Val Ala Asn
                725                 730                 735

Asp Gly Lys Asp Asp Leu Ala Ala Phe Lys Ala Ala Val Thr Ala Ala
            740                 745                 750

Val Ala Ala Gly Lys Ser Leu Tyr Ile Pro Glu Gly Thr Phe His Leu
        755                 760                 765

Ser Ser Met Trp Glu Ile Gly Ser Ala Thr Ser Met Ile Asp Asn Phe
    770                 775                 780

Thr Val Thr Gly Ala Gly Ile Trp Tyr Thr Asn Ile Gln Phe Thr Asn
785                 790                 795                 800

Pro Asn Ala Ser Gly Gly Gly Ile Ser Leu Arg Ile Lys Gly Lys Leu
                805                 810                 815

Asp Phe Ser Asn Ile Tyr Met Asn Ser Asn Leu Arg Ser Arg Tyr Gly
```

```
            820                 825                 830

Gln Asn Ala Val Tyr Lys Gly Phe Met Asp Asn Phe Gly Thr Asn Ser
        835                 840                 845

Ile Ile His Asp Val Trp Val Glu His Phe Glu Cys Gly Met Trp Val
    850                 855                 860

Gly Asp Tyr Ala His Thr Pro Ala Ile Tyr Ala Ser Gly Leu Val Val
865                 870                 875                 880

Glu Asn Ser Arg Ile Arg Asn Asn Leu Ala Asp Gly Ile Asn Phe Ser
                885                 890                 895

Gln Gly Thr Ser Asn Ser Thr Val Arg Asn Ser Ser Ile Arg Asn Asn
            900                 905                 910

Gly Asp Asp Gly Leu Ala Val Trp Thr Ser Asn Thr Asn Gly Ala Pro
        915                 920                 925

Ala Gly Val Asn Asn Thr Phe Ser Tyr Asn Thr Ile Glu Asn Asn Trp
    930                 935                 940

Arg Ala Ala Ala Ile Ala Phe Phe Gly Gly Ser Gly His Lys Ala Asp
945                 950                 955                 960

His Asn Tyr Ile Ile Asp Cys Val Gly Gly Ser Gly Ile Arg Met Asn
                965                 970                 975

Thr Val Phe Pro Gly Tyr His Phe Gln Asn Asn Thr Gly Ile Thr Phe
            980                 985                 990

Ser Asp Thr Thr Ile Ile Asn Ser  Gly Thr Ser Gln Asp  Leu Tyr Asn
        995                 1000                1005

Gly Glu  Arg Gly Ala Ile Asp  Leu Glu Ala Ser Asn  Asp Ala Ile
    1010                1015                1020

Lys Asn  Val Thr Phe Thr Asn  Ile Asp Ile Ile Asn  Ala Gln Arg
    1025                1030                1035

Asp Gly  Val Gln Ile Gly Tyr  Gly Gly Gly Phe Glu  Asn Ile Val
    1040                1045                1050

Phe Asn  Asn Ile Thr Ile Asp  Gly Thr Gly Arg Asp  Gly Ile Ser
    1055                1060                1065

Thr Ser  Arg Phe Ser Gly Pro  His Leu Gly Ala Ala  Ile Tyr Thr
    1070                1075                1080

Tyr Thr  Gly Asn Gly Ser Ala  Thr Phe Asn Asn Leu  Val Thr Arg
    1085                1090                1095

Asn Ile  Ala Tyr Ala Gly Gly  Asn Tyr Ile Gln Ser  Gly Phe Asn
    1100                1105                1110

Leu Thr  Ile
    1115


<210> SEQ ID NO 7
<211> LENGTH: 26
<212> TYPE: PRT
<213> ORGANISM: Bacillus subtilis

<400> SEQUENCE: 7

Met Arg Ser Lys Lys Leu Trp Ile Ser Leu Leu Phe Ala Leu Thr Leu
1               5                   10                  15

Ile Phe Thr Met Ala Phe Ser Asn Met Ser
            20                  25


<210> SEQ ID NO 8
<211> LENGTH: 3426
<212> TYPE: DNA
<213> ORGANISM: Paenibacillus humicus
```

<400> SEQUENCE: 8
gtgagaagca aaaaattgtg gatcagcttg ttgtttgcgt taacgttaat ctttacgatg 60
gcgttcagca acatgtctgc tagcgcagca ggaggcgcga atctgacgct cggcaaaacc 120
gtcaccgcca gcggccagtc gcagacgtac agccccgaca atgtcaagga cagcaatcag 180
ggaacttact gggaaagcac gaacaacgcc ttcccgcagt ggatccaagt cgaccttggc 240
gccagcacga gcatcgacca gatcgtgctc aaacttccgt ccggatggga gactcgtacg 300
caaacgctct cgatacaggg cagcgcgaac ggctcgacgt tcacgaacat cgtcggatcg 360
gccgggtata cattcaatcc atccgtcgcc ggcaacagcg tcacgatcaa cttcagcgct 420
gccagcgccc gctacgtccg cctgaatttc acggccaata cgggctggcc agcaggccag 480
ctgtcggagc ttgagatcta cggagcgacg gcgccaacgc ctactcccac gcctactcca 540
acaccaacgc caacgccaac accaacgcca accccctacag taacccctgc gccttcggcc 600
acgccgactc cgactcctcc ggcaggcagc aacatcgccg tagggaaatc gattacagcc 660
tcttccagca cgcagaccta cgtagctgca aatgcaaatg acaacaatac atccacctat 720
tgggagggag gaagcaaccc gagcacgctg actctcgatt tcggttccaa ccagagcatc 780
acttccgtcg tcctcaagct gaatccggct tcggaatggg ggactcgcac gcaaacgatc 840
caagttcttg gagcggatca gaacgccggc tccttcagca atctcgtctc tgcccagtcc 900
tatacgttca atcccgcaac cggcaatacg gtgacgattc cggtctccgc gacggtcaag 960
cgcctccagc tgaacattac ggcgaactcc ggcgcccctg ccggccagat tgccgagttc 1020
caagtgttcg gcacgccagc gcctaatccg gacttgacca ttaccggcat gtcctggact 1080
ccgtcttctc cggtcgagag cggcgacatt acgctgaacg ccgtcgtcaa gaacatcgga 1140
actgcagctg caggcgccac gacggtcaat ttctacctga acaacgaact cgccggcacc 1200
gctccggtag gcgcgcttgc ggcaggagct tctgcaaatg tatcgatcaa tgcaggcgcc 1260
aaagcagccg caacgtatgc ggtaagcgcc aaagtcgacg agagcaacgc cgtcatcgag 1320
cagaatgaag gcaacaacag ctactcgaac ccgactaacc tcgtcgtagc gccggtgtcc 1380
agctccgacc tcgtcgccgt gacgtcatgg tcgccgggca cgccgtcgca gggagcggcg 1440
gtcgcattta ccgtcgcgct taaaaatcag ggtacgctgg cttccgccgg cggagcccat 1500
cccgtaaccg tcgttctgaa aaacgctgcc ggagcgacgc tgcaaacctt cacgggcacc 1560
tacacaggtt ccctggcagc aggcgcatcc gcgaatatca gcgtgggcag ctggacggca 1620
gcgagcggca cctataccgt ctcgacgacg gtagccgctg acggcaatga aattccggcc 1680
aagcaaagca acaatacgag cagcgcgagc ctcacggtct actcggcgcg cggcgccagc 1740
atgccgtaca gccgttacga cacggaggat gcggtgctcg gcggcggagc tgtcctgaga 1800
acggcgccga cgttcgatca gtcgctcatc gcttccgaag catcgggaca gaaatacgcc 1860
gcacttccgt ccaacggctc cagcctgcag tggaccgtcc gtcaaggcca gggcggtgca 1920
ggcgtcacga tgcgcttcac gatgcccgac acgagcgacg gcatgggcca gaacggctcg 1980
ctcgacgtct atgtcaacgg aaccaaagcc aaaacggtgt cgctgacctc ttattacagc 2040
tggcagtatt tctccggcga catgccggct gacgctccgg gcggcggcag gccgctcttc 2100
cgcttcgacg aagtccactt caagctggat acggcgttga agccgggaga cacgatccgc 2160
gtccagaagg gcggtgacag cctggagtac ggcgtcgact tcatcgagat cgagccgatt 2220
ccggcagcgg ttgcccgtcc ggccaactcg gtgtccgtca ccgaatacgg cgctgtcgcc 2280
aatgacggca aggatgatct cgccgccttc aaggctgccg tgaccgcagc ggtagcggcc 2340

```
ggaaaatccc tctacatccc ggaaggcacc ttccacctga gcagcatgtg ggagatcggc   2400

tcggccacca gcatgatcga caacttcacg gtcacgggtg ccggcatctg gtatacgaac   2460

atccagttca cgaatcccaa tgcatcgggc ggcggcatct ccctgagaat caaaggaaag   2520

ctggatttca gcaacatcta catgaactcc aacctgcgtt cccgttacgg gcagaacgcc   2580

gtctacaaag gctttatgga caatttcggc actaattcga tcatccatga cgtctgggtc   2640

gagcatttcg aatgcggcat gtgggtcggc gactacgccc atactcctgc gatctatgcg   2700

agcgggctcg tcgtggaaaa cagccgcatc cgcaacaatc ttgccgacgg catcaacttc   2760

tcgcagggaa cgagcaactc gaccgtccgc aacagcagca tccgcaacaa cggcgatgac   2820

ggcctcgccg tctggacgag caacacgaac ggcgctccgg ccggcgtgaa caacaccttc   2880

tcctacaaca cgatcgagaa caactggcgc gcggcggcca tcgccttctt cggcggcagc   2940

ggccacaagg ctgaccacaa ctacatcatc gactgtgtcg gcggctccgg catccggatg   3000

aatacggtgt tcccaggcta ccacttccag aacaacaccg gcatcacctt ctcggatacg   3060

acgatcatca acagcggcac cagccaggat ctgtacaacg gcgagcgcgg agcgattgat   3120

ctggaagcat ccaacgacgc gatcaaaaac gtcaccttca ccaacatcga catcatcaat   3180

gcccagcgcg acggcgttca gatcggctat ggcggcggct tcgagaacat cgtgttcaac   3240

aacatcacga tcgacggcac cggccgcgac gggatatcga catcccgctt ctcgggacct   3300

catcttggcg cagccatcta tacgtacacg ggcaacggct cggcgacgtt caacaacctg   3360

gtgacccgga acatcgccta tgcaggcggc aactacatcc agagcgggtt caacctgacg   3420

atctaa                                                              3426
```

```
<210> SEQ ID NO 9
<211> LENGTH: 1141
<212> TYPE: PRT
<213> ORGANISM: Paenibacillus humicus

<400> SEQUENCE: 9

Met Arg Ser Lys Lys Leu Trp Ile Ser Leu Leu Phe Ala Leu Thr Leu
1               5                   10                  15

Ile Phe Thr Met Ala Phe Ser Asn Met Ser Ala Ser Ala Ala Gly Gly
            20                  25                  30

Ala Asn Leu Thr Leu Gly Lys Thr Val Thr Ala Ser Gly Gln Ser Gln
        35                  40                  45

Thr Tyr Ser Pro Asp Asn Val Lys Asp Ser Asn Gln Gly Thr Tyr Trp
    50                  55                  60

Glu Ser Thr Asn Asn Ala Phe Pro Gln Trp Ile Gln Val Asp Leu Gly
65                  70                  75                  80

Ala Ser Thr Ser Ile Asp Gln Ile Val Leu Lys Leu Pro Ser Gly Trp
                85                  90                  95

Glu Thr Arg Thr Gln Thr Leu Ser Ile Gln Gly Ser Ala Asn Gly Ser
            100                 105                 110

Thr Phe Thr Asn Ile Val Gly Ser Ala Gly Tyr Thr Phe Asn Pro Ser
        115                 120                 125

Val Ala Gly Asn Ser Val Thr Ile Asn Phe Ser Ala Ala Ser Ala Arg
    130                 135                 140

Tyr Val Arg Leu Asn Phe Thr Ala Asn Thr Gly Trp Pro Ala Gly Gln
145                 150                 155                 160

Leu Ser Glu Leu Glu Ile Tyr Gly Ala Thr Ala Pro Thr Pro Thr Pro
                165                 170                 175
```

```
Thr Pro Thr Pro Thr Pro Thr Pro Thr Pro Thr Pro Thr Pro Thr Pro
            180                 185                 190

Thr Val Thr Pro Ala Pro Ser Ala Thr Pro Thr Pro Thr Pro Pro Ala
        195                 200                 205

Gly Ser Asn Ile Ala Val Gly Lys Ser Ile Thr Ala Ser Ser Ser Thr
    210                 215                 220

Gln Thr Tyr Val Ala Ala Asn Ala Asn Asp Asn Asn Thr Ser Thr Tyr
225                 230                 235                 240

Trp Glu Gly Gly Ser Asn Pro Ser Thr Leu Thr Leu Asp Phe Gly Ser
                245                 250                 255

Asn Gln Ser Ile Thr Ser Val Val Leu Lys Leu Asn Pro Ala Ser Glu
            260                 265                 270

Trp Gly Thr Arg Thr Gln Thr Ile Gln Val Leu Gly Ala Asp Gln Asn
        275                 280                 285

Ala Gly Ser Phe Ser Asn Leu Val Ser Ala Gln Ser Tyr Thr Phe Asn
    290                 295                 300

Pro Ala Thr Gly Asn Thr Val Thr Ile Pro Val Ser Ala Thr Val Lys
305                 310                 315                 320

Arg Leu Gln Leu Asn Ile Thr Ala Asn Ser Gly Ala Pro Ala Gly Gln
                325                 330                 335

Ile Ala Glu Phe Gln Val Phe Gly Thr Pro Ala Pro Asn Pro Asp Leu
            340                 345                 350

Thr Ile Thr Gly Met Ser Trp Thr Pro Ser Ser Pro Val Glu Ser Gly
        355                 360                 365

Asp Ile Thr Leu Asn Ala Val Val Lys Asn Ile Gly Thr Ala Ala Ala
    370                 375                 380

Gly Ala Thr Thr Val Asn Phe Tyr Leu Asn Asn Glu Leu Ala Gly Thr
385                 390                 395                 400

Ala Pro Val Gly Ala Leu Ala Ala Gly Ala Ser Ala Asn Val Ser Ile
                405                 410                 415

Asn Ala Gly Ala Lys Ala Ala Ala Thr Tyr Ala Val Ser Ala Lys Val
            420                 425                 430

Asp Glu Ser Asn Ala Val Ile Glu Gln Asn Glu Gly Asn Asn Ser Tyr
        435                 440                 445

Ser Asn Pro Thr Asn Leu Val Val Ala Pro Val Ser Ser Ser Asp Leu
    450                 455                 460

Val Ala Val Thr Ser Trp Ser Pro Gly Thr Pro Ser Gln Gly Ala Ala
465                 470                 475                 480

Val Ala Phe Thr Val Ala Leu Lys Asn Gln Gly Thr Leu Ala Ser Ala
                485                 490                 495

Gly Gly Ala His Pro Val Thr Val Val Leu Lys Asn Ala Ala Gly Ala
            500                 505                 510

Thr Leu Gln Thr Phe Thr Gly Thr Tyr Thr Gly Ser Leu Ala Ala Gly
        515                 520                 525

Ala Ser Ala Asn Ile Ser Val Gly Ser Trp Thr Ala Ala Ser Gly Thr
    530                 535                 540

Tyr Thr Val Ser Thr Thr Val Ala Ala Asp Gly Asn Glu Ile Pro Ala
545                 550                 555                 560

Lys Gln Ser Asn Asn Thr Ser Ser Ala Ser Leu Thr Val Tyr Ser Ala
                565                 570                 575

Arg Gly Ala Ser Met Pro Tyr Ser Arg Tyr Asp Thr Glu Asp Ala Val
            580                 585                 590
```

```
Leu Gly Gly Gly Ala Val Leu Arg Thr Ala Pro Thr Phe Asp Gln Ser
        595                 600                 605

Leu Ile Ala Ser Glu Ala Ser Gly Gln Lys Tyr Ala Ala Leu Pro Ser
    610                 615                 620

Asn Gly Ser Ser Leu Gln Trp Thr Val Arg Gln Gly Gln Gly Gly Ala
625                 630                 635                 640

Gly Val Thr Met Arg Phe Thr Met Pro Asp Thr Ser Asp Gly Met Gly
                645                 650                 655

Gln Asn Gly Ser Leu Asp Val Tyr Val Asn Gly Thr Lys Ala Lys Thr
            660                 665                 670

Val Ser Leu Thr Ser Tyr Tyr Ser Trp Gln Tyr Phe Ser Gly Asp Met
        675                 680                 685

Pro Ala Asp Ala Pro Gly Gly Gly Arg Pro Leu Phe Arg Phe Asp Glu
    690                 695                 700

Val His Phe Lys Leu Asp Thr Ala Leu Lys Pro Gly Asp Thr Ile Arg
705                 710                 715                 720

Val Gln Lys Gly Gly Asp Ser Leu Glu Tyr Gly Val Asp Phe Ile Glu
                725                 730                 735

Ile Glu Pro Ile Pro Ala Ala Val Ala Arg Pro Ala Asn Ser Val Ser
            740                 745                 750

Val Thr Glu Tyr Gly Ala Val Ala Asn Asp Gly Lys Asp Asp Leu Ala
        755                 760                 765

Ala Phe Lys Ala Ala Val Thr Ala Ala Val Ala Ala Gly Lys Ser Leu
    770                 775                 780

Tyr Ile Pro Glu Gly Thr Phe His Leu Ser Ser Met Trp Glu Ile Gly
785                 790                 795                 800

Ser Ala Thr Ser Met Ile Asp Asn Phe Thr Val Thr Gly Ala Gly Ile
                805                 810                 815

Trp Tyr Thr Asn Ile Gln Phe Thr Asn Pro Asn Ala Ser Gly Gly Gly
            820                 825                 830

Ile Ser Leu Arg Ile Lys Gly Lys Leu Asp Phe Ser Asn Ile Tyr Met
        835                 840                 845

Asn Ser Asn Leu Arg Ser Arg Tyr Gly Gln Asn Ala Val Tyr Lys Gly
    850                 855                 860

Phe Met Asp Asn Phe Gly Thr Asn Ser Ile Ile His Asp Val Trp Val
865                 870                 875                 880

Glu His Phe Glu Cys Gly Met Trp Val Gly Asp Tyr Ala His Thr Pro
                885                 890                 895

Ala Ile Tyr Ala Ser Gly Leu Val Val Glu Asn Ser Arg Ile Arg Asn
            900                 905                 910

Asn Leu Ala Asp Gly Ile Asn Phe Ser Gln Gly Thr Ser Asn Ser Thr
        915                 920                 925

Val Arg Asn Ser Ser Ile Arg Asn Asn Gly Asp Asp Gly Leu Ala Val
    930                 935                 940

Trp Thr Ser Asn Thr Asn Gly Ala Pro Ala Gly Val Asn Asn Thr Phe
945                 950                 955                 960

Ser Tyr Asn Thr Ile Glu Asn Asn Trp Arg Ala Ala Ala Ile Ala Phe
                965                 970                 975

Phe Gly Gly Ser Gly His Lys Ala Asp His Asn Tyr Ile Ile Asp Cys
            980                 985                 990

Val Gly Gly Ser Gly Ile Arg Met  Asn Thr Val Phe Pro  Gly Tyr His
        995                 1000                 1005

Phe Gln  Asn Asn Thr Gly Ile  Thr Phe Ser Asp Thr  Thr Ile Ile
```

```
    1010                1015                1020

Asn Ser  Gly Thr Ser Gln Asp  Leu Tyr Asn Gly Glu  Arg Gly Ala
    1025                1030                1035

Ile Asp  Leu Glu Ala Ser Asn  Asp Ala Ile Lys Asn  Val Thr Phe
    1040                1045                1050

Thr Asn  Ile Asp Ile Ile Asn  Ala Gln Arg Asp Gly  Val Gln Ile
    1055                1060                1065

Gly Tyr  Gly Gly Gly Phe Glu  Asn Ile Val Phe Asn  Asn Ile Thr
    1070                1075                1080

Ile Asp  Gly Thr Gly Arg Asp  Gly Ile Ser Thr Ser  Arg Phe Ser
    1085                1090                1095

Gly Pro  His Leu Gly Ala Ala  Ile Tyr Thr Tyr Thr  Gly Asn Gly
    1100                1105                1110

Ser Ala  Thr Phe Asn Asn Leu  Val Thr Arg Asn Ile  Ala Tyr Ala
    1115                1120                1125

Gly Gly  Asn Tyr Ile Gln Ser  Gly Phe Asn Leu Thr  Ile
    1130                1135                1140


<210> SEQ ID NO 10
<211> LENGTH: 1308
<212> TYPE: DNA
<213> ORGANISM: Penicillium marneffei

<400> SEQUENCE: 10

atgaagcaaa ccacttccct cctcctctca gccatcgcgg caaccagcag cttcagcgga     60

ctaacagccg ctcaaaaact cgcctttgcg cacgtcgtcg tcggcaacac tgcagcacac    120

acccaatcca cctgggaaag cgacattact ctcgcccata actccggtct agatgccttt    180

gccttgaacg gtggattccc cgatggcaac atccccgcac aaatcgccaa cgcttttgcg    240

gcttgtgaag ccctttcaaa tggcttcaag ctattcattt cgtttgacta cctcggtggt    300

ggtcagccct ggcctgcctc agaggttgtg tctatgctga agcagtatgc cagttccgat    360

tgttatttgg cctatgatgg caagcccttt gtctcaactt ttgagggcac cggaaatatt    420

gcggattggg cgcacggagg tcccattcgg tcggcggtgg atgtttactt tgtgccggat    480

tggacgagtt tggggcctgc tgggattaag tcgtatctcg acaatatcga tggatttttc    540

agctggaaca tgtggcctgt aggtgcggcc gatatgaccg acgagcctga tttcgaatgg    600

ctcgatgcaa ttgggtccga caagacgtac atgatgggcg tttcgccatg gttcttccac    660

agtgcaagcg gaggcaccga ctgggtctgg cgtggtgatg acctctggga tgaccgatgg    720

attcaagtca cctgcgtcga ccctcaattt gtccaggtcg tcacatggaa cgactggggt    780

gaatcctcct acatcggccc cttcgtgacc gctagcgaag tccccgccgg ctcattagcc    840

tacgtcgaca acatgtcaca ccaaagcttc cttgacttct tgcctttcta catcgccacc    900

ttcaaaggcg acacattcaa catctcccgc gaccagatgc aatactggta ccgcctcgca    960

cccgccgcag caggcagcgc gtgcggcgta tacggcaatg atcccgatca aggccagact   1020

accgttgacg tcaactccat cgttcaggac aaggtgtttt tcagtgcttt gttgacggct   1080

gatgctactg taacggtgca gattggtagt aatgctgcgg tttcatatga tggtgttgct   1140

ggtatgaacc actggagtca ggactttaat ggccagaccg gcgcggttac gtttagtgtt   1200

gtcaggggtg gcgctacagt taagagtggt attggagccg agattacggc ttcgacttcg   1260

ttgtcgaatg ggtgcactaa ttacaaccct tgggttggta gtttctaa                1308
```

```
<210> SEQ ID NO 11
<211> LENGTH: 435
<212> TYPE: PRT
<213> ORGANISM: Penicillium marneffei

<400> SEQUENCE: 11

Met Lys Gln Thr Thr Ser Leu Leu Leu Ser Ala Ile Ala Ala Thr Ser
1               5                   10                  15

Ser Phe Ser Gly Leu Thr Ala Ala Gln Lys Leu Ala Phe Ala His Val
            20                  25                  30

Val Val Gly Asn Thr Ala Ala His Thr Gln Ser Thr Trp Glu Ser Asp
        35                  40                  45

Ile Thr Leu Ala His Asn Ser Gly Leu Asp Ala Phe Ala Leu Asn Gly
    50                  55                  60

Gly Phe Pro Asp Gly Asn Ile Pro Ala Gln Ile Ala Asn Ala Phe Ala
65                  70                  75                  80

Ala Cys Glu Ala Leu Ser Asn Gly Phe Lys Leu Phe Ile Ser Phe Asp
                85                  90                  95

Tyr Leu Gly Gly Gly Gln Pro Trp Pro Ala Ser Glu Val Val Ser Met
            100                 105                 110

Leu Lys Gln Tyr Ala Ser Ser Asp Cys Tyr Leu Ala Tyr Asp Gly Lys
        115                 120                 125

Pro Phe Val Ser Thr Phe Glu Gly Thr Gly Asn Ile Ala Asp Trp Ala
    130                 135                 140

His Gly Gly Pro Ile Arg Ser Ala Val Asp Val Tyr Phe Val Pro Asp
145                 150                 155                 160

Trp Thr Ser Leu Gly Pro Ala Gly Ile Lys Ser Tyr Leu Asp Asn Ile
                165                 170                 175

Asp Gly Phe Phe Ser Trp Asn Met Trp Pro Val Gly Ala Ala Asp Met
            180                 185                 190

Thr Asp Glu Pro Asp Phe Glu Trp Leu Asp Ala Ile Gly Ser Asp Lys
        195                 200                 205

Thr Tyr Met Met Gly Val Ser Pro Trp Phe Phe His Ser Ala Ser Gly
    210                 215                 220

Gly Thr Asp Trp Val Trp Arg Gly Asp Asp Leu Trp Asp Asp Arg Trp
225                 230                 235                 240

Ile Gln Val Thr Cys Val Asp Pro Gln Phe Val Gln Val Val Thr Trp
                245                 250                 255

Asn Asp Trp Gly Glu Ser Ser Tyr Ile Gly Pro Phe Val Thr Ala Ser
            260                 265                 270

Glu Val Pro Ala Gly Ser Leu Ala Tyr Val Asp Asn Met Ser His Gln
        275                 280                 285

Ser Phe Leu Asp Phe Leu Pro Phe Tyr Ile Ala Thr Phe Lys Gly Asp
    290                 295                 300

Thr Phe Asn Ile Ser Arg Asp Gln Met Gln Tyr Trp Tyr Arg Leu Ala
305                 310                 315                 320

Pro Ala Ala Ala Gly Ser Ala Cys Gly Val Tyr Gly Asn Asp Pro Asp
                325                 330                 335

Gln Gly Gln Thr Thr Val Asp Val Asn Ser Ile Val Gln Asp Lys Val
            340                 345                 350

Phe Phe Ser Ala Leu Leu Thr Ala Asp Ala Thr Val Thr Val Gln Ile
        355                 360                 365

Gly Ser Asn Ala Ala Val Ser Tyr Asp Gly Val Ala Gly Met Asn His
    370                 375                 380
```

```
Trp Ser Gln Asp Phe Asn Gly Gln Thr Gly Ala Val Thr Phe Ser Val
385                 390                 395                 400

Val Arg Gly Gly Ala Thr Val Lys Ser Gly Ile Gly Ala Glu Ile Thr
                405                 410                 415

Ala Ser Thr Ser Leu Ser Asn Gly Cys Thr Asn Tyr Asn Pro Trp Val
            420                 425                 430

Gly Ser Phe
        435
```

<210> SEQ ID NO 12
<211> LENGTH: 8616
<212> TYPE: DNA
<213> ORGANISM: artificial sequence
<220> FEATURE:
<223> OTHER INFORMATION: plasmid pTrex

<400> SEQUENCE: 12

```
aagcttaact agtacttctc gagctctgta catgtccggt cgcgacgtac gcgtatcgat     60

ggcgccagct gcaggcggcc gcctgcagcc acttgcagtc ccgtggaatt ctcacggtga    120

atgtaggcct tttgtagggt aggaattgtc actcaagcac ccccaacctc cattacgcct    180

cccccataga gttcccaatc agtgagtcat ggcactgttc tcaaatagat tggggagaag    240

ttgacttccg cccagagctg aaggtcgcac aaccgcatga tatagggtcg gcaacggcaa    300

aaaagcacgt ggctcaccga aaagcaagat gtttgcgatc taacatccag gaacctggat    360

acatccatca tcacgcacga ccactttgat ctgctggtaa actcgtattc gccctaaacc    420

gaagtgcgtg gtaaatctac acgtgggccc ctttcggtat actgcgtgtg tcttctctag    480

gtgccattct tttcccttcc tctagtgttg aattgtttgt gttggagtcc gagctgtaac    540

tacctctgaa tctctggaga atggtggact aacgactacc gtgcacctgc atcatgtata    600

taatagtgat cctgagaagg ggggtttgga gcaatgtggg actttgatgg tcatcaaaca    660

aagaacgaag acgcctcttt tgcaaagttt tgtttcggct acggtgaaga actggatact    720

tgttgtgtct tctgtgtatt tttgtggcaa caagaggcca gagacaatct attcaaacac    780

caagcttgct cttttgagct acaagaacct gtggggtata tatctagagt tgtgaagtcg    840

gtaatcccgc tgtatagtaa tacgagtcgc atctaaatac tccgaagctg ctgcgaaccc    900

ggagaatcga gatgtgctgg aaagcttcta gcgagcggct aaattagcat gaaaggctat    960

gagaaattct ggagacggct tgttgaatca tggcgttcca ttcttcgaca agcaaagcgt   1020

tccgtcgcag tagcaggcac tcattcccga aaaaactcgg agattcctaa gtagcgatgg   1080

aaccggaata atataatagg caatacattg agttgcctcg acggttgcaa tgcaggggta   1140

ctgagcttgg acataactgt tccgtacccc acctcttctc aacctttggc gtttccctga   1200

ttcagcgtac ccgtacaagt cgtaatcact attaacccag actgaccgga cgtgttttgc   1260

ccttcatttg gagaaataat gtcattgcga tgtgtaattt gcctgcttga ccgactgggg   1320

ctgttcgaag cccgaatgta ggattgttat ccgaactctg ctcgtagagg catgttgtga   1380

atctgtgtcg ggcaggacac gcctcgaagg ttcacggcaa gggaaaccac cgatagcagt   1440

gtctagtagc aacctgtaaa gccgcaatgc agcatcactg gaaaatacaa accaatggct   1500

aaaagtacat aagttaatgc ctaaagaagt catataccag cggctaataa ttgtacaatc   1560

aagtggctaa acgtaccgta atttgccaac ggcttgtggg gttgcagaag caacggcaaa   1620

gccccacttc cccacgtttg tttcttcact cagtccaatc tcagctggtg atcccccaat   1680

tgggtcgctt gtttgttccg gtgaagtgaa agaagacaga ggtaagaatg tctgactcgg   1740
```

agcgttttgc atacaaccaa gggcagtgat ggaagacagt gaaatgttga cattcaagga 1800
gtatttagcc agggatgctt gagtgtatcg tgtaaggagg tttgtctgcc gatacgacga 1860
atactgtata gtcacttctg atgaagtggt ccatattgaa atgtaagtcg gcactgaaca 1920
ggcaaaagat tgagttgaaa ctgcctaaga tctcgggccc tcgggccttc ggcctttggg 1980
tgtacatgtt tgtgctccgg gcaaatgcaa agtgtggtag gatcgaacac actgctgcct 2040
ttaccaagca gctgagggta tgtgataggc aaatgttcag gggccactgc atggtttcga 2100
atagaaagag aagcttagcc aagaacaata gccgataaag atagcctcat taaacggaat 2160
gagctagtag gcaaagtcag cgaatgtgta tatataaagg ttcgaggtcc gtgcctccct 2220
catgctctcc ccatctactc atcaactcag atcctccagg agacttgtac accatctttt 2280
gaggcacaga aacccaatag tcaaccgcgg actgcgcatc atgtatcgga agttggccgt 2340
catctcggcc ttcttggcca cacctcgtgc tagactaggc gcgccgcgcg ccagctccgt 2400
gcgaaagcct gacgcaccgg tagattcttg gtgagcccgt atcatgacgg cggcgggagc 2460
tacatggccc cgggtgattt atttttttg tatctacttc tgaccctttt caaatatacg 2520
gtcaactcat ctttcactgg agatgcggcc tgcttggtat tgcgatgttg tcagcttggc 2580
aaattgtggc tttcgaaaac acaaaacgat tccttagtag ccatgcattt taagataacg 2640
gaatagaaga aagaggaaat taaaaaaaaa aaaaaaacaa acatcccgtt cataacccgt 2700
agaatcgccg ctcttcgtgt atcccagtac cagtttattt tgaatagctc gcccgctgga 2760
gagcatcctg aatgcaagta acaaccgtag aggctgacac ggcaggtgtt gctagggagc 2820
gtcgtgttct acaaggccag acgtcttcgc ggttgatata tatgtatgtt tgactgcagg 2880
ctgctcagcg acgacagtca agttcgccct cgctgcttgt gcaataatcg cagtggggaa 2940
gccacaccgt gactcccatc tttcagtaaa gctctgttgg tgtttatcag caatacacgt 3000
aatttaaact cgttagcatg ggctgatag cttaattacc gtttaccagt gccatggttc 3060
tgcagctttc cttggcccgt aaaattcggc gaagccagcc aatcaccagc taggcaccag 3120
ctaaacccta taattagtct cttatcaaca ccatccgctc ccccgggatc aatgaggaga 3180
atgaggggga tgcggggcta aagaagccta cataaccctc atgccaactc ccagtttaca 3240
ctcgtcgagc caacatcctg actataagct aacacagaat gcctcaatcc tgggaagaac 3300
tggccgctga taagcgcgcc cgcctcgcaa aaaccatccc tgatgaatgg aaagtccaga 3360
cgctgcctgc ggaagacagc gttattgatt tcccaaagaa atcggggatc ctttcagagg 3420
ccgaactgaa gatcacagag gcctccgctg cagatcttgt gtccaagctg gcggccggag 3480
agttgacctc ggtggaagtt acgctagcat tctgtaaacg ggcagcaatc gcccagcagt 3540
tagtagggtc ccctctacct ctcagggaga tgtaacaacg ccaccttatg ggactatcaa 3600
gctgacgctg gcttctgtgc agacaaactg cgcccacgag ttcttccctg acgccgctct 3660
cgcgcaggca agggaactcg atgaatacta cgcaaagcac aagagacccg ttggtccact 3720
ccatggcctc cccatctctc tcaaagacca gcttcgagtc aaggtacacc gttgccccta 3780
agtcgttaga tgtccctttt tgtcagctaa catatgccac cagggctacg aaacatcaat 3840
gggctacatc tcatggctaa acaagtacga cgaaggggac tcggttctga caaccatgct 3900
ccgcaaagcc ggtgccgtct tctacgtcaa gacctctgtc ccgcagaccc tgatggtctg 3960
cgagacagtc aacaacatca tcgggcgcac cgtcaaccca cgcaacaaga actggtcgtg 4020
cggcggcagt tctggtggtg agggtgcgat cgttgggatt cgtggtggcg tcatcggtgt 4080

```
aggaacggat atcggtggct cgattcgagt gccggccgcg ttcaacttcc tgtacggtct   4140
aaggccgagt catgggcggc tgccgtatgc aaagatggcg aacagcatgg agggtcagga   4200
gacggtgcac agcgttgtcg ggccgattac gcactctgtt gagggtgagt ccttcgcctc   4260
ttccttcttt tcctgctcta taccaggcct ccactgtcct cctttcttgc tttttatact   4320
atatacgaga ccggcagtca ctgatgaagt atgttagacc tccgcctctt caccaaatcc   4380
gtcctcggtc aggagccatg gaaatacgac tccaaggtca tccccatgcc ctggcgccag   4440
tccgagtcgg acattattgc ctccaagatc aagaacggcg ggctcaatat cggctactac   4500
aacttcgacg gcaatgtcct tccacaccct cctatcctgc gcggcgtgga aaccaccgtc   4560
gccgcactcg ccaaagccgg tcacaccgtg accccgtgga cgccatacaa gcacgatttc   4620
ggccacgatc tcatctccca tatctacgcg gctgacggca gcgccgacgt aatgcgcgat   4680
atcagtgcat ccggcgagcc ggcgattcca aatatcaaag acctactgaa cccgaacatc   4740
aaagctgtta acatgaacga gctctgggac acgcatctcc agaagtggaa ttaccagatg   4800
gagtaccttg agaaatggcg ggaggctgaa gaaaaggccg ggaaggaact ggacgccatc   4860
atcgcgccga ttacgcctac cgctgcggta cggcatgacc agttccggta ctatgggtat   4920
gcctctgtga tcaacctgct ggatttcacg agcgtggttg ttccggttac ctttgcggat   4980
aagaacatcg ataagaagaa tgagagtttc aaggcggtta gtgagcttga tgccctcgtg   5040
caggaagagt atgatccgga ggcgtaccat ggggcaccgg ttgcagtgca ggttatcgga   5100
cggagactca gtgaagagag gacgttggcg attgcagagg aagtggggaa gttgctggga   5160
aatgtggtga ctccatagct aataagtgtc agatagcaat ttgcacaaga aatcaatacc   5220
agcaactgta aataagcgct gaagtgacca tgccatgcta cgaaagagca gaaaaaaacc   5280
tgccgtagaa ccgaagagat atgacacgct tccatctctc aaaggaagaa tcccttcagg   5340
gttgcgtttc cagtctagac acgtataacg gcacaagtgt ctctcaccaa atgggttata   5400
tctcaaatgt gatctaagga tggaaagccc agaatatcga tcgcgcgcag atccatatat   5460
agggcccggg ttataattac ctcaggtcga cgtcccatgg ccattcgaat tcgtaatcat   5520
ggtcatagct gtttcctgtg tgaaattgtt atccgctcac aattccacac aacatacgag   5580
ccggaagcat aaagtgtaaa gcctggggtg cctaatgagt gagctaactc acattaattg   5640
cgttgcgctc actgcccgct ttccagtcgg gaaacctgtc gtgccagctg cattaatgaa   5700
tcggccaacg cgcggggaga ggcggtttgc gtattgggcg ctcttccgct tcctcgctca   5760
ctgactcgct gcgctcggtc gttcggctgc ggcgagcggt atcagctcac tcaaaggcgg   5820
taatacggtt atccacagaa tcaggggata acgcaggaaa gaacatgtga gcaaaaggcc   5880
agcaaaaggc caggaaccgt aaaaaggccg cgttgctggc gtttttccat aggctccgcc   5940
cccctgacga gcatcacaaa aatcgacgct caagtcagag gtggcgaaac ccgacaggac   6000
tataaagata ccaggcgttt ccccctggaa gctccctcgt gcgctctcct gttccgaccc   6060
tgccgcttac cggatacctg tccgcctttc tcccttcggg aagcgtggcg ctttctcata   6120
gctcacgctg taggtatctc agttcggtgt aggtcgttcg ctccaagctg ggctgtgtgc   6180
acgaaccccc cgttcagccc gaccgctgcg ccttatccgg taactatcgt cttgagtcca   6240
acccggtaag acacgactta tcgccactgg cagcagccac tggtaacagg attagcagag   6300
cgaggtatgt aggcggtgct acagagttct tgaagtggtg gcctaactac ggctacacta   6360
gaagaacagt atttggtatc tgcgctctgc tgaagccagt taccttcgga aaaagagttg   6420
gtagctcttg atccggcaaa caaaccaccg ctggtagcgg tggttttttt gtttgcaagc   6480
```

```
agcagattac gcgcagaaaa aaaggatctc aagaagatcc tttgatcttt tctacggggt   6540
ctgacgctca gtggaacgaa aactcacgtt aagggatttt ggtcatgaga ttatcaaaaa   6600
ggatcttcac ctagatcctt ttaaattaaa aatgaagttt taaatcaatc taaagtatat   6660
atgagtaaac ttggtctgac agttaccaat gcttaatcag tgaggcacct atctcagcga   6720
tctgtctatt tcgttcatcc atagttgcct gactccccgt cgtgtagata actacgatac   6780
gggagggctt accatctggc cccagtgctg caatgatacc gcgagaccca cgctcaccgg   6840
ctccagattt atcagcaata aaccagccag ccggaagggc cgagcgcaga agtggtcctg   6900
caactttatc cgcctccatc cagtctatta attgttgccg ggaagctaga gtaagtagtt   6960
cgccagttaa tagtttgcgc aacgttgttg ccattgctac aggcatcgtg gtgtcacgct   7020
cgtcgtttgg tatggcttca ttcagctccg gttcccaacg atcaaggcga gttacatgat   7080
cccccatgtt gtgcaaaaaa gcggttagct ccttcggtcc tccgatcgtt gtcagaagta   7140
agttggccgc agtgttatca ctcatggtta tggcagcact gcataattct cttactgtca   7200
tgccatccgt aagatgcttt tctgtgactg gtgagtactc aaccaagtca ttctgagaat   7260
agtgtatgcg gcgaccgagt tgctcttgcc cggcgtcaat acgggataat accgcgccac   7320
atagcagaac tttaaaagtg ctcatcattg gaaaacgttc ttcggggcga aaactctcaa   7380
ggatcttacc gctgttgaga tccagttcga tgtaacccac tcgtgcaccc aactgatctt   7440
cagcatcttt tactttcacc agcgtttctg ggtgagcaaa aacaggaagg caaaatgccg   7500
caaaaaaggg aataagggcg acacggaaat gttgaatact catactcttc ctttttcaat   7560
attattgaag catttatcag ggttattgtc tcatgagcgg atacatattt gaatgtattt   7620
agaaaaataa acaaataggg gttccgcgca catttccccg aaaagtgcca cctgacgtct   7680
aagaaaccat tattatcatg acattaacct ataaaaatag gcgtatcacg aggccctttc   7740
gtctcgcgcg tttcggtgat gacggtgaaa acctctgaca catgcagctc ccggagacgg   7800
tcacagcttg tctgtaagcg gatgccggga gcagacaagc ccgtcagggc gcgtcagcgg   7860
gtgttggcgg gtgtcggggc tggcttaact atgcggcatc agagcagatt gtactgagag   7920
tgcaccataa aattgtaaac gttaatattt tgttaaaatt cgcgttaaat ttttgttaaa   7980
tcagctcatt ttttaaccaa taggccgaaa tcggcaaaat cccttataaa tcaaaagaat   8040
agcccgagat agggttgagt gttgttccag tttggaacaa gagtccacta ttaaagaacg   8100
tggactccaa cgtcaaaggg cgaaaaaccg tctatcaggg cgatggccca ctacgtgaac   8160
catcacccaa atcaagtttt ttggggtcga ggtgccgtaa agcactaaat cggaacccta   8220
aagggagccc ccgatttaga gcttgacggg gaaagccggc gaacgtggcg agaaaggaag   8280
ggaagaaagc gaaaggagcg ggcgctaggg cgctggcaag tgtagcggtc acgctgcgcg   8340
taaccaccac acccgccgcg cttaatgcgc cgctacaggg cgcgtactat ggttgctttg   8400
acgtatgcgg tgtgaaatac cgcacagatg cgtaaggaga aaataccgca tcaggcgcca   8460
ttcgccattc aggctgcgca actgttggga agggcgatcg gtgcgggcct cttcgctatt   8520
acgccagctg gcgaaagggg gatgtgctgc aaggcgatta agttgggtaa cgccagggtt   8580
ttcccagtca cgacgttgta aaacgacggc cagtgc                             8616
```

<210> SEQ ID NO 13
<211> LENGTH: 1455
<212> TYPE: PRT
<213> ORGANISM: Streptococcus mutans

<400> SEQUENCE: 13

```
Met Glu Lys Lys Val Arg Phe Lys Leu Arg Lys Val Lys Lys Arg Trp
1               5                   10                  15

Val Thr Val Ser Val Ala Ser Ala Val Val Thr Leu Thr Ser Leu Ser
            20                  25                  30

Gly Ser Leu Val Lys Ala Asp Ser Thr Asp Asp Arg Gln Gln Ala Val
        35                  40                  45

Thr Glu Ser Gln Ala Ser Leu Val Thr Thr Ser Glu Ala Ala Lys Glu
    50                  55                  60

Thr Leu Thr Ala Thr Asp Thr Ser Thr Ala Thr Ser Ala Thr Ser Gln
65                  70                  75                  80

Leu Thr Ala Thr Val Thr Asp Asn Val Ser Thr Thr Asn Gln Ser Thr
                85                  90                  95

Asn Thr Thr Ala Asn Thr Ala Asn Phe Asp Val Lys Pro Thr Thr Thr
            100                 105                 110

Ser Glu Gln Ser Lys Thr Asp Asn Ser Asp Lys Ile Ile Ala Thr Ser
        115                 120                 125

Lys Ala Val Asn Arg Leu Thr Ala Thr Gly Lys Phe Val Pro Ala Asn
    130                 135                 140

Asn Asn Thr Ala His Pro Lys Thr Val Thr Asp Lys Ile Val Pro Ile
145                 150                 155                 160

Lys Pro Lys Ile Gly Lys Leu Lys Gln Pro Ser Ser Leu Ser Gln Asp
                165                 170                 175

Asp Ile Ala Ala Leu Gly Asn Val Lys Asn Ile Arg Lys Val Asn Gly
            180                 185                 190

Lys Tyr Tyr Tyr Tyr Lys Glu Asp Gly Thr Leu Gln Lys Asn Tyr Ala
        195                 200                 205

Leu Asn Ile Asn Gly Lys Thr Phe Phe Phe Asp Glu Thr Gly Ala Leu
    210                 215                 220

Ser Asn Asn Thr Leu Pro Ser Lys Lys Gly Asn Ile Thr Asn Asn Asp
225                 230                 235                 240

Asn Thr Asn Ser Phe Ala Gln Tyr Asn Gln Val Tyr Ser Thr Asp Ala
                245                 250                 255

Ala Asn Phe Glu His Val Asp His Tyr Leu Thr Ala Glu Ser Trp Tyr
            260                 265                 270

Arg Pro Lys Tyr Ile Leu Lys Asp Gly Lys Thr Trp Thr Gln Ser Thr
        275                 280                 285

Glu Lys Asp Phe Arg Pro Leu Leu Met Thr Trp Trp Pro Asp Gln Glu
    290                 295                 300

Thr Gln Arg Gln Tyr Val Asn Tyr Met Asn Ala Gln Leu Gly Ile His
305                 310                 315                 320

Gln Thr Tyr Asn Thr Ala Thr Ser Pro Leu Gln Leu Asn Leu Ala Ala
                325                 330                 335

Gln Thr Ile Gln Thr Lys Ile Glu Glu Lys Ile Thr Ala Glu Lys Asn
            340                 345                 350

Thr Asn Trp Leu Arg Gln Thr Ile Ser Ala Phe Val Lys Thr Gln Ser
        355                 360                 365

Ala Trp Asn Ser Asp Ser Glu Lys Pro Phe Asp Asp His Leu Gln Lys
    370                 375                 380

Gly Ala Leu Leu Tyr Ser Asn Asn Ser Lys Leu Thr Ser Gln Ala Asn
385                 390                 395                 400

Ser Asn Tyr Arg Ile Leu Asn Arg Thr Pro Thr Asn Gln Thr Gly Lys
                405                 410                 415
```

```
Lys Asp Pro Arg Tyr Thr Ala Asp Arg Thr Ile Gly Gly Tyr Glu Phe
            420                 425                 430

Leu Leu Ala Asn Asp Val Asp Asn Ser Asn Pro Val Val Gln Ala Glu
        435                 440                 445

Gln Leu Asn Trp Leu His Phe Leu Met Asn Phe Gly Asn Ile Tyr Ala
    450                 455                 460

Asn Asp Pro Asp Ala Asn Phe Asp Ser Ile Arg Val Asp Ala Val Asp
465                 470                 475                 480

Asn Val Asp Ala Asp Leu Leu Gln Ile Ala Gly Asp Tyr Leu Lys Ala
                485                 490                 495

Ala Lys Gly Ile His Lys Asn Asp Lys Ala Ala Asn Asp His Leu Ser
            500                 505                 510

Ile Leu Glu Ala Trp Ser Tyr Asn Asp Thr Pro Tyr Leu His Asp Asp
        515                 520                 525

Gly Asp Asn Met Ile Asn Met Asp Asn Arg Leu Arg Leu Ser Leu Leu
    530                 535                 540

Tyr Ser Leu Ala Lys Pro Leu Asn Gln Arg Ser Gly Met Asn Pro Leu
545                 550                 555                 560

Ile Thr Asn Ser Leu Val Asn Arg Thr Asp Asp Asn Ala Glu Thr Ala
                565                 570                 575

Ala Val Pro Ser Tyr Ser Phe Ile Arg Ala His Asp Ser Glu Val Gln
            580                 585                 590

Asp Leu Ile Arg Asn Ile Ile Arg Ala Glu Ile Asn Pro Asn Val Val
        595                 600                 605

Gly Tyr Ser Phe Thr Met Glu Glu Ile Lys Lys Ala Phe Glu Ile Tyr
    610                 615                 620

Asn Lys Asp Leu Leu Ala Thr Glu Lys Lys Tyr Thr His Tyr Asn Thr
625                 630                 635                 640

Ala Leu Ser Tyr Ala Leu Leu Leu Thr Asn Lys Ser Ser Val Pro Arg
                645                 650                 655

Val Tyr Tyr Gly Asp Met Phe Thr Asp Asp Gly Gln Tyr Met Ala His
            660                 665                 670

Lys Thr Ile Asn Tyr Glu Ala Ile Glu Thr Leu Leu Lys Ala Arg Ile
        675                 680                 685

Lys Tyr Val Ser Gly Gly Gln Ala Met Arg Asn Gln Gln Val Gly Asn
    690                 695                 700

Ser Glu Ile Ile Thr Ser Val Arg Tyr Gly Lys Gly Ala Leu Lys Ala
705                 710                 715                 720

Thr Asp Thr Gly Asp Arg Thr Thr Arg Thr Ser Gly Val Ala Val Ile
                725                 730                 735

Glu Gly Asn Asn Pro Ser Leu Arg Leu Lys Ala Ser Asp Arg Val Val
            740                 745                 750

Val Asn Met Gly Ala Ala His Lys Asn Gln Ala Tyr Arg Pro Leu Leu
        755                 760                 765

Leu Thr Thr Asp Asn Gly Ile Lys Ala Tyr His Ser Asp Gln Glu Ala
    770                 775                 780

Ala Gly Leu Val Arg Tyr Thr Asn Asp Arg Gly Glu Leu Ile Phe Thr
785                 790                 795                 800

Ala Ala Asp Ile Lys Gly Tyr Ala Asn Pro Gln Val Ser Gly Tyr Leu
                805                 810                 815

Gly Val Trp Val Pro Val Gly Ala Ala Ala Asp Gln Asp Val Arg Val
            820                 825                 830
```

```
Ala Ala Ser Thr Ala Pro Ser Thr Asp Gly Lys Ser Val His Gln Asn
        835                 840                 845

Ala Ala Leu Asp Ser Arg Val Met Phe Glu Gly Phe Ser Asn Phe Gln
    850                 855                 860

Ala Phe Ala Thr Lys Lys Glu Glu Tyr Thr Asn Val Val Ile Ala Lys
865                 870                 875                 880

Asn Val Asp Lys Phe Ala Glu Trp Gly Val Thr Asp Phe Glu Met Ala
                885                 890                 895

Pro Gln Tyr Val Ser Ser Thr Asp Gly Ser Phe Leu Asp Ser Val Ile
            900                 905                 910

Gln Asn Gly Tyr Ala Phe Thr Asp Arg Tyr Asp Leu Gly Ile Ser Lys
        915                 920                 925

Pro Asn Lys Tyr Gly Thr Ala Asp Asp Leu Val Lys Ala Ile Lys Ala
    930                 935                 940

Leu His Ser Lys Gly Ile Lys Val Met Ala Asp Trp Val Pro Asp Gln
945                 950                 955                 960

Met Tyr Ala Phe Pro Glu Lys Glu Val Val Thr Ala Thr Arg Val Asp
                965                 970                 975

Lys Tyr Gly Thr Pro Val Ala Gly Ser Gln Ile Lys Asn Thr Leu Tyr
            980                 985                 990

Val Val Asp Gly Lys Ser Ser Gly  Lys Asp Gln Gln Ala  Lys Tyr Gly
        995                 1000                 1005

Gly Ala  Phe Leu Glu Glu Leu  Gln Ala Lys Tyr Pro  Glu Leu Phe
    1010                 1015                 1020

Ala Arg  Lys Gln Ile Ser Thr  Gly Val Pro Met Asp  Pro Ser Val
    1025                 1030                 1035

Lys Ile  Lys Gln Trp Ser Ala  Lys Tyr Phe Asn Gly  Thr Asn Ile
    1040                 1045                 1050

Leu Gly  Arg Gly Ala Gly Tyr  Val Leu Lys Asp Gln  Ala Thr Asn
    1055                 1060                 1065

Thr Tyr  Phe Ser Leu Val Ser  Asp Asn Thr Phe Leu  Pro Lys Ser
    1070                 1075                 1080

Leu Val  Asn Pro Asn His Gly  Thr Ser Ser Ser Val  Thr Gly Leu
    1085                 1090                 1095

Val Phe  Asp Gly Lys Gly Tyr  Val Tyr Tyr Ser Thr  Ser Gly Tyr
    1100                 1105                 1110

Gln Ala  Lys Asn Thr Phe Ile  Ser Leu Gly Asn Asn  Trp Tyr Tyr
    1115                 1120                 1125

Phe Asp  Asn Asn Gly Tyr Met  Val Thr Gly Ala Gln  Ser Ile Asn
    1130                 1135                 1140

Gly Ala  Asn Tyr Tyr Phe Leu  Ser Asn Gly Ile Gln  Leu Arg Asn
    1145                 1150                 1155

Ala Ile  Tyr Asp Asn Gly Asn  Lys Val Leu Ser Tyr  Tyr Gly Asn
    1160                 1165                 1170

Asp Gly  Arg Arg Tyr Glu Asn  Gly Tyr Tyr Leu Phe  Gly Gln Gln
    1175                 1180                 1185

Trp Arg  Tyr Phe Gln Asn Gly  Ile Met Ala Val Gly  Leu Thr Arg
    1190                 1195                 1200

Val His  Gly Ala Val Gln Tyr  Phe Asp Ala Ser Gly  Phe Gln Ala
    1205                 1210                 1215

Lys Gly  Gln Phe Ile Thr Thr  Ala Asp Gly Lys Leu  Arg Tyr Phe
    1220                 1225                 1230

Asp Arg  Asp Ser Gly Asn Gln  Ile Ser Asn Arg Phe  Val Arg Asn
```

```
    1235                1240                1245

Ser Lys  Gly Glu Trp Phe Leu  Phe Asp His Asn Gly  Val Ala Val
    1250                1255                1260

Thr Gly  Thr Val Thr Phe Asn  Gly Gln Arg Leu Tyr  Phe Lys Pro
    1265                1270                1275

Asn Gly  Val Gln Ala Lys Gly  Glu Phe Ile Arg Asp  Ala Asp Gly
    1280                1285                1290

His Leu  Arg Tyr Tyr Asp Pro  Asn Ser Gly Asn Glu  Val Arg Asn
    1295                1300                1305

Arg Phe  Val Arg Asn Ser Lys  Gly Glu Trp Phe Leu  Phe Asp His
    1310                1315                1320

Asn Gly  Ile Ala Val Thr Gly  Ala Arg Val Val Asn  Gly Gln Arg
    1325                1330                1335

Leu Tyr  Phe Lys Ser Asn Gly  Val Gln Ala Lys Gly  Glu Leu Ile
    1340                1345                1350

Thr Glu  Arg Lys Gly Arg Ile  Lys Tyr Tyr Asp Pro  Asn Ser Gly
    1355                1360                1365

Asn Glu  Val Arg Asn Arg Tyr  Val Arg Thr Ser Ser  Gly Asn Trp
    1370                1375                1380

Tyr Tyr  Phe Gly Asn Asp Gly  Tyr Ala Leu Ile Gly  Trp His Val
    1385                1390                1395

Val Glu  Gly Arg Arg Val Tyr  Phe Asp Glu Asn Gly  Val Tyr Arg
    1400                1405                1410

Tyr Ala  Ser His Asp Gln Arg  Asn His Trp Asn Tyr  Asp Tyr Arg
    1415                1420                1425

Arg Asp  Phe Gly Arg Gly Ser  Ser Ser Ala Ile Arg  Phe Arg His
    1430                1435                1440

Ser Arg  Asn Gly Phe Phe Asp  Asn Phe Phe Arg Phe
    1445                1450                1455
```

<210> SEQ ID NO 14
<211> LENGTH: 3804
<212> TYPE: DNA
<213> ORGANISM: Streptococcus mutans

<400> SEQUENCE: 14

```
atggtcaatg gcaaatacta ctactacaaa gaggacggta cgttgcagaa gaactacgca     60

ctgaacatta acggcaagac ctttttcttt gacgagactg gcgccctgag caataacacc    120

ctgccgagca agaaaggtaa catcaccaat aacgacaata ccaatagctt cgcgcaatac    180

aatcaggtgt attcgacgga tgcagcgaac ttcgaacatg tcgatcacta cctgacggcg    240

gagtcctggt atcgcccgaa gtatattctg aaagatggca agacgtggac tcagtccacg    300

gagaaagatt ttcgcccgtt gttgatgacc tggtggccgg atcaggaaac ccagcgtcag    360

tatgtaaact atatgaatgc ccagctgggt attcaccaga cctacaacac ggcgaccagc    420

ccgttgcaac tgaatctggc ggcacagacg atccagacca agattgaaga gaagatcacg    480

gcggagaaga acactaattg gctgcgtcaa acgatttcgg cctttgtcaa aacccagagc    540

gcgtggaact cggacagcga aaaaccgttt gacgatcatc tgcaaaaggg tgcactgctg    600

tactctaaca atagcaagtt gacctctcaa gctaatagca actaccgtat tctgaaccgt    660

accccaacca accaaaccgg caagaaagat ccgcgttata ccgctgaccg taccatcggt    720

ggttatgagt tcttgctggc gaacgatgtg gataatagca atcctgttgt tcaagcggaa    780

cagctgaact ggctgcactt cctgatgaac tttggcaata tctatgcaaa cgaccctgac    840
```

```
gccaactttg acagcatccg tgtagacgcc gtggacaacg tggatgcaga tttgttgcaa    900
atcgctggtg actatctgaa ggctgcaaag ggcatccata agaacgacaa agcagcgaac    960
gaccacctgt cgatcctgga agcatggagc tataatgaca ccccgtatct gcacgacgac   1020
ggtgacaaca tgatcaatat ggacaaccgt ctgcgtctga gcctgctgta tagcctggcg   1080
aagccgttga accagcgttc gggcatgaac ccgctgatca cgaacagcct ggttaaccgt   1140
accgatgaca acgcagaaac cgcagcggtc ccgagctaca gctttatccg tgcacacgat   1200
agcgaggttc aagacctgat tcgtaacatt attcgtgctg agattaatcc gaacgtcgtc   1260
ggttatagct tcacgatgga agagatcaag aaggcctttg agatttacaa caaggatctg   1320
ctggcgacgg aaaagaaata cacccactat aacaccgcgc tgagctacgc gctgctgctg   1380
accaataaga gcagcgttcc gcgtgtgtat tacggtgata tgtttactga cgacggtcag   1440
tacatggcac ataaaacgat caactacgag gctatcgaaa cgctgttgaa ggcgcgcatt   1500
aagtacgtgt ctggtggcca agcgatgcgt aatcaacagg tgggtaatag cgaaatcatt   1560
acgagcgtcc gctatggcaa gggcgcactg aaagcgacgg ataccggcga tcgtaccacg   1620
cgcaccagcg gcgttgcggt tattgaaggc aataacccga gcctgcgctt gaaggcgagc   1680
gaccgcgtcg ttgttaacat gggtgcagca cacaagaacc aggcatatcg tccgctgttg   1740
ctgaccactg ataatggcat caaagcgtat cacagcgatc aggaagctgc gggcctggtg   1800
cgctatacca atgatcgtgg tgaattgatc ttcacggcag ctgacattaa aggttatgca   1860
aatccgcaag tcagcggtta tctgggcgtc tgggtgccgg tcggcgcagc ggctgatcaa   1920
gacgtgcgtg tggccgcgag caccgcgcca tcgaccgacg gtaaaagcgt gcaccagaat   1980
gcggcgctgg acagccgtgt catgtttgag ggttttagca actttcaagc ctttgcaacg   2040
aagaaagaag agtacaccaa cgtcgtcatc gcgaagaacg tcgataagtt cgcggaatgg   2100
ggcgttaccg atttcgaaat ggcaccgcag tatgtgtcta gcaccgatgg ctcgtttctg   2160
gattccgtga tccaaaatgg ttatgcattt accgaccgct atgacctggg cattagcaag   2220
ccgaataagt atggtacggc ggatgatctg gttaaagcga tcaaggcgct gcattctaaa   2280
ggtattaagg ttatggccga ctgggttcca gatcagatgt atgctttccc ggaaaaagaa   2340
gtggtgacgg ccacccgcgt ggacaaatat ggtacgccgg tcgcgggcag ccagatcaaa   2400
aacactctgt atgtcgtgga tggcaaaagc tccggtaaag atcagcaagc gaaatatggc   2460
ggtgccttcc tggaagagtt gcaggcgaaa tacccggaac tgttcgcgcg taagcagatc   2520
agcactggtg ttccgatgga cccgagcgtg aagattaaac aatggtccgc gaaatacttt   2580
aacggcacga acatcctggg tcgtggtgcc ggctacgtgc tgaaagacca ggcaacgaat   2640
acgtacttta gcttggtgtc cgacaatacg tttctgccga agtctctggt caacccgaac   2700
cacggtacga gcagctctgt gaccggcctg gtgttcgatg gtaagggcta cgtgtactac   2760
tctaccagcg gttaccaggc caagaatacg ttcatcagcc tgggtaacaa ctggtattac   2820
ttcgacaata acggttacat ggtcacgggt gcgcagagca tcaacggtgc caactactat   2880
tttctgagca acggcattca gctgcgtaat gcgatttacg acaatggcaa taaggttctg   2940
agctactacg gtaatgacgg tcgtcgttat gagaatggct attacctgtt tggccaacag   3000
tggcgctact ttcaaaatgg tattatggcc gtcggtctga cccgtgtcca cggtgcggtg   3060
cagtattttg acgccagcgg cttccaagcc aagggccagt tcatcaccac tgcggacggt   3120
aaactgcgtt actttgaccg tgacagcggc aaccaaatca gcaatcgttt tgttcgtaac   3180
```

agcaagggtg aatggttttt gttcgatcat aacggcgtgg cggttaccgg caccgttact 3240
ttcaatggtc aacgtctgta ctttaagccg aacggtgttc aggcaaaggg tgagttcatt 3300
cgcgacgcgg atggtcactt gcgttactac gaccctaatt ccggtaatga ggttcgtaac 3360
cgtttcgtcc gcaactctaa gggcgaatgg ttcctgtttg accacaatgg catcgcagtc 3420
accggcgctc gtgtggtcaa cggccaacgc ttgtacttca aaagcaatgg cgtccaagct 3480
aagggtgagc tgattaccga acgtaagggc cgtattaagt attatgatcc taacagcggt 3540
aacgaagtgc gtaaccgcta cgtccgcacc agcagcggta attggtacta ttttggtaac 3600
gatggttacg cgctgatcgg ctggcatgtt gttgagggtc gtcgtgtgta ctttgatgag 3660
aacggtgtct atcgttacgc gagccacgac cagcgtaatc attggaacta cgactatcgt 3720
cgcgatttcg gtcgtggtag cagctccgct atccgttttc gccatagccg taacggcttt 3780
ttcgacaact tcttccgctt ctaa 3804

<210> SEQ ID NO 15
<211> LENGTH: 7790
<212> TYPE: DNA
<213> ORGANISM: artificial sequence
<220> FEATURE:
<223> OTHER INFORMATION: synthetic construct

<400> SEQUENCE: 15
aattgtgagc ggataacaat tacgagcttc atgcacagtg aaatcatgaa aaatttattt 60
gctttgtgag cggataacaa ttataatatg tggaattgtg agcgctcaca attccacaac 120
ggtttccctc tagaaataat tttgtttaac ttttaggagg taaaacatat ggtcaatggc 180
aaatactact actacaaaga ggacggtacg ttgcagaaga actacgcact gaacattaac 240
ggcaagacct ttttctttga cgagactggc gccctgagca ataacaccct gccgagcaag 300
aaaggtaaca tcaccaataa cgacaatacc aatagcttcg cgcaatacaa tcaggtgtat 360
tcgacggatg cagcgaactt cgaacatgtc gatcactacc tgacggcgga gtcctggtat 420 cgccccgaagt atattctgaa agatggcaag acgtggactc agtccacgga gaaagatttt 480
cgcccgttgt tgatgacctg gtggccggat caggaaaccc agcgtcagta tgtaaactat 540
atgaatgccc agctgggtat tcaccagacc tacaacacgg cgaccagccc gttgcaactg 600
aatctggcgg cacagacgat ccagaccaag attgaagaga agatcacggc ggagaagaac 660
actaattggc tgcgtcaaac gatttcggcc tttgtcaaaa cccagagcgc gtggaactcg 720
gacagcgaaa aaccgtttga cgatcatctg caaaagggtg cactgctgta ctctaacaat 780
agcaagttga cctctcaagc taatagcaac taccgtattc tgaaccgtac cccaaccaac 840
caaaccggca agaaagatcc gcgttatacc gctgaccgta ccatcggtgg ttatgagttc 900
ttgctggcga acgatgtgga taatagcaat cctgttgttc aagcggaaca gctgaactgg 960
ctgcacttcc tgatgaactt tggcaatatc tatgcaaacg accctgacgc caactttgac 1020
agcatccgtg tagacgccgt ggacaacgtg gatgcagatt tgttgcaaat cgctggtgac 1080
tatctgaagg ctgcaaaggg catccataag aacgacaaag cagcgaacga ccacctgtcg 1140
atcctggaag catggagcta taatgacacc ccgtatctgc acgacgacgg tgacaacatg 1200
atcaatatgg acaaccgtct gcgtctgagc ctgctgtata gcctggcgaa gccgttgaac 1260
cagcgttcgg gcatgaaccc gctgatcacg aacagcctgg ttaaccgtac cgatgacaac 1320
gcagaaaccg cagcggtccc gagctacagc tttatccgtg cacacgatag cgaggttcaa 1380
gacctgattc gtaacattat tcgtgctgag attaatccga acgtcgtcgg ttatagcttc 1440
acgatggaag agatcaagaa ggcctttgag atttacaaca aggatctgct ggcgacggaa 1500
aagaaataca cccactataa caccgcgctg agctacgcgc tgctgctgac caataagagc 1560
agcgttccgc gtgtgtatta cggtgatatg tttactgacg acggtcagta catggcacat 1620
aaaacgatca actacgaggc tatcgaaacg ctgttgaagg cgcgcattaa gtacgtgtct 1680
ggtggccaag cgatgcgtaa tcaacaggtg ggtaatagcg aaatcattac gagcgtccgc 1740
tatggcaagg gcgcactgaa agcgacggat accggcgatc gtaccacgcg caccagcggc 1800
gttgcggtta ttgaaggcaa taacccgagc ctgcgcttga aggcgagcga ccgcgtcgtt 1860
gttaacatgg gtgcagcaca caagaaccag gcatatcgtc cgctgttgct gaccactgat 1920
aatggcatca aagcgtatca cagcgatcag gaagctgcgg gcctggtgcg ctataccaat 1980
gatcgtggtg aattgatctt cacggcagct gacattaaag gttatgcaaa tccgcaagtc 2040
agcggttatc tgggcgtctg ggtgccggtc ggcgcagcgg ctgatcaaga cgtgcgtgtg 2100
gccgcgagca ccgcgccatc gaccgacggt aaaagcgtgc accagaatgc ggcgctggac 2160
agccgtgtca tgtttgaggg ttttagcaac tttcaagcct ttgcaacgaa gaaagaagag 2220
tacaccaacg tcgtcatcgc gaagaacgtc gataagttcg cggaatgggg cgttaccgat 2280
ttcgaaatgg caccgcagta tgtgtctagc accgatggct cgtttctgga ttccgtgatc 2340
caaaatggtt atgcatttac cgaccgctat gacctgggca ttagcaagcc gaataagtat 2400
ggtacggcgg atgatctggt taaagcgatc aaggcgctgc attctaaagg tattaaggtt 2460
atggccgact gggttccaga tcagatgtat gctttcccgg aaaaagaagt ggtgacggcc 2520
acccgcgtgg acaaatatgg tacgccggtc gcgggcagcc agatcaaaaa cactctgtat 2580
gtcgtggatg gcaaaagctc cggtaaagat cagcaagcga aatatggcgg tgccttcctg 2640
gaagagttgc aggcgaaata cccggaactg ttcgcgcgta agcagatcag cactggtgtt 2700
ccgatggacc cgagcgtgaa gattaaacaa tggtccgcga aatactttaa cggcacgaac 2760
atcctgggtc gtggtgccgg ctacgtgctg aaagaccagg caacgaatac gtactttagc 2820
ttggtgtccg acaatacgtt tctgccgaag tctctggtca acccgaacca cggtacgagc 2880
agctctgtga ccggcctggt gttcgatggt aagggctacg tgtactactc taccagcggt 2940
taccaggcca agaatacgtt catcagcctg ggtaacaact ggtattactt cgacaataac 3000
ggttacatgg tcacgggtgc gcagagcatc aacggtgcca actactattt tctgagcaac 3060
ggcattcagc tgcgtaatgc gatttacgac aatggcaata aggttctgag ctactacggt 3120
aatgacggtc gtcgttatga gaatggctat tacctgtttg gccaacagtg gcgctacttt 3180
caaaatggta ttatggccgt cggtctgacc cgtgtccacg gtgcggtgca gtattttgac 3240
gccagcggct tccaagccaa gggccagttc atcaccactg cggacggtaa actgcgttac 3300
tttgaccgtg acagcggcaa ccaaatcagc aatcgttttg ttcgtaacag caagggtgaa 3360
tggtttttgt tcgatcataa cggcgtggcg gttaccggca ccgttacttt caatggtcaa 3420
cgtctgtact ttaagccgaa cggtgttcag gcaaagggtg agttcattcg cgacgcggat 3480
ggtcacttgc gttactacga ccctaattcc ggtaatgagg ttcgtaaccg tttcgtccgc 3540
aactctaagg gcgaatggtt cctgtttgac cacaatggca tcgcagtcac cggcgctcgt 3600
gtggtcaacg gccaacgctt gtacttcaaa agcaatggcg tccaagctaa gggtgagctg 3660
attaccgaac gtaagggccg tattaagtat tatgatccta acagcggtaa cgaagtgcgt 3720
aaccgctacg tccgcaccag cagcggtaat tggtactatt ttggtaacga tggttacgcg 3780

-continued

```
ctgatcggct ggcatgttgt tgagggtcgt cgtgtgtact ttgatgagaa cggtgtctat   3840
cgttacgcga gccacgacca gcgtaatcat tggaactacg actatcgtcg cgatttcggt   3900
cgtggtagca gctccgctat ccgttttcgc catagccgta acggcttttt cgacaacttc   3960
ttccgcttct aactcgagcc ccaagggcga cacaaaattt attctaaatg ataataaata   4020
ctgataacat cttatagttt gtattatatt ttgtattatc gttgacatgt ataattttga   4080
tatcaaaaac tgattttccc tttattattt tcgagattta ttttcttaat tctctttaac   4140
aaactagaaa tattgtatat acaaaaaatc ataaataata gatgaatagt ttaattatag   4200
gtgttcatca atcgaaaaag caacgtatct tatttaaagt gcgttgcttt tttctcattt   4260
ataaggttaa ataattctca tatatcaagc aaagtgacag gcgcccttaa atattctgac   4320
aaatgctctt tccctaaact ccccccataa aaaaacccgc cgaagcgggt ttttacgtta   4380
tttgcggatt aacgattact cgttatcaga accgcccagg gggcccgagc ttaagactgg   4440
ccgtcgtttt acaacacaga aagagtttgt agaaacgcaa aaaggccatc cgtcaggggc   4500
cttctgctta gtttgatgcc tggcagttcc ctactctcgc cttccgcttc ctcgctcact   4560
gactcgctgc gctcggtcgt tcggctgcgg cgagcggtat cagctcactc aaaggcggta   4620
atacggttat ccacagaatc aggggataac gcaggaaaga acatgtgagc aaaaggccag   4680
caaaaggcca ggaaccgtaa aaaggccgcg ttgctggcgt ttttccatag gctccgcccc   4740
cctgacgagc atcacaaaaa tcgacgctca agtcagaggt ggcgaaaccc gacaggacta   4800
taaagatacc aggcgtttcc ccctggaagc tccctcgtgc gctctcctgt tccgaccctg   4860
ccgcttaccg gatacctgtc cgcctttctc ccttcgggaa gcgtggcgct ttctcatagc   4920
tcacgctgta ggtatctcag ttcggtgtag gtcgttcgct ccaagctggg ctgtgtgcac   4980
gaaccccccg ttcagcccga ccgctgcgcc ttatccggta actatcgtct tgagtccaac   5040
ccggtaagac acgacttatc gccactggca gcagccactg gtaacaggat tagcagagcg   5100
aggtatgtag gcggtgctac agagttcttg aagtggtggg ctaactacgg ctacactaga   5160
agaacagtat ttggtatctg cgctctgctg aagccagtta ccttcggaaa aagagttggt   5220
agctcttgat ccggcaaaca aaccaccgct ggtagcggtg gtttttttgt ttgcaagcag   5280
cagattacgc gcagaaaaaa aggatctcaa gaagatcctt tgatcttttc tacggggtct   5340
gacgctcagt ggaacgacgc gcgcgtaact cacgttaagg gattttggtc atgagtcact   5400
gcccgctttc cagtcgggaa acctgtcgtg ccagctgcat taatgaatcg gccaacgcgc   5460
ggggagaggc ggtttgcgta ttgggcgcca gggtggtttt tcttttcacc agtgagactg   5520
gcaacagctg attgcccttc accgcctggc cctgagagag ttgcagcaag cggtccacgc   5580
tggtttgccc cagcaggcga aaatcctgtt tgatggtggt taacggcggg atataacatg   5640
agctatcttc ggtatcgtcg tatcccacta ccgagatatc cgcaccaacg cgcagcccgg   5700
actcggtaat ggcgcgcatt gcgcccagcg ccatctgatc gttggcaacc agcatcgcag   5760
tgggaacgat gccctcattc agcatttgca tggtttgttg aaaaccggac atggcactcc   5820
agtcgccttc ccgttccgct atcggctgaa tttgattgcg agtgagatat ttatgccagc   5880
cagccagacg cagacgcgcc gagacagaac ttaatgggcc cgctaacagc gcgatttgct   5940
ggtgacccaa tgcgaccaga tgctccacgc ccagtcgcgt accgtcctca tgggagaaaa   6000
taatactgtt gatgggtgtc tggtcagaga catcaagaaa taacgccgga acattagtgc   6060
aggcagcttc cacagcaatg gcatcctggt catccagcgg atagttaatg atcagcccac   6120
tgacgcgttg cgcgagaaga ttgtgcaccg ccgctttaca ggcttcgacg ccgcttcgtt   6180
```

```
ctaccatcga caccaccacg ctggcaccca gttgatcggc gcgagattta atcgccgcga   6240

caatttgcga cggcgcgtgc agggccagac tggaggtggc aacgccaatc agcaacgact   6300

gtttgcccgc cagttgttgt gccacgcggt tgggaatgta attcagctcc gccatcgccg   6360

cttccacttt ttcccgcgtt ttcgcagaaa cgtggctggc ctggttcacc acgcgggaaa   6420

cggtctgata agagacaccg gcatactctg cgacatcgta taacgttact ggtttcatat   6480

tcaccaccct gaattgactc tcttccgggc gctatcatgc cataccgcga aaggttttgc   6540

gccattcgat ggcgcgccgc ttaccaatgc ttaatcagtg aggcacctat ctcagcgatc   6600

tgtctatttc gttcatccat agttgcctga ctccccgtcg tgtagataac tacgatacgg   6660

gagggcttac catctggccc cagcgctgcg atgataccgc gagaaccacg ctcaccggct   6720

ccggatttat cagcaataaa ccagccagcc ggaagggccg agcgcagaag tggtcctgca   6780

actttatccg cctccatcca gtctattaat tgttgccggg aagctagagt aagtagttcg   6840

ccagttaata gtttgcgcaa cgttgttgcc atcgctacag gcatcgtggt gtcacgctcg   6900

tcgtttggta tggcttcatt cagctccggt tcccaacgat caaggcgagt tacatgatcc   6960

cccatgttgt gcaaaaaagc ggttagctcc ttcggtcctc cgatcgttgt cagaagtaag   7020

ttggccgcag tgttatcact catggttatg gcagcactgc ataattctct tactgtcatg   7080

ccatccgtaa gatgcttttc tgtgactggt gagtactcaa ccaagtcatt ctgagaatag   7140

tgtatgcggc gaccgagttg ctcttgcccg gcgtcaatac gggataatac cgcgccacat   7200

agcagaactt taaaagtgct catcattgga aaacgttctt cggggcgaaa actctcaagg   7260

atcttaccgc tgttgagatc cagttcgatg taacccactc gtgcacccaa ctgatcttca   7320

gcatctttta ctttcaccag cgtttctggg tgagcaaaaa caggaaggca aaatgccgca   7380

aaaaagggaa taagggcgac acggaaatgt tgaatactca tattcttcct ttttcaatat   7440

tattgaagca tttatcaggg ttattgtctc atgagcggat acatatttga atgtatttag   7500

aaaaataaac aaataggggt cagtgttaca accaattaac caattctgaa cattatcgcg   7560

agcccattta tacctgaata tggctcataa cacccccttgt ttgcctggcg gcagtagcgc   7620

ggtggtccca cctgacccca tgccgaactc agaagtgaaa cgccgtagcg ccgatggtag   7680

tgtggggact ccccatgcga gagtagggaa ctgccaggca tcaaataaaa cgaaaggctc   7740

agtcgaaaga ctgggccttt cgcccgggct aattatgggg tgtcgccctt              7790
```

```
<210> SEQ ID NO 16
<211> LENGTH: 1267
<212> TYPE: PRT
<213> ORGANISM: Streptococcus mutans

<400> SEQUENCE: 16

Met Val Asn Gly Lys Tyr Tyr Tyr Tyr Lys Glu Asp Gly Thr Leu Gln
1               5                   10                  15

Lys Asn Tyr Ala Leu Asn Ile Asn Gly Lys Thr Phe Phe Phe Asp Glu
            20                  25                  30

Thr Gly Ala Leu Ser Asn Asn Thr Leu Pro Ser Lys Lys Gly Asn Ile
        35                  40                  45

Thr Asn Asn Asp Asn Thr Asn Ser Phe Ala Gln Tyr Asn Gln Val Tyr
    50                  55                  60

Ser Thr Asp Ala Ala Asn Phe Glu His Val Asp His Tyr Leu Thr Ala
65                  70                  75                  80

Glu Ser Trp Tyr Arg Pro Lys Tyr Ile Leu Lys Asp Gly Lys Thr Trp
```

-continued

```
            85                  90                  95

Thr Gln Ser Thr Glu Lys Asp Phe Arg Pro Leu Leu Met Thr Trp Trp
            100                 105                 110

Pro Asp Gln Glu Thr Gln Arg Gln Tyr Val Asn Tyr Met Asn Ala Gln
        115                 120                 125

Leu Gly Ile His Gln Thr Tyr Asn Thr Ala Thr Ser Pro Leu Gln Leu
    130                 135                 140

Asn Leu Ala Ala Gln Thr Ile Gln Thr Lys Ile Glu Glu Lys Ile Thr
145                 150                 155                 160

Ala Glu Lys Asn Thr Asn Trp Leu Arg Gln Thr Ile Ser Ala Phe Val
                165                 170                 175

Lys Thr Gln Ser Ala Trp Asn Ser Asp Ser Glu Lys Pro Phe Asp Asp
            180                 185                 190

His Leu Gln Lys Gly Ala Leu Leu Tyr Ser Asn Asn Ser Lys Leu Thr
        195                 200                 205

Ser Gln Ala Asn Ser Asn Tyr Arg Ile Leu Asn Arg Thr Pro Thr Asn
    210                 215                 220

Gln Thr Gly Lys Lys Asp Pro Arg Tyr Thr Ala Asp Arg Thr Ile Gly
225                 230                 235                 240

Gly Tyr Glu Phe Leu Leu Ala Asn Asp Val Asp Asn Ser Asn Pro Val
                245                 250                 255

Val Gln Ala Glu Gln Leu Asn Trp Leu His Phe Leu Met Asn Phe Gly
            260                 265                 270

Asn Ile Tyr Ala Asn Asp Pro Asp Ala Asn Phe Asp Ser Ile Arg Val
        275                 280                 285

Asp Ala Val Asp Asn Val Asp Ala Asp Leu Leu Gln Ile Ala Gly Asp
    290                 295                 300

Tyr Leu Lys Ala Ala Lys Gly Ile His Lys Asn Asp Lys Ala Ala Asn
305                 310                 315                 320

Asp His Leu Ser Ile Leu Glu Ala Trp Ser Tyr Asn Asp Thr Pro Tyr
                325                 330                 335

Leu His Asp Asp Gly Asp Asn Met Ile Asn Met Asp Asn Arg Leu Arg
            340                 345                 350

Leu Ser Leu Leu Tyr Ser Leu Ala Lys Pro Leu Asn Gln Arg Ser Gly
        355                 360                 365

Met Asn Pro Leu Ile Thr Asn Ser Leu Val Asn Arg Thr Asp Asp Asn
    370                 375                 380

Ala Glu Thr Ala Ala Val Pro Ser Tyr Ser Phe Ile Arg Ala His Asp
385                 390                 395                 400

Ser Glu Val Gln Asp Leu Ile Arg Asn Ile Ile Arg Ala Glu Ile Asn
                405                 410                 415

Pro Asn Val Val Gly Tyr Ser Phe Thr Met Glu Glu Ile Lys Lys Ala
            420                 425                 430

Phe Glu Ile Tyr Asn Lys Asp Leu Leu Ala Thr Glu Lys Lys Tyr Thr
        435                 440                 445

His Tyr Asn Thr Ala Leu Ser Tyr Ala Leu Leu Leu Thr Asn Lys Ser
    450                 455                 460

Ser Val Pro Arg Val Tyr Tyr Gly Asp Met Phe Thr Asp Asp Gly Gln
465                 470                 475                 480

Tyr Met Ala His Lys Thr Ile Asn Tyr Glu Ala Ile Glu Thr Leu Leu
                485                 490                 495

Lys Ala Arg Ile Lys Tyr Val Ser Gly Gly Gln Ala Met Arg Asn Gln
            500                 505                 510
```

```
Gln Val Gly Asn Ser Glu Ile Ile Thr Ser Val Arg Tyr Gly Lys Gly
        515                 520                 525

Ala Leu Lys Ala Thr Asp Thr Gly Asp Arg Thr Thr Arg Thr Ser Gly
    530                 535                 540

Val Ala Val Ile Glu Gly Asn Asn Pro Ser Leu Arg Leu Lys Ala Ser
545                 550                 555                 560

Asp Arg Val Val Val Asn Met Gly Ala Ala His Lys Asn Gln Ala Tyr
                565                 570                 575

Arg Pro Leu Leu Leu Thr Thr Asp Asn Gly Ile Lys Ala Tyr His Ser
            580                 585                 590

Asp Gln Glu Ala Ala Gly Leu Val Arg Tyr Thr Asn Asp Arg Gly Glu
        595                 600                 605

Leu Ile Phe Thr Ala Ala Asp Ile Lys Gly Tyr Ala Asn Pro Gln Val
    610                 615                 620

Ser Gly Tyr Leu Gly Val Trp Val Pro Val Gly Ala Ala Ala Asp Gln
625                 630                 635                 640

Asp Val Arg Val Ala Ala Ser Thr Ala Pro Ser Thr Asp Gly Lys Ser
                645                 650                 655

Val His Gln Asn Ala Ala Leu Asp Ser Arg Val Met Phe Glu Gly Phe
            660                 665                 670

Ser Asn Phe Gln Ala Phe Ala Thr Lys Lys Glu Glu Tyr Thr Asn Val
        675                 680                 685

Val Ile Ala Lys Asn Val Asp Lys Phe Ala Glu Trp Gly Val Thr Asp
    690                 695                 700

Phe Glu Met Ala Pro Gln Tyr Val Ser Ser Thr Asp Gly Ser Phe Leu
705                 710                 715                 720

Asp Ser Val Ile Gln Asn Gly Tyr Ala Phe Thr Asp Arg Tyr Asp Leu
                725                 730                 735

Gly Ile Ser Lys Pro Asn Lys Tyr Gly Thr Ala Asp Asp Leu Val Lys
            740                 745                 750

Ala Ile Lys Ala Leu His Ser Lys Gly Ile Lys Val Met Ala Asp Trp
        755                 760                 765

Val Pro Asp Gln Met Tyr Ala Phe Pro Glu Lys Glu Val Val Thr Ala
    770                 775                 780

Thr Arg Val Asp Lys Tyr Gly Thr Pro Val Ala Gly Ser Gln Ile Lys
785                 790                 795                 800

Asn Thr Leu Tyr Val Val Asp Gly Lys Ser Ser Gly Lys Asp Gln Gln
                805                 810                 815

Ala Lys Tyr Gly Gly Ala Phe Leu Glu Glu Leu Gln Ala Lys Tyr Pro
            820                 825                 830

Glu Leu Phe Ala Arg Lys Gln Ile Ser Thr Gly Val Pro Met Asp Pro
        835                 840                 845

Ser Val Lys Ile Lys Gln Trp Ser Ala Lys Tyr Phe Asn Gly Thr Asn
    850                 855                 860

Ile Leu Gly Arg Gly Ala Gly Tyr Val Leu Lys Asp Gln Ala Thr Asn
865                 870                 875                 880

Thr Tyr Phe Ser Leu Val Ser Asp Asn Thr Phe Leu Pro Lys Ser Leu
                885                 890                 895

Val Asn Pro Asn His Gly Thr Ser Ser Ser Val Thr Gly Leu Val Phe
            900                 905                 910

Asp Gly Lys Gly Tyr Val Tyr Tyr Ser Thr Ser Gly Tyr Gln Ala Lys
        915                 920                 925
```

Asn Thr Phe Ile Ser Leu Gly Asn Asn Trp Tyr Tyr Phe Asp Asn Asn
    930                 935                 940

Gly Tyr Met Val Thr Gly Ala Gln Ser Ile Asn Gly Ala Asn Tyr Tyr
945                 950                 955                 960

Phe Leu Ser Asn Gly Ile Gln Leu Arg Asn Ala Ile Tyr Asp Asn Gly
                965                 970                 975

Asn Lys Val Leu Ser Tyr Tyr Gly Asn Asp Gly Arg Arg Tyr Glu Asn
            980                 985                 990

Gly Tyr Tyr Leu Phe Gly Gln Gln  Trp Arg Tyr Phe Gln  Asn Gly Ile
        995                 1000                1005

Met Ala  Val Gly Leu Thr Arg  Val His Gly Ala Val  Gln Tyr Phe
    1010                1015                1020

Asp Ala  Ser Gly Phe Gln Ala  Lys Gly Gln Phe Ile  Thr Thr Ala
    1025                1030                1035

Asp Gly  Lys Leu Arg Tyr Phe  Asp Arg Asp Ser Gly  Asn Gln Ile
    1040                1045                1050

Ser Asn  Arg Phe Val Arg Asn  Ser Lys Gly Glu Trp  Phe Leu Phe
    1055                1060                1065

Asp His  Asn Gly Val Ala Val  Thr Gly Thr Val Thr  Phe Asn Gly
    1070                1075                1080

Gln Arg  Leu Tyr Phe Lys Pro  Asn Gly Val Gln Ala  Lys Gly Glu
    1085                1090                1095

Phe Ile  Arg Asp Ala Asp Gly  His Leu Arg Tyr Tyr  Asp Pro Asn
    1100                1105                1110

Ser Gly  Asn Glu Val Arg Asn  Arg Phe Val Arg Asn  Ser Lys Gly
    1115                1120                1125

Glu Trp  Phe Leu Phe Asp His  Asn Gly Ile Ala Val  Thr Gly Ala
    1130                1135                1140

Arg Val  Val Asn Gly Gln Arg  Leu Tyr Phe Lys Ser  Asn Gly Val
    1145                1150                1155

Gln Ala  Lys Gly Glu Leu Ile  Thr Glu Arg Lys Gly  Arg Ile Lys
    1160                1165                1170

Tyr Tyr  Asp Pro Asn Ser Gly  Asn Glu Val Arg Asn  Arg Tyr Val
    1175                1180                1185

Arg Thr  Ser Ser Gly Asn Trp  Tyr Tyr Phe Gly Asn  Asp Gly Tyr
    1190                1195                1200

Ala Leu  Ile Gly Trp His Val  Val Glu Gly Arg Arg  Val Tyr Phe
    1205                1210                1215

Asp Glu  Asn Gly Val Tyr Arg  Tyr Ala Ser His Asp  Gln Arg Asn
    1220                1225                1230

His Trp  Asn Tyr Asp Tyr Arg  Arg Asp Phe Gly Arg  Gly Ser Ser
    1235                1240                1245

Ser Ala  Ile Arg Phe Arg His  Ser Arg Asn Gly Phe  Phe Asp Asn
    1250                1255                1260

Phe Phe  Arg Phe
    1265

<210> SEQ ID NO 17
<211> LENGTH: 1455
<212> TYPE: PRT
<213> ORGANISM: Streptococcus mutans

<400> SEQUENCE: 17

Met Glu Lys Lys Val Arg Phe Lys Leu Arg Lys Val Lys Lys Arg Trp
1               5                   10                  15

```
Val Thr Val Ser Val Ala Ser Ala Val Val Thr Leu Thr Ser Leu Ser
            20                  25                  30

Gly Ser Leu Val Lys Ala Asp Ser Thr Asp Asp Arg Gln Gln Ala Val
        35                  40                  45

Thr Glu Ser Gln Ala Ser Leu Val Thr Thr Ser Glu Ala Ala Lys Glu
    50                  55                  60

Thr Leu Thr Ala Thr Asp Thr Ser Thr Ala Thr Ser Ala Thr Ser Gln
65                  70                  75                  80

Pro Thr Ala Thr Val Thr Asp Asn Val Ser Thr Thr Asn Gln Ser Thr
                85                  90                  95

Asn Thr Thr Ala Asn Thr Ala Asn Phe Asp Val Lys Pro Thr Thr Thr
            100                 105                 110

Ser Glu Gln Ala Lys Thr Asp Asn Ser Asp Lys Ile Ile Ala Thr Ser
        115                 120                 125

Lys Ala Val Asn Arg Leu Thr Ala Thr Gly Lys Phe Val Pro Ala Asn
    130                 135                 140

Asn Asn Thr Ala His Pro Lys Thr Val Thr Asp Lys Ile Val Pro Ile
145                 150                 155                 160

Lys Pro Lys Ile Gly Lys Leu Lys Gln Pro Ser Ser Leu Ser Gln Asp
                165                 170                 175

Asp Ile Ala Ala Leu Gly Asn Val Lys Asn Ile Arg Lys Val Asn Gly
            180                 185                 190

Lys Tyr Tyr Tyr Tyr Lys Glu Asp Gly Thr Leu Gln Lys Asn Tyr Ala
        195                 200                 205

Leu Asn Ile Asn Gly Lys Thr Phe Phe Phe Asp Glu Thr Gly Ala Leu
    210                 215                 220

Ser Asn Asn Thr Leu Pro Ser Lys Lys Gly Asn Ile Thr Asn Asn Asp
225                 230                 235                 240

Asn Thr Asn Ser Phe Ala Gln Tyr Asn Gln Val Tyr Ser Thr Asp Ala
                245                 250                 255

Ala Asn Phe Glu His Val Asp His Tyr Leu Thr Ala Glu Ser Trp Tyr
            260                 265                 270

Arg Pro Lys Tyr Ile Leu Lys Asn Gly Lys Thr Trp Thr Gln Ser Thr
        275                 280                 285

Glu Lys Asp Phe Arg Pro Leu Leu Met Thr Trp Trp Pro Asp Gln Glu
    290                 295                 300

Thr Gln Arg Gln Tyr Val Asn Tyr Met Asn Ala Gln Leu Gly Ile His
305                 310                 315                 320

Gln Thr Tyr Asn Thr Ala Thr Ser Pro Leu Gln Leu Asn Leu Ala Ala
                325                 330                 335

Gln Thr Ile Gln Thr Lys Ile Glu Glu Lys Ile Thr Ala Glu Lys Asn
            340                 345                 350

Thr Asn Trp Leu Arg Gln Thr Ile Ser Ala Phe Val Lys Thr Gln Ser
        355                 360                 365

Ala Trp Asn Ser Asp Ser Glu Lys Pro Phe Asp Asp His Leu Gln Lys
    370                 375                 380

Gly Ala Leu Leu Tyr Ser Asn Asn Ser Lys Leu Thr Ser Gln Ala Asn
385                 390                 395                 400

Ser Asn Tyr Arg Ile Leu Asn Arg Thr Pro Thr Asn Gln Thr Gly Lys
                405                 410                 415

Lys Asp Pro Arg Tyr Thr Ala Asp Arg Thr Ile Gly Gly Tyr Glu Phe
            420                 425                 430
```

```
Leu Leu Ala Asn Asp Val Asp Asn Ser Asn Pro Val Val Gln Ala Glu
        435                 440                 445

Gln Leu Asn Trp Leu His Phe Leu Met Asn Phe Gly Asn Ile Tyr Ala
    450                 455                 460

Asn Asp Pro Asp Ala Asn Phe Asp Ser Ile Arg Val Asp Ala Val Asp
465                 470                 475                 480

Asn Val Asp Ala Asp Leu Leu Gln Ile Ala Gly Asp Tyr Leu Lys Ala
                485                 490                 495

Ala Lys Gly Ile His Lys Asn Asp Lys Ala Ala Asn Asp His Leu Ser
            500                 505                 510

Ile Leu Glu Ala Trp Ser Asp Asn Asp Thr Pro Tyr Leu His Asp Asp
        515                 520                 525

Gly Asp Asn Met Ile Asn Met Asp Asn Lys Leu Arg Leu Ser Leu Leu
    530                 535                 540

Phe Ser Leu Ala Lys Pro Leu Asn Gln Arg Ser Gly Met Asn Pro Leu
545                 550                 555                 560

Ile Thr Asn Ser Leu Val Asn Arg Thr Asp Asp Asn Ala Glu Thr Ala
                565                 570                 575

Ala Val Pro Ser Tyr Ser Phe Ile Arg Ala His Asp Ser Glu Val Gln
            580                 585                 590

Asp Leu Ile Arg Asn Ile Ile Arg Ala Glu Ile Asn Pro Asn Val Val
        595                 600                 605

Gly Tyr Ser Phe Thr Met Glu Glu Ile Lys Lys Ala Phe Glu Ile Tyr
    610                 615                 620

Asn Lys Asp Leu Leu Ala Thr Glu Lys Lys Tyr Thr His Tyr Asn Thr
625                 630                 635                 640

Ala Leu Ser Tyr Ala Leu Leu Leu Thr Asn Lys Ser Ser Val Pro Arg
                645                 650                 655

Val Tyr Tyr Gly Asp Met Phe Thr Asp Asp Gly Gln Tyr Met Ala His
            660                 665                 670

Lys Thr Ile Asn Tyr Glu Ala Ile Glu Thr Leu Leu Lys Ala Arg Ile
        675                 680                 685

Lys Tyr Val Ser Gly Gly Gln Ala Met Arg Asn Gln Gln Val Gly Asn
    690                 695                 700

Ser Glu Ile Ile Thr Ser Val Arg Tyr Gly Lys Gly Ala Leu Lys Ala
705                 710                 715                 720

Thr Asp Thr Gly Asp Arg Ile Thr Arg Thr Ser Gly Val Ala Val Ile
                725                 730                 735

Glu Gly Asn Asn Pro Ser Leu Arg Leu Asn Asp Thr Asp Arg Val Val
            740                 745                 750

Val Asn Met Gly Ala Ala His Lys Asn Gln Ala Tyr Arg Pro Leu Leu
        755                 760                 765

Leu Thr Thr Asp Asn Gly Ile Lys Ala Tyr His Ser Asp Gln Glu Ala
    770                 775                 780

Ala Gly Leu Val Arg Tyr Thr Asn Asp Arg Gly Glu Leu Ile Phe Thr
785                 790                 795                 800

Ala Ala Asp Ile Lys Gly Tyr Ala Asn Pro Gln Val Ser Gly Tyr Leu
                805                 810                 815

Gly Val Trp Val Pro Val Gly Ala Ala Ala Asp Gln Asp Val Arg Val
            820                 825                 830

Ala Ala Ser Thr Ala Pro Ser Thr Asp Gly Lys Ser Val His Gln Asn
        835                 840                 845

Ala Ala Leu Asp Ser Arg Val Met Phe Glu Gly Phe Ser Asn Phe Gln
```

```
    850                 855                 860

Ala Phe Ala Thr Lys Lys Glu Glu Tyr Thr Asn Val Val Ile Ala Lys
865                 870                 875                 880

Asn Val Asp Lys Phe Ala Glu Trp Gly Val Thr Asp Phe Glu Met Ala
                885                 890                 895

Pro Gln Tyr Val Ser Ser Thr Asp Gly Ser Phe Leu Asp Ser Val Ile
            900                 905                 910

Gln Asn Gly Tyr Ala Phe Thr Asp Arg Tyr Asp Leu Gly Ile Ser Lys
        915                 920                 925

Pro Asn Lys Tyr Gly Thr Ala Asp Asp Leu Val Lys Ala Ile Lys Ala
    930                 935                 940

Leu His Ser Lys Gly Ile Lys Val Met Ala Asp Trp Val Pro Asp Gln
945                 950                 955                 960

Met Tyr Ala Phe Pro Glu Lys Glu Val Val Thr Ala Thr Arg Val Asp
                965                 970                 975

Lys Tyr Gly Thr Pro Val Ala Gly Ser Gln Ile Lys Asn Thr Leu Tyr
            980                 985                 990

Val Val Asp Gly Lys Ser Ser Gly  Lys Asp Gln Gln Ala  Lys Tyr Gly
        995                 1000                1005

Gly Ala  Phe Leu Glu Glu Leu  Gln Ala Lys Tyr Pro  Glu Leu Phe
    1010                 1015                 1020

Ala Arg  Lys Gln Ile Ser Thr  Gly Val Pro Met Asp  Pro Ser Val
    1025                 1030                 1035

Lys Ile  Lys Gln Trp Ser Ala  Lys Tyr Phe Asn Gly  Thr Asn Ile
    1040                 1045                 1050

Leu Gly  Arg Gly Ala Gly Tyr  Val Leu Lys Asp Gln  Ala Thr Asn
    1055                 1060                 1065

Thr Tyr  Phe Ser Leu Val Ser  Asp Asn Thr Phe Leu  Pro Lys Ser
    1070                 1075                 1080

Leu Val  Asn Pro Asn His Gly  Thr Ser Ser Ser Val  Thr Gly Leu
    1085                 1090                 1095

Val Phe  Asp Gly Lys Gly Tyr  Val Tyr Tyr Ser Thr  Ser Gly Tyr
    1100                 1105                 1110

Gln Ala  Lys Asn Thr Phe Ile  Ser Leu Gly Asn Asn  Trp Tyr Tyr
    1115                 1120                 1125

Phe Asp  Asn Asn Gly Tyr Met  Val Thr Gly Ala Gln  Ser Ile Asn
    1130                 1135                 1140

Gly Ala  Asn Tyr Tyr Phe Leu  Ser Asn Gly Ile Gln  Leu Arg Asn
    1145                 1150                 1155

Ala Ile  Tyr Asp Asn Gly Asn  Lys Val Leu Ser Tyr  Tyr Gly Asn
    1160                 1165                 1170

Asp Gly  Arg Arg Tyr Glu Asn  Gly Tyr Tyr Leu Phe  Gly Gln Gln
    1175                 1180                 1185

Trp Arg  Tyr Phe Gln Asn Gly  Ile Met Ala Val Gly  Leu Thr Arg
    1190                 1195                 1200

Val His  Gly Ala Val Gln Tyr  Phe Asp Ala Ser Gly  Phe Gln Ala
    1205                 1210                 1215

Lys Gly  Gln Phe Ile Thr Thr  Ala Asp Gly Lys Leu  Arg Tyr Phe
    1220                 1225                 1230

Asp Arg  Asp Ser Gly Asn Gln  Ile Ser Asn Arg Phe  Val Arg Asn
    1235                 1240                 1245

Ser Lys  Gly Glu Trp Phe Leu  Phe Asp His Asn Gly  Val Ala Val
    1250                 1255                 1260
```

```
Thr Gly Thr Val Thr Phe Asn Gly Gln Arg Leu Tyr Phe Lys Pro
    1265                1270                1275

Asn Gly Val Gln Ala Lys Gly Glu Phe Ile Arg Asp Ala Asp Gly
    1280                1285                1290

His Leu Arg Tyr Tyr Asp Pro Asn Ser Gly Asn Glu Val Arg Asn
    1295                1300                1305

Arg Phe Val Arg Asn Ser Lys Gly Glu Trp Phe Leu Phe Asp His
    1310                1315                1320

Asn Gly Ile Ala Val Thr Gly Ala Arg Val Val Asn Gly Gln Arg
    1325                1330                1335

Leu Tyr Phe Lys Ser Asn Gly Val Gln Ala Lys Gly Glu Leu Ile
    1340                1345                1350

Thr Glu Arg Lys Gly Arg Ile Lys Tyr Tyr Asp Pro Asn Ser Gly
    1355                1360                1365

Asn Glu Val Arg Asn Arg Tyr Val Arg Thr Ser Ser Gly Asn Trp
    1370                1375                1380

Tyr Tyr Phe Gly Asn Asp Gly Tyr Ala Leu Ile Gly Trp His Val
    1385                1390                1395

Val Glu Gly Arg Arg Val Tyr Phe Asp Glu Asn Gly Val Tyr Arg
    1400                1405                1410

Tyr Ala Ser His Asp Gln Arg Asn His Trp Asn Tyr Asp Tyr Arg
    1415                1420                1425

Arg Asp Phe Gly Arg Gly Ser Ser Ser Ala Ile Arg Phe Arg His
    1430                1435                1440

Ser Arg Asn Gly Phe Phe Asp Asn Phe Phe Arg Phe
    1445                1450                1455
```

<210> SEQ ID NO 18
<211> LENGTH: 3804
<212> TYPE: DNA
<213> ORGANISM: Streptococcus mutans
<220> FEATURE:
<221> NAME/KEY: CDS
<222> LOCATION: (1)..(3804)

<400> SEQUENCE: 18

```
atg gtc aat ggc aaa tac tac tac tac aaa gag gac ggt acg ttg cag       48
Met Val Asn Gly Lys Tyr Tyr Tyr Tyr Lys Glu Asp Gly Thr Leu Gln
1               5                   10                  15

aag aac tac gca ctg aac att aac ggc aag acc ttt ttc ttt gac gag       96
Lys Asn Tyr Ala Leu Asn Ile Asn Gly Lys Thr Phe Phe Phe Asp Glu
            20                  25                  30

act ggc gcc ctg agc aat aac acc ctg ccg agc aag aaa ggt aac atc      144
Thr Gly Ala Leu Ser Asn Asn Thr Leu Pro Ser Lys Lys Gly Asn Ile
        35                  40                  45

acc aat aac gac aat acc aat agc ttc gcg caa tac aat cag gtg tat      192
Thr Asn Asn Asp Asn Thr Asn Ser Phe Ala Gln Tyr Asn Gln Val Tyr
    50                  55                  60

tcg acg gat gca gcg aac ttc gaa cat gtc gat cac tac ctg acg gcg      240
Ser Thr Asp Ala Ala Asn Phe Glu His Val Asp His Tyr Leu Thr Ala
65                  70                  75                  80

gag tcc tgg tat cgc ccg aag tat att ctg aaa aat ggc aag acg tgg      288
Glu Ser Trp Tyr Arg Pro Lys Tyr Ile Leu Lys Asn Gly Lys Thr Trp
                85                  90                  95

act cag tcc acg gag aaa gat ttt cgc ccg ttg ttg atg acc tgg tgg      336
Thr Gln Ser Thr Glu Lys Asp Phe Arg Pro Leu Leu Met Thr Trp Trp
            100                 105                 110
```

```
ccg gat cag gaa acc cag cgt cag tat gta aac tat atg aat gcc cag      384
Pro Asp Gln Glu Thr Gln Arg Gln Tyr Val Asn Tyr Met Asn Ala Gln
        115                 120                 125

ctg ggt att cac cag acc tac aac acg gcg acc agc ccg ttg caa ctg      432
Leu Gly Ile His Gln Thr Tyr Asn Thr Ala Thr Ser Pro Leu Gln Leu
    130                 135                 140

aat ctg gcg gca cag acg atc cag acc aag att gaa gag aag atc acg      480
Asn Leu Ala Ala Gln Thr Ile Gln Thr Lys Ile Glu Glu Lys Ile Thr
145                 150                 155                 160

gcg gag aag aac act aat tgg ctg cgt caa acg att tcg gcc ttt gtc      528
Ala Glu Lys Asn Thr Asn Trp Leu Arg Gln Thr Ile Ser Ala Phe Val
                165                 170                 175

aaa acc cag agc gcg tgg aac tcg gac agc gaa aaa ccg ttt gac gat      576
Lys Thr Gln Ser Ala Trp Asn Ser Asp Ser Glu Lys Pro Phe Asp Asp
            180                 185                 190

cat ctg caa aag ggt gca ctg ctg tac tct aac aat agc aag ttg acc      624
His Leu Gln Lys Gly Ala Leu Leu Tyr Ser Asn Asn Ser Lys Leu Thr
        195                 200                 205

tct caa gct aat agc aac tac cgt att ctg aac cgt acc cca acc aac      672
Ser Gln Ala Asn Ser Asn Tyr Arg Ile Leu Asn Arg Thr Pro Thr Asn
    210                 215                 220

caa acc ggc aag aaa gat ccg cgt tat acc gct gac cgt acc atc ggt      720
Gln Thr Gly Lys Lys Asp Pro Arg Tyr Thr Ala Asp Arg Thr Ile Gly
225                 230                 235                 240

ggt tat gag ttc ttg ctg gcg aac gat gtg gat aat agc aat cct gtt      768
Gly Tyr Glu Phe Leu Leu Ala Asn Asp Val Asp Asn Ser Asn Pro Val
                245                 250                 255

gtt caa gcg gaa cag ctg aac tgg ctg cac ttc ctg atg aac ttt ggc      816
Val Gln Ala Glu Gln Leu Asn Trp Leu His Phe Leu Met Asn Phe Gly
            260                 265                 270

aat atc tat gca aac gac cct gac gcc aac ttt gac agc atc cgt gta      864
Asn Ile Tyr Ala Asn Asp Pro Asp Ala Asn Phe Asp Ser Ile Arg Val
        275                 280                 285

gac gcc gtg gac aac gtg gat gca gat ttg ttg caa atc gct ggt gac      912
Asp Ala Val Asp Asn Val Asp Ala Asp Leu Leu Gln Ile Ala Gly Asp
    290                 295                 300

tat ctg aag gct gca aag ggc atc cat aag aac gac aaa gca gcg aac      960
Tyr Leu Lys Ala Ala Lys Gly Ile His Lys Asn Asp Lys Ala Ala Asn
305                 310                 315                 320

gac cac ctg tcg atc ctg gaa gca tgg agc gat aat gac acc ccg tat     1008
Asp His Leu Ser Ile Leu Glu Ala Trp Ser Asp Asn Asp Thr Pro Tyr
                325                 330                 335

ctg cac gac gac ggt gac aac atg atc aat atg gac aac aag ctg cgt     1056
Leu His Asp Asp Gly Asp Asn Met Ile Asn Met Asp Asn Lys Leu Arg
            340                 345                 350

ctg agc ctg ctg ttt agc ctg gcg aag ccg ttg aac cag cgt tcg ggc     1104
Leu Ser Leu Leu Phe Ser Leu Ala Lys Pro Leu Asn Gln Arg Ser Gly
        355                 360                 365

atg aac ccg ctg atc acg aac agc ctg gtt aac cgt acc gat gac aac     1152
Met Asn Pro Leu Ile Thr Asn Ser Leu Val Asn Arg Thr Asp Asp Asn
    370                 375                 380

gca gaa acc gca gcg gtc ccg agc tac agc ttt atc cgt gca cac gat     1200
Ala Glu Thr Ala Ala Val Pro Ser Tyr Ser Phe Ile Arg Ala His Asp
385                 390                 395                 400

agc gag gtt caa gac ctg att cgt aac att att cgt gct gag att aat     1248
Ser Glu Val Gln Asp Leu Ile Arg Asn Ile Ile Arg Ala Glu Ile Asn
                405                 410                 415

ccg aac gtc gtc ggt tat agc ttc acg atg gaa gag atc aag aag gcc     1296
Pro Asn Val Val Gly Tyr Ser Phe Thr Met Glu Glu Ile Lys Lys Ala
            420                 425                 430
```

```
ttt gag att tac aac aag gat ctg ctg gcg acg gaa aag aaa tac acc      1344
Phe Glu Ile Tyr Asn Lys Asp Leu Leu Ala Thr Glu Lys Lys Tyr Thr
        435                 440                 445

cac tat aac acc gcg ctg agc tac gcg ctg ctg ctg acc aat aag agc      1392
His Tyr Asn Thr Ala Leu Ser Tyr Ala Leu Leu Leu Thr Asn Lys Ser
    450                 455                 460

agc gtt ccg cgt gtg tat tac ggt gat atg ttt act gac gac ggt cag      1440
Ser Val Pro Arg Val Tyr Tyr Gly Asp Met Phe Thr Asp Asp Gly Gln
465                 470                 475                 480

tac atg gca cat aaa acg atc aac tac gag gct atc gaa acg ctg ttg      1488
Tyr Met Ala His Lys Thr Ile Asn Tyr Glu Ala Ile Glu Thr Leu Leu
                485                 490                 495

aag gcg cgc att aag tac gtg tct ggt ggc caa gcg atg cgt aat caa      1536
Lys Ala Arg Ile Lys Tyr Val Ser Gly Gly Gln Ala Met Arg Asn Gln
            500                 505                 510

cag gtg ggt aat agc gaa atc att acg agc gtc cgc tat ggc aag ggc      1584
Gln Val Gly Asn Ser Glu Ile Ile Thr Ser Val Arg Tyr Gly Lys Gly
        515                 520                 525

gca ctg aaa gcg acg gat acc ggc gat cgt atc acg cgc acc agc ggc      1632
Ala Leu Lys Ala Thr Asp Thr Gly Asp Arg Ile Thr Arg Thr Ser Gly
    530                 535                 540

gtt gcg gtt att gaa ggc aat aac ccg agc ctg cgc ttg aac gac acc      1680
Val Ala Val Ile Glu Gly Asn Asn Pro Ser Leu Arg Leu Asn Asp Thr
545                 550                 555                 560

gac cgc gtc gtt gtt aac atg ggt gca gca cac aag aac cag gca tat      1728
Asp Arg Val Val Val Asn Met Gly Ala Ala His Lys Asn Gln Ala Tyr
                565                 570                 575

cgt ccg ctg ttg ctg acc act gat aat ggc atc aaa gcg tat cac agc      1776
Arg Pro Leu Leu Leu Thr Thr Asp Asn Gly Ile Lys Ala Tyr His Ser
            580                 585                 590

gat cag gaa gct gcg ggc ctg gtg cgc tat acc aat gat cgt ggt gaa      1824
Asp Gln Glu Ala Ala Gly Leu Val Arg Tyr Thr Asn Asp Arg Gly Glu
        595                 600                 605

ttg atc ttc acg gca gct gac att aaa ggt tat gca aat ccg caa gtc      1872
Leu Ile Phe Thr Ala Ala Asp Ile Lys Gly Tyr Ala Asn Pro Gln Val
    610                 615                 620

agc ggt tat ctg ggc gtc tgg gtg ccg gtc ggc gca gcg gct gat caa      1920
Ser Gly Tyr Leu Gly Val Trp Val Pro Val Gly Ala Ala Ala Asp Gln
625                 630                 635                 640

gac gtg cgt gtg gcc gcg agc acc gcg cca tcg acc gac ggt aaa agc      1968
Asp Val Arg Val Ala Ala Ser Thr Ala Pro Ser Thr Asp Gly Lys Ser
                645                 650                 655

gtg cac cag aat gcg gcg ctg gac agc cgt gtc atg ttt gag ggt ttt      2016
Val His Gln Asn Ala Ala Leu Asp Ser Arg Val Met Phe Glu Gly Phe
            660                 665                 670

agc aac ttt caa gcc ttt gca acg aag aaa gaa gag tac acc aac gtc      2064
Ser Asn Phe Gln Ala Phe Ala Thr Lys Lys Glu Glu Tyr Thr Asn Val
        675                 680                 685

gtc atc gcg aag aac gtc gat aag ttc gcg gaa tgg ggc gtt acc gat      2112
Val Ile Ala Lys Asn Val Asp Lys Phe Ala Glu Trp Gly Val Thr Asp
    690                 695                 700

ttc gaa atg gca ccg cag tat gtg tct agc acc gat ggc tcg ttt ctg      2160
Phe Glu Met Ala Pro Gln Tyr Val Ser Ser Thr Asp Gly Ser Phe Leu
705                 710                 715                 720

gat tcc gtg atc caa aat ggt tat gca ttt acc gac cgc tat gac ctg      2208
Asp Ser Val Ile Gln Asn Gly Tyr Ala Phe Thr Asp Arg Tyr Asp Leu
                725                 730                 735

ggc att agc aag ccg aat aag tat ggt acg gcg gat gat ctg gtt aaa      2256
Gly Ile Ser Lys Pro Asn Lys Tyr Gly Thr Ala Asp Asp Leu Val Lys
```

```
            740                 745                 750

gcg atc aag gcg ctg cat tct aaa ggt att aag gtt atg gcc gac tgg      2304
Ala Ile Lys Ala Leu His Ser Lys Gly Ile Lys Val Met Ala Asp Trp
        755                 760                 765

gtt cca gat cag atg tat gct ttc ccg gaa aaa gaa gtg gtg acg gcc      2352
Val Pro Asp Gln Met Tyr Ala Phe Pro Glu Lys Glu Val Val Thr Ala
    770                 775                 780

acc cgc gtg gac aaa tat ggt acg ccg gtc gcg ggc agc cag atc aaa      2400
Thr Arg Val Asp Lys Tyr Gly Thr Pro Val Ala Gly Ser Gln Ile Lys
785                 790                 795                 800

aac act ctg tat gtc gtg gat ggc aaa agc tcc ggt aaa gat cag caa      2448
Asn Thr Leu Tyr Val Val Asp Gly Lys Ser Ser Gly Lys Asp Gln Gln
                805                 810                 815

gcg aaa tat ggc ggt gcc ttc ctg gaa gag ttg cag gcg aaa tac ccg      2496
Ala Lys Tyr Gly Gly Ala Phe Leu Glu Glu Leu Gln Ala Lys Tyr Pro
            820                 825                 830

gaa ctg ttc gcg cgt aag cag atc agc act ggt gtt ccg atg gac ccg      2544
Glu Leu Phe Ala Arg Lys Gln Ile Ser Thr Gly Val Pro Met Asp Pro
        835                 840                 845

agc gtg aag att aaa caa tgg tcc gcg aaa tac ttt aac ggc acg aac      2592
Ser Val Lys Ile Lys Gln Trp Ser Ala Lys Tyr Phe Asn Gly Thr Asn
    850                 855                 860

atc ctg ggt cgt ggt gcc ggc tac gtg ctg aaa gac cag gca acg aat      2640
Ile Leu Gly Arg Gly Ala Gly Tyr Val Leu Lys Asp Gln Ala Thr Asn
865                 870                 875                 880

acg tac ttt agc ttg gtg tcc gac aat acg ttt ctg ccg aag tct ctg      2688
Thr Tyr Phe Ser Leu Val Ser Asp Asn Thr Phe Leu Pro Lys Ser Leu
                885                 890                 895

gtc aac ccg aac cac ggt acg agc agc tct gtg acc ggc ctg gtg ttc      2736
Val Asn Pro Asn His Gly Thr Ser Ser Ser Val Thr Gly Leu Val Phe
            900                 905                 910

gat ggt aag ggc tac gtg tac tac tct acc agc ggt tac cag gcc aag      2784
Asp Gly Lys Gly Tyr Val Tyr Tyr Ser Thr Ser Gly Tyr Gln Ala Lys
        915                 920                 925

aat acg ttc atc agc ctg ggt aac aac tgg tat tac ttc gac aat aac      2832
Asn Thr Phe Ile Ser Leu Gly Asn Asn Trp Tyr Tyr Phe Asp Asn Asn
    930                 935                 940

ggt tac atg gtc acg ggt gcg cag agc atc aac ggt gcc aac tac tat      2880
Gly Tyr Met Val Thr Gly Ala Gln Ser Ile Asn Gly Ala Asn Tyr Tyr
945                 950                 955                 960

ttt ctg agc aac ggc att cag ctg cgt aat gcg att tac gac aat ggc      2928
Phe Leu Ser Asn Gly Ile Gln Leu Arg Asn Ala Ile Tyr Asp Asn Gly
                965                 970                 975

aat aag gtt ctg agc tac tac ggt aat gac ggt cgt cgt tat gag aat      2976
Asn Lys Val Leu Ser Tyr Tyr Gly Asn Asp Gly Arg Arg Tyr Glu Asn
            980                 985                 990

ggc tat tac ctg ttt ggc caa cag  tgg cgc tac ttt caa  aat ggt att    3024
Gly Tyr Tyr Leu Phe Gly Gln Gln  Trp Arg Tyr Phe Gln  Asn Gly Ile
        995                 1000                1005

atg gcc  gtc ggt ctg acc cgt  gtc cac ggt gcg gtg  cag tat ttt      3069
Met Ala  Val Gly Leu Thr Arg  Val His Gly Ala Val  Gln Tyr Phe
    1010                1015                1020

gac gcc  agc ggc ttc caa gcc  aag ggc cag ttc atc  acc act gcg      3114
Asp Ala  Ser Gly Phe Gln Ala  Lys Gly Gln Phe Ile  Thr Thr Ala
    1025                1030                1035

gac ggt  aaa ctg cgt tac ttt  gac cgt gac agc ggc  aac caa atc      3159
Asp Gly  Lys Leu Arg Tyr Phe  Asp Arg Asp Ser Gly  Asn Gln Ile
    1040                1045                1050

agc aat  cgt ttt gtt cgt aac  agc aag ggt gaa tgg  ttt ttg ttc      3204
```

```
Ser Asn  Arg Phe Val Arg Asn  Ser Lys Gly Glu Trp  Phe Leu Phe
    1055                 1060                 1065

gat cat  aac ggc gtg gcg gtt  acc ggc acc gtt act  ttc aat ggt      3249
Asp His  Asn Gly Val Ala Val  Thr Gly Thr Val Thr  Phe Asn Gly
    1070                 1075                 1080

caa cgt  ctg tac ttt aag ccg  aac ggt gtt cag gca  aag ggt gag      3294
Gln Arg  Leu Tyr Phe Lys Pro  Asn Gly Val Gln Ala  Lys Gly Glu
    1085                 1090                 1095

ttc att  cgc gac gcg gat ggt  cac ttg cgt tac tac  gac cct aat      3339
Phe Ile  Arg Asp Ala Asp Gly  His Leu Arg Tyr Tyr  Asp Pro Asn
    1100                 1105                 1110

tcc ggt  aat gag gtt cgt aac  cgt ttc gtc cgc aac  tct aag ggc      3384
Ser Gly  Asn Glu Val Arg Asn  Arg Phe Val Arg Asn  Ser Lys Gly
    1115                 1120                 1125

gaa tgg  ttc ctg ttt gac cac  aat ggc atc gca gtc  acc ggc gct      3429
Glu Trp  Phe Leu Phe Asp His  Asn Gly Ile Ala Val  Thr Gly Ala
    1130                 1135                 1140

cgt gtg  gtc aac ggc caa cgc  ttg tac ttc aaa agc  aat ggc gtc      3474
Arg Val  Val Asn Gly Gln Arg  Leu Tyr Phe Lys Ser  Asn Gly Val
    1145                 1150                 1155

caa gct  aag ggt gag ctg att  acc gaa cgt aag ggc  cgt att aag      3519
Gln Ala  Lys Gly Glu Leu Ile  Thr Glu Arg Lys Gly  Arg Ile Lys
    1160                 1165                 1170

tat tat  gat cct aac agc ggt  aac gaa gtg cgt aac  cgc tac gtc      3564
Tyr Tyr  Asp Pro Asn Ser Gly  Asn Glu Val Arg Asn  Arg Tyr Val
    1175                 1180                 1185

cgc acc  agc agc ggt aat tgg  tac tat ttt ggt aac  gat ggt tac      3609
Arg Thr  Ser Ser Gly Asn Trp  Tyr Tyr Phe Gly Asn  Asp Gly Tyr
    1190                 1195                 1200

gcg ctg  atc ggc tgg cat gtt  gtt gag ggt cgt cgt  gtg tac ttt      3654
Ala Leu  Ile Gly Trp His Val  Val Glu Gly Arg Arg  Val Tyr Phe
    1205                 1210                 1215

gat gag  aac ggt gtc tat cgt  tac gcg agc cac gac  cag cgt aat      3699
Asp Glu  Asn Gly Val Tyr Arg  Tyr Ala Ser His Asp  Gln Arg Asn
    1220                 1225                 1230

cat tgg  aac tac gac tat cgt  cgc gat ttc ggt cgt  ggt agc agc      3744
His Trp  Asn Tyr Asp Tyr Arg  Arg Asp Phe Gly Arg  Gly Ser Ser
    1235                 1240                 1245

tcc gct  atc cgt ttt cgc cat  agc cgt aac ggc ttt  ttc gac aac      3789
Ser Ala  Ile Arg Phe Arg His  Ser Arg Asn Gly Phe  Phe Asp Asn
    1250                 1255                 1260

ttc ttc  cgc ttc taa                                                3804
Phe Phe  Arg Phe
    1265
```

<210> SEQ ID NO 19
<211> LENGTH: 1267
<212> TYPE: PRT
<213> ORGANISM: Streptococcus mutans

<400> SEQUENCE: 19

```
Met Val Asn Gly Lys Tyr Tyr Tyr Tyr Lys Glu Asp Gly Thr Leu Gln
1               5                   10                  15

Lys Asn Tyr Ala Leu Asn Ile Asn Gly Lys Thr Phe Phe Phe Asp Glu
            20                  25                  30

Thr Gly Ala Leu Ser Asn Asn Thr Leu Pro Ser Lys Lys Gly Asn Ile
        35                  40                  45

Thr Asn Asn Asp Asn Thr Asn Ser Phe Ala Gln Tyr Asn Gln Val Tyr
    50                  55                  60
```

```
Ser Thr Asp Ala Ala Asn Phe Glu His Val Asp His Tyr Leu Thr Ala
65                  70                  75                  80

Glu Ser Trp Tyr Arg Pro Lys Tyr Ile Leu Lys Asn Gly Lys Thr Trp
                85                  90                  95

Thr Gln Ser Thr Glu Lys Asp Phe Arg Pro Leu Leu Met Thr Trp Trp
            100                 105                 110

Pro Asp Gln Glu Thr Gln Arg Gln Tyr Val Asn Tyr Met Asn Ala Gln
        115                 120                 125

Leu Gly Ile His Gln Thr Tyr Asn Thr Ala Thr Ser Pro Leu Gln Leu
    130                 135                 140

Asn Leu Ala Ala Gln Thr Ile Gln Thr Lys Ile Glu Glu Lys Ile Thr
145                 150                 155                 160

Ala Glu Lys Asn Thr Asn Trp Leu Arg Gln Thr Ile Ser Ala Phe Val
                165                 170                 175

Lys Thr Gln Ser Ala Trp Asn Ser Asp Ser Glu Lys Pro Phe Asp Asp
            180                 185                 190

His Leu Gln Lys Gly Ala Leu Leu Tyr Ser Asn Asn Ser Lys Leu Thr
        195                 200                 205

Ser Gln Ala Asn Ser Asn Tyr Arg Ile Leu Asn Arg Thr Pro Thr Asn
    210                 215                 220

Gln Thr Gly Lys Lys Asp Pro Arg Tyr Thr Ala Asp Arg Thr Ile Gly
225                 230                 235                 240

Gly Tyr Glu Phe Leu Leu Ala Asn Asp Val Asp Asn Ser Asn Pro Val
                245                 250                 255

Val Gln Ala Glu Gln Leu Asn Trp Leu His Phe Leu Met Asn Phe Gly
            260                 265                 270

Asn Ile Tyr Ala Asn Asp Pro Asp Ala Asn Phe Asp Ser Ile Arg Val
        275                 280                 285

Asp Ala Val Asp Asn Val Asp Ala Asp Leu Leu Gln Ile Ala Gly Asp
    290                 295                 300

Tyr Leu Lys Ala Ala Lys Gly Ile His Lys Asn Asp Lys Ala Ala Asn
305                 310                 315                 320

Asp His Leu Ser Ile Leu Glu Ala Trp Ser Asp Asn Asp Thr Pro Tyr
                325                 330                 335

Leu His Asp Asp Gly Asp Asn Met Ile Asn Met Asp Asn Lys Leu Arg
            340                 345                 350

Leu Ser Leu Leu Phe Ser Leu Ala Lys Pro Leu Asn Gln Arg Ser Gly
        355                 360                 365

Met Asn Pro Leu Ile Thr Asn Ser Leu Val Asn Arg Thr Asp Asp Asn
    370                 375                 380

Ala Glu Thr Ala Ala Val Pro Ser Tyr Ser Phe Ile Arg Ala His Asp
385                 390                 395                 400

Ser Glu Val Gln Asp Leu Ile Arg Asn Ile Ile Arg Ala Glu Ile Asn
                405                 410                 415

Pro Asn Val Val Gly Tyr Ser Phe Thr Met Glu Glu Ile Lys Lys Ala
            420                 425                 430

Phe Glu Ile Tyr Asn Lys Asp Leu Leu Ala Thr Glu Lys Lys Tyr Thr
        435                 440                 445

His Tyr Asn Thr Ala Leu Ser Tyr Ala Leu Leu Leu Thr Asn Lys Ser
    450                 455                 460

Ser Val Pro Arg Val Tyr Tyr Gly Asp Met Phe Thr Asp Asp Gly Gln
465                 470                 475                 480

Tyr Met Ala His Lys Thr Ile Asn Tyr Glu Ala Ile Glu Thr Leu Leu
```

```
                485                 490                 495

Lys Ala Arg Ile Lys Tyr Val Ser Gly Gly Gln Ala Met Arg Asn Gln
            500                 505                 510

Gln Val Gly Asn Ser Glu Ile Ile Thr Ser Val Arg Tyr Gly Lys Gly
        515                 520                 525

Ala Leu Lys Ala Thr Asp Thr Gly Asp Arg Ile Thr Arg Thr Ser Gly
    530                 535                 540

Val Ala Val Ile Glu Gly Asn Asn Pro Ser Leu Arg Leu Asn Asp Thr
545                 550                 555                 560

Asp Arg Val Val Val Asn Met Gly Ala Ala His Lys Asn Gln Ala Tyr
                565                 570                 575

Arg Pro Leu Leu Leu Thr Thr Asp Asn Gly Ile Lys Ala Tyr His Ser
            580                 585                 590

Asp Gln Glu Ala Ala Gly Leu Val Arg Tyr Thr Asn Asp Arg Gly Glu
        595                 600                 605

Leu Ile Phe Thr Ala Ala Asp Ile Lys Gly Tyr Ala Asn Pro Gln Val
    610                 615                 620

Ser Gly Tyr Leu Gly Val Trp Val Pro Val Gly Ala Ala Ala Asp Gln
625                 630                 635                 640

Asp Val Arg Val Ala Ala Ser Thr Ala Pro Ser Thr Asp Gly Lys Ser
                645                 650                 655

Val His Gln Asn Ala Ala Leu Asp Ser Arg Val Met Phe Glu Gly Phe
            660                 665                 670

Ser Asn Phe Gln Ala Phe Ala Thr Lys Lys Glu Glu Tyr Thr Asn Val
        675                 680                 685

Val Ile Ala Lys Asn Val Asp Lys Phe Ala Glu Trp Gly Val Thr Asp
    690                 695                 700

Phe Glu Met Ala Pro Gln Tyr Val Ser Ser Thr Asp Gly Ser Phe Leu
705                 710                 715                 720

Asp Ser Val Ile Gln Asn Gly Tyr Ala Phe Thr Asp Arg Tyr Asp Leu
                725                 730                 735

Gly Ile Ser Lys Pro Asn Lys Tyr Gly Thr Ala Asp Asp Leu Val Lys
            740                 745                 750

Ala Ile Lys Ala Leu His Ser Lys Gly Ile Lys Val Met Ala Asp Trp
        755                 760                 765

Val Pro Asp Gln Met Tyr Ala Phe Pro Glu Lys Glu Val Val Thr Ala
    770                 775                 780

Thr Arg Val Asp Lys Tyr Gly Thr Pro Val Ala Gly Ser Gln Ile Lys
785                 790                 795                 800

Asn Thr Leu Tyr Val Val Asp Gly Lys Ser Ser Gly Lys Asp Gln Gln
                805                 810                 815

Ala Lys Tyr Gly Gly Ala Phe Leu Glu Glu Leu Gln Ala Lys Tyr Pro
            820                 825                 830

Glu Leu Phe Ala Arg Lys Gln Ile Ser Thr Gly Val Pro Met Asp Pro
        835                 840                 845

Ser Val Lys Ile Lys Gln Trp Ser Ala Lys Tyr Phe Asn Gly Thr Asn
    850                 855                 860

Ile Leu Gly Arg Gly Ala Gly Tyr Val Leu Lys Asp Gln Ala Thr Asn
865                 870                 875                 880

Thr Tyr Phe Ser Leu Val Ser Asp Asn Thr Phe Leu Pro Lys Ser Leu
                885                 890                 895

Val Asn Pro Asn His Gly Thr Ser Ser Ser Val Thr Gly Leu Val Phe
            900                 905                 910
```

```
Asp Gly Lys Gly Tyr Val Tyr Tyr Ser Thr Ser Gly Tyr Gln Ala Lys
        915                 920                 925

Asn Thr Phe Ile Ser Leu Gly Asn Asn Trp Tyr Tyr Phe Asp Asn Asn
    930                 935                 940

Gly Tyr Met Val Thr Gly Ala Gln Ser Ile Asn Gly Ala Asn Tyr Tyr
945                 950                 955                 960

Phe Leu Ser Asn Gly Ile Gln Leu Arg Asn Ala Ile Tyr Asp Asn Gly
                965                 970                 975

Asn Lys Val Leu Ser Tyr Tyr Gly Asn Asp Gly Arg Arg Tyr Glu Asn
            980                 985                 990

Gly Tyr Tyr Leu Phe Gly Gln Gln  Trp Arg Tyr Phe Gln  Asn Gly Ile
        995                 1000                1005

Met Ala  Val Gly Leu Thr Arg  Val His Gly Ala Val  Gln Tyr Phe
    1010                1015                1020

Asp Ala  Ser Gly Phe Gln Ala  Lys Gly Gln Phe Ile  Thr Thr Ala
    1025                1030                1035

Asp Gly  Lys Leu Arg Tyr Phe  Asp Arg Asp Ser Gly  Asn Gln Ile
    1040                1045                1050

Ser Asn  Arg Phe Val Arg Asn  Ser Lys Gly Glu Trp  Phe Leu Phe
    1055                1060                1065

Asp His  Asn Gly Val Ala Val  Thr Gly Thr Val Thr  Phe Asn Gly
    1070                1075                1080

Gln Arg  Leu Tyr Phe Lys Pro  Asn Gly Val Gln Ala  Lys Gly Glu
    1085                1090                1095

Phe Ile  Arg Asp Ala Asp Gly  His Leu Arg Tyr Tyr  Asp Pro Asn
    1100                1105                1110

Ser Gly  Asn Glu Val Arg Asn  Arg Phe Val Arg Asn  Ser Lys Gly
    1115                1120                1125

Glu Trp  Phe Leu Phe Asp His  Asn Gly Ile Ala Val  Thr Gly Ala
    1130                1135                1140

Arg Val  Val Asn Gly Gln Arg  Leu Tyr Phe Lys Ser  Asn Gly Val
    1145                1150                1155

Gln Ala  Lys Gly Glu Leu Ile  Thr Glu Arg Lys Gly  Arg Ile Lys
    1160                1165                1170

Tyr Tyr  Asp Pro Asn Ser Gly  Asn Glu Val Arg Asn  Arg Tyr Val
    1175                1180                1185

Arg Thr  Ser Ser Gly Asn Trp  Tyr Tyr Phe Gly Asn  Asp Gly Tyr
    1190                1195                1200

Ala Leu  Ile Gly Trp His Val  Val Glu Gly Arg Arg  Val Tyr Phe
    1205                1210                1215

Asp Glu  Asn Gly Val Tyr Arg  Tyr Ala Ser His Asp  Gln Arg Asn
    1220                1225                1230

His Trp  Asn Tyr Asp Tyr Arg  Arg Asp Phe Gly Arg  Gly Ser Ser
    1235                1240                1245

Ser Ala  Ile Arg Phe Arg His  Ser Arg Asn Gly Phe  Phe Asp Asn
    1250                1255                1260

Phe Phe  Arg Phe
    1265
```

<210> SEQ ID NO 20
<211> LENGTH: 1630
<212> TYPE: DNA
<213> ORGANISM: artificial sequence
<220> FEATURE:

<223> OTHER INFORMATION: synthetic construct

<400> SEQUENCE: 20

```
cgcgcaatac aatcaggtgt attcgacgga tgcagcgaac ttcgaacatg tcgatcacta     60
cctgacggcg gagtcctggt atcgcccgaa gtatattctg aaaaatggca agacgtggac    120
tcagtccacg gagaaagatt ttcgcccgtt gttgatgacc tggtggccgg atcaggaaac    180
ccagcgtcag tatgtaaact atatgaatgc ccagctgggt attcaccaga cctacaacac    240
ggcgaccagc ccgttgcaac tgaatctggc ggcacagacg atccagacca agattgaaga    300
gaagatcacg gcggagaaga acactaattg gctgcgtcaa acgatttcgg cctttgtcaa    360
aacccagagc gcgtggaact cggacagcga aaaaccgttt gacgatcatc tgcaaaaggg    420
tgcactgctg tactctaaca atagcaagtt gacctctcaa gctaatagca actaccgtat    480
tctgaaccgt accccaacca accaaaccgg caagaaagat ccgcgttata ccgctgaccg    540
taccatcggt ggttatgagt tcttgctggc gaacgatgtg gataatagca atcctgttgt    600
tcaagcggaa cagctgaact ggctgcactt cctgatgaac tttggcaata tctatgcaaa    660
cgaccctgac gccaactttg acagcatccg tgtagacgcc gtggacaacg tggatgcaga    720
tttgttgcaa atcgctggtg actatctgaa ggctgcaaag ggcatccata agaacgacaa    780
agcagcgaac gaccacctgt cgatcctgga agcatggagc gataatgaca ccccgtatct    840
gcacgacgac ggtgacaaca tgatcaatat ggacaacaag ctgcgtctga gcctgctgtt    900
tagcctggcg aagccgttga accagcgttc gggcatgaac ccgctgatca cgaacagcct    960
ggttaaccgt accgatgaca acgcagaaac cgcagcggtc ccgagctaca gctttatccg   1020
tgcacacgat agcgaggttc aagacctgat tcgtaacatt attcgtgctg agattaatcc   1080
gaacgtcgtc ggttatagct tcacgatgga agagatcaag aaggcctttg agatttacaa   1140
caaggatctg ctggcgacgg aaaagaaata cacccactat aacaccgcgc tgagctacgc   1200
gctgctgctg accaataaga gcagcgttcc gcgtgtgtat tacggtgata tgtttactga   1260
cgacggtcag tacatggcac ataaaacgat caactacgag gctatcgaaa cgctgttgaa   1320
ggcgcgcatt aagtacgtgt ctggtggcca agcgatgcgt aatcaacagg tgggtaatag   1380
cgaaatcatt acgagcgtcc gctatggcaa gggcgcactg aaagcgacgg ataccggcga   1440
tcgtatcacg cgcaccagcg gcgttgcggt tattgaaggc aataacccga gcctgcgctt   1500
gaacgacacc gaccgcgtcg ttgttaacat gggtgcagca cacaagaacc aggcatatcg   1560
tccgctgttg ctgaccactg ataatggcat caaagcgtat cacagcgatc aggaagctgc   1620
gggcctggtg                                                          1630
```

<210> SEQ ID NO 21
<211> LENGTH: 28
<212> TYPE: DNA
<213> ORGANISM: artificial sequence
<220> FEATURE:
<223> OTHER INFORMATION: synthetic construct

<400> SEQUENCE: 21

```
aatacaatca ggtgtattcg acggatgc                                        28
```

<210> SEQ ID NO 22
<211> LENGTH: 27
<212> TYPE: DNA
<213> ORGANISM: artificial sequence
<220> FEATURE:
<223> OTHER INFORMATION: synthetic construct

<400> SEQUENCE: 22
tcctgatcgc tgtgatacgc tttgatg 27

<210> SEQ ID NO 23
<211> LENGTH: 7790
<212> TYPE: DNA
<213> ORGANISM: artificial sequence
<220> FEATURE:
<223> OTHER INFORMATION: synthetic construct

<400> SEQUENCE: 23
aattgtgagc ggataacaat tacgagcttc atgcacagtg aaatcatgaa aaatttattt 60
gctttgtgag cggataacaa ttataatatg tggaattgtg agcgctcaca attccacaac 120
ggtttccctc tagaaataat tttgtttaac ttttaggagg taaaacatat ggtcaatggc 180
aaatactact actacaaaga ggacggtacg ttgcagaaga actacgcact gaacattaac 240
ggcaagacct ttttctttga cgagactggc gccctgagca ataacaccct gccgagcaag 300
aaaggtaaca tcaccaataa cgacaatacc aatagcttcg cgcaatacaa tcaggtgtat 360
tcgacggatg cagcgaactt cgaacatgtc gatcactacc tgacggcgga gtcctggtat 420 cgccccgaagt atattctgaa aaatggcaag acgtggactc agtccacgga gaaagatttt 480
cgcccgttgt tgatgacctg gtggccggat caggaaaccc agcgtcagta tgtaaactat 540
atgaatgccc agctgggtat tcaccagacc tacaacacgg cgaccagccc gttgcaactg 600
aatctggcgg cacagacgat ccagaccaag attgaagaga agatcacggc ggagaagaac 660
actaattggc tgcgtcaaac gatttcggcc tttgtcaaaa cccagagcgc gtggaactcg 720
gacagcgaaa aaccgtttga cgatcatctg caaaagggtg cactgctgta ctctaacaat 780
agcaagttga cctctcaagc taatagcaac taccgtattc tgaaccgtac cccaaccaac 840
caaaccggca agaaagatcc gcgttatacc gctgaccgta ccatcggtgg ttatgagttc 900
ttgctggcga acgatgtgga taatagcaat cctgttgttc aagcggaaca gctgaactgg 960
ctgcacttcc tgatgaactt tggcaatatc tatgcaaacg accctgacgc caactttgac 1020
agcatccgtg tagacgccgt ggacaacgtg gatgcagatt tgttgcaaat cgctggtgac 1080
tatctgaagg ctgcaaaggg catccataag aacgacaaag cagcgaacga ccacctgtcg 1140
atcctggaag catggagcga taatgacacc ccgtatctgc acgacgacgg tgacaacatg 1200
atcaatatgg acaacaagct gcgtctgagc ctgctgttta gcctggcgaa gccgttgaac 1260
cagcgttcgg gcatgaaccc gctgatcacg aacagcctgg ttaaccgtac cgatgacaac 1320
gcagaaaccg cagcggtccc gagctacagc tttatccgtg cacacgatag cgaggttcaa 1380
gacctgattc gtaacattat tcgtgctgag attaatccga acgtcgtcgg ttatagcttc 1440
acgatggaag agatcaagaa ggcctttgag atttacaaca aggatctgct ggcgacggaa 1500
aagaaataca cccactataa caccgcgctg agctacgcgc tgctgctgac caataagagc 1560
agcgttccgc gtgtgtatta cggtgatatg tttactgacg acggtcagta catggcacat 1620
aaaacgatca actacgaggc tatcgaaacg ctgttgaagg cgcgcattaa gtacgtgtct 1680
ggtggccaag cgatgcgtaa tcaacaggtg ggtaatagcg aaatcattac gagcgtccgc 1740
tatggcaagg gcgcactgaa agcgacggat accggcgatc gtatcacgcg caccagcggc 1800
gttgcggtta ttgaaggcaa taacccgagc ctgcgcttga acgacaccga ccgcgtcgtt 1860
gttaacatgg gtgcagcaca caagaaccag gcatatcgtc cgctgttgct gaccactgat 1920

-continued aatggcatca aagcgtatca cagcgatcag gaagctgcgg gcctggtgcg ctataccaat 1980
gatcgtggtg aattgatctt cacggcagct gacattaaag gttatgcaaa tccgcaagtc 2040
agcggttatc tgggcgtctg ggtgccggtc ggcgcagcgg ctgatcaaga cgtgcgtgtg 2100
gccgcgagca ccgcgccatc gaccgacggt aaaagcgtgc accagaatgc ggcgctggac 2160
agccgtgtca tgtttgaggg ttttagcaac tttcaagcct ttgcaacgaa gaaagaagag 2220
tacaccaacg tcgtcatcgc gaagaacgtc gataagttcg cggaatgggg cgttaccgat 2280
ttcgaaatgg caccgcagta tgtgtctagc accgatggct cgtttctgga ttccgtgatc 2340
caaaatggtt atgcatttac cgaccgctat gacctgggca ttagcaagcc gaataagtat 2400
ggtacggcgg atgatctggt taaagcgatc aaggcgctgc attctaaagg tattaaggtt 2460
atggccgact gggttccaga tcagatgtat gctttcccgg aaaaagaagt ggtgacggcc 2520
acccgcgtgg acaaatatgg tacgccggtc gcgggcagcc agatcaaaaa cactctgtat 2580
gtcgtggatg gcaaaagctc cggtaaagat cagcaagcga aatatggcgg tgccttcctg 2640
gaagagttgc aggcgaaata cccggaactg ttcgcgcgta agcagatcag cactggtgtt 2700
ccgatggacc cgagcgtgaa gattaaacaa tggtccgcga aatactttaa cggcacgaac 2760
atcctgggtc gtggtgccgg ctacgtgctg aaagaccagg caacgaatac gtactttagc 2820
ttggtgtccg acaatacgtt tctgccgaag tctctggtca acccgaacca cggtacgagc 2880
agctctgtga ccggcctggt gttcgatggt aagggctacg tgtactactc taccagcggt 2940
taccaggcca agaatacgtt catcagcctg ggtaacaact ggtattactt cgacaataac 3000
ggttacatgg tcacgggtgc gcagagcatc aacggtgcca actactattt tctgagcaac 3060
ggcattcagc tgcgtaatgc gatttacgac aatggcaata aggttctgag ctactacggt 3120
aatgacggtc gtcgttatga gaatggctat tacctgtttg gccaacagtg gcgctacttt 3180
caaaatggta ttatggccgt cggtctgacc cgtgtccacg gtgcggtgca gtattttgac 3240
gccagcggct tccaagccaa gggccagttc atcaccactg cggacggtaa actgcgttac 3300
tttgaccgtg acagcggcaa ccaaatcagc aatcgttttg ttcgtaacag caagggtgaa 3360
tggtttttgt tcgatcataa cggcgtggcg gttaccggca ccgttacttt caatggtcaa 3420
cgtctgtact ttaagccgaa cggtgttcag gcaaagggtg agttcattcg cgacgcggat 3480
ggtcacttgc gttactacga ccctaattcc ggtaatgagg ttcgtaaccg tttcgtccgc 3540
aactctaagg gcgaatggtt cctgtttgac cacaatggca tcgcagtcac cggcgctcgt 3600
gtggtcaacg gccaacgctt gtacttcaaa agcaatggcg tccaagctaa gggtgagctg 3660
attaccgaac gtaagggccg tattaagtat tatgatccta acagcggtaa cgaagtgcgt 3720
aaccgctacg tccgcaccag cagcggtaat tggtactatt ttggtaacga tggttacgcg 3780
ctgatcggct ggcatgttgt tgagggtcgt cgtgtgtact ttgatgagaa cggtgtctat 3840
cgttacgcga gccacgacca gcgtaatcat tggaactacg actatcgtcg cgatttcggt 3900
cgtggtagca gctccgctat ccgttttcgc catagccgta acggcttttt cgacaacttc 3960
ttccgcttct aactcgagcc ccaagggcga cacaaaattt attctaaatg ataataaata 4020
ctgataacat cttatagttt gtattatatt ttgtattatc gttgacatgt ataattttga 4080
tatcaaaaac tgattttccc tttattattt tcgagattta ttttcttaat tctctttaac 4140
aaactagaaa tattgtatat acaaaaaatc ataaataata gatgaatagt ttaattatag 4200
gtgttcatca atcgaaaaag caacgtatct tatttaaagt gcgttgcttt tttctcattt 4260
ataaggttaa ataattctca tatatcaagc aaagtgacag gcgcccttaa atattctgac 4320

```
aaatgctctt tccctaaact ccccccataa aaaaacccgc cgaagcgggt ttttacgtta   4380
tttgcggatt aacgattact cgttatcaga accgcccagg gggcccgagc ttaagactgg   4440
ccgtcgtttt acaacacaga aagagtttgt agaaacgcaa aaaggccatc cgtcaggggc   4500
cttctgctta gtttgatgcc tggcagttcc ctactctcgc cttccgcttc ctcgctcact   4560
gactcgctgc gctcggtcgt tcggctgcgg cgagcggtat cagctcactc aaaggcggta   4620
atacggttat ccacagaatc aggggataac gcaggaaaga acatgtgagc aaaaggccag   4680
caaaaggcca ggaaccgtaa aaaggccgcg ttgctggcgt ttttccatag gctccgcccc   4740
cctgacgagc atcacaaaaa tcgacgctca agtcagaggt ggcgaaaccc gacaggacta   4800
taaagatacc aggcgtttcc ccctggaagc tccctcgtgc gctctcctgt tccgaccctg   4860
ccgcttaccg gatacctgtc cgcctttctc ccttcgggaa gcgtggcgct ttctcatagc   4920
tcacgctgta ggtatctcag ttcggtgtag gtcgttcgct ccaagctggg ctgtgtgcac   4980
gaaccccccg ttcagcccga ccgctgcgcc ttatccggta actatcgtct tgagtccaac   5040
ccggtaagac acgacttatc gccactggca gcagccactg gtaacaggat tagcagagcg   5100
aggtatgtag gcggtgctac agagttcttg aagtggtggg ctaactacgg ctacactaga   5160
agaacagtat ttggtatctg cgctctgctg aagccagtta ccttcggaaa aagagttggt   5220
agctcttgat ccggcaaaca aaccaccgct ggtagcggtg gtttttttgt ttgcaagcag   5280
cagattacgc gcagaaaaaa aggatctcaa gaagatcctt tgatcttttc tacggggtct   5340
gacgctcagt ggaacgacgc gcgcgtaact cacgttaagg gattttggtc atgagtcact   5400
gcccgctttc cagtcgggaa acctgtcgtg ccagctgcat taatgaatcg gccaacgcgc   5460
ggggagaggc ggtttgcgta ttgggcgcca gggtggtttt tcttttcacc agtgagactg   5520
gcaacagctg attgcccttc accgcctggc cctgagagag ttgcagcaag cggtccacgc   5580
tggtttgccc cagcaggcga aaatcctgtt tgatggtggt taacggcggg atataacatg   5640
agctatcttc ggtatcgtcg tatcccacta ccgagatatc cgcaccaacg cgcagcccgg   5700
actcggtaat ggcgcgcatt gcgcccagcg ccatctgatc gttggcaacc agcatcgcag   5760
tgggaacgat gccctcattc agcatttgca tggtttgttg aaaaccggac atggcactcc   5820
agtcgccttc ccgttccgct atcggctgaa tttgattgcg agtgagatat ttatgccagc   5880
cagccagacg cagacgcgcc gagacagaac ttaatgggcc cgctaacagc gcgatttgct   5940
ggtgacccaa tgcgaccaga tgctccacgc ccagtcgcgt accgtcctca tgggagaaaa   6000
taatactgtt gatgggtgtc tggtcagaga catcaagaaa taacgccgga acattagtgc   6060
aggcagcttc cacagcaatg gcatcctggt catccagcgg atagttaatg atcagcccac   6120
tgacgcgttg cgcgagaaga ttgtgcaccg ccgctttaca ggcttcgacg ccgcttcgtt   6180
ctaccatcga caccaccacg ctggcaccca gttgatcggc gcgagattta atcgccgcga   6240
caatttgcga cggcgcgtgc agggccagac tggaggtggc aacgccaatc agcaacgact   6300
gtttgcccgc cagttgttgt gccacgcggt tgggaatgta attcagctcc gccatcgccg   6360
cttccacttt ttcccgcgtt ttcgcagaaa cgtggctggc ctggttcacc acgcgggaaa   6420
cggtctgata agagacaccg gcatactctg cgacatcgta taacgttact ggtttcatat   6480
tcaccaccct gaattgactc tcttccgggc gctatcatgc cataccgcga aaggttttgc   6540
gccattcgat ggcgcgccgc ttaccaatgc ttaatcagtg aggcacctat ctcagcgatc   6600
tgtctatttc gttcatccat agttgcctga ctccccgtcg tgtagataac tacgatacgg   6660
```

```
gagggcttac catctggccc cagcgctgcg atgataccgc gagaaccacg ctcaccggct   6720

ccggatttat cagcaataaa ccagccagcc ggaagggccg agcgcagaag tggtcctgca   6780

actttatccg cctccatcca gtctattaat tgttgccggg aagctagagt aagtagttcg   6840

ccagttaata gtttgcgcaa cgttgttgcc atcgctacag gcatcgtggt gtcacgctcg   6900

tcgtttggta tggcttcatt cagctccggt tcccaacgat caaggcgagt tacatgatcc   6960

cccatgttgt gcaaaaaagc ggttagctcc ttcggtcctc cgatcgttgt cagaagtaag   7020

ttggccgcag tgttatcact catggttatg gcagcactgc ataattctct tactgtcatg   7080

ccatccgtaa gatgcttttc tgtgactggt gagtactcaa ccaagtcatt ctgagaatag   7140

tgtatgcggc gaccgagttg ctcttgcccg gcgtcaatac gggataatac cgcgccacat   7200

agcagaactt taaaagtgct catcattgga aaacgttctt cggggcgaaa actctcaagg   7260

atcttaccgc tgttgagatc cagttcgatg taacccactc gtgcacccaa ctgatcttca   7320

gcatctttta ctttcaccag cgtttctggg tgagcaaaaa caggaaggca aaatgccgca   7380

aaaaagggaa taagggcgac acggaaatgt tgaatactca tattcttcct ttttcaatat   7440

tattgaagca tttatcaggg ttattgtctc atgagcggat acatatttga atgtatttag   7500

aaaaataaac aaataggggt cagtgttaca accaattaac caattctgaa cattatcgcg   7560

agcccattta tacctgaata tggctcataa cacccccttgt ttgcctggcg gcagtagcgc   7620

ggtggtccca cctgacccca tgccgaactc agaagtgaaa cgccgtagcg ccgatggtag   7680

tgtggggact ccccatgcga gagtagggaa ctgccaggca tcaaataaaa cgaaaggctc   7740

agtcgaaaga ctgggccttt cgcccgggct aattatgggg tgtcgccctt              7790
```

<210> SEQ ID NO 24
<211> LENGTH: 36
<212> TYPE: DNA
<213> ORGANISM: artificial sequence
<220> FEATURE:
<223> OTHER INFORMATION: synthetic construct

<400> SEQUENCE: 24

```
ataaaaaacg ctcggttgcc gccgggcgtt ttttat                               36
```

<210> SEQ ID NO 25
<211> LENGTH: 21
<212> TYPE: DNA
<213> ORGANISM: artificial sequence
<220> FEATURE:
<223> OTHER INFORMATION: synthetic construct

<400> SEQUENCE: 25

```
ggatcctgac tgcctgagct t                                               21
```

<210> SEQ ID NO 26
<211> LENGTH: 3801
<212> TYPE: DNA
<213> ORGANISM: Streptococcus mutans

<400> SEQUENCE: 26

```
gtgaacggta aatattatta ttataaagaa gatggaactc ttcaaaagaa ttatgcttta     60

aatattaatg ggaaaacttt cttctttgat gaaacaggag cattatcaaa taatacttta    120

cctagtaaaa agggtaatat cactaataat gataacacta acagctttgc tcaatataat    180

caggtctata gtacagatgc tgcaaacttc gaacatgttg atcattattt gacagctgag    240

agttggtatc gtcctaagta catcttgaag gatggtaaaa catggacaca gtcaacagaa    300
```

```
aaagatttcc gtcctttact gatgacatgg tggcctgacc aagaaacgca gcgtcaatat    360
gttaactaca tgaatgcaca gcttggtatt catcaaacat acaatacagc aaccagtccg    420
cttcaattga atttagctgc tcagacaata caaactaaga tcgaagaaaa aatcactgca    480
gaaaagaata ccaattggct gcgtcagact atttccgcat ttgttaagac acagtcagct    540
tggaacagtg acagcgaaaa accgtttgat gatcacttac aaaaaggggc attgctttac    600
agtaataata gcaaactaac ttcacaggct aattccaact accgtatctt aaatcgcacc    660
ccgaccaatc aaactgggaa gaaggaccca aggtatacag ccgatcgcac tatcggcggt    720
tacgaatttt tgttagccaa tgatgtggat aattccaatc ctgtcgtgca ggccgaacaa    780
ttgaactggc tacattttct catgaacttt ggtaacattt atgccaatga tccggatgct    840
aactttgatt ccattcgtgt tgatgcggta gataatgtgg atgctgactt gctccaaatt    900
gctggggatt acctcaaagc tgctaagggg attcataaaa atgataaggc tgctaatgat    960
catttgtcta ttttagaggc atggagttat aatgatactc cttaccttca tgatgatggc   1020
gacaatatga ttaacatgga taacaggtta cgtctttcct tgctttattc attagctaaa   1080
cctttgaatc aacgttcagg catgaatcct ctgatcacta acagtttggt gaatcgaact   1140
gatgataatg ctgaaactgc cgcagtccct tcttattcct tcattcgtgc tcatgacagt   1200
gaagtgcagg acttgattcg caatattatt agagcagaaa tcaatcctaa tgttgtcggg   1260
tattcattca ctatggagga aatcaagaag gctttcgaga tttacaacaa agacttatta   1320
gctacagaga agaaatacac acactataat acggcacttt cttatgccct gcttttaacc   1380
aacaaatcca gtgtgccgcg tgtctattat ggggatatgt tcacagatga cgggcaatac   1440
atggctcata agacgatcaa ttacgaagcc atcgaaaccc ttttaaaggc tcgtattaag   1500
tatgtttcag gcggtcaagc catgcgcaat caacaggttg gcaattctga aatcattacg   1560
tctgtccgct atggtaaagg tgctttgaaa gcaacggata caggggaccg caccacacgg   1620
acttcaggag tggccgtgat tgaaggcaat aacccttctt tacgtttgaa ggcttctgat   1680
cgcgtggttg tcaatatggg agcagctcat aagaaccaag cataccgacc tttactcttg   1740
accacagata acggtatcaa ggcttatcat tccgatcaag aagcggctgg tttggtgcgc   1800
tacaccaatg acagagggga attgatcttc acagcggctg atattaaagg ctatgccaac   1860
cctcaagttt ctggctattt aggtgtttgg gttccagtag gcgctgccgc tgatcaagat   1920
gttcgcgttg cggcttcaac ggccccatca acagatggca agtctgtgca tcaaaatgcg   1980
gcccttgatt cacgcgtcat gtttgaaggt ttctctaatt tccaagcatt cgccactaaa   2040
aaagaggaat ataccaatgt tgtgattgct aagaatgtgg ataagtttgc ggaatggggt   2100
gtcacagatt ttgaaatggc accgcagtat gtgtcttcaa cggatggttc tttcttggat   2160
tctgtgatcc aaaacggcta tgcttttacg gaccgttatg atttgggaat ttccaaacct   2220
aataaatacg ggacagccga tgatttggtg aaagcaataa aagcgttaca cagcaagggt   2280
attaaggtaa tggctgactg ggtgcctgat caaatgtatg cttttcctga aaaagaagtg   2340
gtaacagcaa cccgcgttga taagtatggg actcctgttg caggaagtca gatcaaaaac   2400
accctttatg tagttgatgg taagagttct ggtaaagatc aacaagccaa gtatggggga   2460
gctttcttag aggagctgca agcgaagtat ccggagcttt ttgcgagaaa acaaatttcc   2520
acaggggttc cgatggaccc ttcagttaag attaagcaat ggtctgccaa gtactttaat   2580
gggacaaata ttttagggcg cggagcaggc tatgtcttaa aagatcaggc aaccaatact   2640
```

```
tacttcagtc ttgtttcaga caacaccttc cttcctaaat cgttagttaa cccaaatcac   2700
ggaacaagca gttctgtaac tggattggta tttgatggta aaggttatgt ttattattca   2760
acgagtggtt accaagccaa aaatactttc attagcttag gaaataattg gtattatttc   2820
gataataacg gttatatggt cactggtgct caatcaatta acggtgctaa ttattatttc   2880
ttatcaaatg gtattcaatt aagaaatgct atttatgata atggtaataa agtattgtct   2940
tattatggaa atgatggccg tcgttatgaa aatggttact atctctttgg tcaacaatgg   3000
cgttatttcc aaaatggtat tatggctgtc ggcttaacac gtgttcatgg tgctgttcaa   3060
tattttgatg cttctgggtt ccaagctaaa ggacagttta ttacaactgc tgatggaaag   3120
ctgcgttact ttgatagaga ctcaggaaat caaatttcaa atcgttttgt tagaaattcc   3180
aagggagaat ggttcttatt tgatcacaat ggtgtcgctg taaccggtac tgtaacgttc   3240
aatggacaac gtctttactt taaacctaat ggtgttcaag ccaaaggaga atttatcaga   3300
gatgcagatg gacatctaag atattatgat cctaattccg gaaatgaagt tcgtaatcgc   3360
tttgttagaa attccaaggg agaatggttc ttatttgatc acaatggtat cgctgtaact   3420
ggtgccagag ttgttaatgg acagcgcctc tattttaagt ctaatggtgt tcaggctaag   3480
ggagagctca ttacagagcg taaaggtcgt atcaaatact atgatcctaa ttccggaaat   3540
gaagttcgta atcgttatgt gagaacatca tcaggaaact ggtactattt tggcaatgat   3600
ggctatgcct taattggttg gcatgttgtt gaaggaagac gtgtttactt tgatgaaaat   3660
ggtgtttatc gttatgccag tcatgatcaa agaaaccact ggaattatga ttacagaaga   3720
gactttggtc gtggcagcag tagtgctatt cgttttagac actctcgtaa tggattcttt   3780
gacaatttct ttagatttta a                                          3801
```

<210> SEQ ID NO 27
<211> LENGTH: 3801
<212> TYPE: DNA
<213> ORGANISM: Streptococcus mutans

<400> SEQUENCE: 27

```
gtgaacggta aatattatta ttataaagaa gatggaactc ttcaaaagaa ttatgcttta     60
aatattaatg ggaaaacttt cttctttgat gaaacaggag cattatcaaa taatacttta    120
cctagtaaaa agggtaatat cactaataat gataacacta acagctttgc tcaatataat    180
caggtctata gtacagatgc tgcaaacttc gaacatgttg atcattattt gacagctgag    240
agttggtatc gtcctaaata catcttaaaa gatggcaaaa catggacaca gtcaacagaa    300
aaagatttcc gtcccttact gatgacatgg tggcctgacc aagaaacgca gcgtcaatat    360
gttaactaca tgaatgcaca gcttggtatt catcgaacat acaatacagc aacttcaccg    420
cttcaattga atttagctgc tcagacaata caaactaaga tcgaagaaaa aatcactgca    480
gaaaagaata ccaattggct gcgtcagact atttccgcat ttgttaagac acagtcagct    540
tggaacagtg acagcgaaaa accgtttgat gatcacttac aaaaaggggc attgctttac    600
agtaataata gcaaactaac ttcacaggct aattccaact accgtatctt aaatcgcacc    660
ccgaccaatc aaaccggaaa gaaagatcca aggtatacag ctgatcgcac tatcggcggt    720
tacgaatttc ttttggcaaa cgatgtggat aattctaatc ctgtcgtgca ggccgaacaa    780
ttgaactggc tacattttct catgaacttt ggtaacattt atgccaatga tccggatgct    840
aactttgatt ccattcgtgt tgatgcggtg gataatgtgg atgctgactt gctccaaatt    900
gctggggatt acctcaaagc tgctaagggg attcataaaa atgataaggc tgctaatgat    960
```

catttgtcta ttttagaggc atggagttat aatgatactc cttaccttca tgatgatggc 1020
gacaatatga ttaacatgga taacaggtta cgtctttcct tgctttattc attagctaaa 1080
cctttgaatc aacgttcagg catgaatcct ctgatcacta acagtttggt gaatcgaact 1140
gatgataatg ctgaaactgc cgcagtccct tcttattcct tcatccgtgc ccatgacagt 1200
gaagtgcagg acttgattcg caatattatt agagcagaaa tcaatcctaa tgttgtcggg 1260
tattctttca ctatggagga aatcaagaag gctttcgaga tttacaacaa agacttatta 1320
gctacagaga agaaatacac acactataat acggcacttt cttatgccct gcttttaacc 1380
aacaaatcca gtgtgccgcg tgtctattat ggggatatgt tcacagatga cgggcaatac 1440
atggctcata agacgatcaa ttacgaagcc atcgaaaccc ttttaaaggc tcgtattaag 1500
tatgtttcag gcggtcaagc catgcgcaat caacaggttg gcaattctga aatcattacg 1560
tctgtccgct atggtaaagg tgctttgaaa gcaacggata caggggaccg caccacacgg 1620
acttcaggag tggccgtgat tgaaggcaat aacccttctt tacgtttgaa ggcttctgat 1680
cgcgtggttg tcaatatggg agcagcccat aagaaccaag cataccgtcc attattgtta 1740
actaccaaca atgggattaa agcatatcat tccgatcaag aagcggctgg tttggtgcgc 1800
tacaccaatg acagagggga attgatcttc acagcggctg atattaaagg ctatgccaac 1860
cctcaagttt ctggctattt aggtgtttgg gttccagtag gcgctgccgc tgatcaagat 1920
gttcgcgttg cggcttcaac ggccccatca acagatggca agtctgtgca tcaaaatgcg 1980
gcccttgatt cacgcgtcat gtttgaaggt ttctctaatt tccaagcatt cgccactaaa 2040
aaagaggaat ataccaatgt tgtgattgct aagaatgtgg ataagtttgc ggaatggggg 2100
gtcacagatt ttgaaatggc accgcagtat gtgtcttcaa cagatggttc tttcttggat 2160
tctgtgatcc aaaacggcta tgcttttacg gaccgttatg atttaggaat ttccaaacct 2220
aataaatacg ggacagccga tgatttggtg aaagccatca aagcgttaca cagcaagggc 2280
attaaggtaa tggctgactg ggtgcctgat caaatgtatg ctctccctga aaaagaagtg 2340
gtaacagcaa cccgtgttga taagtatggg actcctgttg caggaagtca gataaaaaac 2400 acccttttatg tagttgatgg taagagttct ggtaaagatc aacaagccaa gtatggggga 2460
gctttcttag aggagctgca agctaaatat ccggagcttt ttgcgagaaa acaaatttcc 2520
acaggggttc cgatggaccc ttcagttaag attaagcaat ggtctgccaa gtactttaat 2580
gggacaaata ttttagggcg cggagcaggc tatgtcttaa aagatcaggc aaccaatact 2640
tacttcagtc ttgtttcaga caacaccttc cttcctaaat cgttagttaa cccaaatcac 2700
ggaacaagca gttctgtaac tggattggta tttgatggta aaggttatgt ttattattca 2760
acgagtggtt accaagccaa aaatgctttc attagcttag gaaataattg gtattatttc 2820
gataataacg gttatatggt cactggtgct caatcaatta acggtgctaa ttattatttc 2880
ttatcaaatg gtattcaatt aagaaatgct atttatgata atggtaataa agtattgtct 2940
tattatggaa atgatggccg ccgttatgaa aatggttact atctctttgg acaacaatgg 3000
cgttatttcc aaaatggtat tatggctgtc ggtttaacac gtgttcatgg tgctgttcaa 3060
tactttgatg cttctggctt ccaagctaaa ggacagttta ttacaactgc tgatggaaag 3120
ctgcgttact ttgatagaga ctcaggaaat caaatttcaa atcgttttgt tagaaattcc 3180
aggggagaat ggttcctatt tgatcacaat ggtgtcgctg taaccggtac tgtaacgttc 3240
aatggacaac gtctttactt taaacctaat ggtgttcaag ccaaaggaga atttatcaga 3300
gatgcagatg gacatctaag atattatgat cctaattccg gaaatgaagt tcgtaatcgc 3360
tttgttagaa attccaaggg agaatggttc ttatttgatc acaatggtat cgctgtaact 3420
ggtgccagag ttgttaacgg acagcgcctc tattttaagt ctaatggtgt tcaggctaag 3480
ggagagctca ttacagagcg taaaggtcgt attaaatatt atgatcctaa ttccggaaat 3540
gaagttcgta atcgttatgt gagaacatca tcaggaaact ggtactattt tggcaatgat 3600
ggctatgctt taattggttg gcatgttgtt gaaggaagac gtgtttactt tgatgaaaat 3660
ggtatttatc gttatgccag tcatgatcaa agaaaccact gggattatga ttacagaaga 3720
gactttggtc gtggcagcag tagtgctatt cgttttagac actctcgtaa tggattcttt 3780
gacaatttct ttagatttta a 3801

<210> SEQ ID NO 28
<211> LENGTH: 1266
<212> TYPE: PRT
<213> ORGANISM: Streptococcus mutans

<400> SEQUENCE: 28

Val Asn Gly Lys Tyr Tyr Tyr Tyr Lys Glu Asp Gly Thr Leu Gln Lys
1 5 10 15

Asn Tyr Ala Leu Asn Ile Asn Gly Lys Thr Phe Phe Phe Asp Glu Thr
20 25 30

Gly Ala Leu Ser Asn Asn Thr Leu Pro Ser Lys Lys Gly Asn Ile Thr
35 40 45

Asn Asn Asp Asn Thr Asn Ser Phe Ala Gln Tyr Asn Gln Val Tyr Ser
50 55 60

Thr Asp Ala Ala Asn Phe Glu His Val Asp His Tyr Leu Thr Ala Glu
65 70 75 80

Ser Trp Tyr Arg Pro Lys Tyr Ile Leu Lys Asp Gly Lys Thr Trp Thr
85 90 95

Gln Ser Thr Glu Lys Asp Phe Arg Pro Leu Leu Met Thr Trp Trp Pro
100 105 110

Asp Gln Glu Thr Gln Arg Gln Tyr Val Asn Tyr Met Asn Ala Gln Leu
115 120 125

Gly Ile His Arg Thr Tyr Asn Thr Ala Thr Ser Pro Leu Gln Leu Asn
130 135 140

Leu Ala Ala Gln Thr Ile Gln Thr Lys Ile Glu Glu Lys Ile Thr Ala
145 150 155 160

Glu Lys Asn Thr Asn Trp Leu Arg Gln Thr Ile Ser Ala Phe Val Lys
165 170 175

Thr Gln Ser Ala Trp Asn Ser Asp Ser Glu Lys Pro Phe Asp Asp His
180 185 190

Leu Gln Lys Gly Ala Leu Leu Tyr Ser Asn Asn Ser Lys Leu Thr Ser
195 200 205

Gln Ala Asn Ser Asn Tyr Arg Ile Leu Asn Arg Thr Pro Thr Asn Gln
210 215 220

Thr Gly Lys Lys Asp Pro Arg Tyr Thr Ala Asp Arg Thr Ile Gly Gly
225 230 235 240

Tyr Glu Phe Leu Leu Ala Asn Asp Val Asp Asn Ser Asn Pro Val Val
245 250 255

Gln Ala Glu Gln Leu Asn Trp Leu His Phe Leu Met Asn Phe Gly Asn
260 265 270

Ile Tyr Ala Asn Asp Pro Asp Ala Asn Phe Asp Ser Ile Arg Val Asp
275 280 285

```
Ala Val Asp Asn Val Asp Ala Asp Leu Leu Gln Ile Ala Gly Asp Tyr
    290                 295                 300

Leu Lys Ala Ala Lys Gly Ile His Lys Asn Asp Lys Ala Ala Asn Asp
305                 310                 315                 320

His Leu Ser Ile Leu Glu Ala Trp Ser Tyr Asn Asp Thr Pro Tyr Leu
                325                 330                 335

His Asp Asp Gly Asp Asn Met Ile Asn Met Asp Asn Arg Leu Arg Leu
            340                 345                 350

Ser Leu Leu Tyr Ser Leu Ala Lys Pro Leu Asn Gln Arg Ser Gly Met
        355                 360                 365

Asn Pro Leu Ile Thr Asn Ser Leu Val Asn Arg Thr Asp Asp Asn Ala
    370                 375                 380

Glu Thr Ala Ala Val Pro Ser Tyr Ser Phe Ile Arg Ala His Asp Ser
385                 390                 395                 400

Glu Val Gln Asp Leu Ile Arg Asn Ile Ile Arg Ala Glu Ile Asn Pro
                405                 410                 415

Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495

Ala Arg Ile Lys Tyr Val Ser Gly Gly Gln Ala Met Arg Asn Gln Gln
            500                 505                 510

Val Gly Asn Ser Glu Ile Ile Thr Ser Val Arg Tyr Gly Lys Gly Ala
        515                 520                 525

Leu Lys Ala Thr Asp Thr Gly Asp Arg Thr Thr Arg Thr Ser Gly Val
    530                 535                 540

Ala Val Ile Glu Gly Asn Asn Pro Ser Leu Arg Leu Lys Ala Ser Asp
545                 550                 555                 560

Arg Val Val Val Asn Met Gly Ala Ala His Lys Asn Gln Ala Tyr Arg
                565                 570                 575

Pro Leu Leu Leu Thr Thr Asn Asn Gly Ile Lys Ala Tyr His Ser Asp
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655

His Gln Asn Ala Ala Leu Asp Ser Arg Val Met Phe Glu Gly Phe Ser
            660                 665                 670

Asn Phe Gln Ala Phe Ala Thr Lys Lys Glu Glu Tyr Thr Asn Val Val
        675                 680                 685

Ile Ala Lys Asn Val Asp Lys Phe Ala Glu Trp Gly Val Thr Asp Phe
    690                 695                 700
```

```
Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750

Ile Lys Ala Leu His Ser Lys Gly Ile Lys Val Met Ala Asp Trp Val
        755                 760                 765

Pro Asp Gln Met Tyr Ala Leu Pro Glu Lys Glu Val Val Thr Ala Thr
    770                 775                 780

Arg Val Asp Lys Tyr Gly Thr Pro Val Ala Gly Ser Gln Ile Lys Asn
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830

Leu Phe Ala Arg Lys Gln Ile Ser Thr Gly Val Pro Met Asp Pro Ser
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880

Tyr Phe Ser Leu Val Ser Asp Asn Thr Phe Leu Pro Lys Ser Leu Val
                885                 890                 895

Asn Pro Asn His Gly Thr Ser Ser Ser Val Thr Gly Leu Val Phe Asp
            900                 905                 910

Gly Lys Gly Tyr Val Tyr Tyr Ser Thr Ser Gly Tyr Gln Ala Lys Asn
        915                 920                 925

Ala Phe Ile Ser Leu Gly Asn Asn Trp Tyr Tyr Phe Asp Asn Asn Gly
    930                 935                 940

Tyr Met Val Thr Gly Ala Gln Ser Ile Asn Gly Ala Asn Tyr Tyr Phe
945                 950                 955                 960

Leu Ser Asn Gly Ile Gln Leu Arg Asn Ala Ile Tyr Asp Asn Gly Asn
                965                 970                 975

Lys Val Leu Ser Tyr Tyr Gly Asn Asp Gly Arg Arg Tyr Glu Asn Gly
            980                 985                 990

Tyr Tyr Leu Phe Gly Gln Gln Trp  Arg Tyr Phe Gln Asn  Gly Ile Met
        995                 1000                1005

Ala Val  Gly Leu Thr Arg Val  His Gly Ala Val Gln  Tyr Phe Asp
    1010                1015                1020

Ala Ser  Gly Phe Gln Ala Lys  Gly Gln Phe Ile Thr  Thr Ala Asp
    1025                1030                1035

Gly Lys  Leu Arg Tyr Phe Asp  Arg Asp Ser Gly Asn  Gln Ile Ser
    1040                1045                1050

Asn Arg  Phe Val Arg Asn Ser  Arg Gly Glu Trp Phe  Leu Phe Asp
    1055                1060                1065

His Asn  Gly Val Ala Val Thr  Gly Thr Val Thr Phe  Asn Gly Gln
    1070                1075                1080

Arg Leu  Tyr Phe Lys Pro Asn  Gly Val Gln Ala Lys  Gly Glu Phe
    1085                1090                1095

Ile Arg  Asp Ala Asp Gly His  Leu Arg Tyr Tyr Asp  Pro Asn Ser
    1100                1105                1110

Gly Asn  Glu Val Arg Asn Arg  Phe Val Arg Asn Ser  Lys Gly Glu
```

```
    1115                1120                1125

Trp Phe  Leu Phe Asp His Asn  Gly Ile Ala Val Thr  Gly Ala Arg
    1130                1135                1140

Val Val  Asn Gly Gln Arg Leu  Tyr Phe Lys Ser Asn  Gly Val Gln
    1145                1150                1155

Ala Lys  Gly Glu Leu Ile Thr  Glu Arg Lys Gly Arg  Ile Lys Tyr
    1160                1165                1170

Tyr Asp  Pro Asn Ser Gly Asn  Glu Val Arg Asn Arg  Tyr Val Arg
    1175                1180                1185

Thr Ser  Ser Gly Asn Trp Tyr  Tyr Phe Gly Asn Asp  Gly Tyr Ala
    1190                1195                1200

Leu Ile  Gly Trp His Val Val  Glu Gly Arg Arg Val  Tyr Phe Asp
    1205                1210                1215

Glu Asn  Gly Ile Tyr Arg Tyr  Ala Ser His Asp Gln  Arg Asn His
    1220                1225                1230

Trp Asp  Tyr Asp Tyr Arg Arg  Asp Phe Gly Arg Gly  Ser Ser Ser
    1235                1240                1245

Ala Ile  Arg Phe Arg His Ser  Arg Asn Gly Phe Phe  Asp Asn Phe
    1250                1255                1260

Phe Arg  Phe
    1265
```

<210> SEQ ID NO 29
<211> LENGTH: 3801
<212> TYPE: DNA
<213> ORGANISM: Streptococcus mutans

<400> SEQUENCE: 29

```
gtgaacggta aatattatta ttataaagaa gatggaactc ttcaaaagaa ttatgcttta     60

aacattaatg ggaaaacttt cttctttgat gaaacaggag cattatcaaa taatacttta    120

cctagtaaaa agggtaatat cactaataat gataacacta acagctttgc tcaatataat    180

caggtctata gtacagatgc tgcaaacttc gaacatgttg atcattattt gacagccgaa    240

agttggtatc gtcctaagta catcttgaag gatggcaaaa catggacaca gtcaacagaa    300

aaagatttcc gtcctttact gatgacatgg tggcctgacc aagaaacgca gcgtcaatat    360

gttaactaca tgaatgcaca gcttggtatt catcaaacat acaatacagc aacttcaccg    420

cttcaattga atttagctgc tcagacaata caaactaaga tcgaagaaaa aatcactgca    480

gaaaagaata ccaattggct gcgtcagact atttccgcat ttgttaagac acagtcagct    540

tggaacagtg acagcgaaaa accgtttgat gatcacttac aaaaaggggc attgctttac    600

agtaataata gcaaactaac ttcacaggct aattccaact accgtatctt aaatcgcacc    660

ccgaccaatc aaactgggaa gaaggaccca aggtatacag ctgataacac tatcggcggt    720

tacgaatttc ttttggcaaa cgatgtggat aattccaatc ctgtcgtgca ggccgaacaa    780

ttgaactggc tccattttct catgaacttt ggtaacattt atgccaatga tccggatgct    840

aactttgatt ccattcgtgt tgatgcggta gataatgtgg atgctgactt gctccaaatt    900

gctggggatt acctcaaagc tgctaagggg attcataaaa atgataaggc tgctaatgat    960

catttgtcta ttttagaggc atggagttat aatgatactc cttaccttca tgatgatggc   1020

gacaatatga ttaacatgga taacaggtta cgtctttcct tgctttattc attagctaaa   1080

cccttaaatc aacgttcagg catgaatcct ctgatcacta acagtttggt gaatcgaact   1140

gatgataatg ctgaaactgc cgcagtccct tcttattcct tcatccgtgc ccatgacagt   1200
```

gaagtgcagg acttgattcg caatattatt agaacagaaa tcaatcctaa tgttgtcggg 1260
tattctttca ctatggagga aatcaagaag gctttcgaga tttacaacaa agacttgtta 1320
gctacagaga agaaatacac acactataat acggcacttt cttatgccct gcttttaacc 1380
aacaaatcca gtgtgccgcg tgtctattat ggggatatgt ttacagatga cgggcaatac 1440
atggctcata agacgatcaa ttacgaagcc atcgaaaccc tgcttaaggc tcgtattaag 1500
tatgtttcag gcggtcaagc catgcgcaat caacaggttg gcaattctga aattattacg 1560
tctgtccgct atggtaaagg tgctttgaaa gcaacggata caggggaccg caccacacga 1620
acttcaggag tggccgtgat tgaaggcaat aacccttctt tacgtttgaa ggcttctgat 1680
cgtgttgttg tcaatatggg agcagcccat aagaaccaag cataccgacc tttactcttg 1740
accacagata acggtatcaa ggcttatcat tccgatcaag aagcggctgg tttggtgcgc 1800
tacaccaatg acagagggga attgatcttc acagcggctg atattaaagg ctatgccaac 1860
cctcaagttt ctggctattt aggtgtctgg gttccagtag gcgctgccgc tgatcaagat 1920
gttcgcgttg cggcttcaac ggccccatca acagatggca agtctgtgca tcaaaatgcg 1980
gcccttgatt cacgcgtcat gtttgaaggt ttctctaatt tccaagcatt cgccactaaa 2040
aaagaggaat ataccaatgt tgtgattgct aagaatgtgg ataagtttgc ggaatggggt 2100
gtcacagatt ttgaaatggc accgcagtat gtgtcttcaa cagatggttc tttcttggat 2160
tctgtgatcc aaaacggcta tgcttttacg gatcgttatg atttgggaat ttccaaacct 2220
aataaatacg ggacagccga tgatttggtt aaggccatca aagcgttaca cagcaagggc 2280
attaaggtaa tggctgactg ggtgcctgat caaatgtatg ctctccctga aaaagaagtg 2340
gtaacagcaa cccgcgttga taagtatggg actcctgttg caggaagtca gatcaaaaac 2400
accctttatg tagttgatgg taagagttct ggtaaagatc aacaagccaa gtatggggga 2460
gccttcttag aggagctgca agcgaagtat ccggagcttt ttgcgagaaa gcaaatttcc 2520
acaggggttc cgatggaccc ttcagttaag attaagcaat ggtctgccaa gtactttaat 2580
gggacaaata ttttagggcg cggagcaggc tatgtcttaa aagatcaggc aactaatact 2640
tacttcagtc ttgtttcaga caacaccttc cttcctaaat cgttagttaa cccaaatcac 2700
ggaacaagca gttctgtaac tggattggta tttgatggta aaggttatgt ttattattca 2760
acgagtggtt accaagccaa aaatgctttc attagcttag gaaataattg gtattatttc 2820
gataataacg gttatatggt cactggtgct caatcaatta acggtgctaa ttattatttc 2880
ttatcaaatg gtattcaatt aagaaatgct atttatgata atggtaataa agtattgtct 2940
tattatggaa atgatggccg tcgttatgaa aatggttact atctctttgg tcaacaatgg 3000
cgttatttcc aaaatggtat tatggctgtc ggcttaacac gtgttcatgg tgctgttcaa 3060
tattttgatg cttctgggtt ccaagctaaa ggacagttta ttacaactgc tgatggaaag 3120
ctgcgttact ttgatagaga ctcaggaaat caaatttcaa atcgttttgt tagaaattct 3180
aagggagaat ggttcttatt tgatcacaat ggtgtcgctg taaccggtac tgtaacgttc 3240
aatggacaac gtctttactt taaacctaat ggtgttcaag ccaaaggaga atttatcaga 3300
gatgcagatg gacatctaag atattatgat cctaattccg gaaatgaagt tcgtaatcgc 3360
tttgttagaa attccaaggg agaatggttc ttatttgatc acaatggtat cgctgtaacc 3420
ggtgccagag ttgttaacgg acagcgcctc tattttaagt ctaatggtgt tcaggctaag 3480
ggagagctca ttacagagcg taaaggtcgt atcaaatact atgatcctaa ttccggaaat 3540
gaagttcgta atcgttatgt gataacatca tcaggaaact ggtactattt tggcaatgat 3600
ggctatgctt taattggttg gcatattgtt gaaggaagac gtgtttattt tgatgaaaat 3660
ggtgtttatc gttatgccag tcatgatcaa agaaaccact gggattatga ttacagaaga 3720
gactttggtc gtggcagcag tagtgctatt cgttttagac actctcgtaa tggattcttt 3780
gacaatttct ttagatttta a 3801

<210> SEQ ID NO 30
<211> LENGTH: 1266
<212> TYPE: PRT
<213> ORGANISM: Streptococcus mutans

<400> SEQUENCE: 30

Val Asn Gly Lys Tyr Tyr Tyr Tyr Lys Glu Asp Gly Thr Leu Gln Lys
1 5 10 15

Asn Tyr Ala Leu Asn Ile Asn Gly Lys Thr Phe Phe Phe Asp Glu Thr
20 25 30

Gly Ala Leu Ser Asn Asn Thr Leu Pro Ser Lys Lys Gly Asn Ile Thr
35 40 45

Asn Asn Asp Asn Thr Asn Ser Phe Ala Gln Tyr Asn Gln Val Tyr Ser
50 55 60

Thr Asp Ala Ala Asn Phe Glu His Val Asp His Tyr Leu Thr Ala Glu
65 70 75 80

Ser Trp Tyr Arg Pro Lys Tyr Ile Leu Lys Asp Gly Lys Thr Trp Thr
85 90 95

Gln Ser Thr Glu Lys Asp Phe Arg Pro Leu Leu Met Thr Trp Trp Pro
100 105 110

Asp Gln Glu Thr Gln Arg Gln Tyr Val Asn Tyr Met Asn Ala Gln Leu
115 120 125

Gly Ile His Gln Thr Tyr Asn Thr Ala Thr Ser Pro Leu Gln Leu Asn
130 135 140

Leu Ala Ala Gln Thr Ile Gln Thr Lys Ile Glu Glu Lys Ile Thr Ala
145 150 155 160

Glu Lys Asn Thr Asn Trp Leu Arg Gln Thr Ile Ser Ala Phe Val Lys
165 170 175

Thr Gln Ser Ala Trp Asn Ser Asp Ser Glu Lys Pro Phe Asp Asp His
180 185 190

Leu Gln Lys Gly Ala Leu Leu Tyr Ser Asn Asn Ser Lys Leu Thr Ser
195 200 205

Gln Ala Asn Ser Asn Tyr Arg Ile Leu Asn Arg Thr Pro Thr Asn Gln
210 215 220

Thr Gly Lys Lys Asp Pro Arg Tyr Thr Ala Asp Asn Thr Ile Gly Gly
225 230 235 240

Tyr Glu Phe Leu Leu Ala Asn Asp Val Asp Asn Ser Asn Pro Val Val
245 250 255

Gln Ala Glu Gln Leu Asn Trp Leu His Phe Leu Met Asn Phe Gly Asn
260 265 270

Ile Tyr Ala Asn Asp Pro Asp Ala Asn Phe Asp Ser Ile Arg Val Asp
275 280 285

Ala Val Asp Asn Val Asp Ala Asp Leu Leu Gln Ile Ala Gly Asp Tyr
290 295 300

Leu Lys Ala Ala Lys Gly Ile His Lys Asn Asp Lys Ala Ala Asn Asp
305 310 315 320

His Leu Ser Ile Leu Glu Ala Trp Ser Tyr Asn Asp Thr Pro Tyr Leu

```
                325                 330                 335

His Asp Asp Gly Asp Asn Met Ile Asn Met Asp Asn Arg Leu Arg Leu
            340                 345                 350

Ser Leu Leu Tyr Ser Leu Ala Lys Pro Leu Asn Gln Arg Ser Gly Met
        355                 360                 365

Asn Pro Leu Ile Thr Asn Ser Leu Val Asn Arg Thr Asp Asp Asn Ala
    370                 375                 380

Glu Thr Ala Ala Val Pro Ser Tyr Ser Phe Ile Arg Ala His Asp Ser
385                 390                 395                 400

Glu Val Gln Asp Leu Ile Arg Asn Ile Ile Arg Thr Glu Ile Asn Pro
                405                 410                 415

Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495

Ala Arg Ile Lys Tyr Val Ser Gly Gly Gln Ala Met Arg Asn Gln Gln
            500                 505                 510

Val Gly Asn Ser Glu Ile Ile Thr Ser Val Arg Tyr Gly Lys Gly Ala
        515                 520                 525

Leu Lys Ala Thr Asp Thr Gly Asp Arg Thr Thr Arg Thr Ser Gly Val
    530                 535                 540

Ala Val Ile Glu Gly Asn Asn Pro Ser Leu Arg Leu Lys Ala Ser Asp
545                 550                 555                 560

Arg Val Val Val Asn Met Gly Ala Ala His Lys Asn Gln Ala Tyr Arg
                565                 570                 575

Pro Leu Leu Leu Thr Thr Asp Asn Gly Ile Lys Ala Tyr His Ser Asp
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655

His Gln Asn Ala Ala Leu Asp Ser Arg Val Met Phe Glu Gly Phe Ser
            660                 665                 670

Asn Phe Gln Ala Phe Ala Thr Lys Lys Glu Glu Tyr Thr Asn Val Val
        675                 680                 685

Ile Ala Lys Asn Val Asp Lys Phe Ala Glu Trp Gly Val Thr Asp Phe
    690                 695                 700

Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750
```

```
Ile Lys Ala Leu His Ser Lys Gly Ile Lys Val Met Ala Asp Trp Val
        755                 760                 765

Pro Asp Gln Met Tyr Ala Leu Pro Glu Lys Glu Val Val Thr Ala Thr
    770                 775                 780

Arg Val Asp Lys Tyr Gly Thr Pro Val Ala Gly Ser Gln Ile Lys Asn
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830

Leu Phe Ala Arg Lys Gln Ile Ser Thr Gly Val Pro Met Asp Pro Ser
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880

Tyr Phe Ser Leu Val Ser Asp Asn Thr Phe Leu Pro Lys Ser Leu Val
                885                 890                 895

Asn Pro Asn His Gly Thr Ser Ser Ser Val Thr Gly Leu Val Phe Asp
            900                 905                 910

Gly Lys Gly Tyr Val Tyr Tyr Ser Thr Ser Gly Tyr Gln Ala Lys Asn
        915                 920                 925

Ala Phe Ile Ser Leu Gly Asn Asn Trp Tyr Tyr Phe Asp Asn Asn Gly
    930                 935                 940

Tyr Met Val Thr Gly Ala Gln Ser Ile Asn Gly Ala Asn Tyr Tyr Phe
945                 950                 955                 960

Leu Ser Asn Gly Ile Gln Leu Arg Asn Ala Ile Tyr Asp Asn Gly Asn
                965                 970                 975

Lys Val Leu Ser Tyr Tyr Gly Asn Asp Gly Arg Arg Tyr Glu Asn Gly
            980                 985                 990

Tyr Tyr Leu Phe Gly Gln Gln Trp  Arg Tyr Phe Gln Asn  Gly Ile Met
        995                 1000                 1005

Ala Val  Gly Leu Thr Arg Val  His Gly Ala Val Gln  Tyr Phe Asp
    1010                 1015                 1020

Ala Ser  Gly Phe Gln Ala Lys  Gly Gln Phe Ile Thr  Thr Ala Asp
    1025                 1030                 1035

Gly Lys  Leu Arg Tyr Phe Asp  Arg Asp Ser Gly Asn  Gln Ile Ser
    1040                 1045                 1050

Asn Arg  Phe Val Arg Asn Ser  Lys Gly Glu Trp Phe  Leu Phe Asp
    1055                 1060                 1065

His Asn  Gly Val Ala Val Thr  Gly Thr Val Thr Phe  Asn Gly Gln
    1070                 1075                 1080

Arg Leu  Tyr Phe Lys Pro Asn  Gly Val Gln Ala Lys  Gly Glu Phe
    1085                 1090                 1095

Ile Arg  Asp Ala Asp Gly His  Leu Arg Tyr Tyr Asp  Pro Asn Ser
    1100                 1105                 1110

Gly Asn  Glu Val Arg Asn Arg  Phe Val Arg Asn Ser  Lys Gly Glu
    1115                 1120                 1125

Trp Phe  Leu Phe Asp His Asn  Gly Ile Ala Val Thr  Gly Ala Arg
    1130                 1135                 1140

Val Val  Asn Gly Gln Arg Leu  Tyr Phe Lys Ser Asn  Gly Val Gln
    1145                 1150                 1155
```

```
Ala Lys  Gly Glu Leu Ile Thr  Glu Arg Lys Gly Arg  Ile Lys Tyr
    1160                 1165                 1170

Tyr Asp  Pro Asn Ser Gly Asn  Glu Val Arg Asn Arg  Tyr Val Ile
    1175                 1180                 1185

Thr Ser  Ser Gly Asn Trp Tyr  Tyr Phe Gly Asn Asp  Gly Tyr Ala
    1190                 1195                 1200

Leu Ile  Gly Trp His Ile Val  Glu Gly Arg Arg Val  Tyr Phe Asp
    1205                 1210                 1215

Glu Asn  Gly Val Tyr Arg Tyr  Ala Ser His Asp Gln  Arg Asn His
    1220                 1225                 1230

Trp Asp  Tyr Asp Tyr Arg Arg  Asp Phe Gly Arg Gly  Ser Ser Ser
    1235                 1240                 1245

Ala Ile  Arg Phe Arg His Ser  Arg Asn Gly Phe Phe  Asp Asn Phe
    1250                 1255                 1260

Phe Arg  Phe
    1265
```

<210> SEQ ID NO 31
<211> LENGTH: 3801
<212> TYPE: DNA
<213> ORGANISM: Streptococcus mutans

<400> SEQUENCE: 31

```
gtgagcggta aatattatta ttataaagaa gatggaactc ttcaaaagaa ttatgcttta     60

aatattaatg ggaaaacttt cttctttgat gaaacaggag cattatcaaa taatacttta    120

cctagtaaaa agggtaatat cactaataat gataacacta acagctttgc tcaatataat    180

caggtctata gtacagatgc tgcaaacttc gaacatgttg atcattattt gacagctgag    240

agttggtatc gtcctaagta catcttgaag gatggtaaaa catggacaca gtcaacagaa    300

aaagatttcc gtcccttact gatgacatgg tggcctgacc aagaaacgca gcgtcaatat    360

gttaactaca tgaatgcaca gcttggtatt catcaaacat acaatacagc aaccagtccg    420

cttcaattga atttagctgc tcagacaata caaactaaga tcgaagaaaa aatcactgca    480

gaaaagaata ccaattggct gcgtcagact atttccgcat ttgttaagac acagtcagct    540

tggaacagtg acagcgaaaa accatttgat gatcacttac aaaaaggggc attgctttac    600

agtaataata gcaaactaac ttcacaggct aattccaact accgtatctt aaatcgcacc    660

ccgaccaatc aaactggaaa gaaggaccca aggtatacag ctgatcgcac cattggcggt    720

tacgaatttc ttttggcaaa cgatgtggat aattccaatc ctgtcgtgca ggccgaacaa    780

ttgaactggc tacattttct catgaacttt ggtaacattt atgccaatga tccggatgct    840

aactttgatt ccattcgtgt tgatgcggtg gataatgtgg atgctgactt gctccaaatt    900

gctggggatt acctcaaagc tgctaagggg attcataaaa atgataaggc tgctaatgat    960

catttgtcta ttttagaggc atggagctat gacgacactc cttaccttca tgatgatggc   1020

gacaatatga ttaacatgga taacaggtta cgtctttcct tgctttattc attagctaaa   1080

cctttgaatc aacgttcagg catgaatcct ctgatcacta acagtttggt gaatcgaact   1140

gatgataatg ctgaaactgc cgcagtccct tcttattcct tcatccgtgc ccatgacagt   1200

gaagtgcagg acttgattcg caatattatt agagcagaaa tcaatcctaa tgttgtcggg   1260

tattcattca ctatggagga aatcaagaag gctttcgaga tttacaacaa agacttatta   1320

gctacagaga agaaatacac acactataat acggcacttt cttatgccct gcttttaacc   1380

aacaaatcca gtgtgccgcg tgtctattat ggggatatgt ttacagatga cgggcaatac   1440
```

```
atggctcata agacgatcaa ttacgaagcc atcgaaaccc ttttaaaggc tcgtattaag   1500
tatgtttcag gcggtcaagc catgcgcaat caacaggttg gcaattctga aatcattacg   1560
tctgtccgct atggtaaagg tgctttgaaa gcaacggata caggggatcg caccacacga   1620
acttcaggag tggctgtgat tgaaggcaat aacccttctt tacgtttgaa ggcttctgat   1680
cgcgtggttg tcaatatggg agcaacccat aagaaccaag cataccgacc tttacttttg   1740
accacagata acggtatcaa ggcttatcat tccgatcaag aagcggctgg tttggtgcgc   1800
tacaccaacg acagagggga attgatcttc acagctgctg atattaaagg ctatgccaac   1860
cctcaagttt ctggctattt aggtgtttgg gttccagtag gcgctgccgc tgatcaagat   1920
gttcgcgttg cggcttcaac ggccccatca acagatggta agtctgtgca tcaaaatgcg   1980
gcccttgatt cacgcgtcat gtttgaaggt ttctctaatt tccaagcatt cgccactaaa   2040
aaagaggaat ataccaatgt tgtgattgct aagaatgtgg ataagtttgc ggaatggggg   2100
gtcacagatt ttgaaatggc accgcagtat gtgtcttcaa cagatggttc cttcttggat   2160
tctgtgatcc aaaacggcta tgcttttacg gaccgttatg atttgggaat ttccaaacct   2220
aataaatacg ggacagccga tgatttggtg aaagccatca aagcgttaca cagcaagggc   2280
attaaggtaa tggctgactg ggtgcctgat caaatgtatg ctctccctga aaaagaagtg   2340
gtaacagcaa cccgcgttga taagtatggg actcctgttg caggaagtca gatcaaaaac   2400
accctttatg tagttgatgg taagagttct ggtaaagatc aacaagccaa gtatgggggga   2460
gctttcttag aagagctgca agcgaagtat ccggagcttt ttgcgagaaa acaaatttcc   2520
acaggggttc cgatggaccc ttcagttaag attaagcaat ggtctgccaa gtactttaat   2580
gggacaaata ttttagggcg cggagcaggc tatgtcttaa aagatcaggc aactaatact   2640
tacttcagtc ttgtttcaga caacaccttc cttcctaaat cgttagttaa cccaaatcat   2700
ggaacaagca gttctgtaac tggattggta tttgatggta aaggttatgt ttattattca   2760
acgagtggtt accaagccaa aaatgctttc attagcttag gaaataattg gtattatttc   2820
gataataacg gttatatggt cactggtgct caatcaatta acggtgctaa ttattatttc   2880
ttatcaaatg gtattcaatt aagaaatgct atttatgata atggtaataa agtattgtct   2940
tattatggaa atgatggccg tcgttatgaa aatggttact atctctttgg tcaacaatgg   3000
cgttatttcc aaaatggtat tatggctgtc ggcttaacac gtgttcatgg tgctgttcaa   3060
tattttgatg cttctgggtt ccaagctaaa ggacagttta ttacaactgc tgatggaaag   3120
ctgcgttact ttgatagaga ctcaggaaat caaatttcaa atcgttttgt tagaaattcc   3180
aagggagaat ggttcttatt tgatcacaat ggtgtcgctg taaccggtac tgtaacgttc   3240
aatggacaac gtctttactt taaacctaat ggtgttcaag ctaaaggaga atttatcaga   3300
gatgcagatg gacatctaag atattatgat cctaattccg gaaatgaagt tcgtaatcgc   3360
tttgttagaa attccaaggg agaatggttc ttatttgatc acaatggtat cgctgtaact   3420
ggtaccagag ttgttaatgg acagcgcctc tattttaagt ctaatggtgt tcaggctaag   3480
ggagagctca ttacagagcg taaaggtcgt atcaaatact atgatcctaa ttccggaaat   3540
gaagttcgta atcgttatgt gagaacatca tcaggaaact ggtactattt tggcaatgat   3600
ggttatgcct taattggttg gcatgttgtt gaaggaagac gtgtttactt tgatgaaaat   3660
ggtatttatc gttatgccag tcatgatcaa agaaaccact gggattatga ttacagaaga   3720
gactttggtc gtggcagcag cagtgctgtt cgttttagac actctcgtaa tggattcttt   3780
```

gacaatttct ttagatttta a 3801

<210> SEQ ID NO 32
<211> LENGTH: 1266
<212> TYPE: PRT
<213> ORGANISM: Streptococcus mutans

<400> SEQUENCE: 32

Val Ser Gly Lys Tyr Tyr Tyr Tyr Lys Glu Asp Gly Thr Leu Gln Lys
1 5 10 15

Asn Tyr Ala Leu Asn Ile Asn Gly Lys Thr Phe Phe Phe Asp Glu Thr
20 25 30

Gly Ala Leu Ser Asn Asn Thr Leu Pro Ser Lys Lys Gly Asn Ile Thr
35 40 45

Asn Asn Asp Asn Thr Asn Ser Phe Ala Gln Tyr Asn Gln Val Tyr Ser
50 55 60

Thr Asp Ala Ala Asn Phe Glu His Val Asp His Tyr Leu Thr Ala Glu
65 70 75 80

Ser Trp Tyr Arg Pro Lys Tyr Ile Leu Lys Asp Gly Lys Thr Trp Thr
85 90 95

Gln Ser Thr Glu Lys Asp Phe Arg Pro Leu Leu Met Thr Trp Trp Pro
100 105 110

Asp Gln Glu Thr Gln Arg Gln Tyr Val Asn Tyr Met Asn Ala Gln Leu
115 120 125

Gly Ile His Gln Thr Tyr Asn Thr Ala Thr Ser Pro Leu Gln Leu Asn
130 135 140

Leu Ala Ala Gln Thr Ile Gln Thr Lys Ile Glu Glu Lys Ile Thr Ala
145 150 155 160

Glu Lys Asn Thr Asn Trp Leu Arg Gln Thr Ile Ser Ala Phe Val Lys
165 170 175

Thr Gln Ser Ala Trp Asn Ser Asp Ser Glu Lys Pro Phe Asp Asp His
180 185 190

Leu Gln Lys Gly Ala Leu Leu Tyr Ser Asn Asn Ser Lys Leu Thr Ser
195 200 205

Gln Ala Asn Ser Asn Tyr Arg Ile Leu Asn Arg Thr Pro Thr Asn Gln
210 215 220

Thr Gly Lys Lys Asp Pro Arg Tyr Thr Ala Asp Arg Thr Ile Gly Gly
225 230 235 240

Tyr Glu Phe Leu Leu Ala Asn Asp Val Asp Asn Ser Asn Pro Val Val
245 250 255

Gln Ala Glu Gln Leu Asn Trp Leu His Phe Leu Met Asn Phe Gly Asn
260 265 270

Ile Tyr Ala Asn Asp Pro Asp Ala Asn Phe Asp Ser Ile Arg Val Asp
275 280 285

Ala Val Asp Asn Val Asp Ala Asp Leu Leu Gln Ile Ala Gly Asp Tyr
290 295 300

Leu Lys Ala Ala Lys Gly Ile His Lys Asn Asp Lys Ala Ala Asn Asp
305 310 315 320

His Leu Ser Ile Leu Glu Ala Trp Ser Tyr Asp Asp Thr Pro Tyr Leu
325 330 335

His Asp Asp Gly Asp Asn Met Ile Asn Met Asp Asn Arg Leu Arg Leu
340 345 350

Ser Leu Leu Tyr Ser Leu Ala Lys Pro Leu Asn Gln Arg Ser Gly Met
355 360 365

```
Asn Pro Leu Ile Thr Asn Ser Leu Val Asn Arg Thr Asp Asp Asn Ala
    370                 375                 380

Glu Thr Ala Ala Val Pro Ser Tyr Ser Phe Ile Arg Ala His Asp Ser
385                 390                 395                 400

Glu Val Gln Asp Leu Ile Arg Asn Ile Ile Arg Ala Glu Ile Asn Pro
                405                 410                 415

Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495

Ala Arg Ile Lys Tyr Val Ser Gly Gly Gln Ala Met Arg Asn Gln Gln
            500                 505                 510

Val Gly Asn Ser Glu Ile Ile Thr Ser Val Arg Tyr Gly Lys Gly Ala
        515                 520                 525

Leu Lys Ala Thr Asp Thr Gly Asp Arg Thr Thr Arg Thr Ser Gly Val
    530                 535                 540

Ala Val Ile Glu Gly Asn Asn Pro Ser Leu Arg Leu Lys Ala Ser Asp
545                 550                 555                 560

Arg Val Val Val Asn Met Gly Ala Thr His Lys Asn Gln Ala Tyr Arg
                565                 570                 575

Pro Leu Leu Leu Thr Thr Asp Asn Gly Ile Lys Ala Tyr His Ser Asp
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655

His Gln Asn Ala Ala Leu Asp Ser Arg Val Met Phe Glu Gly Phe Ser
            660                 665                 670

Asn Phe Gln Ala Phe Ala Thr Lys Lys Glu Glu Tyr Thr Asn Val Val
        675                 680                 685

Ile Ala Lys Asn Val Asp Lys Phe Ala Glu Trp Gly Val Thr Asp Phe
    690                 695                 700

Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750

Ile Lys Ala Leu His Ser Lys Gly Ile Lys Val Met Ala Asp Trp Val
        755                 760                 765

Pro Asp Gln Met Tyr Ala Leu Pro Glu Lys Glu Val Val Thr Ala Thr
    770                 775                 780

Arg Val Asp Lys Tyr Gly Thr Pro Val Ala Gly Ser Gln Ile Lys Asn
```

```
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830

Leu Phe Ala Arg Lys Gln Ile Ser Thr Gly Val Pro Met Asp Pro Ser
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880

Tyr Phe Ser Leu Val Ser Asp Asn Thr Phe Leu Pro Lys Ser Leu Val
                885                 890                 895

Asn Pro Asn His Gly Thr Ser Ser Ser Val Thr Gly Leu Val Phe Asp
            900                 905                 910

Gly Lys Gly Tyr Val Tyr Tyr Ser Thr Ser Gly Tyr Gln Ala Lys Asn
        915                 920                 925

Ala Phe Ile Ser Leu Gly Asn Asn Trp Tyr Tyr Phe Asp Asn Asn Gly
    930                 935                 940

Tyr Met Val Thr Gly Ala Gln Ser Ile Asn Gly Ala Asn Tyr Tyr Phe
945                 950                 955                 960

Leu Ser Asn Gly Ile Gln Leu Arg Asn Ala Ile Tyr Asp Asn Gly Asn
                965                 970                 975

Lys Val Leu Ser Tyr Tyr Gly Asn Asp Gly Arg Arg Tyr Glu Asn Gly
            980                 985                 990

Tyr Tyr Leu Phe Gly Gln Gln Trp  Arg Tyr Phe Gln Asn  Gly Ile Met
        995                 1000                1005

Ala Val  Gly Leu Thr Arg Val  His Gly Ala Val Gln  Tyr Phe Asp
    1010                1015                1020

Ala Ser  Gly Phe Gln Ala Lys  Gly Gln Phe Ile Thr  Thr Ala Asp
    1025                1030                1035

Gly Lys  Leu Arg Tyr Phe Asp  Arg Asp Ser Gly Asn  Gln Ile Ser
    1040                1045                1050

Asn Arg  Phe Val Arg Asn Ser  Lys Gly Glu Trp Phe  Leu Phe Asp
    1055                1060                1065

His Asn  Gly Val Ala Val Thr  Gly Thr Val Thr Phe  Asn Gly Gln
    1070                1075                1080

Arg Leu  Tyr Phe Lys Pro Asn  Gly Val Gln Ala Lys  Gly Glu Phe
    1085                1090                1095

Ile Arg  Asp Ala Asp Gly His  Leu Arg Tyr Tyr Asp  Pro Asn Ser
    1100                1105                1110

Gly Asn  Glu Val Arg Asn Arg  Phe Val Arg Asn Ser  Lys Gly Glu
    1115                1120                1125

Trp Phe  Leu Phe Asp His Asn  Gly Ile Ala Val Thr  Gly Thr Arg
    1130                1135                1140

Val Val  Asn Gly Gln Arg Leu  Tyr Phe Lys Ser Asn  Gly Val Gln
    1145                1150                1155

Ala Lys  Gly Glu Leu Ile Thr  Glu Arg Lys Gly Arg  Ile Lys Tyr
    1160                1165                1170

Tyr Asp  Pro Asn Ser Gly Asn  Glu Val Arg Asn Arg  Tyr Val Arg
    1175                1180                1185

Thr Ser  Ser Gly Asn Trp Tyr  Tyr Phe Gly Asn Asp  Gly Tyr Ala
    1190                1195                1200
```

Leu Ile Gly Trp His Val Val Glu Gly Arg Arg Val Tyr Phe Asp
1205 1210 1215

Glu Asn Gly Ile Tyr Arg Tyr Ala Ser His Asp Gln Arg Asn His
1220 1225 1230

Trp Asp Tyr Asp Tyr Arg Arg Asp Phe Gly Arg Gly Ser Ser Ser
1235 1240 1245

Ala Val Arg Phe Arg His Ser Arg Asn Gly Phe Phe Asp Asn Phe
1250 1255 1260

Phe Arg Phe
1265

<210> SEQ ID NO 33
<211> LENGTH: 3801
<212> TYPE: DNA
<213> ORGANISM: Streptococcus mutans

<400> SEQUENCE: 33
gtgaacggta aatattatta ttataaagaa gatggaactc ttcaaaagaa ttatgcttta 60
aacattaatg ggaaaacttt cttctttgat gaaacaggag cattatcaaa taatacttta 120
cctagtaaaa agggtaatat cactaataat gataacacta acagctttgc tcaatataat 180
caggtctata gtacagatgc tgcaaacttc gaacatgttg atcattattt gacagctgag 240
agttggtatc gtcctaaata catcttaaaa gatggcaaaa catggacaca gtcaacagaa 300
aaagatttcc gtcccttatt gatgacatgg tggcctgacc aagaaacgca gcgtcaatat 360
gttaactaca tgaatgcaca gcttggtatt catcaaacat acaatacagc aaccagtccg 420
cttcaattga atttagctgc tcagacaata caaactaaga tcgaagaaaa aatcactgca 480
gaaaagaata ccaattggct gcgtcagact atttccgcat ttgttaagac acagtcagct 540
tggaacagtg acagcgaaaa accgtttgat gatcacttac aaaaaggggc attgctttac 600
agtaacaata gcaagctaac ttcacaggct aattccaact accgtatctt aaatcgcacc 660
ccaaccaatc aaaccggaaa gaaagatcca aggtatacag ccgatcgcac tatcggcggt 720
tacgaatttc ttttggcaaa cgatgtggat aattctaatc ctgtcgtgca ggccgaacaa 780
ttgaactggc tccactttct catgaacttt ggtaacattt atgccaatga tccggatgct 840
aactttgatt ccattcgtgt tgatgcggtg gataatgtgg atgctgactt gctccaaatt 900
gctggggatt acctcaaagc cgctaagggg attcataaaa atgataaggc tgctaatgat 960
catttgtcta ttttagaggc atggagttat aatgatactc cttaccttca tgatgatggc 1020
gacaatatga ttaacatgga taacaggtta cgtctttcct tgctttattc attagctaaa 1080
cctttgaatc aacgttcagg catgaatcct ctgatcacta acagtttggt gaatcgaact 1140
gatgataatg ctgaaactgc cgcagtccct tcttattcct tcatccgtgc ccatgacagt 1200
gaagtgcagg acttgattcg caatattatt agagcagaaa tcaatcctaa tgttgtcggg 1260
tattcattca ctatggagga aatcaagaag gctttcgaga tttacaacaa agacttatta 1320
gctacagaga agaaatacac acactataat acggcacttt cttatgccct gcttttaacc 1380
aacaaatcca gtgtgccgcg tgtctattat ggggatatgt ttacagatga cgggcaatac 1440
atggctcata agacgatcaa ttacgaagcc atcgaaaccc tgcttaaagc tcgtattaag 1500
tatgtttcag gcggtcaagc catgcgcaat caacaggttg gcaattctga aatcattacg 1560
tctgtccgct atggtaaagg tgctttgaaa gcaacggata caggggaccg taccacacgg 1620
acttcaggag tggccgtgat tgaaggcaat aacccttctt tacgtttgaa ggcttctgat 1680

```
cgcgtggttg tcaatatggg agcagcccat aagaaccaag cataccgacc tttactcttg   1740
accacagata acggtatcaa ggcttatcat tccgatcaag aagcggctgg tttggtgcgc   1800
tacaccaatg acagagggga attgatcttc acagcggctg atattaaagg ctatgccaac   1860
cctcaagttt ctggctattt aggtgtttgg gttccagtag gcgctgccgc tgatcaagat   1920
gttcgcgttg cggcttcaac ggccccatca acagatggca agtctgtgca tcaaaatgcg   1980
gcccttgatt cacgcgtcat gtttgaaggt ttctctaatt tccaagcatt cgccactaaa   2040
aaagaggaat ataccaatgt tgtgattgct aagaatgtgg ataagtttgc ggaatggggg   2100
gtcacagatt ttgaaatggc accgcagtat gtgtcttcaa cagatggttc tttcttggat   2160
tctgtgatcc aaaacggcta tgcttttacg gaccgttatg atttgggaat ttccaaacct   2220
aataaatacg ggacagccga tgatttggtg aaagccatca aagcgttaca cagcaagggc   2280
attaaggtaa tggctgactg ggtgcctgat caaatgtatg ctctccctga aaaagaagtg   2340
gtaacagcaa cccgtgttga taagtatggg actcctgttg caggaagtca gatcaaaaac   2400
accctttatg tagttgatgg taagagttct ggtaaagatc aacaagccaa gtatggggga   2460
gctttcttag aggagctgca agcgaagtat ccggagcttt ttgcgagaaa acaaatttcc   2520
acaggggttc cgatggaccc ttcagttaag attaagcaat ggtctgccaa gtactttaat   2580
gggacaaata ttttagggcg cggagcaggc tatgtcttaa aagaccaggc aaccaatact   2640
tacttcagtc ttgtttcaga caacaccttc cttcctaaat cgttagttaa cccaaatcac   2700
ggaacaagca gttctgtaac tggattggta tttgatggta aaggttatgt ttattattca   2760
acgagtggta accaagctaa aaatgctttc attagcttag gaaataattg gtattatttc   2820
gataataacg gttatatggt cactggtgct caatcaatta acggtgctaa ttattatttc   2880
ttatcaaatg gtattcaatt aagaaatgct atttatgata atggtaataa agtattgtct   2940
tattatggaa atgatggacg tcgttatgaa aatggttact atctctttgg tcaacaatgg   3000
cgttatttcc aaaatggtat tatggctgtc ggcttaacac gtattcatgg tgctgttcaa   3060
tactttgatg cttctgggtt ccaagctaaa ggacagttta ttacaactgc tgatggaaag   3120
ctgcgttact ttgatagaga ctcaggaaat caaatttcaa atcgttttgt tagaaattcc   3180
aagggagaat ggttcttatt tgatcacaat ggtatcgctg taaccggtac tgtaacgttc   3240
aatggacaac gtctttactt taaacctaat ggtgttcaag ccaaaggaga atttatcaga   3300
gatacagatg gacatctaag atattatgat cctaattccg gaaatgaagt tcgtaatcgc   3360
tttgttagaa attccaaggg agaatggttc ttatttgatc acaatggtat cgctgtaact   3420
ggtgccagag ttgttaatgg acagcgcctc tattttaagt ctaatggtgt tcaggctaag   3480
ggagagctca ttacagagcg taaaggtcgt atcaaatact atgatcctaa ttccggaaat   3540
gaagttcgta atcgttatgt gagaacgtca tcaggaaact ggtactattt tggcaatgat   3600
ggctatgcct taattggttg gcatgttgtt gaaggaagac gtgtttactt tgatgaaaat   3660
ggtgtttatc gttattccag tcatgatcaa agaaaccact gggattatga ttacagaaga   3720
gactttggtc gtggcagcag tagtggtatt cgttttagac accctcgtaa tggattcttt   3780
gacaatttct ttagatttta a                                             3801
```

<210> SEQ ID NO 34
<211> LENGTH: 1266
<212> TYPE: PRT
<213> ORGANISM: Streptococcus mutans

<400> SEQUENCE: 34

```
Val Asn Gly Lys Tyr Tyr Tyr Tyr Lys Glu Asp Gly Thr Leu Gln Lys
1               5                   10                  15

Asn Tyr Ala Leu Asn Ile Asn Gly Lys Thr Phe Phe Phe Asp Glu Thr
            20                  25                  30

Gly Ala Leu Ser Asn Asn Thr Leu Pro Ser Lys Lys Gly Asn Ile Thr
        35                  40                  45

Asn Asn Asp Asn Thr Asn Ser Phe Ala Gln Tyr Asn Gln Val Tyr Ser
    50                  55                  60

Thr Asp Ala Ala Asn Phe Glu His Val Asp His Tyr Leu Thr Ala Glu
65                  70                  75                  80

Ser Trp Tyr Arg Pro Lys Tyr Ile Leu Lys Asp Gly Lys Thr Trp Thr
                85                  90                  95

Gln Ser Thr Glu Lys Asp Phe Arg Pro Leu Leu Met Thr Trp Trp Pro
            100                 105                 110

Asp Gln Glu Thr Gln Arg Gln Tyr Val Asn Tyr Met Asn Ala Gln Leu
        115                 120                 125

Gly Ile His Gln Thr Tyr Asn Thr Ala Thr Ser Pro Leu Gln Leu Asn
    130                 135                 140

Leu Ala Ala Gln Thr Ile Gln Thr Lys Ile Glu Glu Lys Ile Thr Ala
145                 150                 155                 160

Glu Lys Asn Thr Asn Trp Leu Arg Gln Thr Ile Ser Ala Phe Val Lys
                165                 170                 175

Thr Gln Ser Ala Trp Asn Ser Asp Ser Glu Lys Pro Phe Asp Asp His
            180                 185                 190

Leu Gln Lys Gly Ala Leu Leu Tyr Ser Asn Asn Ser Lys Leu Thr Ser
        195                 200                 205

Gln Ala Asn Ser Asn Tyr Arg Ile Leu Asn Arg Thr Pro Thr Asn Gln
    210                 215                 220

Thr Gly Lys Lys Asp Pro Arg Tyr Thr Ala Asp Arg Thr Ile Gly Gly
225                 230                 235                 240

Tyr Glu Phe Leu Leu Ala Asn Asp Val Asp Asn Ser Asn Pro Val Val
                245                 250                 255

Gln Ala Glu Gln Leu Asn Trp Leu His Phe Leu Met Asn Phe Gly Asn
            260                 265                 270

Ile Tyr Ala Asn Asp Pro Asp Ala Asn Phe Asp Ser Ile Arg Val Asp
        275                 280                 285

Ala Val Asp Asn Val Asp Ala Asp Leu Leu Gln Ile Ala Gly Asp Tyr
    290                 295                 300

Leu Lys Ala Ala Lys Gly Ile His Lys Asn Asp Lys Ala Ala Asn Asp
305                 310                 315                 320

His Leu Ser Ile Leu Glu Ala Trp Ser Tyr Asn Asp Thr Pro Tyr Leu
                325                 330                 335

His Asp Asp Gly Asp Asn Met Ile Asn Met Asp Asn Arg Leu Arg Leu
            340                 345                 350

Ser Leu Leu Tyr Ser Leu Ala Lys Pro Leu Asn Gln Arg Ser Gly Met
        355                 360                 365

Asn Pro Leu Ile Thr Asn Ser Leu Val Asn Arg Thr Asp Asp Asn Ala
    370                 375                 380

Glu Thr Ala Ala Val Pro Ser Tyr Ser Phe Ile Arg Ala His Asp Ser
385                 390                 395                 400

Glu Val Gln Asp Leu Ile Arg Asn Ile Ile Arg Ala Glu Ile Asn Pro
                405                 410                 415
```

```
Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495

Ala Arg Ile Lys Tyr Val Ser Gly Gly Gln Ala Met Arg Asn Gln Gln
            500                 505                 510

Val Gly Asn Ser Glu Ile Ile Thr Ser Val Arg Tyr Gly Lys Gly Ala
        515                 520                 525

Leu Lys Ala Thr Asp Thr Gly Asp Arg Thr Thr Arg Thr Ser Gly Val
    530                 535                 540

Ala Val Ile Glu Gly Asn Asn Pro Ser Leu Arg Leu Lys Ala Ser Asp
545                 550                 555                 560

Arg Val Val Val Asn Met Gly Ala Ala His Lys Asn Gln Ala Tyr Arg
                565                 570                 575

Pro Leu Leu Leu Thr Thr Asp Asn Gly Ile Lys Ala Tyr His Ser Asp
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655

His Gln Asn Ala Ala Leu Asp Ser Arg Val Met Phe Glu Gly Phe Ser
            660                 665                 670

Asn Phe Gln Ala Phe Ala Thr Lys Lys Glu Glu Tyr Thr Asn Val Val
        675                 680                 685

Ile Ala Lys Asn Val Asp Lys Phe Ala Glu Trp Gly Val Thr Asp Phe
    690                 695                 700

Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750

Ile Lys Ala Leu His Ser Lys Gly Ile Lys Val Met Ala Asp Trp Val
        755                 760                 765

Pro Asp Gln Met Tyr Ala Leu Pro Glu Lys Glu Val Val Thr Ala Thr
    770                 775                 780

Arg Val Asp Lys Tyr Gly Thr Pro Val Ala Gly Ser Gln Ile Lys Asn
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830
```

```
Leu Phe Ala Arg Lys Gln Ile Ser Thr Gly Val Pro Met Asp Pro Ser
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880

Tyr Phe Ser Leu Val Ser Asp Asn Thr Phe Leu Pro Lys Ser Leu Val
                885                 890                 895

Asn Pro Asn His Gly Thr Ser Ser Ser Val Thr Gly Leu Val Phe Asp
            900                 905                 910

Gly Lys Gly Tyr Val Tyr Tyr Ser Thr Ser Gly Asn Gln Ala Lys Asn
        915                 920                 925

Ala Phe Ile Ser Leu Gly Asn Asn Trp Tyr Tyr Phe Asp Asn Asn Gly
    930                 935                 940

Tyr Met Val Thr Gly Ala Gln Ser Ile Asn Gly Ala Asn Tyr Tyr Phe
945                 950                 955                 960

Leu Ser Asn Gly Ile Gln Leu Arg Asn Ala Ile Tyr Asp Asn Gly Asn
                965                 970                 975

Lys Val Leu Ser Tyr Tyr Gly Asn Asp Gly Arg Arg Tyr Glu Asn Gly
            980                 985                 990

Tyr Tyr Leu Phe Gly Gln Gln Trp  Arg Tyr Phe Gln Asn  Gly Ile Met
        995                 1000                 1005

Ala Val  Gly Leu Thr Arg Ile  His Gly Ala Val Gln  Tyr Phe Asp
    1010                 1015                 1020

Ala Ser  Gly Phe Gln Ala Lys  Gly Gln Phe Ile Thr  Thr Ala Asp
    1025                 1030                 1035

Gly Lys  Leu Arg Tyr Phe Asp  Arg Asp Ser Gly Asn  Gln Ile Ser
    1040                 1045                 1050

Asn Arg  Phe Val Arg Asn Ser  Lys Gly Glu Trp Phe  Leu Phe Asp
    1055                 1060                 1065

His Asn  Gly Ile Ala Val Thr  Gly Thr Val Thr Phe  Asn Gly Gln
    1070                 1075                 1080

Arg Leu  Tyr Phe Lys Pro Asn  Gly Val Gln Ala Lys  Gly Glu Phe
    1085                 1090                 1095

Ile Arg  Asp Thr Asp Gly His  Leu Arg Tyr Tyr Asp  Pro Asn Ser
    1100                 1105                 1110

Gly Asn  Glu Val Arg Asn Arg  Phe Val Arg Asn Ser  Lys Gly Glu
    1115                 1120                 1125

Trp Phe  Leu Phe Asp His Asn  Gly Ile Ala Val Thr  Gly Ala Arg
    1130                 1135                 1140

Val Val  Asn Gly Gln Arg Leu  Tyr Phe Lys Ser Asn  Gly Val Gln
    1145                 1150                 1155

Ala Lys  Gly Glu Leu Ile Thr  Glu Arg Lys Gly Arg  Ile Lys Tyr
    1160                 1165                 1170

Tyr Asp  Pro Asn Ser Gly Asn  Glu Val Arg Asn Arg  Tyr Val Arg
    1175                 1180                 1185

Thr Ser  Ser Gly Asn Trp Tyr  Tyr Phe Gly Asn Asp  Gly Tyr Ala
    1190                 1195                 1200

Leu Ile  Gly Trp His Val Val  Glu Gly Arg Arg Val  Tyr Phe Asp
    1205                 1210                 1215

Glu Asn  Gly Val Tyr Arg Tyr  Ser Ser His Asp Gln  Arg Asn His
    1220                 1225                 1230

Trp Asp  Tyr Asp Tyr Arg Arg  Asp Phe Gly Arg Gly  Ser Ser Ser
```

```
    1235                1240                1245

Gly Ile  Arg Phe Arg His Pro  Arg Asn Gly Phe Phe  Asp Asn Phe
    1250                1255                1260

Phe Arg  Phe
    1265
```

<210> SEQ ID NO 35
<211> LENGTH: 3801
<212> TYPE: DNA
<213> ORGANISM: Streptococcus mutans

<400> SEQUENCE: 35

```
gtgaacggta aatattatta ttataaagaa gatggaactc ttcaaaagaa ttatgcttta     60
aacattaatg ggaaaacttt cttctttgat gaaacaggag cattatcaaa taatacttta    120
cctagtaaaa agggtaatat cactaataat gataacacta acagctttgc tcaatataat    180
caggtctata gtacagatgc tgcaaacttc gaacatgttg atcattattt gacagctgag    240
agttggtatc gtcctaagta cgtcttgaag aatggtaaaa catggacaca gtcaacagaa    300
aaagattttc gtcccttact gatgacatgg tggcctgacc aagaaacgca gcgtcaatat    360
gttaactaca tgaatggaca gcttggtatt catcaaacat acaatacagc aacttcaccg    420
cttcaattga atttagctgc tcagacaata caaactaaga tcgaagaaaa aatcactgca    480
gaaaagaata ccaattggct gcgtcagact atttccgcat ttgttaagac acagtcagct    540
tggaacagtg acagcgaaaa accgtttgat gatcacttac aaaaaggggc attgctttac    600
agtaataata gcaaactaac ttcacaggct aattccaact accgtatctt aaatcgcacc    660
ccgaccaatc aaactgggaa gaaggaccca aggtatacag ctgatcgcac cattggcggt    720
tacgaatttt tgttagccaa tgatgtggat aattctaatc ctgtcgtgca ggccgaacag    780
ctgaactggc tccactttct tatgaacttt ggtaacattt atgccaatga tccggatgct    840
aactttgatt ccattcgtgt tgatgcggtg gataatgtgg atgctgactt actccaaatt    900
gctggggatt acctcaaagc tgctaagggg attcataaaa atgataaggc tgctaatgat    960
catttatcta ttttagaggc atggagtgac aacgacactc cttaccttca tgatgatggc   1020
gacaatatga ttaacatgga taacaggtta cgtctttcct tgctttattc attagctaaa   1080
cccttaaatc aacgttcagg catgaatcct ctgatcacta acagtctggt gaatcgaact   1140
gatgataatg ctgaaactgc cgcagtccct tcttattcct acatccgtgc ccatgacagt   1200
gaagtgcagg acttgattcg caatattatt agagcagaaa tcaatcctaa tgttgtcggg   1260
tattctttca ctatggagga aatcaagaag gctttcgaga tttacaacaa agacttatta   1320
gctacagaga agaaatacac acactataat acggcacttt cttatgccct gcttttaacc   1380
aacaaatcca gtgtgccgcg tgtctattat ggggatatgt tcacagatga cgggcaatac   1440
atggctcata agacgatcaa ttacgaagcc atcgaaaccc ttttaaaggc tcgtattaag   1500
tatgtttcag gcggtcaagc catgcgcaat caacaggttg gcaattctga aatcattacg   1560
tctgtccgct atggtaaagg tgctttgaaa gcaacggata caggggaccg caccacacgg   1620
acttcaggag tggccgtgat tgaaggcaat aacccttctt tacgtttgaa ggcttctgat   1680
cgcgtggttg tcaatatggg agcagcccat aagaaccaag cataccgacc tttactcttg   1740
accacagata acggtatcaa ggcttatcat tccgatcaag aagcggctgg tttggtgcgc   1800
tacaccaatg acagagggga attgatcttc acagcggctg atattaaagg ctatgccaac   1860
cctcaagttt ctggctattt aggtgtttgg gttccagtag gcgctgccgc tgatcaagat   1920
```

gttcgcgttg cggctagtac ggccccatca acagatggca agtctgtgca tcaaaatgcg 1980
gcccttgatt cacgcgtcat gtttgaaggt ttctctaatt tccaagcatt cgccactaaa 2040
aaagaggaat ataccaatgt tgtgattgct aagaatgtgg ataagtttgc ggaatggggt 2100
gtcacagact ttgaaatggc accgcagtat gtgtcttcaa cggatggttc tttcttggat 2160
tctgtgatcc aaaacggcta tgcttttacg gaccgttatg atttgggaat ttccaaacct 2220
aataaatacg ggacagccga tgatttggtg aaagcaatca aagcgttaca cagcaagggc 2280
attaaggtaa tggctgactg ggtacctgat caaatgtatg ctttccctga aaaagaagtg 2340
gtaacagcaa cccgtgttga taagtatggg actcctgttg caggaagtca gatcaaaaac 2400
accctttatg tagttgatgg taagagttct ggtaaagatc aacaagccaa gtatgggga 2460 gctttcttag aggaactgca agctaagtat ccggagcttt ttgcgagaaa gcaaatttcc 2520
acaggggttc cgatggaccc ttcagttaag attaagcaat ggtctgccaa gtactttaat 2580
gggacaaata ttttagggcg cggagcaggc tatgtcttaa aagatcaggc aaccaatact 2640
tacttcagtc ttgtttcaga caacaccttc cttcctaaat cgttagttaa cccaaatcac 2700
ggaacaagca gttctgtaac tggatttgta tttgatggta aaggttatgt ttattattca 2760
acgagtggtt accaagccaa aaatgctttc atcagcgaag gtgataaatg gtattatttt 2820
gataataacg gttatatggt cactggtgct caatcaatta acggtgctaa ttattatttc 2880
ttatcaaatg gtattcaatt aagaaatgct atttatgata atggtaataa agtattgtct 2940
tattatggaa atgatggccg tcgttatgaa aatggttact atctctttgg tcaacaatgg 3000
cgttatttcc aaaatggtat tatggctgtc ggcttaacac gtgttcatgg tgctgttcaa 3060
tactttgatg cttctggctt ccaagctaaa ggacagttta ttacaactgc tgatggaaag 3120
ctgcgttact ttgatagaga ctcaggaaat caaatttcaa atcgttttgt tagaaattcc 3180
aagggagaat ggttcttatt tgatcacaat ggtgtcgctg taaccggtac tgtaacgttc 3240
aatagacaac gtctttactt taaacctaat ggtgttcaag ccaaaggaga atttatcaga 3300
gatgcagatg gacatctaag atattatgat cctaattccg gaaatgaagt tcgtaatcgc 3360
tttgttagaa attccaaggg agaatggttc ttatttgatc acaatggtat cgctgtaact 3420
ggtgccagag ttgttaatgg acagcgcctc tattttaagt ctaatggtgt tcaggctaag 3480
ggagagctca ttacagagcg taaaggtcgt atcaaatact atgatcctaa ttccggaaat 3540
gaagttcgta atcgttatgt gagaacatca tcaggaaact ggtactattt tggcaatgat 3600
ggctatgcct taattggttg gcatgttgtt gaaggaagac gtgtttactt tgatgaaaat 3660
ggtgtttatc gttatgccag tcatgatcaa agaaaccact ggaattatga ttacagaaga 3720
gactttggtc gtggcagcag tagtgctatt cgttttagac actctcgtaa tggattcttt 3780
gacaatttct ttagatttta a 3801

<210> SEQ ID NO 36
<211> LENGTH: 1266
<212> TYPE: PRT
<213> ORGANISM: Streptococcus mutans

<400> SEQUENCE: 36

Val Asn Gly Lys Tyr Tyr Tyr Tyr Lys Glu Asp Gly Thr Leu Gln Lys
1 5 10 15

Asn Tyr Ala Leu Asn Ile Asn Gly Lys Thr Phe Phe Phe Asp Glu Thr
20 25 30

```
Gly Ala Leu Ser Asn Asn Thr Leu Pro Ser Lys Lys Gly Asn Ile Thr
        35                  40                  45

Asn Asn Asp Asn Thr Asn Ser Phe Ala Gln Tyr Asn Gln Val Tyr Ser
    50                  55                  60

Thr Asp Ala Ala Asn Phe Glu His Val Asp His Tyr Leu Thr Ala Glu
65                  70                  75                  80

Ser Trp Tyr Arg Pro Lys Tyr Val Leu Lys Asn Gly Lys Thr Trp Thr
                85                  90                  95

Gln Ser Thr Glu Lys Asp Phe Arg Pro Leu Leu Met Thr Trp Trp Pro
            100                 105                 110

Asp Gln Glu Thr Gln Arg Gln Tyr Val Asn Tyr Met Asn Gly Gln Leu
        115                 120                 125

Gly Ile His Gln Thr Tyr Asn Thr Ala Thr Ser Pro Leu Gln Leu Asn
    130                 135                 140

Leu Ala Ala Gln Thr Ile Gln Thr Lys Ile Glu Glu Lys Ile Thr Ala
145                 150                 155                 160

Glu Lys Asn Thr Asn Trp Leu Arg Gln Thr Ile Ser Ala Phe Val Lys
                165                 170                 175

Thr Gln Ser Ala Trp Asn Ser Asp Ser Glu Lys Pro Phe Asp Asp His
            180                 185                 190

Leu Gln Lys Gly Ala Leu Leu Tyr Ser Asn Asn Ser Lys Leu Thr Ser
        195                 200                 205

Gln Ala Asn Ser Asn Tyr Arg Ile Leu Asn Arg Thr Pro Thr Asn Gln
    210                 215                 220

Thr Gly Lys Lys Asp Pro Arg Tyr Thr Ala Asp Arg Thr Ile Gly Gly
225                 230                 235                 240

Tyr Glu Phe Leu Leu Ala Asn Asp Val Asp Asn Ser Asn Pro Val Val
                245                 250                 255

Gln Ala Glu Gln Leu Asn Trp Leu His Phe Leu Met Asn Phe Gly Asn
            260                 265                 270

Ile Tyr Ala Asn Asp Pro Asp Ala Asn Phe Asp Ser Ile Arg Val Asp
        275                 280                 285

Ala Val Asp Asn Val Asp Ala Asp Leu Leu Gln Ile Ala Gly Asp Tyr
    290                 295                 300

Leu Lys Ala Ala Lys Gly Ile His Lys Asn Asp Lys Ala Ala Asn Asp
305                 310                 315                 320

His Leu Ser Ile Leu Glu Ala Trp Ser Asp Asn Asp Thr Pro Tyr Leu
                325                 330                 335

His Asp Asp Gly Asp Asn Met Ile Asn Met Asp Asn Arg Leu Arg Leu
            340                 345                 350

Ser Leu Leu Tyr Ser Leu Ala Lys Pro Leu Asn Gln Arg Ser Gly Met
        355                 360                 365

Asn Pro Leu Ile Thr Asn Ser Leu Val Asn Arg Thr Asp Asp Asn Ala
    370                 375                 380

Glu Thr Ala Ala Val Pro Ser Tyr Ser Tyr Ile Arg Ala His Asp Ser
385                 390                 395                 400

Glu Val Gln Asp Leu Ile Arg Asn Ile Ile Arg Ala Glu Ile Asn Pro
                405                 410                 415

Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
```

```
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495

Ala Arg Ile Lys Tyr Val Ser Gly Gly Gln Ala Met Arg Asn Gln Gln
            500                 505                 510

Val Gly Asn Ser Glu Ile Ile Thr Ser Val Arg Tyr Gly Lys Gly Ala
        515                 520                 525

Leu Lys Ala Thr Asp Thr Gly Asp Arg Thr Thr Arg Thr Ser Gly Val
    530                 535                 540

Ala Val Ile Glu Gly Asn Asn Pro Ser Leu Arg Leu Lys Ala Ser Asp
545                 550                 555                 560

Arg Val Val Val Asn Met Gly Ala Ala His Lys Asn Gln Ala Tyr Arg
                565                 570                 575

Pro Leu Leu Leu Thr Thr Asp Asn Gly Ile Lys Ala Tyr His Ser Asp
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655

His Gln Asn Ala Ala Leu Asp Ser Arg Val Met Phe Glu Gly Phe Ser
            660                 665                 670

Asn Phe Gln Ala Phe Ala Thr Lys Lys Glu Glu Tyr Thr Asn Val Val
        675                 680                 685

Ile Ala Lys Asn Val Asp Lys Phe Ala Glu Trp Gly Val Thr Asp Phe
    690                 695                 700

Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750

Ile Lys Ala Leu His Ser Lys Gly Ile Lys Val Met Ala Asp Trp Val
        755                 760                 765

Pro Asp Gln Met Tyr Ala Phe Pro Glu Lys Glu Val Val Thr Ala Thr
    770                 775                 780

Arg Val Asp Lys Tyr Gly Thr Pro Val Ala Gly Ser Gln Ile Lys Asn
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830

Leu Phe Ala Arg Lys Gln Ile Ser Thr Gly Val Pro Met Asp Pro Ser
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880
```

```
Tyr Phe Ser Leu Val Ser Asp Asn Thr Phe Leu Pro Lys Ser Leu Val
                885                 890                 895

Asn Pro Asn His Gly Thr Ser Ser Ser Val Thr Gly Phe Val Phe Asp
            900                 905                 910

Gly Lys Gly Tyr Val Tyr Tyr Ser Thr Ser Gly Tyr Gln Ala Lys Asn
        915                 920                 925

Ala Phe Ile Ser Glu Gly Asp Lys Trp Tyr Tyr Phe Asp Asn Asn Gly
    930                 935                 940

Tyr Met Val Thr Gly Ala Gln Ser Ile Asn Gly Ala Asn Tyr Tyr Phe
945                 950                 955                 960

Leu Ser Asn Gly Ile Gln Leu Arg Asn Ala Ile Tyr Asp Asn Gly Asn
                965                 970                 975

Lys Val Leu Ser Tyr Tyr Gly Asn Asp Gly Arg Arg Tyr Glu Asn Gly
            980                 985                 990

Tyr Tyr Leu Phe Gly Gln Gln Trp  Arg Tyr Phe Gln Asn  Gly Ile Met
        995                 1000                1005

Ala Val  Gly Leu Thr Arg Val  His Gly Ala Val Gln  Tyr Phe Asp
    1010                 1015                 1020

Ala Ser  Gly Phe Gln Ala Lys  Gly Gln Phe Ile Thr  Thr Ala Asp
    1025                 1030                 1035

Gly Lys  Leu Arg Tyr Phe Asp  Arg Asp Ser Gly Asn  Gln Ile Ser
    1040                 1045                 1050

Asn Arg  Phe Val Arg Asn Ser  Lys Gly Glu Trp Phe  Leu Phe Asp
    1055                 1060                 1065

His Asn  Gly Val Ala Val Thr  Gly Thr Val Thr Phe  Asn Arg Gln
    1070                 1075                 1080

Arg Leu  Tyr Phe Lys Pro Asn  Gly Val Gln Ala Lys  Gly Glu Phe
    1085                 1090                 1095

Ile Arg  Asp Ala Asp Gly His  Leu Arg Tyr Tyr Asp  Pro Asn Ser
    1100                 1105                 1110

Gly Asn  Glu Val Arg Asn Arg  Phe Val Arg Asn Ser  Lys Gly Glu
    1115                 1120                 1125

Trp Phe  Leu Phe Asp His Asn  Gly Ile Ala Val Thr  Gly Ala Arg
    1130                 1135                 1140

Val Val  Asn Gly Gln Arg Leu  Tyr Phe Lys Ser Asn  Gly Val Gln
    1145                 1150                 1155

Ala Lys  Gly Glu Leu Ile Thr  Glu Arg Lys Gly Arg  Ile Lys Tyr
    1160                 1165                 1170

Tyr Asp  Pro Asn Ser Gly Asn  Glu Val Arg Asn Arg  Tyr Val Arg
    1175                 1180                 1185

Thr Ser  Ser Gly Asn Trp Tyr  Tyr Phe Gly Asn Asp  Gly Tyr Ala
    1190                 1195                 1200

Leu Ile  Gly Trp His Val Val  Glu Gly Arg Arg Val  Tyr Phe Asp
    1205                 1210                 1215

Glu Asn  Gly Val Tyr Arg Tyr  Ala Ser His Asp Gln  Arg Asn His
    1220                 1225                 1230

Trp Asn  Tyr Asp Tyr Arg Arg  Asp Phe Gly Arg Gly  Ser Ser Ser
    1235                 1240                 1245

Ala Ile  Arg Phe Arg His Ser  Arg Asn Gly Phe Phe  Asp Asn Phe
    1250                 1255                 1260

Phe Arg  Phe
    1265
```

<210> SEQ ID NO 37
<211> LENGTH: 3801
<212> TYPE: DNA
<213> ORGANISM: Streptococcus mutans

<400> SEQUENCE: 37
gtgaacggta aatattatta ttataaagaa gatggaactc ttcaaaagaa ttatgcttta 60
aatattaatg ggaaaacttt cttctttgat gaaacaggag cattatcaaa taatacttta 120
cctagtaaaa agggtaatat cactaataat gataacacta acagctttgc tcaatataat 180
caggtctata gtacagatgc tgcaaacttc gaacatgttg atcattattt gacagctgag 240
agttggtatc gtcctaagta catcttgaag gatggtaaaa catggacaca gtcaacagaa 300
aaagatttcc gtcccttatt gatgacatgg tggcctgacc aagaaacgca gcgtcaatat 360
gttaactaca tgaatgcaca gcttggtatt catcaaacat acaatacagc aaccagtccg 420
cttcaattga atttagctgc tcagacaata caaactaaga tcgaagaaaa aatcactgca 480
gaaaagaata ccaattggct gcgtcagact atttccgcat ttgttaagac acagtcagct 540
tggaacagtg acagcgaaaa accatttgat gatcacttac aaaaaggggc attgctttac 600
agtaataata gcaaactaac ttcacaggct aattccaact accgtatctt aaatcgcacc 660
ccgaccaatc aaactgggaa gaaggaccca agatatacag ctgataacac tatcggcggt 720
tacgaatttc ttttggcaaa cgatgtggat aattccaatc ctgtcgtgca ggccgaacaa 780
ttgaactggc tccactttct catgaacttt ggcaacattt atgccaatga tccggatgct 840
aactttgatt ccattcgtgt tgatgcggtg gataatgtgg atgctgactt gctccaaatt 900
gctggggatt acctcaaagc tgctaagggg attcataaaa atgataaggc tgctaatgat 960
catttgtcta ttttagaggc atggagtgac aacgacactc cttaccttca tgatgatggc 1020
gacaatatga ttaatatgga caataagctg cgtttgtctc tattattttc attagctaaa 1080
cctttaaatc aacgttcagg catgaatcct ctgatcacta acagtttggt gaatcgaact 1140
gatgataatg ctgaaactgc cgcagtccct tcttattcct tcatccgtgc ccatgacagt 1200
gaagtgcagg atttgattcg tgatatcatc aaggcagaaa tcaatcctaa tgttgtcggg 1260
tattcattca ctatggagga aatcaagaag gctttcgaga tttacaacaa agacttatta 1320
gctacagaga agaaatacac acactataat acggcacttt cttatgccct gcttttaacc 1380
aacaaatcca gtgtgccgcg tgtctattat ggggatatgt ttacagatga cgggcaatac 1440
atggctcata agacgatcaa ttacgaagcc atcgaaaccc tgcttaaagc tcgtattaag 1500
tatgtttcag gcggtcaagc catgcgcaat caacaggttg gcaattctga aattattacg 1560
tctgtccgct atggtaaagg tgctttgaaa gcaacggata caggggaccg caccacacga 1620
acttcaggag tggccgtgat tgaaggcaat aacccttctt tacgtttgaa ggcttctgat 1680
cgcgtggttg tcaatatggg agcagcccat aagaaccaag cataccgacc tttactcttg 1740
accacagata acggtatcaa ggcttatcat tccgatcaag aagcggctgg tttggtgcgc 1800
tacaccaatg acagagggga attgatcttc acagcggctg atattaaagg ctatgccaac 1860
cctcaagttt ctggctattt aggtgtttgg gttccagtag gcgctgccgc tgatcaagat 1920
gttcgcgttg cggcttcaac ggccccatca acagatggca agtctgtgca tcaaaatgcg 1980
gcccttgatt cacgcgtcat gtttgaaggt ttctctaatt tccaagcatt cgccactaaa 2040
aaagaggaat ataccaatgt tgtgattgct aagaatgtgg ataagtttgc ggaatggggt 2100
gtcacagatt ttgaaatggc accgcagtat gtgtcttcaa cagatggttc tttcttggat 2160

```
tctgtgatcc aaaacggcta tgcttttacg gaccgttatg acttaggaat ttccaaacct   2220

aataaatacg ggacagccga tgatttggtg aaagccatca aagcgttaca cagcaagggc   2280

attaaggtaa tggctgactg ggtgcctgat caaatgtatg ctctccctga aaaagaagtg   2340

gtaacagcaa cccgtgttga taagtatggg actcctgttg caggaagtca gatcaaaaac   2400

accctttatg tagttgatgg taagagttct ggtaaagatc aacaagccaa gtatggggga   2460

gctttcttag aggagctgca agctaaatat ccggagcttt ttgcgagaaa acaaatttcc   2520

acaggggttc cgatggaccc ttcagttaag attaagcaat ggtctgccaa gtactttaat   2580

gggacaaata ttttagggcg cggagcaggc tatgtcttaa aagatcaggc aaccaatact   2640

tacttcagtc ttgtttcaga caacaccttc cttcctaaat cgttagttaa cccaaatcac   2700

ggaacaagca gttctgtaac tggattggta tttgatggta aaggttatgt ttattattca   2760

acgagtggta accaagctaa aaatgctttc attagcttag gaaataattg gtattatttc   2820

gataataacg gttatatggt cactggtgct caatcaatta acggtgctaa ttattatttc   2880

ttatcaaatg gtattcaatt aagaaatgct atttatgata atggtaataa agtattgtct   2940

tattatggaa atgatggccg tcgttatgaa aatggttact atctctttgg tcaacaatgg   3000

cgttatttcc aaaatggtat tatggctgtc ggcttaacac gtattcatgg tgctgttcaa   3060

tactttgatg cttctgggtt ccaagctaaa ggacagttta ttacaactgc tgatggaaag   3120

ctgcgttact ttgatagaga ctcaggaaat caaatttcaa atcgttttgt tagaaattcc   3180

aagggagaat ggttcttatt tgatcacaat ggtgtcgctg taaccggtac tgtaacgttc   3240

aatggacaac gtctttactt taaacctaat ggtgttcaag ccaaaggaga atttatcaga   3300

gatgcagatg gacatctaag atattatgat cctaattccg gaaatgaagt tcgtaatcgc   3360

tttgttagaa attccaaggg agaatggttc ttatttgatc acaatggtat cgctgtaact   3420

ggtaccagag ttgttaatgg acagcgcctc tattttaagt ctaatggtgt tcaggctaag   3480

ggagagctca ttacagagcg taaaggtcgt atcaaatact atgatcctaa ttccggaaat   3540

gaagttcgta atcgttatgt gagaacgtca tcaggaaact ggtactattt tggcaatgat   3600

ggctatgcct taattggttg gcatgttgtt gaaggaagac gtgtttactt tgatgaaaat   3660

ggtgtttatc gttatgccag tcatgatcaa agaaaccact gggattatga ttacagaaga   3720

gactttggtc gtggcagcag cagtgctgtt cgttttagac actctcgtaa tggattcttt   3780

gacaatttct ttagatttta a                                            3801
```

<210> SEQ ID NO 38
<211> LENGTH: 1266
<212> TYPE: PRT
<213> ORGANISM: Streptococcus mutans

<400> SEQUENCE: 38

```
Val Asn Gly Lys Tyr Tyr Tyr Tyr Lys Glu Asp Gly Thr Leu Gln Lys
1               5                   10                  15

Asn Tyr Ala Leu Asn Ile Asn Gly Lys Thr Phe Phe Phe Asp Glu Thr
            20                  25                  30

Gly Ala Leu Ser Asn Asn Thr Leu Pro Ser Lys Lys Gly Asn Ile Thr
        35                  40                  45

Asn Asn Asp Asn Thr Asn Ser Phe Ala Gln Tyr Asn Gln Val Tyr Ser
    50                  55                  60

Thr Asp Ala Ala Asn Phe Glu His Val Asp His Tyr Leu Thr Ala Glu
65                  70                  75                  80
```

```
Ser Trp Tyr Arg Pro Lys Tyr Ile Leu Lys Asp Gly Lys Thr Trp Thr
                85                  90                  95

Gln Ser Thr Glu Lys Asp Phe Arg Pro Leu Leu Met Thr Trp Trp Pro
            100                 105                 110

Asp Gln Glu Thr Gln Arg Gln Tyr Val Asn Tyr Met Asn Ala Gln Leu
        115                 120                 125

Gly Ile His Gln Thr Tyr Asn Thr Ala Thr Ser Pro Leu Gln Leu Asn
    130                 135                 140

Leu Ala Ala Gln Thr Ile Gln Thr Lys Ile Glu Glu Lys Ile Thr Ala
145                 150                 155                 160

Glu Lys Asn Thr Asn Trp Leu Arg Gln Thr Ile Ser Ala Phe Val Lys
                165                 170                 175

Thr Gln Ser Ala Trp Asn Ser Asp Ser Glu Lys Pro Phe Asp Asp His
            180                 185                 190

Leu Gln Lys Gly Ala Leu Leu Tyr Ser Asn Asn Ser Lys Leu Thr Ser
        195                 200                 205

Gln Ala Asn Ser Asn Tyr Arg Ile Leu Asn Arg Thr Pro Thr Asn Gln
    210                 215                 220

Thr Gly Lys Lys Asp Pro Arg Tyr Thr Ala Asp Asn Thr Ile Gly Gly
225                 230                 235                 240

Tyr Glu Phe Leu Leu Ala Asn Asp Val Asp Asn Ser Asn Pro Val Val
                245                 250                 255

Gln Ala Glu Gln Leu Asn Trp Leu His Phe Leu Met Asn Phe Gly Asn
            260                 265                 270

Ile Tyr Ala Asn Asp Pro Asp Ala Asn Phe Asp Ser Ile Arg Val Asp
        275                 280                 285

Ala Val Asp Asn Val Asp Ala Asp Leu Leu Gln Ile Ala Gly Asp Tyr
    290                 295                 300

Leu Lys Ala Ala Lys Gly Ile His Lys Asn Asp Lys Ala Ala Asn Asp
305                 310                 315                 320

His Leu Ser Ile Leu Glu Ala Trp Ser Asp Asn Asp Thr Pro Tyr Leu
                325                 330                 335

His Asp Asp Gly Asp Asn Met Ile Asn Met Asp Asn Lys Leu Arg Leu
            340                 345                 350

Ser Leu Leu Phe Ser Leu Ala Lys Pro Leu Asn Gln Arg Ser Gly Met
        355                 360                 365

Asn Pro Leu Ile Thr Asn Ser Leu Val Asn Arg Thr Asp Asp Asn Ala
    370                 375                 380

Glu Thr Ala Ala Val Pro Ser Tyr Ser Phe Ile Arg Ala His Asp Ser
385                 390                 395                 400

Glu Val Gln Asp Leu Ile Arg Asp Ile Ile Lys Ala Glu Ile Asn Pro
                405                 410                 415

Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495
```

```
Ala Arg Ile Lys Tyr Val Ser Gly Gly Gln Ala Met Arg Asn Gln Gln
            500                 505                 510

Val Gly Asn Ser Glu Ile Ile Thr Ser Val Arg Tyr Gly Lys Gly Ala
        515                 520                 525

Leu Lys Ala Thr Asp Thr Gly Asp Arg Thr Thr Arg Thr Ser Gly Val
    530                 535                 540

Ala Val Ile Glu Gly Asn Asn Pro Ser Leu Arg Leu Lys Ala Ser Asp
545                 550                 555                 560

Arg Val Val Val Asn Met Gly Ala Ala His Lys Asn Gln Ala Tyr Arg
                565                 570                 575

Pro Leu Leu Leu Thr Thr Asp Asn Gly Ile Lys Ala Tyr His Ser Asp
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655

His Gln Asn Ala Ala Leu Asp Ser Arg Val Met Phe Glu Gly Phe Ser
            660                 665                 670

Asn Phe Gln Ala Phe Ala Thr Lys Lys Glu Glu Tyr Thr Asn Val Val
        675                 680                 685

Ile Ala Lys Asn Val Asp Lys Phe Ala Glu Trp Gly Val Thr Asp Phe
    690                 695                 700

Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750

Ile Lys Ala Leu His Ser Lys Gly Ile Lys Val Met Ala Asp Trp Val
        755                 760                 765

Pro Asp Gln Met Tyr Ala Leu Pro Glu Lys Glu Val Val Thr Ala Thr
    770                 775                 780

Arg Val Asp Lys Tyr Gly Thr Pro Val Ala Gly Ser Gln Ile Lys Asn
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830

Leu Phe Ala Arg Lys Gln Ile Ser Thr Gly Val Pro Met Asp Pro Ser
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880

Tyr Phe Ser Leu Val Ser Asp Asn Thr Phe Leu Pro Lys Ser Leu Val
                885                 890                 895

Asn Pro Asn His Gly Thr Ser Ser Ser Val Thr Gly Leu Val Phe Asp
            900                 905                 910

Gly Lys Gly Tyr Val Tyr Tyr Ser Thr Ser Gly Asn Gln Ala Lys Asn
```

```
        915                 920                 925

Ala Phe Ile Ser Leu Gly Asn Asn Trp Tyr Tyr Phe Asp Asn Asn Gly
    930                 935                 940

Tyr Met Val Thr Gly Ala Gln Ser Ile Asn Gly Ala Asn Tyr Tyr Phe
945                 950                 955                 960

Leu Ser Asn Gly Ile Gln Leu Arg Asn Ala Ile Tyr Asp Asn Gly Asn
                965                 970                 975

Lys Val Leu Ser Tyr Tyr Gly Asn Asp Gly Arg Arg Tyr Glu Asn Gly
            980                 985                 990

Tyr Tyr Leu Phe Gly Gln Gln Trp  Arg Tyr Phe Gln Asn  Gly Ile Met
        995                 1000                1005

Ala Val  Gly Leu Thr Arg Ile  His Gly Ala Val Gln  Tyr Phe Asp
    1010                1015                1020

Ala Ser  Gly Phe Gln Ala Lys  Gly Gln Phe Ile Thr  Thr Ala Asp
    1025                1030                1035

Gly Lys  Leu Arg Tyr Phe Asp  Arg Asp Ser Gly Asn  Gln Ile Ser
    1040                1045                1050

Asn Arg  Phe Val Arg Asn Ser  Lys Gly Glu Trp Phe  Leu Phe Asp
    1055                1060                1065

His Asn  Gly Val Ala Val Thr  Gly Thr Val Thr Phe  Asn Gly Gln
    1070                1075                1080

Arg Leu  Tyr Phe Lys Pro Asn  Gly Val Gln Ala Lys  Gly Glu Phe
    1085                1090                1095

Ile Arg  Asp Ala Asp Gly His  Leu Arg Tyr Tyr Asp  Pro Asn Ser
    1100                1105                1110

Gly Asn  Glu Val Arg Asn Arg  Phe Val Arg Asn Ser  Lys Gly Glu
    1115                1120                1125

Trp Phe  Leu Phe Asp His Asn  Gly Ile Ala Val Thr  Gly Thr Arg
    1130                1135                1140

Val Val  Asn Gly Gln Arg Leu  Tyr Phe Lys Ser Asn  Gly Val Gln
    1145                1150                1155

Ala Lys  Gly Glu Leu Ile Thr  Glu Arg Lys Gly Arg  Ile Lys Tyr
    1160                1165                1170

Tyr Asp  Pro Asn Ser Gly Asn  Glu Val Arg Asn Arg  Tyr Val Arg
    1175                1180                1185

Thr Ser  Ser Gly Asn Trp Tyr  Tyr Phe Gly Asn Asp  Gly Tyr Ala
    1190                1195                1200

Leu Ile  Gly Trp His Val Val  Glu Gly Arg Arg Val  Tyr Phe Asp
    1205                1210                1215

Glu Asn  Gly Val Tyr Arg Tyr  Ala Ser His Asp Gln  Arg Asn His
    1220                1225                1230

Trp Asp  Tyr Asp Tyr Arg Arg  Asp Phe Gly Arg Gly  Ser Ser Ser
    1235                1240                1245

Ala Val  Arg Phe Arg His Ser  Arg Asn Gly Phe Phe  Asp Asn Phe
    1250                1255                1260

Phe Arg  Phe
    1265
```

<210> SEQ ID NO 39
<211> LENGTH: 3801
<212> TYPE: DNA
<213> ORGANISM: Streptococcus mutans

<400> SEQUENCE: 39

```
gtgaacggta aatattatta ttataaagaa gatggaactc ttcaaaagaa ttatgcttta     60
aatattaatg ggaaaacttt cttctttgat gaaacaggag cattatcaaa taatacttta    120
cctagtaaaa agggtaatat cactaataat gataacacta acagctttgc tcaatataat    180
caggtctata gtacagatgc tgcaaacttc gaacatgttg atcattattt gacagctgag    240
agttggtatc gtcctaagta catcttgaag gatggtaaaa catggacaca gtcaacagaa    300
aaagatttcc gtcccttatt gatgacatgg tggcctgacc aagaaacgca gcgtcaatat    360
gttaactaca tgaatgcaca gcttggtatt catcaaacat acaatacagc aaccagtccg    420
cttcaattga atttagctgc tcagacaata caaactaaga tcgaagaaaa aatcactgca    480
gaaaagaata ccaattggct gcgtcagact atttccgcat ttgttaagac acagtcagct    540
tggaacagtg acagcgaaaa accgtttgat gatcacttac aaaaaggggc attgctttac    600
agtaacaata gcaagctaac ttcacaggct aattccaact accgtatctt aaatcgcacc    660
ccaaccaatc aaaccggaaa gaaagatcca aggtatacag ccgatcgcac catcggtggt    720
tacgagttct tgctggctaa tgatgtggat aattccaatc ctgttgttca ggccgaacag    780
ctgaactggc tccactttct tatgaacttt ggtaacattt atgccaacga tccggatgct    840
aactttgatt ccattcgtgt tgatgcggtg gataatgtgg atgctgactt gctccaaatt    900
gctggggatt acctcaaagc tgctaagggg attcataaaa atgataaggc tgctaatgat    960
catttgtcta ttttagaggc atggagttat aatgatactc cttaccttca tgatgatggc   1020
gacaatatga ttaacatgga taacaggtta cgtctttcct tgctttattc attagctaaa   1080
cctttgaatc aacgttcagg catgaatcct ctgatcacta acagtctggt gaatcgaact   1140
gatgataatg ctgaaactgc cgcagtccct tcttattcct tcatccgtgc ccatgacagt   1200
gaagtgcagg acttgattcg tgatatcatc aaggcagaaa tcaatcctaa tgttgtcggg   1260
tattctttca ctatggagga aatcaagaag gctttcgaga tttacaacaa agacttatta   1320
gctacagaga agaaatacac acactataat acggcacttt cttatgccct gcttttaacc   1380
aacaaatcca gtgtgccgcg tgtctattat ggggatatgt ttacagatga cgggcaatac   1440
atggctcata agacgatcaa ttacgaagcc atcgaaaccc tgcttaaagc tcgtattaag   1500
tatgtttcag gcggtcaagc catgcgcaat caacaggttg gtaattctga aatcattacg   1560
tctgtccgct atggtaaagg tgctttgaaa gcaacggata caggggaccg catcacacgc   1620
acttcaggag tggtcgtgat tgaaggcaat aacccttctt tacgtttgaa ggcttctgat   1680
cgcgtggttg tcaatatggg agcagcccat aagaaccaag cataccgacc tttactcttg   1740
accacagata acggtatcaa ggcttatcat tccgatcaag aagcggctgg tttggtgcgc   1800
tacaccaatg acagagggga attgatcttc acagcggctg atattaaagg ctatgccaac   1860
cctcaagttt ctggctattt aggtgtctgg gttccagtag gcgctgccgc tgatcaagat   1920
gttcgcgttg cggcttcaac ggccccatca acagatggca agtctgtgca tcaaaatgcg   1980
gcccttgatt cacgcgtcat gtttgaaggt ttctctaatt tccaagcatt cgccactaaa   2040
aaagaggaat ataccaatgt tgtgattgct aagaatgtgg ataagtttgc ggaatggggg   2100
gtcacagatt ttgaaatggc accgcagtat gtgtcttcaa cagatggttc tttcttggat   2160
tctgtgatcc aaaacggcta tgcttttacg gaccgttatg atttgggaat ttccaaacct   2220
aataaatacg ggacagccga tgatttggtg aaggccatca aagcgttaca cagcaagggc   2280
attaaggtaa tggctgactg ggtgcctgat caaatgtatg ctctccctga aaaagaagtg   2340
gtaacagcaa cccgtgttga taagtatggg actcctgttg caggaagtca gatcaaaaac   2400
```

```
acccttatg tagttgatgg taagagttct ggtaaagatc aacaagccaa gtatggggga   2460

gctttcttag aggagctgca agctaaatat ccggagcttt ttgcgagaaa acaaatttcc   2520

acaggggttc cgatggaccc ttcagttaag attaagcaat ggtctgccaa gtactttaat   2580

gggacaaata ttttagggcg cggagcaggc tatgtcttaa aagatcaggc aaccaatact   2640

tacttcagtc ttgtttcaga caacaccttc cttcctaaat cgttagttaa cccaaatcac   2700

ggaacaagca gttctgtaac tggattggta tttgatggta aaggttatgt ttattattca   2760

acgagtggta accaagctaa aaatgctttc attagtttag gaaataattg gtattatttc   2820

gataataacg gttatatggt cactggtgct caatcaatta acggtgctaa ttattatttc   2880

ttatcaaatg gtattcaatt aagaaatgct atttatgata atggtaataa agtattgtct   2940

tattatggaa atgatggccg tcgttatgaa aatggttact atctctttgg tcaacaatgg   3000

cgttatttcc aaaatggtat tatggctgtc ggcttaacac gtgttcatgg tgctattcaa   3060

tattttgatg cttctgggtt ccaagctaaa ggacagttta ttacaactgc tgatggaaag   3120

ctgcgttact ttgatagaga ctcaggaaat caaatttcaa atcgttttgt tagaaattcc   3180

aagggagaat ggttcttatt tgatcacaat ggtgtcgctg taaccggtac tgtaacgttc   3240

aatggacaac gtctttactt taaacctaat ggtgttcaag ccaaaggaga atttatcaga   3300

gatgcaaatg gatatctaag atattatgat cctaattccg gaaatgaagt tcgtaatcgc   3360

tttgttagaa attccaaggg agaatggttc ttatttgatc acaatggtgt cgctgtaacc   3420

ggtgccagag ttgttaacgg acagcgcctc tattttaagt ctaatggtgt tcaggctaag   3480

ggagagctca ttacagagcg taaaggtcgt atcaaatact atgatcctaa ttccggaaat   3540

gaagttcgta atcgttatgt gaaaacatca tcaggaaact ggtactattt tggcaatgat   3600

ggctatgcct taattggttg gcatattgtt gaaggaagac gtgtttactt tgatgaaaat   3660

ggtgtttatc gttatgccag tcatgatcaa agaaaccact gggattatga ttacagaaga   3720

gactttggtc gtggcagcag tagtgctatt cgttttagac accctcgtaa tggattcttt   3780

gacaatttct ttagatttta a                                              3801
```

```
<210> SEQ ID NO 40
<211> LENGTH: 1266
<212> TYPE: PRT
<213> ORGANISM: Streptococcus mutans

<400> SEQUENCE: 40

Val Asn Gly Lys Tyr Tyr Tyr Tyr Lys Glu Asp Gly Thr Leu Gln Lys
1               5                   10                  15

Asn Tyr Ala Leu Asn Ile Asn Gly Lys Thr Phe Phe Phe Asp Glu Thr
            20                  25                  30

Gly Ala Leu Ser Asn Asn Thr Leu Pro Ser Lys Lys Gly Asn Ile Thr
        35                  40                  45

Asn Asn Asp Asn Thr Asn Ser Phe Ala Gln Tyr Asn Gln Val Tyr Ser
    50                  55                  60

Thr Asp Ala Ala Asn Phe Glu His Val Asp His Tyr Leu Thr Ala Glu
65                  70                  75                  80

Ser Trp Tyr Arg Pro Lys Tyr Ile Leu Lys Asp Gly Lys Thr Trp Thr
                85                  90                  95

Gln Ser Thr Glu Lys Asp Phe Arg Pro Leu Leu Met Thr Trp Trp Pro
            100                 105                 110

Asp Gln Glu Thr Gln Arg Gln Tyr Val Asn Tyr Met Asn Ala Gln Leu
```

```
        115                 120                 125

Gly Ile His Gln Thr Tyr Asn Thr Ala Thr Ser Pro Leu Gln Leu Asn
    130                 135                 140

Leu Ala Ala Gln Thr Ile Gln Thr Lys Ile Glu Glu Lys Ile Thr Ala
145                 150                 155                 160

Glu Lys Asn Thr Asn Trp Leu Arg Gln Thr Ile Ser Ala Phe Val Lys
                165                 170                 175

Thr Gln Ser Ala Trp Asn Ser Asp Ser Glu Lys Pro Phe Asp Asp His
            180                 185                 190

Leu Gln Lys Gly Ala Leu Leu Tyr Ser Asn Asn Ser Lys Leu Thr Ser
        195                 200                 205

Gln Ala Asn Ser Asn Tyr Arg Ile Leu Asn Arg Thr Pro Thr Asn Gln
    210                 215                 220

Thr Gly Lys Lys Asp Pro Arg Tyr Thr Ala Asp Arg Thr Ile Gly Gly
225                 230                 235                 240

Tyr Glu Phe Leu Leu Ala Asn Asp Val Asp Asn Ser Asn Pro Val Val
                245                 250                 255

Gln Ala Glu Gln Leu Asn Trp Leu His Phe Leu Met Asn Phe Gly Asn
            260                 265                 270

Ile Tyr Ala Asn Asp Pro Asp Ala Asn Phe Asp Ser Ile Arg Val Asp
        275                 280                 285

Ala Val Asp Asn Val Asp Ala Asp Leu Leu Gln Ile Ala Gly Asp Tyr
    290                 295                 300

Leu Lys Ala Ala Lys Gly Ile His Lys Asn Asp Lys Ala Ala Asn Asp
305                 310                 315                 320

His Leu Ser Ile Leu Glu Ala Trp Ser Tyr Asn Asp Thr Pro Tyr Leu
                325                 330                 335

His Asp Asp Gly Asp Asn Met Ile Asn Met Asp Asn Arg Leu Arg Leu
            340                 345                 350

Ser Leu Leu Tyr Ser Leu Ala Lys Pro Leu Asn Gln Arg Ser Gly Met
        355                 360                 365

Asn Pro Leu Ile Thr Asn Ser Leu Val Asn Arg Thr Asp Asp Asn Ala
    370                 375                 380

Glu Thr Ala Ala Val Pro Ser Tyr Ser Phe Ile Arg Ala His Asp Ser
385                 390                 395                 400

Glu Val Gln Asp Leu Ile Arg Asp Ile Ile Lys Ala Glu Ile Asn Pro
                405                 410                 415

Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495

Ala Arg Ile Lys Tyr Val Ser Gly Gly Gln Ala Met Arg Asn Gln Gln
            500                 505                 510

Val Gly Asn Ser Glu Ile Ile Thr Ser Val Arg Tyr Gly Lys Gly Ala
        515                 520                 525

Leu Lys Ala Thr Asp Thr Gly Asp Arg Ile Thr Arg Thr Ser Gly Val
    530                 535                 540
```

```
Val Val Ile Glu Gly Asn Asn Pro Ser Leu Arg Leu Lys Ala Ser Asp
545                 550                 555                 560

Arg Val Val Val Asn Met Gly Ala Ala His Lys Asn Gln Ala Tyr Arg
                565                 570                 575

Pro Leu Leu Leu Thr Thr Asp Asn Gly Ile Lys Ala Tyr His Ser Asp
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655

His Gln Asn Ala Ala Leu Asp Ser Arg Val Met Phe Glu Gly Phe Ser
            660                 665                 670

Asn Phe Gln Ala Phe Ala Thr Lys Lys Glu Glu Tyr Thr Asn Val Val
        675                 680                 685

Ile Ala Lys Asn Val Asp Lys Phe Ala Glu Trp Gly Val Thr Asp Phe
    690                 695                 700

Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750

Ile Lys Ala Leu His Ser Lys Gly Ile Lys Val Met Ala Asp Trp Val
        755                 760                 765

Pro Asp Gln Met Tyr Ala Leu Pro Glu Lys Glu Val Val Thr Ala Thr
    770                 775                 780

Arg Val Asp Lys Tyr Gly Thr Pro Val Ala Gly Ser Gln Ile Lys Asn
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830

Leu Phe Ala Arg Lys Gln Ile Ser Thr Gly Val Pro Met Asp Pro Ser
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880

Tyr Phe Ser Leu Val Ser Asp Asn Thr Phe Leu Pro Lys Ser Leu Val
                885                 890                 895

Asn Pro Asn His Gly Thr Ser Ser Ser Val Thr Gly Leu Val Phe Asp
            900                 905                 910

Gly Lys Gly Tyr Val Tyr Tyr Ser Thr Ser Gly Asn Gln Ala Lys Asn
        915                 920                 925

Ala Phe Ile Ser Leu Gly Asn Asn Trp Tyr Tyr Phe Asp Asn Asn Gly
    930                 935                 940

Tyr Met Val Thr Gly Ala Gln Ser Ile Asn Gly Ala Asn Tyr Tyr Phe
945                 950                 955                 960
```

```
Leu Ser Asn Gly Ile Gln Leu Arg Asn Ala Ile Tyr Asp Asn Gly Asn
                965                 970                 975

Lys Val Leu Ser Tyr Tyr Gly Asn Asp Gly Arg Arg Tyr Glu Asn Gly
            980                 985                 990

Tyr Tyr Leu Phe Gly Gln Gln Trp  Arg Tyr Phe Gln Asn  Gly Ile Met
        995                 1000                1005

Ala Val  Gly Leu Thr Arg Val  His Gly Ala Ile Gln  Tyr Phe Asp
    1010                 1015                 1020

Ala Ser  Gly Phe Gln Ala Lys  Gly Gln Phe Ile Thr  Thr Ala Asp
    1025                 1030                 1035

Gly Lys  Leu Arg Tyr Phe Asp  Arg Asp Ser Gly Asn  Gln Ile Ser
    1040                 1045                 1050

Asn Arg  Phe Val Arg Asn Ser  Lys Gly Glu Trp Phe  Leu Phe Asp
    1055                 1060                 1065

His Asn  Gly Val Ala Val Thr  Gly Thr Val Thr Phe  Asn Gly Gln
    1070                 1075                 1080

Arg Leu  Tyr Phe Lys Pro Asn  Gly Val Gln Ala Lys  Gly Glu Phe
    1085                 1090                 1095

Ile Arg  Asp Ala Asn Gly Tyr  Leu Arg Tyr Tyr Asp  Pro Asn Ser
    1100                 1105                 1110

Gly Asn  Glu Val Arg Asn Arg  Phe Val Arg Asn Ser  Lys Gly Glu
    1115                 1120                 1125

Trp Phe  Leu Phe Asp His Asn  Gly Val Ala Val Thr  Gly Ala Arg
    1130                 1135                 1140

Val Val  Asn Gly Gln Arg Leu  Tyr Phe Lys Ser Asn  Gly Val Gln
    1145                 1150                 1155

Ala Lys  Gly Glu Leu Ile Thr  Glu Arg Lys Gly Arg  Ile Lys Tyr
    1160                 1165                 1170

Tyr Asp  Pro Asn Ser Gly Asn  Glu Val Arg Asn Arg  Tyr Val Lys
    1175                 1180                 1185

Thr Ser  Ser Gly Asn Trp Tyr  Tyr Phe Gly Asn Asp  Gly Tyr Ala
    1190                 1195                 1200

Leu Ile  Gly Trp His Ile Val  Glu Gly Arg Arg Val  Tyr Phe Asp
    1205                 1210                 1215

Glu Asn  Gly Val Tyr Arg Tyr  Ala Ser His Asp Gln  Arg Asn His
    1220                 1225                 1230

Trp Asp  Tyr Asp Tyr Arg Arg  Asp Phe Gly Arg Gly  Ser Ser Ser
    1235                 1240                 1245

Ala Ile  Arg Phe Arg His Pro  Arg Asn Gly Phe Phe  Asp Asn Phe
    1250                 1255                 1260

Phe Arg  Phe
    1265
```

<210> SEQ ID NO 41
<211> LENGTH: 3801
<212> TYPE: DNA
<213> ORGANISM: Streptococcus mutans

<400> SEQUENCE: 41

```
gtgaacggta aatattatta ttataaagaa gatggaactc ttcaaaagaa ttatgcttta      60

aacattaatg ggaaaacttt cttctttgat gaaacaggag cattatcaaa taatacttta     120

cctagtaaaa agggtaatat cactaataat gataacacta acagctttgc tcaatataat     180

caggtctata gtacagatgc tacaaacttc gaacatgttg atcattattt gacagctgag     240
```

```
agttggtatc gtcctaagta catcttgaaa gatggtaaaa catggacaca gtcagcagaa    300
aaagatttcc gtcctttact gatgacatgg tggcctgacc aagaaacgca gcgtcaatat    360
gttaactaca tgaatgcaca gcttggtatt catcaaacat acaatacagc aacttcaccg    420
cttcaattga atttagctgc tcagacaata caaactaaaa tcgaagaaaa aatcactgca    480
gaaaagaata ccaattggct gcgtcagact atttccgcat ttgttaagac acagtcagct    540
tggaacagtg atagcgaaaa accgtttgat gatcacttac aaaaaggggc attgctttac    600
gataatgaag gaaaattaac gccttatgct aattccaact accgtatctt aaatcgcacc    660
ccgaccaatc aaactgggaa gaaggaccca aggtatacag ctgatcgcac cattggcggt    720
tacgaatttt tgttagccaa cgatgtggat aattccaatc ctgtcgtgca agccgaacaa    780
ttgaactggc tgcattttct catgaacttt ggtaacattt atgccaacga tccggatgct    840
aactttgatt ccattcgtgt tgatgcggtg gataatgtgg atgctgactt actccaaatt    900
gctggggatt acctcaaagc tgctaaaggg attcataaaa atgataaggc tgctaatgat    960
catttgtcta ttttagaggc atggagtgac aacgacactc cttaccttca tgatgatggc   1020
gacaatatga ttaacatgga taacaggtta cgtctttcct tgctttattc attagctaaa   1080
cctttgaatc aacgttcagg catgaatcct ctgatcacta acagtttggt gaatcgaact   1140
gatgataatg ctgaaactgc cgcagtccct tcttattcct tcatccgtgc ccatgacagt   1200
gaagtgcagg atttgattcg tgatatcatc aaggcagaaa tcaatcctaa tgttgtcggg   1260
tattcattca ctatggagga aatcaagaag gctttcgaga tttacaacaa agacttatta   1320
gctacagaga agaaatacac acactataat acggcacttt cttatgccct gcttttaacc   1380
aacaaatcca gtgtgccgcg tgtctattat ggggatatgt ttacagatga cgggcaatac   1440
atggctcata agacgatcaa ttacgaagcc atcgaaaccc tgcttaaagc tcgtattaag   1500
tatgtttcag gcggtcaagc catgcgcaat caacaggttg gcaattctga aatcattacg   1560
tctgtccgct atggtaaagg tgctttgaaa gcaacggata caggggaccg caccacacgg   1620
acttcaggag tggccgtgat tgaaggcaat aacccttctt tacgtttgaa ggcttctgat   1680
cgcgtggttg tcaatatggg agcagcccat aagaaccaag cataccgacc tttactcttg   1740
accacagata acggtatcaa ggcttatcat tccgatcaag aagcggctgg tttggtgcgc   1800
tacaccaatg acagagggga attgatcttc acagcggctg atattaaagg ctatgccaac   1860
cctcaagttt ctggctattt aggtgtttgg gttccagtag gcgctgccgc tgatcaagat   1920
gttcgcgttg cggcttcaac ggccccatca acagatggca agtctgtgca tcaaaatgcg   1980
gcccttgatt cacgcgtcat gtttgaaggt ttctctaatt tccaagcatt cgccactaaa   2040
aaagaggaat ataccaatgt tgtgattgct aagaatgtgg ataagtttgc ggaatggggt   2100
gtcacagact ttgaaatggc accgcagtat gtgtcttcaa cagatggttc tttcttggat   2160
tctgtgatcc aaaacggcta tgcttttacg gaccgttatg atttgggaat ttccaaacct   2220
aataaatacg ggacagccga tgatttggtt aaggccatca aagcgttaca cagcaagggc   2280
attaaggtaa tggctgactg ggtgcctgat caaatgtatg ctttccctga aaaagaagtg   2340
gtaacagcaa cccgcgttga taagtatggg actcctgttg caggaagtca gatcaaaaac   2400
accctttatg tagttgatgg taagagttct ggtaaagatc aacaagccaa gtatggggga   2460
gctttcttag aggagctgca agcgaagtat ccggagcttt ttgcgagaaa acaaatttcc   2520
acaggggttc cgatggaccc ttcagttaag attaagcaat ggtctgccaa gtactttaat   2580
gggacaaata ttttagggcg cggagcaggc tatgtcttaa aagatcaggc aaccaatact   2640
```

```
tacttcagtc ttgtttcaga caacaccttc cttcctaaat cgttagttaa cccaaatcac   2700

ggaacaagca gttctgtaac tggattggta tttgatggta aaggttatgt ttattattca   2760

acgagtggtt accaagccaa aaatactttc attagcttag gaaataattg gtattatttc   2820

gataataacg gttatatggt cactggtgct caatcaatta acggtgttaa ttattatttc   2880

ttatcaaatg gtattcaatt aagaaatgct atttatgata atggtaataa agtattgtct   2940

tattatggaa atgatggccg tcgttatgaa aatggttact atctctttgg tcaacaatgg   3000

cgttatttcc aaaatggtat tatggctgtc ggcttaacac gtgttcatgg tgctgttcaa   3060

tactttgatg cttctggctt ccaagctaaa ggacagttta ttacaactgc tgatggaaag   3120

ctgcgttact ttgatagaga ctcaggaaat caaatttcaa atcgttttgt tagaaattcc   3180

aagggagaat ggttcttatt tgatcacaat ggtgtcgctg taaccggtac tgtaacgttc   3240

aatggacaac gtctttactt taaacctaat ggtgttcaag ccaaaggaga atttatcaga   3300

gatgcagatg gacatctaag atattatgat cctaattccg gaaatgaagt tcgtaatcgc   3360

tttgttagaa attccaaggg agaatggttc ttatttgatc acaatggtat cgctgtaact   3420

ggtgccagag ttgttaatgg acagcgcctc tattttaagt ctaatggtgt tcaggctaag   3480

ggagagctca ttacagagcg taaaggtcgt atcaaatact atgatcctaa ttccggaaat   3540

gaagttcgta atcgttatgt gaaaacatca tcaggaaact ggtactattt tggcaatgat   3600

ggctatgctt taattggttg gcatattgtt gaaggaagac gtgtttattt tgatgaaaat   3660

ggtgtttatc gttatgccag tcatgatcaa agaaaccact gggattatga ttacagaaga   3720

aactttggtc gtggcagcag tagtgctatt cgttttagac actctcgtaa tggattcttt   3780

gacaatttct ttagatttta a                                              3801
```

<210> SEQ ID NO 42
<211> LENGTH: 1266
<212> TYPE: PRT
<213> ORGANISM: Streptococcus mutans

<400> SEQUENCE: 42

```
Val Asn Gly Lys Tyr Tyr Tyr Tyr Lys Glu Asp Gly Thr Leu Gln Lys
1               5                   10                  15

Asn Tyr Ala Leu Asn Ile Asn Gly Lys Thr Phe Phe Phe Asp Glu Thr
            20                  25                  30

Gly Ala Leu Ser Asn Asn Thr Leu Pro Ser Lys Lys Gly Asn Ile Thr
        35                  40                  45

Asn Asn Asp Asn Thr Asn Ser Phe Ala Gln Tyr Asn Gln Val Tyr Ser
    50                  55                  60

Thr Asp Ala Thr Asn Phe Glu His Val Asp His Tyr Leu Thr Ala Glu
65                  70                  75                  80

Ser Trp Tyr Arg Pro Lys Tyr Ile Leu Lys Asp Gly Lys Thr Trp Thr
                85                  90                  95

Gln Ser Ala Glu Lys Asp Phe Arg Pro Leu Leu Met Thr Trp Trp Pro
            100                 105                 110

Asp Gln Glu Thr Gln Arg Gln Tyr Val Asn Tyr Met Asn Ala Gln Leu
        115                 120                 125

Gly Ile His Gln Thr Tyr Asn Thr Ala Thr Ser Pro Leu Gln Leu Asn
    130                 135                 140

Leu Ala Ala Gln Thr Ile Gln Thr Lys Ile Glu Glu Lys Ile Thr Ala
145                 150                 155                 160
```

```
Glu Lys Asn Thr Asn Trp Leu Arg Gln Thr Ile Ser Ala Phe Val Lys
                165                 170                 175

Thr Gln Ser Ala Trp Asn Ser Asp Ser Glu Lys Pro Phe Asp Asp His
            180                 185                 190

Leu Gln Lys Gly Ala Leu Leu Tyr Asp Asn Glu Gly Lys Leu Thr Pro
        195                 200                 205

Tyr Ala Asn Ser Asn Tyr Arg Ile Leu Asn Arg Thr Pro Thr Asn Gln
    210                 215                 220

Thr Gly Lys Lys Asp Pro Arg Tyr Thr Ala Asp Arg Thr Ile Gly Gly
225                 230                 235                 240

Tyr Glu Phe Leu Leu Ala Asn Asp Val Asp Asn Ser Asn Pro Val Val
                245                 250                 255

Gln Ala Glu Gln Leu Asn Trp Leu His Phe Leu Met Asn Phe Gly Asn
            260                 265                 270

Ile Tyr Ala Asn Asp Pro Asp Ala Asn Phe Asp Ser Ile Arg Val Asp
        275                 280                 285

Ala Val Asp Asn Val Asp Ala Asp Leu Leu Gln Ile Ala Gly Asp Tyr
    290                 295                 300

Leu Lys Ala Ala Lys Gly Ile His Lys Asn Asp Lys Ala Ala Asn Asp
305                 310                 315                 320

His Leu Ser Ile Leu Glu Ala Trp Ser Asp Asn Asp Thr Pro Tyr Leu
                325                 330                 335

His Asp Asp Gly Asp Asn Met Ile Asn Met Asp Asn Arg Leu Arg Leu
            340                 345                 350

Ser Leu Leu Tyr Ser Leu Ala Lys Pro Leu Asn Gln Arg Ser Gly Met
        355                 360                 365

Asn Pro Leu Ile Thr Asn Ser Leu Val Asn Arg Thr Asp Asp Asn Ala
    370                 375                 380

Glu Thr Ala Ala Val Pro Ser Tyr Ser Phe Ile Arg Ala His Asp Ser
385                 390                 395                 400

Glu Val Gln Asp Leu Ile Arg Asp Ile Ile Lys Ala Glu Ile Asn Pro
                405                 410                 415

Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495

Ala Arg Ile Lys Tyr Val Ser Gly Gly Gln Ala Met Arg Asn Gln Gln
            500                 505                 510

Val Gly Asn Ser Glu Ile Ile Thr Ser Val Arg Tyr Gly Lys Gly Ala
        515                 520                 525

Leu Lys Ala Thr Asp Thr Gly Asp Arg Thr Thr Arg Thr Ser Gly Val
    530                 535                 540

Ala Val Ile Glu Gly Asn Asn Pro Ser Leu Arg Leu Lys Ala Ser Asp
545                 550                 555                 560

Arg Val Val Val Asn Met Gly Ala Ala His Lys Asn Gln Ala Tyr Arg
                565                 570                 575

Pro Leu Leu Leu Thr Thr Asp Asn Gly Ile Lys Ala Tyr His Ser Asp
```

```
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655

His Gln Asn Ala Ala Leu Asp Ser Arg Val Met Phe Glu Gly Phe Ser
            660                 665                 670

Asn Phe Gln Ala Phe Ala Thr Lys Lys Glu Glu Tyr Thr Asn Val Val
        675                 680                 685

Ile Ala Lys Asn Val Asp Lys Phe Ala Glu Trp Gly Val Thr Asp Phe
    690                 695                 700

Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750

Ile Lys Ala Leu His Ser Lys Gly Ile Lys Val Met Ala Asp Trp Val
        755                 760                 765

Pro Asp Gln Met Tyr Ala Phe Pro Glu Lys Glu Val Val Thr Ala Thr
    770                 775                 780

Arg Val Asp Lys Tyr Gly Thr Pro Val Ala Gly Ser Gln Ile Lys Asn
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830

Leu Phe Ala Arg Lys Gln Ile Ser Thr Gly Val Pro Met Asp Pro Ser
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880

Tyr Phe Ser Leu Val Ser Asp Asn Thr Phe Leu Pro Lys Ser Leu Val
                885                 890                 895

Asn Pro Asn His Gly Thr Ser Ser Ser Val Thr Gly Leu Val Phe Asp
            900                 905                 910

Gly Lys Gly Tyr Val Tyr Tyr Ser Thr Ser Gly Tyr Gln Ala Lys Asn
        915                 920                 925

Thr Phe Ile Ser Leu Gly Asn Asn Trp Tyr Tyr Phe Asp Asn Asn Gly
    930                 935                 940

Tyr Met Val Thr Gly Ala Gln Ser Ile Asn Gly Val Asn Tyr Tyr Phe
945                 950                 955                 960

Leu Ser Asn Gly Ile Gln Leu Arg Asn Ala Ile Tyr Asp Asn Gly Asn
                965                 970                 975

Lys Val Leu Ser Tyr Tyr Gly Asn Asp Gly Arg Arg Tyr Glu Asn Gly
            980                 985                 990

Tyr Tyr Leu Phe Gly Gln Gln Trp  Arg Tyr Phe Gln Asn  Gly Ile Met
        995                 1000                1005
```

```
Ala Val  Gly Leu Thr Arg Val  His Gly Ala Val Gln  Tyr Phe Asp
    1010                 1015                 1020

Ala Ser  Gly Phe Gln Ala Lys  Gly Gln Phe Ile Thr  Thr Ala Asp
    1025                 1030                 1035

Gly Lys  Leu Arg Tyr Phe Asp  Arg Asp Ser Gly Asn  Gln Ile Ser
    1040                 1045                 1050

Asn Arg  Phe Val Arg Asn Ser  Lys Gly Glu Trp Phe  Leu Phe Asp
    1055                 1060                 1065

His Asn  Gly Val Ala Val Thr  Gly Thr Val Thr Phe  Asn Gly Gln
    1070                 1075                 1080

Arg Leu  Tyr Phe Lys Pro Asn  Gly Val Gln Ala Lys  Gly Glu Phe
    1085                 1090                 1095

Ile Arg  Asp Ala Asp Gly His  Leu Arg Tyr Tyr Asp  Pro Asn Ser
    1100                 1105                 1110

Gly Asn  Glu Val Arg Asn Arg  Phe Val Arg Asn Ser  Lys Gly Glu
    1115                 1120                 1125

Trp Phe  Leu Phe Asp His Asn  Gly Ile Ala Val Thr  Gly Ala Arg
    1130                 1135                 1140

Val Val  Asn Gly Gln Arg Leu  Tyr Phe Lys Ser Asn  Gly Val Gln
    1145                 1150                 1155

Ala Lys  Gly Glu Leu Ile Thr  Glu Arg Lys Gly Arg  Ile Lys Tyr
    1160                 1165                 1170

Tyr Asp  Pro Asn Ser Gly Asn  Glu Val Arg Asn Arg  Tyr Val Lys
    1175                 1180                 1185

Thr Ser  Ser Gly Asn Trp Tyr  Tyr Phe Gly Asn Asp  Gly Tyr Ala
    1190                 1195                 1200

Leu Ile  Gly Trp His Ile Val  Glu Gly Arg Arg Val  Tyr Phe Asp
    1205                 1210                 1215

Glu Asn  Gly Val Tyr Arg Tyr  Ala Ser His Asp Gln  Arg Asn His
    1220                 1225                 1230

Trp Asp  Tyr Asp Tyr Arg Arg  Asn Phe Gly Arg Gly  Ser Ser Ser
    1235                 1240                 1245

Ala Ile  Arg Phe Arg His Ser  Arg Asn Gly Phe Phe  Asp Asn Phe
    1250                 1255                 1260

Phe Arg  Phe
    1265
```

<210> SEQ ID NO 43
<211> LENGTH: 3606
<212> TYPE: DNA
<213> ORGANISM: Streptococcus mutans

<400> SEQUENCE: 43

```
gtgaacggta aatattatta ttataaagaa gatggaactc ttcaaaagaa ttatgcttta     60

aatattaatg ggaaaacttt cttctttgat gaaacaggag cattatcaaa taatacttta    120

cctagtaaaa agggtaatat cactaataat gataacacta acagctttgc tcaatataat    180

caggtctata gtacagatgc tgcaaacttc gaacatgttg atcattattt gacagctgag    240

agttggtatc gtcctaagta catcttgaag gatggtaaaa catggacaca gtcaacagaa    300

aaagatttcc gtcccttatt gatgacatgg tggcctgacc aagaaacgca gcgtcaatat    360

gttaactaca tgaatgcaca gcttggtatt catcaaacat acaatacagc aaccagtccg    420

cttcaattga atttagctgc tcagacaata caaactaaga tcgaagaaaa aatcactgca    480
```

```
gaaaagaata ccaattggct gcgtcagact atttccgcat ttgttaagac acagtcagct    540
tggaacagtg acagcgaaaa accatttgat gatcacttac aaaaaggggc attgctttac    600
agtaataata gcaaactaac ttcacaggct aattccaact accgtatctt aaatcgcacc    660
ccgaccaatc aaactgggaa gaaggaccca aggtatacag ctgatcgcac cattggcggt    720
tacgaatttc ttttggcaaa cgatgtggat aattccaatc ctgtcgtgca ggccgaacaa    780
ttgaactggc tgcattttct catgaacttt ggcaacattt atgccaatga tccggatgct    840
aactttgatt ccattcgtgt tgatgcggtg gataatgtgg atgctgactt gctccaaatt    900
gctggggatt acctcaaagc tgctaagggg attcataaaa atgataaggc tgctaatgat    960
catttgtcta ttttagaggc atggagtgac aacgacactc cttaccttca tgatgatggc   1020
gacaatatga ttaatatgga caataagctg cgtttgtctc tattattttc attagctaaa   1080
cccttaaatc aacgttcagg catgaatcct ctgatcacta acagtttggt gaatcgaact   1140
gatgataatg ctgaaactgc cgcagtccct tcttattcct tcatccgtgc ccatgacagt   1200
gaagtgcagg atttgattcg tgatatcatc aaggcagaaa tcaatcctaa tgttgtcggg   1260
tattcattca ctatggagga aatcaagaag gctttcgaga tttacaacaa agacttatta   1320
gctacagaga agaaatacac acactataat acggcacttt cttatgccct gcttttaacc   1380
aacaaatcca gtgtgccgcg tgtctattat ggggatatgt ttacagatga cgggcaatac   1440
atggctcata agacgatcaa ttacgaagcc atcgaaaccc tgcttaaagc tcgtattaag   1500
tatgtttcag gcggtcaagc catgcgcaat caacaggttg gcaattctga aatcattacg   1560
tctgtccgct atggtaaagg tgctttgaaa gcaacggata caggggaccg taccacacgg   1620
acttcaggag tggccgtgat tgaaggcaat aacccttctt tacgtttgaa ggcttctgat   1680
cgcgtggttg tcaatatggg agcagcccat aagaaccaag cataccgacc tttactcttg   1740
accacagata acggtatcaa ggcttatcat tccgatcaag aagcggctgg tttggtgcgc   1800
tacaccaatg acagagggga attgatcttc acagcggctg atattaaagg ctatgccaac   1860
cctcaagttt ctggctattt aggtgtttgg gttccagtag gcgctgccgc tgatcaagat   1920
gttcgcgttg cggcttcaac ggccccatca acagatggca agtctgtgca tcaaaatgcg   1980
gcccttgatt cacgcgtcat gtttgaaggt ttctctaatt tccaagcatt cgccactaaa   2040
aaagaggaat ataccaatgt tgtgattgct aagaatgtgg ataagtttgc ggaatggggt   2100
gtcacagatt ttgaaatggc accgcagtat gtgtcttcaa cagatggttc tttcttggat   2160
tctgtgatcc aaaacggcta tgcttttacg gaccgttatg acttaggaat ttccaaacct   2220
aataaatacg ggacagccga tgatttggtg aaagccatca aagcgttaca cagcaagggc   2280
attaaggtaa tggctgactg ggtgcctgat caaatgtatg ctctccctga aaaagaagtg   2340
gtaacagcaa cccgtgttga taagtatggg actcctgttg caggaagtca gatcaaaaac   2400
accctttatg tagttgatgg taagagttct ggtaaagatc aacaagccaa gtatggggga   2460
gctttcttag aggagctgca agctaaatat ccggagcttt ttgcgagaaa acaaatttcc   2520
acaggggttc cgatggaccc ttcagttaag attaagcaat ggtctgccaa gtactttaat   2580
gggacaaata ttttagggcg cggagcaggc tatgtcttaa aagatcaggc aaccaatact   2640
tacttcagtc ttgtttcaga caacaccttc cttcctaaat cgttagttaa cccaaatcac   2700
ggaacaagca gttctgtaac tggattggta tttgatggta aaggttatgt ttattattca   2760
acgagtggta accaagctaa aaatgctttc attagcttag gaaataattg gtattatttc   2820
gataataacg gttatatggt cactggtgct caatcaatta acggtgctaa ttattatttc   2880
```

ttatcaaatg gtattcaatt aagaaatgct atttatgata atggtaataa agtattgtct 2940
tattatggaa atgatggccg tcgttatgaa aatggttact atctctttgg tcaacaatgg 3000
cgttatttcc aaaatggtat tatggctgtc ggcttaacac gtattcatgg tgctgttcaa 3060
tactttgatg cttctgggtt ccaagctaaa ggacagttta ttacaactgc tgatggaaag 3120
ctgcgttact ttgatagaga ctcaggaaat caaatttcaa atcgttttgt tagaaattcc 3180
aagggagaat ggttcttatt tgatcacaat ggtgtcgctg taaccggtac tgtaacgttc 3240
aatggacaac gtctttactt taaacctaat ggtgttcaag ccaaaggaga atttatcaga 3300
gatgcagatg gacatctaag atattatgat cctaattccg gaaatgaagt tcgtaatcgt 3360
tatgtgagaa cgtcatcagg aaactggtac tattttggca atgatggcta tgccttaatt 3420
ggttggcatg ttgttgaagg aagacgtgtt tactttgatg aaaatggtgt ttatcgttat 3480
gccagtcatg atcaaagaaa ccactgggat tatgattaca gaagagactt tggtcgtggc 3540
agcagcagtg ctgttcgttt tagacactct cgtaatggat tctttgacaa tttctttaga 3600
ttttaa 3606

<210> SEQ ID NO 44
<211> LENGTH: 1201
<212> TYPE: PRT
<213> ORGANISM: Streptococcus mutans

<400> SEQUENCE: 44

Val Asn Gly Lys Tyr Tyr Tyr Tyr Lys Glu Asp Gly Thr Leu Gln Lys
1               5                   10                  15

Asn Tyr Ala Leu Asn Ile Asn Gly Lys Thr Phe Phe Phe Asp Glu Thr
            20                  25                  30

Gly Ala Leu Ser Asn Asn Thr Leu Pro Ser Lys Lys Gly Asn Ile Thr
        35                  40                  45

Asn Asn Asp Asn Thr Asn Ser Phe Ala Gln Tyr Asn Gln Val Tyr Ser
    50                  55                  60

Thr Asp Ala Ala Asn Phe Glu His Val Asp His Tyr Leu Thr Ala Glu
65                  70                  75                  80

Ser Trp Tyr Arg Pro Lys Tyr Ile Leu Lys Asp Gly Lys Thr Trp Thr
                85                  90                  95

Gln Ser Thr Glu Lys Asp Phe Arg Pro Leu Leu Met Thr Trp Trp Pro
            100                 105                 110

Asp Gln Glu Thr Gln Arg Gln Tyr Val Asn Tyr Met Asn Ala Gln Leu
        115                 120                 125

Gly Ile His Gln Thr Tyr Asn Thr Ala Thr Ser Pro Leu Gln Leu Asn
    130                 135                 140

Leu Ala Ala Gln Thr Ile Gln Thr Lys Ile Glu Glu Lys Ile Thr Ala
145                 150                 155                 160

Glu Lys Asn Thr Asn Trp Leu Arg Gln Thr Ile Ser Ala Phe Val Lys
                165                 170                 175

Thr Gln Ser Ala Trp Asn Ser Asp Ser Glu Lys Pro Phe Asp Asp His
            180                 185                 190

Leu Gln Lys Gly Ala Leu Leu Tyr Ser Asn Asn Ser Lys Leu Thr Ser
        195                 200                 205

Gln Ala Asn Ser Asn Tyr Arg Ile Leu Asn Arg Thr Pro Thr Asn Gln
    210                 215                 220

Thr Gly Lys Lys Asp Pro Arg Tyr Thr Ala Asp Arg Thr Ile Gly Gly
225                 230                 235                 240

```
Tyr Glu Phe Leu Leu Ala Asn Asp Val Asp Asn Ser Asn Pro Val Val
                245                 250                 255

Gln Ala Glu Gln Leu Asn Trp Leu His Phe Leu Met Asn Phe Gly Asn
            260                 265                 270

Ile Tyr Ala Asn Asp Pro Asp Ala Asn Phe Asp Ser Ile Arg Val Asp
        275                 280                 285

Ala Val Asp Asn Val Asp Ala Asp Leu Leu Gln Ile Ala Gly Asp Tyr
    290                 295                 300

Leu Lys Ala Ala Lys Gly Ile His Lys Asn Asp Lys Ala Ala Asn Asp
305                 310                 315                 320

His Leu Ser Ile Leu Glu Ala Trp Ser Asp Asn Asp Thr Pro Tyr Leu
                325                 330                 335

His Asp Asp Gly Asp Asn Met Ile Asn Met Asp Asn Lys Leu Arg Leu
            340                 345                 350

Ser Leu Leu Phe Ser Leu Ala Lys Pro Leu Asn Gln Arg Ser Gly Met
        355                 360                 365

Asn Pro Leu Ile Thr Asn Ser Leu Val Asn Arg Thr Asp Asp Asn Ala
    370                 375                 380

Glu Thr Ala Ala Val Pro Ser Tyr Ser Phe Ile Arg Ala His Asp Ser
385                 390                 395                 400

Glu Val Gln Asp Leu Ile Arg Asp Ile Ile Lys Ala Glu Ile Asn Pro
                405                 410                 415

Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495

Ala Arg Ile Lys Tyr Val Ser Gly Gly Gln Ala Met Arg Asn Gln Gln
            500                 505                 510

Val Gly Asn Ser Glu Ile Ile Thr Ser Val Arg Tyr Gly Lys Gly Ala
        515                 520                 525

Leu Lys Ala Thr Asp Thr Gly Asp Arg Thr Thr Arg Thr Ser Gly Val
    530                 535                 540

Ala Val Ile Glu Gly Asn Asn Pro Ser Leu Arg Leu Lys Ala Ser Asp
545                 550                 555                 560

Arg Val Val Val Asn Met Gly Ala Ala His Lys Asn Gln Ala Tyr Arg
                565                 570                 575

Pro Leu Leu Leu Thr Thr Asp Asn Gly Ile Lys Ala Tyr His Ser Asp
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655
```

```
His Gln Asn Ala Ala Leu Asp Ser Arg Val Met Phe Glu Gly Phe Ser
            660                 665                 670

Asn Phe Gln Ala Phe Ala Thr Lys Lys Glu Glu Tyr Thr Asn Val Val
        675                 680                 685

Ile Ala Lys Asn Val Asp Lys Phe Ala Glu Trp Gly Val Thr Asp Phe
    690                 695                 700

Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750

Ile Lys Ala Leu His Ser Lys Gly Ile Lys Val Met Ala Asp Trp Val
        755                 760                 765

Pro Asp Gln Met Tyr Ala Leu Pro Glu Lys Glu Val Val Thr Ala Thr
    770                 775                 780

Arg Val Asp Lys Tyr Gly Thr Pro Val Ala Gly Ser Gln Ile Lys Asn
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830

Leu Phe Ala Arg Lys Gln Ile Ser Thr Gly Val Pro Met Asp Pro Ser
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880

Tyr Phe Ser Leu Val Ser Asp Asn Thr Phe Leu Pro Lys Ser Leu Val
                885                 890                 895

Asn Pro Asn His Gly Thr Ser Ser Ser Val Thr Gly Leu Val Phe Asp
            900                 905                 910

Gly Lys Gly Tyr Val Tyr Tyr Ser Thr Ser Gly Asn Gln Ala Lys Asn
        915                 920                 925

Ala Phe Ile Ser Leu Gly Asn Asn Trp Tyr Tyr Phe Asp Asn Asn Gly
    930                 935                 940

Tyr Met Val Thr Gly Ala Gln Ser Ile Asn Gly Ala Asn Tyr Tyr Phe
945                 950                 955                 960

Leu Ser Asn Gly Ile Gln Leu Arg Asn Ala Ile Tyr Asp Asn Gly Asn
                965                 970                 975

Lys Val Leu Ser Tyr Tyr Gly Asn Asp Gly Arg Arg Tyr Glu Asn Gly
            980                 985                 990

Tyr Tyr Leu Phe Gly Gln Gln Trp  Arg Tyr Phe Gln Asn  Gly Ile Met
        995                 1000                 1005

Ala Val  Gly Leu Thr Arg Ile  His Gly Ala Val Gln  Tyr Phe Asp
    1010                 1015                 1020

Ala Ser  Gly Phe Gln Ala Lys  Gly Gln Phe Ile Thr  Thr Ala Asp
    1025                 1030                 1035

Gly Lys  Leu Arg Tyr Phe Asp  Arg Asp Ser Gly Asn  Gln Ile Ser
    1040                 1045                 1050

Asn Arg  Phe Val Arg Asn Ser  Lys Gly Glu Trp Phe  Leu Phe Asp
    1055                 1060                 1065

His Asn  Gly Val Ala Val Thr  Gly Thr Val Thr Phe  Asn Gly Gln
```

```
    1070                1075                1080

Arg Leu  Tyr Phe Lys Pro Asn  Gly Val Gln Ala Lys  Gly Glu Phe
    1085                1090                1095

Ile Arg  Asp Ala Asp Gly His  Leu Arg Tyr Tyr Asp  Pro Asn Ser
    1100                1105                1110

Gly Asn  Glu Val Arg Asn Arg  Tyr Val Arg Thr Ser  Ser Gly Asn
    1115                1120                1125

Trp Tyr  Tyr Phe Gly Asn Asp  Gly Tyr Ala Leu Ile  Gly Trp His
    1130                1135                1140

Val Val  Glu Gly Arg Arg Val  Tyr Phe Asp Glu Asn  Gly Val Tyr
    1145                1150                1155

Arg Tyr  Ala Ser His Asp Gln  Arg Asn His Trp Asp  Tyr Asp Tyr
    1160                1165                1170

Arg Arg  Asp Phe Gly Arg Gly  Ser Ser Ser Ala Val  Arg Phe Arg
    1175                1180                1185

His Ser  Arg Asn Gly Phe Phe  Asp Asn Phe Phe Arg  Phe
    1190                1195                1200


<210> SEQ ID NO 45
<211> LENGTH: 3801
<212> TYPE: DNA
<213> ORGANISM: Streptococcus troglodytae

<400> SEQUENCE: 45

gtgaacggta aatattatta ttataaagaa gatggaactc ttcaaaagaa ctatgcttta     60

aacattaatg ggaaaacttt cttctttgat gaaacgggag cattatcaaa taatacttta    120

cctagtaaaa agggtaatat cactaataat gataacacta atagctttgc tcaatataat    180

caggtctata gtacagatgc tgcaaacttc gaacatgttg atcattattt gacagctgag    240

agttggtatc gtcctaagta catcttgaaa gatggtaaaa catggacaca gtcaacagaa    300

aaagatttcc gtcctttatt gatgacatgg tggcctgacc aagaaacaca gcgtcaatat    360

gtcaactaca tgaatgcaca gcttgggatc aagcaaacat acaatacagc aaccagtccg    420

cttcaattaa atttagcggc tcagacaata caaactaaga tcgaagaaaa gatcactgca    480

gaaaagaata ccaattggct gcgtcagact atttcagcat ttgttaagac acagtcagct    540

tggaatagtg agagcgaaaa accgtttgat gatcacttac aaaaaggggc attgctttac    600

agtaacaata gcaagctaac ttcacaggct aattccaact accgtatttt aaatcgcacc    660

ccgaccaatc aaaccggaaa gaaagatcca cggtatacag ccgatcgcac catcggtggt    720

tacgagttct tgctggctaa tgatgtggat aattccaatc ctgttgttca ggccgaacag    780

ctgaactggc tgcatttttct catgaacttt ggtaacattt atgccaacga tcctgatgct    840

aactttgatt ccattcgtgt tgatgcggtg gacaatgtgg atgctgactt acttcaaatc    900

gctggtgatt acctcaaagc tgctaaaggg attcataaaa atgataaggc tgccaatgat    960

catttgtcta ttttagaggc atggagctat aacgacactc cttaccttca tgatgatggc   1020

gataatatga ttaacatgga caatagatta cgtctttcct tgctttattc attagctaaa   1080

cccttgaatc aacgttcagg catgaatcct ctcatcacta acagtctggt gaatcgaaca   1140

gatgataacg ctgaaactgc cgcagtccct tcttattcct tcattcgtgc ccatgacagt   1200

gaagtgcagg atttgattcg caatattatt agagcagaaa tcaatcctaa tgttgttggt   1260

tattctttca ccatggagga aatcaagaag gctttcgaga tttacaacaa agacttactg   1320

gctacagaga agaaatacac acactataat acggcacttt cttatgccct gcttttaact   1380
```

```
aacaaatcca gtgtgccgcg tgtctattac ggcgatatgt tcacagatga cggtcagtac   1440
atggcacata agaccattaa ttacgaagcc atcgaaactc tgcttaaagc acggattaag   1500
tatgtttcag gcggtcaggc catgcgaaac caaagtgttg gcaattctga aatcattacg   1560
tctgttcgct atggtaaggg agccctgaaa gcaacggata caggagaccg caccacacgc   1620
acttctggag tggccgtgat tgaaggcaat agcccttctt tacgtttgcg ttcttatgat   1680
cgtgttgttg tcaatatggg agctgcccat aagaaccaag cataccgacc tttactcttg   1740
accacagata acggtatcaa ggcttatcat tctgatcaag aagcggctgg tttggtgcgc   1800
tacaccaatg acagagggga attgatcttc acagcggctg atatcaaagg ctatgccaac   1860
cctcaagttt ctggctattt aggtgtttgg gtgccagtag gagctgcagc tgatcaagat   1920
gtccgtgtgg cagccagcac tgccccatca acagacggca aatcagtgca tcaaaatgca   1980
gcccttgatt ctcgtgtcat gtttgaaggc ttctcaaatt tccaagcatt tgcgactaca   2040
aaagaagagt atacgaatgt ggtcattgct aagaatgtgg ataagtttgc ggaatggggt   2100
gttacagact ttgaaatggc accgcaatat gtgtcttcaa cagatggttc tttcttggat   2160
tctgtaattc aaaatggcta tgcctttacg gatcgttatg atctgggaat ttccaaacct   2220
aataaatacg ggacagccga tgatttggtt aaggccatca aagcattgca cagcaagggc   2280
attaaggtta tggccgactg ggtgcctgat caaatgtatg ctttccctga gaaagaagtg   2340
gttgaagtca ctcgtgtgga caaatatgga catcctgttg caggcagtca aatcaaaaac   2400
acactttatg tagttgatgg taagagttcc ggaaaggacc agcaggctaa gtatggggga   2460
gctttcttag aagagctgca agctaaatat ccagagctct ttgccagaaa gcaaatttca   2520
acaggggttc cgatggaccc aactgttaag attaagcaat ggtctgccaa gtactttaat   2580
ggaacaaaca ttttagggcg gggagcaggc tatgtcttaa aggatcaggc aaccaatact   2640
tatttcagtc ttgctgcaga taataccttc cttccgaaat cattagttaa tccggatcat   2700
ggaacgagca gttctgtaat aggattagtg tatgatggta aaggctatac ttatcattca   2760
acaagcggca accaagctaa aaatgctttc attagcttag gaaataattg gtattatttc   2820
gataacaacg gctatatggt cactggtgct agaactatta acggtgctaa ttattatttc   2880
ttatcaaatg gtattcaatt gagaaatgct atttatgata atggtaataa aatattgtct   2940
tattatggaa atgacggtcg ccgttatgaa aatggttatt atctctttgg tcaacaatgg   3000
cgttatttcc aaaatggtgt tatggctgtc ggcttaacac gtgttcatgg tgctgttcaa   3060
tactttgatg cttctgggtt ccaagctaaa ggacagttta ttacaactgc tgatggaaag   3120
ctgcattatt ttgatagaga ctcaggaaat caaatttcaa atcgttttgt tagaaattcc   3180
aagggagagt ggttcttatt tgatcacaat ggtgtcgctg taactggtac gataacgttc   3240
aatggacaac gtctttactt taaacctaat ggtgttcaag ctaaaggaga atttatcaga   3300
gatgcaaatg gatatctaag atattatgat cctaattccg gaaatgaagt tcgtaatcgt   3360
tttgttagaa attccaaggg agaatggttc ttatttgatc acaatggtat cgctgcaact   3420
ggtgccagag ttgttaacgg acaacgcctc tactttaagt ctaatggtgt tcaagctaag   3480
ggtgagctca ttacagagcg taaaggtcgt attaaatatt atgatcctaa ttctggaaat   3540
gaagttcgta atcgttatgt gagaacatca tcaggaaact ggtactattt tggtaatgat   3600
ggttatgcct taattggttg gcatgttgtt gaaggaagac gtgtttactt tgatgaaaat   3660
ggtatttatc gttatgccag tcatgatcaa agaaaccact gggattatga ttacagaaga   3720
```

```
gactttggtc gtggcagcag cagtgctgtt cgttttagac accctcgtaa tggattcttt   3780

gacaatttct ttagatttta a                                             3801


<210> SEQ ID NO 46
<211> LENGTH: 1266
<212> TYPE: PRT
<213> ORGANISM: Streptococcus troglodytae

<400> SEQUENCE: 46

Val Asn Gly Lys Tyr Tyr Tyr Tyr Lys Glu Asp Gly Thr Leu Gln Lys
1               5                   10                  15

Asn Tyr Ala Leu Asn Ile Asn Gly Lys Thr Phe Phe Phe Asp Glu Thr
            20                  25                  30

Gly Ala Leu Ser Asn Asn Thr Leu Pro Ser Lys Lys Gly Asn Ile Thr
        35                  40                  45

Asn Asn Asp Asn Thr Asn Ser Phe Ala Gln Tyr Asn Gln Val Tyr Ser
    50                  55                  60

Thr Asp Ala Ala Asn Phe Glu His Val Asp His Tyr Leu Thr Ala Glu
65                  70                  75                  80

Ser Trp Tyr Arg Pro Lys Tyr Ile Leu Lys Asp Gly Lys Thr Trp Thr
                85                  90                  95

Gln Ser Thr Glu Lys Asp Phe Arg Pro Leu Leu Met Thr Trp Trp Pro
            100                 105                 110

Asp Gln Glu Thr Gln Arg Gln Tyr Val Asn Tyr Met Asn Ala Gln Leu
        115                 120                 125

Gly Ile Lys Gln Thr Tyr Asn Thr Ala Thr Ser Pro Leu Gln Leu Asn
    130                 135                 140

Leu Ala Ala Gln Thr Ile Gln Thr Lys Ile Glu Glu Lys Ile Thr Ala
145                 150                 155                 160

Glu Lys Asn Thr Asn Trp Leu Arg Gln Thr Ile Ser Ala Phe Val Lys
                165                 170                 175

Thr Gln Ser Ala Trp Asn Ser Glu Ser Glu Lys Pro Phe Asp Asp His
            180                 185                 190

Leu Gln Lys Gly Ala Leu Leu Tyr Ser Asn Asn Ser Lys Leu Thr Ser
        195                 200                 205

Gln Ala Asn Ser Asn Tyr Arg Ile Leu Asn Arg Thr Pro Thr Asn Gln
    210                 215                 220

Thr Gly Lys Lys Asp Pro Arg Tyr Thr Ala Asp Arg Thr Ile Gly Gly
225                 230                 235                 240

Tyr Glu Phe Leu Leu Ala Asn Asp Val Asp Asn Ser Asn Pro Val Val
                245                 250                 255

Gln Ala Glu Gln Leu Asn Trp Leu His Phe Leu Met Asn Phe Gly Asn
            260                 265                 270

Ile Tyr Ala Asn Asp Pro Asp Ala Asn Phe Asp Ser Ile Arg Val Asp
        275                 280                 285

Ala Val Asp Asn Val Asp Ala Asp Leu Leu Gln Ile Ala Gly Asp Tyr
    290                 295                 300

Leu Lys Ala Ala Lys Gly Ile His Lys Asn Asp Lys Ala Ala Asn Asp
305                 310                 315                 320

His Leu Ser Ile Leu Glu Ala Trp Ser Tyr Asn Asp Thr Pro Tyr Leu
                325                 330                 335

His Asp Asp Gly Asp Asn Met Ile Asn Met Asp Asn Arg Leu Arg Leu
            340                 345                 350

Ser Leu Leu Tyr Ser Leu Ala Lys Pro Leu Asn Gln Arg Ser Gly Met
```

```
        355                 360                 365

Asn Pro Leu Ile Thr Asn Ser Leu Val Asn Arg Thr Asp Asp Asn Ala
    370                 375                 380

Glu Thr Ala Ala Val Pro Ser Tyr Ser Phe Ile Arg Ala His Asp Ser
385                 390                 395                 400

Glu Val Gln Asp Leu Ile Arg Asn Ile Ile Arg Ala Glu Ile Asn Pro
                405                 410                 415

Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495

Ala Arg Ile Lys Tyr Val Ser Gly Gly Gln Ala Met Arg Asn Gln Ser
            500                 505                 510

Val Gly Asn Ser Glu Ile Ile Thr Ser Val Arg Tyr Gly Lys Gly Ala
        515                 520                 525

Leu Lys Ala Thr Asp Thr Gly Asp Arg Thr Thr Arg Thr Ser Gly Val
    530                 535                 540

Ala Val Ile Glu Gly Asn Ser Pro Ser Leu Arg Leu Arg Ser Tyr Asp
545                 550                 555                 560

Arg Val Val Val Asn Met Gly Ala Ala His Lys Asn Gln Ala Tyr Arg
                565                 570                 575

Pro Leu Leu Leu Thr Thr Asp Asn Gly Ile Lys Ala Tyr His Ser Asp
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655

His Gln Asn Ala Ala Leu Asp Ser Arg Val Met Phe Glu Gly Phe Ser
            660                 665                 670

Asn Phe Gln Ala Phe Ala Thr Thr Lys Glu Glu Tyr Thr Asn Val Val
        675                 680                 685

Ile Ala Lys Asn Val Asp Lys Phe Ala Glu Trp Gly Val Thr Asp Phe
    690                 695                 700

Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750

Ile Lys Ala Leu His Ser Lys Gly Ile Lys Val Met Ala Asp Trp Val
        755                 760                 765

Pro Asp Gln Met Tyr Ala Phe Pro Glu Lys Glu Val Val Glu Val Thr
    770                 775                 780
```

```
Arg Val Asp Lys Tyr Gly His Pro Val Ala Gly Ser Gln Ile Lys Asn
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830

Leu Phe Ala Arg Lys Gln Ile Ser Thr Gly Val Pro Met Asp Pro Thr
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880

Tyr Phe Ser Leu Ala Ala Asp Asn Thr Phe Leu Pro Lys Ser Leu Val
                885                 890                 895

Asn Pro Asp His Gly Thr Ser Ser Ser Val Ile Gly Leu Val Tyr Asp
            900                 905                 910

Gly Lys Gly Tyr Thr Tyr His Ser Thr Ser Gly Asn Gln Ala Lys Asn
        915                 920                 925

Ala Phe Ile Ser Leu Gly Asn Asn Trp Tyr Tyr Phe Asp Asn Asn Gly
    930                 935                 940

Tyr Met Val Thr Gly Ala Arg Thr Ile Asn Gly Ala Asn Tyr Tyr Phe
945                 950                 955                 960

Leu Ser Asn Gly Ile Gln Leu Arg Asn Ala Ile Tyr Asp Asn Gly Asn
                965                 970                 975

Lys Ile Leu Ser Tyr Tyr Gly Asn Asp Gly Arg Arg Tyr Glu Asn Gly
            980                 985                 990

Tyr Tyr Leu Phe Gly Gln Gln Trp  Arg Tyr Phe Gln Asn  Gly Val Met
        995                 1000                1005

Ala Val  Gly Leu Thr Arg Val  His Gly Ala Val Gln  Tyr Phe Asp
    1010                1015                1020

Ala Ser  Gly Phe Gln Ala Lys  Gly Gln Phe Ile Thr  Thr Ala Asp
    1025                1030                1035

Gly Lys  Leu His Tyr Phe Asp  Arg Asp Ser Gly Asn  Gln Ile Ser
    1040                1045                1050

Asn Arg  Phe Val Arg Asn Ser  Lys Gly Glu Trp Phe  Leu Phe Asp
    1055                1060                1065

His Asn  Gly Val Ala Val Thr  Gly Thr Ile Thr Phe  Asn Gly Gln
    1070                1075                1080

Arg Leu  Tyr Phe Lys Pro Asn  Gly Val Gln Ala Lys  Gly Glu Phe
    1085                1090                1095

Ile Arg  Asp Ala Asn Gly Tyr  Leu Arg Tyr Tyr Asp  Pro Asn Ser
    1100                1105                1110

Gly Asn  Glu Val Arg Asn Arg  Phe Val Arg Asn Ser  Lys Gly Glu
    1115                1120                1125

Trp Phe  Leu Phe Asp His Asn  Gly Ile Ala Ala Thr  Gly Ala Arg
    1130                1135                1140

Val Val  Asn Gly Gln Arg Leu  Tyr Phe Lys Ser Asn  Gly Val Gln
    1145                1150                1155

Ala Lys  Gly Glu Leu Ile Thr  Glu Arg Lys Gly Arg  Ile Lys Tyr
    1160                1165                1170

Tyr Asp  Pro Asn Ser Gly Asn  Glu Val Arg Asn Arg  Tyr Val Arg
    1175                1180                1185
```

```
Thr Ser  Ser Gly Asn Trp Tyr  Tyr Phe Gly Asn Asp  Gly Tyr Ala
    1190                 1195                 1200

Leu Ile  Gly Trp His Val Val  Glu Gly Arg Arg Val  Tyr Phe Asp
    1205                 1210                 1215

Glu Asn  Gly Ile Tyr Arg Tyr  Ala Ser His Asp Gln  Arg Asn His
    1220                 1225                 1230

Trp Asp  Tyr Asp Tyr Arg Arg  Asp Phe Gly Arg Gly  Ser Ser Ser
    1235                 1240                 1245

Ala Val  Arg Phe Arg His Pro  Arg Asn Gly Phe Phe  Asp Asn Phe
    1250                 1255                 1260

Phe Arg  Phe
    1265
```

<210> SEQ ID NO 47
<211> LENGTH: 2715
<212> TYPE: DNA
<213> ORGANISM: artificial sequence
<220> FEATURE:
<223> OTHER INFORMATION: T1 C-terminal truncation

<400> SEQUENCE: 47

```
gtgaacggta aatattatta ttataaagaa gatggaactc ttcaaaagaa ttatgcttta     60

aatattaatg ggaaaacttt cttctttgat gaaacaggag cattatcaaa taatacttta    120

cctagtaaaa agggtaatat cactaataat gataacacta acagctttgc tcaatataat    180

caggtctata gtacagatgc tgcaaacttc gaacatgttg atcattattt gacagctgag    240

agttggtatc gtcctaagta catcttgaag gatggtaaaa catggacaca gtcaacagaa    300

aaagatttcc gtcctttact gatgacatgg tggcctgacc aagaaacgca gcgtcaatat    360

gttaactaca tgaatgcaca gcttggtatt catcaaacat acaatacagc aaccagtccg    420

cttcaattga atttagctgc tcagacaata caaactaaga tcgaagaaaa aatcactgca    480

gaaaagaata ccaattggct gcgtcagact atttccgcat ttgttaagac acagtcagct    540

tggaacagtg acagcgaaaa accgtttgat gatcacttac aaaaaggggc attgctttac    600

agtaataata gcaaactaac ttcacaggct aattccaact accgtatctt aaatcgcacc    660

ccgaccaatc aaactgggaa gaaggaccca aggtatacag ccgatcgcac tatcggcggt    720

tacgaatttt tgttagccaa tgatgtggat aattccaatc ctgtcgtgca ggccgaacaa    780

ttgaactggc tacattttct catgaacttt ggtaacattt atgccaatga tccggatgct    840

aactttgatt ccattcgtgt tgatgcggta gataatgtgg atgctgactt gctccaaatt    900

gctggggatt acctcaaagc tgctaagggg attcataaaa atgataaggc tgctaatgat    960

catttgtcta ttttagaggc atggagttat aatgatactc cttaccttca tgatgatggc   1020

gacaatatga ttaacatgga taacaggtta cgtctttcct tgctttattc attagctaaa   1080

cctttgaatc aacgttcagg catgaatcct ctgatcacta acagtttggt gaatcgaact   1140

gatgataatg ctgaaactgc cgcagtccct tcttattcct tcattcgtgc tcatgacagt   1200

gaagtgcagg acttgattcg caatattatt agagcagaaa tcaatcctaa tgttgtcggg   1260

tattcattca ctatggagga aatcaagaag gctttcgaga tttacaacaa agacttatta   1320

gctacagaga agaaatacac acactataat acggcacttt cttatgccct gcttttaacc   1380

aacaaatcca gtgtgccgcg tgtctattat ggggatatgt tcacagatga cgggcaatac   1440

atggctcata agacgatcaa ttacgaagcc atcgaaaccc ttttaaaggc tcgtattaag   1500

tatgtttcag gcggtcaagc catgcgcaat caacaggttg gcaattctga aatcattacg   1560
```

```
tctgtccgct atggtaaagg tgctttgaaa gcaacggata caggggaccg caccacacgg   1620
acttcaggag tggccgtgat tgaaggcaat aacccttctt tacgtttgaa ggcttctgat   1680
cgcgtggttg tcaatatggg agcagctcat aagaaccaag cataccgacc tttactcttg   1740
accacagata acggtatcaa ggcttatcat tccgatcaag aagcggctgg tttggtgcgc   1800
tacaccaatg acagagggga attgatcttc acagcggctg atattaaagg ctatgccaac   1860
cctcaagttt ctggctattt aggtgtttgg gttccagtag gcgctgccgc tgatcaagat   1920
gttcgcgttg cggcttcaac ggccccatca acagatggca agtctgtgca tcaaaatgcg   1980
gcccttgatt cacgcgtcat gtttgaaggt ttctctaatt tccaagcatt cgccactaaa   2040
aaagaggaat ataccaatgt tgtgattgct aagaatgtgg ataagtttgc ggaatggggt   2100
gtcacagatt ttgaaatggc accgcagtat gtgtcttcaa cggatggttc tttcttggat   2160
tctgtgatcc aaaacggcta tgcttttacg gaccgttatg atttgggaat ttccaaacct   2220
aataaatacg ggacagccga tgatttggtg aaagcaataa aagcgttaca cagcaagggt   2280
attaaggtaa tggctgactg ggtgcctgat caaatgtatg cttttcctga aaaagaagtg   2340
gtaacagcaa cccgcgttga taagtatggg actcctgttg caggaagtca gatcaaaaac   2400
accctttatg tagttgatgg taagagttct ggtaaagatc aacaagccaa gtatgggggga   2460
gctttcttag aggagctgca agcgaagtat ccggagcttt ttgcgagaaa acaaatttcc   2520
acaggggttc cgatggaccc ttcagttaag attaagcaat ggtctgccaa gtactttaat   2580
gggacaaata ttttagggcg cggagcaggc tatgtcttaa aagatcaggc aaccaatact   2640
tacttcagtc ttgtttcaga caacaccttc cttcctaaat cgttagttaa cccaaatcac   2700
ggaacaagca gttaa                                                    2715
```

<210> SEQ ID NO 48
<211> LENGTH: 904
<212> TYPE: PRT
<213> ORGANISM: artificial sequence
<220> FEATURE:
<223> OTHER INFORMATION: T1 C-terminal truncation

<400> SEQUENCE: 48

```
Val Asn Gly Lys Tyr Tyr Tyr Tyr Lys Glu Asp Gly Thr Leu Gln Lys
1               5                   10                  15

Asn Tyr Ala Leu Asn Ile Asn Gly Lys Thr Phe Phe Phe Asp Glu Thr
            20                  25                  30

Gly Ala Leu Ser Asn Asn Thr Leu Pro Ser Lys Lys Gly Asn Ile Thr
        35                  40                  45

Asn Asn Asp Asn Thr Asn Ser Phe Ala Gln Tyr Asn Gln Val Tyr Ser
    50                  55                  60

Thr Asp Ala Ala Asn Phe Glu His Val Asp His Tyr Leu Thr Ala Glu
65                  70                  75                  80

Ser Trp Tyr Arg Pro Lys Tyr Ile Leu Lys Asp Gly Lys Thr Trp Thr
                85                  90                  95

Gln Ser Thr Glu Lys Asp Phe Arg Pro Leu Leu Met Thr Trp Trp Pro
            100                 105                 110

Asp Gln Glu Thr Gln Arg Gln Tyr Val Asn Tyr Met Asn Ala Gln Leu
        115                 120                 125

Gly Ile His Gln Thr Tyr Asn Thr Ala Thr Ser Pro Leu Gln Leu Asn
    130                 135                 140

Leu Ala Ala Gln Thr Ile Gln Thr Lys Ile Glu Glu Lys Ile Thr Ala
```

-continued

```
145                 150                 155                 160

Glu Lys Asn Thr Asn Trp Leu Arg Gln Thr Ile Ser Ala Phe Val Lys
                165                 170                 175

Thr Gln Ser Ala Trp Asn Ser Asp Ser Glu Lys Pro Phe Asp Asp His
            180                 185                 190

Leu Gln Lys Gly Ala Leu Leu Tyr Ser Asn Asn Ser Lys Leu Thr Ser
        195                 200                 205

Gln Ala Asn Ser Asn Tyr Arg Ile Leu Asn Arg Thr Pro Thr Asn Gln
    210                 215                 220

Thr Gly Lys Lys Asp Pro Arg Tyr Thr Ala Asp Arg Thr Ile Gly Gly
225                 230                 235                 240

Tyr Glu Phe Leu Leu Ala Asn Asp Val Asp Asn Ser Asn Pro Val Val
                245                 250                 255

Gln Ala Glu Gln Leu Asn Trp Leu His Phe Leu Met Asn Phe Gly Asn
            260                 265                 270

Ile Tyr Ala Asn Asp Pro Asp Ala Asn Phe Asp Ser Ile Arg Val Asp
        275                 280                 285

Ala Val Asp Asn Val Asp Ala Asp Leu Leu Gln Ile Ala Gly Asp Tyr
    290                 295                 300

Leu Lys Ala Ala Lys Gly Ile His Lys Asn Asp Lys Ala Ala Asn Asp
305                 310                 315                 320

His Leu Ser Ile Leu Glu Ala Trp Ser Tyr Asn Asp Thr Pro Tyr Leu
                325                 330                 335

His Asp Asp Gly Asp Asn Met Ile Asn Met Asp Asn Arg Leu Arg Leu
            340                 345                 350

Ser Leu Leu Tyr Ser Leu Ala Lys Pro Leu Asn Gln Arg Ser Gly Met
        355                 360                 365

Asn Pro Leu Ile Thr Asn Ser Leu Val Asn Arg Thr Asp Asp Asn Ala
    370                 375                 380

Glu Thr Ala Ala Val Pro Ser Tyr Ser Phe Ile Arg Ala His Asp Ser
385                 390                 395                 400

Glu Val Gln Asp Leu Ile Arg Asn Ile Ile Arg Ala Glu Ile Asn Pro
                405                 410                 415

Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495

Ala Arg Ile Lys Tyr Val Ser Gly Gly Gln Ala Met Arg Asn Gln Gln
            500                 505                 510

Val Gly Asn Ser Glu Ile Ile Thr Ser Val Arg Tyr Gly Lys Gly Ala
        515                 520                 525

Leu Lys Ala Thr Asp Thr Gly Asp Arg Thr Thr Arg Thr Ser Gly Val
    530                 535                 540

Ala Val Ile Glu Gly Asn Asn Pro Ser Leu Arg Leu Lys Ala Ser Asp
545                 550                 555                 560

Arg Val Val Val Asn Met Gly Ala Ala His Lys Asn Gln Ala Tyr Arg
                565                 570                 575
```

```
Pro Leu Leu Leu Thr Thr Asp Asn Gly Ile Lys Ala Tyr His Ser Asp
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655

His Gln Asn Ala Ala Leu Asp Ser Arg Val Met Phe Glu Gly Phe Ser
            660                 665                 670

Asn Phe Gln Ala Phe Ala Thr Lys Lys Glu Glu Tyr Thr Asn Val Val
        675                 680                 685

Ile Ala Lys Asn Val Asp Lys Phe Ala Glu Trp Gly Val Thr Asp Phe
    690                 695                 700

Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750

Ile Lys Ala Leu His Ser Lys Gly Ile Lys Val Met Ala Asp Trp Val
        755                 760                 765

Pro Asp Gln Met Tyr Ala Phe Pro Glu Lys Glu Val Val Thr Ala Thr
    770                 775                 780

Arg Val Asp Lys Tyr Gly Thr Pro Val Ala Gly Ser Gln Ile Lys Asn
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830

Leu Phe Ala Arg Lys Gln Ile Ser Thr Gly Val Pro Met Asp Pro Ser
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880

Tyr Phe Ser Leu Val Ser Asp Asn Thr Phe Leu Pro Lys Ser Leu Val
                885                 890                 895

Asn Pro Asn His Gly Thr Ser Ser
            900
```

<210> SEQ ID NO 49
<211> LENGTH: 2715
<212> TYPE: DNA
<213> ORGANISM: artificial sequence
<220> FEATURE:
<223> OTHER INFORMATION: T1 C-terminal truncation

<400> SEQUENCE: 49

```
gtgaacggta aatattatta ttataaagaa gatggaactc ttcaaaagaa ttatgcttta      60

aacattaatg ggaaaacttt cttctttgat gaaacaggag cattatcaaa taatacttta     120

cctagtaaaa agggtaatat cactaataat gataacacta acagctttgc tcaatataat     180
```

```
caggtctata gtacagatgc tgcaaacttc gaacatgttg atcattattt gacagccgaa    240
agttggtatc gtcctaagta catcttgaag gatggcaaaa catggacaca gtcaacagaa    300
aaagatttcc gtcctttact gatgacatgg tggcctgacc aagaaacgca gcgtcaatat    360
gttaactaca tgaatgcaca gcttggtatt catcaaacat acaatacagc aacttcaccg    420
cttcaattga atttagctgc tcagacaata caaactaaga tcgaagaaaa aatcactgca    480
gaaaagaata ccaattggct gcgtcagact atttccgcat ttgttaagac acagtcagct    540
tggaacagtg acagcgaaaa accgtttgat gatcacttac aaaaaggggc attgctttac    600
agtaataata gcaaactaac ttcacaggct aattccaact accgtatctt aaatcgcacc    660
ccgaccaatc aaactgggaa gaaggaccca aggtatacag ctgataacac tatcggcggt    720
tacgaatttc ttttggcaaa cgatgtggat aattccaatc ctgtcgtgca ggccgaacaa    780
ttgaactggc tccattttct catgaacttt ggtaacattt atgccaatga tccggatgct    840
aactttgatt ccattcgtgt tgatgcggta gataatgtgg atgctgactt gctccaaatt    900
gctggggatt acctcaaagc tgctaagggg attcataaaa atgataaggc tgctaatgat    960
catttgtcta ttttagaggc atggagttat aatgatactc cttaccttca tgatgatggc   1020
gacaatatga ttaacatgga taacaggtta cgtctttcct tgctttattc attagctaaa   1080
cccttaaatc aacgttcagg catgaatcct ctgatcacta acagtttggt gaatcgaact   1140
gatgataatg ctgaaactgc cgcagtccct tcttattcct tcatccgtgc ccatgacagt   1200
gaagtgcagg acttgattcg caatattatt agaacagaaa tcaatcctaa tgttgtcggg   1260
tattctttca ctatggagga aatcaagaag gctttcgaga tttacaacaa agacttgtta   1320
gctacagaga agaaatacac acactataat acggcacttt cttatgccct gcttttaacc   1380
aacaaatcca gtgtgccgcg tgtctattat ggggatatgt ttacagatga cgggcaatac   1440
atggctcata agacgatcaa ttacgaagcc atcgaaaccc tgcttaaggc tcgtattaag   1500
tatgtttcag gcggtcaagc catgcgcaat caacaggttg gcaattctga aattattacg   1560
tctgtccgct atggtaaagg tgctttgaaa gcaacggata caggggaccg caccacacga   1620
acttcaggag tggccgtgat tgaaggcaat aacccttctt tacgtttgaa ggcttctgat   1680
cgtgttgttg tcaatatggg agcagcccat aagaaccaag cataccgacc tttactcttg   1740
accacagata acggtatcaa ggcttatcat tccgatcaag aagcggctgg tttggtgcgc   1800
tacaccaatg acagagggga attgatcttc acagcggctg atattaaagg ctatgccaac   1860
cctcaagttt ctggctattt aggtgtctgg gttccagtag gcgctgccgc tgatcaagat   1920
gttcgcgttg cggcttcaac ggccccatca acagatggca agtctgtgca tcaaaatgcg   1980
gcccttgatt cacgcgtcat gtttgaaggt ttctctaatt tccaagcatt cgccactaaa   2040
aaagaggaat ataccaatgt tgtgattgct aagaatgtgg ataagtttgc ggaatggggt   2100
gtcacagatt ttgaaatggc accgcagtat gtgtcttcaa cagatggttc tttcttggat   2160
tctgtgatcc aaaacggcta tgcttttacg gatcgttatg atttgggaat ttccaaacct   2220
aataaatacg ggacagccga tgatttggtt aaggccatca aagcgttaca cagcaagggc   2280
attaaggtaa tggctgactg ggtgcctgat caaatgtatg ctctccctga aaaagaagtg   2340
gtaacagcaa cccgcgttga taagtatggg actcctgttg caggaagtca gatcaaaaac   2400
accctttatg tagttgatgg taagagttct ggtaaagatc aacaagccaa gtatggggga   2460
gccttcttag aggagctgca agcgaagtat ccggagcttt ttgcgagaaa gcaaatttcc   2520
```

```
acaggggttc cgatggaccc ttcagttaag attaagcaat ggtctgccaa gtactttaat   2580

gggacaaata ttttagggcg cggagcaggc tatgtcttaa aagatcaggc aactaatact   2640

tacttcagtc ttgtttcaga caacaccttc cttcctaaat cgttagttaa cccaaatcac   2700

ggaacaagca gttaa                                                    2715


<210> SEQ ID NO 50
<211> LENGTH: 904
<212> TYPE: PRT
<213> ORGANISM: artificial sequence
<220> FEATURE:
<223> OTHER INFORMATION: T1 C-terminal truncation

<400> SEQUENCE: 50

Val Asn Gly Lys Tyr Tyr Tyr Tyr Lys Glu Asp Gly Thr Leu Gln Lys
1               5                   10                  15

Asn Tyr Ala Leu Asn Ile Asn Gly Lys Thr Phe Phe Phe Asp Glu Thr
            20                  25                  30

Gly Ala Leu Ser Asn Asn Thr Leu Pro Ser Lys Lys Gly Asn Ile Thr
        35                  40                  45

Asn Asn Asp Asn Thr Asn Ser Phe Ala Gln Tyr Asn Gln Val Tyr Ser
    50                  55                  60

Thr Asp Ala Ala Asn Phe Glu His Val Asp His Tyr Leu Thr Ala Glu
65                  70                  75                  80

Ser Trp Tyr Arg Pro Lys Tyr Ile Leu Lys Asp Gly Lys Thr Trp Thr
                85                  90                  95

Gln Ser Thr Glu Lys Asp Phe Arg Pro Leu Leu Met Thr Trp Trp Pro
            100                 105                 110

Asp Gln Glu Thr Gln Arg Gln Tyr Val Asn Tyr Met Asn Ala Gln Leu
        115                 120                 125

Gly Ile His Gln Thr Tyr Asn Thr Ala Thr Ser Pro Leu Gln Leu Asn
    130                 135                 140

Leu Ala Ala Gln Thr Ile Gln Thr Lys Ile Glu Glu Lys Ile Thr Ala
145                 150                 155                 160

Glu Lys Asn Thr Asn Trp Leu Arg Gln Thr Ile Ser Ala Phe Val Lys
                165                 170                 175

Thr Gln Ser Ala Trp Asn Ser Asp Ser Glu Lys Pro Phe Asp Asp His
            180                 185                 190

Leu Gln Lys Gly Ala Leu Leu Tyr Ser Asn Asn Ser Lys Leu Thr Ser
        195                 200                 205

Gln Ala Asn Ser Asn Tyr Arg Ile Leu Asn Arg Thr Pro Thr Asn Gln
    210                 215                 220

Thr Gly Lys Lys Asp Pro Arg Tyr Thr Ala Asp Asn Thr Ile Gly Gly
225                 230                 235                 240

Tyr Glu Phe Leu Leu Ala Asn Asp Val Asp Asn Ser Asn Pro Val Val
                245                 250                 255

Gln Ala Glu Gln Leu Asn Trp Leu His Phe Leu Met Asn Phe Gly Asn
            260                 265                 270

Ile Tyr Ala Asn Asp Pro Asp Ala Asn Phe Asp Ser Ile Arg Val Asp
        275                 280                 285

Ala Val Asp Asn Val Asp Ala Asp Leu Leu Gln Ile Ala Gly Asp Tyr
    290                 295                 300

Leu Lys Ala Ala Lys Gly Ile His Lys Asn Asp Lys Ala Ala Asn Asp
305                 310                 315                 320

His Leu Ser Ile Leu Glu Ala Trp Ser Tyr Asn Asp Thr Pro Tyr Leu
```

```
                325                 330                 335

His Asp Asp Gly Asp Asn Met Ile Asn Met Asp Asn Arg Leu Arg Leu
            340                 345                 350

Ser Leu Leu Tyr Ser Leu Ala Lys Pro Leu Asn Gln Arg Ser Gly Met
        355                 360                 365

Asn Pro Leu Ile Thr Asn Ser Leu Val Asn Arg Thr Asp Asp Asn Ala
    370                 375                 380

Glu Thr Ala Ala Val Pro Ser Tyr Ser Phe Ile Arg Ala His Asp Ser
385                 390                 395                 400

Glu Val Gln Asp Leu Ile Arg Asn Ile Ile Arg Thr Glu Ile Asn Pro
                405                 410                 415

Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495

Ala Arg Ile Lys Tyr Val Ser Gly Gly Gln Ala Met Arg Asn Gln Gln
            500                 505                 510

Val Gly Asn Ser Glu Ile Ile Thr Ser Val Arg Tyr Gly Lys Gly Ala
        515                 520                 525

Leu Lys Ala Thr Asp Thr Gly Asp Arg Thr Thr Arg Thr Ser Gly Val
    530                 535                 540

Ala Val Ile Glu Gly Asn Asn Pro Ser Leu Arg Leu Lys Ala Ser Asp
545                 550                 555                 560

Arg Val Val Val Asn Met Gly Ala Ala His Lys Asn Gln Ala Tyr Arg
                565                 570                 575

Pro Leu Leu Leu Thr Thr Asp Asn Gly Ile Lys Ala Tyr His Ser Asp
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655

His Gln Asn Ala Ala Leu Asp Ser Arg Val Met Phe Glu Gly Phe Ser
            660                 665                 670

Asn Phe Gln Ala Phe Ala Thr Lys Lys Glu Glu Tyr Thr Asn Val Val
        675                 680                 685

Ile Ala Lys Asn Val Asp Lys Phe Ala Glu Trp Gly Val Thr Asp Phe
    690                 695                 700

Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750
```

```
Ile Lys Ala Leu His Ser Lys Gly Ile Lys Val Met Ala Asp Trp Val
        755                 760                 765

Pro Asp Gln Met Tyr Ala Leu Pro Glu Lys Glu Val Val Thr Ala Thr
    770                 775                 780

Arg Val Asp Lys Tyr Gly Thr Pro Val Ala Gly Ser Gln Ile Lys Asn
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830

Leu Phe Ala Arg Lys Gln Ile Ser Thr Gly Val Pro Met Asp Pro Ser
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880

Tyr Phe Ser Leu Val Ser Asp Asn Thr Phe Leu Pro Lys Ser Leu Val
                885                 890                 895

Asn Pro Asn His Gly Thr Ser Ser
            900
```

<210> SEQ ID NO 51
<211> LENGTH: 2715
<212> TYPE: DNA
<213> ORGANISM: artificial sequence
<220> FEATURE:
<223> OTHER INFORMATION: T1 C-terminal truncation

<400> SEQUENCE: 51

```
gtgaacggta aatattatta ttataaagaa gatggaactc ttcaaaagaa ctatgcttta      60

aacattaatg ggaaaacttt cttctttgat gaaacgggag cattatcaaa taatacttta     120

cctagtaaaa agggtaatat cactaataat gataacacta atagctttgc tcaatataat     180

caggtctata gtacagatgc tgcaaacttc gaacatgttg atcattattt gacagctgag     240

agttggtatc gtcctaagta catcttgaaa gatggtaaaa catggacaca gtcaacagaa     300

aaagatttcc gtcctttatt gatgacatgg tggcctgacc aagaaacaca gcgtcaatat     360

gtcaactaca tgaatgcaca gcttgggatc aagcaaacat acaatacagc aaccagtccg     420

cttcaattaa atttagcggc tcagacaata caaactaaga tcgaagaaaa gatcactgca     480

gaaaagaata ccaattggct gcgtcagact atttcagcat ttgttaagac acagtcagct     540

tggaatagtg agagcgaaaa accgtttgat gatcacttac aaaaaggggc attgctttac     600

agtaacaata gcaagctaac ttcacaggct aattccaact accgtatttt aaatcgcacc     660

ccgaccaatc aaaccggaaa gaaagatcca cggtatacag ccgatcgcac catcggtggt     720

tacgagttct tgctggctaa tgatgtggat aattccaatc ctgttgttca ggccgaacag     780

ctgaactggc tgcattttct catgaacttt ggtaacattt atgccaacga tcctgatgct     840

aactttgatt ccattcgtgt tgatgcggtg gacaatgtgg atgctgactt acttcaaatc     900

gctggtgatt acctcaaagc tgctaaaggg attcataaaa atgataaggc tgccaatgat     960

catttgtcta ttttagaggc atggagctat aacgacactc cttaccttca tgatgatggc    1020

gataatatga ttaacatgga caatagatta cgtctttcct tgctttattc attagctaaa    1080

cccttgaatc aacgttcagg catgaatcct ctcatcacta acagtctggt gaatcgaaca    1140
```

```
gatgataacg ctgaaactgc cgcagtccct tcttattcct tcattcgtgc ccatgacagt   1200

gaagtgcagg atttgattcg caatattatt agagcagaaa tcaatcctaa tgttgttggt   1260

tattctttca ccatggagga aatcaagaag gctttcgaga tttacaacaa agacttactg   1320

gctacagaga agaaatacac acactataat acggcacttt cttatgccct gcttttaact   1380

aacaaatcca gtgtgccgcg tgtctattac ggcgatatgt tcacagatga cggtcagtac   1440

atggcacata agaccattaa ttacgaagcc atcgaaactc tgcttaaagc acggattaag   1500

tatgtttcag gcggtcaggc catgcgaaac caaagtgttg gcaattctga aatcattacg   1560

tctgttcgct atggtaaggg agccctgaaa gcaacggata caggagaccg caccacacgc   1620

acttctggag tggccgtgat tgaaggcaat agcccttctt tacgtttgcg ttcttatgat   1680

cgtgttgttg tcaatatggg agctgcccat aagaaccaag cataccgacc tttactcttg   1740

accacagata acggtatcaa ggcttatcat tctgatcaag aagcggctgg tttggtgcgc   1800

tacaccaatg acagagggga attgatcttc acagcggctg atatcaaagg ctatgccaac   1860

cctcaagttt ctggctattt aggtgtttgg gtgccagtag gagctgcagc tgatcaagat   1920

gtccgtgtgg cagccagcac tgccccatca acagacggca aatcagtgca tcaaaatgca   1980

gcccttgatt ctcgtgtcat gtttgaaggc ttctcaaatt tccaagcatt tgcgactaca   2040

aaagaagagt atacgaatgt ggtcattgct aagaatgtgg ataagtttgc ggaatggggt   2100

gttacagact ttgaaatggc accgcaatat gtgtcttcaa cagatggttc tttcttggat   2160

tctgtaattc aaaatggcta tgcctttacg gatcgttatg atctgggaat ttccaaacct   2220

aataaatacg ggacagccga tgatttggtt aaggccatca aagcattgca cagcaagggc   2280

attaaggtta tggccgactg ggtgcctgat caaatgtatg ctttccctga gaaagaagtg   2340

gttgaagtca ctcgtgtgga caaatatgga catcctgttg caggcagtca aatcaaaaac   2400

acactttatg tagttgatgg taagagttcc ggaaaggacc agcaggctaa gtatggggga   2460

gctttcttag aagagctgca agctaaatat ccagagctct ttgccagaaa gcaaatttca   2520

acaggggttc cgatggaccc aactgttaag attaagcaat ggtctgccaa gtactttaat   2580

ggaacaaaca ttttagggcg gggagcaggc tatgtcttaa aggatcaggc aaccaatact   2640

tatttcagtc ttgctgcaga taataccttc cttccgaaat cattagttaa tccggatcat   2700

ggaacgagca gttaa                                                    2715
```

```
<210> SEQ ID NO 52
<211> LENGTH: 904
<212> TYPE: PRT
<213> ORGANISM: artificial sequence
<220> FEATURE:
<223> OTHER INFORMATION: T1 C-terminal truncation

<400> SEQUENCE: 52

Val Asn Gly Lys Tyr Tyr Tyr Tyr Lys Glu Asp Gly Thr Leu Gln Lys
1               5                   10                  15

Asn Tyr Ala Leu Asn Ile Asn Gly Lys Thr Phe Phe Phe Asp Glu Thr
            20                  25                  30

Gly Ala Leu Ser Asn Asn Thr Leu Pro Ser Lys Lys Gly Asn Ile Thr
        35                  40                  45

Asn Asn Asp Asn Thr Asn Ser Phe Ala Gln Tyr Asn Gln Val Tyr Ser
    50                  55                  60

Thr Asp Ala Ala Asn Phe Glu His Val Asp His Tyr Leu Thr Ala Glu
65                  70                  75                  80
```

```
Ser Trp Tyr Arg Pro Lys Tyr Ile Leu Lys Asp Gly Lys Thr Trp Thr
                85                  90                  95

Gln Ser Thr Glu Lys Asp Phe Arg Pro Leu Leu Met Thr Trp Trp Pro
            100                 105                 110

Asp Gln Glu Thr Gln Arg Gln Tyr Val Asn Tyr Met Asn Ala Gln Leu
        115                 120                 125

Gly Ile Lys Gln Thr Tyr Asn Thr Ala Thr Ser Pro Leu Gln Leu Asn
    130                 135                 140

Leu Ala Ala Gln Thr Ile Gln Thr Lys Ile Glu Glu Lys Ile Thr Ala
145                 150                 155                 160

Glu Lys Asn Thr Asn Trp Leu Arg Gln Thr Ile Ser Ala Phe Val Lys
                165                 170                 175

Thr Gln Ser Ala Trp Asn Ser Glu Ser Glu Lys Pro Phe Asp Asp His
            180                 185                 190

Leu Gln Lys Gly Ala Leu Leu Tyr Ser Asn Asn Ser Lys Leu Thr Ser
        195                 200                 205

Gln Ala Asn Ser Asn Tyr Arg Ile Leu Asn Arg Thr Pro Thr Asn Gln
    210                 215                 220

Thr Gly Lys Lys Asp Pro Arg Tyr Thr Ala Asp Arg Thr Ile Gly Gly
225                 230                 235                 240

Tyr Glu Phe Leu Leu Ala Asn Asp Val Asp Asn Ser Asn Pro Val Val
                245                 250                 255

Gln Ala Glu Gln Leu Asn Trp Leu His Phe Leu Met Asn Phe Gly Asn
            260                 265                 270

Ile Tyr Ala Asn Asp Pro Asp Ala Asn Phe Asp Ser Ile Arg Val Asp
        275                 280                 285

Ala Val Asp Asn Val Asp Ala Asp Leu Leu Gln Ile Ala Gly Asp Tyr
    290                 295                 300

Leu Lys Ala Ala Lys Gly Ile His Lys Asn Asp Lys Ala Ala Asn Asp
305                 310                 315                 320

His Leu Ser Ile Leu Glu Ala Trp Ser Tyr Asn Asp Thr Pro Tyr Leu
                325                 330                 335

His Asp Asp Gly Asp Asn Met Ile Asn Met Asp Asn Arg Leu Arg Leu
            340                 345                 350

Ser Leu Leu Tyr Ser Leu Ala Lys Pro Leu Asn Gln Arg Ser Gly Met
        355                 360                 365

Asn Pro Leu Ile Thr Asn Ser Leu Val Asn Arg Thr Asp Asp Asn Ala
    370                 375                 380

Glu Thr Ala Ala Val Pro Ser Tyr Ser Phe Ile Arg Ala His Asp Ser
385                 390                 395                 400

Glu Val Gln Asp Leu Ile Arg Asn Ile Ile Arg Ala Glu Ile Asn Pro
                405                 410                 415

Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495

Ala Arg Ile Lys Tyr Val Ser Gly Gly Gln Ala Met Arg Asn Gln Ser
```

```
            500                 505                 510

Val Gly Asn Ser Glu Ile Ile Thr Ser Val Arg Tyr Gly Lys Gly Ala
        515                 520                 525

Leu Lys Ala Thr Asp Thr Gly Asp Arg Thr Thr Arg Thr Ser Gly Val
    530                 535                 540

Ala Val Ile Glu Gly Asn Ser Pro Ser Leu Arg Leu Arg Ser Tyr Asp
545                 550                 555                 560

Arg Val Val Val Asn Met Gly Ala Ala His Lys Asn Gln Ala Tyr Arg
                565                 570                 575

Pro Leu Leu Leu Thr Thr Asp Asn Gly Ile Lys Ala Tyr His Ser Asp
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655

His Gln Asn Ala Ala Leu Asp Ser Arg Val Met Phe Glu Gly Phe Ser
            660                 665                 670

Asn Phe Gln Ala Phe Ala Thr Thr Lys Glu Glu Tyr Thr Asn Val Val
        675                 680                 685

Ile Ala Lys Asn Val Asp Lys Phe Ala Glu Trp Gly Val Thr Asp Phe
    690                 695                 700

Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750

Ile Lys Ala Leu His Ser Lys Gly Ile Lys Val Met Ala Asp Trp Val
        755                 760                 765

Pro Asp Gln Met Tyr Ala Phe Pro Glu Lys Glu Val Val Glu Val Thr
    770                 775                 780

Arg Val Asp Lys Tyr Gly His Pro Val Ala Gly Ser Gln Ile Lys Asn
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830

Leu Phe Ala Arg Lys Gln Ile Ser Thr Gly Val Pro Met Asp Pro Thr
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880

Tyr Phe Ser Leu Ala Ala Asp Asn Thr Phe Leu Pro Lys Ser Leu Val
                885                 890                 895

Asn Pro Asp His Gly Thr Ser Ser
            900
```

<210> SEQ ID NO 53

<211> LENGTH: 2715
<212> TYPE: DNA
<213> ORGANISM: artificial sequence
<220> FEATURE:
<223> OTHER INFORMATION: T1 C-terminal truncation

<400> SEQUENCE: 53

```
gtgaacggta aatattatta ttataaagaa gatggaactc ttcaaaagaa ttatgcttta     60
aatattaatg ggaaaacttt cttctttgat gaaacaggag cattatcaaa taatacttta    120
cctagtaaaa agggtaatat cactaataat gataacacta acagctttgc tcaatataat    180
caggtctata gtacagatgc tgcaaacttc gaacatgttg atcattattt gacagctgag    240
agttggtatc gtcctaaata catcttaaaa gatggcaaaa catggacaca gtcaacagaa    300
aaagatttcc gtcccttact gatgacatgg tggcctgacc aagaaacgca gcgtcaatat    360
gttaactaca tgaatgcaca gcttggtatt catcgaacat acaatacagc aacttcaccg    420
cttcaattga atttagctgc tcagacaata caaactaaga tcgaagaaaa aatcactgca    480
gaaaagaata ccaattggct gcgtcagact atttccgcat ttgttaagac acagtcagct    540
tggaacagtg acagcgaaaa accgtttgat gatcacttac aaaaaggggc attgctttac    600
agtaataata gcaaactaac ttcacaggct aattccaact accgtatctt aaatcgcacc    660
ccgaccaatc aaaccggaaa gaaagatcca aggtatacag ctgatcgcac tatcggcggt    720
tacgaatttc ttttggcaaa cgatgtggat aattctaatc ctgtcgtgca ggccgaacaa    780
ttgaactggc tacattttct catgaacttt ggtaacattt atgccaatga tccggatgct    840
aactttgatt ccattcgtgt tgatgcggtg gataatgtgg atgctgactt gctccaaatt    900
gctggggatt acctcaaagc tgctaagggg attcataaaa atgataaggc tgctaatgat    960
catttgtcta ttttagaggc atggagttat aatgatactc cttaccttca tgatgatggc   1020
gacaatatga ttaacatgga taacaggtta cgtctttcct tgctttattc attagctaaa   1080
cctttgaatc aacgttcagg catgaatcct ctgatcacta acagtttggt gaatcgaact   1140
gatgataatg ctgaaactgc cgcagtccct tcttattcct tcatccgtgc ccatgacagt   1200
gaagtgcagg acttgattcg caatattatt agagcagaaa tcaatcctaa tgttgtcggg   1260
tattctttca ctatggagga aatcaagaag gctttcgaga tttacaacaa agacttatta   1320
gctacagaga agaaatacac acactataat acggcacttt cttatgccct gcttttaacc   1380
aacaaatcca gtgtgccgcg tgtctattat ggggatatgt tcacagatga cgggcaatac   1440
atggctcata agacgatcaa ttacgaagcc atcgaaaccc ttttaaaggc tcgtattaag   1500
tatgtttcag gcggtcaagc catgcgcaat caacaggttg gcaattctga aatcattacg   1560
tctgtccgct atggtaaagg tgctttgaaa gcaacggata caggggaccg caccacacgg   1620
acttcaggag tggccgtgat tgaaggcaat aacccttctt tacgtttgaa ggcttctgat   1680
cgcgtggttg tcaatatggg agcagcccat aagaaccaag cataccgtcc attattgtta   1740
actaccaaca atgggattaa agcatatcat tccgatcaag aagcggctgg tttggtgcgc   1800
tacaccaatg acagagggga attgatcttc acagcggctg atattaaagg ctatgccaac   1860
cctcaagttt ctggctattt aggtgtttgg gttccagtag gcgctgccgc tgatcaagat   1920
gttcgcgttg cggcttcaac ggccccatca acagatggca agtctgtgca tcaaaatgcg   1980
gcccttgatt cacgcgtcat gtttgaaggt ttctctaatt tccaagcatt cgccactaaa   2040
aaagaggaat ataccaatgt tgtgattgct aagaatgtgg ataagtttgc ggaatggggg   2100
gtcacagatt ttgaaatggc accgcagtat gtgtcttcaa cagatggttc tttcttggat   2160
```

```
tctgtgatcc aaaacggcta tgcttttacg gaccgttatg atttaggaat ttccaaacct   2220

aataaatacg ggacagccga tgatttggtg aaagccatca aagcgttaca cagcaagggc   2280

attaaggtaa tggctgactg ggtgcctgat caaatgtatg ctctccctga aaaagaagtg   2340

gtaacagcaa cccgtgttga taagtatggg actcctgttg caggaagtca gataaaaaac   2400

accctttatg tagttgatgg taagagttct ggtaaagatc aacaagccaa gtatgggga    2460

gctttcttag aggagctgca agctaaatat ccggagcttt ttgcgagaaa acaaatttcc   2520

acaggggttc cgatggaccc ttcagttaag attaagcaat ggtctgccaa gtactttaat   2580

gggacaaata ttttagggcg cggagcaggc tatgtcttaa aagatcaggc aaccaatact   2640

tacttcagtc ttgtttcaga caacaccttc cttcctaaat cgttagttaa cccaaatcac   2700

ggaacaagca gttaa                                                     2715
```

```
<210> SEQ ID NO 54
<211> LENGTH: 904
<212> TYPE: PRT
<213> ORGANISM: artificial sequence
<220> FEATURE:
<223> OTHER INFORMATION: T1 C-terminal truncation

<400> SEQUENCE: 54

Val Asn Gly Lys Tyr Tyr Tyr Tyr Lys Glu Asp Gly Thr Leu Gln Lys
1               5                   10                  15

Asn Tyr Ala Leu Asn Ile Asn Gly Lys Thr Phe Phe Phe Asp Glu Thr
            20                  25                  30

Gly Ala Leu Ser Asn Asn Thr Leu Pro Ser Lys Lys Gly Asn Ile Thr
        35                  40                  45

Asn Asn Asp Asn Thr Asn Ser Phe Ala Gln Tyr Asn Gln Val Tyr Ser
    50                  55                  60

Thr Asp Ala Ala Asn Phe Glu His Val Asp His Tyr Leu Thr Ala Glu
65                  70                  75                  80

Ser Trp Tyr Arg Pro Lys Tyr Ile Leu Lys Asp Gly Lys Thr Trp Thr
                85                  90                  95

Gln Ser Thr Glu Lys Asp Phe Arg Pro Leu Leu Met Thr Trp Trp Pro
            100                 105                 110

Asp Gln Glu Thr Gln Arg Gln Tyr Val Asn Tyr Met Asn Ala Gln Leu
        115                 120                 125

Gly Ile His Arg Thr Tyr Asn Thr Ala Thr Ser Pro Leu Gln Leu Asn
    130                 135                 140

Leu Ala Ala Gln Thr Ile Gln Thr Lys Ile Glu Glu Lys Ile Thr Ala
145                 150                 155                 160

Glu Lys Asn Thr Asn Trp Leu Arg Gln Thr Ile Ser Ala Phe Val Lys
                165                 170                 175

Thr Gln Ser Ala Trp Asn Ser Asp Ser Glu Lys Pro Phe Asp Asp His
            180                 185                 190

Leu Gln Lys Gly Ala Leu Leu Tyr Ser Asn Asn Ser Lys Leu Thr Ser
        195                 200                 205

Gln Ala Asn Ser Asn Tyr Arg Ile Leu Asn Arg Thr Pro Thr Asn Gln
    210                 215                 220

Thr Gly Lys Lys Asp Pro Arg Tyr Thr Ala Asp Arg Thr Ile Gly Gly
225                 230                 235                 240

Tyr Glu Phe Leu Leu Ala Asn Asp Val Asp Asn Ser Asn Pro Val Val
                245                 250                 255
```

```
Gln Ala Glu Gln Leu Asn Trp Leu His Phe Leu Met Asn Phe Gly Asn
            260                 265                 270

Ile Tyr Ala Asn Asp Pro Asp Ala Asn Phe Asp Ser Ile Arg Val Asp
        275                 280                 285

Ala Val Asp Asn Val Asp Ala Asp Leu Leu Gln Ile Ala Gly Asp Tyr
    290                 295                 300

Leu Lys Ala Ala Lys Gly Ile His Lys Asn Asp Lys Ala Ala Asn Asp
305                 310                 315                 320

His Leu Ser Ile Leu Glu Ala Trp Ser Tyr Asn Asp Thr Pro Tyr Leu
                325                 330                 335

His Asp Asp Gly Asp Asn Met Ile Asn Met Asp Asn Arg Leu Arg Leu
            340                 345                 350

Ser Leu Leu Tyr Ser Leu Ala Lys Pro Leu Asn Gln Arg Ser Gly Met
        355                 360                 365

Asn Pro Leu Ile Thr Asn Ser Leu Val Asn Arg Thr Asp Asp Asn Ala
    370                 375                 380

Glu Thr Ala Ala Val Pro Ser Tyr Ser Phe Ile Arg Ala His Asp Ser
385                 390                 395                 400

Glu Val Gln Asp Leu Ile Arg Asn Ile Ile Arg Ala Glu Ile Asn Pro
                405                 410                 415

Asn Val Val Gly Tyr Ser Phe Thr Met Glu Glu Ile Lys Lys Ala Phe
            420                 425                 430

Glu Ile Tyr Asn Lys Asp Leu Leu Ala Thr Glu Lys Lys Tyr Thr His
        435                 440                 445

Tyr Asn Thr Ala Leu Ser Tyr Ala Leu Leu Leu Thr Asn Lys Ser Ser
    450                 455                 460

Val Pro Arg Val Tyr Tyr Gly Asp Met Phe Thr Asp Asp Gly Gln Tyr
465                 470                 475                 480

Met Ala His Lys Thr Ile Asn Tyr Glu Ala Ile Glu Thr Leu Leu Lys
                485                 490                 495

Ala Arg Ile Lys Tyr Val Ser Gly Gly Gln Ala Met Arg Asn Gln Gln
            500                 505                 510

Val Gly Asn Ser Glu Ile Ile Thr Ser Val Arg Tyr Gly Lys Gly Ala
        515                 520                 525

Leu Lys Ala Thr Asp Thr Gly Asp Arg Thr Thr Arg Thr Ser Gly Val
    530                 535                 540

Ala Val Ile Glu Gly Asn Asn Pro Ser Leu Arg Leu Lys Ala Ser Asp
545                 550                 555                 560

Arg Val Val Val Asn Met Gly Ala Ala His Lys Asn Gln Ala Tyr Arg
                565                 570                 575

Pro Leu Leu Leu Thr Thr Asn Asn Gly Ile Lys Ala Tyr His Ser Asp
            580                 585                 590

Gln Glu Ala Ala Gly Leu Val Arg Tyr Thr Asn Asp Arg Gly Glu Leu
        595                 600                 605

Ile Phe Thr Ala Ala Asp Ile Lys Gly Tyr Ala Asn Pro Gln Val Ser
    610                 615                 620

Gly Tyr Leu Gly Val Trp Val Pro Val Gly Ala Ala Ala Asp Gln Asp
625                 630                 635                 640

Val Arg Val Ala Ala Ser Thr Ala Pro Ser Thr Asp Gly Lys Ser Val
                645                 650                 655

His Gln Asn Ala Ala Leu Asp Ser Arg Val Met Phe Glu Gly Phe Ser
            660                 665                 670

Asn Phe Gln Ala Phe Ala Thr Lys Lys Glu Glu Tyr Thr Asn Val Val
```

```
        675                 680                 685

Ile Ala Lys Asn Val Asp Lys Phe Ala Glu Trp Gly Val Thr Asp Phe
    690                 695                 700

Glu Met Ala Pro Gln Tyr Val Ser Ser Thr Asp Gly Ser Phe Leu Asp
705                 710                 715                 720

Ser Val Ile Gln Asn Gly Tyr Ala Phe Thr Asp Arg Tyr Asp Leu Gly
                725                 730                 735

Ile Ser Lys Pro Asn Lys Tyr Gly Thr Ala Asp Asp Leu Val Lys Ala
            740                 745                 750

Ile Lys Ala Leu His Ser Lys Gly Ile Lys Val Met Ala Asp Trp Val
        755                 760                 765

Pro Asp Gln Met Tyr Ala Leu Pro Glu Lys Glu Val Val Thr Ala Thr
    770                 775                 780

Arg Val Asp Lys Tyr Gly Thr Pro Val Ala Gly Ser Gln Ile Lys Asn
785                 790                 795                 800

Thr Leu Tyr Val Val Asp Gly Lys Ser Ser Gly Lys Asp Gln Gln Ala
                805                 810                 815

Lys Tyr Gly Gly Ala Phe Leu Glu Glu Leu Gln Ala Lys Tyr Pro Glu
            820                 825                 830

Leu Phe Ala Arg Lys Gln Ile Ser Thr Gly Val Pro Met Asp Pro Ser
        835                 840                 845

Val Lys Ile Lys Gln Trp Ser Ala Lys Tyr Phe Asn Gly Thr Asn Ile
    850                 855                 860

Leu Gly Arg Gly Ala Gly Tyr Val Leu Lys Asp Gln Ala Thr Asn Thr
865                 870                 875                 880

Tyr Phe Ser Leu Val Ser Asp Asn Thr Phe Leu Pro Lys Ser Leu Val
                885                 890                 895

Asn Pro Asn His Gly Thr Ser Ser
            900
```

<210> SEQ ID NO 55
<211> LENGTH: 2535
<212> TYPE: DNA
<213> ORGANISM: artificial sequence
<220> FEATURE:
<223> OTHER INFORMATION: T3 C-terminal truncation

<400> SEQUENCE: 55

```
agctttgctc aatataatca ggtctatagt acagatgctg caaacttcga acatgttgat      60

cattatttga cagctgagag ttggtatcgt cctaagtaca tcttgaagga tggtaaaaca     120

tggacacagt caacagaaaa agatttccgt cctttactga tgacatggtg gcctgaccaa     180

gaaacgcagc gtcaatatgt taactacatg aatgcacagc ttggtattca tcaaacatac     240

aatacagcaa ccagtccgct tcaattgaat ttagctgctc agacaataca aactaagatc     300

gaagaaaaaa tcactgcaga aaagaatacc aattggctgc gtcagactat ttccgcattt     360

gttaagacac agtcagcttg gaacagtgac agcgaaaaac cgtttgatga tcacttacaa     420

aaaggggcat tgctttacag taataatagc aaactaactt cacaggctaa ttccaactac     480

cgtatcttaa atcgcacccc gaccaatcaa actgggaaga aggacccaag gtatacagcc     540

gatcgcacta tcggcggtta cgaatttttg ttagccaatg atgtggataa ttccaatcct     600

gtcgtgcagg ccgaacaatt gaactggcta cattttctca tgaactttgg taacatttat     660

gccaatgatc cggatgctaa ctttgattcc attcgtgttg atgcggtaga taatgtggat     720

gctgacttgc tccaaattgc tggggattac ctcaaagctg ctaaggggat tcataaaaat     780
```

```
gataaggctg ctaatgatca tttgtctatt ttagaggcat ggagttataa tgatactcct    840
taccttcatg atgatggcga caatatgatt aacatggata acaggttacg tctttccttg    900
ctttattcat tagctaaacc tttgaatcaa cgttcaggca tgaatcctct gatcactaac    960
agtttggtga atcgaactga tgataatgct gaaactgccg cagtcccttc ttattccttc   1020
attcgtgctc atgacagtga agtgcaggac ttgattcgca atattattag agcagaaatc   1080
aatcctaatg ttgtcgggta ttcattcact atggaggaaa tcaagaaggc tttcgagatt   1140
tacaacaaag acttattagc tacagagaag aaatacacac actataatac ggcactttct   1200
tatgccctgc ttttaaccaa caaatccagt gtgccgcgtg tctattatgg ggatatgttc   1260
acagatgacg ggcaatacat ggctcataag acgatcaatt acgaagccat cgaaaccctt   1320
ttaaaggctc gtattaagta tgtttcaggc ggtcaagcca tgcgcaatca acaggttggc   1380
aattctgaaa tcattacgtc tgtccgctat ggtaaaggtg ctttgaaagc aacggataca   1440
ggggaccgca ccacacggac ttcaggagtg gccgtgattg aaggcaataa cccttcttta   1500
cgtttgaagg cttctgatcg cgtggttgtc aatatgggag cagctcataa gaaccaagca   1560
taccgacctt tactcttgac cacagataac ggtatcaagg cttatcattc cgatcaagaa   1620
gcggctggtt tggtgcgcta caccaatgac agaggggaat tgatcttcac agcggctgat   1680
attaaaggct atgccaaccc tcaagtttct ggctatttag gtgtttgggt tccagtaggc   1740
gctgccgctg atcaagatgt tcgcgttgcg gcttcaacgg ccccatcaac agatggcaag   1800
tctgtgcatc aaaatgcggc ccttgattca cgcgtcatgt ttgaaggttt ctctaatttc   1860
caagcattcg ccactaaaaa agaggaatat accaatgttg tgattgctaa gaatgtggat   1920
aagtttgcgg aatggggtgt cacagatttt gaaatggcac cgcagtatgt gtcttcaacg   1980
gatggttctt tcttggattc tgtgatccaa aacggctatg cttttacgga ccgttatgat   2040
ttgggaattt ccaaacctaa taaatacggg acagccgatg atttggtgaa agcaataaaa   2100
gcgttacaca gcaagggtat taaggtaatg gctgactggg tgcctgatca aatgtatgct   2160
ttcctgaaa aagaagtggt aacagcaacc cgcgttgata agtatgggac tcctgttgca   2220
ggaagtcaga tcaaaaacac cctttatgta gttgatggta agagttctgg taaagatcaa   2280
caagccaagt atgggggagc tttcttagag gagctgcaag cgaagtatcc ggagcttttt   2340
gcgagaaaac aaatttccac aggggttccg atggaccctt cagttaagat taagcaatgg   2400
tctgccaagt actttaatgg gacaaatatt ttagggcgcg gagcaggcta tgtcttaaaa   2460
gatcaggcaa ccaatactta cttcagtctt gtttcagaca acaccttcct tcctaaatcg   2520
ttagttaacc cataa                                                    2535
```

<210> SEQ ID NO 56
<211> LENGTH: 844
<212> TYPE: PRT
<213> ORGANISM: artificial sequence
<220> FEATURE:
<223> OTHER INFORMATION: T3 C-terminal truncation

<400> SEQUENCE: 56

```
Ser Phe Ala Gln Tyr Asn Gln Val Tyr Ser Thr Asp Ala Ala Asn Phe
1               5                   10                  15

Glu His Val Asp His Tyr Leu Thr Ala Glu Ser Trp Tyr Arg Pro Lys
            20                  25                  30

Tyr Ile Leu Lys Asp Gly Lys Thr Trp Thr Gln Ser Thr Glu Lys Asp
        35                  40                  45
```

```
Phe Arg Pro Leu Leu Met Thr Trp Trp Pro Asp Gln Glu Thr Gln Arg
    50                  55                  60

Gln Tyr Val Asn Tyr Met Asn Ala Gln Leu Gly Ile His Gln Thr Tyr
65                  70                  75                  80

Asn Thr Ala Thr Ser Pro Leu Gln Leu Asn Leu Ala Ala Gln Thr Ile
                85                  90                  95

Gln Thr Lys Ile Glu Glu Lys Ile Thr Ala Glu Lys Asn Thr Asn Trp
            100                 105                 110

Leu Arg Gln Thr Ile Ser Ala Phe Val Lys Thr Gln Ser Ala Trp Asn
        115                 120                 125

Ser Asp Ser Glu Lys Pro Phe Asp Asp His Leu Gln Lys Gly Ala Leu
    130                 135                 140

Leu Tyr Ser Asn Asn Ser Lys Leu Thr Ser Gln Ala Asn Ser Asn Tyr
145                 150                 155                 160

Arg Ile Leu Asn Arg Thr Pro Thr Asn Gln Thr Gly Lys Lys Asp Pro
                165                 170                 175

Arg Tyr Thr Ala Asp Arg Thr Ile Gly Gly Tyr Glu Phe Leu Leu Ala
            180                 185                 190

Asn Asp Val Asp Asn Ser Asn Pro Val Val Gln Ala Glu Gln Leu Asn
        195                 200                 205

Trp Leu His Phe Leu Met Asn Phe Gly Asn Ile Tyr Ala Asn Asp Pro
    210                 215                 220

Asp Ala Asn Phe Asp Ser Ile Arg Val Asp Ala Val Asp Asn Val Asp
225                 230                 235                 240

Ala Asp Leu Leu Gln Ile Ala Gly Asp Tyr Leu Lys Ala Ala Lys Gly
                245                 250                 255

Ile His Lys Asn Asp Lys Ala Ala Asn Asp His Leu Ser Ile Leu Glu
            260                 265                 270

Ala Trp Ser Tyr Asn Asp Thr Pro Tyr Leu His Asp Asp Gly Asp Asn
        275                 280                 285

Met Ile Asn Met Asp Asn Arg Leu Arg Leu Ser Leu Leu Tyr Ser Leu
    290                 295                 300

Ala Lys Pro Leu Asn Gln Arg Ser Gly Met Asn Pro Leu Ile Thr Asn
305                 310                 315                 320

Ser Leu Val Asn Arg Thr Asp Asp Asn Ala Glu Thr Ala Ala Val Pro
                325                 330                 335

Ser Tyr Ser Phe Ile Arg Ala His Asp Ser Glu Val Gln Asp Leu Ile
            340                 345                 350

Arg Asn Ile Ile Arg Ala Glu Ile Asn Pro Asn Val Val Gly Tyr Ser
        355                 360                 365

Phe Thr Met Glu Glu Ile Lys Lys Ala Phe Glu Ile Tyr Asn Lys Asp
    370                 375                 380

Leu Leu Ala Thr Glu Lys Lys Tyr Thr His Tyr Asn Thr Ala Leu Ser
385                 390                 395                 400

Tyr Ala Leu Leu Leu Thr Asn Lys Ser Ser Val Pro Arg Val Tyr Tyr
                405                 410                 415

Gly Asp Met Phe Thr Asp Asp Gly Gln Tyr Met Ala His Lys Thr Ile
            420                 425                 430

Asn Tyr Glu Ala Ile Glu Thr Leu Leu Lys Ala Arg Ile Lys Tyr Val
        435                 440                 445

Ser Gly Gly Gln Ala Met Arg Asn Gln Gln Val Gly Asn Ser Glu Ile
    450                 455                 460
```

```
Ile Thr Ser Val Arg Tyr Gly Lys Gly Ala Leu Lys Ala Thr Asp Thr
465                 470                 475                 480

Gly Asp Arg Thr Thr Arg Thr Ser Gly Val Ala Val Ile Glu Gly Asn
                485                 490                 495

Asn Pro Ser Leu Arg Leu Lys Ala Ser Asp Arg Val Val Val Asn Met
            500                 505                 510

Gly Ala Ala His Lys Asn Gln Ala Tyr Arg Pro Leu Leu Leu Thr Thr
        515                 520                 525

Asp Asn Gly Ile Lys Ala Tyr His Ser Asp Gln Glu Ala Ala Gly Leu
    530                 535                 540

Val Arg Tyr Thr Asn Asp Arg Gly Glu Leu Ile Phe Thr Ala Ala Asp
545                 550                 555                 560

Ile Lys Gly Tyr Ala Asn Pro Gln Val Ser Gly Tyr Leu Gly Val Trp
                565                 570                 575

Val Pro Val Gly Ala Ala Ala Asp Gln Asp Val Arg Val Ala Ala Ser
            580                 585                 590

Thr Ala Pro Ser Thr Asp Gly Lys Ser Val His Gln Asn Ala Ala Leu
        595                 600                 605

Asp Ser Arg Val Met Phe Glu Gly Phe Ser Asn Phe Gln Ala Phe Ala
    610                 615                 620

Thr Lys Lys Glu Glu Tyr Thr Asn Val Val Ile Ala Lys Asn Val Asp
625                 630                 635                 640

Lys Phe Ala Glu Trp Gly Val Thr Asp Phe Glu Met Ala Pro Gln Tyr
                645                 650                 655

Val Ser Ser Thr Asp Gly Ser Phe Leu Asp Ser Val Ile Gln Asn Gly
            660                 665                 670

Tyr Ala Phe Thr Asp Arg Tyr Asp Leu Gly Ile Ser Lys Pro Asn Lys
        675                 680                 685

Tyr Gly Thr Ala Asp Asp Leu Val Lys Ala Ile Lys Ala Leu His Ser
    690                 695                 700

Lys Gly Ile Lys Val Met Ala Asp Trp Val Pro Asp Gln Met Tyr Ala
705                 710                 715                 720

Phe Pro Glu Lys Glu Val Val Thr Ala Thr Arg Val Asp Lys Tyr Gly
                725                 730                 735

Thr Pro Val Ala Gly Ser Gln Ile Lys Asn Thr Leu Tyr Val Val Asp
            740                 745                 750

Gly Lys Ser Ser Gly Lys Asp Gln Gln Ala Lys Tyr Gly Gly Ala Phe
        755                 760                 765

Leu Glu Glu Leu Gln Ala Lys Tyr Pro Glu Leu Phe Ala Arg Lys Gln
    770                 775                 780

Ile Ser Thr Gly Val Pro Met Asp Pro Ser Val Lys Ile Lys Gln Trp
785                 790                 795                 800

Ser Ala Lys Tyr Phe Asn Gly Thr Asn Ile Leu Gly Arg Gly Ala Gly
                805                 810                 815

Tyr Val Leu Lys Asp Gln Ala Thr Asn Thr Tyr Phe Ser Leu Val Ser
            820                 825                 830

Asp Asn Thr Phe Leu Pro Lys Ser Leu Val Asn Pro
        835                 840
```

```
<210> SEQ ID NO 57
<211> LENGTH: 2535
<212> TYPE: DNA
<213> ORGANISM: artificial sequence
<220> FEATURE:
<223> OTHER INFORMATION: T3 C-terminal truncation
```

<400> SEQUENCE: 57

```
agctttgctc aatataatca ggtctatagt acagatgctg caaacttcga acatgttgat      60
cattatttga cagccgaaag ttggtatcgt cctaagtaca tcttgaagga tggcaaaaca     120
tggacacagt caacagaaaa agatttccgt cctttactga tgacatggtg gcctgaccaa     180
gaaacgcagc gtcaatatgt taactacatg aatgcacagc ttggtattca tcaaacatac     240
aatacagcaa cttcaccgct tcaattgaat ttagctgctc agacaataca aactaagatc     300
gaagaaaaaa tcactgcaga aaagaatacc aattggctgc gtcagactat ttccgcattt     360
gttaagacac agtcagcttg gaacagtgac agcgaaaaac cgtttgatga tcacttacaa     420
aaaggggcat tgctttacag taataatagc aaactaactt cacaggctaa ttccaactac     480
cgtatcttaa atcgcacccc gaccaatcaa actgggaaga aggacccaag gtatacagct     540
gataacacta tcggcggtta cgaatttctt ttggcaaacg atgtggataa ttccaatcct     600
gtcgtgcagg ccgaacaatt gaactggctc cattttctca tgaactttgg taacatttat     660
gccaatgatc cggatgctaa ctttgattcc attcgtgttg atgcggtaga taatgtggat     720
gctgacttgc tccaaattgc tggggattac ctcaaagctg ctaaggggat tcataaaaat     780
gataaggctg ctaatgatca tttgtctatt ttagaggcat ggagttataa tgatactcct     840
taccttcatg atgatggcga caatatgatt aacatggata acaggttacg tctttccttg     900
ctttattcat tagctaaacc cttaaatcaa cgttcaggca tgaatcctct gatcactaac     960
agtttggtga atcgaactga tgataatgct gaaactgccg cagtcccttc ttattccttc    1020
atccgtgccc atgacagtga agtgcaggac ttgattcgca atattattag aacagaaatc    1080
aatcctaatg ttgtcgggta ttctttcact atggaggaaa tcaagaaggc tttcgagatt    1140
tacaacaaag acttgttagc tacagagaag aaatacacac actataatac ggcactttct    1200
tatgccctgc ttttaaccaa caaatccagt gtgccgcgtg tctattatgg ggatatgttt    1260
acagatgacg ggcaatacat ggctcataag acgatcaatt acgaagccat cgaaaccctg    1320
cttaaggctc gtattaagta tgtttcaggc ggtcaagcca tgcgcaatca acaggttggc    1380
aattctgaaa ttattacgtc tgtccgctat ggtaaaggtg ctttgaaagc aacggataca    1440
ggggaccgca ccacacgaac ttcaggagtg gccgtgattg aaggcaataa cccttcttta    1500
cgtttgaagg cttctgatcg tgttgttgtc aatatgggag cagcccataa gaaccaagca    1560
taccgacctt tactcttgac cacagataac ggtatcaagg cttatcattc cgatcaagaa    1620
gcggctggtt tggtgcgcta caccaatgac agaggggaat tgatcttcac agcggctgat    1680
attaaaggct atgccaaccc tcaagtttct ggctatttag gtgtctgggt tccagtaggc    1740
gctgccgctg atcaagatgt tcgcgttgcg gcttcaacgg ccccatcaac agatggcaag    1800
tctgtgcatc aaaatgcggc ccttgattca cgcgtcatgt ttgaaggttt ctctaatttc    1860
caagcattcg ccactaaaaa agaggaatat accaatgttg tgattgctaa gaatgtggat    1920
aagtttgcgg aatggggtgt cacagatttt gaaatggcac cgcagtatgt gtcttcaaca    1980
gatggttctt tcttggattc tgtgatccaa aacggctatg cttttacgga tcgttatgat    2040
ttgggaattt ccaaacctaa taaatacggg acagccgatg atttggttaa ggccatcaaa    2100
gcgttacaca gcaagggcat taaggtaatg gctgactggg tgcctgatca aatgtatgct    2160
ctccctgaaa aagaagtggt aacagcaacc cgcgttgata agtatgggac tcctgttgca    2220
ggaagtcaga tcaaaaacac cctttatgta gttgatggta agagttctgg taaagatcaa    2280
```

```
caagccaagt atgggggagc cttcttagag gagctgcaag cgaagtatcc ggagcttttt   2340

gcgagaaagc aaatttccac aggggttccg atggaccctt cagttaagat taagcaatgg   2400

tctgccaagt actttaatgg gacaaatatt ttagggcgcg gagcaggcta tgtcttaaaa   2460

gatcaggcaa ctaatactta cttcagtctt gtttcagaca acaccttcct tcctaaatcg   2520

ttagttaacc cataa                                                    2535


<210> SEQ ID NO 58
<211> LENGTH: 844
<212> TYPE: PRT
<213> ORGANISM: artificial sequence
<220> FEATURE:
<223> OTHER INFORMATION: T3 C-terminal truncation

<400> SEQUENCE: 58

Ser Phe Ala Gln Tyr Asn Gln Val Tyr Ser Thr Asp Ala Ala Asn Phe
1               5                   10                  15

Glu His Val Asp His Tyr Leu Thr Ala Glu Ser Trp Tyr Arg Pro Lys
            20                  25                  30

Tyr Ile Leu Lys Asp Gly Lys Thr Trp Thr Gln Ser Thr Glu Lys Asp
        35                  40                  45

Phe Arg Pro Leu Leu Met Thr Trp Trp Pro Asp Gln Glu Thr Gln Arg
    50                  55                  60

Gln Tyr Val Asn Tyr Met Asn Ala Gln Leu Gly Ile His Gln Thr Tyr
65                  70                  75                  80

Asn Thr Ala Thr Ser Pro Leu Gln Leu Asn Leu Ala Ala Gln Thr Ile
                85                  90                  95

Gln Thr Lys Ile Glu Glu Lys Ile Thr Ala Glu Lys Asn Thr Asn Trp
            100                 105                 110

Leu Arg Gln Thr Ile Ser Ala Phe Val Lys Thr Gln Ser Ala Trp Asn
        115                 120                 125

Ser Asp Ser Glu Lys Pro Phe Asp Asp His Leu Gln Lys Gly Ala Leu
    130                 135                 140

Leu Tyr Ser Asn Asn Ser Lys Leu Thr Ser Gln Ala Asn Ser Asn Tyr
145                 150                 155                 160

Arg Ile Leu Asn Arg Thr Pro Thr Asn Gln Thr Gly Lys Lys Asp Pro
                165                 170                 175

Arg Tyr Thr Ala Asp Asn Thr Ile Gly Gly Tyr Glu Phe Leu Leu Ala
            180                 185                 190

Asn Asp Val Asp Asn Ser Asn Pro Val Val Gln Ala Glu Gln Leu Asn
        195                 200                 205

Trp Leu His Phe Leu Met Asn Phe Gly Asn Ile Tyr Ala Asn Asp Pro
    210                 215                 220

Asp Ala Asn Phe Asp Ser Ile Arg Val Asp Ala Val Asp Asn Val Asp
225                 230                 235                 240

Ala Asp Leu Leu Gln Ile Ala Gly Asp Tyr Leu Lys Ala Ala Lys Gly
                245                 250                 255

Ile His Lys Asn Asp Lys Ala Ala Asn Asp His Leu Ser Ile Leu Glu
            260                 265                 270

Ala Trp Ser Tyr Asn Asp Thr Pro Tyr Leu His Asp Asp Gly Asp Asn
        275                 280                 285

Met Ile Asn Met Asp Asn Arg Leu Arg Leu Ser Leu Leu Tyr Ser Leu
    290                 295                 300

Ala Lys Pro Leu Asn Gln Arg Ser Gly Met Asn Pro Leu Ile Thr Asn
305                 310                 315                 320
```

```
Ser Leu Val Asn Arg Thr Asp Asp Asn Ala Glu Thr Ala Ala Val Pro
                325                 330                 335

Ser Tyr Ser Phe Ile Arg Ala His Asp Ser Glu Val Gln Asp Leu Ile
            340                 345                 350

Arg Asn Ile Ile Arg Thr Glu Ile Asn Pro Asn Val Val Gly Tyr Ser
        355                 360                 365

Phe Thr Met Glu Glu Ile Lys Lys Ala Phe Glu Ile Tyr Asn Lys Asp
    370                 375                 380

Leu Leu Ala Thr Glu Lys Lys Tyr Thr His Tyr Asn Thr Ala Leu Ser
385                 390                 395                 400

Tyr Ala Leu Leu Leu Thr Asn Lys Ser Ser Val Pro Arg Val Tyr Tyr
                405                 410                 415

Gly Asp Met Phe Thr Asp Asp Gly Gln Tyr Met Ala His Lys Thr Ile
            420                 425                 430

Asn Tyr Glu Ala Ile Glu Thr Leu Leu Lys Ala Arg Ile Lys Tyr Val
        435                 440                 445

Ser Gly Gly Gln Ala Met Arg Asn Gln Gln Val Gly Asn Ser Glu Ile
    450                 455                 460

Ile Thr Ser Val Arg Tyr Gly Lys Gly Ala Leu Lys Ala Thr Asp Thr
465                 470                 475                 480

Gly Asp Arg Thr Thr Arg Thr Ser Gly Val Ala Val Ile Glu Gly Asn
                485                 490                 495

Asn Pro Ser Leu Arg Leu Lys Ala Ser Asp Arg Val Val Val Asn Met
            500                 505                 510

Gly Ala Ala His Lys Asn Gln Ala Tyr Arg Pro Leu Leu Leu Thr Thr
        515                 520                 525

Asp Asn Gly Ile Lys Ala Tyr His Ser Asp Gln Glu Ala Ala Gly Leu
    530                 535                 540

Val Arg Tyr Thr Asn Asp Arg Gly Glu Leu Ile Phe Thr Ala Ala Asp
545                 550                 555                 560

Ile Lys Gly Tyr Ala Asn Pro Gln Val Ser Gly Tyr Leu Gly Val Trp
                565                 570                 575

Val Pro Val Gly Ala Ala Ala Asp Gln Asp Val Arg Val Ala Ala Ser
            580                 585                 590

Thr Ala Pro Ser Thr Asp Gly Lys Ser Val His Gln Asn Ala Ala Leu
        595                 600                 605

Asp Ser Arg Val Met Phe Glu Gly Phe Ser Asn Phe Gln Ala Phe Ala
    610                 615                 620

Thr Lys Lys Glu Glu Tyr Thr Asn Val Val Ile Ala Lys Asn Val Asp
625                 630                 635                 640

Lys Phe Ala Glu Trp Gly Val Thr Asp Phe Glu Met Ala Pro Gln Tyr
                645                 650                 655

Val Ser Ser Thr Asp Gly Ser Phe Leu Asp Ser Val Ile Gln Asn Gly
            660                 665                 670

Tyr Ala Phe Thr Asp Arg Tyr Asp Leu Gly Ile Ser Lys Pro Asn Lys
        675                 680                 685

Tyr Gly Thr Ala Asp Asp Leu Val Lys Ala Ile Lys Ala Leu His Ser
    690                 695                 700

Lys Gly Ile Lys Val Met Ala Asp Trp Val Pro Asp Gln Met Tyr Ala
705                 710                 715                 720

Leu Pro Glu Lys Glu Val Val Thr Ala Thr Arg Val Asp Lys Tyr Gly
                725                 730                 735
```

```
Thr Pro Val Ala Gly Ser Gln Ile Lys Asn Thr Leu Tyr Val Val Asp
            740                 745                 750

Gly Lys Ser Ser Gly Lys Asp Gln Gln Ala Lys Tyr Gly Gly Ala Phe
        755                 760                 765

Leu Glu Glu Leu Gln Ala Lys Tyr Pro Glu Leu Phe Ala Arg Lys Gln
    770                 775                 780

Ile Ser Thr Gly Val Pro Met Asp Pro Ser Val Lys Ile Lys Gln Trp
785                 790                 795                 800

Ser Ala Lys Tyr Phe Asn Gly Thr Asn Ile Leu Gly Arg Gly Ala Gly
                805                 810                 815

Tyr Val Leu Lys Asp Gln Ala Thr Asn Thr Tyr Phe Ser Leu Val Ser
            820                 825                 830

Asp Asn Thr Phe Leu Pro Lys Ser Leu Val Asn Pro
        835                 840
```

<210> SEQ ID NO 59
<211> LENGTH: 2535
<212> TYPE: DNA
<213> ORGANISM: artificial sequence
<220> FEATURE:
<223> OTHER INFORMATION: T3 C-terminal truncation

<400> SEQUENCE: 59

```
agctttgctc aatataatca ggtctatagt acagatgctg caaacttcga acatgttgat     60

cattatttga cagctgagag ttggtatcgt cctaagtaca tcttgaaaga tggtaaaaca    120

tggacacagt caacagaaaa agatttccgt cctttattga tgacatggtg gcctgaccaa    180

gaaacacagc gtcaatatgt caactacatg aatgcacagc ttgggatcaa gcaaacatac    240

aatacagcaa ccagtccgct tcaattaaat ttagcggctc agacaataca aactaagatc    300

gaagaaaaga tcactgcaga aaagaatacc aattggctgc gtcagactat ttcagcattt    360

gttaagacac agtcagcttg gaatagtgag agcgaaaaac cgtttgatga tcacttacaa    420

aaaggggcat tgctttacag taacaatagc aagctaactt cacaggctaa ttccaactac    480

cgtattttaa atcgcacccc gaccaatcaa accggaaaga aagatccacg gtatacagcc    540

gatcgcacca tcggtggtta cgagttcttg ctggctaatg atgtggataa ttccaatcct    600

gttgttcagg ccgaacagct gaactggctg cattttctca tgaactttgg taacatttat    660

gccaacgatc ctgatgctaa ctttgattcc attcgtgttg atgcggtgga caatgtggat    720

gctgacttac ttcaaatcgc tggtgattac ctcaaagctg ctaaagggat tcataaaaat    780

gataaggctg ccaatgatca tttgtctatt ttagaggcat ggagctataa cgacactcct    840

taccttcatg atgatggcga taatatgatt aacatggaca atagattacg tctttccttg    900

ctttattcat tagctaaacc cttgaatcaa cgttcaggca tgaatcctct catcactaac    960

agtctggtga atcgaacaga tgataacgct gaaactgccg cagtcccttc ttattccttc   1020

attcgtgccc atgacagtga agtgcaggat ttgattcgca atattattag agcagaaatc   1080

aatcctaatg ttgttggtta ttctttcacc atggaggaaa tcaagaaggc tttcgagatt   1140

tacaacaaag acttactggc tacagagaag aaatacacac actataatac ggcactttct   1200

tatgccctgc ttttaactaa caaatccagt gtgccgcgtg tctattacgg cgatatgttc   1260

acagatgacg gtcagtacat ggcacataag accattaatt acgaagccat cgaaactctg   1320

cttaaagcac ggattaagta tgtttcaggc ggtcaggcca tgcgaaacca aagtgttggc   1380

aattctgaaa tcattacgtc tgttcgctat ggtaagggag ccctgaaagc aacggataca   1440
```

```
ggagaccgca ccacacgcac ttctggagtg gccgtgattg aaggcaatag cccttcttta   1500

cgtttgcgtt cttatgatcg tgttgttgtc aatatgggag ctgcccataa gaaccaagca   1560

taccgacctt tactcttgac cacagataac ggtatcaagg cttatcattc tgatcaagaa   1620

gcggctggtt tggtgcgcta caccaatgac agaggggaat tgatcttcac agcggctgat   1680

atcaaaggct atgccaaccc tcaagtttct ggctatttag gtgtttgggt gccagtagga   1740

gctgcagctg atcaagatgt ccgtgtggca gccagcactg ccccatcaac agacggcaaa   1800

tcagtgcatc aaaatgcagc ccttgattct cgtgtcatgt ttgaaggctt ctcaaatttc   1860

caagcatttg cgactacaaa agaagagtat acgaatgtgg tcattgctaa gaatgtggat   1920

aagtttgcgg aatggggtgt tacagacttt gaaatggcac cgcaatatgt gtcttcaaca   1980

gatggttctt tcttggattc tgtaattcaa aatggctatg cctttacgga tcgttatgat   2040

ctgggaattt ccaaacctaa taaatacggg acagccgatg atttggttaa ggccatcaaa   2100

gcattgcaca gcaagggcat taaggttatg gccgactggg tgcctgatca aatgtatgct   2160

ttccctgaga aagaagtggt tgaagtcact cgtgtggaca aatatggaca tcctgttgca   2220

ggcagtcaaa tcaaaaacac actttatgta gttgatggta agagttccgg aaaggaccag   2280

caggctaagt atgggggagc tttcttagaa gagctgcaag ctaaatatcc agagctcttt   2340

gccagaaagc aaatttcaac aggggttccg atggacccaa ctgttaagat taagcaatgg   2400

tctgccaagt actttaatgg aacaaacatt ttagggcggg gagcaggcta tgtcttaaag   2460

gatcaggcaa ccaatactta tttcagtctt gctgcagata ataccttcct tccgaaatca   2520

ttagttaatc cgtaa                                                    2535
```

```
<210> SEQ ID NO 60
<211> LENGTH: 844
<212> TYPE: PRT
<213> ORGANISM: artificial sequence
<220> FEATURE:
<223> OTHER INFORMATION: T3 C-terminal truncation

<400> SEQUENCE: 60

Ser Phe Ala Gln Tyr Asn Gln Val Tyr Ser Thr Asp Ala Ala Asn Phe
1               5                   10                  15

Glu His Val Asp His Tyr Leu Thr Ala Glu Ser Trp Tyr Arg Pro Lys
            20                  25                  30

Tyr Ile Leu Lys Asp Gly Lys Thr Trp Thr Gln Ser Thr Glu Lys Asp
        35                  40                  45

Phe Arg Pro Leu Leu Met Thr Trp Trp Pro Asp Gln Glu Thr Gln Arg
    50                  55                  60

Gln Tyr Val Asn Tyr Met Asn Ala Gln Leu Gly Ile Lys Gln Thr Tyr
65                  70                  75                  80

Asn Thr Ala Thr Ser Pro Leu Gln Leu Asn Leu Ala Ala Gln Thr Ile
                85                  90                  95

Gln Thr Lys Ile Glu Glu Lys Ile Thr Ala Glu Lys Asn Thr Asn Trp
            100                 105                 110

Leu Arg Gln Thr Ile Ser Ala Phe Val Lys Thr Gln Ser Ala Trp Asn
        115                 120                 125

Ser Glu Ser Glu Lys Pro Phe Asp Asp His Leu Gln Lys Gly Ala Leu
    130                 135                 140

Leu Tyr Ser Asn Asn Ser Lys Leu Thr Ser Gln Ala Asn Ser Asn Tyr
145                 150                 155                 160

Arg Ile Leu Asn Arg Thr Pro Thr Asn Gln Thr Gly Lys Lys Asp Pro
```

```
                165                 170                 175

Arg Tyr Thr Ala Asp Arg Thr Ile Gly Gly Tyr Glu Phe Leu Leu Ala
            180                 185                 190

Asn Asp Val Asp Asn Ser Asn Pro Val Val Gln Ala Glu Gln Leu Asn
        195                 200                 205

Trp Leu His Phe Leu Met Asn Phe Gly Asn Ile Tyr Ala Asn Asp Pro
    210                 215                 220

Asp Ala Asn Phe Asp Ser Ile Arg Val Asp Ala Val Asp Asn Val Asp
225                 230                 235                 240

Ala Asp Leu Leu Gln Ile Ala Gly Asp Tyr Leu Lys Ala Ala Lys Gly
                245                 250                 255

Ile His Lys Asn Asp Lys Ala Ala Asn Asp His Leu Ser Ile Leu Glu
            260                 265                 270

Ala Trp Ser Tyr Asn Asp Thr Pro Tyr Leu His Asp Asp Gly Asp Asn
        275                 280                 285

Met Ile Asn Met Asp Asn Arg Leu Arg Leu Ser Leu Leu Tyr Ser Leu
    290                 295                 300

Ala Lys Pro Leu Asn Gln Arg Ser Gly Met Asn Pro Leu Ile Thr Asn
305                 310                 315                 320

Ser Leu Val Asn Arg Thr Asp Asp Asn Ala Glu Thr Ala Ala Val Pro
                325                 330                 335

Ser Tyr Ser Phe Ile Arg Ala His Asp Ser Glu Val Gln Asp Leu Ile
            340                 345                 350

Arg Asn Ile Ile Arg Ala Glu Ile Asn Pro Asn Val Val Gly Tyr Ser
        355                 360                 365

Phe Thr Met Glu Glu Ile Lys Lys Ala Phe Glu Ile Tyr Asn Lys Asp
    370                 375                 380

Leu Leu Ala Thr Glu Lys Lys Tyr Thr His Tyr Asn Thr Ala Leu Ser
385                 390                 395                 400

Tyr Ala Leu Leu Leu Thr Asn Lys Ser Ser Val Pro Arg Val Tyr Tyr
                405                 410                 415

Gly Asp Met Phe Thr Asp Asp Gly Gln Tyr Met Ala His Lys Thr Ile
            420                 425                 430

Asn Tyr Glu Ala Ile Glu Thr Leu Leu Lys Ala Arg Ile Lys Tyr Val
        435                 440                 445

Ser Gly Gly Gln Ala Met Arg Asn Gln Ser Val Gly Asn Ser Glu Ile
    450                 455                 460

Ile Thr Ser Val Arg Tyr Gly Lys Gly Ala Leu Lys Ala Thr Asp Thr
465                 470                 475                 480

Gly Asp Arg Thr Thr Arg Thr Ser Gly Val Ala Val Ile Glu Gly Asn
                485                 490                 495

Ser Pro Ser Leu Arg Leu Arg Ser Tyr Asp Arg Val Val Val Asn Met
            500                 505                 510

Gly Ala Ala His Lys Asn Gln Ala Tyr Arg Pro Leu Leu Leu Thr Thr
        515                 520                 525

Asp Asn Gly Ile Lys Ala Tyr His Ser Asp Gln Glu Ala Ala Gly Leu
    530                 535                 540

Val Arg Tyr Thr Asn Asp Arg Gly Glu Leu Ile Phe Thr Ala Ala Asp
545                 550                 555                 560

Ile Lys Gly Tyr Ala Asn Pro Gln Val Ser Gly Tyr Leu Gly Val Trp
                565                 570                 575

Val Pro Val Gly Ala Ala Ala Asp Gln Asp Val Arg Val Ala Ala Ser
            580                 585                 590
```

```
Thr Ala Pro Ser Thr Asp Gly Lys Ser Val His Gln Asn Ala Ala Leu
        595                 600                 605

Asp Ser Arg Val Met Phe Glu Gly Phe Ser Asn Phe Gln Ala Phe Ala
    610                 615                 620

Thr Thr Lys Glu Glu Tyr Thr Asn Val Val Ile Ala Lys Asn Val Asp
625                 630                 635                 640

Lys Phe Ala Glu Trp Gly Val Thr Asp Phe Glu Met Ala Pro Gln Tyr
                645                 650                 655

Val Ser Ser Thr Asp Gly Ser Phe Leu Asp Ser Val Ile Gln Asn Gly
            660                 665                 670

Tyr Ala Phe Thr Asp Arg Tyr Asp Leu Gly Ile Ser Lys Pro Asn Lys
        675                 680                 685

Tyr Gly Thr Ala Asp Asp Leu Val Lys Ala Ile Lys Ala Leu His Ser
    690                 695                 700

Lys Gly Ile Lys Val Met Ala Asp Trp Val Pro Asp Gln Met Tyr Ala
705                 710                 715                 720

Phe Pro Glu Lys Glu Val Val Glu Val Thr Arg Val Asp Lys Tyr Gly
                725                 730                 735

His Pro Val Ala Gly Ser Gln Ile Lys Asn Thr Leu Tyr Val Val Asp
            740                 745                 750

Gly Lys Ser Ser Gly Lys Asp Gln Gln Ala Lys Tyr Gly Gly Ala Phe
        755                 760                 765

Leu Glu Glu Leu Gln Ala Lys Tyr Pro Glu Leu Phe Ala Arg Lys Gln
    770                 775                 780

Ile Ser Thr Gly Val Pro Met Asp Pro Thr Val Lys Ile Lys Gln Trp
785                 790                 795                 800

Ser Ala Lys Tyr Phe Asn Gly Thr Asn Ile Leu Gly Arg Gly Ala Gly
                805                 810                 815

Tyr Val Leu Lys Asp Gln Ala Thr Asn Thr Tyr Phe Ser Leu Ala Ala
            820                 825                 830

Asp Asn Thr Phe Leu Pro Lys Ser Leu Val Asn Pro
        835                 840
```

<210> SEQ ID NO 61
<211> LENGTH: 2535
<212> TYPE: DNA
<213> ORGANISM: artificial sequence
<220> FEATURE:
<223> OTHER INFORMATION: T3 C-terminal truncation

<400> SEQUENCE: 61

```
agctttgctc aatataatca ggtctatagt acagatgctg caaacttcga acatgttgat     60

cattatttga cagctgagag ttggtatcgt cctaaataca tcttaaaaga tggcaaaaca    120

tggacacagt caacagaaaa agatttccgt cccttactga tgacatggtg gcctgaccaa    180

gaaacgcagc gtcaatatgt taactacatg aatgcacagc ttggtattca tcgaacatac    240

aatacagcaa cttcaccgct tcaattgaat ttagctgctc agacaataca aactaagatc    300

gaagaaaaaa tcactgcaga aaagaatacc aattggctgc gtcagactat ttccgcattt    360

gttaagacac agtcagcttg gaacagtgac agcgaaaaac cgtttgatga tcacttacaa    420

aaaggggcat tgctttacag taataatagc aaactaactt cacaggctaa ttccaactac    480

cgtatcttaa atcgcacccc gaccaatcaa accggaaaga aagatccaag gtatacagct    540

gatcgcacta tcggcggtta cgaatttctt ttggcaaacg atgtggataa ttctaatcct    600
```

```
gtcgtgcagg ccgaacaatt gaactggcta cattttctca tgaactttgg taacatttat    660

gccaatgatc cggatgctaa ctttgattcc attcgtgttg atgcggtgga taatgtggat    720

gctgacttgc tccaaattgc tggggattac ctcaaagctg ctaaggggat tcataaaaat    780

gataaggctg ctaatgatca tttgtctatt ttagaggcat ggagttataa tgatactcct    840

taccttcatg atgatggcga caatatgatt aacatggata acaggttacg tctttccttg    900

ctttattcat tagctaaacc tttgaatcaa cgttcaggca tgaatcctct gatcactaac    960

agtttggtga atcgaactga tgataatgct gaaactgccg cagtcccttc ttattccttc   1020

atccgtgccc atgacagtga agtgcaggac ttgattcgca atattattag agcagaaatc   1080

aatcctaatg ttgtcgggta ttctttcact atggaggaaa tcaagaaggc tttcgagatt   1140

tacaacaaag acttattagc tacagagaag aaatacacac actataatac ggcactttct   1200

tatgccctgc ttttaaccaa caaatccagt gtgccgcgtg tctattatgg ggatatgttc   1260

acagatgacg ggcaatacat ggctcataag acgatcaatt acgaagccat cgaaaccctt   1320

ttaaaggctc gtattaagta tgtttcaggc ggtcaagcca tgcgcaatca acaggttggc   1380

aattctgaaa tcattacgtc tgtccgctat ggtaaaggtg ctttgaaagc aacggataca   1440

ggggaccgca ccacacggac ttcaggagtg gccgtgattg aaggcaataa cccttcttta   1500

cgtttgaagg cttctgatcg cgtggttgtc aatatgggag cagcccataa gaaccaagca   1560

taccgtccat tattgttaac taccaacaat gggattaaag catatcattc cgatcaagaa   1620

gcggctggtt tggtgcgcta caccaatgac agaggggaat tgatcttcac agcggctgat   1680

attaaaggct atgccaaccc tcaagtttct ggctatttag gtgtttgggt tccagtaggc   1740

gctgccgctg atcaagatgt tcgcgttgcg gcttcaacgg ccccatcaac agatggcaag   1800

tctgtgcatc aaaatgcggc ccttgattca cgcgtcatgt ttgaaggttt ctctaatttc   1860

caagcattcg ccactaaaaa agaggaatat accaatgttg tgattgctaa gaatgtggat   1920

aagtttgcgg aatggggggt cacagatttt gaaatggcac cgcagtatgt gtcttcaaca   1980

gatggttctt tcttggattc tgtgatccaa aacggctatg cttttacgga ccgttatgat   2040

ttaggaattt ccaaacctaa taaatacggg acagccgatg atttggtgaa agccatcaaa   2100

gcgttacaca gcaagggcat taaggtaatg gctgactggg tgcctgatca aatgtatgct   2160

ctccctgaaa aagaagtggt aacagcaacc cgtgttgata agtatgggac tcctgttgca   2220

ggaagtcaga taaaaaacac cctttatgta gttgatggta agagttctgg taaagatcaa   2280

caagccaagt atgggggagc tttcttagag gagctgcaag ctaaatatcc ggagcttttt   2340

gcgagaaaac aaatttccac aggggttccg atggaccctt cagttaagat taagcaatgg   2400

tctgccaagt actttaatgg gacaaatatt ttagggcgcg gagcaggcta tgtcttaaaa   2460

gatcaggcaa ccaatactta cttcagtctt gtttcagaca acaccttcct tcctaaatcg   2520

ttagttaacc cataa                                                    2535
```

<210> SEQ ID NO 62
<211> LENGTH: 844
<212> TYPE: PRT
<213> ORGANISM: artificial sequence
<220> FEATURE:
<223> OTHER INFORMATION: T3 C-terminal truncation

<400> SEQUENCE: 62

```
Ser Phe Ala Gln Tyr Asn Gln Val Tyr Ser Thr Asp Ala Ala Asn Phe
1               5                   10                  15
```

-continued

```
Glu His Val Asp His Tyr Leu Thr Ala Glu Ser Trp Tyr Arg Pro Lys
            20                  25                  30

Tyr Ile Leu Lys Asp Gly Lys Thr Trp Thr Gln Ser Thr Glu Lys Asp
        35                  40                  45

Phe Arg Pro Leu Leu Met Thr Trp Trp Pro Asp Gln Glu Thr Gln Arg
    50                  55                  60

Gln Tyr Val Asn Tyr Met Asn Ala Gln Leu Gly Ile His Arg Thr Tyr
65                  70                  75                  80

Asn Thr Ala Thr Ser Pro Leu Gln Leu Asn Leu Ala Ala Gln Thr Ile
                85                  90                  95

Gln Thr Lys Ile Glu Glu Lys Ile Thr Ala Glu Lys Asn Thr Asn Trp
            100                 105                 110

Leu Arg Gln Thr Ile Ser Ala Phe Val Lys Thr Gln Ser Ala Trp Asn
        115                 120                 125

Ser Asp Ser Glu Lys Pro Phe Asp Asp His Leu Gln Lys Gly Ala Leu
    130                 135                 140

Leu Tyr Ser Asn Asn Ser Lys Leu Thr Ser Gln Ala Asn Ser Asn Tyr
145                 150                 155                 160

Arg Ile Leu Asn Arg Thr Pro Thr Asn Gln Thr Gly Lys Lys Asp Pro
                165                 170                 175

Arg Tyr Thr Ala Asp Arg Thr Ile Gly Gly Tyr Glu Phe Leu Leu Ala
            180                 185                 190

Asn Asp Val Asp Asn Ser Asn Pro Val Val Gln Ala Glu Gln Leu Asn
        195                 200                 205

Trp Leu His Phe Leu Met Asn Phe Gly Asn Ile Tyr Ala Asn Asp Pro
    210                 215                 220

Asp Ala Asn Phe Asp Ser Ile Arg Val Asp Ala Val Asp Asn Val Asp
225                 230                 235                 240

Ala Asp Leu Leu Gln Ile Ala Gly Asp Tyr Leu Lys Ala Ala Lys Gly
                245                 250                 255

Ile His Lys Asn Asp Lys Ala Ala Asn Asp His Leu Ser Ile Leu Glu
            260                 265                 270

Ala Trp Ser Tyr Asn Asp Thr Pro Tyr Leu His Asp Asp Gly Asp Asn
        275                 280                 285

Met Ile Asn Met Asp Asn Arg Leu Arg Leu Ser Leu Leu Tyr Ser Leu
    290                 295                 300

Ala Lys Pro Leu Asn Gln Arg Ser Gly Met Asn Pro Leu Ile Thr Asn
305                 310                 315                 320

Ser Leu Val Asn Arg Thr Asp Asp Asn Ala Glu Thr Ala Ala Val Pro
                325                 330                 335

Ser Tyr Ser Phe Ile Arg Ala His Asp Ser Glu Val Gln Asp Leu Ile
            340                 345                 350

Arg Asn Ile Ile Arg Ala Glu Ile Asn Pro Asn Val Val Gly Tyr Ser
        355                 360                 365

Phe Thr Met Glu Glu Ile Lys Lys Ala Phe Glu Ile Tyr Asn Lys Asp
    370                 375                 380

Leu Leu Ala Thr Glu Lys Lys Tyr Thr His Tyr Asn Thr Ala Leu Ser
385                 390                 395                 400

Tyr Ala Leu Leu Leu Thr Asn Lys Ser Ser Val Pro Arg Val Tyr Tyr
                405                 410                 415

Gly Asp Met Phe Thr Asp Asp Gly Gln Tyr Met Ala His Lys Thr Ile
            420                 425                 430
```

-continued

```
Asn Tyr Glu Ala Ile Glu Thr Leu Leu Lys Ala Arg Ile Lys Tyr Val
        435                 440                 445

Ser Gly Gly Gln Ala Met Arg Asn Gln Gln Val Gly Asn Ser Glu Ile
    450                 455                 460

Ile Thr Ser Val Arg Tyr Gly Lys Gly Ala Leu Lys Ala Thr Asp Thr
465                 470                 475                 480

Gly Asp Arg Thr Thr Arg Thr Ser Gly Val Ala Val Ile Glu Gly Asn
                485                 490                 495

Asn Pro Ser Leu Arg Leu Lys Ala Ser Asp Arg Val Val Val Asn Met
            500                 505                 510

Gly Ala Ala His Lys Asn Gln Ala Tyr Arg Pro Leu Leu Leu Thr Thr
        515                 520                 525

Asn Asn Gly Ile Lys Ala Tyr His Ser Asp Gln Glu Ala Ala Gly Leu
    530                 535                 540

Val Arg Tyr Thr Asn Asp Arg Gly Glu Leu Ile Phe Thr Ala Ala Asp
545                 550                 555                 560

Ile Lys Gly Tyr Ala Asn Pro Gln Val Ser Gly Tyr Leu Gly Val Trp
                565                 570                 575

Val Pro Val Gly Ala Ala Ala Asp Gln Asp Val Arg Val Ala Ala Ser
            580                 585                 590

Thr Ala Pro Ser Thr Asp Gly Lys Ser Val His Gln Asn Ala Ala Leu
        595                 600                 605

Asp Ser Arg Val Met Phe Glu Gly Phe Ser Asn Phe Gln Ala Phe Ala
    610                 615                 620

Thr Lys Lys Glu Glu Tyr Thr Asn Val Val Ile Ala Lys Asn Val Asp
625                 630                 635                 640

Lys Phe Ala Glu Trp Gly Val Thr Asp Phe Glu Met Ala Pro Gln Tyr
                645                 650                 655

Val Ser Ser Thr Asp Gly Ser Phe Leu Asp Ser Val Ile Gln Asn Gly
            660                 665                 670

Tyr Ala Phe Thr Asp Arg Tyr Asp Leu Gly Ile Ser Lys Pro Asn Lys
        675                 680                 685

Tyr Gly Thr Ala Asp Asp Leu Val Lys Ala Ile Lys Ala Leu His Ser
    690                 695                 700

Lys Gly Ile Lys Val Met Ala Asp Trp Val Pro Asp Gln Met Tyr Ala
705                 710                 715                 720

Leu Pro Glu Lys Glu Val Val Thr Ala Thr Arg Val Asp Lys Tyr Gly
                725                 730                 735

Thr Pro Val Ala Gly Ser Gln Ile Lys Asn Thr Leu Tyr Val Val Asp
            740                 745                 750

Gly Lys Ser Ser Gly Lys Asp Gln Gln Ala Lys Tyr Gly Gly Ala Phe
        755                 760                 765

Leu Glu Glu Leu Gln Ala Lys Tyr Pro Glu Leu Phe Ala Arg Lys Gln
    770                 775                 780

Ile Ser Thr Gly Val Pro Met Asp Pro Ser Val Lys Ile Lys Gln Trp
785                 790                 795                 800

Ser Ala Lys Tyr Phe Asn Gly Thr Asn Ile Leu Gly Arg Gly Ala Gly
                805                 810                 815

Tyr Val Leu Lys Asp Gln Ala Thr Asn Thr Tyr Phe Ser Leu Val Ser
            820                 825                 830

Asp Asn Thr Phe Leu Pro Lys Ser Leu Val Asn Pro
        835                 840
```